United States Patent [19]

Wigan et al.

[11] 4,388,489

[45] Jun. 14, 1983

[54] CONVERSATIONAL VIDEO SYSTEM

[75] Inventors: Jack G. Wigan; David G. Ure, both of London; John M. Richards, Blewbury, all of England

[73] Assignee: Reuters Limited, London, England

[21] Appl. No.: 230,341

[22] Filed: Jan. 30, 1981

[51] Int. Cl.³ ..................... G06F 15/20; H04Q 11/04; G11B 27/10

[52] U.S. Cl. .................................. 178/3; 179/2 TV; 340/711; 358/85

[58] Field of Search .................... 178/2 R, 3, 17.5, 15, 178/30; 358/85, 84, 86, 93, 101, 903; 179/2 TV; 340/711; 364/514

[56] References Cited

U.S. PATENT DOCUMENTS 3,746,780 7/1973 Stetten et al. ......................... 358/85

4,251,691 2/1981 Kakihara et al. ................ 179/2 TV

FOREIGN PATENT DOCUMENTS 2448266 10/1980 France .

OTHER PUBLICATIONS

"The Reuter Money Dealing Service", an information booklet published in 1978 by Reuters Limited.

*Primary Examiner*—Thomas A. Robinson
*Attorney, Agent, or Firm*—Hubbell, Cohen, Stiefel & Gross

[57] ABSTRACT

A video conversational data communication network (30) in which subscribers (34, 35) may conduct conversational video textual data communications with one or more keystations (70, 602, 98) the network (30). Each keystation (70, 602, 98) is associated with a keystation terminal controller interface (68, 96, 600) which is in turn connected to a message switching node (32) for routing calls throughout the network (30). The keystation controller interface (68, 96, 600) locally stores (304, 306) video conversational textual data for its associated keystations (70, 82, 84, 98, 100, 602) and enables two different designated keystations to conduct two different video conversations with a common keystation in a split screen display (76). The split screen display (76) may also be used to display retrievable data from a data base (50, 52) for simultaneous display (76) along with a video conversation. The video conversational textual data is transmitted between connected keystation controller interfaces (96, 602) in packets which contain less than the total displayable data content of the conversational video textural data message input via the keyboard (72). The keystation controller interface (96, 602) also enables preparation of responses prior to transmission to the other party and while receiving a transmission from that party. Prior to completion of a call, the keystation controller interface (96, 602) provides an incoming calls queue video display (76) at the connected keystations (96, 602). This video display (76) may contain a unique identifier for each keystation initiating a call as well as an interest message. The receiving keystation may then randomly select any of the displayed incoming calls irrespective of position in the queue and the video conversation may then take place using the associated keyboards (72) and video displays (76). A hard copy print out of the video conversation may then be obtained on a printer (102, 604).

23 Claims, 33 Drawing Figures

OVERALL SYSTEM

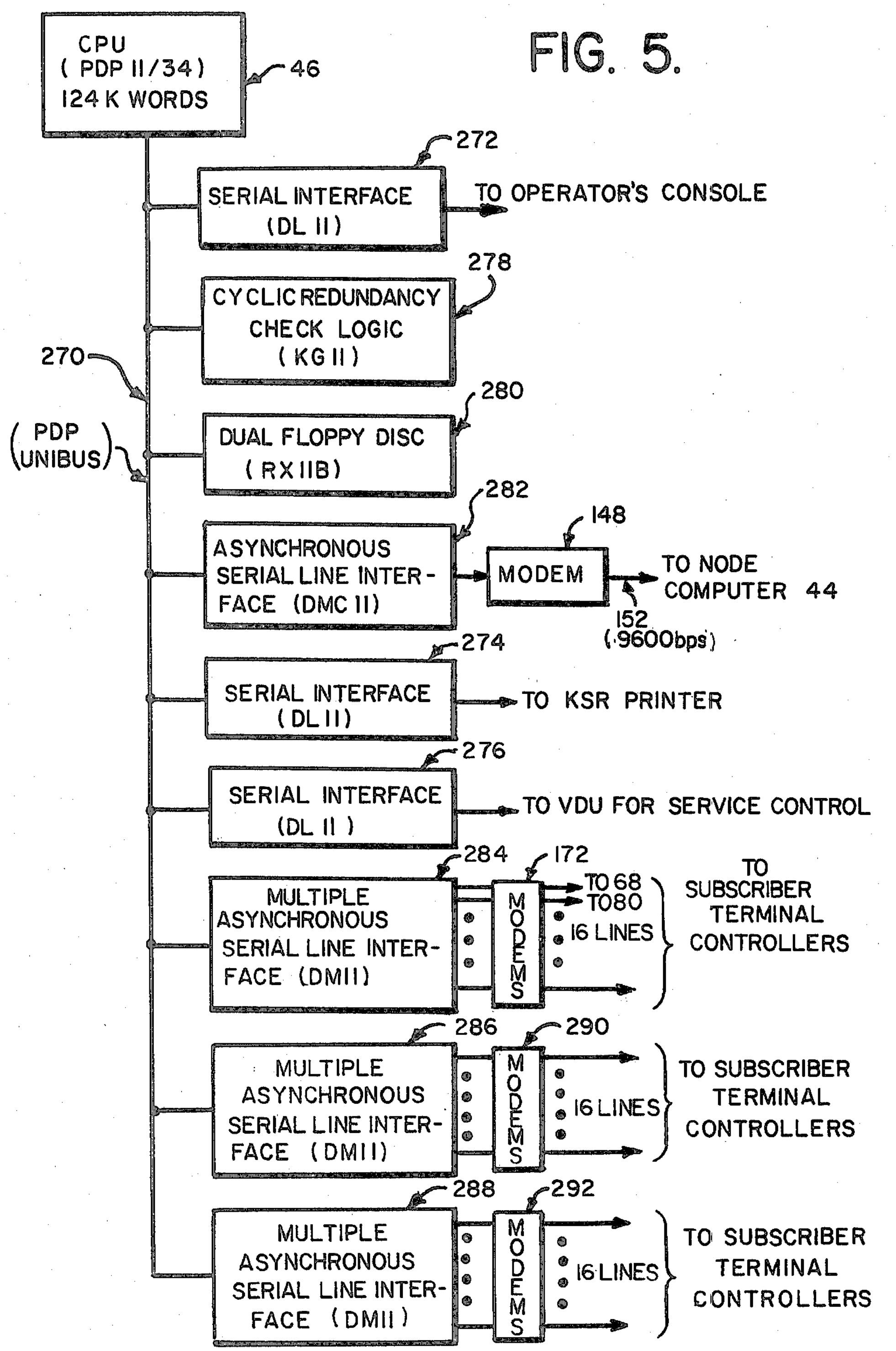
FIG. 5.
CPU
( PDP 11/34)
124 K WORDS
46
272
SERIAL INTERFACE
(DL 11)
TO OPERATOR'S CONSOLE
278
CYCLIC REDUNDANCY
CHECK LOGIC
( KG 11 )
270
PDP
UNIBUS
280
DUAL FLOPPY DISC
( RX 11B)
282
148
ASYNCHRONOUS
SERIAL LINE INTER-
FACE (DMC 11)
MODEM
TO NODE
COMPUTER 44
152
(9600bps)
274
SERIAL INTERFACE
( DL 11)
TO KSR PRINTER
276
SERIAL INTERFACE
(DL 11 )
TO VDU FOR SERVICE CONTROL
284
172
MULTIPLE
ASYNCHRONOUS
SERIAL LINE INTER-
FACE (DM11)
MODEMS
TO 68
TO 80
16 LINES
TO
SUBSCRIBER
TERMINAL
CONTROLLERS
286
290
MULTIPLE
ASYNCHRONOUS
SERIAL LINE INTER-
FACE (DM11)
MODEMS
16 LINES
TO SUBSCRIBER
TERMINAL
CONTROLLERS
288
292
MULTIPLE
ASYNCHRONOUS
SERIAL LINE INTER-
FACE (DM11)
MODEMS
16 LINES
TO SUBSCRIBER
TERMINAL
CONTROLLERS

FIG. 10A.

Call Headings

When a call has been Queued

TO CHBN 1350 FREE

When the call is accepted and the counterparty is to transmit

FROM BARL BARCLAYS LONDON -2 1350 RECEIVE

When this desk unit is to transmit

TO CHMN CHASE MANHATTAN NY -12 1350 SEND

When a bell has been received

TO CHMN CHASE MANHATTAN NY -12 1350 SEND

When being scrolled

TO CHMN CHASE MANHATTAN NY -12 1410 RECEIVE SCROLL

When the other party Ended Contact

FROM BARL BARCLAYS LONDON -2 1350 ENDED

FIG. 10B.

An Example of Conversations Printouts

```
TO CHMN    CHASE MANHATTAN NY  -12     1350  16 SEP  2/0151      CNV
#  CABLE PLEASE
    1.8077-84
#± AT 84 I BUY STG  1 MILLION FOR DLRS
    OK  AGREED  NY DLRS  TO BANK OF AMERICA N.Y.
#  NY  STG  TO  MIDLAND  LDN
#  **END**
   (164 CHARS)
```

A Left Message Printout at the Receiver

```
FROM  CHBN - 2 1420 16 SEP   SWISS FRANCS          LLLLLLLLLLLLCNV
```

The Same Left Message Printout at the Sender

```
TO    CHBN - 2  1420  16 SEP   SWISS FRANCS        LLLLLLLLLLLLCNV
```

FIG. 10C.

Left Message Display

```
MSGE                         LEFT MESSAGES AT 1421

93 UBSZ -16 1421 DM PSE
94 DMBC - 1 1421 F.FRANCS DEP
```

FIG. 10D.

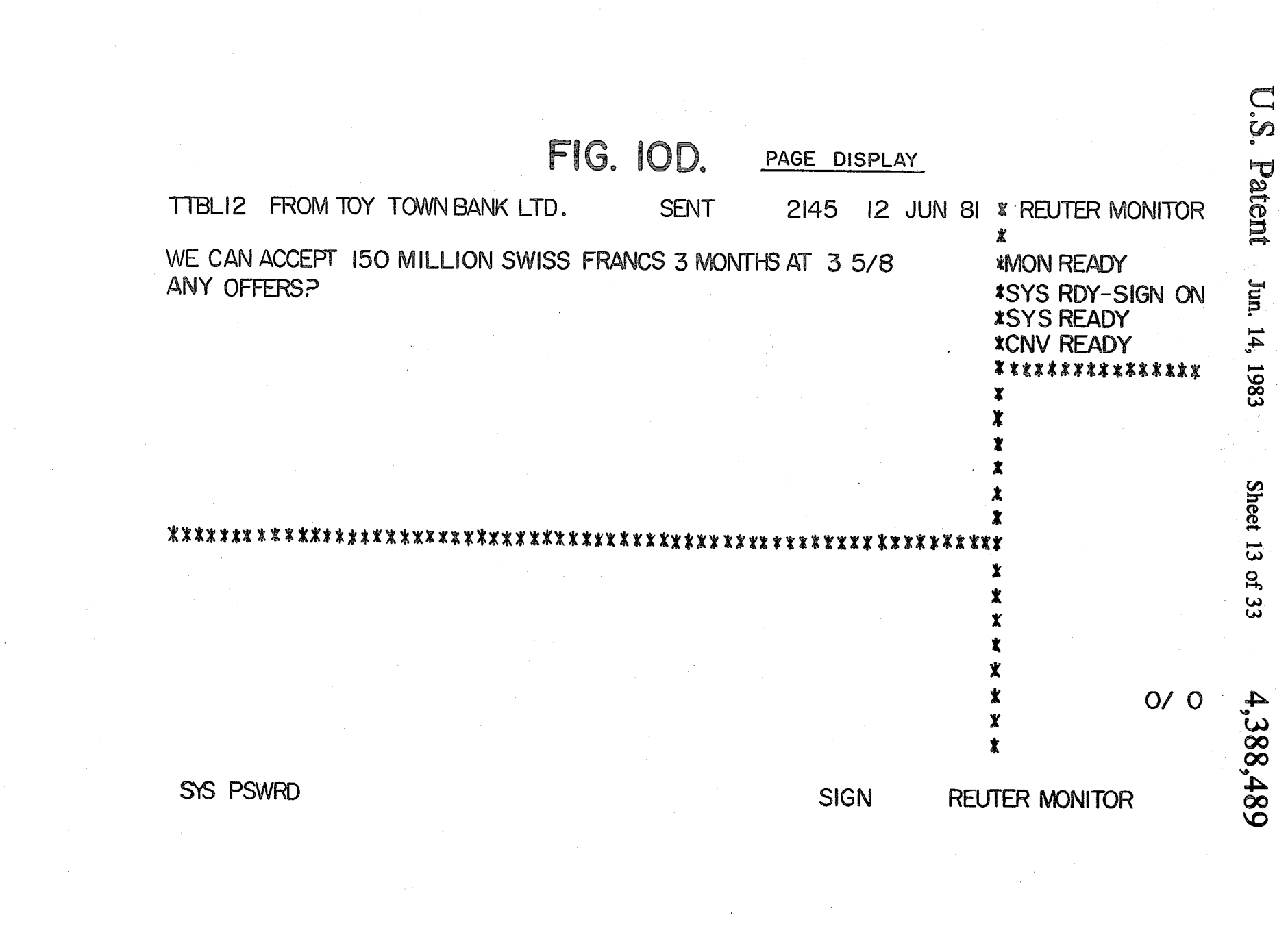

PAGE DISPLAY

TTBL12 FROM TOY TOWN BANK LTD. SENT 2145 12 JUN 81 * REUTER MONITOR

WE CAN ACCEPT 150 MILLION SWISS FRANCS 3 MONTHS AT 3 5/8
ANY OFFERS?

*MON READY
*SYS RDY-SIGN ON
*SYS READY
*CNV READY

0/ 0

SYS PSWRD SIGN REUTER MONITOR

Figure 10E:
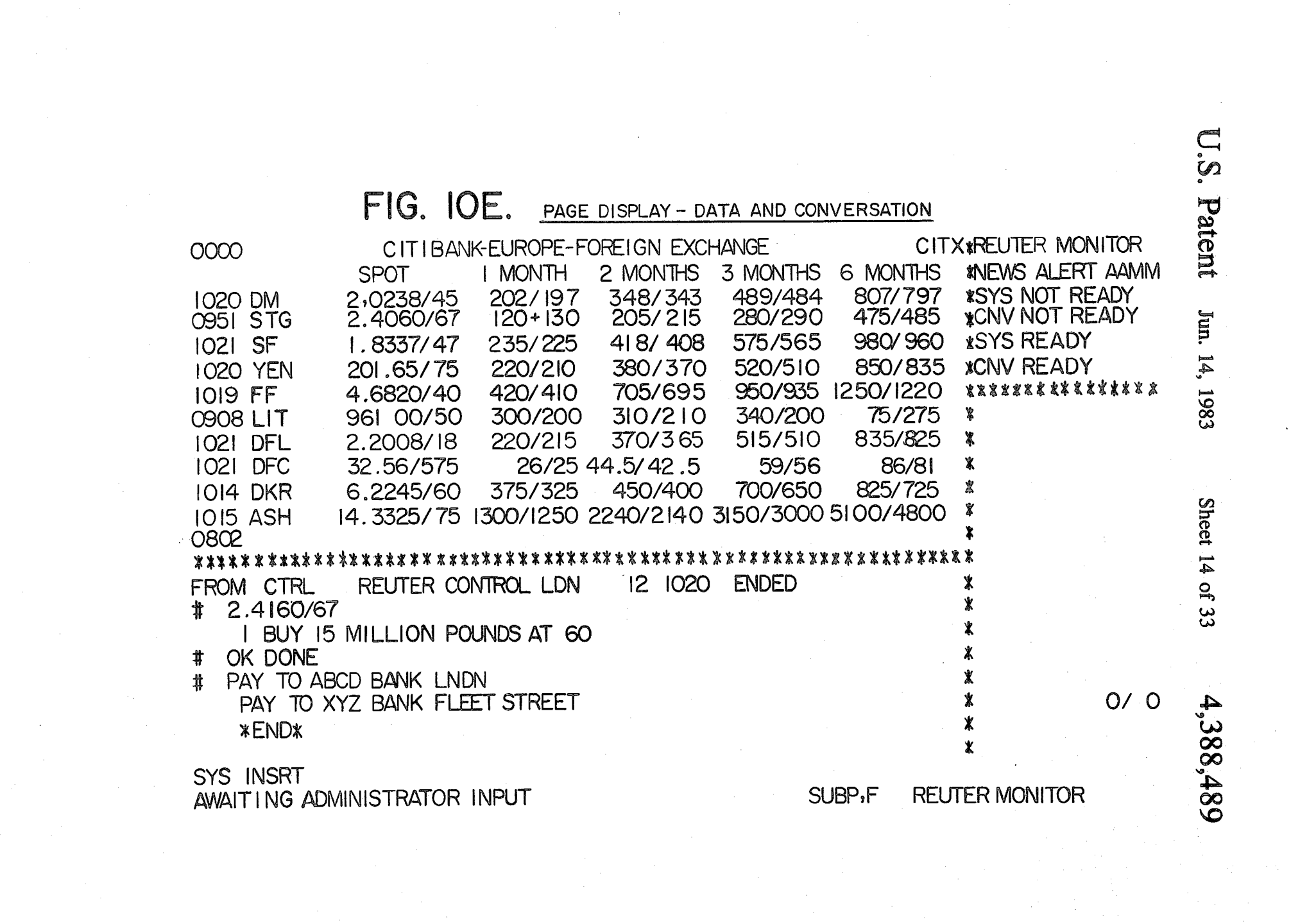

FIG. 10E. PAGE DISPLAY - DATA AND CONVERSATION

0000 CITIBANK-EUROPE-FOREIGN EXCHANGE CITX *REUTER MONITOR

| | SPOT | 1 MONTH | 2 MONTHS | 3 MONTHS | 6 MONTHS | *NEWS ALERT AAMM |
|---|---|---|---|---|---|---|
| 1020 DM | 2,0238/45 | 202/197 | 348/343 | 489/484 | 807/797 | *SYS NOT READY |
| 0951 STG | 2.4060/67 | 120+130 | 205/215 | 280/290 | 475/485 | *CNV NOT READY |
| 1021 SF | 1.8337/47 | 235/225 | 418/408 | 575/565 | 980/960 | *SYS READY |
| 1020 YEN | 201.65/75 | 220/210 | 380/370 | 520/510 | 850/835 | *CNV READY |
| 1019 FF | 4.6820/40 | 420/410 | 705/695 | 950/935 | 1250/1220 | **************** |
| 0908 LIT | 961 00/50 | 300/200 | 310/210 | 340/200 | 75/275 | * |
| 1021 DFL | 2.2008/18 | 220/215 | 370/365 | 515/510 | 835/825 | * |
| 1021 DFC | 32.56/575 | 26/25 | 44.5/42.5 | 59/56 | 86/81 | * |
| 1014 DKR | 6.2245/60 | 375/325 | 450/400 | 700/650 | 825/725 | * |
| 1015 ASH | 14.3325/75 | 1300/1250 | 2240/2140 | 3150/3000 | 5100/4800 | * |
| 0802 | | | | | | * |

*****************************************************************

FROM CTRL REUTER CONTROL LDN 12 1020 ENDED *

2.4160/67 *

1 BUY 15 MILLION POUNDS AT 60 *

OK DONE *

PAY TO ABCD BANK LNDN *

PAY TO XYZ BANK FLEET STREET * 0/ 0

*END* *

SYS INSRT

AWAITING ADMINISTRATOR INPUT SUBP,F REUTER MONITOR

Figure 10F:
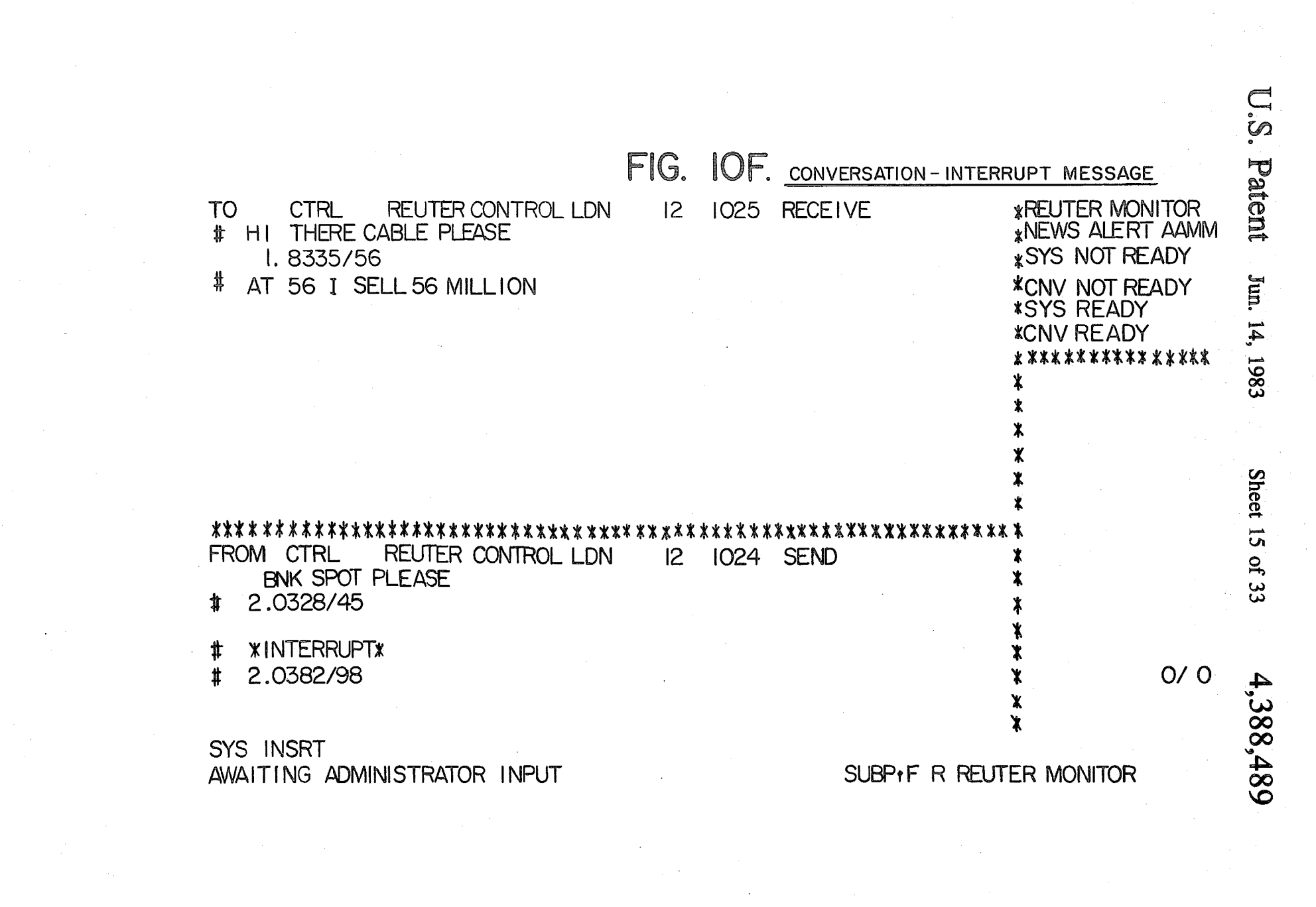

FIG. 10F. CONVERSATION - INTERRUPT MESSAGE

```
TO      CTRL     REUTER CONTROL LDN     12   1025   RECEIVE              *REUTER MONITOR
#  HI  THERE CABLE PLEASE                                                *NEWS ALERT AAMM
     1. 8335/56                                                          *SYS NOT READY
#  AT 56 I SELL 56 MILLION                                               *CNV NOT READY
                                                                         *SYS READY
                                                                         *CNV READY
                                                                         ***************
                                                                         *
                                                                         *
                                                                         *
                                                                         *
                                                                         *
                                                                         *
**************************************************************************
FROM  CTRL     REUTER CONTROL LDN     12   1024   SEND                   *
     BNK SPOT PLEASE                                                     *
#  2.0328/45                                                             *
                                                                         *
#  *INTERRUPT*                                                           *
#  2.0382/98                                                             *        0/ 0
                                                                         *
                                                                         *
SYS  INSRT
AWAITING ADMINISTRATOR INPUT                           SUBP↑F R REUTER MONITOR
```

| | | |
|---|---|---|
| MM | = | MODE |
| FFFF | = | FUNCTION |
| CCCCCC | = | *MORE* IF MORE CALLS CANNOT BE SHOWN |
| QQ | = | NUMBER OF CALLS QUEUED |
| LL | = | NUMBER OF LEFT MESSAGES NOT CANCELLED |
| W | = | W WHEN WAITING FOR A LINE |
| | | T WHEN WAITING FOR A REPLY |
| RRRRRR | = | PAGE WHICH WOULD BE RETRIEVED BY A RECALL FUNCTION |
| YY | = | STATUS OF THE SECOND CONVERSATION |

LD Length of Data

LH Length of Header

SP Port Number and Start Flag

CP Port Number and Continuation Flag

CONVERSATIONAL VIDEO SYSTEM

TECHNICAL FIELD

The present invention relates to two-way video communication systems and particularly to such systems capable of providing subscriber to subscriber video data communication in a conversational mode.

BACKGROUND ART

Communications systems for transmitting data point to point are well known, such as conventional telex systems and data base access systems. In addition, of course, telephone systems are well known two-way conversational communication media with the disadvantage being that a telephone system does not provide any hard copy nor does it allow you to, on the same device, obtain supplementary data while carrying on the conversation. Such supplementary data may be particularly important if the purpose of the conversation is commodity dealing such as in the money market. With respect to the telex communication, apart from its associated rate of speed, it does not enable you to readily carry on two different two-way telex communications alternatively so that you can carry on "telex conversations" with two different subscribers at substantially the same time. Moreover, neither the telex communication systems nor telephone communication systems provide a listing of incoming callers prior to acceptance of the message by the recipient. With respect to two-way data-base access systems, such prior art systems do not in reality provide a real-time conversational communication in that they merely provide for remote storage of information which may subsequently be retrieved upon request by subscriber or, in certain instances can be provided to the subscriber if he is accessing the particular storage location to which the data is being provided. However, this is still not a real-time conversational type of video communication system in which a pair of subscribers or users can interact in real time in a conversational mode. With respect to prior art telephone and data-base access systems, a prior art system merging these two technologies is known as the Delphi system which is a telephone message management system in which speech messages may be prerecorded and stored in a data base for subsequent automatic transmission to incoming callers and in which incoming messages may be stored for subsequent later transmission to proscribed recipients. However, this system is not a true conversational video communication system or does it enable a particular user to carry on multiple conversations substantially simultaneously. Thus, there are no satisfactory prior art systems known to applicants which are capable of providing interactive conversational type of video data communications between pairs of users or subscribers nor such systems which enable multiple conversations to be carried out by a given user or subscriber in real-time and in association with data-base retrieval of supplementary data. These disadvantages of the prior art are overcome by the present invention.

DISCLOSURE OF INVENTION

A video conversational data communication network in which subscribers may conduct conversational video textual data communications with one or more keystations the network. Each keystation is associated with a keystation terminal controller interface which is in turn connected to a message switching node for routing calls throughout the network. The keystation controller interface locally stores video conversational textual data for its associated keystations and enables two different designated keystations to conduct two different video conversations with a common keystation in a split screen display. The split screen display may also be used to display retrievable data from a data base for simultaneous display along with a video conversation. The video conversational textual data is transmitted between connected keystation controller interfaces in packets which contain less than the total displayable data content of the conversational video textual data message input via the keyboard. The keystation controller interface also enables preparation of responses prior to transmission to the other party and while receiving a transmission from that party. Prior to completion of a call, the keystation controller interface provides an incoming calls queue video display at the connected keystations. This video display may contain a unique identifier for each keystation initiating a call as well as an interest message. The receiving keystation may then randomly select any of the displayed incoming calls irrespective of position in the queue and the video conversation may then take place using the associated keyboards and video displays. A hard copy print out of the video conversation may then be obtained on a printer.

BRIEF DESCRIPTION OF DRAWINGS

FIG. 5 is a block diagram of a typical concentrator computer portion of the central system network of FIG. 2;

FIGS. 10A-10F are diagrammatic illustrations of typical sample conversational video displays which may appear on the display portion of a typical keystation used in the system of FIG. 1;

BEST MODE FOR CARRYING OUT THE INVENTION

Figure 1:
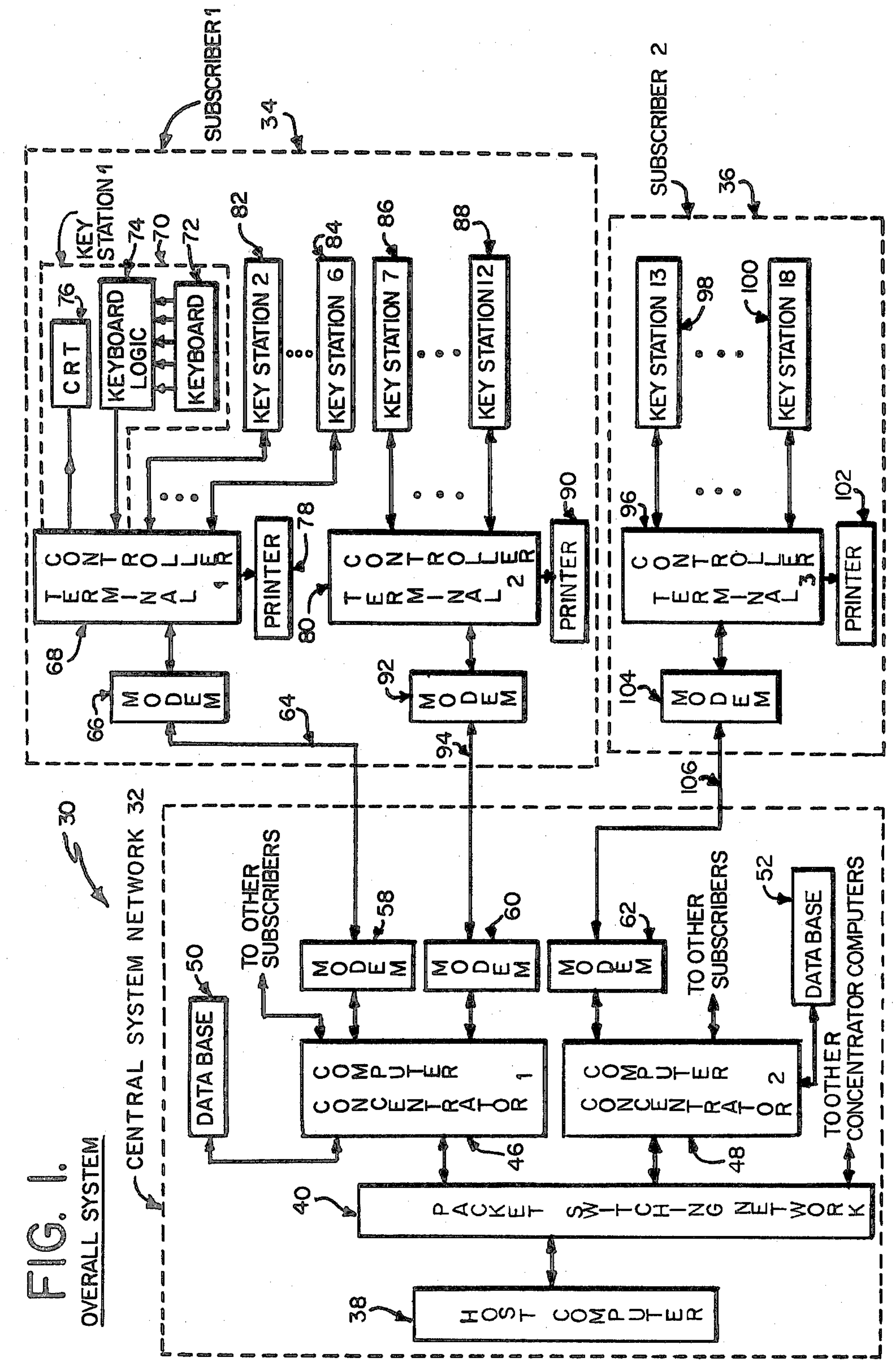
FIG. 1 is an overall system functional block diagram of a conversational video system in accordance with the present invention.
Figure 2:
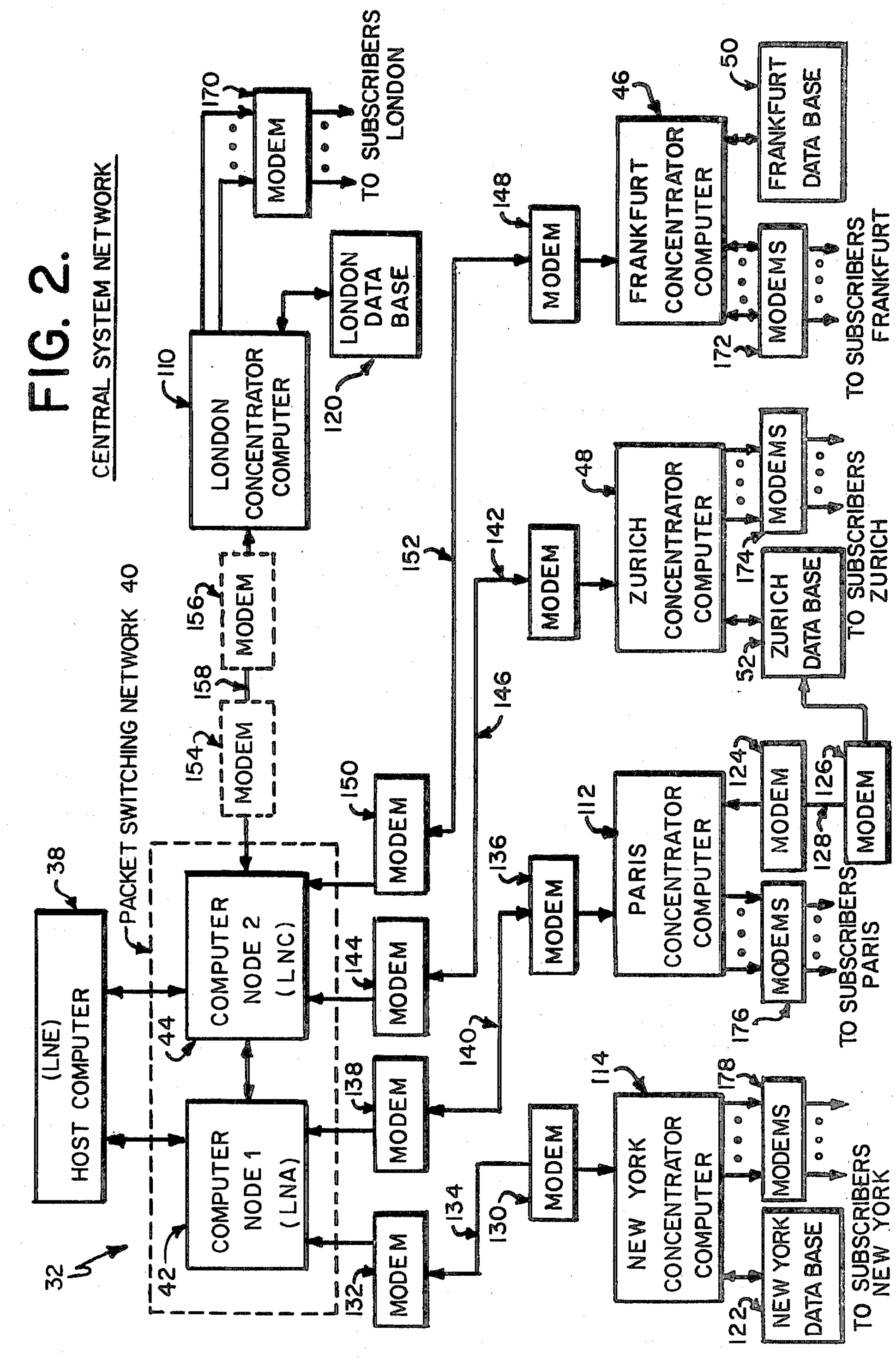
FIG. 2 is a functional block diagram of a typical central system network portion of the conversational video system of FIG. 1.

Referring now to the drawings in detail and initially to FIGS. 1 and 2 thereof, an overall system functional block diagram of a conversational video system, generally referred to by the reference numeral 30, in accordance with the present invention is shown. As shown and preferred in FIG. 1, the conversational video system 30 of the present invention preferably includes a central system network 32, to be described in greater detail with reference to FIG. 2, and a plurality of subscriber locations with two such subscriber locations 34 and 36 being shown by way of example in FIG. 1 although, of course, any plurality of subscriber stations can be utilized in the conversational video system 30 of the present invention. As illustrated in FIG. 1, the central system network 32 preferably includes a host computer 38 which, as will be described in greater detail hereinafter, serves as the traffic control manager for the central system network 32 and is preferably a conventional computer such as a Digital Equipment Corporation PDP11/70. The host computer 38 is preferably connected to a packet switching network 40, which, as illustrated in FIG. 2, preferably comprises a plurality of computer nodes with two such nodes 42 and 44 being shown by way of example in FIG. 2. The packet switching network is preferably connected to concentrator computers located at the various geographic locations close to the various subscribers with two such concentrator computers 46 and 48 being illustrated in FIG. 1 as being associated with subscribers 34 and 36, respectively. As will be described with respect to FIG. 2, these concentrator computers 46, 48, if located at the same site as the associated computer node may be directly connected thereto; however, if located at a remote site from the computer node, then they will be connected to the particular computer nodes in the packet switching network 40 via conventional modems. The concentrator computers 46 and 48 also preferably receive retrievable data from a retrievable data-base such as data-bases 50 and 52, respectively, which provide supplementary data for retrieval and display at the various subscriber locations 34, 36 by way of example. The associated concentrator computers are preferably connected to the various subscriber stations, such as 34, 36 via conventional modems, such as modems 58 and 60 for concentrator computer 46 and modem 62 for concentrator computer 48, to the subscriber locations 34, 36, respectively, with modem 58 being connected via telephone land line 64 to another conventional modem 66 and therefrom to a terminal controller 68, to be described in greater detail hereinafter with reference to FIGS. 6 and 7. The terminal controller 68 is in turn connected to a plurality of subscriber keystations with each terminal controller preferably being capable of servicing, by way of example, up to 6 such subscriber keystations. Each keystation, such as keystation 70 illustrated in FIG. 1, preferably includes a keyboard 72, associated keyboard logic 74 and a cathode ray tube display screen 76 for display of supplementary data and conversational data. As will be described in greater detail hereinafter, the keyboard 72, together with the keyboard logic 74 provides the conversational data to the terminal controller 68 which acts as the interface between the keystation and the central system network 32 to enable conversational video messages to be transmitted and received in a real-time interactive environment. As further shown and preferred in FIG. 1, each terminal controller, such as terminal controller 68 also includes an associated printer 78 for providing a hard copy of the video conversation which has been displayed at the particular keystation through which the conversation has been conducted, such as keystation 70 by way of example. By way of example, subscriber station 34 is shown as having two terminal controllers, terminal controller 68 and terminal controller 80, each of which preferably has 6 associated keystations, with only 3 such keystations being illustrated in FIG. 1 for terminal controller 68, namely keystations 70, 82 and 84 and with only 2 such keystations 86 and 88 being illustrated for terminal controller 80 which is also associated with a separate printer 90. Terminal controller 80, like terminal controller 68 is preferably connected to concentrator computer 46 via a conventional modem 92 and a telephone land line 94. Similarly, at subscriber station 36, at least one other separate terminal controller 96 is provided for controlling up to 6 keystations with, again, for purposes of illustration, only 2 such keystations 98 and 100 being shown in FIG. 1. In addition, a separate printer 102 is also associated with terminal controller 96 which is, in turn, connected to concentrator computer 48 via another conventional modem 104 and a telephone land line 106. As will be described in greater detail hereinafter, the concentrator computers 46, 48 for example, are preferably conventional computers such as Digital Equipment Corporation PDP11/34 and the respective terminal controllers, such as 68, 80 and 96 are preferably special purpose computers such as Digital Equipment Corporation PDP8/420A which preferably contain a special purpose conversational video control program to be described in greater detail hereinafter.

Referring now to FIG. 2, a more detailed block diagram of the central system network 32 of FIG. 1 is shown. It should be noted that the central system network 32 illustrated in FIG. 2 is merely exemplary of one possible network configuration although many other possible network configurations for providing conversational video may be accomplished without departing from the spirit and scope of the present invention. Thus, as shown by way of example in FIG. 2, the packet switching network 40, as previously mentioned, preferably contains two computer nodes 42 and 44, such as conventional Digital Equipment Corporation PDP11/34 computers which are illustrated as being geographically situated at the same location although, of course, these nodes could be at different geographic locations and, moreover, any desired plurality of nodes at different locations could be provided in accordance with the conversational video system of the present invention. However, for the purposes of explanation, it shall be assumed that the central system network 32 has the configuration illustrated in FIG. 2. Moreover, it shall be assumed, for purposes of explanation, that the conversational video system 30 of the present invention is capable of providing world-wide conversational video to subscribers located at five different geographical country sites, such as London, New York, Paris, Zurich and Frankfurt, by way of example. In this regard, it shall be further assumed that the computer nodes 42 and 44 are located at one of these geographical country sites, such as London, as illustrated in FIG. 2. Each of these geographical sites preferably has its own associated concentrator computer and it shall be assumed that concentrator computer 46 is located at Frankfurt in the example of FIG. 2, concentrator computer 48 is located at Zurich in the example of FIG. 2 and that additional concentrator computers 110, 112 and 114 are located, respectively, at London, Paris, and New York in the example of FIG. 2. In addition, preferably each concentrator computer 46, 48, 110, 112 and 114 has its own associated data-base for providing retrievable supplementary data for display at the keystations associated with that particular concentrator computer. Thus, the London data-base is designated by reference numeral 120 and the New York data-base is designated by reference numeral 122. It should be noted that as illustrated in FIG. 2, the retrievable data-base may also be remotely located or shared such as in the instance where the Zurich data-base 52 is also accessed by the Paris concentrator computer 112 via conventional modems 124 and 126. The concentrator computers 46, 48, 112 and 114 are shown as being remotely located from the computer nodes 42 and 44 and thus, are preferably connected thereto via conventional modems and telephone land lines, with concentrator computer 114 being connected to computer node 42 via modems 130 and 132 and telephone land line 134, with concentrator computer 112 being connected to computer node 42 via conventional modems 136 and 138 and telephone land line 140, with concentrator computer 48 being connected to computer node 44 via conventional modems 142 and 144 and telephone land line 146, and with concentrator computer 46 being connected to computer node 44 via conventional modems 148 and 150 and telephone land line 152. With respect to concentrator computer 110, assuming it is located at the same physical location as the computer node 44, then it may be connected thereto by direct connection. However, if the concentrator computer 110 is remotely located from computer node 44, then it would preferably be connected thereto via another pair of conventional modems 154 and 156, shown in dotted form, and a telephone land line 158 which, of course, would be replaced by a conventional wire connection in the instance where the concentrator computer 110 is located at the same physical location as the computer node 44. The various modems associated with the connection of the respective concentrator computers 110, 46, 48, 112 and 114 are illustrated in FIG. 2 in one block corresponding to a plurality of such modems with these blocks being labelled, respectively, with reference numerals 170, 172, 174, 176 and 178. Modems 58, 60 and 62 in FIG. 1 are just an example of such modems and it should be noted that preferably one modem is provided for each telephone line connection such as preferably one per terminal controller, not taking into account a stand-by or back-up situation in which an additional modem would be provided.

Figure 3:
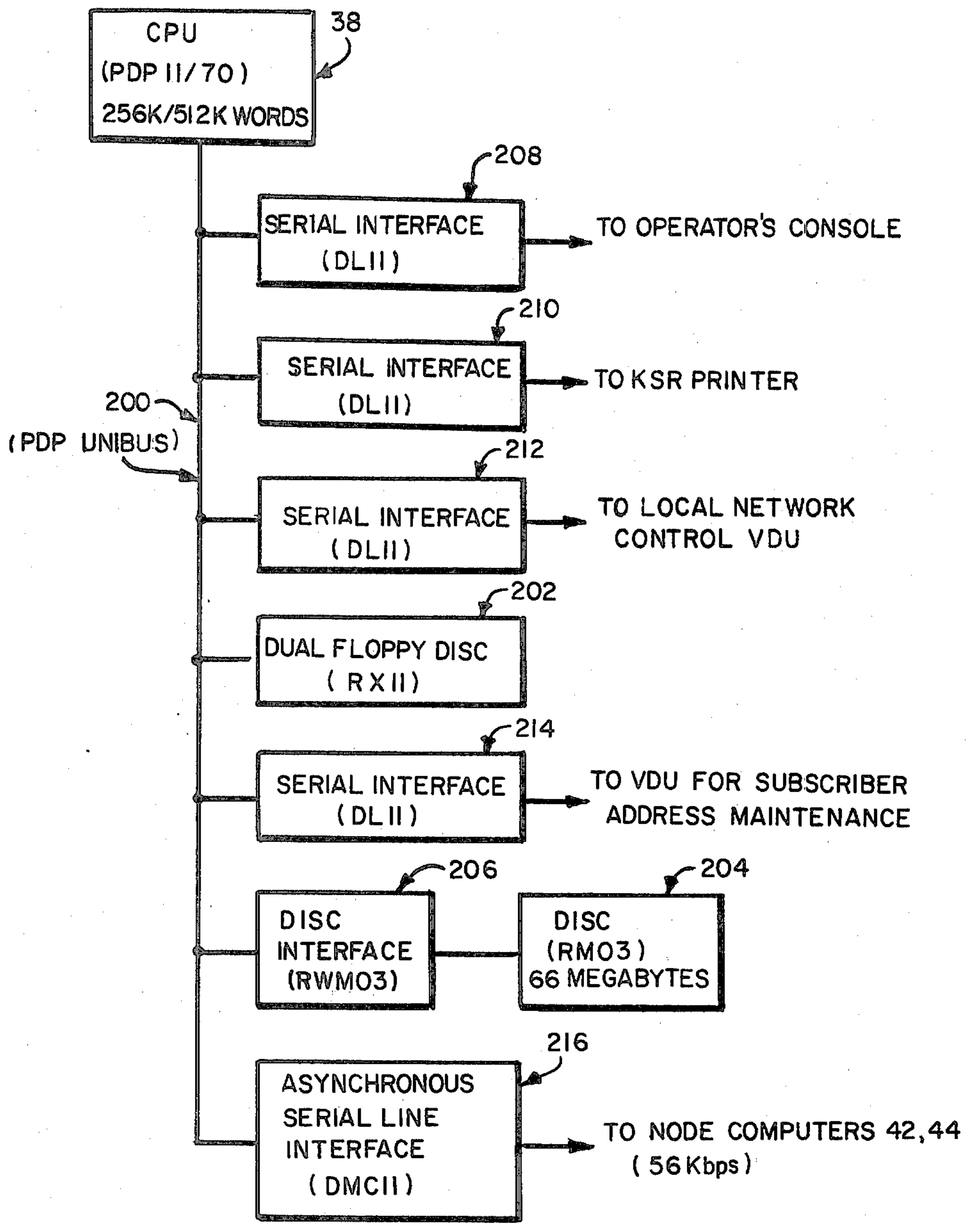
FIG. 3 is a block diagram of a typical host computer portion of the central system network of FIG. 2.

Referring now to FIG. 3, a typical hardware configuration for the host computer 38 is shown. Thus, as previously mentioned, the host computer may be a conventional PDP11/70 CPU having desired core, such as 256 K or 512 K words of core which, via a conventional Digital Equipment Corporation Unibus 200 is connected to associated direct access storage 202 and 204, such as an RX11 dual floppy disc and an RM03 disc via a conventional interface therefor, such as an RWM03 interface 206, for disc 204. In addition, a plurality of serial interfaces 208, 210, 212 and 214, such as a Digital Equipment Corporation DL11, are provided for interfacing the CPU 38 with various associated control consoles, such as interface 208 being utilized with the control console associated with start-up of the system, interface 210 being associated with the control console for the conversational video communication of the system, interface 212 being associated with the control of the packet switching network 40 and with interface 214 being associated with the control which enables identification of new subscribers to be put into the system so that they may be incorporated into the conversational video system 30. In addition, a conventional asynchronous serial line interface 216, such as a conventional Digital Equipment Corporation DMC11, is provided to connect the CPU38 to the packet switching network 40 for transferring data and control information between the host computer 38 and the packet switching network 40 at a rate of preferably 56 kilobits per second.

Figure 4:
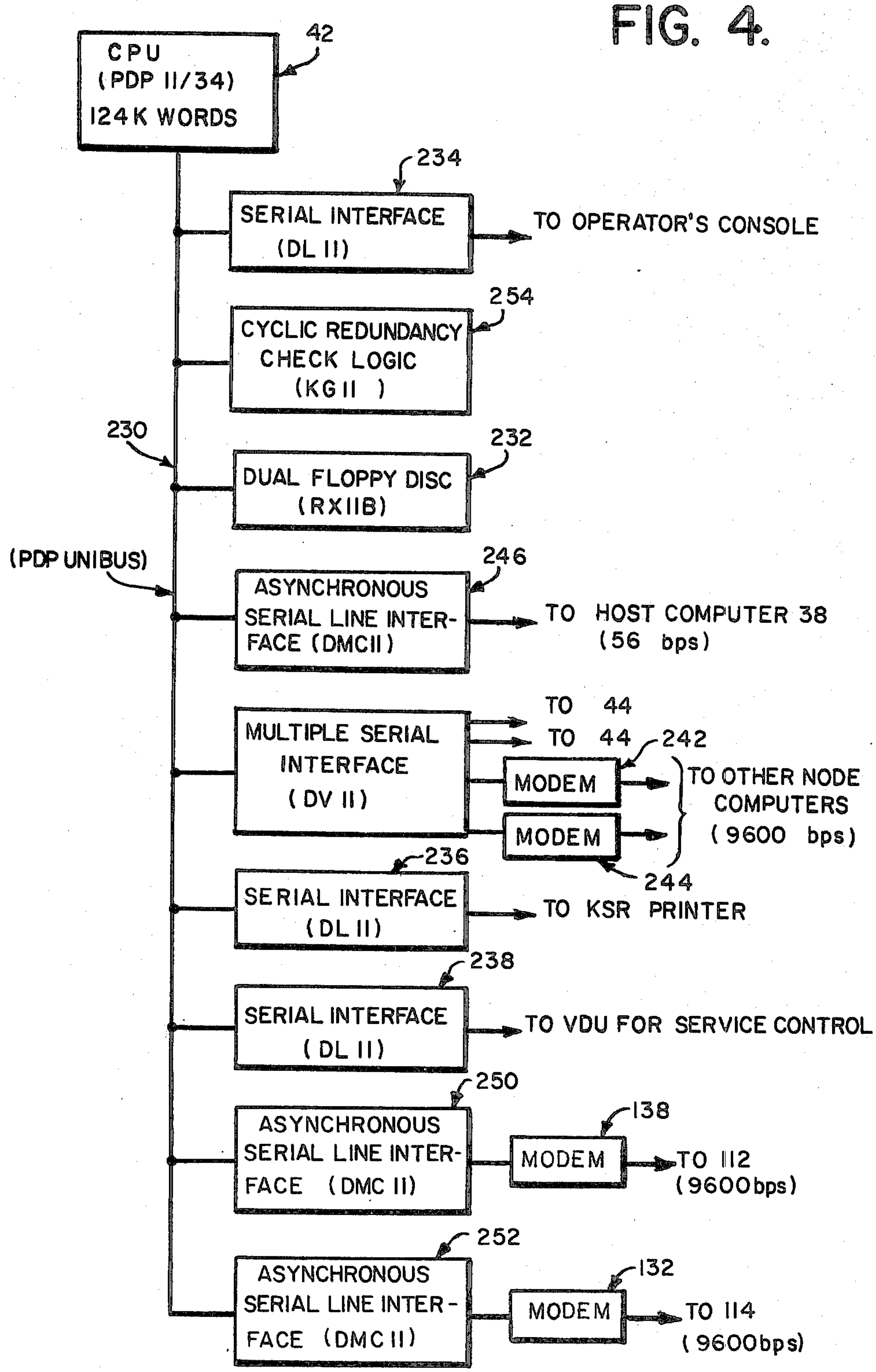
FIG. 4 is a block diagram of a typical computer node portion of the packet switching network of FIG. 2.

Referring now to FIG. 4, a typical hardware configuration for a typical computer node, such as node 42, for example, is shown. Thus, as previously mentioned, the CPU is preferably a conventional computer, such as a PDP11/34 having 124K words of store. The CPU 42 is preferably connected to associated storage and interface devices via a conventional bus 230, such as a Digital Equipment Corporation Unibus. As with the aforementioned host computer 38, the node computer 42 preferably includes additional storage 232 such as an RX11B dual floppy disc which is preferably used to boot the CPU42. In addition, a plurality of serial interfaces 234, 236 and 238, such as conventional Digital Equipment Corporation DL11 interfaces, are provided to interface with control peripherals such as the operators console to start up the system, the printer primarily used for failure monitoring, and the operating control for the system, respectively. In addition, a multiple serial interface 240, such as a conventional Digital Equipment Corporation DV11 is provided for interfacing with other node computers such as node computer 44. Interface 240 is capable of servicing up to 8 lines and may be connected to remotely located computer nodes via modems, 242 and 244 for example, and telephone land lines. The transmission rate is 9600 bits per second to the other nodes. In addition, in the example of FIGS. 2 and 4, computer node 42 includes 3 asynchronous serial line interfaces 246, 250 and 252, such as a conventional Digital Equipment Corporation DMC11, for interfacing the CPU42 with the host computer 38, and concentrators 112 and 114, respectively to enable communication between the CPU42 and the interconnected computers. With respect to concentrators 112 and 114, as was previously mentioned, they are interconnected to the computer node 42 via modems 138 and 132, respectively. With respect to computer node 44, since the concentrator computer 110 is, by way of example, located at the same site as computer node 44, no modem would be required between the corresponding asynchronous serial line interface and the concentrator computer 110. In addition, with respect to the interface 246, to the host computer 38, the data rate is preferably 56 kilobits per second. Lastly, the node configuration illustrated in FIG. 4 also preferably includes a cyclic redundancy check calculation unit 254, such as a conventional Digital Equipment Corporation KG11, connected to the computer bus 230 for conventionally checking the integrity of the transmitted packets. It should be noted that with respect to the interface to the concentrators at interfaces 250 and 252, this is preferably at a data rate of 9600 bits per second.

TABLE A

```
                    /= - MODULES:                                      =
                    /=               TDP511  GET OUTPUT BUFFER AND SET UP  =
                    /=                         INITIAL VALUES          =
                    /=               TDP512  CDF AND STORE NEXT IN OUTPUT  =
                    /=                         BUFFER                  =
                    /=               TDP513  SEND OUTPUT BUFFER        =
                    /=               TDP514  CONNECTION CONTROL        =
                    /=               TDP515  READ SPECIFIC WORD FROM INPUT =
                    /=                         BUFFER                  =
                    /=               TDP516  READ NEXT WORD FROM INPUT =
                    /=                         BUFFER                  =
                    /=                                                 =
                    /= ** NB **      THIS COMPONENT RESIDES ON BOTH FIELD 4 =
                    /=               AND FIELD 5                       =
                    /=                                                 =
                    /==================================================

             0004          FIELD   4
             0200          *200
      40200  0200          0*4000+DM6END-TDP511+2  /*ELEMENT:TYPE 0:SIZE DM6END-TDP511+2

                    /==================================================
                    /=                                                 =
                    /= - MODULE:     TDP511                            =
                    /=               GET OUTPUT BUFFER & SET UP INITIAL =
                    /=               VALUES                            =
                    /=                                                 =
                    /= - FUNCTION:                                     =
                    /=               GETS AN OUTPUT BUFFER,CLEARS THE LINK =
                    /=               WORDS AND THE USAGE COUNT,THEN MOVES =
                    /=               ANY NUMBER OF PARAMETERS FROM CALLER =
                    /=               TO THE RECORD BUFFER              =
                    /=                                                 =
                    /= - FORM OF CALL:                                 =
                    /=               JMS  I  ZKD511                    =
                    /=               <RECORD LENGTH>                   =
                    /=               <RECORD TYPE>                     =
                    /=               <LENGTH NON PACKED>               =
                    /=               < - ETC - >                       =
                    /=               <TERMINATOR(-1)>                  =
                    /=                                                 =
                    /==================================================

      40201  7401             1-1*2+7401                 /*1 VARIABLE LOCATIONS FOLLOW
      40202  0000  TDP511, .-.                  24       / ALSO USED AS WORK LOCN IN TDP513
      40203  1212          TAD     DM1FLD                / GET FIELD SETTING
      40204  7640          SZA CLA                       / BUFFER SENT ? (IE SETTING = 0)
      40205  5213          JMP     DM1010                / NO SO USE SAME BUFFER
      40206  6202          CIF     0                     / YES
      40207  4426          JMS  I  ZKA521   01602        / GET A BUFFER
      40210  7403             2-1*2+7401                 /*2 VARIABLE LOCATIONS FOLLOW
      40211  0000  DM1ADR, 0                 7300        / BUFFER ADDRESS (RETURNED)
      40212  0000  DM1FLD, 0                 0           / BUFFER FIELD    (RETURNED)
                                                         /
      40213  1212  DM1010, TAD     DM1FLD                / SET UP CDF TO FIELD
      40214  1021          TAD     ZKCDF                 /  OF OUTPUT RECORD
      40215  3236          DCA     DM2CDF                /
      40216  7340          ZM0001                        /
      40217  1211          TAD     DM1ADR                / SET UP POINTER TO
      40220  3012          DCA     ZAUTO2                /  OUTPUT RECORD
                                                         /
      40221  4235          JMS     TDP512                / CLEAR LINK WORDS
      40222  4235          JMS     TDP512                /
      40223  4235          JMS     TDP512                / CLEAR USAGE COUNT
                                                         /
      40224  1602  DM1020, TAD  I  TDP511                / PICK UP PARAMETER
      40225  2202          ISZ     TDP511                /
      40226  7510          SPA                           / ALL PARAMETERS DEALT WITH ?
      40227  5232          JMP     DM1030                / YES - RETURN TO CALLER
      40230  4235          JMS     TDP512                / NO - GO STORE PARAMETER
      40231  5224          JMP     DM1020                / REPEAT LOOP
      40232  7300  DM1030, MCLEAR
      40233  5602          JMP  I  TDP511

                    /==================================================
                    /=                                                 =
                    /= - MODULE:     TDP512                            =
                    /=               CDF AND STORE NEXT IN OUTPUT BUFFER =
                    /=                                                 =
                    /= - FUNCTION:                                     =
                    /=               TAKES DATA WORD FROM AC AND STORES IT =
                    /=               IN THE OUTPUT BUFFER              =
                    /=                                                 =
                    /= - FORM OF CALL:                                 =
                    /=               AC= WORD TO BE STORED             =
                    /=               JMS  I  ZKD512                    =
                    /=                                                 =
                    /==================================================

      40234  7403             2-1*2+7401      7510       /*2 VARIABLE LOCATIONS FOLLOW
      40235  0000  TDP512, .-.
      40236  0000  DM2CDF, 0                 0260        / INTO FIELD OF RECORD
```

```
40237  3412            DCA  I  ZAUT02          / STORE DATA WORD
40240  6241            CDF     40              /
40241  5635            JMP  I  TDP512          / RETURN TO CALLER

                /==========================================================
                /=                                                        =
                /= - MODULE:      TDP513                                  =
                /=                SEND OUTPUT BUFFER                      =
                /=                                                        =
                /= - FUNCTION:                                            =
                /=                SENDS THE RECORD BUFFER TO THE GIVEN    =
                /=                PORT                                    =
                /=                                                        =
                /= - FORM OF CALL:                                        =
                /=                AC= EXPANDED APPLN RECORD LENGTH        =
                /=                MQ= SEND PORT AND FEEDBACK              =
                /=                JMS  I  ZKD513                          =
                /=                                                        =
                /==========================================================

40242  7401            1-1^2+7401              /*1 VARIABLE LOCATIONS FOLLOW
40243  0000  TDP513,   .-.
40244  3202            DCA     TDP511          / SAVE APPLN RECORD LENGTH
                                               /
40245  7701            ACL                     / GET PORT NUMBER
40246  3267            DCA     DM3PRT          / SAVE AS PARAMETER
40247  1267            TAD     DM3PRT          / GET PORT NUMBER
40250  0064            AND     ZP0177          / MASK OUT FEEDBACK
40251  1274            TAD     DM3M13          / ADD IN -VE DIALOGUE PORT
40252  7640            SZA CLA                 / PORT = CNV ?
40253  5257            JMP     DM3010          / NO
40254  4675            JMS  I  DM342H          / GO GET SETTING OF CNV/CNB FLAG
40255  2267            ISZ     DM3PRT          / BONDS SO SET PORT = 14
40256  7000            NOP                     / CNV SO PORT = 13
40257  1212  DM3010,   TAD     DM1FLD          / GET FIELD OF OUTPUT RECORD
40260  3270            DCA     DM3FLD          / SAVE AS PARAMETER
40261  1211            TAD     DM1ADR          / GET ADDRESS OF OUTPUT RECORD
40262  3271            DCA     DM3ADR          / SAVE AS PARAMETER
40263  1202            TAD     TDP511          / GET SUM OF APPLN. RECORD LENGTH
40264  6212            CIF     10              /
40265  4575            JMS  I  ZKB521          / SEND OUTPUT RECORD
40266  7405            3-1^2+7401              /*1 VARIABLE LOCATIONS FOLLOW
40267  0000  DM3PRT,   0                       / PORT NUMBER
40270  0000  DM3FLD,   0                       / FIELD OF OUTPUT RECORD
40271  0000  DM3ADR,   0                       / ADDRESS OF OUTPUT RECORD
                                               /
40272  3212            DCA     DM1FLD          / CLEAR FIELD IF RECORD SENT
                                               /
40273  5643            JMP  I  TDP513          / RETURN TO CALLER

40274  7765  DM3M13,   -13                     / -VE CNV PORT
40275  1757  DM342H,   TDP42H                  / LINK TO FIND SETTING OF CNV/CNB FLAG

                /==========================================================
                /=                                                        =
                /= - MODULE:      TDP514.                                 =
                /=                CONNECTION CONTROL                      =
                /=                                                        =
                /= - FUNCTION:                                            =
                /=                SET UP CONNECT C. . . LOG               =
                /=                                                        =
                /= - FORM OF CALL:                                        =
                /=                AC= MESSAGE TYPE                        =
                /=                JMS  I  ZKD514                          =
                /=                                                        =
                /==========================================================

40276  7401            1-1^2+7401              /*1 VARIABLE LOCATIONS FOLLOW
40277  0000  TDP514,   .-.
40300  3064            DCA     ZWORK1          / SAVE MESSAGE TYPE
                                               /
40301  1212            TAD     DM1FLD          / GET FIELD OF BUFFER
40302  3331            DCA     DM4FLD          / SAVE AS PARAMETER
40303  1211            TAD     DM1ADR          / GET ERA OF BUFFER
40304  3332            DCA     DM4ADR          / SAVE AS PARAMETER
                                               /
40305  1064            TAD     ZWORK1          / GET MESSAGE TYPE
40306  7450            SNA                     / TYPE = 0 (REPLY)
40307  5313            JMP     DM4010          / YES
40310  1077            TAD     ZP7777          /
40311  7640            SZA CLA                 / TYPE = 1 (DISCONNECT)
40312  5321            JMP     DM4020          / NO - SO REQUEST OR REJECT
                                               /
40313  1114  DM4010,   TAD     ZPCCCR          / YES - GET DESTINATION CONVERSATION
40314  3333            DCA     DM4DCR          /   REFERENCE AND SAVE
40315  6252            CIF     50              /
40316  4576            JMS  I  ZKD345          / SET UP OUR PORT AS PARAMETER
40317  3334            DCA     DM4PRT          /
40320  5325            JMP     DM4030          / GO SEND MESSAGE
                                               /
40321  1070  DM4020,   TAD     ZP7000          / SET UP NULL PARAMETERS
40322  3333            DCA     DM4DCR          /
40323  1070            TAD     ZP7000          /
40324  3334            DCA     DM4PRT          /
                                               /
```

```
40325  6212  DM4030, CIF      10                 /
40326  1004           TAD      ZWORK1             / GET MESSAGE TYPE
40327  4577           JMS  I   ZKB523             / CALL CONNECTION CONTROL
40330  7407           4-1^2+7401                  /*4 VARIABLE LOCATIONS FOLLOW
40331  0000  DM4FLD, 0                            / DATA FIELD OF DYNAMIC BUFFER
40332  0000  DM4ADR, 0                            / ADDRESS OF START DYNAMIC BUFFER
40333  0000  DM4DCR, 0                            / DESTINATION CONVERSATION REFERENCE (OR NULL)
40334  0000  DM4PRT, 0                            / OUR PORT                        (OR NULL)
                                                  /
40335  3212           DCA      DMIFLD             /
                                                  /
40336  5677           JMP  I   TDP514             /


             /=====================================================
             /=                                                   =
             /= - MODULE:     TDP515                              =
             /=               READ SPECIFIC WORD FROM INPUT RECORD =
             /=                                                   =
             /= - FUNCTION:                                       =
             /=               ADDS OFFSET TO START ADDRESS OF INPUT =
             /=               RECORD AND PICKS UP THE DATA WORD AT =
             /=               THIS LOCATION                       =
             /=                                                   =
             /= - FORM OF CALL:                                   =
             /=               AC= OFFSET-1                        =
             /=               JMS  I  ZKD515                      =
             /=               AC= DATA WORD                       =
             /=                                                   =
             /=====================================================

40337  7403           2-1^2+7401                  /*2 VARIABLE LOCATIONS FOLLOW
40340  0000  DM5FRA, 0                            / START ADDRESS OF INPUT RECORD
40341  0000  TDP515, .-.
40342  1340           TAD      DM5FRA             / SET UP POINTER INTO INPUT RECORD
40343  3013           DCA      ZAUTO3             /
40344  4347           JMS      TDP516             / GET DATA WORD FROM INPUT RECORD.
40345  5741           JMP  I   TDP515             / RETURN TO CALLER


             /=====================================================
             /=                                                   =
             /= - MODULE:     TDP516                              =
             /=               READ NEXT WORD FROM INPUT RECORD    =
             /=                                                   =
             /= - FUNCTION:                                       =
             /=               PICKS UP A DATA WORD FROM THE INPUT =
             /=               RECORD                              =
             /=                                                   =
             /= - FORM OF CALL:                                   =
             /=               JMS  I  ZKD516                      =
             /=               AC= DATA WORD                       =
             /=                                                   =
             /=====================================================

40346  7403           2-1^.+7401                  /*2 VARIABLE LOCATIONS FOLLOW
40347  0000  TDP516, .-.
40350  0000  DM6CDF, 0                            / INTO RECORD'S FIELD
40351  1413           TAD  I   ZAUTO3             / PICK UP DATA WORD
40352  6241           CDF      40                 /
40353  5747           JMP  I   TDP516             / EXIT
40354  0000           Z BLOCK  .+20047600-.       /*ZERO FILL PAGE
       0400  DM6END=.


             /=====================================================
             /=                                                   =
             /= - COMPONENT: INPUT/OUTPUT BUFFER HANDLER  DP5150.88 =
             /=                                                   =
             /= - DESIGN:     R.ANTHONY/G.BROWN                   =
             /=                                                   =
             /= - AUTHOR:     G.BROWN                             =
             /=                                                   =
             /= - MODULES:                                        =
             /=               TDP511  GET OUTPUT BUFFER AND SET UP =
             /=                           INITIAL VALUES          =
             /=               TDP512  CDF AND STORE NEXT IN OUTPUT =
             /=                           BUFFER                  =
             /=               TDP513  SEND OUTPUT BUFFER          =
             /=               TDP514  CONNECTION CONTROL          =
             /=               TDP515  READ SPECIFIC WORD FROM INPUT =
             /=                           BUFFER                  =
             /=               TDP516  READ NEXT WORD FROM INPUT   =
             /=                           BUFFER                  =
             /=                                                   =
             /= ** NB **      THIS COMPONENT RESIDES ON BOTH FIELD 4 =
             /=               AND FIELD 5                         =
             /=                                                   =
             /=====================================================

       0005           FIELD    5
       0200           *200
50200  0200           0^4000+DM6END-TDP511+2  /*ELEMENT:TYPE 0:SIZE DM6END-TDP511+2
```

```
                        /===================================================
                        /=                                                 =
                        /= - MODULE:      TDP511                           =
                        /=                GET OUTPUT BUFFER & SET UP INITIAL =
                        /=                VALUES                           =
                        /=                                                 =
                        /= - FUNCTION:                                     =
                        /=                GETS AN OUTPUT BUFFER,CLEARS THE LINK =
                        /=                WORDS AND THE USAGE COUNT.THEN MOVES =
                        /=                ANY NUMBER OF PARAMETERS FROM CALLER =
                        /=                TO THE RECORD BUFFER             =
                        /=                                                 =
                        /= - FORM OF CALL:                                 =
                        /=                JMS  I  ZKD511                   =
                        /=                <RECORD LENGTH>                  =
                        /=                <RECORD TYPE>                    =
                        /=                <LENGTH NON PACKED>              =
                        /=                < - ETC - >                      =
                        /=                <TERMINATOR(-1)>                 =
                        /=                                                 =
                        /===================================================

50201  7401               1-1^2+7401                /*1 VARIABLE LOCATIONS FOLLOW
50202  0000  TDP511, .-.                            / ALSO USED AS WORK LOCN IN TDP513
50203  1212               TAD      DM1FLD           / GET FIELD SETTING
50204  7640               SZA CLA                   / BUFFER SENT ? (IE SETTING = 0)
50205  5213               JMP      DM1010           / NO SO USE SAME BUFFER
50206  6202               CIF      0                / YES
50207  4426               JMS  I   ZKA521           / GET A BUFFER
50210  7403               2-1^2+7401                /*2 VARIABLE LOCATIONS FOLLOW
50211  0000  DM1ADR, 0                              / BUFFER ADDRESS (RETURNED)
50212  0000  DM1FLD, 0                              / BUFFER FIELD   (RETURNED)
                                                    /
50213  1212  DM1010, TAD      DM1FLD               / SET UP CDF TO FIELD
50214  1021               TAD      ZKCDF            /  OF OUTPUT RECORD
50215  3236               DCA      DM2CDF           /
50216  7340               W=0001                    /
50217  1211               TAD      DM1ADR           / SET UP POINTER TO
50220  3012               DCA      ZAUTO2           /  OUTPUT RECORD
                                                    /
50221  4235               JMS      TDP512           / CLEAR LINK WORDS
50222  4235               JMS      TDP512           /
50223  4235               JMS      TDP512           / CLEAR USAGE COUNT
                                                    /
50224  1602  DM1020, TAD  I   TDP511               / PICK UP PARAMETER
50225  2202               ISZ      TDP511           /
50226  7510               SPA                       / ALL PARAMETERS DEALT WITH ?
50227  5232               JMP      DM1030           / YES - RETURN TO CALLER
50230  4235               JMS      TDP512           / NO - GO STORE PARAMETER
50231  5224               JMP      DM1020           / REPEAT LOOP
50232  7300  DM1030, WKLEAR
50233  5602               JMP  I   TDP511

                        /===================================================
                        /=                                                 =
                        /= - MODULE:      TDP512                           =
                        /=                CDF AND STORE NEXT IN OUTPUT BUFFER =
                        /=                                                 =
                        /= - FUNCTION:                                     =
                        /=                TAKES DATA WORD FROM AC AND STORES IT =
                        /=                IN THE OUTPUT BUFFER             =
                        /=                                                 =
                        /= - FORM OF CALL:                                 =
                        /=                AC= WORD TO BE STORED            =
                        /=                JMS  I  ZKD512                   =
                        /=                                                 =
                        /===================================================

50234  7403               2-1^2+7401                /*2 VARIABLE LOCATIONS FOLLOW
50235  0000  TDP512, .-.
50236  0000  DM2CDF, 0                              / INTO FIELD OF RECORD
50237  3412               DCA  I   ZAUTO2           / STORE DATA WORD
50240  6251               CDF      50               /
50241  5635               JMP  I   TDP512           / RETURN TO CALLER

                        /===================================================
                        /=                                                 =
                        /= - MODULE:      TDP513                           =
                        /=                SEND OUTPUT BUFFER               =
                        /=                                                 =
                        /= - FUNCTION:                                     =
                        /=                SENDS THE RECORD BUFFER TO THE GIVEN =
                        /=                PORT                             =
                        /=                                                 =
                        /= - FORM OF CALL:                                 =
                        /=                AC= EXPANDED APPLN RECORD LENGTH =
                        /=                MQ= SEND PORT AND FEEDBACK       =
                        /=                JMS  I  ZKD513                   =
                        /=                                                 =
                        /===================================================

50242  7401               1-1^2+7401                /*1 VARIABLE LOCATIONS FOLLOW
50243  0000  TDP513, .-.
50244  3202               DCA      TDP511           / SAVE APPLN RECORD LENGTH
                                                    /
```

```
50245  7701            ACL                       / GET PORT NUMBER
50246  3267            DCA      DM3PRT           / SAVE AS PARAMETER
50247  1267            TAD      DM3PRT           / GET PORT NUMBER
50250  0064            AND      ZP0177           / MASK OUT FEEDBACK
50251  1274            TAD      DM3M13           / ADD IN -VE CNV PORT
50252  7640            SZA CLA                   / PORT = CNV ?
50253  5257            JMP      DM3010           / NO
50254  1123            TAD      ZDCDBF           / YES - GET CNV/CDB FLAG
50255  7640            SZA CLA                   / BONDS ?
50256  2267            ISZ      DM3PRT           / YES - SET PORT = 14
50257  1212  DM3010,   TAD      DM1FLD           / GET FIELD OF OUTPUT RECORD
50260  3270            DCA      DM3FLD           / SAVE AS PARAMETER
50261  1211            TAD      DM1ADR           / GET ADDRESS OF OUTPUT RECORD
50262  3271            DCA      DM3ADR           / SAVE AS PARAMETER
50263  1262            TAD      TDP511           / GET SUM OF APPLN. RECORD LENGTH
50264  6212            CIF      10               /
50265  4575            JMS   I  ZKB521           / SEND OUTPUT RECORD
50266  7405            3-1^2+7401                /*3 VARIABLE LOCATIONS FOLLOW
50267  0000  DM3PRT,   0                         / PORT NUMBER
50270  0000  DM3FLD,   0                         / FIELD OF OUTPUT RECORD
50271  0000  DM3ADR,   0                         / ADDRESS OF OUTPUT RECORD
                                                 /
50272  3212            DCA      DM1FLD           / CLEAR FIELD IF RECORD SENT
                                                 /
50273  5613            JMP   I  TDP513           / RETURN TO CALLER

50274  7765  DM3M13,   -13                       / -VE CNV PORT
50275  0000  FILLER,   0
             /=====================================================
             /=                                                   =
             /= - MODULE:       TDP514                            =
             /=                 CONNECTION CONTROL                =
             /=                                                   =
             /= - FUNCTION:                                       =
             /=                 SET UP CONNECT CONTROL            =
             /=                                                   =
             /= - FORM OF CALL:                                   =
             /=                 AC= MESSAGE TYPE                  =
             /=                 JMS  I  ZKD514                    =
             /=                                                   =
             /=====================================================

50276  7401            1-1^2+7401                /*1 VARIABLE LOCATIONS FOLLOW
50277  0000  TDP514,   .-.
50300  3064            DCA      ZWORK1           / SAVE MESSAGE TYPE
                                                 /
50301  1212            TAD      DM1FLD           / GET FIELD OF BUFFER
50302  3331            DCA      DM4FLD           / SAVE AS PARAMETER
50303  1211            TAD      DM1ADR           / GET ERA OF BUFFER
50304  3332            DCA      DM4ADR           / SAVE AS PARAMETER
                                                 /
50305  1064            TAD      ZWORK1           / GET MESSAGE TYPE
50306  7450            SNA                       / TYPE = 0 (REPLY)
50307  5313            JMP      DM4010           / YES
50310  1077            TAD      ZP7777           /
50311  7640            SZA CLA                   / TYPE = 1 (DISCONNECT)
50312  5321            JMP      DM4020           / NO - SO REQUEST OR REJECT
                                                 /
50313  1114  DM4010,   TAD      ZDCCCR           / YES - GET DESTINATION CONVERSATION
50314  3333            DCA      DM4DCR           /   REFERENCE AND SAVE
50315  7000            NOP                       /  FILLER
50316  4570            JMS   I  ZKD345           / SET UP OUR PORT AS PARAMETER
50317  3334            DCA      DM4PRT           /
50320  5325            JMP      DM4030           / GO SEND MESSAGE
                                                 /
50321  1070  DM4020,   TAD      ZP7000           / SET UP NULL PARAMETERS
50322  3333            DCA      DM4DCR           /
50323  1070            TAD      ZP7000           /
50324  3334            DCA      DM4PRT           /
                                                 /
50325  6212  DM4030,   CIF      10               /
50326  1064            TAD      ZWORK1           / GET MESSAGE TYPE
50327  4577            JMS   I  ZKB523           / CALL CONNECTION CONTROL
50330  7407            4-1^2+7401                /*4 VARIABLE LOCATIONS FOLLOW
50331  0000  DM4FLD,   0                         / DATA FIELD OF DYNAMIC BUFFER
50332  0000  DM4ADR,   0                         / ADDRESS OF START DYNAMIC BUFFER
50333  0000  DM4DCR,   0                         / DESTINATION CONVERSATION REFERENCE (OR NULL)
50334  0000  DM4PRT,   0                         / OUR PORT                           (OR NULL)
                                                 /
50335  3212            DCA      DM1FLD           /
                                                 /
50336  5677            JMP   I  TDP514           /
```

```
               /==========================================================
               /=                                                        =
               /= - MODULE:      TDP515                                  =
               /=                READ SPECIFIC WORD FROM INPUT RECORD    =
               /=                                                        =
               /= - FUNCTION:                                            =
               /=                ADDS OFFSET TO START ADDRESS OF INPUT   =
               /=                RECORD AND PICKS UP THE DATA WORD AT    =
               /=                THIS LOCATION                           =
               /=                                                        =
               /= - FORM OF CALL:                                        =
               /=                AC= OFFSET-1                            =
               /=                JMS  I  ZKD515                          =
               /=                AC= DATA WORD                           =
               /=                                                        =
               /==========================================================

50337  7403            Z=1^Z+7401            /*2 VARIABLE LOCATIONS FOLLOW
50340  0000  DMSFRA,   0                     / START ADDRESS OF INPUT RECORD
50341  0000  TDP515,   .-.
50342  1340            TAD     DMSFRA        / SET UP POINTER INTO INPUT RECORD
50343  3013            DCA     ZAUTO3        /
50344  4347            JMS     TDP516        / GET DATA WORD FROM INPUT RECORD
50345  5741            JMP  I  TDP515        / RETURN TO CALLER

               /==========================================================
               /=                                                        =
               /= - MODULE:      TDP516                                  =
               /=                READ NEXT WORD FROM INPUT RECORD        =
               /=                                                        =
               /= - FUNCTION:                                            =
               /=                PICKS UP A DATA WORD FROM THE INPUT     =
               /=                RECORD                                  =
               /=                                                        =
               /= - FORM OF CALL:                                        =
               /=                JMS  I  ZKD516                          =
               /=                AC= DATA WORD                           =
               /=                                                        =
               /==========================================================

50346  7403            Z=1^Z+7401            /*2 VARIABLE LOCATIONS FOLLOW
50347  0000  TDP516,   .-.
50350  0000  DM6COF,   0                     / INFO RECORD'S FIELD
50351  1413            TAD  I  ZAUTO3        / PICK UP DATA WORD
50352  6251            CDF     50            /
50353  5747            JMP  I  TDP516        / EXIT
50354  0000            ZBLOCK  .+200&7600-.  /*ZERO FILL PAGE
       0400  DM6END=.
```

| | | | | | | | |
|---|---|---|---|---|---|---|---|
| AB5251 | 1733 | DUZPCM | 0125 | TAC417 | 0265 | TBP22S | 2601 |
| ACL | 7701 | DUZDFS | 0127 | TAD151 | 2042 | TBP22U | 2437 |
| AKSILC | 1557 | DUZDOM | 0124 | TAD221 | 1561 | TBP22X | 0202 |
| AKSILI | 1555 | FAP110 | 0000 | TAD322 | 1072 | TBP221 | 1401 |
| AKSILO | 1556 | FAP120 | 0000 | TAP118 | 4472 | TBP222 | 1444 |
| AQAFPN | 6411 | FAP130 | 0000 | TAP121 | 4400 | TBP223 | 1500 |
| AQAKTP | 0015 | FAP150 | 0000 | TAP129 | 2402 | TBP224 | 1601 |
| AQOFPN | 0403 | FAP220 | 0000 | TAP131 | 4470 | TBP226 | 0401 |
| AQOFTP | 0016 | FAP230 | 0000 | TAP134 | 4571 | TBP229 | 3201 |
| AQPRNM | 0177 | FAP240 | 0000 | TAP151 | 2002 | TBP231 | 5143 |
| AQPRTX | 0200 | FAP320 | 0000 | TAP152 | 2022 | TBP23J | 5322 |
| AQQINS | 0144 | FAP410 | 0000 | TAP153 | 2034 | TBP23S | 4361 |
| AQQRR1 | 5601 | FAP520 | 0000 | TAP154 | 2062 | TBP23X | 5601 |
| AQQRR2 | 5704 | FARPDF | 0000 | TAP212 | 0660 | TBP23Z | 6061 |
| AQQRR3 | 6143 | FAUSC1 | 0000 | TAP223 | 1525 | TBP31A | 4404 |
| AQQRR4 | 6246 | FBC205 | 0030 | TAP235 | 7400 | TBP31R | 5001 |
| AQQTB1 | 7475 | FBP110 | 0000 | TAP236 | 6637 | TBP315 | 3602 |
| AQQTB2 | 7634 | FBP130 | 0000 | TAP237 | 6042 | TBP422 | 0242 |
| AQSOM | 6001 | FBP210 | 0020 | TAP239 | 6531 | TBP423 | 0220 |
| BLZCCG | 0131 | FBP220 | 0020 | TAP242 | 3601 | TBP424 | 0401 |
| BLZFRA | 0134 | FBP230 | 0020 | TAP243 | 3605 | TBP425 | 0202 |
| BLZFRL | 0133 | FBP310 | 0010 | TAP244 | 0000 | TBP431 | 5202 |
| BLZFPT | 0126 | FBP420 | 0030 | TAP322 | 0747 | TBP432 | 5211 |
| B4VARG | 5207 | FBP430 | 0010 | TAP323 | 1061 | TBP434 | 5677 |
| CAM | 7621 | FBP440 | 0020 | TAP324 | 1021 | TBP436 | 6001 |
| CDI | 6203 | FBP510 | 0010 | TAP411 | 0600 | TBP437 | 6024 |
| DM1A0B | 0211 | FBP520 | 0010 | TAP412 | 0606 | TBP438 | 6047 |
| DM1FLD | 0212 | FBP530 | 0010 | TAP416 | 0367 | TBP44C | 7555 |
| DM1010 | 0213 | FBP540 | 0010 | TAP417 | 0202 | TBP44D | 6352 |
| DM1020 | 0224 | FBP610 | 0040 | TAP521 | 1602 | TBP44E | 6253 |
| DM1030 | 0232 | FBP820 | 0040 | TAP525 | 1656 | TBP44F | 7355 |
| DM2COF | 0236 | FBP910 | 0030 | TAP529 | 1742 | TBP44J | 7601 |
| DM3A09 | 0271 | FCP110 | 0010 | TAP611 | 1755 | TBP44K | 7401 |
| DM3FLD | 0270 | FCP210 | 0010 | TAP612 | 1765 | TBP44L | 7212 |
| DM3M13 | 0274 | FCP310 | 0010 | TAR417 | 0400 | TBP44M | 7206 |
| DM3RRT | 0267 | FCP550 | 0010 | TAUS01 | 0200 | TBP44N | 7202 |
| DM3010 | 0257 | FCP610 | 0010 | TBCAIL | 0210 | TBP44R | 7140 |
| DM3420 | 0275 | FDC480 | 0030 | TBCDAG | 0050 | TBP44U | 6413 |
| DM4A0C | 0332 | FDP120 | 0050 | TBCPSE | 1565 | TBP44V | 7714 |
| DM40CK | 0333 | FDP130 | 0050 | TBC4FF | 1566 | TBP441 | 6241 |
| DM4FLD | 0331 | FDP210 | 0050 | TBC132 | 2727 | TBP512 | 1272 |
| DM4RRT | 0334 | FDP230 | 0050 | TBC205 | 2401 | TBP521 | 2201 |
| DM4010 | 0313 | FDP310 | 0050 | TBC210 | 2445 | TBP522 | 2504 |
| DM4020 | 0321 | FDP320 | 0050 | TBD541 | 0711 | TBP523 | 2703 |
| DM4030 | 0325 | FDP330 | 0050 | TBLBOF | 4401 | TBP532 | 0522 |
| DM5FRA | 0340 | FDP340 | 0050 | TBP111 | 2602 | TBP533 | 0555 |

```
D86COF 0350
D86ESD 0400
D8A6FF 0151
D8B81A 0145
D8B81B 0146
D88CHS 0144
D8SPTF 0150
D815PA 0147
D0ZADF 0126
TCP311 6401
TCP551 7113
TCP611 7201
TCP911 7266
TCP912 7401
TCP913 7414
TCP914 7432
TDC010 3400
TDC201 0000
TDC202 0500
TDC481 4201
TDC483 5001
TDC484 5401
TDC486 6001
TDC487 6601
TDD201 0020
TDD202 0520
TDP121 5202
TDP122 5406
TDP123 5242
TDP131 7202
TDP132 7401
TDP133 7311
TDP134 7460
TDP135 7463
TDP211 0402
TDP212 0601
TDP224 1257
TDP236 1070
TDP31A 3003
TDP31B 2202
TDP31C 4240
TDP311 4515
TDP312 3201
TDP313 3602
TDP314 2103
TDP315 3401
TDP316 4001
TDP317 4201
TDP318 4322
TDP319 3755
TDP32A 6426
TDP32B 6504
TDP321 6323
TDP322 6601
TDP323 7001
TDP324 6401
TDP325 6001
TDP326 6201
TDP327 5623
TDP328 6650
TDP329 0112
TDP331 4603
TDP332 5001
TDP333 5077
```

```
FDF410 0040
FDF420 0040
FDF430 0040
FDF440 0040
FDF450 0040
FDF460 0040
FDF470 0040
FDF490 0040
FILLER 0275
TDP334 5137
TDP335 5161
TDP341 4401
TDP342 4434
TDP345 4143
TDP411 4043
TDP412 4201
TDP413 4115
TDP415 4430
TDP416 3740
TDP42A 0402
TDP42B 2043
TDP42C 0711
TDP42D 2011
TDP42E 2025
TDP42F 0601
TDP42G 2001
TDP42H 1757
TDP42I 1143
TDP421 1401
TDP422 1201
TDP423 1606
TDP424 2212
TDP425 2231
TDP426 3001
TDP427 2201
TDP428 0510
TDP429 2401
TDP431 5401
TDP432 5430
TDP433 5601
TDP434 5471
TDP435 5476
TDP436 5503
TDP437 5510
TDP441 3055
TDP442 3201
TDP448 3225
TDP449 3142
TDP451 6202
TDP452 6242
TDP453 6601
TDP454 6401
TDP455 6646
TDP456 6717
TDP457 6467
TDP461 7201
TDP462 6330
TDP463 7401
TDP464 7601
TDP471 6001
TDP472 6032
TDP473 6056
TDP474 5643
TDP491 3402
```

```
TBP131 3234
TBP132 3401
TBP211 4514
TBP212 4001
TBP213 4601
TBP221 1657
TBP22L 2001
TBP22M 2511
TBP22P 3401
TDP492 3446
TDP493 3462
TDP511 0202
TDP512 0235
TDP513 0243
TDP514 0277
TDP515 0341
TDP516 0347
TDR001 5601
TDZACI 5620
TDZOAB 5605
TDZOCY 5617
TDZOSM 5602
TDZOTC 5604
TD483E 6000
TD487E 7600
WKLEAR 7300
WK4000 7330
WK5777 7352
WK6000 7333
WK7775 7346
WK7776 7344
WK7777 7340
WR0001 7340
WR0002 7344
WR0003 7346
WR2000 7333
WR2001 7352
WR4000 7330
WP0001 7301
WP0002 7305
WP0003 7325
WP0004 7307
WP0006 7327
WP0100 7203
WP2000 7332
WP3777 7350
ZARMDF 0133
ZAUT00 0010
ZAUT01 0011
ZAUT02 0012
ZAUT03 0013
ZAUT04 0014
ZAUT05 0015
ZAUT06 0016
ZAUT07 0017
ZBCALM 0105
ZBCAOM 0103
ZBCCIF 0110
ZBCDCM 0104
ZBCDDA 0102
ZBCDDN 0161
ZBCILA 0113
ZBCILF 0112
ZBCIVA 0122
ZKB23X 0173
ZKB23Z 0174
ZKB31A 0156
ZKB521 0175
ZKB522 0176
ZKB523 0177
ZKCDF  0021
ZKCDI  0023
ZKCIF  0022
ZKC213 0135
ZKC911 0173
ZKD329 0156
ZKD342 0136
ZKD345 0170
ZKD42A 0147
ZKD42B 0140
ZKD42C 0167
ZKD42F 0150
ZKD42G 0145
ZKD421 0152
ZKD422 0153
ZKD423 0154
ZKD424 0176
ZKD425 0177
ZKD426 0155
ZKD428 0151
ZKD429 0162
ZKD441 0141
ZKD453 0142
ZKD456 0143
```

```
TBP541 1103
TBP542 1154
TBP551 2122
TBP811 0202
TBP921 1602
TBP911 7610
TBP919 7603
TCP111 6202
TCP213 7023
ZBCKLT 0111
ZBCPGN 0120
ZBCPG1 0115
ZBCPTF 0114
ZDBNCL 0122
ZDCCAN 0115
ZDCCCL 0107
ZDCCCR 0114
ZDCCCY 0110
ZDCCDS 0103
ZDCCHS 0117
ZDCCLN 0106
ZDCCLT 0113
ZDCCOS 0102
ZDCCSN 0107
ZDCCSP 0111
ZDCDAT 0104
ZDCDBF 0123
ZDCDES 0101
ZDCDTP 0103
ZDCFLD 0110
ZDCFLG 0111
ZDCFLN 0105
ZDCLCU 0114
ZDCNCL 0121
ZDCNUL 0101
ZDCOAN 0113
ZDCOCR 0112
ZDCPKS 0120
ZDCPLN 0116
ZDCPRS 0102
ZDCPSC 0115
ZDCSAB 0104
ZDCTXS 0112
ZKA151 0036
ZKA152 0037
ZKA153 0040
ZKA154 0041
ZKA322 0031
ZKA323 0032
ZKA324 0033
ZKA416 0024
ZKA417 0025
ZKA521 0026
ZKA525 0027
ZKA529 0030
ZKB111 0035
ZKB213 0157
ZKB22L 0166
ZKB221 0160
ZKB222 0161
ZKB226 0163
ZKB229 0164
ZKB23J 0171
ZKB23S 0172
ZP0060 0020
ZP0070 0060
ZP0077 0061
ZP0100 0062
ZP0120 0063
ZP0177 0064
ZP0200 0065
ZP0260 0066
ZP0377 0067
ZP0777 0076
ZP7000 0070
ZP7400 0071
ZP7600 0072
ZP7700 0073
ZP7777 0077
ZWORK1 0004
ZWORK2 0005
ZWORK3 0006
ZWORK4 0007
```

```
ZKD457 0144
ZKD462 0145
ZKD463 0146
ZKD511 0130
ZKD512 0131
ZKD513 0132
ZKD514 0133
ZKD515 0134
ZKD516 0137
ZM0004 0074
ZM0005 0042
ZM0006 0043
ZM0010 0044
ZM0040 0045
ZM0120 0046
ZM0200 0047
ZP0003 0000
ZP0005 0050
ZP0006 0051
ZP0007 0052
ZP0010 0053
ZP0017 0054
ZP0020 0055
ZP0037 0056
ZP0040 0057
ERRORS DETECTED: 0
LINKS GENERATED: 0

ACL      148   401
DM1ADR    83    90   160   196   336#  343   413   449
DM1FLG    77    84    86   158   170   194   227   330   337#  339
         411   423   447   480
DM1010    79    86   332   339#
DM1020    97   102   350#  355
DM1030   100   103   353   356#
DM2CDF    88   123   341   376#
DM3ADR   161   168   114   421#
DM3FLG   159   167   412   420#
DM3M13   152   174   405   427#
DM3EEI   149   150   156   166   402   403   410   419#
DM3010   154   158   407   411#
DM3420   155   175#
DM4ADR   197   223   450   476#
DM4DCK   207   214   224   460   467   477#
DM4FLG   195   222   448   475#
DM4PRI   210   216   225   463   469   478#
DM4010   201   206   454   459#
DM4020   204   213   457   466#
DM4040   211   218   464   471#
DM5FRA   248   250   501#  503
DM6CDF   272   525#
DM6E40    52   277   305   530#
FILLER   428#
IOP420   175
IOP511    52    76    97    98   104   146   162   305   329#  350
         351   357   399   415
IOP512    93    94    95   101   122   126   336   347   348   354
         375#  379
IOP513   145   172   398#  425
IOP514   191   229   444#  482
IOP515   249   253   502#  506
IOP516   252   271   275   505   524#  528
SKLEAR   103   356
690001    89   342
ZA0102    91   124   344   377
ZA0103   251   273   504   526
ZDCCCF   206   459
ZDCPMF   408
ZEA521    81   334
ZEP521   164   417
ZKP523   220   473
ZKCDF     87   340
ZKD345   209   462
ZP0177   151   404
ZP7000   213   215   466   468
ZP7777   202   455
ZSOPKI   192   199   219   445   452   472

V56
```

```
/ DP4251.8B
/
/        ****************************************************************
/        *                                                              *
/        *                         PROPRIETARY.                         *
/        *                                                              *
/        *   THIS DOCUMENT CONTAINS INFORMATION PROPRIETARY TO          *
/        *   REUTERS LIMITED AND IS NOT TO BE REPRODUCED AND/OR         *
/        *   USED IN WHOLE OR IN PART WITHOUT THE EXPRESS WRITTEN       *
/        *   PERMISSION OF REUTERS LIMITED.                             *
/        *                                                              *
/        ****************************************************************
/
/
```

```
                  /
                  /        MODULE  MAPB50.BB 27-OCT-80
                  /        SYSTEM MAP FILE
                  /
                  /        MODULE MAPC50.BB 30-OCT-80
                  /        CONVERSATIONS MAP FILE
                  /
                  /        MODULE FCF050.BB 16-JAN-80
                  /        FIXED PAGE ZERO CONSTANTS AND COMMON DATA EQUATES FIELD 4 & 5
                  ////////                                                              ////////
                  /                                                                            /
                  /        COMPONENT:      BASIC FUNCTIONS          DP4251.BB                  /
                  /                        VERSION 50        07/09/79                          /
                  /                        DOUG ROBERTSON  (C.A.P. LTD.)                       /
                  /                                                                            /
                  /        MODULES:        TDP42A - BINARY TO CHARACTER CONVERSION             /
                  /                        TDP42B - CALCULATE FREE DESK UNITS                  /
                  /                        TDP42F - GET DIALOGUE BUFFER                        /
                  /                        TDP42C - SWAP CONTROL BLOCKS                        /
                  /                        TDP421 - SET CNV/CNB FLAG                           /
                  /                        TDP422 - FIND ROOM IN DIALOGUE BUFFERS              /
                  /                        TDP421 - ENDLINE STORAGE                            /
                  /                        TDP423 - COPY TEXT TO DIALOGUE BUFFERS              /
                  /                        TDP420 - TEST CNV/CNB FLAG                          /
                  /                        TDP42G - TEST CONVERSATION STATUS FOR DIALOGUE      /
                  /                        TDP42D - RELATIVE LINE NO TO ABSOLUTE               /
                  /                        TDP42E - ABSOLUTE LINE NO TO RELATIVE               /
                  /                        TDP428 - FIND POSITION IN DIALOGUE BUFFER           /
                  /                        TDP427 - CALCULATE FIRST LINE UNSCROLLED            /
                  /                        TDP424 - REMEMBER DIALOGUE POSITION                 /
                  /                        TDP425 - DISPLAY LATEST TEXT                        /
                  /                        TDP429 - UPDATE APPLICATION STATUS                  /
                  /                        TDP426 - DISPLAY WHOLE CONVERSATION                 /
                  /                        TDP441 - TRANSMIT FROM DIALOGUE BUFFERS             /
                  /                        TDP449 - SEND TEXT MESSAGE                          /
                  /                        TDP442 - RELINQUISH CONTROL                         /
                  /                        TDP448 - TRANSFER CHARS. FROM DIALOGUE TO TRANSMIT  /
                  /                                 BUFFER                                     /
                  /                                                                            /
                  ////////                                                              ////////
          0003            FIELD   3
          3377            *3377                    / INITIAL LOADING WILL ZEROISE
  33377   4601            1^4000+601          /*ELEMENT:TYPE 1:SIZE 601
  33400   0000    TDC010, ZBLOCK  600              /   SAVE AREA BUFFERS


                  / MODIFIED RJA 28-NOV-80 TDP422 USE LOCAL WORK AREA RATHER THAN ZWORK4
                  / TO STORE CHAR OFFSET IN DIALOGUE BUFFER
                  ////////                                                              ////////
                  /                                                                            /
                  /        MODULE:         TDP42A                                              /
                  /                        BINARY TO CHARACTER CONVERSION                      /
                  /                                                                            /
                  /        FUNCTION:       THIS MODULE CONVERTS A BINARY NUMBER TO             /
                  /                        ITS PACKED CHARACTER EQUIVALENT                     /
                  /                                                                            /
                  /        FORM OF CALL:   JMS  I  ZKD42A                                      /
                  /                                                                            /
                  /        ENTRY PARAMETER: AC = BINARY NUMBER FOR CONVERSION (0-3777)         /
                  /                                                                            /
                  /        EXIT PARAMETERS: AC = TWO LEAST SIGNIFICANT PACKED CHARS OF ANSWER  /
                  /                         MQ = TWO MOST SIGNIFICANT PACKED CHARS OF ANSWER   /
                  /                                                                            /
                  ////////                                                              ////////
          0004    FIELD   4
          0400    *400
  40400   3000            0^4000+D0BEND-TDP42A+2  /*ELEMENT:TYPE 0:SIZE D0BEND-TDP42A+2
                  /
  40401   7401            1-1^2+7401               /*1 VARIABLE LOCATIONS FOLLOW
  40402   0000    TDP42A, .-.
  40403   3007            DCA     ZWORK4           / SAVE BINARY NUMBER
  40404   6214            RDF
  40405   1023            TAD     ZKCDI            / CONSTRUCT CDI FOR
  40406   3230            DCA     D042AX           /  RETURN TO CALLER
  40407   6241            CDF     40
  40410   1057            TAD     ZP0040           / SET UP INITIAL CHAR DISPLAY
  40411   3004            DCA     ZWORK1
  40412   4233            JMS     D0AEXD           / EXTRACT AND CONVERT DIGIT
  40413   6030            -1750                    / K = CONSTANT = -1000
  40414   7002            BSW                      / PUT 1ST DIGIT IN TOP HALF OF MQ
  40415   7421            MQL
  40416   4233            JMS     D0AEXD           / EXTRACT AND CONVERT DIGIT
  40417   7634            -144                     / K = CONSTANT = -100
  40420   7501            MQA                      / PUT 2ND DIGIT IN BOTTOM HALF OF MQ
  40421   7421            MQL                      /  GIVING 2 MOST SIGNIFICANT PACKED CHARS IN MQ
  40422   4233            JMS     D0AEXD           / EXTRACT AND CONVERT DIGIT
  40423   7766            -12                      / K = CONSTANT = -10
  40424   7002            BSW                      / PUT 3RD DIGIT IN TOP HALF OF AC
  40425   1007            TAD     ZWORK4           / GET REMAINING UNITS
  40426   1020            TAD     ZP0060           / PUT 4TH DIGIT IN BOTTOM HALF OF AC
                                                   /  GIVING 2 LEAST SIGNIFICANT PACKED CHARS IN AC
  40427   7401            1-1^2+7401               /*1 VARIABLE LOCATIONS FOLLOW
```

```
40430  0000  DO42AX, 0                    / INTO CALLER'S FIELD
40431  5602         JMP  I  TOP42A        / RETURN TO CALLER WITH ANSWER IN AC AND MQ
                    /
                    EJECT
                    /
                    /       SUBROUTINE:      DOAEXD
                    /                        EXTRACT AND CONVERT DIGIT
                    /
                    /
40432  7401                1-1^2+7401          /*1 VARIABLE LOCATIONS FOLLOW
40433  0000  DOAEXD, .-.                       / V = RETURN ADDRESS
                                               / AC MUST = 0 ON ENTRY
40434  3006         DCA     ZWORK3             / INITIALISE LOOP COUNT
40435  1007  DOD010, TAD    ZWORK4             / GET DIGIT
40436  1633         TAD  I  DOAEXD             / SUBTRACT GIVEN POWER OF 10
40437  7510         SPA                        / DIGIT NOW < GIVEN POWER OF TEN
40440  5244         JMP     DOD020             / YES
40441  3007         DCA     ZWORK4             / NO - SAVE REMAINDER AS DIGIT
40442  2006         ISZ     ZWORK3             / INCREMENT LOOP COUNT
40443  5235         JMP     DOD010             /
40444  7300  DOD020, *KLEAR
40445  1006         TAD     ZWORK3             / GET LOOP COUNT
40446  7650         SNA CLA                    / ANY OF THIS POWER OF TEN ?
40447  5253         JMP     DOD030             / NO - SO CHAR = SPACE
40450  1020         TAD     ZP0060             / YES - SO SET DISPLAY CHAR = ASCII DIGIT
40451  3004         DCA     ZWORK1
40452  1006         TAD     ZWORK3             / GET NO OF THIS POWER OF TEN
40453  1004  DOD030, TAD    ZWORK1             / ADD IN DISPLAY CHAR FRAMEWORK
40454  2233         ISZ     DOAEXD             /
40455  5633         JMP  I  DOAEXD             / RETURN TO CALLER WITH AC = PACKED CHAR
                    /
                    EJECT
                    ////////                                                        ////////
                    /                                                                      /
                    /       MODULE:          TOP428                                        /
                    /                        CALCULATE FREE DESK UNITS                     /
                    /                                                                      /
                    /       FUNCTION:        THIS MODULE CALCULATES THE NUMBER OF FREE DESK /
                    /                        UNITS ON THE CONTROLLER                       /
                    /                                                                      /
                    /       FORM OF CALL:    JMS  I  ZKD428                                /
                    /                                                                      /
                    /       EXIT PARAMETER: AC = NUMBER OF FREE DESK UNITS (0-6)           /
                    /                                                                      /
                    ////////                                                        ////////
                    /
40456  7403                2-1^2+7401          /*2 VARIABLE LOCATIONS FOLLOW
40457  0000  DOKMSK, 0                         / CNV OR CNB MASK
40460  0000  TOP428, .-.
40461  6214         RDF                        / AC MUST = 0 ON ENTRY
40462  1023         TAD     ZKCDI              / CONSTRUCT CDI FOR
40463  3344         DCA     DO42RX             /  RETURN TO CALLER
40464  3006         DCA     ZWORK3             / SET NO OF FREE DESK UNITS = 0
40465  6221         CDF     20
40466  1524         TAD  I  DOZDUN             /  PICK UP CURRENT DESK UNIT NUMBER AND
40467  3336         DCA     DORDNM             /   SET FIRST PARAMETER WORD FOR TRP213
40470  1525         TAD  I  DOZDCM             / PICK UP DISPLAY AND CURRENT MODES,
40471  0061         AND     ZP0077             /  EXTRACT CURRENT MODE AND
40472  3337         DCA     DORMOD             /   SET SECOND PARAMETER WORD FOR TRP213
40473  6241         CDF     40
40474  4747         JMS  I  DOK426             / GET CNV/CNB FLAG SETTING
40475  1043         TAD     ZM0006             / CNB - SET MASK = -10
40476  1346         TAD     DOKCST             / CNV - SET MASK = -2
40477  3257         DCA     DOKMSK             / SAVE MASK
40500  7001         IAC
40501  3365         DCA     DOBDNO             / SET DESK UNIT NUMBER = 1
                    /
40502  6212  DOK114, CIF    10
40503  4573         JMS  I  ZKC911             / OBTAIN CONTROL BLOCKS & CAPABILITY FOR DESK UNIT
40504  7403                2-1^2+7401          /*2 VARIABLE LOCATIONS FOLLOW
40505  0000  DOKDNO, 0                         / F = DESK UNIT NUMBER
40506  0002         2                          / K = MODE = 2 (CNV)
40507  1257         TAD     DOKMSK             / ADD IN MASK CONSTANT
40510  7640         SZA CLA                    / DU CAPABLE OF REQD. SERVICE ?
40511  5324         JMP     DOKF15             / NO - GO TO NEXT DU
                    /
40512  6221         CDF     20                 / YES
40513  1745         TAD  I  DOBDHA             / GET DU ASSIGNMENT
40514  7104         CLL RAL
40515  7430         SZL                        / CHECK DU PHYSICALLY
40516  7700         SMA CLA                    /  AND LOGICALLY ENABLED
40517  5324         JMP     DOKF15             / NO - GO TO NEXT DU
                    /
                    /
40520  1526         TAD  I  DOZALK             / TEST IF BOTH
40521  0073         AND     ZP7700             /  DIALOGUE MODES
40522  7650         SNA CLA                    /   INACTIVE
40523  2006         ISZ     ZWORK3             / INCREMENT NO OF FREE DESK UNITS
                    /
40524  7300  DOKF15, *KLEAR
40525  6241         CDF     40
40526  2365         ISZ     DOBDNO             / INCREMENT DESK UNIT NUMBER
40527  1365         TAD     DOBDNO             / GET DESK UNIT NUMBER
40530  1043         TAD     ZM0006
```

```
40531  7750           SPA SNA CLA              / ALL DESKS DONE ?
40532  5362           JMP     DOBE11           / NO - GO PROCESS NEXT DU
                  /
40533  6222  DOBE11,  CIF     20
40534  4557           JMS  I  ZKB213           / OBTAIN CONTROL BLOCKS FOR DESK UNIT
40535  7403           2-1^2+7401               /*2 VARIABLE LOCATIONS FOLLOW
40536  0000  DOBDVA,  0                        / F - DESK UNIT NUMBER
40537  0000  DOBMOD,  0                        / F - MODE
40540  7200           CLA
40541  1006           TAD     ZWORK3           / PICK UP NO OF FREE DESK UNITS AND
40542  7401           1-1^2+7401               /*1 VARIABLE LOCATIONS FOLLOW
40543  0000  DO428X,  0
40544  5660           JMP  I  TDP428           /  RETURN TO CALLER WITH ANSWER IN AC
                  /
                  /
40545  0102  DOBDUA,  ZBCDUA                   / A - ADDRESS OF DU ASSIGNMENTS/CAPABILITIES
40546  7776  DOBCST,  -2                       / K - CONSTANT = -2
40547  1757  DO842C,  TDP428                   / A - GET CNV/CNB FLAG SETTING S/R
                  /
                  /
                  /        SUBROUTINE:      DP42IS
                  /                         SET CNV/CNB FLAG FOR TDP42C
                  /
40550  7401           1-1^2+7401               /*1 VARIABLE LOCATIONS FOLLOW
40551  0000  DP42IS,  .-.
40552  6251           CDF     50
40553  7340           WM0001
40554  1770           TAD  I  DOFLAD           / GET FLAG INDICATOR
40555  7510           SPA                      / CNV/CNB KNOWN FOR THIS CONVERSATION ?
40556  5361           JMP     DP421C           / NO - GO SET
40557  3771           DCA  I  DOIFAG           / YES - SET GLOBAL FLAG ACCORDINGLY
40560  5751           JMP  I  DP42IS
40561  7301  DP421C,  WP0001
40562  4772           JMS  I  DO421A           / SET GLOBAL FLAG FROM DU CAPABILITY
40563  6251           CDF     50
40564  1771           TAD  I  DOIFAG           / GET GLOBAL FLAG SETTING
40565  7001           IAC
40566  3770           DCA  I  DOFLAD           / SET KNOWN FOR THIS CONVERSATION
40567  5751           JMP  I  DP42IS
40570  0116  DOFLAD,  ZDCCVB                   / A - THIS CONVERSATION CNV/CNB FLAG
40571  0123  DOIFAG,  ZDCDBF                   / A - GLOBAL CNV/CNB FLAG
40572  1143  DO421A,  TDP42I                   / A - S/R TO SET CNV/CNB FLAG
40573  0000           ZBLOCK  .+20067600-.     /*ZERO FILL PAGE
                  EJECT
                  ////////                                                             ////////
                  /                                                                           /
                  /        MODULE:          TDP42F                                            /
                  /                         GET DIALOGUE BUFFER                               /
                  /                                                                           /
                  /        FUNCTION:        GETS A BUFFER AND ATTACHES IT TO THE END OF       /
                  /                         THE DIALOGUE BUFFER CHAIN                         /
                  /                                                                           /
                  /        FORM OF CALL:    JMS  I  ZK042F                                    /
                  /                                                                           /
                  ////////                                                             ////////
                  /
40600  7401           1-1^2+7401               /*1 VARIABLE LOCATIONS FOLLOW
40601  0000  TDP42F,  .-.
40602  6214           RDF                      / AC MUST = 0 ON ENTRY
40603  1023           TAD     ZKCDI            / CONSTRUCT CDI FOR
40604  3253           DCA     DO42FX           /  RETURN TO CALLER
40605  6241           CDF     40
40606  6202           CIF     0
40607  4426           JMS  I  ZKA521           / GET A BUFFER
40610  7403           2-1^2+7401               /*2 VARIABLE LOCATIONS FOLLOW
40611  0000  DOFFRA,  0                        / F - F.R.A. OF START OF BUFFER
40612  0000  DOFDFP,  0                        / G - DF OF BUFFER
40613  1211           TAD     DOFFRA           / PICK UP BUFFER START ADDRESS
40614  3004           DCA     ZWORK1           /  AND SAVE
40615  1212           TAD     DOFDFP           / CONSTRUCT
40616  1021           TAD     ZKCDF            /  BUFFER CDF
40617  3221           DCA     .+2              /   AND STORE FOR EXECUTION
40620  7401           1-1^2+7401               /*1 VARIABLE LOCATIONS FOLLOW
40621  0000           0                        / I - CDF TO BUFFER'S FIELD
40622  3404           DCA  I  ZWORK1           / ZEROISE BUFFER
40623  2004           ISZ     ZWORK1           /  FORWARD
40624  3404           DCA  I  ZWORK1           /   LINKAGE
40625  6241           CDF     40
40626  1255           TAD     DOFDTP           / POINT AT
40627  3004           DCA     ZWORK1           /  BUFFER OF
                  /
40630  1404  DOC133,  TAD  I  ZWORK1           / TEST IF LAST
40631  7450           SNA                      /  DIALOGUE BUFFER
40632  5243           JMP     DOCE33
                  /
40633  1021           TAD     ZKCDF            / CONSTRUCT BUFFER CDF
40634  3241           DCA     DOFCDF           /  AND STORE FOR EXECUTION
40635  2004           ISZ     ZWORK1           / POINT AT BUFFER ADDRESS
40636  1404           TAD  I  ZWORK1           / PICK UP BUFFER ADDRESS
40637  3004           DCA     ZWORK1           /  AND POINT AT BUFFER DF
40640  7401           1-1^2+7401               /*1 VARIABLE LOCATIONS FOLLOW
40641  0000  DOFCDF,  0                        / I - CDF TO BUFFER'S FIELD
                  /
40642  5230           JMP     DOC133
                  /
```

```
40643  1212  DOCF33, TAD        DOFDFP              / GET FIELD
40644  6002          IOF
40645  3404          DCA   I   ZWORK1              /// SAVE AS FORWARD LINK FIELD
40646  2004          ISZ       ZWORK1              /// NEXT WORD
40647  1211          TAD       DOFFRA              /// GET FIELD RELATIVE ADDRESS
40650  3404          DCA   I   ZWORK1              /// SAVE AS FORWARD LINK ADDRESS
40651  6001          ION                           ///
40652  7401          1-1^2+7401                    /*1 VARIABLE LOCATIONS FOLLOW
40653  0000  D042FX, 0
40654  5601          JMP   I   TDP42F              / RETRN TO CALLER WITH AC = 0
                     /
                     /
40655  0103  DOFDTP, ZDCOTP                        / A - ADDR OF BUFFERS START OF CHAIN CDF
                     /
                     EJECT
                     /
                     /         SUBROUTINE:        D05SZC
                     /                            SET ZONE NUMBER AND START (CURSOR) POSITION
                     /
                     /
40656  7401          1-1^2+7401                    /*1 VARIABLE LOCATIONS FOLLOW
40657  0000  D05SZC, .-.                           / V - RETURN ADDRESS
40660  7305          WP0002                        / SET ZONE
40661  3706          DCA   I   D05AZN              /  NUMBER = 2
                     /
40662  6251          CDF       50
40663  1527          TAD   I   D0ZDFS              / PICK UP BLOCK DESCRIPTOR
40664  6241          CDF       40
40665  0061          AND       ZP0077              /  AND ISOLATE MODE
40666  1042          TAD       ZM0005              / TEST IF CN1
40667  7650          SNA CLA                       /  DISPLAY
40670  5302          JMP       D0HF40              / START (CURSOR) POSITION FOR CN2 = 0000
                     /
40671  2706          ISZ   I   D05AZN              / SET ZONE NUMBER = 3
                     /
40672  1101          TAD       ZDCHOL              / PICK UP NO OF LINES IN CN1 DISPLAY (5 OR 7)
40673  7012          RTR                           /  AND ROTATE BIT 10 OF AC INTO LINK
40674  7200          CLA
40675  1304          TAD       D05NMC              / START (CURSOR) POSITION FOR CN1 NORMAL = 2140
40676  7420          SNL                           / TEST IF CN1 SHORT DISPLAY
                     /
40677  2706          ISZ   I   D05AZN              / SET ZONE NUMBER = 1
40700  7420          SNL                           / TEST IF CN1 SHORT DISPLAY
40701  1305          TAD       D05SHC              / START (CURSOR) POSITION FOR CN1 SHORT = 2400
                     /
                     /
                     /
                     /
40702  3707  D0HF40, DCA   I   D05ACR              / SET CURSOR CONTROL
40703  5657          JMP   I   D05SZC              / RETURN TO CALLER WITH AC = 0
                     /
                     /
40704  2140  D05NMC, 2140                          / K - CN1 NORMAL START (CURSOR) POSITION
40705  0240  D05SHC, 2400-2140                     / K - INC FOR CN1 SHORT START (CURSOR) POSITION
40706  2370  D05AZN, D05ZON                        / A - ADDRESS OF ZONE NUMBER
40707  2367  D05ACR, D05CUR                        / A - ADDRESS OF CURSOR CONTROL
                     /
                     EJECT
                     ////////                                                                 ////////
                     /                                                                               /
                     /         MODULE:            TDP42C                                             /
                     /                            SWAP CONTROL BLOCKS                                /
                     /                                                                               /
                     /         FUNCTION:          THIS MODULE SWAPS THE CONVERSATIONS CONTROL BLOCKS /
                     /                            IN AND OUT OF PAGE ZERO OF FIELDS 4 AND 5          /
                     /                                                                               /
                     /         FORM OF CALL:   JMS   I   ZKD42C                                      /
                     /                                                                               /
                     ////////                                                                 ////////
                     /
40710  7401          1-1^2+7401                    /*1 VARIABLE LOCATIONS FOLLOW
40711  0000  TDP42C, .-.
40712  6214          RDF                           / AC MUST = 0 ON ENTRY
40713  1023          TAD       ZKCDI               / CONSTRUCT CDI FOR
40714  3366          DCA       D042CX              /  RETURN TO CALLER
40715  6221          CDF       20
40716  1525          TAD   I   D0ZDCM              / PICK UP DISPLAY AND CURRENT MODES,
40717  0061          AND       ZP0077              /  EXTRACT CURRENT MODE,
40720  7002          BSW                           /   SWAP,
40721  1524          TAD   I   D0ZDUN              /    ADD IN DESK UNIT NUMBER,
40722  7002          BSW                           /     SWAP BACK AND
40723  3007          DCA       ZWORK4              /      SAVE DESK UNIT/MODE
40724  6251          CDF       50
40725  1527          TAD   I   D0ZDFS              / PICK UP CURRENT DESCRIPTOR
40726  6241          CDF       40
40727  7450          SNA                           / MODE NON ZERO ?
40730  5341          JMP       DOCF04              / NO
40731  3005          DCA       ZWORK2              / SAVE CURRENT MODE
40732  1007          TAD       ZWORK4              / GET NEW MODE
40733  7041          CMA IAC                       / NEGATE
40734  1005          TAD       ZWORK2              / ADD IN CURRENT MODE
40735  7650          SNA CLA                       / NEW MODE = CURRENT MODE
40736  5364          JMP       D042SF              / YES - NO BLOCKS TO BE SWAPPED SO EXIT
40737  4770          JMS   I   DOCCBA              / CALCULATE ADDR OF CCB SAVE AREA BUFFER
```

```
40740 4771           JMS  I  DOCSBA            / SAVE CURRENT CONTROL BLOCK
                    /
40741 1007  DOCF04,  TAD     ZWORK4            / GET NEW MODE
40742 3005           DCA     ZWORK2            /
40743 4770           JMS  I  DOCCBA            / CALCULATE ADDR OF CCB SAVE AREA BUFFER
40744 4772           JMS  I  DOCRBA            / RESTORE NEW CURRENT CONTROL BLOCKS
                    /
40745 1005           TAD     ZWORK2            / TEST IF
40746 0061           AND     ZP0077            /  CN2
40747 1074           TAD     ZM0004            /   CONTROL
40750 7640           SZA CLA                   /    BLOCK
40751 5356           JMP     DOCLAB
40752 6221           CDF     20                / FOR CN1
40753 1526           TAD  I  DOZALB            /  TEST IF
40754 7002           BSW                       /   HEADLINE
40755 7700           SMA CLA                   /    ON DISPLAY
40756 7305  DOCLAB,  ZP0002
40757 1050           TAD     ZP0005
40760 3101           DCA     ZDCNOL            / SET NUMBER OF LINES ON SCREEN
40761 1005           TAD     ZWORK2            / PICK UP STORED COPY OF CURRENT DESCRIPTOR
40762 6251           CDF     50
40763 3527           DCA  I  DOZDES            /  AND SET CURRENT DESCRIPTOR
                    /
40764 4773  DO42SF,  JMS  I  DOC42I            / GO SET CNV/CNB FLAG
40765 7401           1-1^2+7401                /*1 VARIABLE LOCATIONS FOLLOW
40766 0000  DO42CX,  0
40767 5711           JMP  I  TOP42C            / RETURN TO CALLER WITH AC = 0
                    /
                    /
40770 1001  DOCCBA,  DOCCAB                    / A - ADDRESS OF CALC ADDR OF SAVE AREA BUFF S/R
40771 1021  DOCSBA,  DOCSCB                    / A - ADDRESS OF SAVE CN1/CN2 CONTROL BLOCK S/R
40772 1051  DOCRBA,  DOCRCB                    / A - ADDRESS OF RESTORE CN1/CN2 CNTRL BLCK S/R
40773 0551  DOC42I,  DP42IS                    / A - ADDRESS OF SET UP CNV/CNB FLAG S/R
                    /
40774 0000           ZBLOCK  .+200&7600-.      /*ZERO FILL PAGE
                    EJECT
                    /
                    /
                    /        SUBROUTINE:      DOCCAB
                    /                         CALCULATE ADDRESS OF CCB SAVE AREA BUFFER
                    /
                    /
41000 7401           1-1^2+7401                /*1 VARIABLE LOCATIONS FOLLOW
41001 0000  DOCCAB,  .-.                       / V - RETURN ADDRESS
                                               / AC MUST = 0 ON ENTRY
41002 1005           TAD     ZWORK2            / CALCULATE THE ADDRESS OF THE BUFFER IN WHICH
41003 0073           AND     ZP7700            /  THIS DESK UNIT'S CONVERSATION CONTROL
41004 1217           TAD     DOCACB            /   BLOCK IS TO BE FOUND
41005 3006           DCA     ZWORK3            /    AND STORE
41006 1005           TAD     ZWORK2            / TEST IF CN1
41007 0061           AND     ZP0077            /  CONTROL BLOCK
41010 1074           TAD     ZM0004            /   TO BE
41011 7640           SZA CLA                   /    RESTORED
41012 1057           TAD     ZP0040            / PICK UP BUFFER OFFSET-1 FOR CN2
41013 1077           TAD     ZP7777            / PICK UP BUFFER OFFSET-1 FOR CN1
41014 1006           TAD     ZWORK3            / CALCULATE AND SET ADDRESS-1 OF
41015 3010           DCA     ZAUTO0            /  BUFFER POSITION FOR TDC011
41016 5601           JMP  I  DOCCAB            / RETURN TO CALLER WITH AC = 0
                    /
                    /
41017 3300  DOCACB,  TDC010-100                / A - ADDRESS OF CCB SAVE AREA BUFFER FOR DU = 0
                    /
                    EJECT
                    /
                    /        SUBROUTINE:      DOCSCB
                    /                         SAVE CN1 OR CN2 CONTROL BLOCK
                    /
                    /
41020 7401           1-1^2+7401                /*1 VARIABLE LOCATIONS FOLLOW
41021 0000  DOCSCB,  .-.                       / V - RETURN ADDRESS
                                               / AC MUST = 0 ON ENTRY
                    /
41022 1300           TAD     DOC011            / SET UP SOURCE ADDR TO TDC011
41023 3011           DCA     ZAUTO1            /
41024 1302           TAD     DOCL11            / SET UP -VE LENGTH OF TDC011
41025 3004           DCA     ZWORK1            /
                    /
41026 6241  DOKF03,  CDF     40                / INTO TDC011'S FIELD
41027 1411           TAD  I  ZAUTO1            / GET SOURCE WORD
41030 6231           CDF     30                / INTO FIELD OF SAVE AREA
41031 3410           DCA  I  ZAUTO0            / SAVE
41032 2004           ISZ     ZWORK1            / ALL OF BLOCK MOVED ?
41033 5226           JMP     DOKF03            / NO - GO MOVE NEXT
41034 1301           TAD     DOC019            / YES - SET SOURCE ADDR TO TDC019
41035 3011           DCA     ZAUTO1            /
41036 1303           TAD     DOCL19            / SET UP -VE LENGTH OF TDC019
41037 3004           DCA     ZWORK1
                    /
41040 6251  DOKF07,  CDF     50                / INTO TDC019'S FIELD
41041 1411           TAD  I  ZAUTO1            / GET SOURCE WORD
41042 6231           CDF     30                / INTO FIELD OF SAVE AREA
41043 3410           DCA  I  ZAUTO0            / SAVE
41044 2004           ISZ     ZWORK1            / ALL OF BLOCK MOVED ?
```

```
41045  5240          JMP      DOKF07          / NO = GO MOVE NEXT
41046  6241          CDF      40
41047  5621          JMP  I   DOCSCB          / RETURN TO CALLER WITH AC = 0
               /
               EJECT
               /
               /       SUBROUTINE:     DOCRCB
               /                       RESTORE CN1 OR CN2 CONTROL BLOCK
               /
               /
41050  7401          1-1^2+7401               /*1 VARIABLE LOCATIONS FOLLOW
41051  0000  DOCRCB, .-.                      / V = RETURN ADDRESS
                                              / AC MUST = 0 ON ENTRY
41052  1300          TAD      DOC011          / SET UP DESTINATION ADDR (= TDC011)
41053  3011          DCA      ZAUT01          /
41054  1302          TAD      DOCL11          / SET UP -VE LENGTH OF TDC011
41055  3004          DCA      ZWORK1
               /
41056  6231  DOTF03, CDF      30              / INTO FIELD OF SAVE AREA
41057  1410          TAD  I   ZAUT00          / GET WORD FROM SAVE AREA
41060  6241          CDF      40              / INTO TDC011'S FIELD
41061  3411          DCA  I   ZAUT01          / SAVE WORD IN TDC011 CCB
41062  2004          ISZ      ZWORK1          / ALL OF BLOCK MOVED BACK IN ?
41063  5256          JMP      DOTF03          / NO = GO MOVE NEXT
41064  1301          TAD      DOC019          / SET UP DESTINATION ADDR (= TDC019)
41065  3011          DCA      ZAUT01          /
41066  1303          TAD      DOCL19          / SET UP -VE LENGTH OF TDC019
41067  3004          DCA      ZWORK1          /
               /
41070  6231  DOTF07, CDF      30              / INTO FIELD OF SAVE AREA
41071  1410          TAD  I   ZAUT00          / GET WORD FROM SAVE AREA
41072  6251          CDF      50              / INTO TDC019'S FIELD
41073  3411          DCA  I   ZAUT01          / SAVE WORD IN TDC019 CCB
41074  2004          ISZ      ZWORK1          / ALL OF BLOCK MOVED BACK IN ?
41075  5270          JMP      DOTF07          / NO = GO MOVE NEXT
41076  6241          CDF      40
41077  5651          JMP  I   DOCRCB          / RETURN TO CALLER WITH AC = 0
               /
41100  0101  DOC011, ZDCCOS-1                 / ADDRESS-1 OF TDC011
41101  0101  DOC019, ZDCPRS-1                 / ADDRESS-1 OF TDC019
41102  7761  DOCL11, ZDCCOS-ZDCPKS-1          / -VE LENGTH OF TDC011
41103  7763  DOCL19, ZDCPRS-ZDCCVB-1          / -VE LENGTH OF TDC019
               EJECT
               /
               /       SUBROUTINE:     DO222L
               /                       INVOKE TBP22L
               /
               /       ENTRY PARAMETER: AC = START OF MESSAGE ADDRESS
               /
               /
41104  7401          1-1^2+7401               /*1 VARIABLE LOCATIONS FOLLOW
41105  0000  DO222L, .-.                      / V = RETURN ADDRESS
41106  3314          DCA      DO2ASM          / SET START OF MESSAGE ADDRESS
41107  7040          CMA                      / SET ENTRY PARAMETER (CONTROL VALUE) NEGATIVE
41110  6222          CIF      20
41111  4566          JMS  I   ZKB22L          / SET UP AND DISPLAY MESSAGE LINE
41112  7403          2-1^2+7401               /*2 VARIABLE LOCATIONS FOLLOW
41113  6241          CDF      40              / G = MESSAGE CDF
41114  0000  DO2ASM, 0                        / F = ADDRESS OF MESSAGE
41115  5705          JMP  I   DO222L          / RETURN TO CALLER WITH AC = 0
               /
               /
41116  2022  DO2TPD, TEXT    /PRINT DIALOGUE1/
41117  1116
41120  2440
41121  0411
41122  0114
41123  1707
41124  2505
41125  3500
41126  2701  DO2TWP, TEXT    /WARNING - PLEASE PRINT1/
41127  2216
41130  1116
41131  0740
41132  5540
41133  2014
41134  0501
41135  2305
41136  4020
41137  2211
41140  1624
41141  3500
               /
               EJECT
               ////////                                                    ////////
               /                                                                  /
               /       MODULE:         TDP421                                     /
               /                       SET CNV/CNB FLAG                           /
               /                                                                  /
               /       FUNCTION:       SETS A FLAG TO INDICATE EITHER CURRENCY SERVICE OR /
               /                       BONDS SERVICE                              /
               /                                                                  /
               /       FORM OF CALL:   JMS  I  (TDP421                            /
               /
```

```
                /       ENTRY PARAMETERS: AC = 0 :- USE PORT NO TO CALCULATE FLAG SETTING    /
                /                         AC NON 0 :- USE DU CAPABILITES                      /
                /                                                                             /
                /       EXIT PARAMETER: AC = 0                                                /
                /                                                                             /
                ////////                                                               ////////

41142  7401             1-1^2+7401                  /*1 VARIABLE LOCATIONS FOLLOW
41143  0000     TDP421, .-.
41144  7640             SZA CLA                     / TO USE PORT NO OR DU CAPABILITIES ?
41145  5353             JMP     DOI010              / DU CAPABILITIES
41146  6211             CDF     10                  / PORT NO
41147  1765             TAD  I  DOIPRT              / GET PORT NUMBER
41150  0064             AND     ZP0177              / MASK OUT FEEDBACK IF ANY
41151  1364             TAD     DOIK13              / ADD IN -VE CNV PORT NO
41152  5360             JMP     DOI020              / CNV FLAG = 0, CNB FLAG = 1
                /
41153  6221     DOI010, CDF     20                  /
41154  1766             TAD  I  DOIDUA              / GET DU ASSIGNMENTS
41155  0053             AND     ZP0010              / MASK DU CAPABILITIES WITH CNB MASK
41156  7640             SZA CLA                     / CNB CAPABLE ?
41157  7301             WP0001                      / YES - SET FLAG = 1
                /
41160  6251     DOI020, CDF     50                  /
41161  3767             DCA  I  DOIFLG              / SET FLAG
41162  6241             CDF     40                  /
41163  5743             JMP  I  TDP421              / RETURN TO CALLER
41164  7765     DOIK13, -13                         / -VE VALUE OF CNV PORT NUMBER
41165  0126     DOIPRT, BLZPRT                      / LINK TO PORT NO.
41166  0102     DOIDUA, ZBCDUA                      / LINK TO DU CAPABILITIES
41167  0123     DOIFLG, ZDCOBF                      / LINK TO CNV/CNB FLAG
41170  0000             ZBLOCK  .+20067600-.        /*ZERO FILL PAGE
                EJECT
                ////////                                                               ////////
                /                                                                             /
                /       MODULE:         TDP422                                                /
                /                       FIND ROOM IN DIALOGUE BUFFERS                         /
                /                                                                             /
                /       FUNCTION:       ENSURES ENOUGH SPACE IN THE DIALOGUE BUFFERS FOR      /
                /                       FORTHCOMING TEXT AND/OR DETECTS WHEN THERE IS NOT     /
                /                                                                             /
                /       FORM OF CALL:   JMS  I  ZKD422                                        /
                /                                                                             /
                /       ENTRY PARAMETERS: AC = NEW LINE / NO OF CHARS                         /
                /                         MQ = OVERRIDING INDICATOR                           /
                /                                                                             /
                /       EXIT PARAMETER: AC = LIMIT INDICATOR                                  /
                /                                                                             /
                ////////                                                               ////////
                /
41200  7401             1-1^2+7401                  /*1 VARIABLE LOCATIONS FOLLOW
41201  0000     TDP422, .-.
41202  3012             DCA     ZAUTO2              / SAVE ENTRY PARAMETER (NEW LINE / NO OF CHARS)
41203  7701             ACL
41204  3011             DCA     ZAUTO1              / SAVE ENTRY PARAMETER (OVERRIDING INDICATOR)
41205  3010             DCA     ZAUTO0              / SET NO OF LINES TO ZERO
41206  6214             RDF
41207  1023             TAD     ZKCDI               / CONSTRUCT CDI FOR
41210  3360             DCA     DO422X              /  RETURN TO CALLER
41211  6241             CDF     40
                /
41212  1012             TAD     ZAUTO2              / TEST IF
41213  7450             SNA                         /  NEW LINE
41214  5221             JMP     DOC025
41215  1107             TAD     ZDCCCL              / OR TEST IF
41216  1362             TAD     DO2M60              /  LINE
41217  7750             SPA SNA CLA                 /   OVERFLOW
41220  5225             JMP     DOBF24
                /
41221  7327     DOC025, WP0006                      / ADD SIX
41222  1012             TAD     ZAUTO2              /  TO NO OF
41223  3012             DCA     ZAUTO2              /   CHARS
41224  2010             ISZ     ZAUTO0              / ADD ONE TO NO OF LINES
                /
                /
                DOBF24,
                /
41225  4763             JMS  I  DO2ATH              / TEST IF CURRENT LINE IS HIGHLIGHTED
41226  5232             JMP     DOBF26
                /
41227  1054             TAD     ZP0017              / ADD FIFTEEN
41230  1012             TAD     ZAUTO2              /  TO NO OF
41231  3012             DCA     ZAUTO2              /   CHARS
                /
                /
41232  1107     DOBF26, TAD     ZDCCCL              / SET MQ = NO OF CHARS
41233  7001             IAC                         /
41234  7421             MQL                         /  IN CURRENT LINE
41235  1106             TAD     ZDCCLN              / SET AC = CURRENT LINE NO
41236  4540             JMS  I  ZKD428              / FIND CURRENT POSN IN DIALOGUE BUFFER
41237  7403             2-1^2+7401                  /*2 VARIABLE LOCATIONS FOLLOW
41240  0000     DO2CDF, 0                           / G - BUFFER CDF
41241  0000     DO2ERA, 0                           / F - E.R.A. OF WORD WITHIN BUFFER CONT'G CHAR
41242  3375             DCA     DO2CHO              / SAVE CHAR OFFSET WITHIN DIALOGUE BUFFER
```

```
41243  7701              ACL
41244  3006              DCA     ZWORK3          / SAVE RELATIVE BUFFER NO
41245  6202              CIF     0
41246  4430              JMS  I  ZKA529          / ENQUIRE NO OF FREE BUFFERS
41247  1051              TAD     ZP0006          / SAVE AS LIMIT (NO
41250  7110              CLL RAR                 /  OF FREE BUFFERS +6) / 2
41251  1044              TAD     ZM0010          /   TEST IF THIS LIMIT IS
41252  7500              SMA                     /  GREATER THAN OR EQUAL TO 9 ?
41253  7301              WP0001                  / YES - RESET LIMIT TO 9
41254  1053              TAD     ZP0010          / NO - RESET LIMIT TO OLD VALUE
41255  3005              DCA     ZWORK2          / SAVE
                /
41256  1106     DOER27,  TAD     ZDCCLN          / TEST IF
41257  1010              TAD     ZAUTO0          /  LINE
41260  1364              TAD     DO2M50          /   LIMIT
41261  7740              SMA SZA CLA             /    EXCEEDED
41262  5300              JMP     DOGR28
41263  1115              TAD     ZDCPSC          / OR TEST IF PRINT
41264  7710              SPA CLA                 /  ALREADY DEMANDED
41265  5300              JMP     DOGR28
41266  1375              TAD     DO2CPO          / OR
41267  1012              TAD     ZAUTO2          /  TEST IF
41270  1365              TAD     DO2MPO          /   BUFFER
41271  7710              SPA CLA                 /    OVERFLOW
41272  5312              JMP     DOFF27
41273  1005              TAD     ZWORK2          / AND
41274  7041              CMA IAC                 /  BUFFER
41275  1006              TAD     ZWORK3          /   LIMIT
41276  7710              SPA CLA                 /    REACHED
41277  5312              JMP     DOFF27
                /
41300  1115     DOGR28,  TAD     ZDCPSC          / SET
41301  7104              CLL RAL                 /  PRINT FLAG
41302  7130              STL RAR
41303  3115              DCA     ZDCPSC          /    TRUE
                /
41304  1011              TAD     ZAUTO1          / TEST IF NOT
41305  7640              SZA CLA                 /  OVERRIDING
41306  5312              JMP     DOGE28
                /
41307  1366              TAD     DO2APD          / PICK UP ADDR OF "PRINT DIALOGUE" MESSAGE
41310  4772              JMS  I  DO2AOM          /  AND OUTPUT MESSAGE
41311  4773              JMS  I  DO2CVS          / CALL CURSOR VISIBILITY S/R
                /
                /
                DOGE28,
                /
                DOFF27,
                /
41312  1375              TAD     DO2CPO          / TEST
41313  1012              TAD     ZAUTO2          /  IF
41314  1365              TAD     DO2MPO          /   BUFFER
41315  7710              SPA CLA                 /    OVERFLOW
41316  5356              JMP     DOIF29
                /
41317  1240              TAD     DO2CDF          / PICK UP BUFFER CDF
41320  3322              DCA     .+2             /  AND STORE FOR EXECUTION
41321  7401              1=1^2+7401              /*1 VARIABLE LOCATIONS FOLLOW
41322  0000              0                       / I = CDF TO BUFFER'S FIELD
41323  1241              TAD     DO2FKA          / CALCULATE BUFFER
41324  0073              AND     ZP7700          /  START ADDRESS
41325  3004              DCA     ZWORK1          /   AND SAVE
41326  1404              TAD  I  ZWORK1          / TEST IF ANOTHER BUFFER ALREADY
41327  6241              CDF     40
41330  7640              SZA CLA                 /  ON DIALOGUE CHAIN
41331  5356              JMP     DOHF38
                /
41332  1011              TAD     ZAUTO1          / TEST IF
41333  7640              SZA CLA                 /  OVERRIDING
41334  5345              JMP     DOKQ31
41335  1005              TAD     ZWORK2          / OR TEST IF
41336  7041              CMA IAC                 /  BUFFER
41337  1006              TAD     ZWORK3          /   LIMIT NOT
41340  7700              SMA CLA                 /    REACHED
41341  5356              JMP     DOJF30
41342  1115              TAD     ZDCPSC          / AND TEST IF PRINT NOT
41343  7710              SPA CLA                 /  ALREADY DEMANDED
41344  5356              JMP     DOJF30
                /
41345  1006     DOKQ31,  TAD     ZWORK3          / PRESERVE RELATIVE
41346  7421              MQL                     /  BUFFER NO IN MQ
41347  4770              JMS  I  DO2AGB          / GET AND ATTACH DIALOGUE BUFFER
                /
41350  7701              ACL                     / TEST IF
41351  1371              TAD     DO2M07          /  EIGHTH
41352  7640              SZA CLA                 /   BUFFER
41353  5356              JMP     DOLF32
                /
41354  1367              TAD     DO2AWP          / PICK UP ADDR OF "WARNING - PLEASE PRINT"
41355  4772              JMS  I  DO2AOM          /  MESSAGE AND OUTPUT MESSAGE
                /
                /
                DOLF32,
                /
```

```
                        /
                        DOJF30,
                        /
                        DONF38,
                        /
41356   1115    DOIF29, TAD     ZDCPSC          / PICK UP PRINT FLAGS
41357   7401            1-1^2+7401              /*1 VARIABLE LOCATIONS FOLLOW
41360   0000    DO422X, 0
41361   5601            JMP  I  TDP422          / RETURN TO CALLER WITH ANSWER IN AC
                        /
                        /
41362   7704    DO2M60, -74                     / K - CONSTANT = -60
41363   1521    DO2ATH, DO1THL                  / A - ADDR OF TEST CURR LINE FOR HIGHLIGHT S/R
41364   7716    DO2M50, -62                     / K - CONSTANT = -50
41365   7601    DO2M0, -177                     / K - CONSTANT = -127
41366   1116    DO2APD, DO2TPD                  / A - ADDR OF "PRINT DIALOGUE" MESSAGE
41367   1126    DO2AWP, DO2TWP                  / A - ADDR OF "WARNING - PLEASE PRINT" MESSAGE
41370   0601    DO2AGB, TDP42F                  / A - ADDR OF GET DIALOGUE BUFFER MODULE
41371   7771    DO2M07, -7                      / K - CONSTANT = -7
41372   1105    DO2AIM, DO222L                  / A - ADDR OF INVOKE TBP22L S/R
41373   3031    DO2CVS, DO6CVS                  / A - ADDR OF CURSOR VISIBILITY S/R
41374   7401            1-1^2+7401              /*1 VARIABLE LOCATIONS FOLLOW
41375   0000    DO2CHO, 0                       / CHAR OFFSET WITHIN DIALOG BUFFER
41376   0000            ZBLOCK  .+200&7600-.    /*ZERO FILL PAGE
                EJECT
                ////////                                                        ////////
                /                                                                      /
                /       MODULE:         TDP421                                         /
                /                       ENDLINE STORAGE                                /
                /                                                                      /
                /       FUNCTION:       STORES CHARACTERS IN THE DIALOGUE BUFFERS      /
                /                       CORRESPONDING TO THE END OF A LINE OF TEXT     /
                /                       AND THE START OF A NEW ONE                     /
                /                                                                      /
                /       FORM OF CALL:   JMS  I  ZKD421                                 /
                /                                                                      /
                ////////                                                        ////////
                /
41400   7401            1-1^2+7401              /*1 VARIABLE LOCATIONS FOLLOW
41401   0000    TDP421, .-.
41402   6214            RDF                     / AC MUST = 0 ON ENTRY
41403   1023            TAD     ZKCDI           / CONSTRUCT CDI FOR
41404   3316            DCA     DO421X          /  RETURN TO CALLER
41405   6241            CDF     40
                /
41406   4321            JMS     DO1THL          / TEST IF CURRENT LINE IS HIGHLIGHTED
41407   5235            JMP     DOBF17
                /
41410   7325            WP0003                  / SET INCREMENT (TO ZDCCCL)
41411   3005            DCA     ZWORK2          /  TO 3 (SENDER'S LINE)
41412   1004            TAD     ZWORK1          / PICK UP FIRST WORD OF LINE AND
41413   7002            BSW                     /  IDENTIFY FIRST CHARACTER AS
41414   0061            AND     ZP0077          /   SPACE (RECEIVER) OR AS HASH
41415   1363            TAD     DO1MHS          /    (SENDER) OR AS F/T (HEADLINE)
41416   7510            SPA
41417   2005            ISZ     ZWORK2          / CHANGE INCREMENT TO 4 (RECEIVER'S LINE)
41420   7740            SMA SZA CLA
41421   3005            DCA     ZWORK2          / CHANGE INCREMENT TO 0 (HEADLINE)
41422   1005            TAD     ZWORK2          / NO OF SPACES TO BE TABBED
41423   1107            TAD     ZDCCCL          /  = 66 - 1 - ZDCCCL
41424   7041            CMA IAC                 /   - INCREMENT (TO
41425   1364            TAD     DO1P65          /    ZDCCCL)
41426   1361            TAD     DO1PTN          / CONSTRUCT TAB TO COL 67
41427   3766            DCA  I  DO1ATK          /  AND STORE IN POSITION
41430   1366            TAD     DO1ATK          / SET ADDRESS OF TEXT TO
41431   3357            DCA     DO1TXA          /  TAB TO COL 67 AND 13 "*"S
41432   7421            MQL                     / SET MQ = 0,
41433   1054            TAD     ZP0017          /  AC = NO OF CHARS
41434   4353            JMS     DO1423          /   AND COPY TEXT TO DIALOGUE BUFFERS
                /
                /
41435   1107    DOBF17, TAD     ZDCCCL          / SET MQ = NO OF CHARS
41436   7001            IAC                     /
41437   7421            MQL                     /  IN CURRENT LINE + 1,
41440   1106            TAD     ZDCCLN          /   AC = CURRENT LINE NO
41441   4344            JMS     DO142B          /    AND FIND CURRENT POSN
41442   3004            DCA     ZWORK1          / SAVE CHAR OFFSET WITHIN DIALOGUE BUFFER
41443   7421            MQL                     / SET MQ = 0
41444   1367            TAD     DO1ADN          / SET ADDRESS OF TEXT TO
41445   3357            DCA     DO1TXA          /  DESTRUCTIVE CR/LF + NULL
                /
41446   7301            WP0001                  / SET AC = NO OF CHARS
41447   0004            AND     ZWORK1          /  (1 IF CURR POSN ODD OR
41450   7040            CMA                     /
41451   1000            TAD     ZP0003          /   2 IF CURR POSN EVEN)
41452   4353            JMS     DO1423          /    AND COPY TEXT TO DIALOGUE BUFFERS
41453   1107            TAD     ZDCCCL          / SET MQ = 1 + NO
41454   7001            IAC                     /  OF CHARS IN
41455   7421            MQL                     /   CURRENT LINE
41456   1106            TAD     ZDCCLN          / SET AC = CURRENT LINE NO
41457   4344            JMS     DO142B          / FIND NEXT FREE POSN IN DIALOGUE BUFFER
41460   7110            CLL RAR                 / CALCULATE WORD OFFSET BY DIVIDING CHAR
41461   3005            DCA     ZWORK2          /  OFFSET BY 2 AND SAVE
```

```
41462  7325           *P0003                        / ADDRESS OF NEW LINE POINTER
41463  1106           TAD      ZDCCLN               /  ENTRY = ZDCSAD
41464  1104           TAD      ZDCSAD               /   + 2 + ZDCCLN +1
41465  3004           DCA      ZWORK1               / SAVE ADDRESS OF LINE POINTER ENTRY
41466  1021           TAD      ZKCDF                / CONSTRUCT
41467  1103           TAD      ZDCDTP               /  LINE POINTER BUFFER CDF
41470  3301           DCA      DO1DFC               /   AND STORE FOR EXECUTION
41471  7701           ACL                           / PICK UP REL BUFFER NO,
41472  7002           BSW                           /  SWAP INTO M.S. BYTE,
41473  1005           TAD      ZWORK2               /   ADD IN WORD OFFSET INTO L.S. BYTE
41474  3005           DCA      ZWORK2               /    AND SAVE
41475  1102           TAD      ZDCCOS               / COMPLETE LINE POINTER ENTRY
41476  7112           CLL RTR                       /  BY PUTTING SENDER/RECEIVER
41477  1005           TAD      ZWORK2               /   STATUS INTO M.S. BIT
41500  7401           1-1^2+7401                    /*1 VARIABLE LOCATIONS FOLLOW
41501  0000  DO1DFC,  0                             / I - CDF TO LINE POINTER BUFFER'S FIELD
41502  3404           DCA   I  ZWORK1               / STORE LINE POINTER ENTRY IN TABLE
41503  6241           CDF      40
41504  1370           TAD      DO1APS               / SET ADDRESS OF TEXT TO
41505  3357           DCA      DO1TXA               /  HASH + SPACES
41506  1102           TAD      ZDCCOS               / SET MQ = SOURCE START INDICATOR
41507  7421           MQL                           /  (0 FOR EVEN START OR 1 FOR ODD START)
41510  7325           *P0003                        / SET AC = NO OF CHARS (3 IF SENDER
               /
41511  1102           TAD      ZDCCOS               /  OR 4 IF RECEIVER)
               /
41512  4353  DUGF19,  JMS      DO1423               /   AND COPY TEXT TO DIALOGUE BUFFERS
41513  3107           DCA      ZDCCCL               / SET NO OF CHARS IN CURRENT LINE TO 0
41514  2106           ISZ      ZDCCLN               / INCREMENT CURRENT LINE NO WHICH
                                                    /  MAY GO TO ZERO
41515  7401           1-1^2+7401                    /*1 VARIABLE LOCATIONS FOLLOW
41516  0000  DO421X,  0
41517  5601           JMP   I  TDP421              / RETURN TO CALLER WITH AC = 0
               /
               EJECT
               /
               /       SUBROUTINE:      DO1THL
               /                        TEST CURRENT LINE FOR HIGHLIGHT
               /
               /       EXIT PARAMETER: RETURN IS TO JMS+1 IF NOT HIGHLIGHTED OR
               /                        RETURN IS TO JMS+2 IF HIGHLIGHTED
               /
               /
41520  7401           1-1^2+7401                    /*1 VARIABLE LOCATIONS FOLLOW
41521  0000  DO1THL,  .-.                           / V - RETURN ADDRESS
                                                    / AC MUST = 0 ON ENTRY
41522  7421           MQL                           / SET MQ = 0,
41523  1106           TAD      ZDCCLN               /  AC = CURRENT LINE NO
41524  4344           JMS      DO1428               /   AND FIND START OF LINE
41525  7200           CLA
41526  1347           TAD      DO1CDF               / PICK UP BUFFER CDF AND
41527  3331           DCA      .+2                  /  STORE FOR EXECUTION
41530  7401           1-1^2+7401                    /*1 VARIABLE LOCATIONS FOLLOW
41531  0000           0                             / I - CDF TO BUFFER'S FIELD
41532  1750           TAD   I  DO1FRA               / PICK UP FIRST WORD OF LINE
41533  6241           CDF      40
41534  3004           DCA      ZWORK1               /  AND SAVE
41535  1004           TAD      ZWORK1               / TEST IF
41536  0061           AND      ZP0077               /  CURRENT
41537  1362           TAD      DO1MAK               /   LINE IS
41540  7650           SNA CLA                       /    HIGHLIGHTED
               /
41541  2321           ISZ      DO1THL               / INCREMENT RETURN ADDRESS
               /
41542  5721           JMP   I  DO1THL               / RETURN TO CALLER WITH AC = 0
               /
               EJECT
               /
               /       SUBROUTINE:      DO1428
               /                        INVOKE TDP428
               /
               /       ENTRY PARAMETERS: AC = LINE PARAM (REL LINE NO / HEADLINE)
               /                        MQ = POSN PARAM (BEGINNING OF LINE / USER TEXT CHAR
               /                        POSN / CHAR OFFSET)
               /
               /       EXIT PARAMETERS: AC = CHAR OFFSET WITHIN DIALOGUE BUFFER
               /                        MQ = REL BUFFER NO
               /
               /
41543  7401           1-1^2+7401                    /*1 VARIABLE LOCATIONS FOLLOW
41544  0000  DO1428,  .-.                           / V - RETURN ADDRESS
41545  4540           JMS   I  ZKD428               / FIND POSITION IN DIALOGUE BUFFER
41546  7403           2-1^2+7401                    /*2 VARIABLE LOCATIONS FOLLOW
41547  0000  DO1CDF,  0                             / G - BUFFER CDF
41550  0000  DO1FRA,  0                             / F - F.R.A. OF WORD WITHIN BUFFER CONT'G CHAR
41551  5744           JMP   I  DO1428               / RETURN TO CALLER WITH ANSWER IN AC AND MQ
               /
               EJECT
               /
               /       SUBROUTI         DO1423
               /                        INVOKE TDP423
               /
               /       ENTRY PARAMETERS: AC = NO OF CHARS
               /                        MQ = ODD/EVEN SOURCE START INDICATOR
```

```
                       /
                       /
         41552  7401         1-1^2+7401             /*1 VARIABLE LOCATIONS FOLLOW
         41553  0000  DO1423, .-.                   / V - RETURN ADDRESS
         41554  4554         JMS  I  ZKD423         / COPY TEXT TO DIALOGUE BUFFERS
         41555  7403         2-1^2+7401             /*2 VARIABLE LOCATIONS FOLLOW
         41556  6241         CDF     40             / G - TEXT CDF
         41557  0000  DO1TXA, 0                     / F - ADDRESS OF TEXT
         41560  5753         JMP  I  DO1423         / RETURN TO CALLER WITH AC = 0
                       /
                       /
         41561  3400  DO1PTN, 3400                  / P - DESTRUCTIVE TAB + NULL
         41562  7726  DO1MAK, -0052                 / K - CONSTANT = -"*"
         41563  7735  DO1MHS, -0043                 / K - CONSTANT = -"#"
         41564  0101  DO1P65, 0101                  / K - CONSTANT = 65
         41565  3600  DO1PDN, 3600                  / P - DESTRUCTIVE CR/LF + NULL
         41566  1575  DO1ATK, DO1TAK                / A - ADDRESS OF TAB TO COL 67 AND 13 "*"S
         41567  1565  DO1ADN, DO1PDN                / A - ADDRESS OF DESTRUCTIVE CR/LF + NULL
         41570  1571  DO1APS, DO1PHS                / A - ADDRESS OF HASH AND SPACES
         41571  4340  DO1PHS, 4340                  / P - HASH + SPACE
         41572  4040         4040                   / P - SPACE + SPACE
         41573  4000         4000                   / P - SPACE + NULL
                       /
                       /
         41574  7401         1-1^2+7401             /*1 VARIABLE LOCATIONS FOLLOW
         41575  0000  DO1TAK, 0                     / F - TAB TO COL 67
         41576  5252         5252                   / P - ASTERISK + ASTERISK
         41577  5252         5252                   / P - ASTERISK + ASTERISK
         41600  5252         5252                   / P - ASTERISK + ASTERISK
         41601  5252         5252                   / P - ASTERISK + ASTERISK
         41602  5252         5252                   / P - ASTERISK + ASTERISK
         41603  5252         5252                   / P - ASTERISK + ASTERISK
         41604  5200         5200                   / P - ASTERISK + NULL
                       /
                       EJECT
                       ////////                                                          ////////
                       /                                                                        /
                       /          MODULE:          TDP423                                       /
                       /                           COPY TEXT TO DIALOGUE BUFFERS                /
                       /                                                                        /
                       /          FUNCTION:        COPIES TEXT FROM A SOURCE AREA INTO THE NEXT /
                       /                           FREE AREA IN THE DIALOGUE BUFFERS            /
                       /                                                                        /
                       /          FORM OF CALL:    JMS  I  ZKD423                               /
                       /                           .AZKNOP:2                                    /
                       /                           DATA CDF                                     /
                       /                           DATA ADDRESS                                 /
                       /                                                                        /
                       /          ENTRY PARAMETERS: AC = NO OF CHARS                            /
                       /                           MQ = ODD/EVEN SOURCE START INDICATOR         /
                       /                                                                        /
                       ////////                                                          ////////
                       /
         41605  7401         1-1^2+7401             /*1 VARIABLE LOCATIONS FOLLOW
         41606  0000  TDP423, .-.
         41607  7040         CMA                    / SAVE COMPLEMENTED ENTRY
         41610  3010         DCA     ZAUTO0         /  PARAMETER ( - NO OF CHARS)
         41611  6214         RDF
         41612  1023         TAD     ZKCDI          / CONSTRUCT CDI FOR
         41613  3243         DCA     DO423X         /  RETURN TO CALLER
         41614  7701         ACL                    / PICK UP ODD/EVEN SOURCE START INDICATOR
         41615  7112         CLL RTR                / SET SOURCE CHAR INDICATOR (ZAUTO1) TO
         41616  3011         DCA     ZAUTO1         /  4000 (ODD) OR 0000 (EVEN)
         41617  2206         ISZ     TDP423         / POINT TO PARAMETERS
         41620  1606         TAD  I  TDP423         / PICK UP PARAMETER 1 (DATA CDF) AND
         41621  3275         DCA     DO3CDR         /  SET SOURCE CDF (DO3CDR)
         41622  2206         ISZ     TDP423         /
         41623  1606         TAD  I  TDP423         / PICK UP PARAMETER 2 (DATA ADDRESS) AND
         41624  3353         DCA     DO3SCA         /  SET SOURCE ADDRESS (DO3SCA)
         41625  2206         ISZ     TDP423         /
         41626  6241         CDF     40
         41627  4246         JMS     DO3NFP         / DETERMINE N.F.P. AND SET DESTINATION PARAMS
                       /
         41630  2010  DO0I20, ISZ    ZAUTO0         / TEST IF END
         41631  7410         SKP                    /  OF LOOP
         41632  5237         JMP     DO0E20
                       /
         41633  4274         JMS     DO3CHR         / READ CHAR FROM SOURCE TEXT
         41634  4317         JMS     DO3CHW         / WRITE CHAR TO DIALOGUE BUFFER
         41635  2107         ISZ     ZBCCCL         / INCREMENT NO OF CHARS IN CURRENT LINE
                       /
         41636  5230         JMP     DO0I20
                       /
         41637  1351  DO0E20, TAD    DO3PDD         / SET CURRENT CHAR TO
         41640  3355         DCA     DO3CHA         /  DESTRUCTIVE END OF TEXT
         41641  4317         JMS     DO3CHW         / WRITE CHAR TO DIALOGUE BUFFER
         41642  7401         1-1^2+7401             /*1 VARIABLE LOCATIONS FOLLOW
         41643  0000  DO423X, 0
         41644  5606         JMP  I  TDP423         / RETURN TO CALLER WITH AC = 0
/ DP4251.88                          PAL8-V10C 28-NOV-80 PAGE 24-2

                       /
```

```
                        EJECT
                        /
                        /       SUBROUTINE:     DO3NFP
                        /                       DETERMINE NEXT FREE POSITION AND SET
                        /                       DESTINATION PARAMETERS
                        /
                        /
        41645   7401            1-1^2+7401              /*1 VARIABLE LOCATIONS FOLLOW
        41646   0000    DO3NFP, .-.                     / V = RETURN ADDRESS
                                                        / AC MUST = 0 ON ENTRY
        41647   1107            TAD     ZDCCCL          / SET MQ = 1 + NO
        41650   7001            IAC                     /  OF CHARS IN
        41651   7421            MQL                     /   CURRENT LINE
        41652   1106            TAD     ZDCCLG          / SET AC = CURRENT LINE NO
        41653   4540            JMS  I  ZKD42B          / FIND NEXT FREE POSN IN DIALOGUE BUFFER
        41654   7403            2-1^2+7401              /*2 VARIABLE LOCATIONS FOLLOW
        41655   0000    DO3CDF, 0                       / G = BUFFER CDF
        41656   0000    DO3FRA, 0                       / F = F.R.A. OF WORD WITHIN BUFFER CONT'G CHAR
        41657   7010            RAR                     / PICK UP CHAR OFFSET WITHIN DIALOGUE BUFFER
        41660   7210            CLA RAR                 / SET DESTINATION CHAR INDICATOR (ZAUTO2) TO
        41661   3012            DCA     ZAUTO2          /  4000 (ODD) OR 0000 (EVEN)
        41662   1255            TAD     DO3CDF          / PICK UP BUFFER CDF AND
        41663   3326            DCA     DO3CDW          /  SET DESTINATION CDF (DO3CDW)
        41664   1256            TAD     DO3FRA          / PICK UP F.R.A. OF WORD WITHIN BUFFER AND
        41665   3354            DCA     DO3DTA          /  SET DESTINATION ADDRESS (DO3DTA)
        41666   1354            TAD     DO3DTA          / DETERMINE START ADDRESS OF
        41667   0073            AND     ZP7700          /  THIS DIALOGUE BUFFER AND
        41670   1062            TAD     ZP0100          /   CALCULATE OVERFLOW ADDRESS
        41671   3006            DCA     ZWORK3          / SET DESTINATION OVERFLOW COMPARATOR (ZWORK3)
        41672   5646            JMP  I  DO3NFP          / RETURN TO CALLER WITH AC = 0
                        /
                        EJECT
                        /
                        /       SUBROUTINE:     DO3CHR
                        /                       READ CHARACTER FROM SOURCE TEXT
                        /
                        /
        41673   7403            2-1^2+7401              /*2 VARIABLE LOCATIONS FOLLOW
        41674   0000    DO3CHR, .-.                     / V = RETURN ADDRESS
                                                        / AC MUST = 0 ON ENTRY
        41675   0000    DO3CDR, 0                       / I = CDF TO SOURCE TEXT FIELD
        41676   7330            WK4000                  / SET SOURCE CHAR INDICATOR
        41677   1011            TAD     ZAUTO1          /  (FOR NEXT CHAR) TO
        41700   3011            DCA     ZAUTO1          /   4000 (ODD) OR 0000 (EVEN)
                        /
        41701   1011            TAD     ZAUTO1          / TEST IF EVEN
        41702   7700            SMA CLA                 /  SOURCE CHAR
        41703   5307            JMP     DODS21
                        /
        41704   1753            TAD  I  DO3SCA          / PICK UP SOURCE CHAR
        41705   7002            BSW                     / GET EVEN SOURCE CHAR INTO BITS 6-11 OF AC
        41706   5312            JMP     DODF21
                        /
                        DODS21,
                        /
        41707   1753            TAD  I  DO3SCA          / GET ODD SOURCE CHAR INTO BITS 6-11 OF AC
        41710   2353            ISZ     DO3SCA          / INCREMENT SOURCE ADDRESS WHICH
        41711   7000            NOP                     /  MAY GO TO ZERO
                        /
                        /
        41712   0061    DODF21, AND     ZP0077          / EXTRACT SOURCE CHAR AND
        41713   3355            DCA     DO3CHA          /  STORE
        41714   6241            CDF     40
        41715   5674            JMP  I  DO3CHR          / RETURN TO CALLER WITH AC = 0
                        /
                        EJECT
                        /
                        /       SUBROUTINE:     DO3CHW
                        /                       WRITE CHARACTER TO DIALOGUE BUFFER
                        /
                        /
        41716   7401            1-1^2+7401              /*1 VARIABLE LOCATIONS FOLLOW
        41717   0000    DO3CHW, .-.                     / V = RETURN ADDRESS
                                                        / AC MUST = 0 ON ENTRY
                        /
        41720   1006            TAD     ZWORK3          / TEST IF
        41721   7041            CMA IAC                 /  DIALOGUE
        41722   1354            TAD     DO3DTA          /   BUFFER
        41723   7650            SNA CLA                 /    FULL
                        /
        41724   4246            JMS     DO3NFP          / DETERMINE N.F.P. AND SET DESTINATION PARAMS
                        /
        41725   7401            1-1^2+7401              /*1 VARIABLE LOCATIONS FOLLOW
        41726   0000    DO3CDW, 0                       / I = CDF TO DESTINATION BUFFER FIELD
        41727   7330            WK4000                  / SET DESTINATION CHAR INDICATOR
        41730   1012            TAD     ZAUTO2          /  (FOR NEXT CHAR) TO
        41731   3012            DCA     ZAUTO2          /   4000 (ODD) OR 0000 (EVEN)
                        /
        41732   1012            TAD     ZAUTO2          / TEST IF EVEN
        41733   7700            SMA CLA                 /  DESTINATION CHAR
        41734   5341            JMP     DOGS23
                        /
        41735   1355            TAD     DO3CHA          / PICK UP CHAR
        41736   7002            BSW                     / GET EVEN DESTINATION CHAR INTO BITS 0-5 OF AC
```

```
41737  3754          DCA  I  D03DTA         / PUT EVEN DESTINATION CHAR INTO BUFFER
41740  5347          JMP     DOGF23
                /
                DOGS23,
                /
41741  1754          TAD  I  D03DTA         / PICK UP WORD FROM BUFFER,
41742  0073          AND     ZP7700         /  ISOLATE EVEN CHAR,
41743  1355          TAD     D03CHA         /   ADD IN ODD DESTINATION CHAR AND
41744  3754          DCA  I  D03DTA         /    PUT CHAR PAIR INTO BUFFER
41745  2354          ISZ     D03DTA         / INCREMENT DESTINATION ADDRESS WHICH
41746  7000          NOP                    /  MAY GO TO ZERO
                /
                /
41747  6241     DOGF23, CDF     40
41750  5717          JMP  I  D03CHW         / RETURN TO CALLER WITH AC = 0
                /
                /
41751  0035     D03PND, 0035                / P - NULL + DESTRUCTIVE END OF TEXT
                /
41752  7405          3-1^2+7401             /*3 VARIABLE LOCATIONS FOLLOW
41753  0000     D03SCA, 0                   / V - SOURCE ADDRESS
41754  0000     D03DTA, 0                   / V - DESTINATION ADDRESS
41755  0000     D03CHA, 0                   / P - NULL + CURRENT CHARACTER
                /
                EJECT
                ////////                                                        ////////
                /                                                                      /
                /       MODULE:         TDP42H                                         /
                /                       TEST CURRENCY/BONDS FLAG                       /
                /                                                                      /
                /       FUNCTION:       TEST THE CNV/CNB FLAG AND EXITS                /
                /                                                                      /
                /       FORM OF CALL:   JMS  I  (TDP42H                                /
                /                       <RETURN FOR CNB>                               /
                /                       <RETURN FOR CNV>                               /
                /                                                                      /
                ////////                                                        ////////

41756  7401          1-1^2+7401             /*1 VARIABLE LOCATIONS FOLLOW
41757  0000     TDP42H, .-.
41760  3372          DCA     DOHTMP         / SAVE AC
41761  6251          CDF     50             /
41762  1770          TAD  I  DOHDBF         / GET CNV/CNB FLAG
41763  6241          CDF     40             /
41764  7650          SNA CLA                / BONDS ?
41765  2357          ISZ     TDP42H         / NO - CNV SO EXIT RETURN+1
41766  1372          TAD     DOHTMP         / RESTORE AC
41767  5757          JMP  I  TDP42H         / YES - NORMAL RETURN
41770  0123     DOHDBF, ZDCDBF              / LINK TO CNV/CNB FLAG
41771  7401          1-1^2+7401             /*1 VARIABLE LOCATIONS FOLLOW
41772  0000     DOHTMP, 0                   / TEMP STORE
41773  0000          ZBLOCK  .+20067600-.   /*ZERO FILL PAGE
                EJECT
                ////////                                                        ////////
                /                                                                      /
                /       MODULE:         TDP42G                                         /
                /                       TEST CONVERSATION STATUS FOR DIALOGUE          /
                /                                                                      /
                /       FUNCTION:       TESTS THE CONVERSATION PRIMARY STATUS TO SEE   /
                /                       IF IT IS DIALOGUE                              /
                /                                                                      /
                /       FORM OF CALL:   JMS  I  ZKD42G                                 /
                /                                                                      /
                /       EXIT PARAMETER: AC = DIALOGUE INDICATOR (TDZPRS - 3)           /
                /                                                                      /
                ////////                                                        ////////
                /
42000  7401          1-1^2+7401             /*1 VARIABLE LOCATIONS FOLLOW
42001  0000     TDP42G, .-.
42002  7346          WM0003                 / DIALOGUE INDICATOR =
42003  6251          CDF     50
42004  1607          TAD  I  DOGPRS         /  PRIMARY STATUS - 3
42005  6241          CDF     40
42006  5601          JMP  I  TDP42G         / RETURN TO CALLER WITH ANSWER IN AC
                /
                /
42007  0102     DOGPRS, ZDCPRS              / A - ADDRESS OF PRIMARY STATUS
                /
                EJECT
                ////////                                                        ////////
                /                                                                      /
                /       MODULE:         TDP42D                                         /
                /                       RELATIVE LINE NUMBER TO ABSOLUTE               /
                /                                                                      /
                /       FUNCTION:       THIS MODULE CONVERTS A RELATIVE LINE NUMBER TO /
                /                       AN ABSOLUTE LINE NUMBER                        /
                /                                                                      /
                /       FORM OF CALL:   JMS  I  ZKD42D                                 /
                /                                                                      /
                /       ENTRY PARAMETER: AC = RELATIVE LINE NUMBER FOR CONVERSION (0-77) /
                /                                                                      /
                /       EXIT PARAMETER: AC = ABSOLUTE LINE NUMBER (0-77)               /
                /                                                                      /
                ////////                                                        ////////
                /
```

```
42010  7401          1-1^2+7401                 /*1 VARIABLE LOCATIONS FOLLOW
42011  0000  TDP42D, .-.
42012  3007          DCA     ZWORK4             / SAVE RELATIVE LINE NUMBER
42013  6214          RDF
42014  1023          TAD     ZKCDI              / CONSTRUCT CDI FOR
42015  3222          DCA     DO42DX             /  RETURN TO CALLER
42016  1007          TAD     ZWORK4             / PICK UP RELATIVE LINE NUMBER
42017  1105          TAD     ZDCFLN             / TO RELATIVE LINE NUMBER ADD ABSOLUTE
42020  0061          AND     ZP0077             /  FIRST LINE NUMBER (MODULO 64)
42021  7401          1-1^2+7401                 /*1 VARIABLE LOCATIONS FOLLOW
42022  0000  DO42DX, 0
42023  5611          JMP  I  TDP42D             / RETURN TO CALLER WITH ANSWER IN AC
                     /
                     EJECT
                     ////////                                                        ////////
                     /                                                                      /
                     /         MODULE:        TDP42E                                        /
                     /                        ABSOLUTE LINE NUMBER TO RELATIVE              /
                     /                                                                      /
                     /         FUNCTION:      THIS MODULE CONVERTS AN ABSOLUTE LINE NUMBER TO /
                     /                        A RELATIVE LINE NUMBER                        /
                     /                                                                      /
                     /         FORM OF CALL:  JMS  I  ZKD42E                                /
                     /                                                                      /
                     /         ENTRY PARAMETER: AC = ABSOLUTE LINE NUMBER FOR CONVERSION (0-77) /
                     /                                                                      /
                     /         EXIT PARAMETER: AC = RELATIVE LINE NUMBER (0-77)             /
                     /                                                               ////////
                     ////////
                     /
42024  7401          1-1^2+7401                 /*1 VARIABLE LOCATIONS FOLLOW
42025  0000  TDP42E, .-.
42026  3007          DCA     ZWORK4             / SAVE ABSOLUTE LINE NUMBER
42027  6214          RDF
42030  1023          TAD     ZKCDI              / CONSTRUCT CDI FOR
42031  3240          DCA     DO42EX             /  RETURN TO CALLER
42032  1007          TAD     ZWORK4             / PICK UP ABSOLUTE LINE NUMBER
42033  7041          CMA IAC                    / FROM ABSOLUTE LINE NUMBER
42034  1105          TAD     ZDCFLN             /  SUBTRACT ABSOLUTE FIRST
42035  7041          CMA IAC                    /   LINE NUMBER
42036  0061          AND     ZP0077             /    (MODULO 64)
42037  7401          1-1^2+7401                 /*1 VARIABLE LOCATIONS FOLLOW
42040  0000  DO42EX, 0
42041  5625          JMP  I  TDP42E             / RETURN TO CALLER WITH ANSWER IN AC
                     /
                     EJECT
                     ////////                                                        ////////
                     /                                                                      /
                     /         MODULE:        TDP42B                                        /
                     /                        FIND POSITION IN DIALOGUE BUFFER              /
                     /                                                                      /
                     /         FUNCTION:      FINDS THE REQUESTED POSITION IN THE DIALOGUE  /
                     /                        BUFFERS                                       /
                     /                                                                      /
                     /         FORM OF CALL:  JMS  I  ZKD42B                                /
                     /                        AZKNOP:2                                      /
                     /                        WORD FOR BUFFER CDF                           /
                     /                        WORD FOR F.R.A. OF WORD CONTAINING CHAR       /
                     /                                                                      /
                     /         ENTRY PARAMETERS: AC = RELATIVE LINE NO / HEADLINE           /
                     /                        MQ = BEGINNING OF LINE / USER TEXT CHAR POSN / /
                     /                        CHAR OFFSET                                   /
                     /                                                                      /
                     /         EXIT PARAMETERS: AC = CHAR OFFSET WITHIN DIALOGUE BUFFER     /
                     /                        MQ = RELATIVE BUFFER NO                       /
                     /                                                                      /
                     ////////                                                        ////////
                     /
42042  7401          1-1^2+7401                 /*1 VARIABLE LOCATIONS FOLLOW
42043  0000  TDP42B, .-.
42044  3007          DCA     ZWORK4             / SAVE ENTRY PARAMETER (REL LINE NO / HEADLINE)
42045  6214          RDF
42046  1023          TAD     ZKCDI              / CONSTRUCT CDI FOR
42047  3360          DCA     DO42BX             /  RETURN TO CALLER
42050  1021          TAD     ZKCDF              / CONSTRUCT
42051  1103          TAD     ZDCDTP             /  BUFFERS START OF CHAIN CDF
42052  3254          DCA     .+2                /   AND STORE FOR EXECUTION
42053  7401          1-1^2+7401                 /*1 VARIABLE LOCATIONS FOLLOW
42054  0000          0                          / 1 = CDF TO BUFFER'S FIELD
42055  1104          TAD     ZDCSAD             / PICK UP BUFFER ADDRESS
42056  3004          DCA     ZWORK1             /  AND SAVE
                     /
42057  1007          TAD     ZWORK4             / TEST IF HEADLINE
42060  7700          SMA CLA                    /  POSN REQUIRED
42061  5270          JMP     DOBS34
                     /
42062  7701          ACL                        / CALCULATE DIALOGUE OFFSET
42063  1051          TAD     ZP0006             /  = CHAR OFFSET + 4 + 2
42064  3005          DCA     ZWORK2             /   AND SAVE
42065  7305          WP0002                     / SET RELATIVE BUFFER NO = 2
42066  3006          DCA     ZWORK3             /  AND SAVE
                     /
42067  5347          JMP     DOBF34
             DOBS34,
                     /
```

```
42070  7305              *P0002                   / CALCULATE ADDRESS OF LINE POINTER ENTRY
42071  1007              TAD     ZWORK4           /  = BUFFER ADDRESS + TABLE OFFSET (2)
42072  1104              TAD     ZDCSAD           /   + INDEX TO ENTRY
42073  3007              DCA     ZWORK4
42074  1407              TAD  I  ZWORK4           / PICK UP LINE POINTER ENTRY
42075  3007              DCA     ZWORK4           /  AND SAVE
42076  1007              TAD     ZWORK4           / ISOLATE RELATIVE BUFFER
42077  7002              BSW                      /  NO FROM LINE
42100  0054              AND     ZP0017           /   POINTER ENTRY
42101  3006              DCA     ZWORK3           /    AND SAVE
42102  1007              TAD     ZWORK4           / CALCULATE DIALOGUE OFFSET
42103  0061              AND     ZP0077           /  = 2 X WORD
42104  7104              CLL RAL                  /   DISPLACEMENT
42105  3005              DCA     ZWORK2           /    AND SAVE
                  /
42106  7701              ACL                      / TEST IF USER TEXT CHAR
42107  7450              SNA                      /  POSN REQUIRED
42110  5327              JMP     DOEF35
                  /
42111  1374              TAD     DOBP02           / INCREMENT DIALOGUE
42112  1005              TAD     ZWORK2           /  OFFSET BY 3 +
42113  3005              DCA     ZWORK2           /   OWNER STATUS (0/1)
42114  1007              TAD     ZWORK4           /    + USER TEXT
42115  7104              CLL RAL                  /     CHAR POSN
42116  7630              SZL CLA                  /      -1 AND
42117  2005              ISZ     ZWORK2           /       SAVE
                  /
42120  1005              TAD     ZWORK2           / TEST IF BUFFER OVERFLOW
42121  1072              TAD     ZP7600           /  (I.E. TEST IF DIALOGUE
42122  7510              SPA                      /   OFFSET > 127)
42123  5327              JMP     DOGF36
                  /
42124  1375              TAD     DOBP04           / DECREMENT DIALOGUE OFFSET
42125  3005              DCA     ZWORK2           /  BY 128 - 4
42126  2006              ISZ     ZWORK3           / INCREMENT RELATIVE BUFFER NO BY 1
                  /
                  /
                  DOGF36,
                  /
                  /
42127  7344       DOEF35, *M0002                  / SET LOOP COUNTER
42130  1006              TAD     ZWORK3           /  TO - (RELATIVE
42131  7040              CMA                      /   BUFFER NO
42132  3007              DCA     ZWORK4           /    - 1 - 1)
42133  2007       DOII37, ISZ    ZWORK4           / TEST IF END
42134  7410              SKP                      /  OF LOOP
42135  5347              JMP     DOIE37
                  /
42136  1021              TAD     ZKCDF            / CONSTRUCT
42137  1404              TAD  I  ZWORK1           /  BUFFER CDF
42140  3345              DCA     DOBCDF           /   AND STORE FOR EXECUTION
42141  2004              ISZ     ZWORK1           / POINT AT BUFFER ADDRESS
42142  1404              TAD  I  ZWORK1           / PICK UP BUFFER ADDRESS
42143  3004              DCA     ZWORK1           /  AND SAVE
42144  7401              1-1^2+7401               /*1 VARIABLE LOCATIONS FOLLOW
42145  0000       DOBCDF, 0                       / 1 - CDF TO BUFFER'S FIELD
                  /
42146  5333              JMP     DOII37
                  /
                  DOIE37,
                  /
                  /
                  DOBF34,
42147  1021              TAD     ZKCDF            / CONSTRUCT
42150  1404              TAD  I  ZWORK1           /  BUFFER CDF
42151  3007              DCA     ZWORK4           /   AND SAVE
42152  2004              ISZ     ZWORK1           / POINT AT BUFFER ADDRESS
42153  1005              TAD     ZWORK2           / CALCULATE F.R.A. OF WORD CONTAINING
42154  7110              CLL RAR                  /  CHAR = BUFFER ADDRESS +
42155  1404              TAD  I  ZWORK1           /   DIALOGUE OFFSET / 2
42156  3004              DCA     ZWORK1           /    AND SAVE
42157  7401              1-1^2+7401               /*1 VARIABLE LOCATIONS FOLLOW
42160  0000       DO428X, 0
42161  2243              ISZ     TOP428           / STEP OVER AZK30P
42162  1007              TAD     ZWORK4           / PICK UP BUFFER CDF
42163  3643              DCA  I  TOP428           /  AND SET RETURN PARAMETER 1
42164  2243              ISZ     TOP428           / STEP OVER 1ST RETURN PARAM
42165  1004              TAD     ZWORK1           / PICK UP F.R.A. OF WORD CONTAINING CHAR
42166  3643              DCA  I  TOP428           /  AND SET RETURN PARAMETER 2
42167  2243              ISZ     TOP428           / STEP OVER 2ND RETURN PARAM TO SET RETURN ADDR
42170  1006              TAD     ZWORK3           / SET MQ = RELATIVE
42171  7421              MQL                      /  BUFFER NO
42172  1005              TAD     ZWORK2           / SET AC = DIALOGUE OFFSET
42173  5643              JMP  I  TOP428           / RETURN TO CALLER WITH ANSWER IN AC AND MQ
                  /
                  /
42174  0002       DOBP02, 2                       / K - CONSTANT = 2
42175  0004       DOBP04, 4                       / K - CONSTANT = 4
                  /
42176  0000              ZBLOCK  .+200&7600-.     /*ZERO FILL PAGE
```

```
                        EJECT
                        ////////                                                                ////////
                        /                                                                              /
                        /         MODULE:         TDP427                                               /
                        /                         CALCULATE FIRST LINE UNSCROLLED                      /
                        /                                                                              /
                        /         FUNCTION:       CALCULATES THE RELATIVE LINE NO OF THE FIRST LINE    /
                        /                         WHICH WOULD APPEAR ON AN UNSCROLLED DISPLAY          /
                        /                                                                              /
                        /         FORM OF CALL:   JMS  I  ZKD427                                       /
                        /                                                                              /
                        /         EXIT PARAMETER: AC = FIRST LINE UNSCROLLED                           /
                        /                                                                              /
                        ////////                                                                ////////
                        /
      42200  7401               1=1^2+7401               /*1 VARIABLE LOCATIONS FOLLOW
      42201  0000       TDP427, .-.
                                                         / AC MUST = 0 ON ENTRY
                        /
      42202  1101               TAD     ZDCNOL           / TEST IF TEXT
      42203  7041               CMA IAC                  /  OVERFLOWS
      42204  1106               TAD     ZDCCLN           /   SCREEN
      42205  7001               IAC                      /    DISPLAY
      42206  7510               SPA                      /     AREA
                        /
      42207  7200               CLA                      / SET FIRST LINE UNSCROLLED = 0
                        /
                        /
      42210  5601               JMP  I  TDP427           / RETURN TO CALLER WITH ANSWER IN AC
                        /
                        EJECT
                        ////////                                                                ////////
                        /                                                                              /
                        /         MODULE:         TDP424                                               /
                        /                         REMEMBER DIALOGUE POSITION                           /
                        /                                                                              /
                        /         FUNCTION:       REMEMBERS THE CURRENT POSITION IN THE DIALOGUE       /
                        /                         BUFFERS SO THAT ANY LATER TEXT CAN SUBSEQUENTLY      /
                        /                         BE DISPLAYED                                         /
                        /                                                                              /
                        /         FORM OF CALL:   JMS  I  ZKD424                                       /
                        /                                                                              /
                        ////////                                                                ////////
                        /
      42211  7401               1=1^2+7401               /*1 VARIABLE LOCATIONS FOLLOW
      42212  0000       TDP424, .-.
      42213  6214               RDF                      / AC MUST = 0 ON ENTRY
      42214  1023               TAD     ZKCDI            / CONSTRUCT CDI FOR
      42215  3224               DCA     DD424X           /  RETURN TO CALLER
      42216  1106               TAD     ZDCCLN           / PICK UP CURRENT LINE NO
      42217  3227               DCA     DD4CLN           /  AND SAVE
      42220  1107               TAD     ZDCCCL           / CALCULATE NEXT FREE POSITION = 1 + NO
      42221  7001               IAC                      /  OF CHARS IN CURRENT LINE
      42222  3230               DCA     DD4NFP           /   AND SAVE
      42223  7401               1=1^2+7401               /*1 VARIABLE LOCATIONS FOLLOW
      42224  0000       DD424X, 0
      42225  5612               JMP  I  TDP424           / RETURN TO CALLER WITH AC = 0
                        /
                        /
      42226  7405               3=1^2+7401               /*3 VARIABLE LOCATIONS FOLLOW
      42227  0000       DD4CLN, 0                        / F - SAVED CURRENT LINE NO
      42230  0000       DD4NFP, 0                        / F - SAVED NEXT FREE POSITION IN CURRENT LINE
                        /
                        EJECT
                        ////////                                                                ////////
                        /                                                                              /
                        /         MODULE:         TDP425                                               /
                        /                         DISPLAY LATEST TEXT                                  /
                        /                                                                              /
                        /         FUNCTION:       DISPLAYS TEXT INPUT, RECEIVED OR GENERATED SINCE     /
                        /                         THE LATEST REMEMBERED CURRENT POSITION               /
                        /                                                                              /
                        /         FORM OF CALL:   JMS  I  ZKD425                                       /
                        /                                                                              /
                        /         ENTRY PARAMETER: AC = -1 REDISPLAY WHOLE DIALOGUE                    /
                        /                          AC = 0 NORMAL CALL                                  /
                        /                          AC = +1 INHIBIT UNSCROLL                            /
                        /                                                                              /
                        ////////                                                                ////////
                        /
      42231  0000       TDP425, .-.
      42232  3013               DCA     ZAUT03           / SAVE ENTRY PARAMETER
      42233  6214               RDF
      42234  1023               TAD     ZKCDI            / CONSTRUCT CDI FOR
      42235  3330               DCA     DD425X           /  RETURN TO CALLER
      42236  6241               CDF     40
                        /
      42237  1013               TAD     ZAUT03           / TEST IF WHOLE DIALOGUE
      42240  7750               SPA SNA CLA              /  TO BE REDISPLAYED
      42241  5255               JMP     DDC060
      42242  1227               TAD     DD4CLN           / OR TEST IF NEW TEXT
      42243  7041               CIA                      /  HAS BEEN ADDED
      42244  1106               TAD     ZDCCLN           / (A) TEST IF CURRENT
      42245  7640               SZA CLA                  /  LINE NO HAS CHANGED
```

```
42246  5255             JMP     DOC060
42247  7340             WM0001                  / (B) TEST IF
42250  1230             TAD     DO4GFP          /  NO OF CHARS
42251  7041             CIA                     /   IN CURRENT
42252  1107             TAD     ZDCCCL          /    LINE HAS
42253  7650             SNA CLA                 /     CHANGED
42254  5327             JMP     DOBF61
                 /
                 DOC060,
                 /
42255  1013             TAD     ZAUTO3          / TEST IF UNSCROLLING
42256  7740             SMA SZA CLA             /  NOT INHIBITED
42257  5263             JMP     DODF62
                 /
42260  1111             TAD     ZDCFLG          / CLEAR SCROLLED INDICATOR
42261  0332             AND     DO5SUF          /  AND UNDISPLAYED TEXT
42262  3111             DCA     ZDCFLG          /   INDICATOR
                 /
                 /
                 DODF62,
                 /
42263  4734             JMS  I  DO5ATD          / TEST IF DIALOGUE NOT DISPLAYED
42264  5273             JMP     DOG063
42265  1111             TAD     ZDCFLG          / OR TEST IF SCROLLED
42266  7700             SMA CLA                 /  INDICATOR SET
42267  5301             JMP     DOFS64
42270  1013             TAD     ZAUTO3          /   AND UNSCROLLING
42271  7750             SPA SNA CLA             /    INHIBITED
42272  5301             JMP     DOFS64
                 /
42273  1111      DOG063, TAD    ZDCFLG          / SET
42274  0335             AND     DO5MSK          /  UNDISPLAYED
42275  1336             TAD     DO5UTF          /   TEXT
42276  3111             DCA     ZDCFLG          /    INDICATOR
42277  4562             JMS  I  ZKD429          / UPDATE APPLICATION STATUS
                 /
42300  5327             JMP     DOFF64
                 DOFS64,
                 /
42301  4733             JMS  I  DO5ACU          / CALCULATE FIRST LINE UNSCROLLED
42302  3006             DCA     ZWORK3          /  AND SAVE
42303  1006             TAD     ZWORK3          / TEST IF ROLL UP
42304  7041             CIA                     /  REQUIRED (I.E.
42305  1110             TAD     ZDCFLD          /   FIRST LINE UNSCROLLED NOT
42306  7640             SZA CLA                 /    = FIRST LINE DISPLAYED
42307  5313             JMP     DOI065
42310  1013             TAD     ZAUTO3          / OR TEST IF WHOLE DIALOGUE
42311  7700             SMA CLA                 /  TO BE REDISPLAYED
42312  5317             JMP     DOHS66
                 /
42313  1006      DOI065, TAD    ZWORK3          / SET FIRST LINE DISPLAYED
42314  3110             DCA     ZDCFLD          /  = FIRST LINE UNSCROLLED
42315  4555             JMS  I  ZKD426          / REDISPLAY WHOLE CONVERSATION
                 /
42316  5327             JMP     DOHF66
                 DOHS66,
                 /
42317  4737             JMS  I  DO5AZC          / GET ZONE AND CUSOR ADDRESS
42320  7340             WM0001                  / SET CURSOR CONTROL
42321  3367             DCA     DO5CUF          /  NEGATIVE TO CONTINUE
42322  1230             TAD     DO4NFP          / SET MQ = SAVED NEXT
42323  7421             MQL                     /  FREE POSN,
42324  1227             TAD     DO4CLN          /   AC = SAVED CURRENT LINE NO
42325  4341             JMS     DO5426          / FIND POSN
42326  4355             JMS     DO5226          /  AND DISPLAY TEXT
                 /
                 /
                 DOHF66,
                 /
                 DOFF64,
                 /
                 /
                 DOBF61,
42327  7401             1-1^2+7401              /*1 VARIABLE LOCATIONS FOLLOW
42330  0000      DO425X, 0
42331  5631             JMP  I  TDP425          / RETURN TO CALLER WITH AC = 0
                 /
                 /
42332  2777      DO5SUF, 2777                   / K - CONSTANT = 2777
42333  2201      DO5ACU, TDP427                 / A - ADDR OF CALC 1ST LINE UNSCROLLED MODULE
42334  2661      DO5ATD, DO9TDD                 / A - ADDRESS OF TEST IF DIALOGUE DISPLAYED S/R
42335  6777      DO5MSK, 6777                   / K - CONSTANT = 6777
42336  1000      DO5UTF, 1000                   / K - CONSTANT = 1000
42337  0657      DO5AZC, DO5SZC                 / A - ADDR OF SET ZONE & CURSOR ADDR S/R
                 /
                 EJECT
                 /
                 /        SUBROUTINE:      DO5428
                 /                         INVOKE TDP428
                 /
                 /        ENTRY PARAMETERS: AC = LINE PARAM (REL LINE NO / HEADLINE)
                 /                          MQ = POSN PARAM (BEGINNING OF LINE / USER TEXT CHAR
                 /                          POSN / CHAR OFFSET)
                 /
```

```
                      /          EXIT PARAMETERS: MO = REG BUFFER NO
                      /
                      /
42340  7401                      1-1^2+7401                    /*1 VARIABLE LOCATIONS FOLLOW
42341  0000  D05428,  .-.                                      / V - RETURN ADDRESS
42342  4540                      JMS  I  ZKD428                / FIND POSITION IN DIALOGUE BUFFER
42343  7403                      2-1^2+7401                    /*2 VARIABLE LOCATIONS FOLLOW
42344  0000  D05CDF,  0                                        / G - BUFFER CDF
42345  0060  D05FRA,  0                                        / F - F.R.A. OF WORD WITHIN BUFFER CONT'G CHAR
42346  7010                      RAR                           / ISOLATE L.S. BIT OF CHAR OFFSET
42347  7204                      CLA RAL                       /  WITHIN DIALOGUE BUFFER,
42350  7041                      CMA IAC                       /   NEGATE
42351  3354                      DCA     D05HFI                /    AND SAVE
42352  5741                      JMP  I  D05428                / RETURN TO CALLER WITH AC = 0 AND ANSWER IN MO
                      /
                      /
42353  7403                      2-1^2+7401                    /*2 VARIABLE LOCATIONS FOLLOW
42354  0000  D05HFI,  0                                        / F - HALF WORD / FULL WORD INDICATOR
                      /
                      EJECT
                      /
                      /          SUBROUTINE:      D05226
                      /                           INVOKE TBP226
                      /
                      /
42355  0000  D05226,  .-.                                      / V - RETURN ADDRESS
                                                               / AC MUST = 0 ON ENTRY
42356  1344                      TAD     D05CDF                / PICK UP BUFFER CDF,
42357  0060                      AND     ZP0070                /  ISOLATE DF
42360  3371                      DCA     D05FLD                /   AND SET DATA FIELD
42361  1345                      TAD     D05FRA                / PICK UP F.R.A. OF WORD WITHIN BUFFER CONT'G
42362  3372                      DCA     D05ADD                /  CHAR AND SET DATA ADDRESS
42363  1354                      TAD     D05HFI                / SET AC = CONTROL VALUE (HALF WORD /
42364  6222                      CIF     20                    /  FULL WORD INDICATOR)
42365  4563                      JMS  I  ZKB226                /   AND DISPLAY 6 BIT PACKED STRING
42366  7407                      4-1^2+7401                    /*4 VARIABLE LOCATIONS FOLLOW
42367  0000  D05COR,  0                                        / F - CURSOR CONTROL
42370  0000  D05ZON,  0                                        / F - ZONE NUMBER
42371  0000  D05FLD,  0                                        / G - DATA FIELD
42372  0000  D05ADD,  0                                        / V - DATA ADDRESS
42373  5755                      JMP  I  D05226                / RETURN TO CALLER WITH AC = 0
                      /
42374  0000                      ZBLOCK  .+20067600-.          /*ZERO FILL PAGE
                      EJECT
                      ////////                                                                    ////////
                      /                                                                                  /
                      /          MODULE:          TDP429                                                 /
                      /                           UPDATE APPLICATION STATUS                              /
                      /                                                                                  /
                      /          FUNCTION:        BRINGS THE DIALOGUE HEADING LINE AND APPLICATION       /
                      /                           STATUS AREAS UP-TO-DATE IN STORAGE AND ON DISPLAY      /
                      /                                                                                  /
                      /          FORM OF CALL:    JMS  I  ZKD429                                         /
                      /                                                                                  /
                      ////////                                                                    ////////
                      /
42400  7401                      1-1^2+7401                    /*1 VARIABLE LOCATIONS FOLLOW
42401  0000  TDP429,  .-.
42402  6214                      RDF                           / AC MUST = 0 ON ENTRY
42403  1023                      TAD     ZKCDI                 / CONSTRUCT CDI FOR
42404  3322                      DCA     D0429X                /  RETURN TO CALLER
42405  6241                      CDF     40
42406  3014                      DCA     ZAUT04                / CLEAR UNRECOGNISED STATUS FLAG
42407  4743                      JMS  I  D09ASZ                / GET ZONE &CURSOR ADDRESS
42410  4747                      JMS  I  D09ADD                / DETERMINE DISPLAYED STATUS
42411  5222                      JMP     D0SS45                / NORMAL EXIT - RECOGNISED STATUS
                      /
42412  2014                      ISZ     ZAUT04                / SET UNRECOGNISED STATUS FLAG
42413  6214                      RDF                           / IDLE OR UNRECOGNISED STATUS
42414  1021                      TAD     ZKCDF
42415  3737                      DCA  I  D09ACD                / SET CDF FOR DESTRUCTIVE END OF TEXT
42416  1324                      TAD     D09ADA
42417  3740                      DCA  I  D09AFR                / SET F.R.A. FOR DESTRUCTIVE END OF TEXT
42420  3741                      DCA  I  D09AHF                / SET INDICATOR FOR DESTRUCTIVE END OF TEXT
                      /
42421  5245                      JMP     D0SF45
              D0SS45,
                      /
42422  7421                      MQL                           / SET MO = 0 (CHAR OFFSET),
42423  7040                      CMA                           /  AC NEGATIVE (HEADLINE)
42424  4742                      JMS  I  D09AFL                /   AND FIND START OF HEADING LINE POSN
42425  1327                      TAD     D09P26                / SET MO = 22 (OFFSET-1
42426  7421                      MQL                           /  WITHIN HEADING LINE),
42427  1050                      TAD     ZP0005                /   AC = 5 (NO OF WORDS TO BE MOVED)
42430  4750                      JMS  I  D09AMV                /    AND MOVE DISPLAYED STATUS TO HEADING LINE
                      /
42431  1111                      TAD     ZBCFLG                / TEST IF SCROLLED
42432  7710                      SPA CLA                       /  DIALOGUE
                      /
42433  7325                      *P0003                        / PICK UP ADDRESS-1 OF "SCROLL"
                      /
                      /
42434  1332                      TAD     D09ASP                /  OR PICK UP ADDRESS-1 OF SPACES
42435  3010                      DCA     ZAUT00                /   AND STORE IN AN A.I.R.
```

```
42436  1330          TAD     D09P34          / SET MQ = 28 (OFFSET-1
42437  7421          MQL                     /  WITHIN HEADING LINE),
42440  7325          *P0003                  /   AC = 3 (NO OF WORDS TO BE MOVED)
42441  4750          JMS  I  D09AMV          /    AND MOVE "SCROLL" / SPACES TO HEADING LINE
                /
42442  1745          TAD  I  D09AZN          / ADJUST ZONE NUMBER
42443  1326          TAD     D09P16          /
42444  3745          DCA  I  D09AZN          /
                /
                D0SE45,
                /
42445  4751          JMS  I  D09ATD          / TEST IF DIALOGUE DISPLAYED
42446  5273          JMP     D0VF47
                /
42447  4744     D0D048, JMS  I  D09ADT      / DISPLAY TEXT
                /
42450  1111          TAD     ZDCFLG          / TEST IF BELL
42451  7004          RAL                     /  CHARACTER TO
42452  7700          SMA CLA                 /   BE FLASHED
42453  5261          JMP     D0EF49
                /
42454  1333          TAD     D09FBL          / PICK UP FLASHING BELL CHARACTER
42455  3360          DCA     D09CHA          /  AND SET CONTROL BITS PLUS 7-BIT CHARACTER
42456  1060          TAD     ZP0070          / CALCULATE FLASHING BELL CHAR CURSOR
42457  1746          TAD  I  D09ACD          /  POSITION WITHIN HEADING LINE
42460  4354          JMS     D09222          /   AND FLASH BELL CHARACTER
                /
                /
                D0EF49,
                /
42461  1111          TAD     ZDCFLG          / TEST IF
42462  7006          RTL                     /  UNDISPLAYED
42463  7700          SMA CLA                 /   TEXT
42464  5273          JMP     D0GF50
                /
42465  7330          *M4000                  / ADD FLASHING BIT TO FIRST
42466  1012          TAD     ZAUT02          /  CHAR OF DISPLAYED STATUS
42467  3360          DCA     D09CHA          /
42470  1331          TAD     D09P56          / CALCULATE FLASHING STATUS CHAR CURSOR
42471  1746          TAD  I  D09ACD          /  POSITION WITHIN HEADING LINE
42472  4354          JMS     D09222          /   AND FLASH STATUS CHARACTER
                /
                /
                D0GF50,
                /
                /
                D0VF47,
                /
42473  1007          TAD     ZWORK4          / TEST IF CURRENT
42474  7640          SZA CLA                 /  MODE IS CN2
42475  5316          JMP     D0TF51
                /
                /
42476  1111          TAD     ZDCFLG          / TEST IF
42477  7006          RTL                     /  UNDISPLAYED
42500  7710          SPA CLA                 /   TEXT
                /
42501  7330          *M4000
                /
                /
42502  1012          TAD     ZAUT02          / ADD IN 7-BIT CHARACTER
42503  3360          DCA     D09CHA          /  AND SET CONTROL BITS PLUS 7-BIT CHARACTER
42504  1334          TAD     D09AST          / PICK UP CN2 STATUS CURSOR POSITION
42505  4354          JMS     D09222          /  AND DISPLAY STATUS CHARACTER
                /
42506  1111          TAD     ZDCFLG          / TEST IF BELL
42507  7004          RAL                     /  CHARACTER NOT TO
42510  7710          SPA CLA                 /   BE FLASHED
                /
42511  1336          TAD     D09IFB
                /
                /
42512  1057          TAD     ZP0040          / CONSTRUCT CORR DISPLAY OF CORR 7-BIT CHARACTER
42513  3360          DCA     D09CHA          /  AND SET CONTROL BITS PLUS 7-BIT CHARACTER
42514  1335          TAD     D09ABL          / PICK UP CN2 BELL CURSOR POSITION
42515  4354          JMS     D09222          /  AND DISPLAY CHARACTER
                /
                /
                D0TF51,
42516  4752          JMS  I  D09ACV          / CALL CURSOR VISIBILITY S/R
42517  1014          TAD     ZAUT04          / GET UNRECOGNISED STATUS FLAG
42520  7421          MQL                     / PASS BACK TO CALLER
42521  7401          1-1^2+7401              /*1 VARIABLE LOCATIONS FOLLOW
42522  0000     D0429X, 0
42523  5601          JMP  I  T0P429          / RETURN TO CALLER WITH AC = 0
                /
                /
42524  2525     D09ADX, D09DXT               / A - ADDRESS OF DESTRUCTIVE END OF TEXT
42525  3500     D09DXT, 3500                 / P - DESTRUCTIVE END OF TEXT + NULL
42526  0016     D09P16, 16                   / K - CONSTANT 16
42527  0026     D09P26, 26                   / K - CONSTANT = 22
42530  0034     D09P34, 34                   / K - CONSTANT = 28
42531  0056     D09P56, 56                   / K - CONSTANT = 46
42532  2624     D09ASP, D09SPS-1             / A - ADDRESS-1 OF SPACES
```

```
42533  4007  D09FBL, 4007                     / K = CONSTANT = FLASHING BELL CHARACTER
42534  3552  D09AST, 3552                     / K = CN2 STATUS (CURSOR) POSITION
42535  3553  D09ABL, 3553                     / K = CN2 BELL (CURSOR) POSITION
42536  3747  D09IFB, 3747                     / K = CONSTANT = 3747
42537  2344  D09ACD, D05CDF                   / A = ADDRESS OF BUFFER CDF
42540  2345  D09AFR, D05FRA                   / A = ADDR OF F.R.A. OF WORD IN BUFF CONT'G CHAR
42541  2354  D09AHF, D05HFI                   / A = ADDRESS OF HALF WORD / FULL WORD INDICATOR
42542  2341  D09AFP, D0542B                   / A = ADDRESS OF INVOKE TDP428 S/R
42543  0657  D09ASZ, D05SZC                   / A = ADDR OF SET ZONE NO AND START CURSOR POSN
42544  2355  D09ADT, D05226                   / A = ADDRESS OF INVOKE TBP226 S/R
42545  2370  D09AZN, D05ZON                   / A = ADDRESS OF ZONE NUMBER
42546  2367  D09ACU, D05CUR                   / A = ADDRESS OF CURSOR CONTROL
42547  2704  D09ADD, D09DDS                   / A = ADDRESS OF DETERMINE DISPLAYED STATUS S/R
42550  2634  D09AMV, D09MOV                   / A = ADDR OF MOVE A STRING TO HEADING LINE S/R
42551  2661  D09ATD, D09TDD                   / A = ADDRESS OF TEST IF DIALOGUE DISPLAYED S/R
42552  3031  D09ACV, D06CVS                   / A = ADDR OF CURSOR VISIBILITY S/R
             /
             EJECT
             /
             /        SUBROUTINE:      D09222
             /                         INVOKE TBP222
             /
             /        ENTRY PARAMETER: AC = CURSOR ADDRESS
             /
             /
42553  7401           1-1^2+7401                 /*1 VARIABLE LOCATIONS FOLLOW
42554  0000  D09222,  .-.                        / V = RETURN ADDRESS
42555  6222           CIF      20
42556  3561           JMS  I   ZKB222            / DISPLAY SINGLE CHARACTER
42557  7401           1-1^2+7401                 /*1 VARIABLE LOCATIONS FOLLOW
42560  0000  D09CHA,  0                          / F = CONTROL BITS PLUS 7-BIT CHARACTER
42561  5754           JMP  I   D09222            / RETURN TO CALLER WITH AC = 0
             /
             /
42562  0622  D09DSI,  TEXT    /FREE        /
42563  0505
42564  4040
42565  4040
42566  4040
42567  0000
       2567  *.-1
42567  2125           TEXT    /QUEUED      /
42570  0525
42571  0504
42572  4040
42573  4040
42574  0000
       2574  *.-1
42574  0225           TEXT    /BUSY        /
42575  2331
42576  4040
42577  4040
42600  4040
42601  0000
       2601  *.-1
42601  1706           TEXT    /OFF SYSTEM/
42602  0640
42603  2331
42604  2324
42605  0515
42606  0000
       2606  *.-1
42606  2305           TEXT    /SEND        /
42607  1604
42610  4040
42611  4040
42612  4040
42613  0000
       2613  *.-1
42613  2205           TEXT    /RECEIVE     /
42614  0305
42615  1126
42616  0540
42617  4040
42620  0000
       2620  *.-1
42620  0516           TEXT    /ENDED       /
42621  0405
42622  0440
42623  4040
42624  4040
42625  0000
       2625  *.-1
42625  4040  D09SPS,  TEXT    /     /
42626  4040
42627  4040
42630  0000
       2630  *.-1
42630  2303  D09SCR,  TEXT    /SCROLL/
42631  2217
42632  1414
42633  0000
       2633  *.-1
             /
```

```
                        EJECT
                        /
                        /       SUBROUTINE:     D09MOV
                        /                       MOVE A STRING OF WORDS TO THE HEADING LINE
                        /
                        /       ENTRY PARAMETERS: AC = NO OF WORDS TO BE MOVED
                        /                         MQ = OFFSET-1 WITHIN HEADING LINE
                        /
                        /
        42633   7401            1-1^2+7401              /*1 VARIABLE LOCATIONS FOLLOW
        42634   0000    D09MOV, .-.                     / V - RETURN ADDRESS
        42635   7040            CMA                     / SET LOOP COUNTER TO - NO
        42636   3004            DCA     ZWORK1          /  OF WORDS TO BE MOVED
        42637   7701            ACL                     / CALCULATE ADDRESS-1 OF DESTINATION
        42640   1657            TAD  I  D09BER          /  WITHIN HEADING LINE
        42641   3011            DCA     ZAUT01          /   AND STORE IN AN A.I.R.
        42642   1656            TAD  I  D09BDF          / SET HEADING LINE
        42643   3251            DCA     D09CDF          /  BUFFER CDF
                        /
        42644   2004    D08I46, ISZ     ZWORK1          / TEST IF END
        42645   7410            SKP                     /  OF LOOP
        42646   5255            JMP     D08E46
                        /
        42647   1410            TAD  I  ZAUT00          / PICK UP WORD FROM SOURCE STRING
        42650   7401            1-1^2+7401              /*1 VARIABLE LOCATIONS FOLLOW
        42651   0000    D09CDF, 0                       / I - CDF TO HEADING LINE BUFFER'S FIELD
        42652   3411            DCA  I  ZAUT01          / DEPOSIT WORD IN HEADING LINE
        42653   6241            CDF     40
                        /
        42654   5244            JMP     D08I46
                        /
        42655   5634    D08E46, JMP  I  D09MOV          / RETURN TO CALLER WITH AC = 0
                        /
                        /
        42656   2344    D09BDF, D05CDF                  / A - ADDRESS OF BUFFER CDF
        42657   2345    D09BER, D05ERA                  / A - ADDR OF E.R.A. OF WORD IN BUFF CONT'G CHAR
                        /
                        EJECT
                        /
                        /       SUBROUTINE:     D09TDD
                        /                       TEST IF DIALOGUE DISPLAYED
                        /
                        /       EXIT PARAMETER: RETURN IS TO JMS+1 IF NOT DISPLAYED OR
                        /                       RETURN IS TO JMS+2 IF DISPLAYED
                        /
                        /
        42660   7401            1-1^2+7401              /*1 VARIABLE LOCATIONS FOLLOW
        42661   0000    D09TDD, .-.                     / V - RETURN ADDRESS
                                                        / AC MUST = 0 ON ENTRY
        42662   6221            CDF     20
        42663   1525            TAD  I  D0ZDCM          / PICK UP DISPLAY MODE AND CURRENT MODE
        42664   6241            CDF     40
        42665   3007            DCA     ZWORK4          /  AND SAVE
        42666   1007            TAD     ZWORK4          / ISOLATE CURRENT
        42667   0061            AND     ZP0077          /  MODE
        42670   1042            TAD     ZM0005          / TEST IF CURRENT
        42671   7440            SZA                     /  MODE IS CN1
        42672   5300            JMP     D0Y055
        42673   1007            TAD     ZWORK4          / ISOLATE
        42674   0073            AND     ZP7700          /  DISPLAY
        42675   7002            BSW                     /   MODE
        42676   1042            TAD     ZM0005          / TEST IF DISPLAY
        42677   7650            SNA CLA                 /  MODE IS CN2
                        /
        42700   2261    D0Y055, ISZ     D09TDD          / INCREMENT RETURN ADDRESS
                        /
        42701   3007            DCA     ZWORK4          / SET INDICATOR TO 0 (CN2) OR -1 (CN1)
        42702   5661            JMP  I  D09TDD          / RETURN TO CALLER WITH AC = 0
                        /
                        /
                        /
                        EJECT
                        /
                        /       SUBROUTINE:     D09DDS
                        /                       DETERMINE DISPLAYED STATUS
                        /
                        /       EXIT PARAMETER: AC = PRIMARY STATUS
                        /
                        /
        42703   7401            1-1^2+7401              /*1 VARIABLE LOCATIONS FOLLOW
        42704   0000    D09DDS, .-.                     / V - RETURN ADDRESS
                                                        / AC MUST = 0 ON ENTRY
                        /
        42705   6251            CDF     50
        42706   1767            TAD  I  D09PRS          / PICK UP PRIMARY STATUS,
        42707   7041            CMA IAC                 /  NEGATE
        42710   3004            DCA     ZWORK1          /   AND SAVE
        42711   2004            ISZ     ZWORK1          / TEST IF PRIMARY STATUS IS "CONTACT"
        42712   5320            JMP     D0PS43
                        /
        42713   1770            TAD  I  D09CSP          / ISOLATE COUNTERPARTY
        42714   0052            AND     ZP0007          /  STATUS AT CONTACT
        42715   1077            TAD     ZP7777          / CALCULATE DISPLAYED
        42716   3006            DCA     ZWORK3          /  STATUS INDEX
                        /
```

```
42717  5350            JMP     DOPF43
42720  2004  DOPS43,   ISZ     ZWORK1
42721  2004            ISZ     ZWORK1          / TEST IF PRIMARY STATUS IS "DIALOGUE"
42722  5327            JMP     DOPT43
             /
42723  7307            WP0004                  / CALCULATE DISPLAYED
42724  1102            TAD     ZOCCOS          /  STATUS
42725  3006            DCA     ZWORK3          /   INDEX
             /
42726  5350            JMP     DOPF43
42727  7327  DOPT43,   WP0006
42730  3006            DCA     ZWORK3          / SET DISPLAYED STATUS INDEX FOR "ENDED"
42731  2004            ISZ     ZWORK1          / TEST IF PRIMARY STATUS IS "END CONTACT"
42732  7410            SKP
42733  5350            JMP     DOPF43
42734  2006            ISZ     ZWORK3          / SET DISPLAYED STATUS INDEX FOR "TRANSFER"
42735  2004            ISZ     ZWORK1          / TEST IF PRIMARY STATUS IS "TRANSFER
42736  7000            NOP
42737  2004            ISZ     ZWORK1          / TEST IF PRIMARY STATUS IS "TRANSFERRED"
42740  7000            NOP
42741  7327            WP0006
42742  3006            DCA     ZWORK3          / SET DISPLAYED STATUS INDEX FOR "ENDED"
42743  2004            ISZ     ZWORK1          / TEST IF PRIMARY STATUS IS "CONNECTION LOST"
42744  7410            SKP
42745  5350            JMP     DOPF43
42746  2006            ISZ     ZWORK3          / SET DISPLAYED STATUS
                                               /  INDEX FOR SPACES
42747  2304            ISZ     D09DDS          / TAKE ABNORMAL EXIT
             /
42750  1006  DOPF43,   TAD     ZWORK3          / MULTIPLY DISPLAYED
42751  7106            CLL RTL                 /  STATUS INDEX
42752  1006            TAD     ZWORK3          /   BY FIVE,
42753  1371            TAD     D09ADS          /    ADD IN ADDRESS-1 OF DISPLAYED STATUS TABLE
42754  3010            DCA     ZAUTO0          /     AND SAVE ADDRESS-1 OF DISPLAYED STATUS
42755  6241            CDF     40
42756  1010            TAD     ZAUTO0          / GET ADDR-1 OF DISPLAYED STATUS
42757  3012            DCA     ZAUTO2          /
42760  1412            TAD  I  ZAUTO2          / SAVE FIRST CHAR OF DISPLAYED STATUS
42761  0073            AND     ZP7700          /
42762  7500            SMA                     /
42763  7001            IAC                     /
42764  7002            BSW                     /
42765  3012            DCA     ZAUTO2          /
42766  5704            JMP  I  D09DDS          / RETURN TO CALLER WITH AC = 0
             /
             /
42767  0102  D09PRS, ZDCPRS                    / A - ADDRESS OF PRIMARY STATUS
42770  0111  D09CSP, ZDCCSP                    / A - ADDRESS OF COUNTERPARTY STATUS AT CONTACT
42771  2561  D09ADS, D09DST-1                  / A - ADDRESS-1 OF DISPLAYED STATUS TABLE
             /
42772  0000            ZBLOCK  .+2006&7600-.,  /*ZERO FILL PAGE
             EJECT
             ////////                                                          ////////
             /                                                                        /
             /         MODULE:          TDP426                                        /
             /                          DISPLAY WHOLE CONVERSATION                    /
             /                                                                        /
             /         FUNCTION:        REDISPLAYS THE DIALOGUE INCLUDING THE HEADING /
             /                          LINE AND APPLICATION STATUS AREA FROM CURRENT /
             /                          DISPLAY STATUS INFORMATION                    /
             /                                                                        /
             /         FORM OF CALL:    JMS  I  ZKD426                                /
             /                                                                        /
             ////////                                                          ////////
             /
43000  7401            1-1^2+7401              /*1 VARIABLE LOCATIONS FOLLOW
43001  0000  TDP426,   .-.
43002  6214            RDF                     / AC MUST = 0 ON ENTRY
43003  1023            TAD     ZKCDI           / CONSTRUCT CDI FOR
43004  3222            DCA     DO426X          /  RETURN TO CALLER
43005  6241            CDF     40
43006  4562            JMS  I  ZKD429          / UPDATE APPLICATION STATUS
43007  7521            SWP                     / GET RETURNED FLAG/CLEAR MQ
43010  7640            SZA CLA                 / UNRECOGNISED STATUS FOUND ?
43011  5222            JMP     DO426X          / YES - EXIT
43012  1110            TAD     ZDCFLD          /  AC = FIRST LINE DISPLAYED
43013  4624            JMS  I  DO6AFP          /   AND FIND DISPLAYED POSN
43014  4627            JMS  I  DO6ASZ          / GET ZONE & CURSOR ADDRESS
43015  1625            TAD  I  DO6ACR          / SET CURSOR CONTROL
43016  1063            TAD     ZP0120          /  TO START OF DIALOGUE
43017  3625            DCA  I  DO6ACR          /   DISPLAY AREA
43020  4626            JMS  I  DO6ADT          / DISPLAY TEXT
43021  7401            1-1^2+7401              /*1 VARIABLE LOCATIONS FOLLOW
43022  0000  DO426X,   0
43023  5601            JMP  I  TDP426          / RETURN TO CALLER WITH AC = 0
             /
             /
43024  2341  DO6AFP, DO5428                    / A - ADDRESS OF INVOKE TDP428 S/R
43025  2367  DO6ACR, DO5CUR                    / A - ADDRESS OF CURSOR CONTROL
43026  2355  DO6ADT, DO5226                    / A - ADDRESS OF INVOKE TDP226 S/R
43027  0657  DO6ASZ, DO5SZC                    / A - ADDR OF GET ZONE & CURSOR ADDR S/R
             /
```

```
                       EJECT
                       /
                       /        SUBROUTINE:      D06CVS
                       /                         INVOKE TBP221
                       /
                       /
43030  7401                     1-1^2+7401                 /*1 VARIABLE LOCATIONS FOLLOW
43031  0000            D06CVS, .-.                         / V - RETURN ADDRESS
                                                           / AC MUST = 0 ON ENTRY
43032  4535                     JMS  I  ZKD426             / TEST IF PRIMARY
43033  7640                     SZA CLA                    /  STATUS IS DIALOGUE
43034  5247                     JMP     D06LAB
43035  4653                     JMS  I  D06ATD             / TEST IF DIALOGUE DISPLAYED
43036  5247                     JMP     D06LAB
43037  1111                     TAD     ZDCFLG             / TEST IF UNSCROLLED
43040  7710                     SPA CLA                    /  DISPLAY
43041  5247                     JMP     D06LAB
43042  1115                     TAD     ZDCPSC             / TEST IF PRINT
43043  7710                     SPA CLA                    /  NOT DEMANDED
43044  5247                     JMP     D06LAB
43045  1102                     TAD     ZDCCOS             / SET ENTRY PARAM FOR TBP221 = ZDCCOS
43046  7410                     SKP
43047  7301            D06LAB, WP0001                      / SET ENTRY PARAM FOR TBP221 = 1
43050  6222                     CIF     20                 /
43051  4560                     JMS  I  ZKB221             / DISPLAY CURSOR
43052  5631                     JMP  I  D06CVS             / RETURN TO CALLER WITH AC = 0
                       /
                       /
43053  2661            D06ATD, D09TDD                      / A - ADDRESS OF TEST IF DIALOGUE DISPLAYED S/R
                       /
                       /====================================================
                       /=                                                  =
                       /= - MODULE:     TDP441                             =
                       /=               TRANSMIT FROM DIALOGUE BUFFERS     =
                       /=                                                  =
                       /= - FUNCTION:                                      =
                       /=               TRANSMITS THE LATEST TEXT FROM THE =
                       /=               DIALOGUE BUFFERS                   =
                       /=                                                  =
                       /= - FORM OF CALL:                                  =
                       /=               JMS      TDP441                    =
                       /=                                                  =
                       /====================================================
43054  7401                     1-1^2+7401                 /*1 VARIABLE LOCATIONS FOLLOW
43055  0000            TDP441, .-.
43056  3337                     DCA     D01CCI             / SAVE CONTROL CHANGE INDICATOR
43057  6214                     RDF                        /
43060  1023                     TAD     ZKCDI              /
43061  3331                     DCA     D01CDI             / SAVE RETURN TO CALLER'S FIELD INSTR.
                                                           /
43062  6241                     CDF     40                 /
43063  4530                     JMS  I  ZKD511             / GO GET A BUFFER AND SET INITIAL VALUES
43064  0005                     5                          / INITIAL RECORD LENGTH
43065  0304                     304                        / RECORD TYPE
43066  0005                     5                          / LENGTH NON PACKED
43067  7777                     -1                         / TERMINATOR
                                                           /
43070  1106                     TAD     ZDCCLN             / GET RELATIVE LINE NUMBER
43071  4733                     JMS  I  D01420             / CALCULATE ABSOLUTE LINE NO.
43072  4531                     JMS  I  ZKD512             / SET UP CONTROL INDICATOR IN RECORD
43073  4531                     JMS  I  ZKD512             / SET INITIAL TEXT SEQUENCE "    "
                                                           / *** BASIC TEXT MESSAGE SET UP ***
                                                           /
43074  1050                     TAD     ZP0005             / SET UP LOCAL RECORD LENGTH
43075  3017                     DCA     ZAUT07             /
43076  1012                     TAD     ZAUT02             / GET POINTER WITHIN RECORD
43077  1042                     TAD     ZM0005             / MOVE IT BACK TO POINT TO RECORD
43100  3340                     DCA     D01PTR             /   LENGTH AND SAVE IT LOCALLY
                                                           /
43101  1102                     TAD     ZDCCOS             / GET CONTROL STATUS
43102  7640                     SZA CLA                    / STATUS = SEND ?
43103  5321                     JMP     D01010             / NO - LEAVE TEXT SEQUENCE CLEAR
43104  1077                     TAD     ZP7777             / YES - RESET RECORD POINTER
43105  1012                     TAD     ZAUT02             /  IN ORDER TO UPDATE TEXT SEQUENCE
43106  3012                     DCA     ZAUT02             /
43107  1112                     TAD     ZDCTXS             / GET TEXT SEQUENCE
43110  7001                     IAC                        / INCREMENT BY ONE
43111  0067                     AND     ZP0377             / MASKING OUT OVERFLOW IF ANY
43112  3112                     DCA     ZDCTXS             / SAVE NEW TEXT SEQUENCE
43113  1112                     TAD     ZDCTXS             /
43114  4531                     JMS  I  ZKD512             / AND PUT IT IN THE RECORD
43115  4734                     JMS  I  D01448             / GO AND TRANSFER UNTRANSMITTED CHAR.S
43116  1337                     TAD     D01CCI             / GET CONTROL CHANGE VALUE
43117  7640                     SZA CLA                    / CONTROL TO CHANGE ?
43120  4735                     JMS  I  D01442             / YES - RELINQUISH CONTROL
                                                           /
43121  4342            D01010, JMS      TDP449             / SEND THE TEXT MESSAGE
43122  1337                     TAD     D01CCI             / GET PORT NO. HELD IN LOCAL WORK AREA
43123  1053                     TAD     ZP0010             / ADD IN CONSTANT GIVING REQD. ECB NO.
                                                           /
43124  6002                     IOF                        /
43125  6202                     CIF     0                  /
43126  4432                     JMS  I  ZKA323             / SET UP A NEW WAIT FOR 20 SECONDS
43127  6001                     ION                        /
                                                           /
```

```
43130  7401          1-1^2+7401          /*1 VARIABLE LOCATIONS FOLLOW
43131  0000  D01CD1, 0                   /
43132  5655          JMP  I  TDP441      / EXIT
43133  2011  D01420, TDP420              / LINK TO CALCULATE ABSOLUTE LINE NO.
43134  3225  D01448, TDP448              / LINK TO TRANSFER CHARACTERS RTW
43135  3201  D01442, TDP442              / LINK TO RELINQUISH CONTROL
43136  7403          2-1^2+7401          /*2 VARIABLE LOCATIONS FOLLOW
43137  0000  D01CCI, 0                   / CONTROL CHANGE INDICATOR / PORT NUMBER
43140  0000  D01PTR, 0                   / LOCAL POINTER TO RECORD LENGTH
             /================================================
             /=                                              =
             /= - MODULE:    TDP449                          =
             /=              SEND TEXT MESSAGE               =
             /=                                              =
             /= - FUNCTION:                                  =
             /=              SENDS THE TEXT MESSAGE AND UPDATES =
             /=              STATISTICS                      =
             /=                                              =
             /= - FORM OF CALL:                              =
             /=              JMS     TDP449                  =
             /=                                              =
             /================================================
43141  7401          1-1^2+7401          /*1 VARIABLE LOCATIONS FOLLOW
43142  0000  TDP449, .-.
43143  2120          ISZ     ZDCPPS      / INCREMENT PACKET COUNT
43144  7000          NOP                 / SAFEGUARD FOR WRAP-ROUND COUNT
                                         /
43145  1017          TAD     ZA0107      / GET RECORD LENGTH AND SUBTRACT FROM IT
43146  1042          TAD     Z00005      /  THE LENGTH OF NON PACKED DATA
43147  1337          TAD     D01CCI      / ALSO CONSIDER CONTROL CHANGE INDICATOR
43150  7450          SNA                 / NO. OF TEXT CHARS = 0 ?
43151  5364          JMP     D09010      / YES - THEN GO SEND MESSAGE
43152  1117          TAD     ZDCCHS      / ADD NO. OF TEXT CHARS. IN THE
43153  3117          DCA     ZDCCHS      / RECORD TO THE CHAR. COUNT
43154  1111          TAD     ZDCFLG      / GET FLAGS
43155  7106          CLL RTL             / GET BELL FLASH INDICATOR
43156  7620          SNL CLA             / BELL FLASH SET ?
43157  5364          JMP     D09010      / NO - THEN JUST SEND MESSAGE
43160  7352          WK5777              / YES - SET UP BELL MASK AND
43161  0111          AND     ZDCFLG      / CLEAR BELL FLASH INDICATOR
43162  3111          DCA     ZDCFLG      /
                                         /
43163  4562          JMS  I  ZK0429      / REDISPLAY UPDATED HEADING
                                         / AND APPLICATION STATUS
43164  6252  D09010, CIF     50          /
43165  4570          JMS  I  ZKD345      / CALCULATE PORT NUMBER
43166  3337          DCA     D01CCI      / HOLD IN LOCAL WORK AREA
43167  1337          TAD     D01CCI      / GET PORT NO. BACK
43170  7421          MQL                 /
43171  1017          TAD     ZA0107      / GET SUM OF APPLICATION RECORD LENGTH
43172  4532          JMS  I  ZK0513      / SEND OFF TRANSMISSION BUFFER
                                         /
43173  5742          JMP  I  TDP449      / RETURN
43174  0000          ZBLOCK  .+20067600-.  /*ZERO FILL PAGE
             /=====================================================
             /=                                                   =
             /= - MODULE:   TDP442                                =
             /=             RELINQUISH CONTROL                    =
             /=                                                   =
             /= - FUNCTION:                                       =
             /=             TAKES APPROPRIATE STEPS TO CHANGE FROM =
             /=             BEING THE SENDER TO BEING THE RECEIVER =
             /=             OF DIALOGUE                           =
             /=                                                   =
             /= - FORM OF CALL:                                   =
             /=             JMS      TDP442                       =
             /=                                                   =
             /=====================================================
43200  7401          1-1^2+7401          /*1 VARIABLE LOCATIONS FOLLOW
43201  0000  TDP442, .-.
                                         /
43202  4570          JMS  I  ZKD424      / REMEMBER CURRENT POSITION
                                         /
43203  7001          IAC                 / CHANGE CONTROL STATUS
43204  3102          DCA     ZDCCOS      /  TO RECEIVE
                                         /
43205  3112          DCA     ZDCTXS      / ZEROISE TEXT SEQUENCE
                                         /
43206  4562          JMS  I  ZK0429      / UPDATE CONVERSATION STATUS AND
                                         /  APPLICATION STATUS
43207  4552          JMS  I  ZK0421      / ADD A NEWLINE TO THE DIALOGUE BUFFERS
                                         /
43210  1104          TAD     ZDCCLN      / GET LINE NUMBER
43211  4623          JMS  I  D02420      / CONVERT TO ABSOLUTE
43212  7421          MQL                 / HOLD TEMPORARILY
43213  7325          WP0003              /
43214  1771          TAD  I  D08LPT      / SET UP POINTER INTO RECORD
43215  3012          DCA     ZA0102      /
43216  1065          TAD     Z00200      / GET CONTROL CHANGE MASK
```

```
43217  7501           MQA                   / SET CONTROL CHANGE BIT
43220  4531           JMS  I  ZKD512        / SAVE IN RECORD
                                            /
43221  4577           JMS  I  ZKD425        / DISPLAY THE LATEST TEXT
                                            /
43222  5601           JMP  I  TDP442        / EXIT

43223  2011   DQ2420, TDP420                / LINK TO CALCULATE ABSOLUTE LINE NO.
              /=======================================================
              /=                                                     =
              /= - MODULE:      TDP448                               =
              /=                TRANSFER CHARACTERS FROM DIALOGUE TO  =
              /=                 TRANSMIT BUFFER                     =
              /=                                                     =
              /= - FUNCTION:                                         =
              /=                TRANSFERS UNTRANSMITTED TEXT FROM THE =
              /=                DIALOGUE BUFFERS TO THE TEXT RECORD  =
              /=                BUFFER                               =
              /=                                                     =
              /= - FORM OF CALL:                                     =
              /=                JMS      TDP448                      =
              /=                                                     =
              /=======================================================

43224  7401           1=1^2+7401            /*1 VARIABLE LOCATIONS FOLLOW
43225  0000   TDP448, .-.
                                            / RESET RIGHT OR LEFT HAND INDICATOR
43226  3341           DCA     DQ8THC        /  FOR TRANSMISSION BUFFER
                                            /
43227  1114           TAD     ZDCLCH        / GET THE COLUMN OF THE FIRST
43230  0061           AND     ZP0077        /  UNTRANSMITTED CHARACTER
43231  3343           DCA     DQ8COL        /
43232  1114           TAD     ZDCLCH        / GET THE LINE OF THE FIRST
43233  7002           BSW                   /  UNTRANSMITTED CHARACTER
43234  0061           AND     ZP0077        /
43235  3344           DCA     DQ8LIN        /
                                            /
43236  1343   DQ8010, TAD     DQ8COL        / SET UP COLUMN
43237  7421           MQL                   /
43240  1344           TAD     DQ8LIN        / SET UP LINE
43241  4540           JMS  I  ZKD428        / CALL FIND POSITION IN DIALOGUE BUFFER
43242  7403           2=1^2+7401            /*2 VARIABLE LOCATIONS FOLLOW
43243  0000   DQ8DBF, 0                     / CDF TO DIALOGUE BUFFER (RETURNED)
43244  0000   DQ8DBA, 0                     / EBA OF DIALOGUE BUFFER (RETURNED)
                                            /
                                            / SET UP RIGHT OR LEFT HAND
43245  3342           DCA     DQ8DBC        /  CHARACTER INDICATOR
                                            /
43246  1243           TAD     DQ8DBF        / SET UP CDF TO DIALOGUE BUFFER
43247  3251           DCA     DQ8CFD        /
43250  7401           1=1^2+7401            /*1 VARIABLE LOCATIONS FOLLOW
43251  0000   DQ8CFD, 0                     / INTO DIALOGUE BUFFER'S FIELD
                                            /
43252  1342           TAD     DQ8DBC        / GET CHARACTER INDICATOR
43253  7110           CLL RAR               /
43254  7200           CLA                   /
43255  1644           TAD  I  DQ8DBA        / GET WORD FROM DIALOGUE BUFFER
43256  6241           CDF     40            /
43257  7420           SNL                   /
43260  7002           BSW                   / GET REQUIRED CHARACTER IN BOTTOM
43261  0061           AND     ZP0077        /  6-BITS AND MASK OUT OTHER 6-BITS
43262  2343           ISZ     DQ8COL        / INCREMENT COLUMN NUMBER
                                            /
43263  1372           TAD     DQ8P36        / GET NEWLINE CODE
43264  7440           SZA                   / CHARACTER = DEST EOL ?
43265  5273           JMP     DQ8030        / NO - GO TO NEXT TEST
43266  4346   DQ8020, JMS     DQ8060        / YES - GO STORE CHAR IN TRANSMIT BUFFER
43267  7001           IAC                   /
43270  3343           DCA     DQ8COL        / SET UP NEXT COLUMN NUMBER
43271  2344           ISZ     DQ8LIN        / SET UP NEXT LINE NUMBER
43272  5236           JMP     DQ8010        / GO REPEAT LOOP FOR NEXT CHARACTER
                                            /
43273  7001   DQ8030, IAC                   /
43274  7440           SZA                   / CHARACTER = DEST END OF TEXT ?
43275  5305           JMP     DQ8035        / NO - GO TO NEXT TEST
43276  1341           TAD     DQ8THC        / YES - GET LEFT OR RIGHT HAND
43277  7110           CLL RAR               /  CHARACTER STORAGE INDICATOR
43300  7620           SNL CLA               / ALL CHARACTERS MOVED FROM TEMP STORE ?
43301  5325           JMP     DQ8050        / YES - GO TO END PROCESSING
43302  1345           TAD     DQ8CHR        / NO - GET LAST CHARACTER + NULL
43303  4531           JMS  I  ZKD512        / STORE IN RECORD
43304  5325           JMP     DQ8050        / GO TO END PROCESSING
                                            /
43305  7001   DQ8035, IAC                   /
43306  7450           SNA                   / CHARACTER = DEST TAB ?
43307  5266           JMP     DQ8020        / REPLACE DEST TAB CHARACTER
                                            /  WITH DEST END OF LINE CHARACTER
                                            /
43310  1374   DQ8040, TAD     DQ8M02        /
43311  4346           JMS     DQ8060        / GO STORE ORDINARY CHARACTER
43312  2342           ISZ     DQ8DBC        / INCREMENT CHARACTER INDICATOR
43313  1342           TAD     DQ8DBC        / GET CHARACTER INDICATOR
43314  7110           CLL RAR               /
```

```
43315  7630           SZL CLA              / DONE ALL CHAR.S IN WORD ?
43316  5251           JMP     DQ8CFD       / NO - REPEAT LOOP
43317  2244           ISZ     DQ8DBA       / POINT TO NEXT WORD IN DIALOGUE BUFFER
43320  1244           TAD     DQ8DBA       /
43321  0061           AND     ZP0077       /
43322  7640           SZA CLA              / AT END OF BUFFER ?
43323  5251           JMP     DQ8CFD       / NO - PROCESS NEXT WORD
43324  5236           JMP     DQ8010       / YES - LINK TO NEXT BUFFER
                                           /
43325  1771  DQ8050, TAD  I  DQ8LPT       / GET LOCAL POINTER TO RECORD LENGTH
43326  3012           DCA     ZAUT02       /
43327  1017           TAD     ZAUT07       / GET NEW RECORD LENGTH
43330  4531           JMS  I  ZKD512       / AND SAVE IN RECORD
                                           /

43331  1106           TAD     ZOCCLS       / SET THE FIRST UNTRANSMITTED
43332  7002           BSW                  /  CHARACTER POINTER EQUAL TO
43333  1107           TAD     ZOCCCL       /  THE NEXT FREE POSITION
43334  7001           IAC                  /
43335  3114           DCA     ZOCLCH       /
43336  3113           DCA     ZOCCLF       / ZEROISE NO. OF CHARS SINCE LAST
                                           /  TRANSMISSION
                                           /
43337  5625           JMP  I  TDP448       / EXIT
                                           /
43340  7413           6*1^2+7401           /*6 VARIABLE LOCATIONS FOLLOW
43341  0000  DQ8TBC, 0                     / TRANSMIT BUFFER CHAR. INDICATOR
43342  0000  DQ8DBC, 0                     / DIALOGUE BUFFER CHAR. INDICATOR
43343  0000  DQ8COL, 0                     / COLUMN NUMBER WITHIN DIALOGUE BUFFER
43344  0000  DQ8LIN, 0                     / LINE NUMBER WITHIN DIALOGUE BUFFER
43345  0000  DQ8CHR, 0                     / TEMPORARY CHARACTER STORE

43346  0000  DQ8060, .-.                   / STORE A CHARACTER ROUTINE
43347  1373           TAD     DQ8P36       / RESET INPUT CHAR TO ORIGINAL VALUE
43350  7421           MQL                  / HOLD TEMPORARILY
43351  1341           TAD     DQ8TBC       / SET UP LEFT OR RIGHT HAND
43352  7110           CLL RAR              /  CHARACTER STORAGE INDICATOR
43353  7200           CLA                  /
43354  7701           ACL                  / GET CHARACTER BACK
43355  7420           SNL                  / CHAR TO GO IN LEFT OR RIGHT HAND SIDE ?
43356  7002           BSW                  / - LEFT HAND SIDE
43357  7430           SZL                  / CHAR TO BE ADDED IN FROM TEMP. STORE ?
43360  1345           TAD     DQ8CHR       / YES - CHAR IN RIGHT HAND SIDE
43361  3345           DCA     DQ8CHR       / STORE THE WORD TEMPORARILY
43362  2017           ISZ     ZAUT07       / INCREMENT RECORD LENGTH
43363  2341           ISZ     DQ8TBC       / INCREMENT CHARACTER INDICATOR
43364  7420           SNL                  / BOTH BYTES OF TEMP STORE FILLED ?
43365  5746           JMP  I  DQ8060       / NO - GO GET NEXT BYTE
43366  1345           TAD     DQ8CHR       / GET WORD WITH 2 CHAR. BYTES
43367  4531           JMS  I  ZKD512       / STORE BYTES IN TEXT RECORD
                                           /
43370  5746           JMP  I  DQ8060       / EXIT

43371  3140  DQ8LPT, DQ1PTR                / LINK TO LOCAL RECORD LENGTH POINTER
43372  7742  DQ8M36, -36                   / -VE CODE FOR DEST END OF LINE
43373  0036  DQ8P36, 36                    / +VE CODE FOR DEST END OF LINE
43374  7776  DQ8M02, -2                    / CONSTANT

43375  0000           ZBLOCK  .+200&7600-. /*ZERO FILL PAGE
       3400  DQ8END=.

S
AB5251 1733   DOCCHA 0770   DOIE51 2516   DQ2M50 1364
ACL    7701   DOCF33 0643   DOI137 2133   DQ2M60 1362
AKSILC 1557   DOCF04 0741   DOIK13 1164   DQ2TPD 1116
AKSILI 1555   DOC133 0630   DOIPRT 1165   DQ2TWP 1126
AKSILO 1556   DOCLAB 0756   DQ1065 2313   DQ222L 1105
AQAKPN 6411   DOCL11 1102   DOI010 1153   DQ3CDF 1655
AQAKTP 0015   DOCL19 1103   DOI020 1160   DQ3CDR 1675
AQDPPN 6403   DOC025 1221   DOJF30 1356   DQ3CDW 1726
AQDPTP 0016   DOC060 2255   DOKF03 1026   DQ3CHA 1755
AQPRWM 0177   DOCRBA 0772   DOKF07 1040   DQ3CHR 1674
AQPRTY 0200   DOCRCB 1051   DOKQ31 1345   DQ3CHW 1717
AQQIAS 0144   DOCSBA 0771   DOLF32 1356   DQ3DTA 1754
AQQRB1 5601   DOCSCB 1021   DONF38 1356   DQ3FRA 1656
AQQRB2 5704   DOC011 1100   DOPF43 2750   DQ3NFP 1646
AQQRB3 6143   DOC019 1101   DOPS43 2720   DQ3PND 1751
AQQRB4 6246   DOC421 0773   DOPT43 2727   DQ3SCA 1753
AQQTB1 7475   DODF15 0524   DOSF45 2445   DQ4CLW 2227
AQQTB2 7634   DODF21 1712   DOSS45 2422   DQ4NFP 2230
AQSOH  0001   DODF26 1232   DOTF03 1056   DQ42AX 0430
AQ36SP 7157   DODF62 2263   DOTF07 1070   DQ42BX 2160
BFVAWT 6232   DOD048 2447   DOVF47 2473   DQ42CX 0766
BLTYPF 4402   DODS21 1707   DOY055 2700   DQ42DX 2022
BLZCCN 0131   DOD010 0345   DOZALM 0126   DQ42EX 2040
BLZPRA 0134   DOD020 0344   DOZDCM 0125   DQ42FX 0653
BLZPRO 0133   DOD030 0453   DOZDFS 0127   DQ421A 0572
BLZPRT 0126   DOEF35 2127   DOZPON 0124   DQ42SF 0764
BRVWFG 5207   DOEF49 2161   DQ1ADN 1567   DQ421X 1516
CAM    7621   DOFCDF 0641   DQ1APS 1570   DQ422X 1360
CDI    6203   DOFDFP 0612   DQ1ATK 1566   DQ423X 1643
DL16SA 4136   DOFOTP 0655   DQ1CDF 1547   DQ424X 2224
DM5FRA 0340   DOFFRA 0611   DQ1DFC 1501   DQ425X 2330
DM6CDF 0350   DOFF27 1312   DQ1FRA 1550   DQ426X 3022
DNABFF 0151   DOFF64 2327   DQ1MAK 1562   DQ428X 0543
```

| | | | | | | | |
|---|---|---|---|---|---|---|---|
| DNHW1A | 0145 | D0FLAD | 0570 | D01MHS | 1563 | D0429X | 2522 |
| DNHW1B | 0146 | D0FR27 | 1256 | D01PDN | 1565 | D05ACR | 0707 |
| DNNCHS | 0144 | D0FS64 | 2301 | D01PHS | 1571 | D05ACU | 2333 |
| DNSPTF | 0150 | D0GF19 | 1512 | D01PTN | 1561 | D05ADD | 2372 |
| DN15PA | 0147 | D0GF23 | 1747 | D01P65 | 1564 | D05ATD | 2334 |
| D0AEXD | 0433 | D0GF28 | 1312 | D01TAK | 1575 | D05AZC | 2337 |
| D0BCDF | 2145 | D0GF36 | 2127 | D01THL | 1521 | D05AZN | 0706 |
| D0BE14 | 0533 | D0GF50 | 2473 | D01TXA | 1557 | D05CDF | 2344 |
| D0BE20 | 1637 | D0GPRS | 2007 | D0142B | 1544 | D05CUR | 2367 |
| D0BE46 | 2655 | D0G063 | 2273 | D01423 | 1553 | D05FLD | 2371 |
| D0BF17 | 1435 | D0GR28 | 1300 | D02AGB | 1370 | D05FRA | 2345 |
| D0BF24 | 1225 | D0GS23 | 1741 | D02ADM | 1372 | D05HFT | 2354 |
| D0BF34 | 2147 | D0HDBF | 1770 | D02APD | 1366 | D05MSK | 2335 |
| D0BF61 | 2327 | D0HF40 | 0702 | D02ASM | 1114 | D05MMC | 0704 |
| D0BI14 | 0502 | D0HF66 | 2327 | D02ATH | 1363 | D05SHC | 0705 |
| D0BI20 | 1630 | D0HS66 | 2317 | D02A*P | 1367 | D05SUF | 2332 |
| D0BI46 | 2644 | D0HTMP | 1772 | D02CDF | 1240 | D05SZC | 0657 |
| D0BP02 | 2174 | D0IDUA | 1166 | D02CHD | 1375 | D05UTF | 2336 |
| D0BP04 | 2175 | D0IE37 | 2147 | D02CVS | 1373 | D05ZON | 2370 |
| D0BS34 | 2070 | D0IFAG | 0571 | D02FRA | 1241 | D05226 | 2355 |
| D0CACB | 1017 | D0IFLG | 1167 | D02MMD | 1365 | D05428 | 2341 |
| D0CCAB | 1001 | D0IF29 | 1356 | D02M07 | 1371 | D06ACR | 3025 |
| D06ADT | 3026 | D01010 | 3121 | FCP110 | 0010 | TAP611 | 1755 |
| D06AFP | 3024 | D01420 | 3133 | FCP210 | 0010 | TAP612 | 1765 |
| D06ASZ | 3027 | D01442 | 3135 | FCP310 | 0010 | TAR417 | 0400 |
| D06ATD | 3053 | D01448 | 3134 | FCP410 | 0010 | TAUS01 | 0200 |
| D06CVS | 3031 | D02420 | 3223 | FCP550 | 0010 | TBCATL | 0210 |
| D06LAB | 3047 | D08CFD | 3251 | FCP610 | 0010 | TBCDAL | 0050 |
| D08CST | 0546 | D08CHR | 3345 | FDC480 | 0030 | TBCFSP | 1565 |
| D08DNM | 0536 | D08COL | 3343 | FDP120 | 0050 | TBCNFP | 1566 |
| D08DNO | 0505 | D08DHA | 3244 | FDP130 | 0050 | TBC132 | 2727 |
| D08DUA | 0545 | D08DHC | 3342 | FDP210 | 0050 | TBC205 | 2401 |
| D08MOD | 0537 | D08DHF | 3243 | FDP230 | 0050 | TBC210 | 2445 |
| D08MSK | 0457 | D08FGD | 3400 | FDP310 | 0050 | TB0541 | 0711 |
| D0842H | 0547 | D08LIN | 3344 | FDP320 | 0050 | TBLHDF | 4401 |
| D09ABL | 2535 | D08LPT | 3371 | FDP330 | 0050 | TBP111 | 2602 |
| D09ACD | 2537 | D08M02 | 3374 | FDP340 | 0050 | TBP131 | 3235 |
| D09ACH | 2546 | D08M36 | 3372 | FDP410 | 0040 | TBP132 | 3401 |
| D09ACV | 2552 | D08P36 | 3373 | FDP420 | 0040 | TBP211 | 4514 |
| D09ADD | 2547 | D08TBC | 3341 | FDP430 | 0040 | TBP212 | 4001 |
| D09ADS | 2771 | D08010 | 3236 | FDP440 | 0040 | TBP213 | 4601 |
| D09ADT | 2544 | D08020 | 3266 | FDP450 | 0040 | TBP22E | 2563 |
| D09ADX | 2524 | D08030 | 3273 | FDP460 | 0040 | TBP22I | 1657 |
| D09AFP | 2542 | D08035 | 3305 | FDP470 | 0040 | TBP22L | 2001 |
| D09AFR | 2540 | D08040 | 3310 | FDP490 | 0040 | TBP22M | 2511 |
| D09AHF | 2541 | D08050 | 3325 | TAC417 | 0265 | TBP22R | 3401 |
| D09AMV | 2550 | D08060 | 3346 | TAD151 | 2042 | TBP22S | 2601 |
| D09ASP | 2532 | D09010 | 3164 | TAD221 | 1561 | TBP22U | 2437 |
| D09AST | 2534 | FAF110 | 0000 | TAD322 | 1072 | TBP22X | 0202 |
| D09ASZ | 2543 | FAF120 | 0000 | TAP11B | 4472 | TBP221 | 1401 |
| D09ATD | 2551 | FAF130 | 0000 | TAP121 | 4400 | TBP222 | 1444 |
| D09AZN | 2545 | FAF150 | 0000 | TAP129 | 2402 | TBP223 | 1500 |
| D09BDF | 2656 | FAP220 | 0000 | TAP131 | 4470 | TBP224 | 1601 |
| D09BFR | 2657 | FAP230 | 0000 | TAP134 | 4571 | TBP226 | 0401 |
| D09CDF | 2651 | FAP240 | 0000 | TAP151 | 2002 | TBP229 | 3201 |
| D09CHA | 2560 | FAP320 | 0000 | TAP152 | 2022 | TBP23I | 5143 |
| D09CSP | 2770 | FAP410 | 0000 | TAP153 | 2034 | TBP23J | 5324 |
| D09DPS | 2704 | FAP520 | 0000 | TAP154 | 2062 | TBP23S | 4361 |
| D09DST | 2562 | FARMDE | 0000 | TAP212 | 0660 | TBP23X | 5601 |
| D09DXT | 2525 | FAUS01 | 0000 | TAP223 | 1525 | TBP23Z | 6061 |
| D09FBL | 2533 | FBC205 | 0030 | TAP235 | 7400 | TBP31A | 4404 |
| D09IFB | 2536 | FBP110 | 0000 | TAP236 | 6637 | TBP31R | 5001 |
| D09MOV | 2634 | FBP130 | 0000 | TAP237 | 6042 | TBP315 | 3602 |
| D09PRS | 2767 | FBP210 | 0020 | TAP239 | 6531 | TBP422 | 0242 |
| D09P16 | 2526 | FBP220 | 0020 | TAP242 | 3600 | TBP423 | 0220 |
| D09P26 | 2527 | FBP230 | 0020 | TAP243 | 3604 | TBP424 | 0401 |
| D09P34 | 2530 | FBP310 | 0010 | TAP244 | 0000 | TBP425 | 0202 |
| D09P56 | 2531 | FBP420 | 0030 | TAP322 | 0747 | TBP431 | 5202 |
| D09SCR | 2630 | FBP430 | 0010 | TAP323 | 1001 | TBP432 | 5211 |
| D09SPS | 2625 | FBP440 | 0020 | TAP324 | 1021 | TBP434 | 5677 |
| D09TDD | 2661 | FBP510 | 0010 | TAP411 | 0600 | TBP437 | 6001 |
| D09222 | 2554 | FBP520 | 0010 | TAP412 | 0606 | TBP438 | 6024 |
| DP421C | 0561 | FBP530 | 0010 | TAP416 | 0367 | TBP44C | 7555 |
| DP421S | 0551 | FBP540 | 0010 | TAP417 | 0202 | TBP440 | 6351 |
| D01CC1 | 3137 | FBP810 | 0040 | TAP521 | 1602 | TBP44E | 6253 |
| D01CD1 | 3131 | FBP820 | 0040 | TAP525 | 1656 | TBP44F | 7352 |
| D01PTR | 3140 | FBP910 | 0030 | TAP529 | 1742 | TBP44J | 7601 |
| TBP44K | 7401 | TDP224 | 1265 | TDP433 | 5601 | *P0002 | 7305 |
| TBP44L | 7212 | TDP236 | 1070 | TDP434 | 5471 | *P0003 | 7325 |
| TBP44M | 7206 | TDP31A | 3003 | TDP435 | 5476 | *P0004 | 7307 |
| TBP44N | 7202 | TDP31B | 2202 | TDP436 | 5503 | *P0006 | 7327 |
| TBP44R | 7135 | TDP311 | 4511 | TDP437 | 5510 | *P0100 | 7203 |
| TBP44U | 6414 | TDP312 | 3201 | TDP441 | 3055 | *P2000 | 7332 |
| TBP44V | 7715 | TDP313 | 3602 | TDP442 | 3201 | *P3777 | 7350 |
| TBP441 | 6241 | TDP314 | 2403 | TDP448 | 3225 | ZARMDE | 0133 |
| TBP451 | 7610 | TDP315 | 3401 | TDP449 | 3142 | ZAUT00 | 0010 |
| TBP512 | 1265 | TDP316 | 4001 | TDP451 | 6202 | ZAUT01 | 0011 |
| TBP521 | 2201 | TDP317 | 4201 | TDP452 | 6242 | ZAUT02 | 0012 |
| TBP522 | 2504 | TDP319 | 3755 | TDP453 | 6601 | ZAUT03 | 0013 |
| TBP523 | 2703 | TDP32A | 6420 | TDP454 | 6401 | ZAUT04 | 0014 |
| TBP532 | 0522 | TDP32B | 6504 | TDP455 | 6646 | ZAUT05 | 0015 |
| TBP533 | 0555 | TDP321 | 6326 | TDP456 | 6717 | ZAUT06 | 0016 |
| TBP541 | 1103 | TDP322 | 6601 | TDP457 | 6467 | ZAUT07 | 0017 |
| TBP542 | 1154 | TDP323 | 7001 | TDP461 | 7201 | ZBCALM | 0105 |

```
TBP551 2122
TBP811 0202
TBP821 1602
TBP911 7610
TBP919 7603
TCP111 6202
TCP213 7023
TCP311 6401
TCP551 7124
TCP611 7201
TCP91X 7335
TCP911 7266
TCP912 7401
TCP913 7414
TCP914 7432
TDC010 3400
TDC201 1717
TDC202 1737
TDC481 4201
TDC483 5001
TDC484 5401
TDC486 6001
TDC487 6601
TDD201 0001
TDD202 0461
TDP121 5202
TDP122 5405
TDP123 5242
TDP124 5535
TDP131 7202
TDP132 7401
TDP133 7311
TDP134 7460
TDP135 7463
TDP137 7357
TDP211 0402
TDP212 0601
TDP221 0507
ZDCPLN 0116
ZDCPRS 0102
ZDCPSC 0115
ZDCSAD 0104
ZDCTXS 0112
ZKA151 0036
ZKA152 0037
ZKA153 0040
ZKA154 0041
ZKA322 0031
ZKA323 0032
ZKA324 0033
ZKA416 0024
ZKA417 0025
ZKA521 0026
ZKA525 0027
ZKA529 0030
ZKB111 0035
ZKB213 0157
ZKB22L 0166
ZKB221 0160
ZKB222 0161
ZKB226 0163
ZKB229 0164
ZKB23L 0171
ZKB23S 0172
ZKB23X 0173
ZKB23Z 0174
ZKB31A 0156
ZKB521 0175
ZKB522 0176
ZKB523 0177
ZKCDF  0021
ZKCDI  0023
ZKCIF  0022
ZKC213 0135
ZKC911 0173
ZKD329 0156
ZKD342 0136
ZKD345 0170
ZKD42A 0147
ZKD42B 0140
ZKD42C 0167
ZKD42F 0150
ZKD42G 0135
ZKD421 0152
ZKD422 0153
ZKD423 0154
ZKD424 0176
ZKD425 0177
ZKD426 0155
ZKD428 0151
ZKD429 0162
ZKD441 0141
ZKD453 0142

TDP324 6401
TDP325 6001
TDP326 6201
TDP327 5623
TDP328 6050
TDP329 6112
TDP331 4603
TDP332 5001
TDP333 5077
TDP334 5137
TDP335 5161
TDP341 4401
TDP342 4436
TDP345 4143
TDP411 4043
TDP412 4201
TDP415 4430
TDP416 3741
TDP42A 0402
TDP42B 2043
TDP42C 0711
TDP42D 2011
TDP42E 2025
TDP42F 0601
TDP42G 2001
TDP42H 1757
TDP42I 1143
TDP421 1401
TDP422 1201
TDP423 1606
TDP424 2212
TDP425 2231
TDP426 3001
TDP427 2201
TDP428 0460
TDP429 2401
TDP431 5401
TDP432 5430
ZKD456 0143
ZKD457 0144
ZKD462 0145
ZKD463 0146
ZKD511 0130
ZKD512 0131
ZKD513 0132
ZKD514 0133
ZKD515 0134
ZKD516 0137
ZM0004 0074
ZM0005 0042
ZM0006 0043
ZM0010 0044
ZM0040 0045
ZM0120 0046
ZM0260 0047
ZP0003 0006
ZP0005 0050
ZP0006 0051
ZP0007 0052
ZP0010 0053
ZP0017 0054
ZP0020 0055
ZP0037 0056
ZP0040 0057
ZP0060 0020
ZP0070 0060
ZP0077 0061
ZP0100 0062
ZP0120 0063
ZP0177 0064
ZP0200 0065
ZP0260 0066
ZP0377 0067
ZP0777 0076
ZP7000 0070
ZP7400 0071
ZP7600 0072
ZP7700 0073
ZP7777 0077
ZVKCRL 0126
ZWORK1 0004
ZWORK2 0005
ZWORK3 0006
ZWORK4 0007

TDP462 6330
TDP463 7401
TDP464 7601
TDP471 6001
TDP472 6032
TDP473 6056
TDP474 5643
TDP491 3402
TDP492 3446
TDP493 3462
TDP511 0202
TDP512 0235
TDP513 0243
TDP514 0277
TDP515 0341
TDP516 0347
TDR001 5601
TDZACI 5620
TDZDAB 5605
TDZOCY 5617
TDZOSM 5602
TDZOTC 5604
TD483E 6000
TD487E 7600
WKLFAR 7300
WK4000 7330
WK5777 7352
WK6000 7333
WK7775 7346
WK7776 7344
WK7777 7340
WM0001 7340
WM0002 7344
WM0003 7346
WM2000 7333
WM2001 7352
WM4000 7330
WP0001 7301

ZBCAOM 0103
ZBCCIF 0110
ZBCDCM 0104
ZBCDOA 0102
ZBCDOB 0101
ZBCILA 0113
ZBCILF 0112
ZBCIVA 0122
ZBCKLT 0111
ZBCPGN 0120
ZBCPGI 0115
ZBCPTP 0114
ZDBNCL 0122
ZDCCAN 0115
ZDCCCL 0107
ZDCCCR 0114
ZDCCCY 0110
ZDCCDS 0103
ZDCCHS 0117
ZDCCLN 0106
ZDCCLT 0113
ZDCCOS 0102
ZDCCSN 0107
ZDCCSP 0111
ZDCCVR 0116
ZDCDAT 0104
ZDCDBF 0124
ZDCDES 0101
ZDCDTP 0103
ZDCFLD 0110
ZDCFLG 0111
ZDCFLN 0105
ZDCLCH 0114
ZDCNCL 0121
ZDCNOL 0101
ZDCOAN 0113
ZDCOCR 0112
ZDCPKS 0120

ERRORS DETECTED: 0
LINES GENERATED: 0
```

```
ACL        631    672    755    866   1013   1318   1342   1900   2394
BLZPRT     606
DOAEXD      93     97    101    118#   122    136    137
DOBCDF    1377   1382#
DOBE14     205#
DOBE20    1028   1036#
DOBE46    1908   1918#
DOBF17     812    837#
DOBF24     645    653#
DOBF34    1324   1389#
DOBF61    1517   1583#
DOBI14     175#   203
DOBI20    1026#  1034
DOBI46    1906#  1916
DOBP02    1346   1413#
DOBP04    1359   1414#
DOBS34    1316   1325#
DOCACB     438    451#
DOCCAB     420    434#   448
DOCCBA     390    395    420#
DOCE33     285    297#
DOCF04     383    393#
DOCI33     283#   295
DOCLAB     402    407#
DOCL11     465    499    524#
DOCL19     476    510    525#
DOCO25     641    647#
DOCO60    1506   1511   1519#
DOCRBA     396    422#
DOCRCB     422    495#   520
DOCSBA     391    421#
DOCSCB     421    460#   486
DOC011     463    497    522#
DOC019     474    508    523#
DOC42I     414    423#
DODF15     182    189    197#
DODF21    1094   1103#
DODF26     656    663#
DODF62    1523   1530#
DODQ48    1713#
DODS21    1090   1096#
DOD010     121#   127
DOD020     124    128#
DOD030     131    135#
DOFF35    1344   1367#
DOFF49    1718   1727#
DOFCDF     288    293#
DOFDFP     268#   271    297
DOFOTP     280    309#
DOFFRA     267#   269    301
DOFF27     696    701    719#
DOFF64    1547   1580#
DOFLAD     229    239    241#
DOFR27     684#
DOFS64    1536   1539   1548#
DOGF19     885#
DOGF23    1138   1150#
DOGF28     710    717#
DOGF36    1357   1364#
DOGF50    1732   1742#
DOGPRS    1208   1213#
DOGQ63    1533   1541#
DOGR28     688    691    703#
DOGS23    1133   1140#
DOHDBF    1179   1185#
DOHF40     328    345#
DOHF66    1565   1578#
DOHS66    1559   1566#
DOHTMP    1177   1183   1187#
DOIDOA     596    607#
DOIE37    1373   1386#
DOIFAG     232    237    242#
DOIFLG     602    608#
DOIF29     725    771#
DOIF51    1749   1777#
DOII37    1371#  1384
DOIK13     592    605#
DOIPRT     590    606#
DOIQ65    1556   1561#
DOI010     588    595#
DOI020     593    601#
DOJF30     746    749    767#
DOKF03     468#   473
DOKF07     479#   484
DOKQ31     741    751#
DOLF32     758    764#
DONF38     737    769#
DOPF43    1982   1991   1996   2006   2011#
DOPS43    1975   1983#
DOPT43    1985   1992#
DOSF45    1680   1708#
DOSS45    1670   1681#
DOTF03     502#   507
DOTF07     513#   518
```

| | | | | | | | | |
|---|---|---|---|---|---|---|---|---|
| D0VF47 | 1711 | 1745# | | | | | | |
| D0Y055 | 1944 | 1951# | | | | | | |
| D0ZAL* | 192 | 404 | | | | | | |
| D0ZDC* | 164 | 373 | 1937 | | | | | |
| D0ZDES | 323 | 380 | 412 | | | | | |
| D0ZODM | 162 | 376 | | | | | | |
| D01ADN | 844 | 970# | | | | | | |
| D01APS | 877 | 971# | | | | | | |
| D01ATK | 829 | 830 | 969# | | | | | |
| D01CDF | 909 | 942# | | | | | | |
| D01DEC | 865 | 874# | | | | | | |
| D01FRA | 913 | 943# | | | | | | |
| D01MAK | 918 | 965# | | | | | | |
| D01*RS | 819 | 966# | | | | | | |
| D01PDN | 968# | 970 | | | | | | |
| D01P*S | 971 | 972# | | | | | | |
| D01PTN | 828 | 964# | | | | | | |
| D01P65 | 827 | 967# | | | | | | |
| D01TAK | 969 | 978# | | | | | | |
| D01THL | 778 | 811 | 903# | 921 | 923 | | | |
| D01TXA | 831 | 845 | 878 | 960# | | | | |
| D01426 | 841 | 856 | 907 | 939# | 944 | | | |
| D01423 | 834 | 851 | 885 | 956# | 961 | | | |
| D02AGH | 753 | 763# | | | | | | |
| D02AOM | 713 | 761 | 785# | | | | | |
| D02APD | 712 | 781# | | | | | | |
| D02ASM | 536 | 542# | | | | | | |
| D02ATH | 655 | 778# | | | | | | |
| D02A*P | 760 | 782# | | | | | | |
| D02CDF | 669# | 727 | | | | | | |
| D02CHO | 671 | 692 | 721 | 788# | | | | |
| D02CVS | 714 | 766# | | | | | | |
| D02FRA | 670# | 731 | | | | | | |
| D02*RD | 694 | 723 | 780# | | | | | |
| D02*07 | 756 | 784# | | | | | | |
| D02*50 | 686 | 779# | | | | | | |
| D02*60 | 643 | 777# | | | | | | |
| D02IPD | 546# | 761 | | | | | | |
| D02IAP | 554# | 762 | | | | | | |
| D0222L | 535# | 543 | 785 | | | | | |
| D03CDF | 1059# | 1064 | | | | | | |
| D03CDR | 1018 | 1083# | | | | | | |
| D03CDW | 1065 | 1126# | | | | | | |
| D03CPA | 1037 | 1104 | 1135 | 1144 | 1159# | | | |
| D03CHR | 1030 | 1081# | 1106 | | | | | |
| D03C*W | 1031 | 1034 | 1115# | 1151 | | | | |
| D03DTA | 1067 | 1068 | 1120 | 1137 | 1142 | 1145 | 1146 | 1158# |
| D03FRA | 1060# | 1066 | | | | | | |
| D03NFP | 1024 | 1051# | 1072 | 1123 | | | | |
| D03P*D | 1036 | 1154# | | | | | | |
| D03SCA | 1021 | 1092 | 1098 | 1099 | 1157# | | | |
| D04CLN | 1467 | 1477# | 1507 | 1573 | | | | |
| D04NFP | 1470 | 1478# | 1513 | 1571 | | | | |
| D042AX | 69 | 108# | | | | | | |
| D042BX | 1305 | 1399# | | | | | | |
| D042CX | 371 | 416# | | | | | | |
| D042DX | 1237 | 1242# | | | | | | |
| D042EX | 1267 | 1274# | | | | | | |
| D042FX | 262 | 305# | | | | | | |
| D042TA | 235 | 243# | | | | | | |
| D042SF | 389 | 414# | | | | | | |
| D0421X | 868 | 890# | | | | | | |
| D0422X | 636 | 773# | | | | | | |
| D0423X | 1012 | 1040# | | | | | | |
| D0424X | 1465 | 1472# | | | | | | |
| D0425X | 1501 | 1565# | | | | | | |
| D0426X | 2051 | 2056 | 2065# | | | | | |
| D0428X | 159 | 213# | | | | | | |
| D0429X | 1665 | 1782# | | | | | | |
| D05ACK | 345 | 352# | | | | | | |
| D05ACH | 1550 | 1590# | | | | | | |
| D05ADD | 1636 | 1644# | | | | | | |
| D05ATD | 1532 | 1591# | | | | | | |
| D05AZC | 1568 | 1594# | | | | | | |
| D05AZ* | 320 | 330 | 338 | 351# | | | | |
| D05CDF | 1612# | 1632 | 1797 | 1921 | | | | |
| D05CUR | 352 | 1570 | 1641# | 1804 | 2070 | | | |
| D05FLO | 1634 | 1643# | | | | | | |
| D05FRA | 1613# | 1635 | 1798 | 1922 | | | | |
| D05HFT | 1617 | 1622# | 1637 | 1799 | | | | |
| D05MSK | 1542 | 1592# | | | | | | |
| D05NMC | 335 | 349# | | | | | | |
| D05SHC | 340 | 350# | | | | | | |
| D05SUF | 1526 | 1589# | | | | | | |
| D05SZC | 318# | 346 | 1594 | 1801 | 2072 | | | |
| D05UTF | 1543 | 1593# | | | | | | |
| D05ZDN | 351 | 1642# | 1803 | | | | | |
| D05226 | 1575 | 1630# | 1645 | 1802 | 2071 | | | |
| D0542B | 1574 | 1609# | 1618 | 1800 | 2069 | | | |
| D06ACR | 2060 | 2062 | 2070# | | | | | |
| D06ADT | 2063 | 2071# | | | | | | |
| D06AFP | 2058 | 2069# | | | | | | |
| D06ASZ | 2059 | 2072# | | | | | | |
| D06AID | 2086 | 2102# | | | | | | |

| | | | | | | | |
|---|---|---|---|---|---|---|---|
| DO6CVS | 786 | 1808 | 2081# | 2099 | | | |
| DO6LAB | 2085 | 2087 | 2090 | 2093 | 2096# | | |
| DO8CST | 170 | 218# | | | | | |
| DO8DNM | 163 | 208# | | | | | |
| DO8DNO | 173 | 178# | 199 | 200 | | | |
| DO8DUA | 185 | 217# | | | | | |
| DO8MOD | 166 | 209# | | | | | |
| DO8MSK | 155# | 171 | 180 | | | | |
| DO842B | 168 | 219# | | | | | |
| DO9ABL | 1773 | 1795# | | | | | |
| DO9ACD | 1675 | 1797# | | | | | |
| DO9ACH | 1723 | 1738 | 1804# | | | | |
| DO9ACV | 1778 | 1808# | | | | | |
| DO9ADD | 1669 | 1805# | | | | | |
| DO9ADS | 2014 | 2030# | | | | | |
| DO9ADT | 1713 | 1802# | | | | | |
| DO9ADX | 1676 | 1786# | | | | | |
| DO9AFP | 1685 | 1800# | | | | | |
| DO9AFR | 1677 | 1798# | | | | | |
| DO9AHF | 1678 | 1799# | | | | | |
| DO9AMV | 1689 | 1702 | 1806# | | | | |
| DO9ASP | 1697 | 1792# | | | | | |
| DO9AST | 1761 | 1794# | | | | | |
| DO9ASZ | 1668 | 1801# | | | | | |
| DO9ATD | 1710 | 1807# | | | | | |
| DO9AZN | 1704 | 1706 | 1803# | | | | |
| DO9BDF | 1903 | 1921# | | | | | |
| DO9BFR | 1901 | 1922# | | | | | |
| DO9CDF | 1904 | 1912# | | | | | |
| DO9CHA | 1721 | 1736 | 1760 | 1772 | 1823# | | |
| DO9CSP | 1977 | 2029# | | | | | |
| DO9DDS | 1805 | 1967# | 2009 | 2025 | | | |
| DO9DST | 1827# | 2030 | | | | | |
| DO9DXT | 1786 | 1787# | | | | | |
| DO9FBL | 1720 | 1793# | | | | | |
| DO9IFB | 1768 | 1796# | | | | | |
| DO9MOV | 1806 | 1897# | 1918 | | | | |
| DO9PRS | 1971 | 2028# | | | | | |
| DO9P16 | 1705 | 1788# | | | | | |
| DO9P26 | 1686 | 1789# | | | | | |
| DO9P34 | 1699 | 1790# | | | | | |
| DO9P56 | 1737 | 1791# | | | | | |
| DO9SCR | 1881# | | | | | | |
| DO9SFS | 1792 | 1876# | | | | | |
| DO9TDD | 1591 | 1807 | 1934# | 1951 | 1954 | 2102 | |
| DO9222 | 1724 | 1739 | 1762 | 1774 | 1819# | 1824 | |
| DP421C | 231 | 234# | | | | | |
| DP421S | 226# | 233 | 240 | 423 | | | |
| DQ1CCT | 2119 | 2156 | 2161 | 2178# | 2201 | 2218 | 2219 |
| DQ1CDI | 2122 | 2170# | | | | | |
| DQ1PTR | 2141 | 2179# | 2409 | | | | |
| DQ1010 | 2145 | 2160# | | | | | |
| DQ142D | 2132 | 2174# | | | | | |
| DQ1442 | 2158 | 2176# | | | | | |
| DQ1448 | 2155 | 2175# | | | | | |
| DQ242D | 2257 | 2270# | | | | | |
| DQ8CFD | 2312 | 2314# | 2357 | 2362 | | | |
| DQ8CHR | 2342 | 2386# | 2398 | 2399 | 2404 | | |
| DQ8COL | 2294 | 2300 | 2324 | 2331 | 2384# | | |
| DQ8DBA | 2306# | 2319 | 2358 | 2359 | | | |
| DQ8DBC | 2309 | 2316 | 2353 | 2354 | 2383# | | |
| DQ8DBF | 2305# | 2311 | | | | | |
| DQ8END | 82 | 2415# | | | | | |
| DQ8LFN | 2298 | 2302 | 2332 | 2385# | | | |
| DQ8LPT | 2260 | 2365 | 2409# | | | | |
| DQ8M02 | 2351 | 2412# | | | | | |
| DQ8M36 | 2326 | 2410# | | | | | |
| DQ8P36 | 2389 | 2411# | | | | | |
| DQ8TBC | 2290 | 2338 | 2382# | 2391 | 2401 | | |
| DQ8010 | 2300# | 2333 | 2363 | | | | |
| DQ8020 | 2329# | 2348 | | | | | |
| DQ8030 | 2328 | 2335# | | | | | |
| DQ8035 | 2337 | 2346# | | | | | |
| DQ8040 | 2351# | | | | | | |
| DQ8050 | 2341 | 2344 | 2365# | | | | |
| DQ8060 | 2329 | 2352 | 2388# | 2403 | 2407 | | |
| DQ9010 | 2203 | 2209 | 2216# | | | | |
| TDC010 | 59# | 451 | | | | | |
| TDP42A | 82 | 95# | 109 | | | | |
| TDP42B | 1301# | 1400 | 1402 | 1403 | 1405 | 1406 | 1410 |
| TDP42C | 368# | 417 | | | | | |
| TDP42D | 1233# | 1243 | 2174 | 2270 | | | |
| TDP42E | 1263# | 1275 | | | | | |
| TDP42F | 259# | 306 | 783 | | | | |
| TDP42G | 1205# | 1210 | | | | | |
| TDP42H | 219 | 1176# | 1182 | 1184 | | | |
| TDP42I | 243 | 586# | 604 | | | | |
| TDP421 | 805# | 891 | | | | | |
| TDP422 | 629# | 774 | | | | | |
| TDP423 | 1007# | 1016 | 1017 | 1019 | 1020 | 1022 | 1041 |
| TDP424 | 1462# | 1473 | | | | | |
| TDP425 | 1497# | 1586 | | | | | |
| TDP426 | 2048# | 2066 | | | | | |
| TDP427 | 1433# | 1445 | 1590 | | | | |

| | | | | | | | | | | |
|---|---|---|---|---|---|---|---|---|---|---|
| TOP428 | 156# | 214 | | | | | | | | |
| TOP429 | 1662# | 1763 | | | | | | | | |
| TOP441 | 2118# | 2171 | | | | | | | | |
| TOP442 | 2176 | 2243# | 2268 | | | | | | | |
| TOP448 | 2175 | 2288# | 2379 | | | | | | | |
| TOP449 | 2160 | 2195# | 2224 | | | | | | | |
| *KLEAR | 128 | 197 | | | | | | | | |
| *K4000 | 1084 | 1127 | | | | | | | | |
| *K5777 | 2210 | | | | | | | | | |
| *M0001 | 228 | 1512 | 1569 | | | | | | | |
| *M0002 | 1367 | | | | | | | | | |
| *M0003 | 1206 | | | | | | | | | |
| *M4000 | 1734 | 1756 | | | | | | | | |
| *P0001 | 234 | 599 | 680 | 847 | 2096 | | | | | |
| *P0002 | 319 | 407 | 1321 | 1327 | | | | | | |
| *P0003 | 814 | 859 | 881 | 1694 | 1701 | 2259 | | | | |
| *P0004 | 1987 | | | | | | | | | |
| *P0006 | 647 | 1992 | 2002 | | | | | | | |
| ZAUT00 | 447 | 471 | 482 | 503 | 514 | 633 | 650 | 685 | 1009 | 1026 |
| | 1698 | 1910 | 2015 | 2017 | | | | | | |
| ZAUT01 | 464 | 469 | 475 | 480 | 498 | 505 | 509 | 516 | 632 | 708 |
| | 739 | 1015 | 1085 | 1086 | 1088 | 1902 | 1913 | | | |
| ZAUT02 | 630 | 639 | 648 | 649 | 659 | 660 | 693 | 722 | 1063 | 1128 |
| | 1129 | 1131 | 1735 | 1759 | 2018 | 2019 | 2024 | 2139 | 2147 | 2148 |
| | 2261 | 2366 | | | | | | | | |
| ZAUT03 | 1498 | 1504 | 1521 | 1537 | 1557 | | | | | |
| ZAUT04 | 1667 | 1672 | 1779 | | | | | | | |
| ZAUT07 | 2138 | 2199 | 2221 | 2367 | 2400 | | | | | |
| ZBCD0A | 217 | 607 | | | | | | | | |
| ZDCCCL | 642 | 663 | 825 | 837 | 852 | 886 | 1032 | 1053 | 1468 | 1515 |
| | 2373 | | | | | | | | | |
| ZDCCHS | 2204 | 2205 | | | | | | | | |
| ZDCCLN | 666 | 684 | 840 | 855 | 860 | 887 | 906 | 1056 | 1438 | 1466 |
| | 1509 | 2131 | 2256 | 2371 | | | | | | |
| ZDCCLT | 2376 | | | | | | | | | |
| ZDCCOS | 522 | 524 | 870 | 879 | 883 | 1988 | 2094 | 2143 | 2248 | |
| ZDCCSP | 2029 | | | | | | | | | |
| ZDCCVB | 241 | 525 | | | | | | | | |
| ZDCDBF | 242 | 608 | 1185 | | | | | | | |
| ZDCDTP | 309 | 864 | 1307 | | | | | | | |
| ZDCFLD | 1554 | 1562 | 2057 | | | | | | | |
| ZDCFLG | 1525 | 1527 | 1534 | 1541 | 1544 | 1691 | 1715 | 1729 | 1752 | 1764 |
| | 2088 | 2206 | 2211 | 2212 | | | | | | |
| ZDCFLG | 1239 | 1270 | | | | | | | | |
| ZDCLCH | 2292 | 2295 | 2375 | | | | | | | |
| ZDCNUL | 332 | 409 | 1436 | | | | | | | |
| ZDCPKS | 524 | 2196 | | | | | | | | |
| ZDCPRS | 523 | 525 | 1213 | 2028 | | | | | | |
| ZDCPSC | 689 | 703 | 706 | 747 | 771 | 2091 | | | | |
| ZDCSAD | 861 | 1311 | 1329 | | | | | | | |
| ZDCTXS | 2149 | 2152 | 2153 | 2250 | | | | | | |
| ZKA323 | 2166 | | | | | | | | | |
| ZKA521 | 265 | | | | | | | | | |
| ZKA529 | 675 | | | | | | | | | |
| ZKB213 | 206 | | | | | | | | | |
| ZKB22L | 539 | | | | | | | | | |
| ZKB221 | 2098 | | | | | | | | | |
| ZKB222 | 1821 | | | | | | | | | |
| ZKB226 | 1639 | | | | | | | | | |
| ZKCDF | 272 | 287 | 863 | 1306 | 1375 | 1390 | 1671 | | | |
| ZKCDI | 88 | 158 | 261 | 370 | 635 | 807 | 1011 | 1236 | 1266 | 1304 |
| | 1464 | 1500 | 1664 | 2050 | 2121 | | | | | |
| ZKC911 | 176 | | | | | | | | | |
| ZKD345 | 2217 | | | | | | | | | |
| ZKD428 | 667 | 940 | 1057 | 1610 | 2303 | | | | | |
| ZKD42G | 2083 | | | | | | | | | |
| ZKD421 | 2254 | | | | | | | | | |
| ZKD423 | 957 | | | | | | | | | |
| ZKD424 | 2245 | | | | | | | | | |
| ZKD425 | 2266 | | | | | | | | | |
| ZKD426 | 1563 | | | | | | | | | |
| ZKD429 | 1545 | 2053 | 2214 | 2252 | | | | | | |
| ZKD511 | 2125 | | | | | | | | | |
| ZKD512 | 2133 | 2134 | 2154 | 2264 | 2343 | 2368 | 2405 | | | |
| ZKD513 | 2222 | | | | | | | | | |
| ZM0004 | 400 | 442 | | | | | | | | |
| ZM0005 | 326 | 1942 | 1948 | 2140 | 2200 | | | | | |
| ZM0006 | 169 | 201 | | | | | | | | |
| ZM0010 | 678 | | | | | | | | | |
| ZP0003 | 850 | | | | | | | | | |
| ZP0005 | 408 | 1688 | 2137 | | | | | | | |
| ZP0006 | 676 | 1319 | | | | | | | | |
| ZP0007 | 1978 | | | | | | | | | |
| ZP0010 | 597 | 681 | 2162 | | | | | | | |
| ZP0017 | 658 | 833 | 1335 | | | | | | | |
| ZP0040 | 91 | 444 | 1771 | | | | | | | |
| ZP0060 | 105 | 132 | | | | | | | | |
| ZP0070 | 1633 | 1722 | | | | | | | | |
| ZP0077 | 165 | 325 | 374 | 399 | 441 | 818 | 917 | 1103 | 1240 | 1272 |
| | 1338 | 1941 | 2293 | 2297 | 2323 | 2360 | | | | |
| ZP0100 | 1070 | | | | | | | | | |
| ZP0120 | 2061 | | | | | | | | | |
| ZP0177 | 591 | | | | | | | | | |
| ZP0200 | 2262 | | | | | | | | | |

```
ZP0377    2151
ZP7600    1355
ZP7700     193   437   732  1069  1143  1946  2020
ZP7777     445  1979  2146
ZWORK1      92   133   135   270   276   277   278   281   283   289
           290   291   299   300   302   466   472   477   483   500
           506   511   517   733   734   816   842   848   862   875
           915   916  1312  1376  1378  1379  1380  1391  1393  1396
          1397  1404  1899  1906  1973  1974  1983  1984  1994  1998
          2000  2004
ZWORK2     384   387   394   398   410   436   440   682   697   742
           815   821   823   824   858   868   869   872  1320  1340
          1347  1348  1352  1354  1360  1394  1409
ZWORK3     120   126   129   134   160   195   211   439   446   673
           699   744   751  1071  1118  1322  1336  1361  1368  1407
          1551  1552  1561  1980  1989  1993  1997  2003  2007  2011
          2013
ZWORK4      86   104   121   125   378   385   393  1234  1238  1264
          1268  1302  1314  1328  1330  1331  1332  1334  1337  1349
          1370  1371  1392  1401  1747  1939  1940  1945  1953

VSA
/ GP4056.88
/
/           %%%%%%%%%%%%%%%%%%%%%%%%%%%%%%%%%%%%%%%%%%%%%%%%%%%%%%%%%%%%%%%%%%%%%
/           %                                                                   %
/           %                        PROPRIETARY.                               %
/           %                                                                   %
/           %   THIS DOCUMENT CONTAINS INFORMATION PROPRIETARY TO               %
/           %   REUTERS LIMITED AND IS NOT TO BE REPRODUCED AND/OR              %
/           %   USED IN WHOLE OR IN PART WITHOUT THE EXPRESS WRITTEN            %
/           %   PERMISSION OF REUTERS LIMITED.                                  %
/           %                                                                   %
/           %%%%%%%%%%%%%%%%%%%%%%%%%%%%%%%%%%%%%%%%%%%%%%%%%%%%%%%%%%%%%%%%%%%%%
/
/


/
/        MODULE    AFF50.88 27-OCT-80
/        SYSTEM MAP FILE
/
/        MODULE MAPC50.88 22-JAN-81
/        CONVERSATIONS MAP FILE
/
/        MODULE FCF050.88 16-JAN-80
/        FIXED PAGE ZERO CONSTANTS AND COMMON DATA EQUATES FIELD 4 & 5
         ////////                                                  ////////
         /                                                                /
         /          MAJOR COMPONENT:                                      /
         /                   GP4056.88 - DIALOGUE.                        /
         /                   VERSION 1 - 13/8/'79.                        /
         /                   AUTHOR - J.BARTON/G.BROWN.                   /
         /                                                                /
         /          COMPRISES:                                            /
         /                   GP4956.88 - DIALOGUE ROUTEING.               /
         /                   GP4150.88 - DIALOGUE ENTRY/RECEIPT.          /
         /                   GP4350.88 - DIALOGUE DISPLAY.                /
         /                   GP4750.88 - BELL & HIGHLIGHT.                /
         /                   TDC481 - CNV SYSTEM ABBREVIATION TABLE       /
         /                   TDC483 - CNV USER ABBREVIATIONS TABLE.       /
         /                   TDC486 - CNB SYSTEM ABBREVIATION TABLE       /
         /                   TDC487 - CNB USER ABBREVIATION TABLE         /
         /                                                                /
         ////////                                                  ////////



         ////////                                                  ////////
         /                                                                /
         /          COMPONENT:                                            /
         /                   GP4956.88 - DIALOGUE ROUTEING.               /
         /                   VERSION 1 - 15/5/'79.                        /
         /                   AUTHOR - J.BARTON.                           /
         /                                                                /
         /          COMPRISES:                                            /
         /                   TDP491 - DIALOGUE RECEPTION.                 /
         /                   TDP492 - CONVERSATIONS RECEPTION.            /
         /                   TDP493 - DIALOGUE CONTROL.                   /
         /                   TDP494 - ACTION TRANSMIT - DIALOGUE.         /
         /                                                                /
         ////////                                                  ////////


/ MODIFIED RJA 4-JUL-80 TDP411 CURRENT LINE FULL CHECK DONE AFTER
/ DISPLAYING CHAR RATHER THAN BEFORE (CORRECT CONFUSING CURSOR POSITION)
/ MODIFIED RJA 18-SEP-80 TDP411 FIND ROOM FOR NEWLINE INSERTED ON FULL LINE!
/ MODIFIED RJA 29-OCT-80 FFISTA TREAT ? AND % AS SPECIAL PUNCTUATION
/ MODIFIED RJA 30-OCT-80 TDP411 LINE FULL CHECK TURNED INTO S/R TO BE
/ CALLED BY TDP415 AT END OF INSERT LINE PROCESSING TO SEE IF LINE IS
/ NOW FULL AND IF SO TO INSERT A NEWLINE
/ MODIFIED RJA 5-DEC-80 TDP416 FORCE TRANSMIT NOW CHECKS IF THERE ARE
/ ACTUALLY ANY CHARS TO BE SENT AND DOES NOTHING IF NOT
/ MODIFIED RJA 12-JAN-81 CORRECT CHECK IN DP43SR FOR DIALOG REDISPLAY
/ ON CNVS HEADLINE RESET
/ FURTHER MOD RJA 22-JAN-81 FOR CNVS HEADLINE RESET PROBLEM TO ENSURE
/ CORRECT REDISPLAY OF 'CONTACT:CONTACT REPLY RECVD' HEADING LINES
```

```
                        ////////                                                  ////////
                        /                                                                /
                        /          MODULE:                                               /
                        /                   TDP491 - DIALOGUE RECEPTION.                 /
                        /                                                                /
                        /          FUNCTION:                                             /
                        /                   TO CALL THE MODULE TO PROCESS THE MSG        /
                        /               JUST RECEIVED ON A DIALOGUE PORT OR PORT 1.      /
                        /                                                                /
                        /          FORM OF CALL:                                         /
                        /                   JMS BY TBP31A.                               /
                        /                                                                /
                        ////////                                                  ////////

              0004      FIELD   FDP490%10
              3400      *3400
      43400   2600      0*4000+DT4ESD-TDP491+2   /*ELEMENT:TYPE 0:SIZE DT4ESD-TDP491+2
      43401   7401      1-1*2+7401              /*1 VARIABLE LOCATIONS FOLLOW


                / ======================================
                / = SET UP DATA FOR USE BY MODULE TO BE =
                / =  CALLED.                            =
                / ======================================

      43402   0000  TDP491, .-.
      43403   1202          TAD      TDP491
      43404   4226          JMS      DV49SA            / CALL ROUTINE TO SET UP TDP51* VARS.
      43405   4567          JMS  I   ZKD42C            / CALL TDP42C TO GET CONTROL BLOCK.


                / ======================================
                / = CHECK FOR ENABLED KEYBOARD.         =
                / ======================================

      43406   6221          CDF      20
      43407   1756          TAD  I   DV91AA
      43410   7104          CLL RAL
      43411   7700          SMA CLA                    / IS KB LOGICALLY ENABLED?
      43412   5223          JMP      DV91LA            / NO - IGNORE MESSAGE.
      43413   7120          STL                        / YES - IS KB SWITCHED ON?
      43414   5223          JMP      DV91LA            / NO - IGNORE MESSAGE.
      43415   6241          CDF      FDP490
                / ======================================
                / = DETERMINE WHICH MODULE TO CALL.     =
                / ======================================

      43416   7430          KP3000                     / SET C01/C02 FLAG IN RETURN
      43417   3262          DCA      TDP493            /   ADDRESS OF TDP493.
      43420   7325          AP0003                     / CALL TDP515 TO GET RECORD
      43421   4534          JMS  I   ZKD515            /   TYPE BYTE FROM BUFFER.
      43422   4313          JMS      DV49SB            / CALL ROUTINE TO CALL THE MODULE
                                                       /   DEPENDING ON RECORD TYPE.


                / ======================================
                / = RETURN TO TBP31A.                   =
                / ======================================

      43423   6213  DV91LA, CDI      FDP310
      43424   5416          JMP  I   ZAUT06            /  RETURN.


                / ======================================
                / = ROUTINE TO SET UP TDP51* VARIABLES. =
                / ======================================

      43425   7401          1-1*2+7401                 /*1 VARIABLE LOCATIONS FOLLOW
      43426   0000  DV49SA, .-.
      43427   3016          DCA      ZAUT06            / SAVE ADDRESS OF ZKNOP:2.
      43430   1416          TAD  I   ZAUT06
      43431   7421          MQL                        / HOLD CDF TO BUFFER IN MQ.
      43432   1416          TAD  I   ZAUT06
      43433   6251          CDF      50
      43434   3760          DCA  I   DV49AB            / STORE BUFFER START IN FIELD 5 TDP51*.
      43435   7701          ACL
      43436   3757          DCA  I   DV49AA            / STORE CDF TO BUFFER IN FIELD 5 TDP51*.
      43437   1760          TAD  I   DV49AB
      43440   6241          CDF      FDP490
      43441   3760          DCA  I   DV49AB            / STORE BUFFER START IN FIELD 4 TDP51*.
      43442   7701          ACL
      43443   3757          DCA  I   DV49AA            / STORE CDF TO BUFFER IN FIELD 4 TDP51*.
      43444   5626          JMP  I   DV49SA            / RETURN.
                        ////////                                                  ////////
                        /                                                                /
                        /          MODULE:                                               /
                        /                   TDP492 - CONVERSATIONS RECEPTION.            /
                        /                                                                /
                        /          FUNCTION:                                             /
                        /                   TO CALL THE MODULE TO PROCESS THE MSG        /
                        /             RECEIVED ON THE CONVERSATIONS FACILITY PORT.       /
                        /                                                                /
                        /          FORM OF CALL:                                         /
                        /                   JMS BY TBP31A.                               /
                        /                                                                /
                        ////////                                                  ////////
```

```
43445  7401           1-1^2+7401             /*1 VARIABLE LOCATIONS FOLLOW.
43446  0000  TDP492,  .-.
43447  1246           TAD      TDP492
43450  4226           JMS      DV49SA         / CALL ROUTINE TO SET UP TDP51* VARS.
43451  3262           DCA      TDP493         / CLEAR CN1/CN2 FLAG IN TDP493.
43452  4660           JMS   I  DV9421         / GO SET CNV/CNB FLAG FROM PORT NO.
43453  7325           WP0003
43454  4534           JMS   I  ZK0515         / CALL TDP515 TO GET RECORD TYPE BYTE AND
43455  4313           JMS      DV49SB         /   CALL ROUTINE TO CALL PROCESS MODULE.
43456  6213           CDI      FBP310
43457  5116           JMP   I  ZA0106         / RETURN TO TBP31A.
43460  1143  DV9421,  TDP421                  / LINK TO SET CNV/CNB FLAG RTN.

                      ////////                                    ////////
                      /                                                  /
                      /        MODULE:                                   /
                      /              TDP493 - DIALOGUE CONTROL.          /
                      /                                                  /
                      /        FUNCTION:                                 /
                      /              TO CALL THE MODULE TO PROCESS THE INPUT /
                      /           FROM THE KEYBOARD.                     /
                      /                                                  /
                      /        FORM OF CALL:                             /
                      /              CIF      FBP490                     /
                      /              JMS   I  X         (X HOLDS TDP493). /
                      /                                                  /
                      ////////                                    ////////

43461  7401           1-1^2+7401             /*1 VARIABLE LOCATIONS FOLLOW
43462  0000  TDP493,  .-.
43463  3246           DCA      TDP492         / SAVE FUNCTION CODE.
43464  1762           TAD   I  DV93A0
43465  0061           AND      ZP0077
43466  1074           TAD      ZM0004
43467  7450           SNA                     / CURRENT MODE = CN1?
43470  5274           JMP      DV93LA         /   YES - OK.
43471  1077           TAD      ZP7777
43472  7640           SZA CLA                 / CURRENT MODE = CN2?
43473  5310           JMP      DV93LB         /   NO - INVALID MODE SO RETURN.
43474  6211  DV93LA,  CDF      FDP490
43475  7701           ACL
43476  3202           DCA      TDP491         / SAVE KB CHAR.
43477  4567           JMS   I  ZKD42C         / CALL TDP42C TO GET CONTROL BLOCK.
43500  1202           TAD      TDP491
43501  7421           MQL                     / RESTORE KB CHAR.
43502  1246           TAD      TDP492
43503  1361           TAD      DV93AA
43504  3004           DCA      ZWORK1         / SAVE MODULE ADDRESS TABLE ADDRESS.
43505  1404           TAD   I  ZWORK1
43506  3004           DCA      ZWORK1         / OBTAIN MODULE ADDRESS
43507  4404           JMS   I  ZWORK1         /   AND CALL IT.
43510  6223  DV93LB,  CDI      FBE230
43511  5662           JMP   I  TDP493         / RETURN.
                 / ======================================
                 / = ROUTINE TO SEARCH TABLE FOR MATCHING=
                 / =  RECORD TYPE AND CALL RELEVANT MOD. =
                 / ======================================

43512  7401           1-1^2+7401             /*1 VARIABLE LOCATIONS FOLLOW
43513  0000  DV49SB,  .-.
43514  7041           CIA
43515  3004           DCA      ZWORK1         / SAVE NEGATED RECORD TYPE.
43516  1363           TAD      DV49KA
43517  3005           DCA      ZWORK2         / SET COUNT FOR SEARCH.
43520  1364           TAD      DV49AC
43521  3006           DCA      ZWORK3         / SET UP TABLE POINTER.
43522  1406  DV49LA,  TAD   I  ZWORK3
43523  0067           AND      ZP0377
43524  1004           TAD      ZWORK1
43525  7640           SZA CLA                 / MATCH FOUND?
43526  5351           JMP      DV49LB         / NO - CONTINUE SEARCH.
43527  7330           WK4000
43530  0406           AND   I  ZWORK3
43531  1262           TAD      TDP493
43532  7640           SZA CLA                 / IS RECORD TYPE VALID?
43533  5713           JMP   I  DV49SB         / NO - RETURN.
43534  1406           TAD   I  ZWORK3
43535  7104           CLL RAL
43536  7002           BSW
43537  0060           AND      ZP0070
43540  1022           TAD      ZKCIF
43541  3346           DCA      DV49IA         / CREATE CIF TO PROCESS MODULE.
43542  2006           ISZ      ZWORK3
43543  1406           TAD   I  ZWORK3
43544  3006           DCA      ZWORK3         / GET MODULE ADDRESS.
43545  7401           1-1^2+7401             /*1 VARIABLE LOCATIONS FOLLOW
43546  0000  DV49IA,  0
43547  4406           JMS   I  ZWORK3         / CALL MODULE.
43550  5713           JMP   I  DV49SB         / RETURN.
43551  2006  DV49LB,  ISZ      ZWORK3
43552  2006           ISZ      ZWORK3
43553  2005           ISZ      ZWORK2
43554  5322           JMP      DV49LA         / CONTINUE IF SEARCH NOT
43555  5713           JMP   I  DV49SB         /   COMPLETE ELSE RETURN.
```

```
                        / ========================================
                        / = CONSTANT DATA IDENTIFIERS.           =
                        / ========================================

43556   0102  DV91AA, ZBCDUA              / A - DESK UNIT ENABLEMENT WORD IN TBC200.
43557   0350  DV49AA, DM6CDF              / A - CDF TO BUFFER IN TDP51*.
43560   0340  DV49AB, D45FRA              / A - BUFFER START VARIABLE IN TDP51*.
43561   3564  DV93AA, DV93TA-1            / A - MODULE TABLE.
43562   0104  DV93AB, ZBCDCM              / A - DESK UNIT MODE.
43563   7755  DV49KA, -23                 / K - NUMBER OF DV49TA ENTRIES.
43564   3602  DV19AC, DV49TA              / A - RECORD TYPE/MODULE TABLE.


                        / ========================================
                        / = MODULE ADDRESS TABLE USED BY TDP493.=
                        / ========================================

43565   3651  DV93TA, TDP494              / A - ACTION TRANSMIT - DIALOGUE MODULE.
43566   4043          TDP411              / A - DATA CHARACTER MODULE.
43567   4123          TDP413              / A - ENDLINE - DIALOGUE MODULE.
43570   3741          TDP416              / A - FORCE TRANSMIT MODULE.
43571   6202          TDP451              / A - INTERRUPT MODULE.
43572   7201          TDP461              / A - PRINT/STATS MODULE.
43573   6601          TDP471              / A - BELL REQUEST MODULE.
43574   5643          TDP474              / A - HIGHLIGHT MODULE.
43575   5475          TDP434              / A - DIALOGUE LINE FORWARD MODULE.
43576   5502          TDP435              / A - DIALOGUE LINE BACK MODULE.
43577   5507          TDP436              / A - DIALOGUE PAGE FORWARD MODULE.
43600   5514          TDP437              / A - DIALOGUE PAGE BACK MODULE.
43601   5401          TDP431              / A - REFRESH CN2 DISPLAY IF NECESSARY MODULE.
                        / ========================================
                        / = RECORD TYPE/MODULE ADDRESS TABLE.    =
                        / ========================================

43602   6700  DV49TA, FDP310^40+4300      / B - CN1/CN2 FLAG(0:1),FIELD(1:3),RECORD TYPE(4:8).
43603   3401          TDP315              / A - CONNECT REQUEST RECEIVED MODULE.
43604   6701          FDP310^40+4301
43605   4001          TDP316              / A - CONNECT REPLY RECEIVED MODULE.
43606   6702          FDP310^40+4302
43607   4201          TDP317              / A - CONNECT FAILED RECEIVED MODULE.
43610   6304          FDP410^40+4304
43611   4201          TDP412              / A - TEXT RECEIVED MODULE.
43612   6310          FDP450^40+4310
43613   6401          TDP454              / A - CONTROL REQUEST RECEIVED MODULE.
43614   6311          FDP450^40+4311
43615   6646          TDP455              / A - CONTROL REPLY RECEIVED MODULE.
43616   6314          FDP470^40+4314
43617   6056          TDP473              / A - BELL REQUEST RECEIVED MODULE.
43620   6315          FDP470^40+4315
43621   6032          TDP472              / A - BELL REPLY MODULE.
43622   6720          FDP320^40+4320
43623   7001          TDP323              / A - DISCONNECT REQUEST RECEIVED MODULE.
43624   6721          FDP320^40+4321
43625   6001          TDP325              / A - DISCONNECT STATEMENT RECEIVED MODULE.
43626   6722          FDP320^40+4322
43627   6050          TDP328              / A - DISCONNECT REJECTION RECEIVED MODULE.
43630   2601          FDP310^40+201
43631   3602          TDP313              / A - CONTACT REPLY RECEIVED MODULE.
43632   2603          FDP330^40+203
43633   5001          TDP332              / A - LEAVE MSG REPLY RECEIVED MODULE.
43634   2604          FDP330^40+204
43635   5077          TDP333              / A - LEFT MSG STATEMENT RECEIVED MODULE.
43636   2605          FDP210^40+205
43637   0402          TDP211              / A - NEW CALL MODULE.
43640   2607          FDP210^40+207
43641   0601          TDP212              / A - DEQUEUE CALL MODULE.
43642   2611          FDP330^40+211
43643   5077          TDP333              / A - LEFT MSG STATEMENT RECEIVED MODULE.
43644   2614          FDP120^40+214       /
43645   5202          TDP121              / A - AUTHORISATION MODULE.
43646   2616          FDP120^40+216       /
43647   5405          TDP122              / A - TABLE UPDATE RECEIVED MODULE.
                      ////////                                   ////////
                      /                                                 /
                      /        MODULE:                                  /
                      /               TDP494 - ACTION TRANSMIT - DIALOGUE. /
                      /                                                 /
                      /        FUNCTION:                                /
                      /               TO CALL MODULE TO PROCESS DIALOGUE TEXT./
                      /                                                 /
                      /        FORM OF CALL:                            /
                      /               JMS BY TDP493.                    /
                      /                                                 /
                      ////////                                   ////////

43650   7401          I=1^2+7401          /*I VARIABLE LOCATIONS FOLLOW
43651   0000  TDP494, .-.
43652   6221          CDF     20
43653   1734          TAD  I  DV91AA
43654   7650          SNA CLA             / IS OPERATOR INPUT FUNCTION NULL?
43655   5313          JMP     DV94LD      / YES - GO HANDLE.
43656   7316          *M0063
43657   1734          TAD  I  DV91AA
43660   6241          CDF     FDP490
```

```
43661  7450           SNA                            / IS FUNCTION TXFER?
43662  5267           JMP      DV94LA                / YES - GO HANDLE.
43663  1077           TAD      ZF7777
43664  7650           SNA CLA                        / IS FUNCTION INSERT?
43665  5272           JMP      DV94LB                / YES - GO HANDLE.
43666  5326           JMP      DV94LF                / NO - GO DO ERROR.


               / =====================================
               / = FUNCTION IS TRANSFER.             =
               / =====================================

43667  6253   DV94LA, CDI      FDP320                /
43670  4735           JMS   I  DV94AB                / CALL TDP321 (TRANSFER)
43671  5651           JMP   I  TDP494                /   AND RETURN.


               / =====================================
               / = FUNCTION IS I*SERT.               =
               / =====================================

43672  4535   DV94LB, JMS   I  ZKD42G                / CALL TDP42G TO GET CONV'N STATUS.
43673  7450           SNA                            / IS STATUS DIALOGUE?
43674  5304           JMP      DV94LC                / YES - GO HANDLE.
43675  7001           IAC
43676  7001           IAC
43677  7640           SZA CLA                        / IS STATUS CONTACT?
43700  5326           JMP      DV94LF                / NO - GO DO ERROR.
43701  6252           CIF      FDP330                / FUNCTION IS INSERT AND STATUS =
43702  4736           JMS   I  DV94AC                /   CONTACT - CALL TDP331 (LEAVE MESSAGE)
43703  5651           JMP   I  TDP494                /   AND RETURN.
43704  1102   DV94LC, TAD      ZDCCOS
43705  7640           SZA CLA                        / CONTROL STATUS=SEND?
43706  5651           JMP   I  TDP494                / NO - RETURN.
43707  4737           JMS   I  DV94AD                / YES - CALL TDP415 (INSERT LINE TEXT) AND
43710  7640           SZA CLA                        / ALL TEXT PROCESSED ?
43711  5321           JMP      DV94LE                / YES - GO TO CALL TDP441 (TRANSMIT FROM DIALOGUE).
43712  5324           JMP      DV94LG                / NO


               / =====================================
               / = FUNCTION IS NULL.                 =
               / =====================================

43713  4535   DV94LD, JMS   I  ZKD42G                / CALL TDP42G TO GET CONV'N STATUS.
43714  7640           SZA CLA                        / IS STATUS DIALOGUE?
43715  5326           JMP      DV94LF                / NO - GO DO ERROR.
43716  1102           TAD      ZDCCOS                / YES -
43717  7640           SZA CLA                        /   IS CONTROL STATUS SEND?
43720  5651           JMP   I  TDP494                / NO - RETURN.
43721  4553   DV94LE, JMS   I  ZKD422                / FIND ROOM FOR TEXT
43722  7650           SNA CLA                        / PRINT BEEN DEMANDED ?
43723  7001           IAC                            / NO - SET PARAMETER TO TRUE
43724  4541   DV94LG, JMS   I  ZKD441                /   CALL TDP441 (TRANSMIT FROM DIALOGUE)
43725  5651           JMP   I  TDP494                /   AND RETURN.


               / =====================================
               / = ERROR PROCESSING SECTION.         =
               / =====================================

43726  1052   DV94LF, TAD      ZP0007
43727  6222           CIF      FBP220                / CALL TBP22L (DISPLAY MSG LINE) TO
43730  4566           JMS   I  ZKB22L                /   DISPLAY "INVALID FUNCTION".
43731  6222           CIF      FBP230
43732  4572           JMS   I  ZKB23S                / CALL TBP23S TO UNLOCK THE
43733  5651           JMP   I  TDP494                /   KEYBOARD AND RETURN.


               / =====================================
               / = CONSTANT DATA IDENTIFIERS.        =
               / =====================================

43734  0110   DV94AA, ZBCCIF                         / A - OPERATOR INPUT FUNCTION IN TBC210.
43735  6273   DV94AB, TDP321                         / A - TRANSFER MODULE.
43736  4603   DV94AC, TDP331                         / A - LEAVE MESSAGE MODULE.
43737  4430   DV94AD, TDP415                         / A - INSERT LINE TEXT MODULE.

                      ////////                                       ////////
                      /                                                     /
                      /       COMPONENT:                                    /
                      /               DP4150.RB - DIALOGUE ENTRY/RECEIPT,   /
                      /               VERSION 1 - 30/5/'79,                 /
                      /               AUTHOR - J.BARTON.                    /
                      /                                                     /
                      /       COMPRISES:                                    /
                      /               TDP416 - FORCE TRANSMIT.              /
                      /               TDP41A - 20 SECOND CN1 TIMEOUT,       /
                      /               TDP41B - 20 SECOND CN2 TIMEOUT,       /
                      /               TDP411 - DATA CHARACTER,              /
                      /               TDP413 - ENDLINE DIALOGUE,            /
                      /               TDP412 - TEXT RECEIVED,               /
                      /               TDP415 - INSERT LINE TEXT,            /
                      /                                                     /
                      ////////                                       ////////
```

```
        0000          FIELD   FAP410%10
        0516          *2^50+TAR417-2
00516   0040          FDP410
00517   4000          TDP41A                / A - TASK DATA FOR TDP41A.
00520   0040          FDP410
00521   4001          TDP41B                / A - TASK DATA FOR TDP41B.


        1332          *4^51+TAD322-4
01332   0000          0
01333   7634          -144
01334   0000          0
01335   0050          50                    / 20 SECOND ECB FOR DU1:CN1.
01336   0000          0
01337   7634          -144
01340   0000          0
01341   0051          51                    / 20 SECOND ECB FOR DU1:CN2.
01342   0000          0
01343   7634          -144
01344   0000          0
01345   0050          50                    / 20 SECOND ECB FOR DU2:CN1.
01346   0000          0
01347   7634          -144
01350   0000          0
01351   0051          51                    / 20 SECOND ECB FOR DU2:CN2.
01352   0000          0
01353   7634          -144
01354   0000          0
01355   0050          50                    / 20 SECOND ECB FOR DU3:CN1.
01356   0000          0
01357   7634          -144
01360   0000          0
01361   0051          51                    / 20 SECOND ECB FOR DU3:CN2.
01362   0000          0
01363   7634          -144
01364   0000          0
01365   0050          50                    / 20 SECOND ECB FOR DU4:CN1.
01366   0000          0
01367   7634          -144
01370   0000          0
01371   0051          51                    / 20 SECOND ECB FOR DU4:CN2.
01372   0000          0
01373   7634          -144
01374   0000          0
01375   0050          50                    / 20 SECOND ECB FOR DU5:CN1.
01376   0000          0
01377   7634          -144
01400   0000          0
01401   0051          51                    / 20 SECOND ECB FOR DU5:CN2.
01402   0000          0
01403   7634          -144
01404   0000          0
01405   0050          50                    / 20 SECOND ECB FOR DU6:CN1.
01406   0000          0
01407   7634          -144
01410   0000          0
01411   0051          51                    / 20 SECOND ECB FOR DU6:CN2.
                      ////////                                        ////////
                      /                                                      /
                      /       MODULE:                                        /
                      /               TDP416 - FORCE TRANSMIT.               /
                      /       FUNCTION:                                      /
                      /               EFFECTS TRANSMISSION OF TEXT IF THE    /
                      /           OPERATOR INPUT FUNCTION CHANGES TO INSRT OR /
                      /           TXFER WHEN IN MODES CN1 OR CN2.            /
                      /       FORM OF CALL:                                  /
                      /               JMS BY TDP493 (DIALOGUE CONTROL).      /
                      /                                                      /
                      ////////                                        ////////
        0004          FIELD   FDP410%10
        3740          *TDP416-1
43740   7401          1-1^2+7401            /*1 VARIABLE LOCATIONS FOLLOW
43741   0000  TDP416, .-.
43742   4535          JMS  I  ZKD42G        / GET CONV'N STATUS.
43743   7640          SZA CLA               / IS STATUS DIALOGUE?
43744   5741          JMP  I  TDP416        / NO - RETURN TO TDP493 (DIALOGUE CONTROL).
43745   1102          TAD     ZOCCUS
43746   7640          SZA CLA               / IS CONTROL STATUS SEND?
43747   5741          JMP  I  TDP416        / NO
43750   1113          TAD     ZOCCLT        / CHECK CHARS SINCE LAST XMIT
43751   7640          SZA!CLA
43752   4541          JMS  I  ZKD441        / YES - TRANSMIT LATEST TEXT.
43753   5741          JMP  I  TDP416        / RETURN TO TDP493.

              / ======================================
              / = ROUTINE TO FIND ROOM FOR N CHARS    =
              / =  OR NEWLINE IN DIALOGUE BUFFER.     =
              / ======================================

43754   7401          1-1^2+7401            /*1 VARIABLE LOCATIONS FOLLOW
43755   0000  DN41SA, .-.
43756   7421          MQL
43757   7521          MQA MQL               / CALL TDP422 TO FIND ROOM FOR
```

```
43760  4553          JMS  I  ZKD422          /   N CHARS OR NEWLINE.
43761  7650          SNA CLA
43762  2355          ISZ     DN41SA          / INCREMENT RETURN ADDRESS IF PRINT NOT DEMANDED.
43763  5755          JMP  I  DN41SA          / RETURN.

              / ======================================
              / = ROUTINE TO COPY CHARACTER INTO THE  =
              / =  DIALOGUE BUFFER.                   =
              / ======================================
43764  7403          2-1^2+7401              /*2 VARIABLE LOCATIONS FOLLOW
43765  0000  DNCHAR, 0                       / C - 6-BIT CHAR FROM KEYBOARD.
43766  0000  DN41SB, .-.
43767  7301          WR0001
43770  7421          MQL                     / SET UP MQ FOR BOTTOM HALF OF WORD.
43771  7701          ACL                     / SET UP AC FOR SINGLE CHARACTER.
43772  4554          JMS  I  ZKD423          / COPY THE CHAR OVER.
43773  0000          0                       / FIXED PARS SO NO ZKNOP NEEDED.
43774  6241          CDF     FDP410
43775  3765          DNCHAR
43776  5766          JMP  I  DN41SB          / RETURN.
43777  0000          ZBLOCK  .+200&7600-.    /*ZERO FILL PAGE
                     ////////                                        ////////
                     /                                                      /
                     /          TASKS:                                      /
                     /                  TDP41A&B - 20 SECOND CN1/CN2 TIMEOUT.  /
                     /                                                      /
                     /          FUNCTION:                                   /
                     /                  PREVENTS CONNECTION BEING LOST FOR ANY  /
                     /              CONVERSATION.                           /
                     /                                                      /
                     ////////                                        ////////


44000  7340  TDP41A, WM0001
44001  1050  TDP41B, TAD     ZP0005
44002  3226          DCA     DNMODE          / SET MODE (CN1 FOR 41A, CN2 FOR 41B).
44003  1043          TAD     ZK0006
44004  3376          DCA     DNLCTL          / SET LOOP CONTROL FOR SIX DUS.
44005  1374          TAD     DNECB0
44006  1226          TAD     DNMODE
44007  3377          DCA     DNECBN          / SET UP FIRST ECB NUMBER.

44010  1377  DNLOOP, TAD     DNECBN
44011  6202          CIF     FAP320
44012  6002          IOF                     /// CALL TAP322 TO GET TIMER
44013  4431          JMS  I  ZKA322          ///   VALUE FOR THIS DU & MODE.
44014  6001          ION                     ///
44015  7640          SZA CLA                 /// TIMER VALUE = 0?
44016  5234          JMP     DNABLA          /   NO - GO EXAMINE NEXT DU ECB.
44017  1376          TAD     DNLCTL
44020  1052          TAD     ZP0007
44021  3225          DCA     DNDKUN          / SET UP DESK UNIT NUMBER.
44022  6222          CIF     FBP210
44023  4557          JMS  I  ZKB213          /// CALL TBP213 TO GET DESK UNIT & MODE DATA.
44024  7403          2-1^2+7401              /*2 VARIABLE LOCATIONS FOLLOW
44025  0000  DNDKUN, 0                       / F - DESK UNIT NUMBER.
44026  0000  DNMODE, 0                       / F - MODE (CN1 OR CN2).
44027  7300          WKLEAR                  / IGNORE RETURN STATUS.
44030  4567          JMS  I  ZKD42C          / CALL TDP42C TO GET CONV'N CONTROL BLOCK.
44031  4535          JMS  I  ZKD42G          / CALL TDP42G TO GET CONV'N STATUS.
44032  7650          SNA CLA                 / IS STATUS = DIALOGUE?
44033  4541          JMS  I  ZKD441          /   YES - CALL TDP441 TO TRANSMIT TEXT.
44034  2377  DNABLA, ISZ     DNECBN
44035  2377          ISZ     DNECBN
44036  2376          ISZ     DNLCTL
44037  5210          JMP     DNLOOP          / REPEAT FOR ALL SIX DUS.
44040  6203          CDI     0
44041  5424          JMP  I  ZKA416          /// EXIT BACK TO SCHEDULER.
                     ////////                                        ////////
                     /                                                      /
                     /          MODULE:                                     /
                     /                  TDP411 - DATA CHARACTER.            /
                     /                                                      /
                     /          FUNCTION:                                   /
                     /                  PROCESSES THE TEXT CHARACTER KEYED WHEN /
                     /              IN MODES CN1 OR CN2.                    /
                     /                                                      /
                     /          FORM OF CALL:                               /
                     /                  JMS BY TDP493 (DIALOGUE CONTROL).   /
                     /                                                      /
                     ////////                                        ////////

44042  7401          1-1^2+7401              /*1 VARIABLE LOCATIONS FOLLOW
44043  0000  TDP411, .-.
44044  7701          ACL
44045  0061          AND     ZP0077
44046  3766          DCA  I  DNCHAD          / SAVE CHARACTER KEYED.

              / ======================================
              / = CHECK FOR CORRECT STATE TO PROCESS. =
              / ======================================

```

```
44047  6221          CDF     FBP210
44050  1767          TAD  I  DN11AA
44051  6241          CDF     FDP410
44052  7640          SZA CLA                  / IS OPERATOR INPUT FUNCTION NULL?
44053  5643          JMP  I  TDP411           / NO - IGNORE CHAR.
44054  4535          JMS  I  ZKD42G           / CALL TDP42G TO GET CONV'N STATUS.
44055  7640          SZA CLA                  / IS STATUS DIALOGUE?
44056  5643          JMP  I  TDP411           / NO - IGNORE CHAR.
44057  1102          TAD     ZDCCOS
44060  7640          SZA CLA                  / IS CONTROL STATUS SEND?
44061  5643          JMP  I  TDP411           / NO - IGNORE CHAR.


              / ======================================
              / = STATUS OK SO PROCESS TEXT CHAR.    =
              / ======================================

44062  7301          WP0001
44063  4764          JMS  I  DN11AB           / CALL ROUTINE TO FIND ROOM FOR SINGLE CHAR
44064  5643          JMP  I  TDP411           /    IN DIALOGUE BUFFER AND RETURN IF NONE.
44065  4576          JMS  I  ZKD424           / REMEMBER CURRENT DIALOGUE POSITION.
44066  4765          JMS  I  DN11AC           / CALL ROUTINE TO PUT CHAR IN DIALOGUE BUFFER.
44067  2113          ISZ     ZDCCLT           / INCREMENT NO. OF CHARS SINCE LAST TRANS'N.
44070  4307          JMS     DN11SR           / DO LINE FULL CHECK
44071  1371          TAD     DN11KA
44072  1113          TAD     ZDCCLT
44073  7700          SMA CLA                  / NO. OF UNTRANS'D CHAR > 14?
44074  5304          JMP     DN11LB           / YES - GO TRANSMIT.
44075  1373          TAD     DN11KB
44076  1113          TAD     ZDCCLT
44077  7750          SPA SNA CLA              / NO. OF UNTRANS'D CHARS > 10?
44100  5643          JMP  I  TDP411           / NO - END OF MODULE.
44101  1045          TAD     ZM0040
44102  1766          TAD  I  DNCHAD
44103  7650          SNA CLA                  / IS CHAR SPACE?
44104  4541   DN11LB, JMS I  ZKD441           / TRANSMIT LATEST TEXT.
44105  5643          JMP  I  TDP411           / RETURN TO TDP493 (DIALOGUE CONTROL).

              / SR TO INJECT NEWLINE IF CURRENT LINE IS FULL AND DISPLAY LATEST TEXT
44106  7401          1-1^2+7401               /41 VARIABLE LOCATIONS FOLLOW
44107  0000   DN11SR, .-.
44110  1107          TAD     ZDCCCL
44111  1370          TAD     DNFLIN
44112  7640          SZA CLA                  / IS CURRENT LINE FULL?
44113  5320          JMP     DN11LA           / NO.
              / ======================================
              / = HANDLE FORCED END OF LINE.         =
              / ======================================

44114  4764          JMS  I  DN11AB           / CALL ROUTINE TO FIND ROOM FOR NEWLINE
44115  5320          JMP     DN11LA           / NO ROOM SO DONT INSERT
44116  4552          JMS  I  ZKD421           / ADD NEWLINE TO DIALOGUE BUFFER.
44117  4541          JMS  I  ZKD441           / EFFECT TRANSMISSION OF PREVIOUS TEXT.
44120  4577   DN11LA, JMS I  ZKD425           / DISPLAY NEW TEXT.
44121  5707          JMP  I  DN11SR
                     ////////                                  ////////
                     /                                                /
                     /        MODULE:                                 /
                     /               TDP413 - ENDLINE - DIALOGUE.     /
                     /                                                /
                     /        FUNCTION:                               /
                     /               HANDLES THE CURRENT DIALOGUE LINE. /
                     /                                                /
                     /        FORM OF CALL:                           /
                     /               JMS BY TDP493 (DIALOGUE CONTROL). /
                     /                                                /
                     ////////                                  ////////

44122  7401          1-1^2+7401               /41 VARIABLE LOCATIONS FOLLOW
44123  0000   TDP413, .-.
44124  4535          JMS  I  ZKD42G           / GET CONV'N STATUS.
44125  7640          SZA CLA                  / IS STATUS DIALOGUE?
44126  5360          JMP     DN13LB           / NO - INVALID.
44127  1102          TAD     ZDCCOS
44130  7640          SZA CLA                  / IS CONTROL STATUS SEND?
44131  5360          JMP     DN13LB           / NO - INVALID.
44132  6221          CDF     FBP210
44133  1767          TAD  I  DN13AA           / GET OPERATOR INPUT FUNCTION.
44134  6241          CDF     FDP410
44135  7450          SNA
44136  5346          JMP     DN13LA           / NULL - HANDLE DIRECT ENTRY LINE.
44137  1074          TAD     ZM0004
44140  7640          SZA CLA
44141  5360          JMP     DN13LB           / NOT NULL OR INSERT - INVALID.


              / ======================================
              / = PROCESS THE INSERT LINE.           =
              / ======================================

44142  4772          JMS  I  DN13AB           / CALL TDP415 TO HANDLE INSERT LINE.
44143  7300          WKLEAR                   / SET TDP441 PARAMETER = NO CHANGE OF CONTROL.
44144  4541          JMS  I  ZKD441           / EFFECT TRANSMISSION OF NEW TEXT.
44145  5723          JMP  I  TDP413           / RETURN TO TDP493 (DIALOGUE CONTROL).
```

```
                    / ======================================
                    / = PROCESS DIRECT ENTRY LINE.         =
                    / ======================================

 44146  1107  DN13LA, TAD      ZDCCCL
 44147  7650          SNA CLA                    / EMPTY LINE?
 44150  5723          JMP  I  TDP413             / YES - IGNORE BY RETURNING TO CALLER.
 44151  4764          JMS  I  DN13AC             / FIND ROOM FOR NEWLINE.
 44152  5723          JMP  I  TDP413             / NO ROOM SO RETURN TO TDP493.
 44153  4576          JMS  I  ZKD424             / REMEMBER CURRENT DIALOGUE POSITION.
 44154  4552          JMS  I  ZKD421             / ADD NEWLINE TO DIALOGUE BUFFER.
 44155  4577          JMS  I  ZKD425             / DISPLAY LATEST TEXT.
 44156  4541          JMS  I  ZKD441             / TRANSMIT LATEST TEXT.
 44157  5723          JMP  I  TDP413             / RETURN TO TDP493 (DIALOGUE CONTROL).


                    / ======================================
                    / = ENDLINE IS INVALID IN CONTEXT.     =
                    / ======================================

 44160  1052  DN13LB, TAD      ZP0007
 44161  6222          CIF      FBP220
 44162  4566          JMS  I  ZKB22L             /// CALL TBP22L TO DISPLAY "INVALID FUNCTION"
 44163  5723          JMP  I  TDP413             /   AND RETURN TO TDP413 (DIALOGUE CONTROL).


                    / ======================================
                    / =     CONSTANT DATA IDENTIFIERS.     =
                    / ======================================

              DN13AC,
 44164  3755  DN11AB, DN41SA                     / A - ROUTINE TO FIND ROOM FOR SINGLE CHAR,
 44165  3766  DN11AC, DN41SB                     / A - ROUTINE TO COPY SINGLE CHAR TO BUFFER.
 44166  3765  DNCHAD, DNCHAR                     / A - SIX-BIT CHARACTER.
              DN11AA,
 44167  0110  DN13AA, ZBCCIF                     / A - OPERATOR INPUT FUNCTION.
 44170  7704  DNFLIN, -74                        / K - NEGATIVE FULL DIALOGUE LINE.
 44171  7761  DN11KA, -17                        / K - MINUS 15.
 44172  4430  DN13AB, TDP415                     / A - INSERT LINE TEXT MODULE.
 44173  7766  DN11KB, -12                        / K - MINUS 10.
 44174  0045  DNECBO, 45                         / K - ECB OFFSET FOR 20 SECOND WAITS.


                    / ======================================
                    / =     VARIABLE DATA IDENTIFIERS.     =
                    / ======================================

 44175  7403          2-1^2+7401                 /*2 VARIABLE LOCATIONS FOLLOW
 44176  0000  DNLCTL, 0                          / F - LOOP CONTROL VARIABLE.
 44177  0000  DNECBN, 0                          / F - ECB NUMBER.
                      ////////                                      ////////
                      /                                                    /
                      /       MODULE:                                      /
                      /             TDP412 - TEXT RECEIVED.                /
                      /                                                    /
                      /       FUNCTION:                                    /
                      /             PROCESSES THE RECORD RECEIVED FOR A    /
                      /       DIALOGUE.                                    /
                      /                                                    /
                      /       FORM OF CALL:                                /
                      /             JMS BY TDP491 (DIALOGUE RECEPTION).    /
                      /                                                    /
                      ////////                                      ////////

 44200  7401          1-1^2+7401                 /*1 VARIABLE LOCATIONS FOLLOW
 44201  0000  TDP412, .-.


                    / ======================================
                    / = CHECK FOR VALID STATUS.            =
                    / ======================================

 44202  4535          JMS  I  ZKD42G             / GET CONV'N STATUS.
 44203  7640          SZA CLA                    / IS STATUS DIALOGUE?
 44204  5601          JMP  I  TDP412             / NO - INVALID SO RETURN.
 44205  1102          TAD      ZDCCOS
 44206  7640          SZA CLA                    / IS CONTROL STATUS RECEIVE?
 44207  5215          JMP      DN12LB            / YES
 44210  1050          TAD      ZP0005            /
 44211  4534          JMS  I  ZKD515             /
 44212  0061          AND      ZP0077            /
 44213  3116          DCA      ZDCPLN            / STORE PRINTABLE LINE NUMBER
 44214  5347          JMP      DN12LI            /GO TO INVALID STATUS PROCESSING
 44215  6251  DN12LB, CDF      50
 44216  1763          TAD  I  DN12AA
 44217  6241          CDF      FDP410
 44220  7640          SZA CLA                    / IS SECONDARY STATUS NORMAL?
 44221  5347          JMP      DN12LI            / NO - INVALID STATUS.


                    / ======================================
                    / = CHECK FOR CORRECT SEQUENCING.      =
                    / ======================================
```

```
44222  1051            TAD     ZP0006
44223  4534            JMS  I  ZKD515          / GET TEXT SEQUENCE FROM RECORD.
44224  7041            CIA
44225  7440            SZA
44226  7001            IAC
44227  1112            TAD     ZDCTXS          / SEQUENCING IS OK IF BOTH ZERO OR
44230  7640            SZA CLA                 /   ONE IN RECORD IS ONE GREATER.
44231  5340            JMP     DN12LH          / INCORRECT - DO CONTROL REQUEST.
                / =====================================
                / = SEQUENCING OK SO PROCESS RECORD.  =
                / =====================================

44232  7305            WP0002
44233  4534            JMS  I  ZKD515
44234  1042            TAD     ZM0005
44235  7040            CMA                     / SAVE NEGATED NUMBER OF PACKED
44236  3373            DCA     DN12CA          /   TEXT CHARS+1 FOR LOOP CONTROL.
44237  1050            TAD     ZP0005
44240  4534            JMS  I  ZKD515
44241  0061            AND     ZP0077
44242  3116            DCA     ZDCPLN          / STORE PRINTABLE LINE NUMBER.
44243  4576            JMS  I  ZKD424          / REMEMBER DIALOGUE POSITION.
44244  1051            TAD     ZP0006
44245  4534            JMS  I  ZKD515
44246  3112            DCA     ZDCTXS          / SET TEXT SEQUENCE.
44247  2373            ISZ     DN12CA          / EMPTY RECORD?
44250  7410            SKP
44251  5300            JMP     DN12LC          / YES - GO CHECK FOR CONTROL CHANGE.
44252  1052            TAD     ZP0007
44253  3374            DCA     DN12OA          / SET RECORD OFFSET.
44254  1374    DN12LA, TAD     DN12OA
44255  4534            JMS  I  ZKD515          / GET TEXT WORD.
44256  3375            DCA     DN12TA
44257  1375            TAD     DN12TA
44260  7002            BSW
44261  0061            AND     ZP0077
44262  3761            DCA  I  DN12AF          / SAVE SIX-BIT CHAR.
44263  1761            TAD  I  DN12AF
44264  1362            TAD     DNNLCH
44265  4764            JMS  I  DN12AB          / PROCESS CHARACTER.
44266  5300            JMP     DN12LC          / END OF TEXT OR PRINT DEMANDED.

44267  1375            TAD     DN12TA
44270  0061            AND     ZP0077
44271  3761            DCA  I  DN12AF          / SAVE SIX-BIT CHAR.
44272  1761            TAD  I  DN12AF
44273  1362            TAD     DNNLCH
44274  4764            JMS  I  DN12AB          / PROCESS NEXT CHARACTER.
44275  5300            JMP     DN12LC          / END OF TEXT OR PRINT DEMANDED.
44276  2374            ISZ     DN12OA          / NOT END - INCREMENT RECORD OFFSET
44277  5254            JMP     DN12LA          /   GO GET NEXT TEXT WORD.
                / =====================================
                / = CHECK FOR CHANGE OF CONTROL.      =
                / =====================================

44300  1050    DN12LC, TAD     ZP0005
44301  4534            JMS  I  ZKD515
44302  0065            AND     ZP0200
44303  7650            SNA CLA                 / INDICATOR SET?
44304  5332            JMP     DN12LE          / NO - GO CHECK FOR TEXT DISPLAY.
44305  4765            JMS  I  DN12AC          / YES - FIND ROOM FOR NEWLINE.
44306  5337            JMP     DN12LG          / NO ROOM - DO CONTROL REQUEST.


                / =====================================
                / = HANDLE CHANGE OF CONTROL.         =
                / =====================================

44307  2117            ISZ     ZDCCHS          / INCREMENT CHARS RECEIVED COUNT.
44310  3102            DCA     ZDCCOS          / SET CONTROL STATUS = SEND.
44311  4552            JMS  I  ZKD421          / HANDLE NEWLINE.
44312  4562            JMS  I  ZKD429          / UPDATE APPLICATION STATUS.
44313  1106            TAD     ZDCCLN
44314  7002            BSW
44315  7001            IAC
44316  3114            DCA     ZDCLCU          / RESET TRANSMISSION
44317  3113            DCA     ZDCCLT          /   CONTROL VARIABLES.
44320  3112            DCA     ZDCTXS          / RESET TEXT SEQUENCE.
44321  1116            TAD     ZDCPLN
44322  4766            JMS  I  DN12AJ          / CONVERT PRINTABLE LINE
44323  7041            CIA                     /   NUMBER TO RELATIVE.
44324  1106            TAD     ZDCCLN
44325  7650            SNA CLA                 / SAME AS CURRENT LINE?
44326  5332            JMP     DN12LE          / YES - CONTINUE.
44327  6252            CIF     FDP320          / NO - CALL TDP329 TO HANDLE
44330  4556            JMS  I  ZKD329          ///   LOST CONNECTION AND RETURN
44331  5601            JMP  I  TDP412          /   TO TDP491 (DIALOGUE RECEPTION).


                / =====================================
                / = ATTEMPT TO DISPLAY TEXT RECEIVED. =
                / =====================================
```

```
44332  7301  DN12LE, WP0001                              /
44333  4577          JMS  I  ZKD425                      /


               / =======================================
               / = TEST FOR PRINT DEMANDED.             =
               / =======================================

44334  1115  DN12LZ, TAD      ZDCPSC
44335  7700          SMA CLA                             / PRINT DEMANDED?
44336  5347          JMP      DN12LI                     / NO - CONTROL REQUEST NOT NEEDED.
               / =======================================
               / = HANDLE CONTROL REQUEST.              =
               / =======================================

44337  7340  DN12LG, WM0001                              / PRINT DEMANDED = 4.
44340  1050  DN12LH, TAD      ZP0005                     / INVALID SEQUENCING = 5.
44341  6251          CDF      50
44342  3763          DCA  I   DN12AA                     / SET SECONDARY STATUS.
44343  6241          CDF      FDP410
44344  6222          CIF      FBP230
44345  4574          JMS  I   ZKB23Z                     / LOCK KEYBOARD.
44346  4770          JMS  I   DN12AD                     / CALL TDP452 TO SEND CONTROL REQUEST.


               / =======================================
               / = SET UP CONNECTION LOST TIMEOUT.      =
               / =======================================

44347  6252  DN12LI, CIF      FDP340
44350  4570          JMS  I   ZKD345                     / CALCULATE PORT FOR
44351  1371          TAD      DN120B                     /   CURRENT DU & MODE.
44352  6202          CIF      FAP320                     /   ADD ECB OFFSET AND
44353  6002          IOF                                 /   SET UP 40 SECOND
44354  4432          JMS  I   ZKA323                     /// CONNECTION TIMEOUT.
44355  6001          ION                                 ///
44356  2120          ISZ      ZDCPKS                     /// INCREMENT PACKET
44357  7000          NOP                                 /// SAFEGUARD AGAINST WRAPROUND
44360  5601          JMP  I   TDP412                     /// RETURN TO TDP491 (DIALOGUE RECEPTION).


               / =======================================
               / =     CONSTANT DATA IDENTIFIERS.       =
               / =======================================

44361  3765  DN12AF, DNCHAR                              / A - SIX-BIT CHARACTER.
44362  7742  DNNLCH, -36                                 / K - NEGATIVE DESTRUCTIVE NEWLINE CHARACTER.
44363  0103  DN12AA, ZDCCDS                              / A - SECONDARY STATUS.
44364  4401  DN12AB, DN12SA                              / A - PROCESS RECORD CHARACTER ROUTINE.
44365  3755  DN12AC, DN41SA                              / A - FIND ROOM FOR SINGLE CHAR ROUTINE.
44366  2025  DN12AJ, TDP42E                              / A - LINE NUMBER CONVERSION MODULE.
44367  1000  DN12KA, 1000                                / K - UNDISPLAYED TEXT FLAG VALUE.
44370  6242  DN12AD, TDP452                              / A - CONTROL REQUEST MODULE.
44371  0024  DN120B, 24                                  / K - 40S ECB OFFSET.


               / =======================================
               / =     VARIABLE DATA IDENTIFIERS.       =
               / =======================================

44372  7405          3-1^2+7401                          /*3 VARIABLE LOCATIONS FOLLOW
44373  0000  DN12CA, 0                                   / F - NUMBER OF TEXT RECORD CHARS.
44374  0000  DN12OA, 0                                   / F - RECORD OFFSET.
44375  0000  DN12TA, 0                                   / F - TEXT WORD STORAGE.
44376  0000          ZBLOCK   .+200&7600-.               /*ZERO FILL PAGE
       4400          PAGE
               / =======================================
               / = ROUTINE TO PROCESS TEXT RECORD CHAR.=
               / =======================================

44400  7401          1-1^2+7401                          /*1 VARIABLE LOCATIONS FOLLOW
44401  0000  DN12SA, .-.
44402  7650          SNA CLA                             / CHAR = NEWLINE?
44403  5211          JMP      DN12LJ
44404  7301          WP0001                              / NO - FIND ROOM FOR
44405  4620          JMS  I   DN12AG                     /   SINGLE CHAR.
44406  5601          JMP  I   DN12SA                     / NO ROOM SO RETURN.
44407  4621          JMS  I   DN12AH                     / COPY CHAR TO DIALOGUE BUFFER.
44410  5214          JMP      DN12LK
44411  4620  DN12LJ, JMS  I   DN12AG                     / FIND ROOM FOR NEWLINE.
44412  5601          JMP  I   DN12SA                     / NO ROOM.
44413  4552          JMS  I   ZKD421                     / HANDLE NEWLINE.
44414  2117  DN12LK, ISZ      ZDCCHS                     / INCREMENT CHARS RECEIVED.
44415  2622          ISZ  I   DN12AI                     / INCREMENT RECORD CHAR COUNT.
44416  2201          ISZ      DN12SA
44417  5601          JMP  I   DN12SA                     / RETURN.


               / =======================================
               / =     CONSTANT DATA IDENTIFIERS.       =
               / =======================================

44420  3755  DN12AG, DN41SA                              / A - FIND ROOM IN BUFFER ROUTINE.
44421  3766  DN12AH, DN41SB                              / A - COPY CHAR TO BUFFER ROUTINE.
44422  4373  DN12AI, DN12CA                              / A - CHARACTER COUNT.
```

```
                    ////////                                          ////////
                    /                                                        /
                    /        MODULE:                                         /
                    /                TDP415 - INSERT LINE TEXT.              /
                    /        FUNCTION:                                       /
                    /                PROCESSES THE INSERT LINE TEXT WHICH    /
                    /            MAY CONTAIN ABBREVIATED TEXT. ALL PROCESSED /
                    /            TEXT IS MOVED TO THE DIALOGUE BUFFERS       /
                    /            UNLESS TRANSMISSION BECOMES NECESSARY.      /
                    /        FORM OF CALL:                                   /
                    /                JMS  BY ENDLINE - DIALOGUE, OR          /
                    /                       END CONTACT.                     /
                    /                                                        /
                    ////////                                          ////////

               / ======================================
               / =      VARIABLE DATA IDENTIFIERS.     =
               / ======================================

44423  7411            5-1^2+7401                /*5 VARIABLE LOCATIONS FOLLOW
44424  0000    DNRPAR, 0                         / F - RETURN PARAMETER.
44425  0000    DNNLIL, 0                         / F - NEGATIVE LENGTH OF INSERT LINE.
44426  0000    DNTCHS, 0                         / F - TOTAL NUMBER OF CHARS SEARCHED.
44427  0000    DNABCF, 0                         / B - ABBREVIATE CHAR. FOUND FLAG.

               / ======================================
               / = PERFORM INITIALISATION.            =
               / ======================================

44430  0000    TDP415, .-.
44431  6214            RDF
44432  1023            TAD      ZKCDI
44433  3355            DCA      DN15IB           / SET UP CDI FOR GLOBAL RETURN.
44434  6221            CDF      FBP210
44435  1760            TAD   I  DN15A6
44436  3147            DCA      DN15PA           / SET UP POINTER TO ILB.
44437  1021            TAD      ZKCDF
44440  1757            TAD   I  DN15AA
44441  6241            CDF      FDP410
44442  3772            DCA   I  DN15A4           / SET UP CDF TO INSERT LINE BUFFER.
44443  3146            DCA      DNHWIB           / CLEAR ILB HALF-WORD INDICATOR,
44444  3226            DCA      DNTCHS           /   TOTAL CHARS SEARCHED COUNT,
44445  3151            DCA      DNABFF           /   CURRENT TEXT EXPANDED FLAG.
44446  7301            WP0001
44447  3224            DCA      DNRPAR           / SET ALL IL PROCESSED FLAG.
44450  7301            WP0001
44451  3773            DCA   I  DN15A5           / SET LAST TEXT WAS EXPANSION FLAG.
44452  3774            DCA   I  DN15A6           / CLEAR SPACE TERMINATOR FLAG.
44453  4771            JMS   I  DN15A3           / GET WORD FROM ILB.
44454  7041            CIA
44455  3225            DCA      DNNLIL           / SAVE AS NEGATIVE LENGTH OF INSERT LINE.
44456  1772            TAD   I  DN15A4
44457  3766            DCA   I  DN15AS           / SET UP CDF TO ILB FOR DN15SE.
44460  4576            JMS   I  ZKD424           / REMEMBER CURRENT DIALOGUE POSITION.
               / ======================================
               / = HANDLE FIRST PART OF INSERT LINE   =
               / =  (NO ABBREVIATIONS).               =
               / ======================================

44461  4767            JMS   I  DN15AT           / PERFORM SEARCH INIT.
44462  4762            JMS   I  DN15AD           / SEARCH ILB FOR TERMINATOR.
44463  5262            JMP      .-1              / TERMINATOR WASN'T ABBREVIATE CHAR.
44464  3144            DCA      DNNCHS           / SET NUMBER OF CHARS SEARCHED TO EXCLUDE ABBREV. CHAR.
44465  3774            DCA   I  DN15A6           / CLEAR SPACE TERMINATOR FLAG.
44466  7410            SKP                       / DON'T SET TERMINATOR PROCESSING PARAMETER.

               / ======================================
               / = HANDLE REST OF INSERT LINE         =
               / =  (MAY CONTAIN ABBREVIATIONS).      =
               / ======================================

44467  7301    DN15LA, WP0001                    / SET TERMINATOR PROCESSING FLAG.
44470  4763            JMS   I  DN15AE           / PROCESS TEXT HANDLED SO FAR.
44471  1226    DN15LB, TAD      DNTCHS
44472  1225            TAD      DNNLIL
44473  7650            SNA CLA                   / ALL INSERT LINE PROCESSED?
44474  5346            JMP      DN15LE           / YES. - DO TERMINATION.
44475  4767            JMS   I  DN15AT           / PERFORM SEARCH INIT.
44476  4762            JMS   I  DN15AD           / SEARCH ILB FOR TERMINATOR.
44477  7000            NOP
44500  3144            DCA      DNNCHS           / EXCLUDE TERMINATOR FROM COUNT.
44501  1144            TAD      DNNCHS
44502  7450            SNA                       / TERMINATOR FOUND IMMEDIATELY?
44503  5332            JMP      DN15LD           / YES - GO HANDLE IT.
44504  1043            TAD      ZM0006
44505  7740            SMA SZA CLA               / NUMBER OF CHARS SEARCHED LESS THAN 7?
44506  5321            JMP      DN15LC           / NO - GO TREAT AS ORDINARY TEXT.
44507  4764            JMS   I  DN15AF           / YES - SET UP PARAMETERS FOR DN15SF
44510  4761            JMS   I  DN15AC           /  AND CALL IT TO SEARCH THE USER ABBR. TABLE.
44511  5321            JMP      DN15LC           / FOUND - GO HANDLE EXPANDED TEXT.
44512  7301            WP0001
44513  4761            JMS   I  DN15AC           / CALL DN15SF TO SEARCH THE SYSTEM ABBR. TABLE.
44514  5321            JMP      DN15LC           / FOUND - GO HANDLE EXPANDED TEXT.
```

```
44515  6252          CIF     50          / NOT FOUND IN EITHER TABLE -
44516  4765          JMS  I  DN1124      /   TERMINATE PROCESSING OF ILB
                                         /   IF DATE STAMP NOT PRESENT
44517  7650          SNA CLA             /   IN THE USER ABBREVIATION
44520  5347          JMP     DN15LF      /   CONTROL TABLE.
44521  4763  DN15LC, JMS  I  DN15AE      / PROCESS TEXT UPTO BUT NOT INCLUDING TERMINATOR.
44522  1146          TAD     DNHWIB
44523  7040          CMA
44524  3145          DCA     DNHWIA      / SET HALF-WORD INDICATOR FOR TERMINATOR.
44525  1145          TAD     DNHWIA
44526  7650          SNA CLA             / WAS POINTER ON TOP HALF-WORD?
44527  7340          WM0001              / YES - DECREMENT ILB POINTER.
44530  1147          TAD     DN15PA
44531  3770          DCA  I  DN15AU
44532  7301  DN15LD, WP0001
44533  3144          DCA     DNNCHS      / SET NUMBER OF CHARS SEARCHED = 1.
44534  1227          TAD     DNABCF
44535  7640          SZA CLA             / WAS TERMINATOR ABBREVIATE CHAR.?
44536  5271          JMP     DN15LH      / YES - IGNORE IT.
44537  1150          TAD     DNSPTF
44540  7650          SNA CLA             / WAS TERMINATOR SPECIAL ABBREV. CHAR.?
44541  5267          JMP     DN15LA      / NO - GO PROCESS ORDINARY TERMINATOR.
44542  4764          JMS  I  DN15AF      / YES - SET UP PARAMETERS FOR DN15SF
44543  7301          WP0001              /  AND CALL IT TO SEARCH THE SYSTEM ABBR.
44544  4761          JMS  I  DN15AC      /   TABLE (WILL ALWAYS BE FOUND).
44545  5267          JMP     DN15LA      / GO PROCESS EXPANDED TEXT.


                     / ======================================
                     / = PERFORM TERMINATION.               =
                     / ======================================

44546  1224  DN15LE, TAD     DNRPAR
44547  3224  DN15LF, DCA     DNRPAR      / SET OR CLEAR ALL ILB PROCESSED FLAG.
44550  4775          JMS  I  DN11SA      / INJECT NEWLINE IF LINE FULL AND DISPLAY
44551  6222          CIF     20          /
44552  4571          JMS  I  ZKB23J      / CLEAR INSERT LINE & OP I/P FUNC.
44553  1224          TAD     DNRPAR
44554  7401          1-1^2+7401          /*1 VARIABLE LOCATIONS FOLLOW
44555  0000  DN15IB, 0                   / I - VARIABLE CDI TO CALLER.
44556  5630          JMP  I  TOP415      / RETURN WITH PROCESSING FLAG.


                     / ======================================
                     / = CONSTANT DATA IDENTIFIERS.         =
                     / ======================================

44557  0112  DN15AA, ZBCILF              / A - INSERT LINE BUFFER POINTER (FIELD).
44560  0113  DN15AB, ZBCILA              / A - INSERT LINE BUFFER POINTER (ADDRESS).
44561  5057  DN15AC, DN15SF              / A - EXPAND ABBREVIATION ROUTINE.
44562  5201  DN15AD, DN15SC              / A - SEARCH ILB ROUTINE.
44563  4606  DN15AE, DN15SD              / A - PROCESS TEXT ROUTINE.
44564  5001  DN15AF, DN15SE              / A - SET DN15SF PARAMETERS ROUTINE.
44565  5535  DN1124, TDP124              / A - ADDR OF PICK UP DATE STAMP
44566  5027  DN15AS, DN15ID              / A - CDF INSTRUCTION IN DN15SE.
44567  5277  DN15AT, DN15SB              / A - SEARCH INIT ROUTINE.
44570  4763  DN15AU, DN15PA              / A - SECOND ILB POINTER.
44571  5343  DN15A3, DN15SA              / A - GET WORD FROM ILB ROUTINE.
44572  5344  DN15A4, DN15IA              / A - CDF TO ILB.
44573  4602  DN15A5, DNLAST              / A - LAST TEXT WAS EXPANSION FLAG.
44574  4601  DN15A6, DNSPCE              / A - SPACE TERMINATOR FLAG.
44575  4107  DN11SA, DN11SR              / A- LINE FULL CHECK AND DISPLAY S/R
44576  0000          ZBLOCK  .+200&7600-.  /*ZERO FILL PAGE
                     / ======================================
                     / = TOP415 ROUTINE D - PROCESSES TEXT  =
                     / = (INCLUDING SPACE & NEWLINE INSERTS.)=
                     / ======================================

44600  7413          6-1^2+7401          /*6 VARIABLE LOCATIONS FOLLOW
44601  0000  DNSPCE, 0                   / B - SPACE TERMINATOR FLAG.
44602  0000  DNLAST, 0                   / B - LAST TEXT WAS EXPANSION FLAG.
44603  0000  DNSFPF, 0                   / B - SPECIAL PUNCTUATION FLAG.
44604  0000  DNSPIF, 0                   / B - SPACE INSERTION FLAG.
44605  0000  DNRMSP, 0                   / F - NUMBER OF REMAINING SPACES ON DIALOGUE LINE.
44606  0000  DN15SD, .-.
44607  3004          DCA     ZWORK1      / SET OR CLEAR TERMINATOR PROCESSING FLAG.
44610  1144          TAD     DNNCHS
44611  7650          SNA CLA
44612  5606          JMP  I  DN15SD      / RETURN IF NO TEXT TO PROCESS.
44613  1204          TAD     DNSPIE
44614  7640          SZA CLA             / LAST CHARACTER IN LINE NOT SPACE?
44615  5250          JMP     DN15LJ      / FALSE - DON'T INSERT SPACE.
44616  1107          TAD     ZDCCCL
44617  7650          SNA CLA             / CURRENT DIALOGUE LINE EMPTY?
44620  5250          JMP     DN15LJ      / FALSE - DON'T INSERT SPACE.
44621  1107          TAD     ZDCCCL
44622  1370          TAD     DN15KC
44623  7650          SNA CLA             / CURRENT DIALOGUE LINE NOT FULL?
44624  5250          JMP     DN15LJ      / FALSE - DON'T INSERT SPACE.
44625  4151          TAD     DNABEE
44626  7640          SZA CLA             / CURRENT TEXT IS EXPANDED?
44627  5237          JMP     DN15LP      / TRUE - SPACE MAY BE INSERTED.
44630  1202          TAD     DNLAST
44631  7650          SNA CLA             / LAST TEXT PROCESSED WAS EXPANDED?
```

```
44632  5250            JMP     DN15LJ         / FALSE - DON'T INSERT SPACE.
44633  1004            TAD     ZWORK1
44634  0203            AND     DNSPPF
44635  7640            SZA CLA                / CURRENT TEXT NOT SPECIAL PUNCTUATION?
44636  5250            JMP     DN15LJ         / FALSE - DON'T INSERT SPACE.
44637  7301   DN15LP,  WP0001
44640  4775            JMS  I  DN15AY         / WOULD SPACE INSERT FORCE TRANSMIT?
44641  7301            WP0001
44642  4771            JMS  I  DN15AJ         / NO - IS THERE ROOM IN DIALOGUE BUFFERS?
44643  5772            JMP  I  DN15AU         / NO ROOM - TERMINATE PROCESSING.
44644  2113            ISZ     ZDCCLT
44645  1057            TAD     ZP0040         / INCREMENT UNTRANSMITTED CHARACTER COUNT, PUT
44646  3773            DCA  I  DN15AP         /   SPACE IN PARAMETER AND CALL TDP423
44647  4774            JMS  I  DN15AQ         /   TO PUT SPACE IN DIALOGUE BUFFERS.
44650  1370   DN15LJ,  TAD     DN15KC
44651  1107            TAD     ZDCCCL
44652  7041            CIA
44653  3205            DCA     DNRMSP         / SAVE REMAINING NUMBER OF SPACES ON LINE.
44654  1205            TAD     DNRMSP
44655  7140            CLL CMA
44656  1144            TAD     DNNCHS
44657  7620            SNL CLA                / NUMBER OF CHARS TO PROCESS > REMAINING?
44660  5312            JMP     DN15LL         / NO - GO COPY TEXT.
44661  1151            TAD     DNABEF
44662  7650            SNA CLA                / IS TEXT EXPANSION?
44663  5266            JMP     DN15LK         / NO - GO HANDLE ORDINARY.
44664  4331            JMS     DN15SG         / PERFORM NEWLINE ROUTINE.
44665  5312            JMP     DN15LL
44666  1205   DN15LK,  TAD     DNRMSP
44667  7450            SNA
44670  5304            JMP     DN15LO         / CATER FOR CASE WHERE NO TEXT LEFT ON LINE.
44671  4342            JMS     DN15SJ         / COPY REMAINING LINE TEXT TO DIALOGUE BUFFERS.
44672  7340            WM0001
44673  1205            TAD     DNRMSP
44674  7110            CLL RAR
44675  1363            TAD     DN15PB
44676  3363            DCA     DN15PB         / ADJUST ILB POINTER.
44677  7430            SZL
44700  5304            JMP     DN15LO
44701  1145            TAD     DNHWIA
44702  7040            CMA                    / SWITCH THE HALF-WORD INDICATOR IF
44703  3145            DCA     DNHWIA         /   ODD NUMBER OF CHARS COPIED.
44704  4331   DN15LO,  JMS     DN15SG         / PERFORM NEWLINE ROUTINE.
44705  1205            TAD     DNRMSP
44706  7041            CIA
44707  1144            TAD     DNNCHS
44710  3144            DCA     DNNCHS         / ADJUST NUMBER OF CHARS TO PROCESS.
44711  5250            JMP     DN15LJ         / REPEAT FOR REST OF ORDINARY TEXT.
44712  1144   DN15LL,  TAD     DNNCHS
44713  4342            JMS     DN15SJ         / COPY REMAINING TEXT TO DIALOGUE BUFFERS.
44714  1151            TAD     DNABEF
44715  7440            SZA
44716  5322            JMP     DN15LU
44717  1202            TAD     DNLAST         / IF CURRENT TEXT IS NOT AN
44720  0203            AND     DNSPPF         /   EXPANDED ABBREVIATION THEN
44721  7650            SNA CLA                /   PRESERVE THE LAST TEXT FLAG IF
44722  3202   DN15LU,  DCA     DNLAST         /   TERMINATOR IS SPECIAL PUNCTUATION.
44723  3151            DCA     DNABEF         / CLEAR ABBREVIATION EXPANDED FLAG.
44724  1776            TAD  I  DN15A7
44725  3362            DCA     DN15IC         / RESET CDF TO ILB FOR DN15SJ.
44726  3204            DCA     DNSPIF         / CLEAR SPACE INSERTION FLAG.
44727  5606            JMP  I  DN15SD         / RETURN.

                       / ======================================
                       / = TDP415 ROUTINE G - INSERT NEWLINE.  =
                       / ======================================

44730  7401            1-1^2+7401             /*1 VARIABLE LOCATIONS FOLLOW
44731  0000   DN15SG,  .-.
44732  7301            WP0001
44733  4775            JMS  I  DN15AY         / WILL NEWLINE FORCE TRANSMIT?
44734  4771            JMS  I  DN15AJ         / NO - IS THERE ROOM FOR NEWLINE?
44735  5772            JMP  I  DN15AU         / NO - GO TERMINATE PROCESSING.
44736  4552            JMS  I  ZK0421         / INSERT NEWLINE.
44737  2113            ISZ     ZDCCLT         / INCREMENT UNTRANSMITTED CHAR. COUNT.
44740  5731            JMP  I  DN15SG         / RETURN.

                       / ======================================
                       / = TDP415 ROUTINE J - COPY TEXT TO     =
                       / =   DIALOGUE BUFFERS.                 =
                       / ======================================

44741  7401            1-1^2+7401             /*1 VARIABLE LOCATIONS FOLLOW
44742  0000   DN15SJ,  .-.
44743  3205            DCA     DNRMSP         / SAVE NUMBER OF CHARS. TO COPY.
44744  1205            TAD     DNRMSP
44745  4775            JMS  I  DN15AY         / WILL INSERTION OF THESE CHARS FORCE TRANSMIT?
44746  1205            TAD     DNRMSP
44747  4771            JMS  I  DN15AJ         / NO - IS THERE ROOM FOR THESE CHARS?
44750  5772            JMP  I  DN15AU         / NO - GO TERMINATE PROCESSING.
44751  1145            TAD     DNHWIA
44752  7450            SNA
44753  2363            ISZ     DN15PB         / INCREMENT POINTER IF ON WORD BOUNDRY.
44754  7640            SZA CLA
```

```
44755  7301           WP0001                  / SET HALF-WORD PARAMETER ACCORDINGLY.
44756  7421           MQL
44757  1205           TAD      DNRMSP
44760  4554           JMS   I  ZKD423         / CALL TDP423 TO COPY TEXT OVER.
44761  7403           2-1^2+7401              /*2 VARIABLE LOCATIONS FOLLOW
44762  0000  DN15IC,  0                       / F - CDF TO TEXT.
44763  0000  DN15PB,  0                       / V - TEXT START ADDRESS.
44764  1205           TAD      DNRMSP
44765  1113           TAD      ZDCCLT
44766  3113           DCA      ZDCCLT         / INCREMENT NUMBER OF UNTRANSMITTED CHARS.
44767  5742           JMP   I  DN15SJ         / RETURN.

             / =====================================
             / =      CONSTANT DATA IDENTIFIERS.    =
             / =====================================
44770  7704  DN15KC,  -74                     / K - FULL LINE TEST.
44771  3755  DN15AJ,  DN41SA                  / A - FIND ROOM IN DIALOGUE BUFFERS ROUTINE.
44772  4547  DN15AO,  DN15LF                  / A - TEMINATION SECTION (NOT ALL DONE).
44773  3765  DN15AP,  DNCHAR                  / A - SIX-BIT CHARACTER FOR DIALOGUE STORAGE.
44774  3766  DN15AQ,  DN41SB                  / A - COPY CHAR TO DIALOGUE BUFFER ROUTINE.
44775  5317  DN15AY,  DN15SI                  / A - TRANSMIT CHECK ROUTINE.
44776  5344  DN15AZ,  DN15IA                  / A - CDF TO TEXT.
44777  0000           ZBLOCK   .+200&7600-.   /*ZERO FILL PAGE
       5000           PAGE

             / =====================================
             / = TDP415 ROUTINE E - SET UP DN15SF   =
             / =   (EXPAND ABBREV.) PARAMETERS.     =
             / =====================================

45000  7401           1-1^2+7401              /*1 VARIABLE LOCATIONS FOLLOW
45001  0000  DN15SE,  .-.
45002  3254           DCA      DABBRA
45003  3255           DCA      DABBRB
45004  3256           DCA      DABBRC         / CLEAR PARAMETER BLOCK.
45005  1374           TAD      DN15AM
45006  3004           DCA      ZWORK1         / SET POINTER TO START-1 OF BLOCK.
45007  3005           DCA      ZWORK2         / CLEAR HALF-WORD INDICATOR.
45010  1144           TAD      DNNCHS
45011  7041           CIA
45012  3006           DCA      ZWORK3         / SET PARAMETER COUNT.
45013  1775           TAD   I  DN15A9
45014  3007           DCA      ZWORK4         / SET UP ILB POINTER.
45015  1044           TAD      ZM0010
45016  7001           IAC
45017  1144           TAD      DNNCHS
45020  3010           DCA      ZAUTO0         / SET NUMBER OF SPACES+1.
45021  1145           TAD      DNHWIA
45022  3011           DCA      ZAUTO1         / SET UP HALF-WORD INDICATOR.
45023  1011  DN15LM,  TAD      ZAUTO1
45024  7650           SNA CLA
45025  2007           ISZ      ZWORK4         / INCREMENT POINTER IF ON WORD BOUNDRY.
45026  7401           1-1^2+7401              /*1 VARIABLE LOCATIONS FOLLOW
45027  0000  DN15IO,  0                       / I - VARIABLE CDF TO ILB.
45030  1407           TAD   I  ZWORK4
45031  6241           CDF      FDP410
45032  2011           ISZ      ZAUTO1
45033  7002           BSW                     / BYTESWAP IF TOP HALF REQUIRED.
45034  0061           AND      ZP0077
45035  7421           MQL
45036  4350           JMS      DN15SK         / PUT WORD IN PARAMETER BLOCK.
45037  1011           TAD      ZAUTO1
45040  7041           CIA
45041  3011           DCA      ZAUTO1         / SWITCH ILB HALF-WORD INDICATOR.
45042  2006           ISZ      ZWORK3
45043  5223           JMP      DN15LM         / REPEAT UNTIL SPACE FILL NEEDED.
45044  1057           TAD      ZP0040
45045  7421           MQL
45046  2010  DN15LN,  ISZ      ZAUTO0         / END OF SPACE FILLING?
45047  7410           SKP
45050  5601           JMP   I  DN15SE         / YES - RETURN.
45051  4350           JMS      DN15SK         / PUT SPACE IN PARAMETER BLOCK.
45052  5246           JMP      DN15LN         / CONTINUE.

             / =====================================
             / = TDP415 ROUTINE F - SEARCH ABBREV.  =
             / =  TABLE FOR TEXT EXPANSION.         =
             / =====================================

45053  7407           4-1^2+7401              /*4 VARIABLE LOCATIONS FOLLOW
45054  0000  DABBRA,  0                       / P - FIRST TWO CHARS. OF POSSIBLE ABBREVIATION.
45055  0000  DABBRB,  0                       / P - NEXT TWO CHARS. OF POSSIBLE ABBREVIATION.
45056  0000  DABBRC,  0                       / P - NEXT TWO CHARS. OF POSSIBLE ABBREVIATION.
45057  0000  DN15SF,  .-.
45060  4776           JMS   I  DU842H         / GO FIND SETTING OF CNV/CNB FLAG
45061  1377           TAD      DU8K02         / BONDS
45062  1365           TAD      DU81AA         / CURRENCY
45063  3004           DCA      ZWORK1
45064  1404           TAD   I  ZWORK1
45065  3004           DCA      ZWORK1         / SET POINTER TO FIRST TABLE ENTRY.
45066  6231  DU81IA,  CDF      FDC480
45067  1404  DU81LA,  TAD   I  ZWORK1
45070  7650           SNA CLA
45071  5331           JMP      DU81LD         / NOT FOUND IF END OF TABLE REACHED.
45072  7340           WM0001
```

```
45073  1004           TAD     ZWORK1
45074  3010           DCA     ZAUTO0
45075  7325           WP0003
45076  1004           TAD     ZWORK1
45077  3004           DCA     ZWORK1        / SET POINTER TO START OF EXPANSION.
45100  1404           TAD  I  ZWORK1
45101  7002           BSW
45102  0061           AND     ZP0077
45103  3005           DCA     ZWORK2        / OBTAIN LENGTH OF EXPANSION.
45104  1254           TAD     DABBRA
45105  7041           CIA
45106  1410           TAD  I  ZAUTO0
45107  7640           SZA CLA               / FIRST TWO CHARS MATCH?
45110  5323           JMP     DU81LB        / NO - GO TRY NEXT ENTRY.
45111  1255           TAD     DABBRB
45112  7041           CIA
45113  1410           TAD  I  ZAUTO0
45114  7640           SZA CLA               / SECOND TWO CHARS MATCH?
45115  5323           JMP     DU81LB        / NO - GO TRY NEXT ENTRY.
45116  1256           TAD     DABBRC
45117  7041           CIA
45120  1410           TAD  I  ZAUTO0
45121  7650           SNA CLA               / LAST TWO CHARS MATCH?
45122  5334           JMP     DU81LC        / YES - MATCH FOUND.
45123  1005   DU81LB, TAD     ZWORK2
45124  7110           CLL RAR
45125  7001           IAC
45126  1004           TAD     ZWORK1
45127  3004           DCA     ZWORK1        / LAST ENTRY DIDN'T MATCH SO RESET TABLE
45130  5267           JMP     DU81LA        /    POINTER AND GO TRY NEXT ENTRY.
45131  2257   DU81LD, ISZ     DN15SF        / NOT FOUND.
45132  6241           CDF     FDP410
45133  5657           JMP  I  DN15SF        / RETURN.
45134  2151   DU81LC, ISZ     DNABEF        / FOUND - SET ABBREVIATION EXPANDED FLAG.
45135  6241           CDF     FDP410
45136  1005           TAD     ZWORK2
45137  3144           DCA     DNNCHS        / SET NUMBER OF CHARS TO PROCESS.
45140  1004           TAD     ZWORK1
45141  3772           DCA  I  DU81AB        / SET POINTER TO START OF EXPANSION.
45142  1266           TAD     DU81IA
45143  3773           DCA  I  DU81AC        / SET CDF TO TEXT.
45144  7040           CMA
45145  3145           DCA     DNHWIA        / SET HALF-WORD INDICATOR.
45146  5657   DU81LE, JMP  I  DN15SF        / RETURN.


                      / ======================================
                      / = TDP415 ROUTINE B - SET WORD IN      =
                      / =  DN15SF PARAMETER BLOCK.            =
                      / ======================================

45147  7401           1-1^2+7401            /*1 VARIABLE LOCATIONS FOLLOW
45150  0000   DN15SK, .-.
45151  1005           TAD     ZWORK2
45152  7650           SNA CLA
45153  2004           ISZ     ZWORK1        / INCREMENT BLOCK POINTER IF ON WORD BOUNDRY.
45154  7701           ACL
45155  2005           ISZ     ZWORK2
45156  7002           BSW                   / BYTESWAP IF TO BE PUT IN TOP HALF-WORD.
45157  1404           TAD  I  ZWORK1
45160  3404           DCA  I  ZWORK1        / OR WORD INTO PARAMETER BLOCK.
45161  1005           TAD     ZWORK2
45162  7041           CIA
45163  3005           DCA     ZWORK2        / SWITCH BLOCK'S HALF-WORD INDICATOR.
45164  5750           JMP  I  DN15SK        / RETURN.


                      / ======================================
                      / =     CONSTANT DATA IDENTIFIERS.      =
                      / ======================================

45165  5166   DU81AA, .+1                   / A - BASE POINTER.
45166  5001           TDC483                / A - CNV USER ABBREVIATIONS TABLE.
45167  4201           TDC481                / A - CNV SYSTEM ABBREVIATIONS TABLE.
45170  6601           TDC487                / A - CNB USER ABBREVIATIONS TABLE.
45171  6001           TDC486                / A - CNB SYSTEM ABBREVIATIONS TABLE.
45172  4763   DU81AB, DN15PB                / A - TEXT POINTER.
45173  4762   DU81AC, DN15IC                / A - CDF TO TEXT.
45174  5053   DN15A8, DABBRA-1              / A - DN15SF PARAMETER BLOCK.
45175  4763   DN15A9, DN15PB                / A - TEXT POINTER.
45176  1757   EU8428, TDP428                / LINK TO FIND CNV/CNB FLAG SETTING RTN.
45177  0002   DU8K02, 2                     / TABLE OFFSET FOR CNB

                      / ======================================
                      / = TDP415 ROUTINE C - SEARCH TLB       =
                      / = FOR A TERMINATOR.                   =
                      / ======================================

45200  7401           1-1^2+7401            /*1 VARIABLE LOCATIONS FOLLOW
45201  0000   DN15SC, .-.
45202  7300           *KLEAR
45203  3761           DCA  I  DN15AR        /    CLEAR SPECIAL PUNCTUATION FLAG.
45204  1763   DN15LG, TAD  I  DN15AV
45205  1764           TAD  I  DN15AW
```

```
45206  7650            SNA CLA                / END OF ILB?
45207  5270            JMP     DN15LS         / YES - TREAT AS ABBREV. CHAR TERMINATOR.
45210  4343            JMS     DN15SA         / GET WORD FROM ILB.
45211  2144            ISZ     DNNCHS         / INCREMENT NUMBER OF CHARS SEARCHED.
45212  2763            ISZ  I  DN15AV         / INCREMENT TOTAL CHARS SEARCHED.
45213  2146            ISZ     DNHWIB
45214  7002            BSW                    / BYTESWAP IF TOP HALF OF ILB WORD IS REQUIRED.
45215  0061            AND     ZP0077
45216  7421            MQL
45217  1146            TAD     DNHWIB
45220  7041            CIA
45221  3146            DCA     DNHWIB         / SWITCH HALF-WORD INDICATOR.
45222  7701            ACL
45223  1355            TAD     DN15KA
45224  7750            SPA SNA CLA            / IS CHARACTER ALPHABETIC?
45225  5204            JMP     DN15LG         / YES - CONTINUE SEARCH.
45226  1044            TAD     ZM0010
45227  3004            DCA     ZWORK1         / SET COUNT FOR SEARCH OF CHAR. TABLE.
45230  1362            TAD     DN15A2
45231  3010            DCA     ZAUTO0         / SET POINTER TO TABLE.
45232  2010   DN15LH,  ISZ     ZAUTO0
45233  7701            ACL
45234  1410            TAD  I  ZAUTO0
45235  7650            SNA CLA                / CHAR. FOUND IN TABLE?
45236  5410            JMP  I  ZAUTO0         / YES - GO DO PROCESSING DEFINED BY TABLE.
45237  2004            ISZ     ZWORK1
45240  5232            JMP     DN15LH
45241  5273            JMP     DN15LT         / CHAR. NOT IN TABLE SO ORDINARY TERMINATOR.
45242  2757   DN15LI,  ISZ  I  DN15AI         / TERMINATOR WAS A SPACE.
45243  2761   DN15LQ,  ISZ  I  DN15AR         / TERMINATOR WAS SPECIAL PUNCTUATION.
45244  5273            JMP     DN15LT
45245  2150   DN15LR,  ISZ     DNSPTF         / TERMINATOR WAS SPECIAL ABBREVIATION.
45246  5273            JMP     DN15LT
45247  7740   DN15TA,  -40                    / " ".
45250  5242            JMP     DN15LI
45251  7724            -54                    / ",".
45252  5243            JMP     DN15LQ
45253  7726            -52                    / "*".
45254  5245            JMP     DN15LR
45255  7701            -77                    / "?".
45256  5243            JMP     DN15LQ
45257  7733            -45                    / "%".
45260  5243            JMP     DN15LQ
45261  7722            -56                    / ".".
45262  5243            JMP     DN15LQ
45263  7705            -73                    / ";".
45264  5243            JMP     DN15LQ
45265  7706            -72                    / "ABBREV".
45266  7340            WM0001
45267  2761            ISZ  I  DN15AR         / TREAT ABBREV. CHAR AS SPECIAL PUNCTUATION.
45270  2770   DN15LS,  ISZ  I  DN15AX         / SET ABBREVIATE CHAR. FOUND FLAG.
45271  2201            ISZ     DN15SC         /   INCREMENT RETURN ADDRESS.
45272  7410            SKP
45273  7340   DN15LT,  WM0001
45274  1144            TAD     DNNCHS         /   RETURN WITH AC = NUMBER OF
45275  5601            JMP  I  DN15SC         /   CHARS SEARCHED MINUS ONE.


                       / =====================================
                       / = TDP415 ROUTINE B - PERFORM SEARCH  =
                       / =   INITIALISATION.                  =
                       / =====================================

45276  7401            1-1^2+7401             /*1 VARIABLE LOCATIONS FOLLOW
45277  0000   DN15SB,  .-.
45300  1146            TAD     DNHWIB
45301  3145            DCA     DNHWIA         / SET HALF-WORD INDICATOR FOR START OF SEARCH.
45302  1147            TAD     DN15PA
45303  3765            DCA  I  DN15AH         / REMEMBER ILB POINTER AT SEARCH START.
45304  1757            TAD  I  DN15AI
45305  3766            DCA  I  DN15AN         / SET OR CLEAR SPACE INSERTION FLAG.
45306  3757            DCA  I  DN15AI         / CLEAR SPACE TERMINATOR FLAG.
45307  3150            DCA     DNSPTF         / CLEAR SPECIAL TERMINATOR FLAG.
45310  1344            TAD     DN151A
45311  3767            DCA  I  DN15AZ         / SET CDF TO ILB FPR DN15SJ.
45312  3770            DCA  I  DN15AX         / CLEAR ABBREVIATE CHAR. FOUND FLAG.
45313  3761            DCA  I  DN15AR         /   SPECIAL PUNCTUATION FLAG,
45314  3144            DCA     DNNCHS         /   NUMBER OF CHARS. SEARCHED COUNT
45315  5677            JMP  I  DN15SB         /   AND RETURN.

                       / =====================================
                       / = TDP415 ROUTINE I - TRANSMIT CHECK.  =
                       / =====================================

45316  7401            1-1^2+7401             /*1 VARIABLE LOCATIONS FOLLOW
45317  0000   DN15SI,  .-.
45320  1113            TAD     ZDCCLT
45321  3004            DCA     ZWORK1         / SAVE NUMBER OF UNTRANSMITTED CHARS.
45322  1356            TAD     DN15KD
45323  7140            CLL CMA
45324  1004            TAD     ZWORK1
45325  7620            SNL CLA                / NUMBER UNTRANSMITTED > 70?
45326  5717            JMP  I  DN15SI         / NO - RETURN.
45327  1151            TAD     DNABFF
```

```
45330  7640          SZA CLA                        / IS TEXT EXPANDED ABBREVIATION?
45331  5760          JMP  I  DN15AK                 / YES - TERMINATE PROCESSING.
45332  1113          TAD     ZOCCLT
45333  7041          CIA
45334  1356          TAD     DN15KD
45335  7450          SNA                            / CAN ANY MORE TEXT BE HANDLED?
45336  5760          JMP  I  DN15AK                 / NO - TERMINATE PROCESSING.
45337  3753          DCA  I  DN15AL                 / YES - SAVE THE NUMBER THAT CAN,
45340  3754          DCA  I  DNPARA                 /   CLEAR ALL ILB PROCESSED FLAG
45341  5717          JMP  I  DN15SI                 /   AND RETURN.


                / ======================================
                / = TDP415 ROUTINE A - GET WORD FROM     =
                / =  INSERT LINE BUFFER.                 =
                / ======================================

45342  7403          2-1^2+7401                     /*2 VARIABLE LOCATIONS FOLLOW
45343  0000   DN15SA, .-.
45344  0000   DN15IA, 0                             / I - VARIABLE CDF TO ILB.
45345  1146          TAD     DLHW16
45346  7650          SNA CLA
45347  2147          ISZ     DN15PA                 / INCREMENT ILB POINTER IF ON WORD BOUNDRY.
45350  1547          TAD  I  DN15PA                 / GET WORD.
45351  6241          CDF     FDP410
45352  5743          JMP  I  DN15SA                 / RETURN.
                / ======================================
                / =      CONSTANT DATA IDENTIFIERS.      =
                / ======================================

45353  4605   DN15AL, DNRMSP                        / A - NUMBER OF CHARS TO PROCESS.
45354  4424   DNPARA, DNRPAR                        / A - RETURN PARAMETER.
45355  7746   DN15KA, -32                           / K - CHARACTER TEST.
45356  0106   DN15KD, 106                           / K - TRANSMIT TEST.
45357  4601   DN15AI, DNSPCF                        / A - SPACE TERMINATOR FLAG.
45360  4547   DN15AK, DN15LF                        / A - TERMINATION SECTION.
45361  4603   DN15AR, DNSPPF                        / A - SPECIAL PUNCTUATION FLAG.
45362  5245   DN15A2, DN15TA-2                      / A - TERMINATOR TABLE.
45363  4426   DN15AV, DNTCHS                        / A - TOTAL CHARS SEARCHED.
45364  4425   DN15AW, DNNLIL                        / A - NEGATIVE LENGTH OF INSERT LINE.
45365  4763   DN15AH, DN15PB                        / A - ILB POINTER.
45366  4604   DN15AN, DNSPIF                        / A - SPACE INSERTION FLAG.
45367  4762   DN15AZ, DN15IC                        / A - CDF TO ILB USED BY DN15SJ.
              DN15AR,
45370  4427   DN15AX, DNABCF                        / A - ABBREVIATE CHAR. FOUND FLAG.
45371  0000          ZBLOCK  .+20067600-.           /*ZERO FILL PAGE
       5400          PAGE
                /=====================================================
                /=                                                   =
                /= - COMPONENT: DIALOGUE DISPLAY        DP4350.88    =
                /=                                                   =
                /= - DESIGN:    P.ROBERTS                            =
                /=                                                   =
                /= - AUTHOR:    G.BROWN/J.BARTON.                    =
                /=                                                   =
                /= - DATE:      JUNE 1979                            =
                /=                                                   =
                /= - MODULES:                                        =
                /=              TDP431  REFRESH CN2 DISPLAY          =
                /=              TDP432  REDISPLAY CN1 ON RECEIPT OF  =
                /=                        NEWS HEADLINE              =
                /=              TDP434  DIALOGUE LINE FORWARD        =
                /=              TDP435  DIALOGUE LINE BACK           =
                /=              TDP436  DIALOGUE PAGE FORWARD        =
                /=              TDP437  DIALOGUE PAGE BACK           =
                /=              TDP433  REDISPLAY CN1 ON RESET OF    =
                /=                        NEWS HEADLINE              =
                /=                                                   =
                /=====================================================

                /=====================================================
                /=                                                   =
                /= - MODULE:    TDP431                               =
                /=              REFRESH CN2 DISPLAY IF NECESSARY     =
                /=                                                   =
                /= - FUNCTION:                                       =
                /=              DISPLAYS CONVERSATION 2 IF IT IS NOT =
                /=              ALREADY DISPLAYED                    =
                /=                                                   =
                /= - FORM OF CALL:                                   =
                /=              JMS  I  (TDP431                      =
                /=                                                   =
                /=====================================================

45400  7401          1-1^2+7401                     /*1 VARIABLE LOCATIONS FOLLOW
45401  0000   TDP431, .-.
45402  6214          RDF                            /
45403  1023          TAD     ZKCDI                  / SET UP RETURN TO CALLER'S
45404  3221          DCA     DP1CDI                 /  FIELD INSTRUCTION
                                                    /
45405  6221          CDF     20                     /
45406  1624          TAD  I  DP1LDM                 / GET DISPLAY/CURRENT MODE
45407  7041          CIA                            / NEGATE
```

```
45410  1223          TAD     DP1505          / CONSTANT (DISPLAY=CURRENT=CN2) MODE
45411  7650          SNA CLA                 / CN2 DISPLAYED ?
45412  5221          JMP     DP1CD1          / YES SO EXIT
                                             /
45413  1223          TAD     DP1505          / NO - SO SET MODE OF
45414  3624          DCA  I  DP1LDM          /  DISPLAY = CN2 (IE 5)
45415  6241          CDF     40              /
                                             /
45416  7340          WM0001                  /
45417  4577          JMS  I  ZKD425          / DISPLAY CONVERSATION 2
                                             /
45420  7401          1-1^2+7401              /*1 VARIABLE LOCATIONS FOLLOW
45421  0000  DP1CD1, 0                       /
45422  5601          JMP  I  TDP431          / RETURN TO CALLER

45423  0505  DP1505, 505                     / CONSTANT FOR DISPLAY/CURRENT MODE = CN2
45424  0104  DP1LDM, ZBCDCM                  / LINK TO DISPLAY/CURRENT MODE
45425  2201  DP0427, TDP427                  / CALCULATE FIRST LINE UNSCROLLED MODULE,
45426  0102  DPRLPS, ZDCPRS                  / LINK TO PRIMARY STATUS
             /=====================================================
             /=                                                   =
             /= - MODULE:      TDP432                             =
             /=                REDISPLAY CN1 ON RECEIPT OF        =
             /=                NEWS HEADLINE                      =
             /= - FUNCTION:                                       =
             /=                ADJUST THE LENGTH OF THE CN1 SCREEN     =
             /=                AND REDISPAYS THE DIALOGUE,IF ANY,      =
             /=                IN THE NEW SCREEN                  =
             /= - FORM OF CALL:                                   =
             /=                JMS  I  (TDP432                    =
             /=                                                   =
             /=====================================================

45427  7401          1-1^2+7401              /*1 VARIABLE LOCATIONS FOLLOW
45430  0000  TDP432, .-.
45431  1050          TAD     ZP0005          /
45432  4250          JMS     DP43SR          / CALL COMMON S/R
45433  5245          JMP     DP2EXT          / NO SO EXIT
                                             /
45434  1111          TAD     ZDCFLG          / GET FLAGS
45435  7710          SPA CLA                 / IS DIALOGUE SCROLLED ?
45436  5242          JMP     DP2010          / YES
                                             / NO
45437  4625          JMS  I  DP0427          / CALCULATE FIRST LINE UNSCROLLED
45440  3110          DCA     ZDCFLD          /   AND SAVE AS FIRST LINE DISPLAYED.
45441  5214          JMP     DP2020          /
                                             /
45442  2110  DP2010, ISZ     ZDCFLD          / ADD TWO TO FIRST LINE DISPLAYED
45443  2110          ISZ     ZDCFLD          /
                                             /
45444  4555  DP2020, JMS  I  ZKD426          / REDISPLAY THE WHOLE CONVERSATION
                                             /
45445  6233  DP2EXT, CDI     30              /
45446  5630          JMP  I  TDP432          / RETURN TO CALLER


             /
             / COMMON SUBROUTINE USED BY TDP432 & TDP433 TO
             / SWAP IN CNV CONTROL BLOCKS & SET UP NO. OF LINES
             /
45447  7401          1-1^2+7401              /*1 VARIABLE LOCATIONS FOLLOW
45450  0000  DP43SR, .-.
45451  3275          DCA     TDP434          / SAVE NEW NO. OF LINES
45452  6241          CDF     40              /
45453  4567          JMS  I  ZKD42C          / SWAP IN CCB
45454  1101          TAD     ZDCNOL          / GET CURRENT NO. OF LINES
45455  7041          CIA                     / NEGATE
45456  1275          TAD     TDP434          / ADD IN NEW NO. OF LINES
45457  7650          SNA CLA                 / OLD NO. = NEW NO.
45460  5650          JMP  I  DP43SR          / YES - DON'T RESET : EXIT
45461  1275          TAD     TDP434          / GET NEW NO. OF LINES
45462  3101          DCA     ZDCNOL          / SAVE AS CURRENT NO. OF LINES
45463  7340          WM0001
45464  6251          CDF     50              / DISPLAY NOT NECESSARY IF
45465  1626          TAD  I  DPRLPS          / STATUS IS 'IDLE' OR
45466  1673          TAD  I  DPRLSS          / 'CONTACT:CONTACT REQUEST SENT'
45467  6241          CDF     40
45470  7740          SMA SZA CLA
45471  2250          ISZ     DP43SR          / YES - INCREMENT RETURN ADDR
45472  5650          JMP  I  DP43SR          / RETURN TO CALLER
45473  0103  DPRLSS, ZDCCDS                  / A- SECONDARY STATUS
             /=====================================================
             /=                                                   =
             /= - MODULE:     TDP434                              =
             /=               DIALOGUE LINE FORWARD               =
             /= - FUNCTION:                                       =
             /=               VALIDATES AND ACTIONS A REQUEST BY THE  =
             /=               OPERATOR TO SCROLL HIS DIALOGUE TEXT    =
             /=               FORWARD ONE LINE                    =
             /= - FORM OF CALL:                                   =
             /=               JMS  I  (TDP434                     =
             /=                                                   =
             /=====================================================
```

```
45474  7401          1-1^2+7401             /*1 VARIABLE LOCATIONS FOLLOW
45475  0000  TDP434, .-.                     / USED ALSO AS WORK AREA IN COMMON S/R
45476  7301          WP0001                 / SET LINE FORWARD PARAMETER.
45477  4322          JMS      DPSCRL        / CALL ROUTINE TO HANDLE IT.
45500  5675          JMP   I  TDP434        / RETURN.


              /======================================================
              /=                                                    =
              /= - MODULE:     TDP435                               =
              /=               DIALOGUE LINE BACK                   =
              /= - FUNCTION:                                        =
              /=               VALIDATES AND ACTIONS A REQUEST BY THE  =
              /=               OPERATOR TO SCROLL HIS DIALOGUE TEXT    =
              /=               BACK ONE LINE                        =
              /= - FORM OF CALL:                                    =
              /=               JMS   I   (TDP435                    =
              /=                                                    =
              /======================================================

45501  7401          1-1^2+7401             /*1 VARIABLE LOCATIONS FOLLOW
45502  0000  TDP435, .-.
45503  7340          WM0001                 / SET LINE BACKWARD PARAMETER.
45504  4322          JMS      DPSCRL        / CALL ROUTINE TO HANDLE IT.
45505  5702          JMP   I  TDP435        / RETURN.

              /======================================================
              /=                                                    =
              /= - MODULE:     TDP436                               =
              /=               DIALOGUE PAGE FORWARD                =
              /= - FUNCTION:                                        =
              /=               VALIDATES AND ACTIONS A REQUEST BY THE  =
              /=               OPERATOR TO SCROLL HIS DIALOGUE TEXT    =
              /=               FORWARD ONE PAGE (= ONE DIALOGUE SCREEN =
              /=               AREA FULL)                           =
              /= - FORM OF CALL:                                    =
              /=               JMS   I   (TDP436                    =
              /=                                                    =
              /======================================================

45506  7401          1-1^2+7401             /*1 VARIABLE LOCATIONS FOLLOW
45507  0000  TDP436, .-.
45510  1101          TAD      ZDCNOL        / SET PAGE FORWARD PARAMETER.
45511  4322          JMS      DPSCRL        / CALL ROUTINE TO HANDLE IT.
45512  5707          JMP   I  TDP436        / RETURN.


              /======================================================
              /=                                                    =
              /= - MODULE:     TDP437                               =
              /=               DIALOGUE PAGE BACK                   =
              /= - FUNCTION:                                        =
              /=               VALIDATES AND ACTIONS A REQUEST BY THE  =
              /=               OPERATOR TO SCROLL HIS DIALOGUE TEXT    =
              /=               BACK ONE PAGE (= ONE DIALOGUE SCREEN    =
              /=               AREA FULL)                           =
              /= - FORM OF CALL:                                    =
              /=               JMS   I   (TDP437                    =
              /=                                                    =
              /======================================================

45513  7401          1-1^2+7401             /*1 VARIABLE LOCATIONS FOLLOW
45514  0000  TDP437, .-.
45515  1101          TAD      ZDCNOL
45516  7041          CIA                    / SET PAGE BACKWARD PARAMETER.
45517  4322          JMS      DPSCRL        / CALL ROUTINE TO HANDLE IT.
45520  5714          JMP   I  TDP437        / RETURN.

              /======================================================
              /= TDP430 ROUTINE A - HANDLES THE SCROLLING REQUIRED    =
              /=  BY TDP434, TDP435, TDP436 OR TDP437.               =
              /======================================================

45521  7401          1-1^2+7401             /*1 VARIABLE LOCATIONS FOLLOW
45522  0000  DPSCRL, .-.
45523  3201          DCA      TDP431        / SAVE SCROLLING PARAMETER.
45524  4535          JMS   I  ZK042G
45525  7001          IAC
45526  7550          SPA SNA                / PRIMARY STATUS < OR = 2 ?
45527  5333          JMP      DPR010        / YES SO NOTHING TO SCROLL
45530  1074          TAD      ZM0004        /
45531  7640          SZA CLA                / PRIMARY STATUS = 6 ?
45532  5340          JMP      DPR020        / NO SO SOMETHING TO SCROLL
45533  7200  DPR010, CLA                    /
45534  6222          CIF      20            /
45535  1052          TAD      ZP0007        / DISPLAY 'INVALID FUNCTION'
45536  4566          JMS   I  ZKB221        /  IN MESSAGE LINE
45537  5722          JMP   I  DPSCRL        / RETURN.
45540  1110  DPR020, TAD      ZDCFLD        /
45541  3230          DCA      TDP432        / SAVE OLD FIRST LINE DISPLAYED
45542  4625          JMS   I  DP0427        / CALL TDP427 TO GET FIRST LINE UNSCROLLED
45543  7421          MQL                    /    AND HOLD IN MQ.
45544  1201          TAD      TDP431
45545  1110          TAD      ZDCFLD
45546  7510          SPA                    / ADJUST FIRST LINE DISPLAYED...
```

```
45547  7200            CLA                      /   (SET TO ZERO IF RESULT BECOMES NEGATIVE).
45550  3110            DCA      ZDCFLD
45551  7701            ACL
45552  7041            CIA
45553  1110            TAD      ZDCFLD
45554  7700            SMA CLA                  / FIRST LINE DISP. < FIRST LINE UNSCR. ?
45555  5363            JMP      DPR030          / NO - GO ENSURE FLD=FLU.
45556  1111            TAD      ZDCFLG          / YES - SET THE SCROLLED
45557  7104            CLL RAL                  /
45560  7130            STL RAR
45561  3111            DCA      ZDCFLG          /   INDICATOR FLAG.
45562  5370            JMP      DPR040          / GO REDISPLAY CONVERSATION.
45563  1111    DPR030, TAD      ZDCFLG          /
45564  0376            AND      DP2777          / CLEAR SCROLLED AND
45565  3111            DCA      ZDCFLG          /   UNDISPLAYED TEXT INDICATOR FLAGS.
45566  7701            ACL
45567  3110            DCA      ZDCFLD          / SET FLD = FLU.
45570  1230    DPR040, TAD      TDP432          /
45571  7041            CIA                      /
45572  1110            TAD      ZDCFLD          /
45573  7640            SZA CLA                  / FIRST LINE DISPLAYED CHANGE ?
45574  4555            JMS  I   ZKD426          / YES - REDISPLAY WHOLE CONVERSATION.
45575  5722            JMP  I   DPSCRL          / RETURN.
45576  2777    DP2777, 2777                     / B - MASK FOR CLEARING BIT FLAGS.
45577  0000            ZBLOCK   .+200&7600-.    /*ZERO FILL PAGE
               /===================================================
               /=                                                 =
               /= - MODULE:     TDP433                            =
               /=               REDISPLAY CN1 ON RESET OF         =
               /=               NEWS HEADLINE                     =
               /=                                                 =
               /= - FUNCTION:                                     =
               /=               ADJUSTS THE LENGTH OF THE CN1 SCREEN  =
               /=               AND REDISPLAYS THE DIALOGUE,IF ANY,   =
               /=               IN THE NEW SCREEN                 =
               /=                                                 =
               /= - FORM OF CALL:                                 =
               /=               JMS   I   (TDP433                 =
               /=                                                 =
               /===================================================

45600  7401            1=1^2+7401               /*1 VARIABLE LOCATIONS FOLLOW
45601  0000    TDP433, .-.
45602  6221            CDF      20              /
45603  1525            TAD  I   DOZDCM          / GET DISPLAY/CURRENT MODES
45604  0061            AND      ZP0077          / MASK LEAVING CURRENT MODE
45605  3243            DCA      TDP474          / SAVE TEMPORARILY
45606  7307            WP0004                   /
45607  4637            JMS  1   DP3213          / GO SWAP IN CN1 MODE BLOCK
45610  1052            TAD      ZP0007          /
45611  4640            JMS  1   DP3SRA          / GO DO COMMON PROCESSING
45612  5231            JMP      DP3EXT          / NO SO EXIT
                                                /
45613  7344            WM0002                   /
45614  1110            TAD      ZDCFLD          / SUBTRACT 2 FROM FIRST LINE DISPLAYED
45615  7510            SPA                      / FIRST LINE DISPLAYED < 0
45616  7200            CLA                      / YES - SET FIRST LINE DISPLAYED = 0
45617  3110            DCA      ZDCFLD          / NO - SAVE FIRST LINE DISPLAYED
                                                /
45620  4635            JMS  1   DP3427          / CALCULATE FIRST LINE UNSCROLLED
45621  7041            CIA                      / NEGATE FIRST LINE UNSCROLLED
45622  1110            TAD      ZDCFLD          / ADD IN FIRST LINE DISPLAYED
45623  7640            SZA CLA                  / LINES EQUAL ?
45624  5230            JMP      DP3010          / NO
45625  1236            TAD      DP2MSK          / YES
45626  0111            AND      ZDCFLG          / UNSET SCROLLED INDICATOR
45627  3111            DCA      ZDCFLG          /
                                                /
45630  4555    DP3010, JMS  I   ZKD426          / REDISPLAY WHOLE CONVERSATION
                                                /
45631  1243    DP3EXT, TAD      TDP474          / GET MODE ON ENTRY
45632  4637            JMS  1   DP3213          / GO SWAP IN ITS MODE BLOCK
45633  6233            CDI      30              /
45634  5601            JMP  I   TDP433          / RETURN TO CALLER
45635  2201    DP3427, TDP427                   / LINK TO CALCULATE FIRST LINE UNSCROLLED
45636  2777    DP2MSK, 2777                     / MASK
45637  6157    DP3213, DP3SWP                   / LINK TO SWAP MODE BLOCKS RTN
45640  5450    DP3SRA, DP43SR                   / LINK TO COMMON  S/R

                                                                        ////////
                /////////
                /       COMPONENT:     DP4750.RB - BELL AND HIGHLIGHT         /
                /       FUNCTION:      ALLOWS THE OPERATOR TO GAIN THE ATTENTION OF HIS  /
                /                      COUNTERPARTY BY 'RINGING HIS BELL':    /
                /                      ALLOWS THE OPERATOR TO HIGHLIGHT A LINE OF THE    /
                /                      CONVERSATION THAT HE IS HOLDING.       /
                /       AUTHOR:        S.WATHANASIN                           /
                /       DATE:          AS HEADING                             /
                /       VERSION:       1                                      /
                /       COMPRISES:                                            /
                /                      TDP474  HIGHLIGHT                      /
                /                      TDP471  BELL REQUEST                   /
                /                      TDP472  BELL REPLY                     /
                /                      TDP473  BELL REQUEST RECEIVED          /
                ////////                                                ////////
```

```
                      ////////                                                        ////////
                      /          MODULE: TDP474  (HIGHLIGHT)                                 /
                      /          FUNCTION:        HIGHLIGHTS THE CURRENT LINE (OR,IF IT IS ABSENT,   /
                      /                           THE PREVIOUS LINE)                         /
                      /          CALLED BY:       TDP493,TDP461                              /
                      /          FORM OF CALL:    JMS  I  (TDP474)                           /
                      /          EXIT CONDITIONS:ACC= 0, DF=IF=4                             /
                      ////////                                                        ////////
45641  7403                 2=1^2+7401                  /*2 VARIABLE LOCATIONS FOLLOW
45642  0000  DT4CLS,  0
45643  0000  TDP474,  .-.
45644  4535           JMS  I  ZKD42G            / TEST CONV'N STATUS.
45645  7640           SZA CLA
45646  5266           JMP     DT4RET            / NOT DIALOGUE
45647  7621           CAM
45650  4774           JMS I   DT4FS             / FIND START OF LINE
45651  7200           CLA                       / THROW AWAY CHAR OFFSET (RETURNED BY 420)
45652  1107           TAD     ZDCCCL            / NO OF CHARS IN CURRENT LINE=0?
45653  7650           SNA     CLA
45654  5270           JMP     DT4CLE            / YES:CURRENT LINE EMPTY
45655  4775           JMS I   DT4HLG            / PUT AN ASTERISK IN THE LINE
45656  7640           SZA     CLA
45657  5266           JMP     DT4RET            / ALREADY HIGHLIGHTED
45660  6241           CDF     FDP470
45661  7301           WP0001
45662  7421           MQL
45663  4553           JMS  I  ZKD422            / FIND ROOM
45664  7200           CLA
45665  4555  DT4DIS,  JMS  I  ZKD426            / DISPLAY CONV
45666  6241  DT4RET,  CDF     FDP470
45667  5643           JMP  I  TDP474
45670  1106  DT4CLE,  TAD     ZDCCLN            / CURRENT LINE = 0?
45671  7450           SNA
45672  5643           JMP  I  TDP474            / YES
45673  1077           TAD     ZP7777            / NO:SUBTRACT ONE FROM CURRENT LINE
45674  3106           DCA     ZDCCLN
45675  7621           CAM
45676  4774           JMS I   DT4FS             / FIND START OF PREV LINE
45677  4775           JMS I   DT4HLG            / HIGHLIGHT THE LINE
45700  7650           SNA     CLA
45701  5304           JMP     DT4NHL            / NOT HIGHLIGHTED
45702  2106           ISZ     ZDCCLN
45703  5266           JMP     DT4RET
45704  1642  DT4NHL,  TAD  I  DT4CLS
45705  0073           AND     ZP7700
45706  1372           TAD     DT4MHS
45707  7650           SNA     CLA
45710  7001           IAC
45711  1074           TAD     ZM0004            / IF 1ST CHAR IS "*" SUBTRACT 3, ELSE 4 FROM
45712  7001           IAC                       / FIRST CHARACTER IN THE LINE IS NOT CHECKED
45713  3107           DCA     ZDCCCL            / TOTAL COUNT
45714  1642  DT4LP,   TAD  I  DT4CLS
45715  0061           AND     ZP0077
45716  1371           TAD     DT4MEL
45717  7650           SNA     CLA
45720  5347           JMP     DT4EVN
45721  2107           ISZ     ZDCCCL            / INCR COUNT
45722  7000           NOP                       / SAFEGUARD FOR WRAPROUND !!!
45723  2242           ISZ     DT4CLS            / STEP ON POINTER
45724  7000           NOP
45725  1242           TAD     DT4CLS
45726  0061           AND     ZP0077            / CHECK FOR END OF BUFFER
45727  7650           SNA     CLA
45730  5362           JMP     DT4FNB            / FIND NEW BUFFER
45731  1642  DT4WD,   TAD  I  DT4CLS
45732  7002           BSW
45733  0061           AND     ZP0077            / CHECK TOP HALF FOR END OF LINE
45734  1371           TAD     DT4MEL            /
45735  7650           SNA     CLA
45736  5342           JMP     DT4ODD
45737  2107           ISZ     ZDCCCL
45740  7000           NOP                       / SAFEGUARD FOR WRAPROUND !!!
45741  5314           JMP     DT4LP
45742  1642  DT4ODD,  TAD  I  DT4CLS            / ODD NO OF CHARS
45743  0061           AND     ZP0077
45744  1372           TAD     DT4ETX            / PUT AN ETX IN M.S. HALF
45745  3642           DCA  I  DT4CLS
45746  5353           JMP     DT4FL
45747  1642  DT4EVN,  TAD  I  DT4CLS            / ADD ETX TO L.S. HALF
45750  0073           AND     ZP7700
45751  1373           TAD     DT4FDT
45752  3642           DCA  I  DT4CLS
45753  6241  DT4FL,   CDF     FDP470
45754  7301           WP0001
45755  7421           MQL
45756  4553           JMS  I  ZKD422            / FIND ROOM
45757  7621           CAM
45760  4552           JMS  I  ZKD421            / ADD ENDLINE(AND ASTERISKS)
45761  5265           JMP     DT4DIS
45762  1107  DT4FNB,  TAD     ZDCCCL
45763  7001           IAC
45764  7421           MQL
45765  4774           JMS I   DT4FS             / FIND CONTINUATION OF LINE
45766  7401           1=1^2+7401                /*1 VARIABLE LOCATIONS FOLLOW
```

```
45767  0000  DT4CF,  0                              / FIELD PUT HERE
45770  5331          JMP     DT4WD
45771  7742  DT4MEL, -36
             DT4MHS,
45772  3500  DT4ETX, 3500
45773  0035  DT4EOT, 35
45774  6137  DT4FS,  DT4FSL
45775  6114  DT4HLG, DT4HL
45776  0000          ZBLOCK  .+200&7600-.           /*ZERO FILL PAGE
       6000          PAGE

             ////////                                                                         ////////
             /       MODULE: TDP471            BELL REQUEST                                          /
             /       FUNCTION:        CHECKS THAT A BELL REQUEST BY THE OPERATOR IS VALID            /
             /                        AND IF SO, SENDS SUCH A REQUEST TO THE COUNTERPARTY            /
             /       CALLED BY:       TDP493                                                         /
             /       FORM OF CALL:    JMS  I   (TDP471)                                              /
             /       EXIT CONDITIONS:ACC=0,   DF=IF=4                                                /
             /       USES:            ZAUT02                                                         /
             ////////                                                                         ////////
46000  7401          1-1^2+7401                     /*1 VARIABLE LOCATIONS FOLLOW
46001  0000  TDP471, .-.
46002  4535          JMS  I  ZKD42G                 / TEST CONV'N STATUS.
46003  7640          SZA CLA
46004  5601          JMP I   TDP471                 / NOT DIALOGUE
46005  6222          CIF     FBP230
46006  4574          JMS  I  ZKB23Z                 / LOCK KEYBOARD
46007  4530          JMS  I  ZKD511                 / GET A BUFFER & SET IT UP
                     DECIMAL
46010  0003          3
46011  0314          204
46012  0003          3
46013  7777          -1                             / END OF LIST
                     OCTAL
46014  1057          TAD     ZP0040                 / SET BELL INDICATOR(BIT 6)
46015  7421          MQL
46016  1111          TAD     ZDCFLG
46017  7501          MQA
46020  3111          DCA     ZDCFLG
46021  2120          ISZ     ZDCPKS
46022  7000          NOP
46023  6252          CIF     FDP340
46024  4570          JMS  I  ZKD345                 / GET OUTPUT PORT NUMBER
46025  7421          MQL                            / PUT IN MQ
46026  7325          WP0003                         / LENGTH OF RECORD IN ACC
46027  4532          JMS  I  ZKD513                 / SEND IT
46030  5601          JMP  I  TDP471

             ////////                                                                         ////////
             /       MODULE: TDP472  BELL REPLY                                                      /
             /       FUNCTION:        RINGS BELL                                                     /
             /       CALLED BY:       TDP491                                                         /
             /       FORM OF CALL:    JMS  I   (TDP472)                                              /
             /       EXIT CONDITIONS:AC=0,    DF=IF=4                                                /
             ////////                                                                         ////////
46031  7401          1-1^2+7401                     /*1 VARIABLE LOCATIONS FOLLOW
46032  0000  TDP472, .-.
46033  4535          JMS  I  ZKD42G                 / TEST CONV'N STATUS.
46034  7640          SZA CLA
46035  5632          JMP  I  TDP472                 / NOT DIALOGUE
46036  1111          TAD     ZDCFLG
46037  0057          AND     ZP0040                 / BELL INDICATOR?
46040  7450          SNA
46041  5632          JMP  I  TDP472                 / NO:EXIT
46042  7040          CMA
46043  0111          AND     ZDCFLG
46044  3111          DCA     ZDCFLG                 / CLEAR BELL REQUEST SENT INDICATOR
46045  2120          ISZ     ZDCPKS
46046  7000          NOP
46047  6222          CIF     FBP220
46050  7301          WP0001
46051  4564          JMS  I  ZKB229                 / RING BELL.
46052  6222          CIF     FBP230
46053  4572          JMS  I  ZKB23S                 / UNLOCK KEYBOARD
46054  5632          JMP  I  TDP472

             ////////                                                                         ////////
             /       MODULE: TDP473            BELL REQUEST RECEIVED                                 /
             /       FUNCTION:        DEALS WITH A BELL REQUEST SENT BY THE COUNTERPARTY             /
             /       CALLED BY:       TDP491                                                         /
             /       FORM OF CALL:    JMS  I   (TDP473)                                              /
             /       EXIT CONDITIONS:ACC=0,   DF=IF=4                                                /
             ////////                                                                         ////////
46055  7401          1-1^2+7401                     /*1 VARIABLE LOCATIONS FOLLOW
46056  0000  TDP473, .-.
46057  4535          JMS  I  ZKD42G                 / TEST CONV'N STATUS.
46060  7640          SZA CLA
46061  5656          JMP  I  TDP473                 / NOT DIALOGUE.
46062  4530          JMS  I  ZKD511                 / GET A BUFFER & LOAD IT
                     DECIMAL
46063  0003  DT3RL,  3
46064  0315          205
46065  0003          3
46066  7777          -1                             / END OF LIST
                     OCTAL
46067  7305          WP0002
```

```
46070  1120          TAD      ZDCPKS
46071  3120          DCA      ZDCPKS              / ADD 2 TO PACKET COUNT
46072  6252          CIF      FDP340
46073  4570          JMS   I  ZKD345              / GET PORT NO
46074  7421          MQL
46075  1263          TAD      DT3RL
46076  4532          JMS   I  ZKD513              / SEND REPLY
46077  7332          WP2000
46100  7421          MQL
46101  1111          TAD      ZDCFLG
46102  7501          MQA                          / SET BELL TO BE DISPLAYED FLAG
46103  3111          DCA      ZDCFLG
46104  4562          JMS   I  ZKD429              / NEW HEADER
46105  7301          WP0001
46106  6222          CIF      FBP220
46107  4564          JMS   I  ZKB229              / RING BELL
46110  5656          JMP   I  TDP473
46111  0052  DT4AST, 52

             /
             /       ROUTINE TO PUT AN ASTERISK IN 2ND CHARACTER POSN IF NOT ALREADY THERE
             /       RETURNS 0 IF SUCCESSFUL, NOT 0 IF ALREADY PRESENT
             /
46112  7726  DT4MAS, -52
46113  7401          1-1^2+7401                   /*1 VARIABLE LOCATIONS FOLLOW
46114  0000  DT4HL,  .-.                          / ROUTINE TO PUT ASTERISK IN 2ND COL
46115  7200          CLA
46116  1344          TAD      DT4CLF              / PICK UP FIELD
46117  3321          DCA      DT4CDF              / CHANGE FIELD

             /
             /       ROUTINE TO INVOKE TDP428; PUTS ADDR OF START OF LINE IN DT4CLS,
             /       FIELD IN DT4CF  (ALSO IN DT4SRT,DT4CLF IN ITS OWN PAGE)
             /
46120  7401          1-1^2+7401                   /*1 VARIABLE LOCATIONS FOLLOW
46121  0000  DT4CDF, 0
46122  1745          TAD   I  DT4SRT
46123  0061          AND      ZP0077
46124  1312          TAD      DT4MAS
46125  7640          SZA      CLA
46126  5331          JMP      DT4NAS              / NOT ASTERISK
46127  7340          K30001
46130  5714          JMP   I  DT4HL
46131  1745  DT4NAS, TAD   I  DT4SRT
46132  0073          AND      ZP7700
46133  1311          TAD      DT4AST
46134  3745          DCA   I  DT4SRT
46135  5714          JMP   I  DT4HL
46136  7401          1-1^2+7401                   /*1 VARIABLE LOCATIONS FOLLOW
46137  0000  DT4FSL, .-.                          / ROUTINE TO FIND START OF LINE
46140  6241          CDF      FDP470
46141  1106          TAD      ZDCCLN
46142  4540          JMS   I  ZKD428
46143  7403          2-1^2+7401                   /*2 VARIABLE LOCATIONS FOLLOW
46144  0000  DT4CLF, 0                            / FIELD OF BUFFER THAT CONTAINS LINE
46145  0000  DT4SRT, 0                            / ADDR OF START OF LINE
46146  7621          CAM                          / AC AND MQ RETURNS NOT REQUIRED
46147  1344          TAD      DT4CLF
46150  3754          DCA   I  DT4FLD
46151  1345          TAD      DT4SRT
46152  3755          DCA   I  DT4LIN
46153  5737          JMP   I  DT4FSL
46154  5767  DT4FLD, DT4CF              / FIELD WHERE LINE STARTS IS PUT IN DT4CF
46155  5642  DT4LIN, DT4CLS             / ADDR OF START OF LINE IS PUT IN DT4CLS



             /
             / SUBROUTINE TO SWAP IN REQUIRED MODE BLOCK
             /
46156  7403          2-1^2+7401                   /*2 VARIABLE LOCATIONS FOLLOW
46157  0000  DP3SWP, .-.
46160  3371          DCA      DP3MDE              / SAVE MODE OF BLOCK TO BE SWAPPED IN
46161  6221          CDF      20                  /
46162  1524          TAD   I  D0ZDUN              / GET CURRENT DESK UNIT
46163  3370          DCA      DP3DUN              / SAVE
46164  6241          CDF      40                  /
46165  6222          CIF      20                  /
46166  4557          JMS   I  ZKB213              / SWAP IN MODE BLOCK
46167  7403          2-1^2+7401                   /*2 VARIABLE LOCATIONS FOLLOW
46170  0000  DP3DUN, 0                            / DESK UNIT
46171  0000  DP3MDE, 0                            / MODE
46172  7300          WKLEAR                       /
46173  5757          JMP   I  DP3SWP              / EXIT
46174  0000          ZBLOCK   .+200&7600-.        /*ZERO FILL PAGE
       6200          PAGE
       6200  DT4FGD=.
             $
```

| | |
|---|---|
| AB525I | 1733 |
| ACL | 7701 |
| AKS1LC | 1557 |
| AKSILI | 1555 |
| AKSILO | 1556 |
| AQAKPN | 6411 |
| AQAKTP | 0015 |
| AQDPPN | 6403 |
| AQDPTP | 0016 |
| AQPRNM | 0177 |
| AQPRTY | 0200 |
| AQQINS | 0144 |
| AQQRB1 | 5601 |
| AQQRB2 | 5704 |
| AQQRB3 | 6143 |
| AQQRB4 | 6246 |
| AQQTB1 | 7475 |
| AQQTB2 | 7634 |
| AQSOH | 0001 |
| AQ36SR | 7157 |
| BFVWST | 6232 |
| BLTYPE | 4402 |
| BLZCCB | 0131 |
| BLZPRA | 0134 |
| BLZPRD | 0133 |
| BLZPRT | 0126 |
| B4VWFG | 5207 |
| CAM | 7621 |
| COI | 6203 |
| DABBRA | 5054 |
| DABBRB | 5055 |
| DABBRC | 5056 |
| DL16SA | 4106 |
| D45FRA | 0340 |
| D46CDF | 0350 |
| DNABCF | 4427 |
| DNABEF | 0151 |
| DNABLA | 4034 |
| DNCHAD | 4166 |
| DNCHAR | 3765 |
| DNDKUN | 4025 |
| DNECBN | 4177 |
| DNECBO | 4174 |
| DNFLIN | 4170 |
| DNHWIA | 0145 |
| DNHWIB | 0146 |
| DNLAST | 4602 |
| DNLCTL | 4176 |
| DNLOOP | 4010 |
| DNMODE | 4026 |
| DNNCHS | 0144 |
| DNNLCH | 4362 |
| DNNLIL | 4425 |
| DNPARA | 5354 |
| DNRMSP | 4605 |
| DNRPAR | 4424 |
| DNSPCF | 4601 |
| DNSPIF | 4604 |
| DNSPPF | 4603 |
| DNSPTF | 0150 |
| DNTCHS | 4426 |
| DN11AA | 4167 |
| DN11AB | 4164 |
| DN11AC | 4165 |
| DN11KA | 4171 |
| DN11KB | 4173 |
| DN11LA | 4120 |
| DN11LB | 4104 |
| DN11SA | 4575 |
| DN11SB | 4107 |
| DN1124 | 4565 |
| DN12AA | 4363 |
| DN12AB | 4364 |
| DN12AC | 4365 |
| DN12AD | 4370 |
| DN12AF | 4361 |
| DN12AG | 4420 |
| DN12AH | 4421 |
| DN12AI | 4422 |
| DN12AJ | 4366 |
| DN12CA | 4373 |
| DN12KA | 4367 |
| DN12LA | 4254 |
| DN12LB | 4215 |
| DN12LC | 4300 |
| DN12LE | 4332 |
| DN12LG | 4337 |
| DN12LH | 4340 |
| DN12LI | 4347 |
| DN12LJ | 4411 |
| DN12LK | 4414 |
| DN12LZ | 4334 |
| DN12OA | 4374 |
| DN12OB | 4371 |
| DN12SA | 4401 |
| DN12TA | 4375 |
| DN13AA | 4167 |
| DN13AB | 4172 |
| DN13AC | 4164 |
| DN13LA | 4146 |
| DN13LB | 4160 |
| DN15AA | 4557 |
| DN15AB | 4560 |
| DN15AC | 4561 |
| DN15AD | 4562 |
| DN15AE | 4563 |
| DN15AF | 4564 |
| DN15AH | 5365 |
| DN15AI | 5357 |
| DN15AJ | 4771 |
| DN15AK | 5360 |
| DN15AL | 5353 |
| DN15AM | 5174 |
| DN15AN | 5366 |
| DN15AO | 4772 |
| DN15AP | 4773 |
| DN15AQ | 4774 |
| DN15AR | 5361 |
| DN15AS | 4566 |
| DN15AT | 4567 |
| DN15AU | 4570 |
| DN15AV | 5363 |
| DN15AW | 5364 |
| DN15AX | 5370 |
| DN15AY | 4775 |
| DN15AZ | 5367 |
| DN15A2 | 5362 |
| DN15A3 | 4571 |
| DN15A4 | 4572 |
| DN15A5 | 4573 |
| DN15A6 | 4574 |
| DN15A7 | 4776 |
| DN15A8 | 5370 |
| DN15A9 | 5175 |
| DN15IA | 5344 |
| DN15IB | 4555 |
| DN15IC | 4762 |
| DN15ID | 5027 |
| DN15KA | 5355 |
| DN15KC | 4770 |
| DN15KD | 5356 |
| DN15LA | 4467 |
| DN15LB | 4471 |
| DN15LC | 4521 |
| DN15LD | 4532 |
| DN15LE | 4546 |
| DN15LF | 4547 |
| DN15LG | 5204 |
| DN15LH | 5232 |
| DN15LI | 5242 |
| DN15LJ | 4650 |
| DN15LK | 4666 |
| DN15LL | 4712 |
| DN15LM | 5023 |
| DN15LN | 5046 |
| DN15LO | 4704 |
| DN15LP | 4637 |
| DN15LQ | 5243 |
| DN15LR | 5245 |
| DN15LS | 5270 |
| DN15LT | 5273 |
| DN15LU | 4722 |
| DN15PA | 0147 |
| DN15PB | 4763 |
| DN15SA | 5343 |
| DN15SB | 5277 |
| DN15SC | 5201 |
| DN15SD | 4606 |
| DN15SE | 5001 |
| DN15SF | 5057 |
| DN15SG | 4731 |
| DN15SI | 5317 |
| DN15SJ | 4742 |
| DN15SK | 5150 |
| DN15TA | 5247 |
| DN41SA | 3755 |
| DN41SB | 3766 |
| DOZALM | 0126 |
| DOZDCM | 0125 |
| DOZDES | 0127 |
| DOZDUN | 0124 |
| DPRLPS | 5426 |
| DPRLSS | 5473 |
| DPR010 | 5533 |
| DPR020 | 5540 |
| DPR030 | 5563 |
| DPR040 | 5570 |
| DPSCRL | 5522 |
| DP0427 | 5425 |
| DP1CDI | 5421 |
| DP1LOM | 5424 |
| DP1505 | 5423 |
| DP2EXT | 5445 |
| DP2MSK | 5636 |
| DP2010 | 5442 |
| DP2020 | 5444 |
| DP2777 | 5576 |
| DP3DUN | 6170 |
| DP3EXT | 5631 |
| DP3MDE | 6171 |
| DP3SRA | 5640 |
| DP3SWP | 6157 |
| DP3010 | 5630 |
| DP3213 | 5637 |
| DP3427 | 5635 |
| DP43SR | 5450 |
| DT3RL | 6063 |
| DT4AST | 6111 |
| DT4CDF | 6121 |
| DT4CF | 5767 |
| DT4CLE | 5670 |
| DT4CLF | 6144 |
| DT4CLS | 5642 |
| DT4DIS | 5665 |
| DT4EL | 5753 |
| DT4END | 6200 |
| DT4EOT | 5773 |
| DT4ETX | 5772 |
| DT4EVN | 5747 |
| DT4FLD | 6154 |
| DT4FNB | 5762 |
| DT4FS | 5774 |
| DT4FSL | 6137 |
| DT4HL | 6114 |
| DT4HLG | 5775 |
| DT4LIN | 6155 |
| DT4LP | 5714 |
| DT4MAS | 6112 |
| DT4MFL | 5771 |
| DT4MHS | 5772 |
| DT4NAS | 6131 |
| DT4NHL | 5704 |
| DT4ODD | 5742 |
| DT4RET | 5666 |
| DT4SRT | 6145 |
| DT4WD | 5731 |
| DU8K02 | 5177 |
| DU81AA | 5165 |
| DU81AB | 5172 |
| DU81AC | 5173 |
| DU81IA | 5066 |
| DU81LA | 5067 |
| DU81LB | 5123 |
| DU81LC | 5134 |
| DU81LD | 5131 |
| DU81LE | 5146 |
| DU842B | 5176 |
| DV49AA | 3557 |
| DV49AB | 3560 |
| DV49AC | 3564 |
| DV49IA | 3546 |
| DV49KA | 3563 |
| DV49LA | 3522 |
| DV49LB | 3551 |
| DV49SA | 3426 |
| DV49SB | 3513 |
| DV49TA | 3602 |
| DV91AA | 3556 |
| DV91LA | 3423 |
| DV9421 | 3460 |
| FAP110 | 0000 |
| FAP120 | 0000 |
| FAP130 | 0000 |
| FAP150 | 0000 |
| FAP220 | 0000 |
| FAP230 | 0000 |
| FAP240 | 0000 |
| FAP320 | 0000 |
| FAP410 | 0000 |
| FAP520 | 0000 |
| FARMDF | 0000 |
| FAUS01 | 0000 |
| FBC205 | 0030 |
| FBP110 | 0000 |
| FBP130 | 0000 |
| FBP210 | 0020 |
| FBP220 | 0020 |
| FBP230 | 0020 |
| FBP310 | 0010 |
| FBP420 | 0030 |
| FBP430 | 0010 |
| FBP440 | 0020 |
| FBP510 | 0010 |
| FBP520 | 0010 |
| FBP530 | 0010 |
| FBP540 | 0010 |
| FBP810 | 0040 |
| FBP820 | 0040 |
| FBP910 | 0030 |
| FCP110 | 0010 |
| FCP210 | 0010 |
| FCP310 | 0010 |
| FCP410 | 0010 |
| FCP550 | 0010 |
| FCP610 | 0010 |
| FDC480 | 0030 |
| FDP120 | 0050 |
| FDP130 | 0050 |
| TAD221 | 1561 |
| TAD322 | 1072 |
| TAP11B | 4472 |
| TAP121 | 4400 |
| TAP129 | 2402 |
| TAP131 | 4470 |
| TAP134 | 4571 |
| TAP151 | 2002 |
| TAP152 | 2022 |
| TAP153 | 2034 |
| TAP154 | 2062 |
| TAP212 | 0660 |
| TAP223 | 1525 |
| TAP235 | 7400 |
| TAP236 | 6637 |
| TAP237 | 6042 |
| TAP239 | 6531 |
| TAP242 | 3600 |
| TAP243 | 3604 |
| TAP244 | 0000 |
| TAP322 | 0747 |
| TAP323 | 1001 |
| TAP324 | 1021 |
| TAP411 | 0600 |
| TAP412 | 0606 |
| TAP416 | 0367 |
| TAP417 | 0202 |
| TAP521 | 1602 |
| TAP525 | 1656 |
| TAP529 | 1742 |
| TAP611 | 1755 |
| TAP612 | 1765 |
| TAR417 | 0400 |
| TAUS01 | 0200 |
| TBCATL | 0210 |
| TBCDAL | 0050 |
| TBCESP | 1565 |
| TBCNFP | 1566 |
| TBC132 | 2727 |
| TBP22H | 2437 |
| TBP22X | 0202 |
| TBP221 | 1401 |
| TBP222 | 1444 |
| TBP223 | 1500 |
| TBP224 | 1601 |
| TBP226 | 0401 |
| TBP229 | 3201 |
| TBP23I | 5143 |
| TBP23J | 5324 |
| TBP23S | 4361 |
| TBP23X | 5601 |
| TBP23Z | 6061 |
| TBP31A | 4404 |
| TBP31B | 5001 |
| TBP315 | 3602 |
| TBP422 | 0242 |
| TBP423 | 0220 |
| TBP424 | 0401 |
| TBP425 | 0202 |
| TBP431 | 5202 |
| TBP432 | 5211 |
| TBP434 | 5677 |
| TBP437 | 6001 |
| TBP438 | 6024 |
| TBP44C | 7555 |
| TBP44D | 6351 |
| TBP44E | 6253 |
| TBP44F | 7352 |
| TBP44J | 7601 |
| TBP44K | 7401 |
| TBP44L | 7212 |
| TBP44M | 7206 |
| TBP44N | 7202 |
| TBP44R | 7135 |
| TBP44U | 6414 |
| TBP44V | 7715 |
| TBP441 | 6241 |
| TBP451 | 7610 |

| | |
|---|---|
| DV93AA | 3561 |
| DV93AB | 3562 |
| DV93LA | 3474 |
| DV93LB | 3510 |
| DV93TA | 3565 |
| DV94AA | 3734 |
| DV94AB | 3735 |
| DV94AC | 3736 |
| DV94AD | 3737 |
| DV94LA | 3667 |
| DV94LB | 3672 |
| DV94LC | 3704 |
| DV94LD | 3713 |
| DV94LE | 3721 |
| DV94LF | 3726 |
| DV94LG | 3724 |
| TCP551 | 7124 |
| TCP611 | 7201 |
| TCP91X | 7335 |
| TCP911 | 7266 |
| TCP912 | 7401 |
| TCP913 | 7414 |
| TCP914 | 7432 |
| TDC010 | 3400 |
| TDC201 | 1717 |
| TDC202 | 1737 |
| TDC481 | 4201 |
| TDC483 | 5001 |
| TDC484 | 5401 |
| TDC486 | 6001 |
| TDC487 | 6601 |
| TDD201 | 0001 |
| TDD202 | 0461 |
| TDP121 | 5202 |
| TDP122 | 5405 |
| TDP123 | 5242 |
| TDP124 | 5535 |
| TDP131 | 7202 |
| TDP132 | 7401 |
| TDP133 | 7311 |
| TDP134 | 7460 |
| TDP135 | 7463 |
| TDP137 | 7357 |
| TDP211 | 0402 |
| TDP212 | 0601 |
| TDP214 | 2121 |
| TDP221 | 0507 |
| TDP224 | 1265 |
| TDP236 | 1070 |
| TDP31A | 3003 |
| TDP31B | 2202 |
| TDP311 | 4511 |
| TDP312 | 3201 |
| TDP313 | 3602 |
| TDP314 | 2403 |
| TDP315 | 3401 |
| TDP316 | 4001 |
| TDP317 | 4201 |
| TDP319 | 3755 |
| TDP32A | 6420 |
| TDP32B | 6504 |
| TDP321 | 6273 |
| TDP322 | 6601 |
| TDP323 | 7001 |
| TDP324 | 6401 |
| TDP325 | 6001 |
| TDP326 | 6201 |
| TDP327 | 5623 |
| TDP328 | 6050 |
| TDP329 | 6112 |
| TDP331 | 4603 |
| FDP210 | 0050 |
| FDP230 | 0050 |
| FDP310 | 0050 |
| FDP320 | 0050 |
| FDP330 | 0050 |
| FDP340 | 0050 |
| FDP410 | 0040 |
| FDP420 | 0040 |
| FDP430 | 0040 |
| FDP440 | 0040 |
| FDP450 | 0040 |
| FDP460 | 0040 |
| FDP470 | 0040 |
| FDP490 | 0040 |
| TAC417 | 0265 |
| TAD151 | 2042 |
| TDP332 | 5001 |
| TDP333 | 5077 |
| TDP334 | 5137 |
| TDP335 | 5161 |
| TDP341 | 4401 |
| TDP342 | 4436 |
| TDP345 | 4143 |
| TDP41A | 4000 |
| TDP41B | 4001 |
| TDP411 | 4043 |
| TDP412 | 4201 |
| TDP413 | 4123 |
| TDP415 | 4430 |
| TDP416 | 3741 |
| TDP42A | 0402 |
| TDP42B | 2043 |
| TDP42C | 0711 |
| TDP42D | 2011 |
| TDP42E | 2025 |
| TDP42F | 0601 |
| TDP42G | 2001 |
| TDP42H | 1757 |
| TDP42I | 1143 |
| TDP421 | 1401 |
| TDP422 | 1201 |
| TDP423 | 1606 |
| TDP424 | 2212 |
| TDP425 | 2231 |
| TDP426 | 3001 |
| TDP427 | 2201 |
| TDP428 | 0460 |
| TDP429 | 2401 |
| TDP431 | 5401 |
| TDP432 | 5430 |
| TDP433 | 5601 |
| TDP434 | 5475 |
| TDP435 | 5502 |
| TDP436 | 5507 |
| TDP437 | 5514 |
| TDP441 | 3055 |
| TDP442 | 3201 |
| TDP448 | 3225 |
| TDP449 | 3142 |
| TDP451 | 6202 |
| TDP452 | 6242 |
| TDP453 | 6601 |
| TDP454 | 6401 |
| TDP455 | 6646 |
| TDP456 | 6717 |
| TDP457 | 6467 |
| TDP461 | 7201 |
| TDP462 | 6330 |
| TDP463 | 7401 |
| TDP464 | 7601 |
| TDP471 | 6001 |
| TBC205 | 2401 |
| TBC210 | 2445 |
| TBD541 | 0711 |
| TBLBDF | 4401 |
| TBP111 | 2602 |
| TBP131 | 3235 |
| TBP132 | 3401 |
| TBP211 | 4514 |
| TBP212 | 4001 |
| TBP213 | 4601 |
| TBP22F | 2563 |
| TBP221 | 1657 |
| TBP22L | 2001 |
| TBP22M | 2511 |
| TBP22R | 3401 |
| TBP22S | 2601 |
| TDP472 | 6032 |
| TDP473 | 6056 |
| TDP474 | 5643 |
| TDP491 | 3402 |
| TDP492 | 3446 |
| TDP493 | 3462 |
| TDP494 | 3651 |
| TDP511 | 0202 |
| TDP512 | 0235 |
| TDP513 | 0243 |
| TDP514 | 0277 |
| TDP515 | 0341 |
| TDP516 | 0347 |
| TDR001 | 5601 |
| TDZACI | 5620 |
| TDZDAB | 5605 |
| TDZDCY | 5617 |
| TDZOSM | 5602 |
| TDZOTC | 5604 |
| TD483E | 6000 |
| TD487E | 7600 |
| WKLEAR | 7300 |
| WK4000 | 7330 |
| WK5777 | 7352 |
| WK6000 | 7333 |
| WK7775 | 7346 |
| WK7776 | 7344 |
| WK7777 | 7340 |
| WM0001 | 7340 |
| WM0002 | 7344 |
| WM0003 | 7346 |
| WM2000 | 7333 |
| WM2001 | 7352 |
| WM4000 | 7330 |
| WP0001 | 7301 |
| WP0002 | 7305 |
| WP0003 | 7325 |
| WP0004 | 7307 |
| WP0006 | 7327 |
| WP0100 | 7203 |
| WP2000 | 7332 |
| WP3777 | 7350 |
| ZARMDE | 0133 |
| ZAUT00 | 0010 |
| ZAUT01 | 0011 |
| ZAUT02 | 0012 |
| ZAUT03 | 0013 |
| ZAUT04 | 0014 |
| ZAUT05 | 0015 |
| ZAUT06 | 0016 |
| ZAUT07 | 0017 |
| ZBCALM | 0105 |
| ZBCADM | 0103 |
| ZBCCIF | 0110 |
| ZBCDCM | 0104 |
| ZKB221 | 0160 |
| ZKB222 | 0161 |
| ZKB226 | 0163 |
| ZKB229 | 0164 |
| ZKB231 | 0171 |
| ZKB23S | 0172 |
| ZKB23X | 0173 |
| ZKB23Z | 0174 |
| ZKB31A | 0156 |
| ZKB521 | 0175 |
| ZKB522 | 0176 |
| ZKB523 | 0177 |
| ZKCDF | 0021 |
| ZKCDT | 0023 |
| ZKCIF | 0022 |
| ZKC213 | 0135 |
| ZKC911 | 0173 |
| ZKD329 | 0156 |
| ZKD342 | 0136 |
| ZKD345 | 0170 |
| ZKD42A | 0147 |
| ZKD42B | 0140 |
| ZKD42C | 0167 |
| TBP512 | 1265 |
| TBP521 | 2201 |
| TBP522 | 2504 |
| TBP523 | 2703 |
| TBP532 | 0522 |
| TBP533 | 0555 |
| TBP541 | 1103 |
| TBP542 | 1154 |
| TBP551 | 2122 |
| TBP811 | 0202 |
| TBP821 | 1602 |
| TBP911 | 7610 |
| TBP919 | 7603 |
| TCP111 | 6202 |
| TCP213 | 7023 |
| TCP311 | 6401 |
| ZBCDUA | 0102 |
| ZBCDUN | 0101 |
| ZBCILA | 0113 |
| ZBCILF | 0112 |
| ZBCIVA | 0122 |
| ZBCKLT | 0111 |
| ZBCPGN | 0120 |
| ZBCPGI | 0115 |
| ZBCPTP | 0114 |
| ZDBNCL | 0122 |
| ZDCCAN | 0115 |
| ZDCCCL | 0107 |
| ZDCCCR | 0114 |
| ZDCCCY | 0110 |
| ZDCCDS | 0103 |
| ZDCCHS | 0117 |
| ZDCCLN | 0106 |
| ZDCCLT | 0113 |
| ZDCCUS | 0102 |
| ZDCCSN | 0107 |
| ZDCCSP | 0111 |
| ZDCCVB | 0116 |
| ZDCDAT | 0104 |
| ZDCDBF | 0123 |
| ZDCDES | 0101 |
| ZDCDIP | 0103 |
| ZDCFLD | 0110 |
| ZDCFLG | 0111 |
| ZDCFLN | 0105 |
| ZDCLCU | 0114 |
| ZDCNCL | 0121 |
| ZDCNUL | 0101 |
| ZDCOAN | 0113 |
| ZDCOCR | 0112 |
| ZDCPKS | 0120 |
| ZDCPLN | 0116 |
| ZDCPRS | 0102 |
| ZDCPSC | 0115 |
| ZDCSAD | 0104 |
| ZDCTXS | 0112 |
| ZKA151 | 0036 |
| ZKA152 | 0037 |
| ZKA153 | 0040 |
| ZKA154 | 0041 |
| ZKA322 | 0031 |
| ZKA323 | 0032 |
| ZKA324 | 0033 |
| *ZKA416 | 0024 |
| ZKA417 | 0025 |
| ZKA521 | 0026 |
| ZKA525 | 0027 |
| ZKA529 | 0030 |
| ZKB111 | 0035 |
| ZKB213 | 0157 |
| ZKB22L | 0166 |
| ZP0007 | 0052 |
| ZP0010 | 0053 |
| ZP0017 | 0054 |
| ZP0020 | 0055 |
| ZP0037 | 0056 |
| ZP0040 | 0057 |
| ZP0060 | 0020 |
| ZP0070 | 0060 |
| ZP0077 | 0061 |
| ZP0100 | 0062 |
| ZP0120 | 0063 |
| ZP0177 | 0064 |
| ZP0200 | 0065 |
| ZP0260 | 0066 |
| ZP0377 | 0067 |
| ZP0777 | 0076 |
| ZP7000 | 0070 |
| ZP7400 | 0071 |
| ZP7600 | 0072 |
| ZP7700 | 0073 |
| ZP7777 | 0077 |
| ZVKCRL | 0126 |
| ZXDEK1 | 0004 |

```
ZKD42F 0150          ZWORK2 0005
ZKD42G 0135          ZWORK3 0006
ZKD421 0152          ZWORK4 0007
ZKD422 0153
ZKD423 0154
ZKD424 0176
ZKD425 0177
ZKD426 0155
ZKD428 0151
ZKD429 0162
ZKD441 0141
ZKD453 0142
ZKD456 0143
ZKD457 0144
ZKD462 0145
ZKD463 0146
ZKD511 0130
ZKD512 0131
ZKD513 0132
ZKD514 0133
ZKD515 0134
ZKD516 0137
ZM0004 0074
ZM0005 0042
ZM0006 0043
ZM0010 0044
ZM0040 0045
ZM0120 0046
ZM0260 0047
ZP0003 0000
ZP0005 0050
ZP0006 0051
```

```
ERRORS DETECTED: 0
LINKS GENERATED: 0
ACL      150   155   212   564   634   1448  1498  1507  1860  1873
CAM      1966  1988  2038  2195
CDI      134   181   223   372   616   1724  1930
DABBRA   1330  1377# 1401  1470
DABBRB   1331  1378# 1406
DABBRC   1332  1379# 1411
DM5FRA   272
DM6CDF   271
DNABCF   1041# 1128  1623
DNABFF   1060  1201  1229  1256  1263  1425  1578
DNABLA   598   612#
DNCHAD   636   675   769#
DNCHAR   560#  568   769   968   1317
DNDKUN   601   605#
DNECBN   590   592   612   613   785#
DNECBO   588   776#
DNFLIN   684   772#
DNHWIA   1120  1121  1245  1247  1295  1345  1434  1552
DNHWIB   1058  1118  1491  1495  1497  1551  1599
DNLAST   1171  1182# 1204  1259  1262
DNLCTL   587   599   614   784#
DNLOOP   592#  615
DNMODE   585   589   606#
DNNCHS   1080  1099  1100  1127  1188  1226  1251  1252  1254  1336
         1343  1428  1489  1540  1563
DNNLCH   868   876   969#
DNNLIL   1039# 1068  1093  1618
DNPARA   1587  1610#
DNP#SP   1185# 1223  1224  1234  1239  1249  1289  1290  1292  1301
         1306  1609
DNRPAR   1038# 1062  1144  1145  1149  1610
DNSPCF   1172  1181# 1613
DNSPIF   1184# 1191  1266  1620
DNSPPF   1183# 1208  1260  1615
DNSPTF   1131  1517  1558
DNTCHS   1040# 1059  1092  1617
DN11AA   643   770#
DN11AB   660   691   767#
DN11AC   663   768#
DN11KA   666   773#
DN11KB   670   775#
DN11LA   686   692   695#
DN11LB   669   677#
DN11SA   1146  1173#
DN11SB   665   682#  696   1173
DN1124   1113  1165#
DN12AA   820   941   970#
DN12AB   869   877   971#
DN12AC   890   972#
DN12AD   945   975#
DN12AF   866   867   874   875   968#
DN12AG   998   1002  1015#
DN12AH   1000  1016#
DN12AI   1006  1017#
DN12AJ   909   973#
DN12CA   846   855   984#  1017
DN12KA   974#
DN12LA   860#  880
```

| | | | | | | | | |
|---|---|---|---|---|---|---|---|---|
| DN12LB | 813 | 819# | | | | | | |
| DN12LC | 857 | 870 | 878 | 885# | | | | |
| DN12LE | 889 | 913 | 923# | | | | | |
| DN12LG | 891 | 938# | | | | | | |
| DN12LH | 837 | 939# | | | | | | |
| DN12LI | 818 | 823 | 933 | 952# | | | | |
| DN12LJ | 996 | 1002# | | | | | | |
| DN12LK | 1001 | 1005# | | | | | | |
| DN12LZ | 931# | | | | | | | |
| DN12OA | 859 | 860 | 879 | 985# | | | | |
| DN12OB | 954 | 976# | | | | | | |
| DN12SA | 971 | 994# | 999 | 1003 | 1007 | 1008 | | |
| DN12TA | 862 | 863 | 872 | 986# | | | | |
| DN13AA | 719 | 771# | | | | | | |
| DN13AB | 732 | 774# | | | | | | |
| DN13AC | 743 | 766# | | | | | | |
| DN13LA | 722 | 740# | | | | | | |
| DN13LB | 714 | 717 | 725 | 756# | | | | |
| DN15AA | 1055 | 1159# | | | | | | |
| DN15AB | 1052 | 1160# | | | | | | |
| DN15AC | 1107 | 1110 | 1136 | 1161# | | | | |
| DN15AD | 1078 | 1097 | 1162# | | | | | |
| DN15AE | 1091 | 1117 | 1163# | | | | | |
| DN15AF | 1106 | 1134 | 1164# | | | | | |
| DN15AH | 1554 | 1619# | | | | | | |
| DN15AI | 1514 | 1555 | 1557 | 1613# | | | | |
| DN15AJ | 1214 | 1276 | 1293 | 1315# | | | | |
| DN15AK | 1580 | 1585 | 1614# | | | | | |
| DN15AL | 1586 | 1609# | | | | | | |
| DN15AM | 1333 | 1470# | | | | | | |
| DN15AN | 1556 | 1620# | | | | | | |
| DN15AO | 1215 | 1277 | 1294 | 1316# | | | | |
| DN15AP | 1218 | 1317# | | | | | | |
| DN15AQ | 1219 | 1318# | | | | | | |
| DN15AR | 1483 | 1515 | 1535 | 1562 | 1615# | | | |
| DN15AS | 1070 | 1166# | | | | | | |
| DN15AT | 1077 | 1096 | 1167# | | | | | |
| DN15AU | 1125 | 1168# | | | | | | |
| DN15AV | 1484 | 1490 | 1617# | | | | | |
| DN15AW | 1485 | 1618# | | | | | | |
| DN15AX | 1536 | 1623# | | | | | | |
| DN15AY | 1212 | 1275 | 1291 | 1319# | | | | |
| DN15AZ | 1560 | 1621# | | | | | | |
| DN15A2 | 1504 | 1616# | | | | | | |
| DN15A3 | 1066 | 1169# | | | | | | |
| DN15A4 | 1057 | 1069 | 1170# | | | | | |
| DN15A5 | 1064 | 1171# | | | | | | |
| DN15A6 | 1065 | 1081 | 1172# | | | | | |
| DN15A7 | 1264 | 1320# | | | | | | |
| DN15A8 | 1561 | 1622# | | | | | | |
| DN15A9 | 1339 | 1471# | | | | | | |
| DN15IA | 1170 | 1320 | 1559 | 1598# | | | | |
| DN15IB | 1050 | 1151# | | | | | | |
| DN15IC | 1265 | 1304# | 1469 | 1621 | | | | |
| DN15ID | 1166 | 1351# | | | | | | |
| DN15KA | 1499 | 1611# | | | | | | |
| DN15KC | 1198 | 1220 | 1314# | | | | | |
| DN15KD | 1573 | 1583 | 1612# | | | | | |
| DN15LA | 1090# | 1133 | 1137 | | | | | |
| DN15LB | 1092# | 1130 | | | | | | |
| DN15LC | 1105 | 1108 | 1111 | 1117# | | | | |
| DN15LD | 1102 | 1126# | | | | | | |
| DN15LE | 1095 | 1144# | | | | | | |
| DN15LF | 1116 | 1145# | 1316 | 1614 | | | | |
| DN15LG | 1484# | 1501 | | | | | | |
| DN15LH | 1506# | 1512 | | | | | | |
| DN15LI | 1514# | 1520 | | | | | | |
| DN15LJ | 1193 | 1196 | 1200 | 1206 | 1210 | 1220# | 1253 | |
| DN15LK | 1231 | 1234# | | | | | | |
| DN15LL | 1228 | 1233 | 1254# | | | | | |
| DN15LM | 1347# | 1363 | | | | | | |
| DN15LN | 1366# | 1370 | | | | | | |
| DN15LO | 1236 | 1244 | 1248# | | | | | |
| DN15LP | 1203 | 1211# | | | | | | |
| DN15LQ | 1515# | 1522 | 1526 | 1528 | 1530 | 1532 | | |
| DN15LR | 1517# | 1524 | | | | | | |
| DN15LS | 1487 | 1536# | | | | | | |
| DN15LT | 1513 | 1516 | 1518 | 1539# | | | | |
| DN15LU | 1258 | 1262# | | | | | | |
| DN15PA | 1053 | 1124 | 1553 | 1601 | 1602 | | | |
| DN15PB | 1168 | 1241 | 1242 | 1297 | 1305# | 1468 | 1471 | 1619 |
| DN15SA | 1169 | 1488 | 1597# | 1604 | | | | |
| DN15SB | 1167 | 1550# | 1564 | | | | | |
| DN15SC | 1162 | 1481# | 1537 | 1541 | | | | |
| DN15SD | 1163 | 1186# | 1190 | 1267 | | | | |
| DN15SE | 1164 | 1329# | 1368 | | | | | |
| DN15SF | 1161 | 1380# | 1422 | 1424 | 1435 | | | |
| DN15SG | 1232 | 1248 | 1273# | 1280 | | | | |
| DN15SI | 1319 | 1570# | 1577 | 1588 | | | | |
| DN15SJ | 1237 | 1255 | 1288# | 1309 | | | | |
| DN15SK | 1358 | 1369 | 1444# | 1456 | | | | |
| DN15TA | 1519# | 1616 | | | | | | |
| DN41SA | 547# | 552 | 553 | 767 | 972 | 1015 | 1315 | |
| DN41SB | 561# | 569 | 768 | 1016 | 1318 | | | |

```
DOZDCM    1902
DOZDUN    2213
DPRLPS    1690#  1745
DPRLSS    1746   1751#
DPR010    1842   1846#
DPR020    1845   1851#
DPR030    1864   1870#
DPR040    1869   1875#
DPSCRL    1768   1788   1807   1829   1837#  1850   1880
DP0427    1689#  1715   1853
DP1CD1    1667   1674   1684#
DP1LDM    1670   1677   1688#
DP1505    1672   1676   1687#
DP2EXT    1709   1724#
DP2MSK    1922   1933#
DP2010    1713   1719#
DP2020    1717   1722#
DP2777    1871   1881#
DP3DUN    2214   2219#
DP3EXT    1909   1928#
DP3MDE    2211   2220#
DP3SRA    1908   1935#
DP3SWP    1934   2210#  2222
DP3010    1921   1926#
DP3213    1906   1929   1934#
DP3427    1917   1932#
DP43SR    1708   1732#  1740   1749   1750   1935
DT3RL     2133#  2144
DT4AST    2156#  2184
DT4COF    2167   2174#
DT4CF     2046#  2201
DT4CLE    1971   1983#
DT4CLF    2166   2193#  2196
DT4CLS    1961#  1995   2003   2010   2012   2016   2025   2028   2030   2033
          2207
DT4DIS    1960#  2040
DT4EL     2029   2034#
DT4END      91   2225#
DT4EOT    2032   2051#
DT4ETX    2027   2050#
DT4EVN    2007   2030#
DT4FLD    2197   2201#
DT4FNB    2015   2041#
DT4FS     1967   1989   2044   2052#
DT4FSL    2052   2188#  2200
DT4HL     2053   2164#  2181   2186
DT4HLG    1972   1990   2053#
DT4LIN    2199   2202#
DT4LP     2003#  2024
DT4MAS    2162#  2177
DT4MFL    2005   2019   2048#
DT4MGS    1997   2049#
DT4NAS    2179   2182#
DT4NHL    1992   1995#
DT4ODD    2021   2025#
DT4RET    1965   1974   1981#  1994
DT4SRT    2175   2182   2185   2194#  2198
DT4WD     2016#  2047
DU8K02    1382   1473#
DU81AA    1383   1463#
DU81AB    1430   1468#
DU81AC    1432   1469#
DU81IA    1387#  1431
DU81LA    1388#  1421
DU81LB    1405   1410   1416#
DU81LC    1415   1425#
DU81LD    1390   1422#
DU81LF    1435#
DU842B    1381   1472#
DV49AA     151    156    271#
DV49AB     149    152    154    272#
DV49AC     236    276#
DV49IA     253    258#
DV49KA     234    275#
DV49LA     238#   264
DV49LB     242    261#
DV49SA     102    143#   157    175
DV49SB     126    180    231#   247    260    265
DV49TA     276    300#
DV91AA     111    270#
DV91LA     114    116    133#
DV93AA     218    273#
DV93AB     203    274#
DV93LA     207    211#
DV93LB     210    223#
DV93TA     273    283#
DV94AA     354    358    433#
DV94AB     373    434#
DV94AC     389    435#
DV94AD     394    436#
DV94LA     361    372#
DV94LB     364    381#
DV94LC     383    391#
DV94LD     356    404#
```

| | | | | | | | | | | |
|---|---|---|---|---|---|---|---|---|---|---|
| DV94LF | 396 | 410# | | | | | | | | |
| DV94LF | 365 | 387 | 406 | 421# | | | | | | |
| DV94LG | 397 | 413# | | | | | | | | |
| DV942T | 177 | 183# | | | | | | | | |
| FAP320 | 593 | 955 | | | | | | | | |
| FAP410 | 457 | | | | | | | | | |
| FBP210 | 602 | 642 | 718 | 1051 | | | | | | |
| FBP220 | 422 | 757 | 2113 | 2153 | | | | | | |
| FBP230 | 223 | 424 | 943 | 2070 | 2116 | | | | | |
| FBP310 | 134 | 181 | | | | | | | | |
| FDC480 | 1387 | | | | | | | | | |
| FDP120 | 334 | 336 | | | | | | | | |
| FDP210 | 328 | 330 | | | | | | | | |
| FDP310 | 300 | 302 | 304 | 322 | | | | | | |
| FDP320 | 316 | 318 | 320 | 372 | 914 | | | | | |
| FDP330 | 324 | 326 | 332 | 388 | | | | | | |
| FDP340 | 952 | 2086 | 2141 | | | | | | | |
| FDP410 | 306 | 459 | 461 | 526 | 567 | 644 | 720 | 821 | 942 | 1056 |
| | 1353 | 1423 | 1426 | 1603 | | | | | | |
| FDP450 | 308 | 310 | | | | | | | | |
| FDP470 | 312 | 314 | 1975 | 1981 | 2034 | 2189 | | | | |
| FDP490 | 89 | 117 | 153 | 211 | 359 | | | | | |
| TAD322 | 465 | | | | | | | | | |
| TAR417 | 458 | | | | | | | | | |
| TDC481 | 1465 | | | | | | | | | |
| TDC483 | 1464 | | | | | | | | | |
| TDC486 | 1467 | | | | | | | | | |
| TDC487 | 1466 | | | | | | | | | |
| TDP121 | 335 | | | | | | | | | |
| TDP122 | 337 | | | | | | | | | |
| TDP124 | 1165 | | | | | | | | | |
| TDP211 | 329 | | | | | | | | | |
| TDP212 | 331 | | | | | | | | | |
| TDP313 | 323 | | | | | | | | | |
| TDP315 | 301 | | | | | | | | | |
| TDP316 | 303 | | | | | | | | | |
| TDP317 | 305 | | | | | | | | | |
| TDP321 | 434 | | | | | | | | | |
| TDP323 | 317 | | | | | | | | | |
| TDP325 | 319 | | | | | | | | | |
| TDP328 | 321 | | | | | | | | | |
| TDP331 | 435 | | | | | | | | | |
| TDP332 | 325 | | | | | | | | | |
| TDP333 | 327 | 333 | | | | | | | | |
| TDP41A | 460 | 583# | | | | | | | | |
| TDP41B | 462 | 584# | | | | | | | | |
| TDP411 | 284 | 633# | 646 | 649 | 652 | 661 | 673 | 678 | | |
| TDP412 | 307 | 801# | 810 | 916 | 961 | | | | | |
| TDP413 | 285 | 711# | 735 | 742 | 744 | 749 | 759 | | | |
| TDP415 | 436 | 774 | 1047# | 1152 | | | | | | |
| TDP416 | 286 | 527 | 529# | 532 | 535 | 539 | | | | |
| TDP42B | 973 | | | | | | | | | |
| TDP428 | 1472 | | | | | | | | | |
| TDP42T | 183 | | | | | | | | | |
| TDP427 | 1689 | 1932 | | | | | | | | |
| TDP431 | 295 | 1664# | 1685 | 1838 | 1855 | | | | | |
| TDP432 | 1706# | 1725 | 1852 | 1875 | | | | | | |
| TDP433 | 1900# | 1931 | | | | | | | | |
| TDP434 | 291 | 1733 | 1738 | 1741 | 1766# | 1769 | | | | |
| TDP435 | 292 | 1786# | 1789 | | | | | | | |
| TDP436 | 293 | 1805# | 1808 | | | | | | | |
| TDP437 | 294 | 1826# | 1830 | | | | | | | |
| TDP451 | 287 | | | | | | | | | |
| TDP452 | 975 | | | | | | | | | |
| TDP454 | 309 | | | | | | | | | |
| TDP455 | 311 | | | | | | | | | |
| TDP461 | 288 | | | | | | | | | |
| TDP471 | 289 | 2066# | 2069 | 2091 | | | | | | |
| TDP472 | 315 | 2100# | 2103 | 2107 | 2118 | | | | | |
| TDP473 | 313 | 2127# | 2130 | 2155 | | | | | | |
| TDP474 | 290 | 1904 | 1928 | 1962# | 1982 | 1985 | | | | |
| TDP491 | 91 | 100# | 101 | 213 | 215 | | | | | |
| TDP492 | 173# | 174 | 202 | 217 | | | | | | |
| TDP493 | 123 | 176 | 201# | 224 | 245 | | | | | |
| TDP494 | 283 | 352# | 374 | 390 | 393 | 409 | 414 | 426 | | |
| XKLEAR | 607 | 733 | 1482 | 2221 | | | | | | |
| XS1000 | 122 | 243 | | | | | | | | |
| XS0001 | 583 | 938 | 1123 | 1238 | 1391 | 1534 | 1539 | 1680 | 1743 | 1787 |
| | 2180 | | | | | | | | | |
| XS0002 | 1911 | | | | | | | | | |
| XS0003 | 357 | | | | | | | | | |
| XP0001 | 562 | 659 | 923 | 997 | 1061 | 1063 | 1090 | 1109 | 1126 | 1135 |
| | 1211 | 1213 | 1274 | 1293 | 1767 | 1976 | 2035 | 2114 | 2152 | |
| XP0002 | 842 | 2138 | | | | | | | | |
| XP0003 | 124 | 176 | 1394 | 2089 | | | | | | |
| XP0004 | 1905 | | | | | | | | | |
| XP2000 | 2146 | | | | | | | | | |
| ZAGI60 | 1344 | 1366 | 1393 | 1403 | 1408 | 1413 | 1505 | 1506 | 1508 | 1510 |
| ZAGI61 | 1346 | 1347 | 1354 | 1359 | 1361 | | | | | |
| ZAGT06 | 135 | 144 | 145 | 147 | 182 | | | | | |
| ZBCC1F | 433 | 771 | | | | | | | | |
| ZBCHC3 | 274 | 1688 | | | | | | | | |
| ZBCH0A | 270 | | | | | | | | | |
| ZBC1LA | 1160 | | | | | | | | | |

```
ZFCILF      1159
ZDCCCG       683   740  1194  1197  1221  1969  2002  2008  2022  2041
ZDCCDS       970  1751
ZDCCHS       898  1005
ZDCCLN       902   911  1983  1987  1993  2190
ZDCCLT       536   664   667   671   906  1216  1279  1307  1308  1571
            1581
ZDCCOS       391   407   533   650   715   811   899
ZDCFLD      1716  1719  1720  1851  1856  1859  1862  1874  1877  1912
            1915  1919
ZDCFLG      1711  1865  1868  1870  1872  1923  1924  2081  2083  2104
            2109  2110  2148  2150
ZDCLCH       905
ZDCNOL      1736  1742  1806  1827
ZDCPKS       959  2084  2111  2139  2140
ZDCPLN       817   850   908
ZDCPRS      1690
ZDCPSC       931
ZDCTXS       835   854   907
ZKA322       595
ZKA323       957
ZKA416       617
ZKB213       603  2217
ZKB22L       423   758  1849
ZKB229      2115  2154
ZKB23J      1148
ZKB23S       425  2117
ZKB23Z       944  2071
ZKCDF       1054
ZKCDI       1049  1666
ZKCIF        252
ZKD329       915
ZKD345       953  2087  2142
ZKD42B      2191
ZKD42C       103   214   608  1735
ZKD42G       381   404   530   609   647   712   808  1839  1963  2067
            2101  2128
ZKD421       693   746   900  1004  1278  2039
ZKD422       410   550  1978  2037
ZKD423       565  1302
ZKD424       662   745   851  1071
ZKD425       695   747   924  1681
ZKD426      1722  1879  1926  1980
ZKD429       901  2151
ZKD441       413   538   611   677   694   734   748
ZKD511      2072  2131
ZKD513      2090  2145
ZKD515       125   179   815   831   843   848   853   861   886
ZM0004       205   723  1843  2000
ZM0005       844
ZM0006       586  1103
ZM0010      1341  1502
ZM0040       674
ZP0005       584   814   847   885   939  1707
ZP0006       830   852
ZP0007       421   600   756   858  1848  1907
ZP0040      1217  1364  2079  2105
ZP0070       251
ZP0077       204   635   816   849   865   873 ,1356  1399  1493  1903
            2004  2013  2018  2026  2176
ZP0200       887
ZP0377       239
ZP7700      1996  2031  2183
ZP7777       208   362  1986
ZWORK1       219   220   221   222   233   240  1187  1207  1334  1384
            1385  1386  1388  1392  1395  1396  1397  1419  1420  1429
            1447  1451  1452  1503  1511  1572  1575
ZWORK2       235   263  1335  1400  1416  1427  1445  1449  1453  1455
ZWORK3       237   238   244   248   254   255   256   259   261   262
            1338  1362
ZWORK4      1340  1349  1352

V5A

/ DC4051.88
/
/         %%%%%%%%%%%%%%%%%%%%%%%%%%%%%%%%%%%%%%%%%%%%%%%%%%%%%%%%%%%%
/         %                                                          %
/         %                       PROPRIETARY.                       %
/         %                                                          %
/         %  THIS DOCUMENT CONTAINS INFORMATION PROPRIETARY TO       %
/         %  REUTERS LIMITED AND IS NOT TO BE REPRODUCED AND/OR      %
/         %  USED IN WHOLE OR IN PART WITHOUT THE EXPRESS WRITTEN    %
/         %  PERMISSION OF REUTERS LIMITED.                          %
/         %                                                          %
/         %%%%%%%%%%%%%%%%%%%%%%%%%%%%%%%%%%%%%%%%%%%%%%%%%%%%%%%%%%%%
/
/
/
/       MODULE  MAP650.88 14-MAY-80
/       SYSTEM MAP FILE
/
/       MODULE MAPC50.88 25-FEB-80
/       CONVERSATIONS MAP FILE
/
```

```
             /        *MODULE F3EQ50.8B 30-MAY-79
             /        FIXED PAGE ZERO CONSTANTS AND COMMON DATA EQUATES FIELD 3.


             /
             /        *MODULE YKEQ50.8B        22-JUN-79
             /        SYSTEM DEVICE EQUATES


             / ======================================
             / =                                    =
             / =      COMPONENT:       DC4051.8B    =
             / =      SYSTEM & USER ABBREVIATIONS   =
             / =                                    =
             / ======================================


             / ======================================
             / = TDC481 - SYSTEM ABBREVIATIONS      =
             / =      TABLE DATA SET FOR CNV.       =
             / ======================================


       0003           FIELD   FDC480%10
       4200           *TDC481-1
34200  0600           0^4000+DU8END-TDC481+1  /*ELEMENT:TYPE 0:SIZE DU8END-TDC481+1
34201  0240  TDC481, TEXT    #B      #           / B="I BUY"
34202  4040
34203  4040
34204  0511           "I&77!500
34205  4002           TEXT    # BUY#
34206  2531
34207  0223           TEXT    #BS     #           / BS="I BUY AND SELL"
34210  4040
34211  4040
34212  1611           "I&77!1600
34213  4002           TEXT    # BUY AND SELL#
34214  2531
34215  4001
34216  1604
34217  4023
34220  0514
34221  1400
34222  0740           TEXT    #G      #           / G="I GIVE"
34223  4040
34224  4040
34225  0611           "I&77!600
34226  4007           TEXT    # GIVE#
34227  1126
34230  0500
34231  2340           TEXT    #S      #           / S="I SELL"
34232  4040
34233  4040
34234  0611           "I&77!600
34235  4023           TEXT    # SELL#
34236  0514
34237  1400
34240  2302           TEXT    #SB     #           / SB="I SELL AND BUY"
34241  4040
34242  4040
34243  1611           "I&77!1600
34244  4023           TEXT    # SELL AND BUY#
34245  0514
34246  1440
34247  0116
34250  0440
34251  0225
34252  3100
34253  2440           TEXT    #T      #           / T="I TAKE"
34254  4040
34255  4040
34256  0611           "I&77!600
34257  4024           TEXT    # TAKE#
34260  0113
34261  0500
34262  5240           TEXT    #*      #           / *="MILLION US DOLLARS AT "
34263  4040
34264  4040
34265  2615           "M&77!2600
34266  1114           TEXT    #ILLION US DOLLARS AT #
34267  1411
34270  1716
34271  4025
34272  2340
34273  0417
34274  1414
34275  0122
34276  2340
34277  0124
34300  4000
34301  2040           TEXT    #P      #           / P="MILLION POUNDS AT "
34302  4040
34303  4040
34304  2215           "M&77!2200
```

```
34305  1114         TEXT    #ILLION POUNDS AT "
34306  1411
34307  1716
34310  4020
34311  1725
34312  1604
34313  2340
34314  0124
34315  4042
34316  0000  DU81CE, ZBLOCK  TDC483-.-1                      / 0= END OF TABLE MARKER
       5000  DU8END=.

       / =====================================
       / = TDC483 - USER ABBREVIATIONS TABLE   =
       / =      DATA SET FOR CSV.              =
       / =====================================

       5000         *TDC483-1
35000  5000         1*4000+1000      /*ELEMENT:TYPE 1:SIZE 1000
35001  0000  TDC483, ZBLOCK  777

       / =====================================
       / = TDC486 - SYSTEM ABBREVIATIONS       =
       / =      TABLE DATA SET FOR CNB.        =
       / =====================================

       6000         *TDC486-1
36000  0600         0*4000+DU9END-TDC486+1  /*ELEMENT:TYPE 0:SIZE DU9END-TDC486+1
36001  0124  TDC486, TEXT    #ATS    #          / ATS="AUSTRIAN SCHILLING"
36002  2340
36003  4040
36004  2201         "A&77!2200              / LENGTH IN TOP HALF OF 1ST WORD OF
36005  2523         TEXT    #USTRIAN SCHILLING#               / EXPANDED TEXT
36006  2422
36007  1101
36010  1640
36011  2303
36012  1011
36013  1414
36014  1116
36015  0700
36016  0240         TEXT    #B      #          / B="I BUY"
36017  4040
36020  4040
36021  0511         "I&77!500
36022  4002         TEXT    # BUY#
36023  2531
36024  0205         TEXT    #BEF    #          / BEF="BELGIAN FRANC"
36025  0640
36026  4040
36027  1502         "B&77!1500
36030  0514         TEXT    #ELGIAN FRANC#
36031  0711
36032  0116
36033  4006
36034  2201
36035  1603
36036  0223         TEXT    #BS     #          / BS="I BUY AND SELL"
36037  4040
36040  4040
36041  1611         "I&77!1600
36042  4002         TEXT    # BUY AND SELL#
36043  2531
36044  4001
36045  1604
36046  4023
36047  0514
36050  1400
36051  0340         TEXT    #C      #          / C="CHANGE"
36052  4040
36053  4040
36054  0603         "C&77!600
36055  1001         TEXT    #HANGE#
36056  1607
36057  0500
36060  0301         TEXT    #CAD    #          / CAD="CANADIAN DOLLAR"
36061  0440
36062  4040
36063  1703         "C&77!1700
36064  0116         TEXT    #ANADIAN DOLLAR#
36065  0104
36066  1101
36067  1640
36070  0417
36071  1414
36072  0122
36073  0310         TEXT    #CHF    #          / CHF="SWISS FRANC"
36074  0640
36075  4040
36076  1323         "S&77!1300
36077  2711         TEXT    #WISS FRANC#
36100  2323
```

```
36101  4006
36102  2201
36103  1603
36104  0405         TEXT     #DEM    #          / DEM="DEUTSCHE MARK"
36105  1540
36106  4040
36107  1504         "D&77!1500
36110  0525         TEXT     #EUTSCHE MARK#
36111  2423
36112  0310
36113  0540
36114  1501
36115  2213
36116  0413         TEXT     #DKK    #          / DKK="DANISH KRONER"
36117  1340
36120  4040
36121  1504         "D&77!1500
36122  0116         TEXT     #ANISH KRONER#
36123  1123
36124  1040
36125  1322
36126  1716
36127  0522
36130  0523         TEXT     #ESP    #          / ESP="SPANISH PESETA"
36131  2040
36132  4040
36133  1623         "S&77!1600
36134  2001         TEXT     #PANISH PESETA#
36135  1611
36136  2310
36137  4020
36140  0523
36141  0524
36142  0100
36143  0611         TEXT     #FIM    #          / FIM="FINNISH MARKKA"
36144  1540
36145  4040
36146  1606         "F&77!1600
36147  1116         TEXT     #INNISH MARKKA#
36150  1611
36151  2310
36152  4015
36153  0122
36154  1313
36155  0100
36156  0622         TEXT     #FRF    #          / FRF="FRENCH FRANC"
36157  0640
36160  4040
36161  1406         "F&77!1400
36162  2205         TEXT     #RENCH FRANC#
36163  1603
36164  1040
36165  0622
36166  0116
36167  0300
36170  0740         TEXT     #G      #          / G="I GIVE"
36171  4040
36172  4040
36173  0611         "I&77!1600
36174  4007         TEXT     # GIVE#
36175  1126
36176  0500
36177  0702         TEXT     #GBP    #          / GBP="STERLING"
36200  2040
36201  4040
36202  1023         "S&77!1000
36203  2405         TEXT     #TERLING#
36204  2214
36205  1116
36206  0700
36207  1040         TEXT     #H      #          / H="CAN YOU HOLD ?"
36210  4040
36211  4040
36212  1603         "C&77!1600
36213  0116         TEXT     #AN YOU HOLD ?#
36214  4031
36215  1725
36216  4010
36217  1714
36220  0440
36221  7700
36222  1013         TEXT     #HKD    #          / HKD="HONG KONG DOLLAR"
36223  0440
36224  4040
36225  2010         "H&77!2000
36226  1716         TEXT     #ONG KONG DOLLAR#
36227  0740
36230  1317
36231  1607
36232  4004
36233  1714
36234  1401
36235  2200
36236  1105         TEXT     #IEP    #          / IEP="IRISH POUND"
```

```
36237  2040
36240  4040
36241  1311        "I&77!1300
36242  2211        TEXT    #RISH POUND#
36243  2310
36244  4020
36245  1725
36246  1604
36247  1115        TEXT    #IM     #         / IM="CAN YOU IMPROVE ?"
36250  4040
36251  4040
36252  2103        "C&77!2100
36253  0116        TEXT    #AN YOU IMPROVE ?#
36254  4031
36255  1725
36256  4011
36257  1520
36260  2217
36261  2605
36262  4077
36263  1124        TEXT    #ITL    #         / ITL="ITALIAN LIRA"
36264  1440
36265  4040
36266  1411        "I&77!1400
36267  2401        TEXT    #TALIAN LIRA#
36270  1411
36271  0116
36272  4014
36273  1122
36274  0100
36275  1220        TEXT    #JPY    #         / JPY="YEN"
36276  3140
36277  4040
36300  0331        "Y&77!300
36301  0516        TEXT    #EN#
36302  1514        TEXT    #ML     #         / ML="MILLION"
36303  4040
36304  4040
36305  0715        "M&77!700
36306  1114        TEXT    #ILLION#
36307  1411
36310  1716
36311  1614        TEXT    #NLG    #         / NLG="GUILDER"
36312  0740
36313  4040
36314  0707        "G&77!700
36315  2511        TEXT    #UILDER#
36316  1404
36317  0522
36320  1617        TEXT    #NOK    #         / NOK="NORWEGIAN KRONER"
36321  1340
36322  4040
36323  2016        "N&77!2000
36324  1722        TEXT    #ORWEGIAN KRONER#
36325  2705
36326  0711
36327  0116
36330  4013
36331  2217
36332  1605
36333  2200
36334  2024        TEXT    #PTE    #         / PTE="PORTUGUESE ESCUDO"
36335  0540
36336  4040
36337  2120        "P&77!2100
36340  1722        TEXT    #ORTUGUESE ESCUDO#
36341  2425
36342  0725
36343  0523
36344  0540
36345  0523
36346  0325
36347  0417
36350  2340        TEXT    #S      #         / S="I SELL"
36351  4040
36352  4040
36353  0611        "I&77!600
36354  4023        TEXT    # SELL#
36355  0514
36356  1400
36357  2302        TEXT    #SB     #         / SB="I SELL AND BUY"
36360  4040
36361  4040
36362  1611        "I&77!1600
36363  4023        TEXT    # SELL AND BUY#
36364  0514
36365  1440
36366  0116
36367  0440
36370  0225
36371  3100
36372  2305        TEXT    #SEK    #         / SEK="SWEDISH KRONA"
36373  1340
36374  4040
```

```
36375  1523          "S&77!1500
36376  2705          TEXT    #WEDISH KRONA#
36377  0411
36400  2310
36401  4013
36402  2217
36403  1601
36404  2307          TEXT    #SGD    #        / SGD="SINGAPORE DOLLAR"
36405  0440
36406  4040
36407  2023          "S&77!2000
36410  1116          TEXT    #INGAPORE DOLLAR#
36411  0701
36412  2017
36413  2205
36414  4004
36415  1714
36416  1101
36417  2200
36420  2440          TEXT    #T      #        / T="I TAKE"
36421  4040
36422  4040
36423  0611          "I&77!1600
36424  4024          TEXT    # TAKE#
36425  0113
36426  0500
36427  2523          TEXT    #USD    #        / USD="US DOLLAR"
36430  0440
36431  4040
36432  1125          "U&77!1100
36433  2340          TEXT    #S DOLLAR#
36434  0417
36435  1414
36436  0122
36437  5240          TEXT    #*      #        / *="MILLION US DOLLARS AT "
36440  4040
36441  4040
36442  2615          "M&77!2600
36443  1114          TEXT    #ILLION US DOLLARS AT #
36444  1411
36445  1716
36446  4025
36447  2340
36450  0417
36451  1414
36452  0122
36453  2340
36454  0124
36455  4040
36456  0000   DUR6CE, 0                         / 0= END OF TABLE MARKER
36457  0000         ZBLOCK   .+200&7600-.       /*ZERO FILL PAGE
       6600         PAGE
       6600   DU9END=.

              / ======================================
              / = TDC487 - USER ABBREVIATIONS TABLE  =
              / =      DATA SET FOR CNB.             =
              / ======================================

       6600          *TDC487-1
36600  5000          1^4000+1000      /*ELEMENT:TYPE 1:SIZE 1000
36601  0000   TDC487, ZBLOCK  777
              SS

AB5251 1733      FBP310 0010      TAP244 0000      TBP431 5202
ACL    7701      FBP420 0030      TAP322 0747      TBP432 5211
AKSILC 1557      FBP430 0010      TAP323 1001      TBP434 5677
AKSILI 1555      FBP440 0020      TAP324 1021      TBP437 6001
AKSILU 1556      FBP510 0010      TAP411 0600      TBP438 6024
AQAKPN 6411      FBP520 0010      TAP412 0606      TBP44C 7555
AQAKTP 0015      FBP530 0010      TAP416 0367      TBP44D 6351
AQDPPN 6403      FBP540 0010      TAP417 0202      TBP44E 6253
AQDPTF 0016      FBP810 0040      TAP521 1602      TBP44F 7352
AQPRNM 0177      FBP820 0040      TAP525 1656      TBP44J 7601
AQPRTY 0200      FBP910 0030      TAP529 1742      TBP44K 7401
AQQINS 0144      FCP110 0010      TAP611 1755      TBP44L 7212
AQQRB1 5601      FCP210 0010      TAP612 1765      TBP44M 7206
AQQRB2 5704      FCP310 0010      TAR417 0400      TBP44N 7202
AQQRB3 6143      FCP410 0010      TAUS01 0200      TBP44R 7135
AQQRB4 6246      FCP550 0010      TBCATL 0210      TBP44U 6414
AQQTB1 7475      FCP610 0010      TBCDAL 0050      TBP44V 7715
AQQTB2 7634      FDC480 0030      TBCFSP 1565      TBP441 6241
AQSUB  0001      FDP120 0050      TBCNFP 1566,     TBP512 1265
BGTYPE 4402      FDP130 0050      TBC132 2727      TBP521 2201
BGZCCS 0131      FDP210 0050      TBC205 2401      TBP522 2504
BGZPRA 0134      FDP230 0050      TBC210 2445      TBP523 2703
BGZPRD 0133      FDP310 0050      TBD541 0711      TBP532 0522
BGZPRT 0126      FDP320 0050      TBLBOF 4401      TBP533 0555
BNVREG 5207      FDP330 0050      TBP111 2602      TBP541 1103
BQZATL 0171      FDP340 0050      TBP131 3235      TBP542 1154
BQZFSP 0173      FDP410 0040      TBP132 3401      TBP551 2122
BQZIFS 0172      FDP420 0040      TBP211 4514      TBP811 0202
BQZNFP 0174      FDP430 0040      TBP212 4001      TBP821 1602
CAM    7621      FDP140 0040      TBP213 4601      TBP911 7610
```

| | |
|---|---|
| CDI | 6203 |
| DM5FRA | 0340 |
| DM6CDF | 0350 |
| DU8END | 5000 |
| DU8ICF | 4316 |
| DU8ICE | 6456 |
| DU9END | 6600 |
| FAP110 | 0000 |
| FAP120 | 0000 |
| FAP130 | 0000 |
| FAP150 | 0000 |
| FAP220 | 0000 |
| FAP230 | 0000 |
| FAP240 | 0000 |
| FAP320 | 0000 |
| FAP410 | 0000 |
| FAP520 | 0000 |
| FARMDF | 0000 |
| FAUS01 | 0000 |
| FBC205 | 0030 |
| FBP110 | 0000 |
| FBP130 | 0000 |
| FBP210 | 0020 |
| FBP220 | 0020 |
| FBP230 | 0020 |
| TDP132 | 7401 |
| TDP133 | 7311 |
| TDP134 | 7460 |
| TDP135 | 7463 |
| TDP211 | 0402 |
| TDP212 | 0601 |
| TDP224 | 1265 |
| TDP236 | 1070 |
| TDP31A | 3003 |
| TDP31B | 2202 |
| TDP31C | 4240 |
| TDP311 | 4511 |
| TDP312 | 3201 |
| TDP313 | 3602 |
| TDP314 | 2403 |
| TDP315 | 3401 |
| TDP316 | 4001 |
| TDP317 | 4201 |
| TDP318 | 4322 |
| TDP319 | 3755 |
| TDP32A | 6420 |
| TDP32B | 6504 |
| TDP321 | 6326 |
| TDP322 | 6601 |
| TDP323 | 7001 |
| TDP324 | 6401 |
| TDP325 | 6001 |
| TDP326 | 6201 |
| TDP327 | 5623 |
| TDP328 | 6050 |
| TDP329 | 6112 |
| TDP331 | 4603 |
| TDP332 | 5001 |
| TDP333 | 5077 |
| TDP334 | 5137 |
| TDP335 | 5161 |
| TDP341 | 4401 |
| TDP342 | 4436 |
| TDP345 | 1143 |
| TDP411 | 4043 |
| TDP412 | 4201 |
| TDP413 | 4115 |
| TDP415 | 4430 |
| TDP416 | 3731 |
| TDP42A | 0402 |
| TDP42B | 2043 |
| TDP42C | 0711 |
| TDP42D | 2011 |
| TDP42E | 2025 |
| TDP42F | 0601 |
| TDP42G | 2001 |
| TDP42H | 1757 |
| TDP42I | 1143 |
| TDP421 | 1401 |
| TDP422 | 1201 |
| ZM0004 | 0074 |
| ZM0005 | 0042 |
| ZM0006 | 0043 |
| ZM0010 | 0044 |
| ZM0040 | 0045 |
| ZM0120 | 0046 |
| ZM0260 | 0047 |
| ZP0003 | 0000 |
| ZP0005 | 0050 |
| ZP0006 | 0051 |
| ZP0007 | 0052 |
| ZP0010 | 0053 |
| ZP0017 | 0054 |
| ZP0020 | 0055 |
| FDP450 | 0040 |
| FDP460 | 0040 |
| FDP470 | 0040 |
| FDP490 | 0040 |
| TAC417 | 0265 |
| TAD151 | 2042 |
| TAD221 | 1561 |
| TAD322 | 1072 |
| TAP116 | 4472 |
| TAP121 | 4400 |
| TAP129 | 2402 |
| TAP131 | 4470 |
| TAP134 | 4571 |
| TAP151 | 2002 |
| TAP152 | 2022 |
| TAP153 | 2034 |
| TAP154 | 2062 |
| TAP212 | 0660 |
| TAP223 | 1525 |
| TAP235 | 7400 |
| TAP236 | 6637 |
| TAP237 | 6042 |
| TAP239 | 6531 |
| TAP242 | 3600 |
| TAP243 | 3604 |
| TDP423 | 1606 |
| TDP424 | 2212 |
| TDP425 | 2231 |
| TDP426 | 3001 |
| TDP427 | 2201 |
| TDP428 | 0460 |
| TDP429 | 2401 |
| TDP431 | 5401 |
| TDP432 | 5430 |
| TDP433 | 5601 |
| TDP434 | 5471 |
| TDP435 | 5476 |
| TDP436 | 5503 |
| TDP437 | 5510 |
| TDP441 | 3055 |
| TDP442 | 3201 |
| TDP448 | 3225 |
| TDP449 | 3142 |
| TDP451 | 6202 |
| TDP452 | 6242 |
| TDP453 | 6601 |
| TDP454 | 6401 |
| TDP455 | 6646 |
| TDP456 | 6717 |
| TDP457 | 6467 |
| TDP461 | 7201 |
| TDP462 | 6330 |
| TDP463 | 7401 |
| TDP464 | 7601 |
| TDP471 | 6001 |
| TDP472 | 6032 |
| TDP473 | 6056 |
| TDP474 | 5643 |
| TDP491 | 3402 |
| TDP492 | 3146 |
| TDP493 | 3462 |
| TDP511 | 0202 |
| TDP512 | 0235 |
| TDP513 | 0243 |
| TDP514 | 0277 |
| TDP515 | 0341 |
| TDP516 | 0347 |
| TDR001 | 5601 |
| TDZACI | 5620 |
| TDZOAB | 5605 |
| TDZOCY | 5617 |
| TDZOSM | 5602 |
| TDZOTC | 5604 |
| TD483E | 6000 |
| TD487E | 7600 |
| WKLEAR | 7300 |
| WK4000 | 7330 |
| WK5777 | 7352 |
| WK6000 | 7333 |
| WK7775 | 7336 |
| TBP22I | 1657 |
| TBP22L | 2001 |
| TBP22M | 2511 |
| TBP22R | 3401 |
| TBP22S | 2601 |
| TBP22U | 2437 |
| TBP22X | 0202 |
| TBP221 | 1401 |
| TBP222 | 1444 |
| TBP223 | 1500 |
| TBP224 | 1601 |
| TBP226 | 0401 |
| TBP229 | 3201 |
| TBP23I | 5143 |
| TBP23J | 5324 |
| TBP23S | 4361 |
| TBP23X | 5601 |
| TBP23Z | 6061 |
| TBP31A | 4404 |
| TBP31R | 5001 |
| TBP315 | 3602 |
| TBP422 | 0242 |
| TBP423 | 0220 |
| TBP424 | 0401 |
| TBP425 | 0202 |
| WK7776 | 7344 |
| WK7777 | 7340 |
| WM0001 | 7340 |
| WM0002 | 7344 |
| WM0003 | 7346 |
| WM2000 | 7333 |
| WM2001 | 7352 |
| WM4000 | 7330 |
| WP0001 | 7301 |
| WP0002 | 7305 |
| WP0003 | 7325 |
| WP0004 | 7307 |
| WP0006 | 7327 |
| WP0100 | 7203 |
| WP2000 | 7332 |
| WP3777 | 7350 |
| YCAL | 6103 |
| YDU1 | 0400 |
| YDU2 | 0420 |
| YDU3 | 0440 |
| YDU4 | 0460 |
| YDU5 | 0500 |
| YDU6 | 0520 |
| YMSAB | 6701 |
| YMSCD | 6710 |
| YMSIE | 6700 |
| YMSLB | 6712 |
| YMSLC | 6711 |
| YMSRA | 6702 |
| YMSRD | 6705 |
| YMSXD | 6704 |
| YPCIE | 6055 |
| YPCLF | 6062 |
| YPLS | 6066 |
| YPSKF | 6061 |
| YPSTB | 6064 |
| YRCCB | 6116 |
| YRCGB | 6114 |
| YRCLC | 6115 |
| YRCRB | 6111 |
| YRCRL | 6112 |
| YSPL | 6102 |
| YVKBSY | 6001 |
| YVKCLR | 6000 |
| YVKCRL | 6004 |
| YVKIF | 6005 |
| YVKKCF | 6010 |
| YVKKRB | 6016 |
| YVKKSF | 6011 |
| YVKLD | 6014 |
| YVKLDI | 6015 |
| YVKRD | 6012 |
| YVKRDI | 6013 |
| YVKSLD | 6017 |
| ZARMDF | 0133 |
| TBP919 | 7603 |
| TCP111 | 6202 |
| TCP213 | 7023 |
| TCP311 | 6401 |
| TCP551 | 7124 |
| TCP611 | 7201 |
| TCP911 | 7266 |
| TCP912 | 7401 |
| TCP913 | 7414 |
| TCP914 | 7432 |
| TDC010 | 3400 |
| TDC201 | 1717 |
| TDC202 | 1737 |
| TDC481 | 4201 |
| TDC483 | 5001 |
| TDC484 | 5401 |
| TDC486 | 6001 |
| TDC487 | 6601 |
| TDD201 | 0001 |
| TDD202 | 0461 |
| TDP121 | 5202 |
| TDP122 | 5405 |
| TDP123 | 5242 |
| TDP124 | 5535 |
| TDP131 | 7202 |
| ZAUT00 | 0010 |
| ZAUT01 | 0011 |
| ZAUT02 | 0012 |
| ZAUT03 | 0013 |
| ZAUT04 | 0014 |
| ZAUT05 | 0015 |
| ZAUT06 | 0016 |
| ZAUT07 | 0017 |
| ZBCALM | 0105 |
| ZBCADM | 0103 |
| ZBCCIF | 0110 |
| ZBCDCM | 0104 |
| ZBCDUA | 0102 |
| ZBCDUB | 0101 |
| ZBCILA | 0113 |
| ZBCILF | 0112 |
| ZBCIVA | 0122 |
| ZBCKLT | 0111 |
| ZBCPGN | 0120 |
| ZBCPG1 | 0115 |
| ZBCPTP | 0114 |
| ZKA151 | 0036 |
| ZKA152 | 0037 |
| ZKA153 | 0040 |
| ZKA154 | 0041 |
| ZKA322 | 0031 |
| ZKA323 | 0032 |
| ZKA324 | 0033 |
| ZKA416 | 0024 |
| ZKA417 | 0025 |
| ZKA521 | 0026 |
| ZKA525 | 0027 |
| ZKA529 | 0030 |
| ZKB111 | 0035 |
| ZKB213 | 0157 |
| ZKB220 | 0165 |
| ZKB222 | 0161 |
| ZKB226 | 0163 |
| ZKB229 | 0164 |
| ZKB422 | 0176 |
| ZKB423 | 0177 |
| ZKB521 | 0175 |
| ZKCDF | 0021 |
| ZKCDT | 0023 |
| ZKCIF | 0022 |
| ZKD236 | 0154 |
| ZKD42B | 0140 |
| ZKD42C | 0167 |
| ZKD432 | 0156 |
| ZKD433 | 0155 |
| ZKRADM | 0147 |
| ZKRBDF | 0153 |
| ZKRDCM | 0151 |
| ZKRDUA | 0150 |
| ZKRDUB | 0152 |

```
ZP0037 0056
ZP0040 0057
ZP0060 0020
ZP0070 0060
ZP0077 0061
ZP0100 0062
ZP0120 0063
ZP0177 0064
ZP0200 0065
ZP0260 0066
ZP0377 0067
ZP0777 0076
ZP7000 0070
ZP7400 0071
ZP7600 0072
ZP7700 0073
ZP7777 0077
ZWORK1 0004
ZWORK2 0005
ZWORK3 0006
ZWORK4 0007

ERRORS DETECTED: 0
LINKS GENERATED: 0

                 / DP4551.8B
                 /
                 /
                 /       %%%%%%%%%%%%%%%%%%%%%%%%%%%%%%%%%%%%%%%%%%%%%%%%%%%%%%%%%
                 /       %                                                       %
                 /       %                     PROPRIETARY.                      %
                 /       %                                                       %
                 /       %  THIS DOCUMENT CONTAINS INFORMATION PROPRIETARY TO    %
                 /       %  REUTERS LIMITED AND IS NOT TO BE REPRODUCED AND/OR   %
                 /       %  USED IN WHOLE OR IN PART WITHOUT THE EXPRESS WRITTEN %
                 /       %  PERMISSION OF REUTERS LIMITED.                       %
                 /       %                                                       %
                 /       %%%%%%%%%%%%%%%%%%%%%%%%%%%%%%%%%%%%%%%%%%%%%%%%%%%%%%%%%
                 /
                 /

                 /
                 /        MODULE  MAPB50.8B 27-OCT-80
                 /        SYSTEM MAP FILE
                 /
                 /        MODULE MAPC50.8B 30-OCT-80
                 /        CONVERSATIONS MAP FILE
                 /
                 /        MODULE FCE050.8B 16-JAN-80
                 /        FIXED PAGE ZERO CONSTANTS AND COMMON DATA EQUATES FIELD 4 & 5

                 /=====================================================
                 /=                                                   =
                 /= - COMPONENT: SHARED FUNCTIONS        DP4551.8B    =
                 /=                                                   =
                 /= - DESIGN:     P.ROBERTS                           =
                 /=                                                   =
                 /= - AUTHORS:    G.BROWN, J.P.DOCHERTY AND P.ROBERTS =
                 /=                                                   =
                 /= - DATE:       APRIL 1979                          =
                 /=                                                   =
                 /= - MODULES:                                        =
                 /=               TDP451  INTERRUPT                   =
                 /=               TDP452  CONTROL REQUEST             =
                 /=               TDP462  PRINT - STATS               =
                 /=               TDP454  CONTROL REQUEST RECEIVED    =
                 /=               TDP457  COMPARE CURRENT POSITION    =
                 /=               TDP453  RESET DIALOGUE POSITION     =
                 /=               TDP455  CONTROL REPLY RECEIVED      =
                 /=               TDP456  STORE & DISPLAY INTERRUPT   =
                 /=                          LITERALS                 =
                 /=               TDP461  PRINT DIALOGUE              =
                 /=               TDP463  FORM AND SEND STATS RECORD  =
                 /=               TDP464  SET UP PRINT HEADING LINE   =
                 /=                                                   =
                 /=====================================================

          0004            FIELD   4
          6200            *6200
   46200  1600            0^4000+DL6END-TDP451+2  /*ELEMENT:TYPE 0:SIZE DL6END-TDP451+2


                 / MODIFIED RJA 4-NOV-80 TDP461 DISCARD PRINT IF 0 CHARS (PROBABLY DUE
                 / REPEATED DEPRESSION OF PRINT KEY)
```

```
                    /======================================================
                    /=                                                    =
                    /= - MODULE:      TDP451                              =
                    /=                INTERRUPT                           =
                    /=                                                    =
                    /= - FUNCTION:                                        =
                    /=                VALIDATES AN OPERATOR'S REQUEST TO  =
                    /=                INTERRUPT AND ACTIONS IT IF VALID   =
                    /=                                                    =
                    /= - FORM OF CALL:                                    =
                    /=                JMS   I  (TDP451                    =
                    /=                                                    =
                    /======================================================
46201  7401                 1-1^2+7401               /*1 VARIABLE LOCATIONS FOLLOW
46202  0000  TDP451, .-.
                                                     /
46203  6221                 CDF      20              / INTO FIELD OF DUCB
46204  1525                 TAD   I  DDZDCM          / GET DISPLAY/CURRENT MODES
46205  6241                 CDF      40              /
46206  0061                 AND      ZP0077          / GET CURRENT MODE
46207  1042                 TAD      ZM0005          /
46210  7450                 SNA                      / CURRENT MODE = CN2 ?
46211  5215                 JMP      DR1010          / YES - GO TO NEXT TEST
46212  7001                 IAC                      /
46213  7640                 SZA CLA                  / CURRENT MODE = CN1 ?
46214  5234                 JMP      DR1020          / NO - GO DISPLAY ERROR MESSAGE
                                                     /
46215  4535  DR1010, JMS  I  ZKD42G                  / ROUTINE TO GET CNV STATUS
46216  7640                 SZA CLA                  / STATUS = DIALOGUE
46217  5234                 JMP      DR1020          / NO - GO DISPLAY ERROR MESSAGE
46220  1102                 TAD      ZDCCOS          / GET CONTROL STATUS
46221  1077                 TAD      ZP7777          /
46222  7640                 SZA CLA                  / CONTROL STATUS = RECEIVE
46223  5602                 JMP   I  TDP451          / NO - SO EXIT TO CALLER
46224  7325                 WP0003                   /
46225  6251                 CDF      50              / SET SECONDARY STATUS = CONTROL
46226  3640                 DCA   I  DR1LSS          /  REQUEST (NORMAL) SENT
46227  6241                 CDF      40              /
                                                     /
46230  4242                 JMS      TDP452          / SEND CONTROL REQUEST
                                                     /
46231  6222                 CIF      20              /
46232  4574                 JMS   I  ZKB23Z          / LOCK THE KEYBOARD
46233  5602                 JMP   I  TDP451          / EXIT TO CALLER
                                                     /
46234  6222  DR1020, CIF             20              /
46235  1052                 TAD      ZP0007          / DISPLAY "INVALID FUNCTION"
46236  4566                 JMS   I  ZKB22L          /  IN MESSAGE LINE
                                                     /
46237  5602  DR1030, JMP  I  TDP451                  / RETURN TO CALLER

46240  0103  DR1LSS, ZDCCDS                          / LINK TO SECONDARY STATUS
                    /======================================================
                    /=                                                    =
                    /= - MODULE:      TDP452                              =
                    /=                CONTROL REQUEST                     =
                    /=                                                    =
                    /= - FUNCTION:                                        =
                    /=                FORMS A CONTROL REQUEST AND SENDS IT=
                    /=                                                    =
                    /= - FORM OF CALL:                                    =
                    /=                JMS      TDP452                     =
                    /=                                                    =
                    /======================================================

46241  7401                 1-1^2+7401               /*1 VARIABLE LOCATIONS FOLLOW
46242  0000  TDP452, .-.
                                                     /
                                                     / SET UP FIND ROOM PARAMETER
46243  7421                 MQL                      /  TO NON OVERRIDING STATE
46244  1305                 TAD      DR2027          / SET UP AMOUNT OF ROOM REQUIRED
46245  4553                 JMS   I  ZKD422          / FIND ROOM IN DIALOGUE BUFFER
                                                     /
46246  7650                 SNA CLA                  / PRINT DEMANDED BY SYSTEM ?
46247  5260                 JMP      DR2010          / NO
46250  7001                 IAC                      / YES - SET UP FIND ROOM PARAMETER
46251  7421                 MQL                      /   TO OVERRIDING STATE
46252  1305                 TAD      DR2027          / SET UP AMOUNT OF ROOM REQUIRED
46253  4553                 JMS   I  ZKD422          / FIND ROOM IN DIALOGUE BUFFER
46254  7307                 WP0004                   /
46255  6251                 CDF      50              / CHANGE REQUEST TYPE
46256  3640                 DCA   I  DR1LSS          /  TO PRINT
46257  6241                 CDF      40              /
                                                     /
46260  2120  DR2010, ISZ             ZDCPKS          / INCREMENT PACKET COUNT
46261  7000                 NOP                      / SAFEGUARD FOR WRAP-ROUND COUNT
                                                     /
46262  4530                 JMS   I  ZKD511          / GET AND SET UP SEND BUFFER
46263  0006                 6                        /  RECORD LENGTH
46264  0310                 310                      /  RECORD TYPE
46265  0006                 6                        /  LENGTH OF NON PACKABLE DATA
46266  7777                 -1                       /  END INDICATOR
                                                     /
```

```
46267  6251          CDF     50                /
46270  1640          TAD  I  DR1LSS            / SET UP CONTROL TYPE = SECONDARY STATUS
46271  4531          JMS  I  ZKD512            /
46272  1106          TAD     ZDCCLN            / GET RELATIVE LINE NUMBER
46273  4706          JMS  I  DR242D            / CONVERT TO ABSOLUTE LINE NUMBER
46274  4531          JMS  I  ZKD512            / SET UP CONTROL POSITION LINE
46275  1107          TAD     ZDCCCL            / SET UP CONTROL POSITION COLUMN
46276  4531          JMS  I  ZKD512.           /  = NO. OF CHARS. IN CURRENT LINE
                                               /
46277  6252          CIF     50                /
46300  4570          JMS  I  ZKD345            / CALCULATE PORT NUMBER
46301  7421          MQL                       /
                                               /
46302  1051          TAD     ZP0006            / SET UP SUM OF APPLN. RECORD LENGTH
46303  4532          JMS  I  ZKD513            / SET UP SEND PARAMS AND SEND RECORD
                                               /
46304  5642          JMP  I  TDP452            / RETURN TO CALLER

46305  0027  DR2027, 27                        / LENGTH OF LITERAL
46306  2011  DR242D, TDP42D                    / LINK TO CONVERT LINE NUMBER RTN.

             /
             /  LIST OF INTERRUPTS LITERALS USED IN TDP456
             /

46307  5211  DR6INT, TEXT    "*INTERRUPT"
46310  1624
46311  0522
46312  2275
46313  2024
46314  0000
       6314          *.-1
46314  5252  DR6PRI, TEXT    "** PRINT *"
46315  4020
46316  2211
46317  1624
46320  4052
46321  0000
       6321          *.-1
46321  5224  DR6TEX, TEXT    "*TEXT LOST*"
46322  0530
46323  2440
46324  1417
46325  2324
46326  5200

             ////////////////////////////////////////////////////////////////
             /                                                              /
             /   MODULE:  TDP462  PRINT - STATS                             /
             /                                                              /
             /   FUNCTION:   ACTIONS ANY REQUIREMENT TO PRINT               /
             /               CONVERSATION BUFFERS AND REPORT                /
             /               STATISTICS                                     /
             /                                                              /
             /   PARAMETERS: NONE                                           /
             /                                                              /
             /   CALLED BY:  TDP131 (CONVERSATIONS STARTUP)                 /
             /               TDP322 (END CONTACT)                           /
             /               TDP325 (DISCONNECT STATEMENT RECIEVED)         /
             /               TDP32A (TRANSFERRED)                           /
             /               TDP461 (PRINT DIALOGUE)                        /
             /                                                              /
             ////////////////////////////////////////////////////////////////

46327  7401          1-1^2+7401                /*1 VARIABLE LOCATIONS FOLLOW
46330  0000  TDP462, .-.
46331  6214          RDF                       /
46332  1023          TAD     ZKCD1             / SET UP RETURN TO CALLER'S
46333  3361          DCA     DL62CF            /  FIELD INSTRUCTION
46334  6241          CDF     40                /
46335  7301          WP0001                    / FIND ROOM FOR
46336  7421          MQL                       / STATS IN DIALOGUE
46337  1363          TAD     DL62K1            / BUFFERS
46340  4553          JMS  I  ZKD422
46341  7300          WKLEAR                    /
46342  1117          TAD     ZDCCHS            / CONVERT NO. OF CHARS
46343  4776          JMS  I  DL622A            / STATISTIC TO CHARACTER
46344  3367          DCA     DL62M2            / FORMAT.
46345  7701          ACL
46346  3366          DCA     DL62M1
46347  4774          JMS  I  DL62S1            / RESET ACTIVITY MODE IF STATUS NOT DIALOGUE
46350  7301  DL62J1, WP0001
46351  7421          MQL                       / ADD THE STATISTICS TO THE
46352  1363          TAD     DL62K1            / FOOT OF THE DIALOGUE.
46353  4554          JMS  I  ZKD423
46354  7403          2-1^2+7401                /*2 VARIABLE LOCATIONS FOLLOW
46355  6241  CDF 40
46356  6365  DL62AD, DL62MS
46357  4775          JMS  I  DL62S2            / FORM AND SEND STATS RECORD
                                               / THEN CALL PRINT SUPERVISOR
46360  7401          1-1^2+7401                /*1 VARIABLE LOCATIONS FOLLOW
46361  0000  DL62CF, 0                         / INTO CALLER'S FIELDS
46362  5730          JMP  I  TDP462
```

```
46363  0014  DL62K1, 14                          / LENGTH OF MESSAGE
46364  7415          7-1^2+7401                  /*7 VARIABLE LOCATIONS FOLLOW
46365  0050  DL62MS, 0050                                / MESSAGE TEXT
46366  0000  DL62M1, 0
46367  0000  DL62M2, 0
46370  4003  4003                                /   SPACE C
46371  1001  1001                                /     H A
46372  2223  2223                                /     R S
46373  5100  5100                                /     )
46374  7137  DL62S1, DL62R1
46375  6531  DL62S2, DL62R2
46376  0402  DL622A, TDP42A
46377  0000          ZBLOCK   .+20067600-.       /*ZERO FILL PAGE

             /======================================================
             /=                                                    =
             /= - MODULE:     TDP454                               =
             /=               CONTROL REQUEST RECEIVED             =
             /=                                                    =
             /= - FUNCTION:                                        =
             /=               ACTS ON A REQUEST FOR CONTROL FROM THE  =
             /=               OTHER PARTY                          =
             /=                                                    =
             /= - FORM OF CALL:                                    =
             /=               JMS   I   )TDP454                    =
             /=                                                    =
             /======================================================

46400  7401          1-1^2+7401                  /*1 VARIABLE LOCATIONS FOLLOW
46401  0000  TDP454, .-.
                                                 /
46402  4535          JMS  I   ZKD42G             / GET  CONVERSATION STATUS
46403  7640          SZA CLA                     / STATUS = DIALOGUE ?
46404  5601          JMP  I   TDP454             / NO - SO EXIT
                                                 /
46405  7001          IAC                         /
46406  7421          MQL                         /
46407  1261          TAD      DR4027             / LENGTH OF LITERAL
46410  4553          JMS  I   ZKD422             / FIND ROOM FOR CORRESP. LITERAL
46411  7300          WKLEAR                      /
                                                 /
46412  4530          JMS  I   ZKD511             / GET AND SET UP SEND BUFFER
46413  0005          5                           /  RECORD LENGTH
46414  0311          311                         /  RECORD TYPE
46415  0005          5                           /  LENGTH OF NON PACKABLE DATA
46416  7777          -1                          /  END INDICATOR
                                                 /
46417  1050          TAD      ZP0005             /
46420  4534          JMS  I   ZKD515             / GET CONTROL TYPE FROM REQUEST RECORD
46421  4531          JMS  I   ZKD512             / STORE CONTROL TYPE IN REPLY RECORD
                                                 /
46422  2120          ISZ      ZDCPKS             / INCREMENT PACKET COUNT BY 2
46423  2120          ISZ      ZDCPKS             /
46424  7000          NOP                         / SAFEGUARD FOR WRAP-ROUND COUNT
                                                 /
46425  7332          WP2000                      /
46426  1115          TAD      ZDCPSC             / GET PACKET STATUS
46427  7650          SNA CLA                     / PRINT DEMANDED AND COUNTERPARTY KNOWS ?
46430  5252          JMP      DR4040             / YES - GO  SET INVALIDITY
46431  4267          JMS      TDP457             / NO - GO COMPARE CURRENT POSITIONS
46432  7510          SPA                         / CURRENT LINE/COL > LINE/COL IN RECORD ?
46433  5243          JMP      DR4030             / YES - GO SET VALIDITY
46434  7640          SZA CLA                     / CURRENT LINE/COL = LINE/COL IN RECORD ?
46435  5252          JMP      DR4040             / NO - GO SET INVALIDITY
46436  6251          CDF      50                 /
46437  1662          TAD  I   DR4LSS             / GET SECONDARY STATUS
46440  6241          CDF      40                 /
46441  7640          SZA CLA                     / DISCONNECT REQUEST OUTSTANDING ?
46442  5252          JMP      DR4040             / YES - GO SET INVALIDITY
                                                 /
46443  7301  DR4030, WP0001                      /
46444  4531          JMS  I   ZKD512             / SET UP VALIDITY IN RECORD TO TRUE
46445  4663          JMS  I   DR4453             / RESET STORAGE CONTROL INFO. TO
                                                 /  REFLECT POSITION IN REQUEST
46446  7001          IAC                         /
46447  3102          DCA      ZDCCOS             / SET CONTROL STATUS TO RECEIVE
                                                 /
46450  4664          JMS  I   DR4456             / STORE AND DISPLAY LITERAL
46451  7410          SKP                         /
                                                 /
46452  4531  DR4040, JMS  I   ZKD512             / SET UP VALIDITY IN RECORD TO FALSE
46453  6252          CIF      50                 /
46454  4570          JMS  I   ZKD345             / CALCULATE PORT NUMBER
46455  7421          MQL                         /
46456  1050          TAD      ZP0005             /
46457  4532          JMS  I   ZKD513             / GO SEND RECORD
                                                 /
46460  5601          JMP  I   TDP454             / RETURN TO CALLER

46461  0027  DR4027, 27                          / LENGTH OF LITERAL
46462  0103  DR4LSS, ZDCCDS                      / LINK TO SECONDARY STATUS
46463  6601  DR4453, TDP453                      / LINK TO RESET DIALOGUE POSITION
46464  6717  DR4456, TDP456                      / LINK TO STORE AND DISPLAY LITERAL RTN
46465  2025  DR442E, TDP42E                      / LINK TO CALCULATE LINE NUMBER RTN.
```

```
                       /======================================================
                       /=                                                    =
                       /= - MODULE:     TDP457                               =
                       /=               COMPARE CURRENT POSITIONS            =
                       /=                                                    =
                       /= - FUNCTION:                                        =
                       /=               COMPARES THE CURRENT POSITION AS HELD =
                       /=               IN PAGE 0 WITH THE CURRENT POSITION AS =
                       /=               HELD IN THE RECORD                   =
                       /=                                                    =
                       /= - FORM OF CALL:                                    =
                       /=               JMS  I  )TDP457                      =
                       /=               -VE AC : PAGE 0 LINE NO > REC LINE NO =
                       /=                0  AC : PAGE 0 LINE NO = REC LINE NO =
                       /=               +VE AC : PAGE 0 LINE NO < REC LINE NO =
                       /=                                                    =
                       /======================================================

46466  7401                 1-1^2+7401          /*1 VARIABLE LOCATIONS FOLLOW
46467  0000   TDP457,  .-.
46470  6214            RDF                      /
46471  1023            TAD       ZKCDI          / SET UP RETURN TO CALLER'S
46472  3326            DCA       DR7CDI         /  FIELD INSTRUCTION
                                                /
46473  1051            TAD       ZP0006         /
46474  4534            JMS   I   ZKD515         / GET CURRENT LINE NO. FROM RECORD
46475  3004            DCA       ZWORK1         /
46476  4537            JMS   I   ZKD516         / GET CURRENT COLUMN NO. FROM RECORD
46477  3005            DCA       ZWORK2         /
                                                /
46500  1004            TAD       ZWORK1         / GET CURRENT LINE NO. (ABSOLUTE)
46501  4665            JMS   I   DR442E         / CONVERT TO RELATIVE FORM
46502  3004            DCA       ZWORK1         / SAVE CURRENT LINE NO. (RELATIVE)
                                                /
46503  1106            TAD       ZDCCLN         / GET CURRENT LINE NO. FROM PAGE 0
46504  7041            CIA                      /
46505  1004            TAD       ZWORK1         / ADD IN RECORD'S CURRENT LINE NO.
46506  7500            SMA                      / PAGE 0 LINE NO. > RECORD LINE NO
46507  5312            JMP       DR7020         / NO - TRY NEXT TEST
                                                /
46510  7340   DR7010,  WM0001                   / YES - SET RETURN PARAMETER
46511  5326            JMP       DR7CDI         / EXIT
                                                /
46512  7450   DR7020,  SNA                      / PAGE 0 LINE NO. < RECORD LINE NO.
46513  5316            JMP       DR7040         / NO - LINES EQUAL SO TEST COLUMNS
                                                /
46514  7301   DR7030,  WP0001                   / YES - SET RETURN PARAMETER
46515  5326            JMP       DR7CDI         / EXIT
                                                /
46516  1107   DR7040,  TAD       ZDCCCL         / GET CURRENT COLUMN NO. FROM PAGE 0
46517  7041            CIA                      /
46520  1005            TAD       ZWORK2         / ADD IN RECORD'S CURRENT COLUMN NO.
46521  7510            SPA                      / PAGE 0 COLUMN NO > RECORD COLUMN NO
46522  5310            JMP       DR7010         / YES - GO SET RETURN PARAMETER
46523  7440            SZA                      / PAGE 0 COLUMN NO < RECORD COLUMN NO
46524  5314            JMP       DR7030         / YES - GO SET RETURN PARAMETER
                                                / COLUMNS AND LINES EQUAL -
                                                /
46525  7401                 1-1^2+7401          /*1 VARIABLE LOCATIONS FOLLOW
46526  0000   DR7CDI,  0                        /
46527  5667            JMP   I   TDP457         / RETURN TO CALLER

              EJECT
              /
              / LOCAL ROUTINE FOR TDP462 TO FORM AND SEND A STATS
              / RECORD AND CALL THE PRINTER SUPERVISOR
              /

46530  7401                 1-1^2+7401          /*1 VARIABLE LOCATIONS FOLLOW
46531  0000   DL62R2,  .-.
46532  4774            JMS   I   DL6263         / FORM AND SEND STATISTICS RECORD
46533  4775            JMS   I   DL6264         / SET UP HEADING LINE IN PRINT FORMAT
46534  1103            TAD       ZDCDTP
46535  1021            TAD       ZKCDF
46536  3342            DCA       DL62C1         / PICK UP POINTERS TO FIRST REAL
46537  1104            TAD       ZDCSAD         / DIALOGUE BUFFER AND SET UP PARAMETERS
46540  3004            DCA       ZWORK1         / FOR PRINTER SUPERVISOR.
46541  7401            1-1^2+7401               /*1 VARIABLE LOCATIONS FOLLOW
46542  0000   DL62C1,  0
46543  1404            TAD   I   ZWORK1
46544  3356            DCA       DL62P1
46545  2004            ISZ       ZWORK1
46546  7325            WP0003
46547  1404            TAD   I   ZWORK1
46550  3357            DCA       DL62P2
46551  6241            CDF       40
46552  6202            CIF       0
46553  7305            WP0002                   / SET UP ITEM TYPE
46554  4435            JMS   I   ZKB111         / INITIATE PRINTING DIALOGUE
46555  7403            2-1^2+7401               /*2 VARIABLE LOCATIONS FOLLOW
46556  0000   DL62P1,  0
46557  0000   DL62P2,  0
46560  1103            TAD       ZDCDTP         / SET UP PARAMETERS TO RETURN
```

```
                                             / LINE POINTER BUFFER
46561  3370          DCA     DL62BF
46562  1104          TAD     ZDCSAD
46563  3367          DCA     DL62BA
46564  6202          CIF     0
46565  4427          JMS  I  ZKA525          / RETURN LINE POINTER BUFFER
46566  7403          2-1^2+7401              /*2 VARIABLE LOCATIONS FOLLOW
46567  0000  DL62BA, 0       100             / BUFFER ADDRESS
46570  0000  DL62BF, 0                       / BUFFER FIELD
46571  3103          DCA     78ZDCDTP        / ZEROISE TDODTP IN TDC019
46572  3104          DCA     ZDCSAD
46573  5731          JMP  I  DL62R2

46574  7401  DL6263, TDP463
46575  7601  DL6264, TDP464
46576  0000          ZBLOCK  .+200&7600-.    /*ZERO FILL PAGE

             /=====================================================
             /=                                                   =
             /= - MODULE:     TDP453                              =
             /=               RESET DIALOGUE POSITION             =
             /=                                                   =
             /= - FUNCTION:                                       =
             /=               RESETS THE DIALOGUE POSITION TO THE =
             /=               INTERRUPTED POINT                   =
             /=                                                   =
             /= - FORM OF CALL:                                   =
             /=               JMS   I   )TDP453                   =
             /=                                                   =
             /=====================================================

46600  7401          1-1^2+7401              /*1 VARIABLE LOCATIONS FOLLOW
46601  0000  TDP453, .-.
46602  6214          RDF                     / SET UP RETURN TO CALLER'S
46603  1023          TAD     ZKCDI           /  FIELDS INSTRUCTION
46604  3241          DCA     DR3CDI          /
                                             /
46605  6241          CDF     40              /
46606  4644          JMS  I  DR3457          / GO GET RELATIVE LINE & COL NO.S
46607  7300          WKLEAR                  / CLEAR RETURN PARAMETER
46610  1005          TAD     ZWORK2          / GET RELATIVE COLUMN
46611  3107          DCA     ZDCCCL          /  AND SAVE IN PAGE 0
46612  1004          TAD     ZWORK1          / GET RELATIVE LINE NO.
46613  3106          DCA     ZDCCLN          /  AND SAVE IN PAGE 0
                                             /
46614  1107          TAD     ZDCCCL          / GET RELATIVE COLUMN NO. BACK
46615  7001          IAC                     / SET TO NEXT POSITION
46616  7421          MQL                     / STORE AS PARAMETER
46617  1106          TAD     ZDCCLN          / GET OTHER PARAMETER
                                             /
46620  4540          JMS  I  ZKD42B          / FIND POSITION IN DIALOGUE BUFFER
46621  7403          2-1^2+7401              /*2 VARIABLE LOCATIONS FOLLOW
46622  0000  DR3BFD, 0       6271            / CDF TO FIELD OF REQUIRED POSITION
46623  0000  DR3BAD, 0       4266            / FRA OF REQUIRED POSITION
46624  7010          RAR                     / SET REQUIRED BYTE INDICATOR
46625  7200          CLA                     /
46626  1222          TAD     DR3BFD          / SET UP CDF FOR EXECUTION
46627  3231          DCA     DR3CDF          /
                                             /
46630  7401          1-1^2+7401              /*1 VARIABLE LOCATIONS FOLLOW
46631  0000  DR3CDF, 0                       / INTO DIALOGUE BUFFER FIELD
46632  1623          TAD  I  DR3BAD          / GET DATA WORD
46633  0073          AND     ZP7700          /  CLEAR OUT RH BYTE
46634  1243          TAD     DR3035          / LOAD IN DEST END OF TEXT
46635  7420          SNL                     / PUT DEST END OF TEXT
46636  7002          BSW                     /  INTO REQUIRED BYTE
46637  3623          DCA  I  DR3BAD          /  AND RESTORE DATA WORD
                                             /
46640  7401          1-1^2+7401              /*1 VARIABLE LOCATIONS FOLLOW
46641  0000  DR3CDI, 0                       / INTO CALLER'S FIELDS
46642  5601          JMP  I  TDP453          / RETURN TO CALLER

46643  0035  DR3035, 35                      / CODE FOR DEST END OF TEXT
46644  6467  DR3457, TDP457                  / LINK TO COMPARE POSITIONS RTN.

             /=====================================================
             /=                                                   =
             /= - MODULE:     TDP455                              =
             /=               CONTROL REPLY RECEIVED              =
             /=                                                   =
             /= - FUNCTION:                                       =
             /=               ACTS ON A REQUEST FOR CONTROL FROM THE =
             /=               OTHER PARTY                         =
             /=                                                   =
             /= - FORM OF CALL:                                   =
             /=               JMS   I   )TDP455                   =
             /=                                                   =
             /=====================================================

46645  7401          1-1^2+7401              /*1 VARIABLE LOCATIONS FOLLOW
46646  0000  TDP455, .-.
                                             /
46647  4535          JMS  I  ZKD42G          / GET CONVERSATION STATUS
```

```
46650  7640           SZA CLA                 / STATUS = DIALOGUE ?
46651  5646           JMP  I  TDP455          / NO - RETURN TO CALLER
                                              /
46652  1050           TAD     ZP0005          /
46653  4534           JMS  I  ZKD515          / GET DATA FROM INPUT RECORD
46654  7041           CIA                     / NEGATE CONTROL TYPE
46655  6251           CDF     50              /
46656  1715           TAD  I  DR5LSS          / GET SECONDARY STATUS
46657  6241           CDF     40              /
46660  7640           SZA CLA                 / STATUS = CONTROL REQUEST SENT ?
46661  5314           JMP     DR5030          / NO - RETURN TO CALLER
46662  2120           ISZ     ZDCPKS          / INCREMENT PACKET COUNT
46663  7000           NOP                     / SAFEGUARD FOR WRAP-ROUND COUNT
                                              /
46664  4537           JMS  I  ZKD516          / GET DATA WORD
46665  7650           SNA CLA                 / VALID ?
46666  5307           JMP     DR5010          / NO
46667  1102           TAD     ZDCCOS          / GET CONTROL STATUS
46670  7650           SNA CLA                 / CONTROL STATUS = RECEIVE
46671  5274           JMP     DP5005          / NO GO NEXT TEST
46672  3102           DCA     ZDCCOS          / YES - SET CONTROL STATUS = SEND
46673  4317           JMS     TDP456          / STORE AND DISPLAY APPROPRIATE LITERAL
                                              /
46674  6251   DR5005, CDF     50              /
46675  1715           TAD  I  DR5LSS          / GET SECONDARY STATUS
46676  6241           CDF     40              /
46677  1074           TAD     ZM0004          /
46700  7640           SZA CLA                 / STATUS = PRINT CONTROL REQUEST ?
46701  5307           JMP     DR5010          / NO
46702  1115           TAD     ZDCPSC          / GET PRINT FLAGS
46703  7106           CLL RTL                 /
46704  7120           STL                     / SET COUNTERPARTY KNOWS FLAG
46705  7012           RTR                     /
46706  3115           DCA     ZDCPSC          / SAVE
                                              /
46707  6251   DR5010, CDF     50              /
46710  3715           DCA  I  DR5LSS          /CLEAR SECONDARY STATUS
46711  6241           CDF     40              /
                                              /
46712  6222   DR5020, CIF     20              /
46713  4572           JMS  I  ZKB23S          / UNLOCK THE KEYBOARD
                                              /
46714  5646   DR5030, JMP  I  TDP455          / RETURN TO CALLER

46715  0103   DR5LSS, ZDCCDS                  / LINK TO SECONDARY STATUS


              /=====================================================
              /=                                                   =
              /= - MODULE:     TDP456                              =
              /=               STORE AND DISPLAY INTERRUPT LITERALS =
              /=                                                   =
              /= - FUNCTION:                                       =
              /=               STORES LITERAL ACCORDING TO CONTROL =
              /=               TYPE IN DIALOGUE BUFFERS AND UPDATES =
              /=               DISPLAY                             =
              /=                                                   =
              /= - FORM OF CALL:                                   =
              /=               JMS  I  )TDP456                     =
              /=                                                   =
              /=====================================================

46716  7401           1-1^2+7401              /*1 VARIABLE LOCATIONS FOLLOW
46717  0000   TDP456, .-.
46720  6214           RDF                     /
46721  1023           TAD     ZKCDI           / SET UP RETURN TO CALLER'S
46722  3356           DCA     DR6CDI          /  FIELD INSTRUCTION
                                              /
46723  1050           TAD     ZP0005          /
46724  4534           JMS  I  ZKD515          / GET CONTROL TYPE FROM INPUT RECORD
46725  1362           TAD     DR6MAD          / ADD IN START ADDRESS OF VECTOR
46726  3004           DCA     ZWORK1          /  CONTAINING LITERAL'S ADDRESSES
46727  1404           TAD  I  ZWORK1          / GET START ADDRESS OF REQUIRED LITERAL
46730  3337           DCA     DR6LAD          / SAVE AS PARAMETER
                                              /
46731  4552           JMS  I  ZKD421          / MOVE NEWLINE TO DIALOGUE BUFFERS
46732  7421           MQL                     / SET START CHARACTER INDICATOR
46733  1360           TAD     DR6013          / SET UP NUMBER OF CHARACTERS
                                              /
46734  4554           JMS  I  ZKD423          / MOVE LITERAL TO DIALOGUE BUFFER
46735  7403           2-1^2+7401              /*2 VARIABLE LOCATIONS FOLLOW
46736  6241           CDF     40              / CDF TO LITERAL'S FIELD
46737  0000   DR6LAD, 0                       / FRA OF LITERAL
                                              /
46740  4552           JMS  I  ZKD421          / MOVE NEWLINE TO DIALOGUE BUFFER
                                              /
46741  3112           DCA     ZDCTXS          / ZEROISE TEXT SEQUENCE
46742  3113           DCA     ZDCCLT          / ZEROISE NO. CHARS. TRANSMITTED
46743  1106           TAD     ZDCCLN          / GET CURRENT LINE NUMBER
46744  7002           BSW                     / PUT LINE NO. IN TOP BYTE
46745  1107           TAD     ZDCCCL          / ADD IN CHARS. IN CURRENT LINE
46746  7001           IAC                     /  PLUS ONE
46747  3114           DCA     ZDCLCU          / SAVE UNTRANSMITTED CHAR DETAILS
46750  1106           TAD     ZDCCLN          / SAVE PRINTABLE LINE NUMBER
```

```
46751  4761            JMS  I  DR642D          /  IN ABSOLUTE FORM
46752  3116            DCA     ZDCPLN          /
                                               /
46753  7340            WM0001                  /
46754  4577            JMS  I  ZKD425          / DISPLAY LATEST TEXT
                                               /
46755  7401            1-1^2+7401              /*1 VARIABLE LOCATIONS FOLLOW
46756  0000   DR6CDI,  0                       / INTO CALLER'S FIELDS
46757  5717            JMP  I  TDP456          / RETURN TO CALLER

46760  0013   DR6013,  13                      / LENGTH OF LITERAL
46761  2011   DR642D,  TDP42D                  / LINK TO CONVERT TO ABSOLUTE RTN.
46762  6762   DR6MAD,  .
46763  6307            DR6INT                  / ADDRESS OF INTERRUPT LITERAL
46764  6307            DR6INT                  / ADDRESS OF INTERRUPT LITERAL
46765  6307            DR6INT                  / ADDRESS OF INTERRUPT LITERAL
46766  6314            DR6PRI                  / ADDRESS OF PRINT LITERAL
46767  6321            DR6TEX                  / ADDRESS OF TEXT LITERAL

46770  0000            ZBLOCK  .+200&7600-.    /*ZERO FILL PAGE
                       /
                       /=LOCAL ROUTINE TO COPY TEXT FROM OLD TO NEW DIALOGUE
                       /=BUFFERS, MAINTAINING CONTROL INFO FOR THE NEW BUFFERS
                       /=I.E. -SETTING UP LINE POINTERS AND MAINTAINING ZDCCLN
                       /=AND ZDCCCL
                       /
47000  7407            4-1^2+7401              /*4 VARIABLE LOCATIONS FOLLOW
47001  0000   DL61NF,  0                       / NEWLINE FOUND FLAG
47002  0000   DL61SA,  0                       / SOURCE COPY ADDRESS
47003  0000   DL61TA,  0                       / TARGET COPY ADDRESS
47004  0000   DL61CT,  .-.
47005  7340            WM0001
47006  3201            DCA     DL61NF          / SET FIRST TIME VALUE FOR NEWLINE FLAG
47007  7305            WP0002
47010  3224            DCA     DL61RB          / SET RELATIVE BUFFER NO. = 2
                       /
                       /   HEAD OF MAIN LOOP
                       /
                       /COPY A WORD FROM OLD TO NEW BUFFERS
                       /
47011  1202   DL61L3,  TAD     DL61SA
47012  4733            JMS  I  DL61AS          / STEP ON SOURCE COPY POINTER
47013  7403            2-1^2+7401              /*2 VARIABLE LOCATIONS FOLLOW
47014  0000   DL61WD,  0                       / RETURN PARAM IGNORED / WORD JUST COPIED
47015  0000   DL61SF,  0                       / CDF TO SOURCE BUFFER
47016  3202            DCA     DL61SA          / STORE RETURNED ADDRESS IN SOURCE
47017  1602            TAD  I  DL61SA          / PICK UP AND STORE
47020  3214            DCA     DL61WD          /    WORD TO BE COPIED
47021  1203            TAD     DL61TA
47022  4733            JMS  I  DL61AS          / STEP ON TARGET COPY POINTER
47023  7403            2-1^2+7401              /*2 VARIABLE LOCATIONS FOLLOW
47024  0000   DL61RB,  0                       / RELATIVE BUFFER NO. (TARGET)
47025  0000   DL61TF,  0                       / CDF TO TARGET BUFFER
47026  3203            DCA     DL61TA          / STORE TARGET ADDRESS
47027  1214            TAD     DL61WD          / COPY WORD TO TARGET
47030  3603            DCA  I  DL61TA
                       /
                       /NOW CHECK THE WORD JUST COPIED
                       /
47031  6241            CDF     40
47032  1201            TAD     DL61NF          / NEWLINE FOUND IN PREVIOUS WORD?
47033  7750            SPA SNA CLA
47034  5267            JMP     DL61J6          / NO
                       /
                       /PREVIOUS WORD CONTAINED A NEWLINE SO
                       /ADJUST STORAGE CONTROL INFO AND SET UP
                       /LINE POINTER.
                       /
47035  3201            DCA     DL61NF          / CLEAR NEWLINE FOUND FLAG
47036  2106            ISZ     ZDCCLN          / INCREMENT CURRENT LINE NO.
47037  7000            NOP
47040  1214            TAD     DL61WD          / CHECK FIRST CHAR OF WORD JUST COPIED
47041  0073            AND     ZP7700
47042  1334            TAD     DL61K4
47043  7640            SZA CLA                 / " " OR "*" ?
47044  7001            IAC                     / SPACE SO COUNTERPARTY'S LINE
47045  3102            DCA     ZDCCOS
47046  1102            TAD     ZDCCOS          / SET CCL = -2(RECEIVER)
47047  7040            CMA                     /    OR -1(SENDER)
47050  3107            DCA     ZDCCCL
                       /
                       /SET UP LINE POINTER ENTRY
                       /
47051  1102            TAD     ZDCCOS
47052  7640            SZA CLA
47053  1057            TAD     ZP0040
47054  1224            TAD     DL61RB
47055  7002            BSW
47056  3007            DCA     ZWORK4
47057  1203            TAD     DL61TA
47060  0061            AND     ZP0077
47061  1007            TAD     ZWORK4
47062  7401            1-1^2+7401              /*1 VARIABLE LOCATIONS FOLLOW
```

```
47063  0000  DL61LF, 0                           / CDF TO LINE POINTER BUFFER
47064  3414           DCA  I  ZAUTO4
47065  6241           CDF 40
47066  5211           JMP     DL61L3              / GO TO READ NEXT WORD
                      /
                      /NOT START OF NEW LINE SO CHECK 2 CHARS COPIED
                      /FOR DESTRUCT, NEWLINE OR DESTRUCT ETX
                      /
47067  1214  DL61J6,  TAD     DL61WD              / CHECK FIRST CHAR OF COPIED WORD
47070  0073           AND     ZP7700
47071  7002           BSW
47072  1335           TAD     DL61K5
47073  7450           SNA                         / NEWLINE ?
47074  5315           JMP     DL61J7              / YES
47075  7001           IAC                         / NO
47076  7650           SNA CLA                     / ETX ?
47077  5604           JMP  I  DL61CT              / YES - EXIT
47100  2107           ISZ     ZDCCCL              / INCREMENT CHARS CURRENT LINE
47101  7000           NOP                         / WRAP ROUND GUARD
47102  1214           TAD     DL61WD              / NOW CHECK SECOND CHAR
47103  0061           AND     ZP0077
47104  1335           TAD     DL61K5
47105  7450           SNA
47106  5315           JMP     DL61J7              / NEWLINE
47107  7001           IAC
47110  7650           SNA CLA
47111  5604           JMP  I  DL61CT              / ETX - EXIT
47112  2107           ISZ     ZDCCCL              / INCREMENT CHARS CURRENT LINE
47113  7000           NOP                         / WRAP ROUND GUARD
47114  5211           JMP     DL61L3              / GO READ NEXT WORD
                      /
                      /NEWLINE FOUND
                      /
47115  2201  DL61J7,  ISZ     DL61NF              / SET NEWLINE FLAG
47116  7410           SKP
47117  5211           JMP     DL61L3              / FIRST TIME - PRETEND NOT TO HAVE SEEN
47120  1106           TAD     ZDCCLN
47121  7700           SMA CLA                     / END OF HEADING LINE?
47122  5211           JMP     DL61L3              / NO - GO TO READ NEXT CHAR
47123  7340           WM0001                      / YES - ADJUST SOURCE POINTERS
47124  1732           TAD  I  DL61A8
47125  3202           DCA     DL61SA              /   TO POINT TO LINE ZDCPLN
47126  1731           TAD  I  DL61A7
47127  3215           DCA     DL61SF
47130  5211           JMP     DL61L3
                      /
                      /
47131  7215  DL61A7,  DL61CF                      / POINTER TO CDF FOR BUFFER
                                                  /   CONTAINING BEGIN LINE ZDCPLN
47132  7216  DL61A8,  DL61CA                      / ADDRESS OF WORD CONTAINING
                                                  /   BEGIN LINE ZDCPLN
47133  7706  DL61AS,  DL61ST                      / A - ROUTINE TO STEP ON BUFFER POINTER
47134  3500  DL61K4,  3500
47135  7742  DL61K5,  -36
              /
              / LOCAL ROUTINE FOR TDP462 TO RESET ACTIVITY
              / MODE IF CONVERSATION STATUS IS NO DIALOGUE
              /

47136  7401           1-1^2+7401                  /*1 VARIABLE LOCATIONS FOLLOW
47137  0000  DL62R1,  .-.
47140  4535           JMS  I  ZK042G              / IF CONVERSATION STATUS
47141  7650           SNA CLA                     / NOT DIALOGUE (=3)
47142  5737           JMP  I  DL62R1
47143  7346           WM0003
47144  6251           CDF     50
47145  1527           TAD  I  DOZDFS
47146  0061           AND     ZP0077
47147  7040           CMA
47150  7002           BSW
47151  6221           CDF     20
47152  0526           AND  I  DOZALM              /
47153  3526           DCA  I  DOZALM
47154  6241           CDF     40
47155  5737           JMP  I  DL62R1
47156  0000           ZBLOCK  .+200&7600-.    /*ZERO FILL PAGE

                      /=====================================================
                      /=                                                   =
                      /= - MODULE:    TDP461                               =
                      /=              PRINT DIALOGUE                       =
                      /=                                                   =
                      /= - FUNCTION:  ACTIONS AN OPERATOR REQUEST TO PRINT =
                      /=              HIS DIALOGUE TEXT                    =
                      /= - FORM OF CALL:                                   =
                      /=              JMS  I  )TDP461                      =
                      /=                                                   =
                      /=====================================================

47200  7401           1-1^2+7401                  /*1 VARIABLE LOCATIONS FOLLOW
47201  0000  TDP461,  .-.
47202  4535           JMS  I  ZK042G              /PRIMARY STATUS DIALOGUE?
47203  7640           SZA CLA
47204  5324           JMP     DL61E2              /NO - ERROR
```

```
47205  1117            TAD     ZDCCHS
47206  7650            SNA!CLA
47207  5324            JMP     DL61E2          / SUPPRESS IF ZERO CHARS
47210  7421            MQL                     /FIND OUT HOW MANY BUFFERS NEEDED
47211  1116            TAD     ZDCPLN
47212  4753            JMS  I  DL612E
47213  4540            JMS  I  ZKD428
47214  7403            2-1^2+7401              /*2 VARIABLE LOCATIONS FOLLOW
47215  0000    DL61CF, 0
47216  0000    DL61CA, 0
47217  7300            WKLEAR
47220  1107            TAD     ZDCCCL
47221  7521            SWP
47222  3014            DCA     ZAUTO4
47223  1106            TAD     ZDCCLN
47224  4540            JMS  I  ZKD428
47225  7403            2-1^2+7401              /*2 VARIABLE LOCATIONS FOLLOW
47226  0000    DL61W1, 0
47227  0000    DL61W2, 0
47230  7521            SWP
47231  1050            TAD     ZP0005
47232  7041            CIA
47233  1014            TAD     ZAUTO4
47234  3014            DCA     ZAUTO4
47235  6202            CIF     0
47236  4430            JMS  I  ZKA529          /HOW MANY BUFFERS IN POOL?
47237  1014            TAD     ZAUTO4
47240  7710            SPA CLA                 /ENOUGH?
47241  5323            JMP     DL61E1          /NO - ERROR
47242  7305            WP0002                  /SET UP LOOP COUNT
47243  1014            TAD     ZAUTO4          /FOR OBTAINING DIALOGUE BUFFERS
47244  3226            DCA     DL61W1
47245  1116            TAD     ZDCPLN          /ADJUST LINE NUMBER IN FIRST UNTRANSMITTED
47246  4753            JMS  I  DL612E          /CHAR FIELD
47247  7041            CIA
47250  7002            BSW
47251  0073            AND     ZP7700
47252  1114            TAD     ZDCLCU
47253  3114            DCA     ZDCLCU
47254  4332            JMS     DL61HI          /FIND START OF HEADING LINE FOR OLD BUFFERS
47255  1337            TAD     DL61HF
47256  3754            DCA  I  DL61A1          /SET UP
47257  1340            TAD     DL61HA          /SOURCE
47260  3755            DCA  I  DL61A2          /COPY POINTERS
47261  4752            JMS  I  DL61SP          /SWAP IN STORAGE INFO FOR NEW BUFFERS
47262  3103            DCA     ZDCDTP          /INITIALISE IT
47263  3104            DCA     ZDCSAD
47264  3107            DCA     ZDCCCL
47265  7340            WM0001
47266  3106            DCA     ZDCCLN
47267  1116            TAD     ZDCPLN
47270  3105            DCA     ZDCFLN
47271  4750    DL61L1, JMS  I  DL612F          /OBTAIN
47272  2226            ISZ     DL61W1          /  REQUIRED NO.
47273  5271            JMP     DL61L1          /    OF BUFFERS
47274  4332            JMS     DL61HI          /FIND START OF HEADING FOR NEW BUFFERS
47275  1337            TAD     DL61HF
47276  3756            DCA  I  DL61A3          /SET UP
47277  1340            TAD     DL61HA          /  TARGET
47300  3757            DCA  I  DL61A4          /    COPY POINTERS
47301  1103            TAD     ZDCDTP          /SET UP
47302  1021            TAD     ZKCDF           /  ADDRESS FOR
47303  3760            DCA  I  DL61A5          /    LINE POINTERS
47304  7301            WP0001
47305  1104            TAD     ZDCSAD
47306  3014            DCA     ZAUTO4
47307  4751            JMS  I  DL61PL          /COPY DIALOGUE TEXT FROM OLD TO NEW BUFFERS
47310  4752            JMS  I  DL61SP          /SWAP IN STORAGE INFO FOR OLD BUFFERS
47311  1116            TAD     ZDCPLN          /RESET STORAGE POINTERS TO START OF FIRST LINE
47312  4753            JMS  I  DL612E          /  COPIED FORWARD
47313  3106            DCA     ZDCCLN
47314  3107            DCA     ZDCCCL
47315  4747            JMS  I  DL6162          /PRINT THE OLD BUFFERS
47316  4752            JMS  I  DL61SP          /SWAP IN STORAGE INFO FOR NEW BUFFERS
47317  3115            DCA     ZDCPSC          /CLEAR PRINT/COUNTERPARTY KNOWS FLAGS
47320  7340            WM0001
47321  4577            JMS  I  ZKD425          /DISPLAY THE CARRIED FORWARD DIALOGUE TEXT
47322  5325            JMP     DL61J2
47323  1346    DL61E1, TAD     DL61K2          /ERROR:  SYSTEM BUSY - TRY AGAIN
47324  1051    DL61E2, TAD     ZP0006          /ERROR:  INVALID FUNCTION
47325  7001    DL61J2, IAC                     /NORMAL EXIT:  CLEAR MESSAGE LINE
47326  6222            CIF     20
47327  4566            JMS  I  ZKH22L
47330  5601            JMP  I  TOP461
                       /
                       /= LOCAL S/R TO OBTAIN POINTERS TO
                       /= START OF HEADING LINE
                       /
47331  7401            1-1^2+7401              /*1 VARIABLE LOCATIONS FOLLOW
47332  0000    DL61HI,.-.
47333  7421            MQL
47334  7340            WM0001
47335  4540            JMS  I  ZKD428
47336  7403            2-1^2+7401              /*2 VARIABLE LOCATIONS FOLLOW
```

```
47337  0000  DL61HF, 0
47340  0000  DL61HA, 0
47341  7340        *M0001
47342  1340        TAD     DL61HA
47343  3340        DCA     DL61HA
47344  5732        JMP  I  DL61HI
                   /
                   /
                   /
47345  0002  DL61K1, +2
47346  0015  DL61K2, +15
47347  6330  DL6162, TDP462
47350  0601  DL612F, TDP42F
47351  7004  DL61PL, DL61CT                / A - COPY TEXT FROM OLD TO NEW BRFS S/R
47352  7547  DL61SP, DL61SW                / A - SWAP STORAGE INFO S/R
47353  2025  DL612E, TDP42E
47354  7015  DL61A1, DL61SF                / ADDRESS OF CDF TO SOURCE BUFFER
47355  7002  DL61A2, DL61SA                / ADDRESS OF SOURCE ADDRESS
47356  7025  DL61A3, DL61TF                / ADDRESS OF CDF TO TARGET BUFFER
47357  7003  DL61A4, DL61TA                / ADDRESS OF TARGET ADDRESS
47360  7063  DL61A5, DL61LF                / ADDRESS OF CDF TO LINE POINTER BUFFER
47361  0000        ZBLOCK  .+200&7600-.    /*ZERO FILL PAGE
             ///////////////////////////////////////////////////////////
             /                                                         /
             /    MODULE:  TDP463  FORM AND SEND STATS RECORD          /
             /                                                         /
             /    FUNCTION:   TO FORM A STATISTICS RECORD, CLEAR THE   /
             /                STATISTICS INFORMATION ON PAGE ZERO AND  /
             /                SEND THE RECORD                          /
             /                                                         /
             /    PARAMETERS: NONE                                     /
             /                                                         /
             /    CALLED BY:  TDP335 (MESSAGE LEAVING ENDED)           /
             /                TDP322 (END CONTACT)                     /
             /                                                         /
             ///////////////////////////////////////////////////////////
47400  7401        1=1^2+7401              /*1 VARIABLE LOCATIONS FOLLOW
47401  0000  TDP463, .-.
47402  6214        RDF                     /
47403  1023        TAD     ZKCDI           / SET UP RETURN TO CALLER'S
47404  3330        DCA     DL63CF          /  FIELD INSTRUCTION
47405  6241        CDF     40              /
47406  4737        JMS  I  DL6348          / CALCULATE AND STORE NO.
47407  3004        DCA     ZWORK1          / OF FREE DESK UNITS
47410  4530        JMS  I  ZKD511          / STORE CONSTANTS AT
47411  0024        24                      / START OF STATISTICS RECORD
47412  0210        210
47413  0016        16
47414  7777        -1
47415  6221        CDF     20              / PICK UP AND STORE
47416  1524        TAD  I  DOZDUN          / DESK UNIT NO. IN
47417  4531        JMS  I  ZKD512
47420  1004        TAD     ZWORK1          / STORE FREE DESK UNIT FIELD
47421  4531        JMS  I  ZKD512          / IN RECORD
47422  4535        JMS  I  ZKD42G          / STORE A FIELD TO SIGNIFY
47423  1074        TAD     ZM0004          / IF CONNECT INTACT
47424  7650        SNA CLA
47425  7301        *P0001
47426  4531        JMS  I  ZKD512
47427  4535        JMS  I  ZKD42G          / CALL ROUTINE TO CALCULATE
47430  7540        SMA SZA                 / PRIMARY STATUS LESS 3
47431  5235        JMP     DL63J1          / IF PRIMARY STATUS-3 IS POSITIVE STORE 3
47432  7700        SMA CLA
47433  5236        JMP     DL63J2          / IF PRIMARY STATUS-3 IS ZERO STORE 2
47434  5237        JMP     DL63J3          / IF PRIMARY STATUS-3 IS NEGATIVE STORE 1
47435  7301  DL63J1, *P0001
47436  7001  DL63J2, IAC
47437  7001  DL63J3, IAC
47440  4531        JMS  I  ZKD512
47441  1117        TAD     ZDCCHS          / STORE CHARACTERS TRANSMITTED
47442  0067        AND     ZP0377          / IN INTEGER FORMAT (I.E. TWO WORDS)
47443  4531        JMS  I  ZKD512
47444  1117        TAD     ZDCCHS
47445  7002        BSW
47446  7112        CLL RTR
47447  0054        AND     ZP0017
47450  4531        JMS  I  ZKD512
47451  1120        TAD     ZDCPKS          / STORE PACKETS TRANSMITTED
47452  0067        AND     ZP0377          / IN INTEGER FORMAT
47453  4531        JMS  I  ZKD512
47454  1120        TAD     ZDCPKS
47455  7002        BSW
47456  7112        CLL RTR
47457  0054        AND     ZP0017
47460  4531        JMS  I  ZKD512
47461  6251        CDF     50
47462  7330        *M4000                  / STORE  PAYER INDICATOR
47463  0734        AND  I  DL63CS
47464  7106        CLL RTL
47465  4531        JMS  I  ZKD512
47466  6251        CDF     50
47467  1734        TAD  I  DL63CS          / STORE COUNTERPARTY STATUS (AT CONTACT)
```

```
47470  4531          JMS  I  ZKD512
47471  6251          CDF     50
47472  1735          TAD  I  DL63CN         / STORE COUNTERPARTY AUDIT NO.
47473  4531          JMS  I  ZKD512
47474  6251          CDF     50
47475  1736          TAD  I  DL63CY         /  STORE COUNTERPARTY COUNTRY
47476  4531          JMS  I  ZKD512
47477  1052          TAD     ZP0007         / SET UP OFFSET VALUE
47500  7421          MQL
47501  7340          WM0001                 / GET ADDRESS AND FIELD OF SUBSCRIBER
47502  4540          JMS  I  ZKD428         / MNEMONIC IN HEADING LINE
47503  7403          2-1^2+7401             /*2 VARIABLE LOCATIONS FOLLOW
47504  0000  DL63DF, 0                      / HEADING LINE CDF
47505  0000  DL63DA, 0                      / SUBSCRIBER MNEMONIC ADDRESS
47506  7341          WM0002
47507  3005          DCA     ZWORK2
47510  1304          TAD     DL63DF
47511  3313          DCA     DL63C1
47512  7401          1-1^2+7401             /*1 VARIABLE LOCATIONS FOLLOW
47513  0000  DL63C1, 0                      / GET INTO HEADING LINE
47514  1705          TAD  I  DL63DA
47515  4531          JMS  I  ZKD512         / STORE 2 SUBSCRIBER MNEMONIC WORDS
47516  2305          ISZ     DL63DA
47517  2005          ISZ     ZWORK2
47520  5313          JMP     DL63C1
47521  1332          TAD     DL63K1         / SET UP STATS RECORD PORT
47522  7421          MQL
47523  1333          TAD     DL63K2         / SET UP STATS RECORD EXPANDED LENGTH
47524  4532          JMS  I  ZKD513         / SEND THE STATS RECORD
47525  3117          DCA     ZDCCHS         / CLEAR CHARACTERS TRANSMITTED COUNT.
47526  3120          DCA     ZDCPKS         / CLEAR PACKETS TRANSMITTED COUNT.
47527  7401          1-1^2+7401             /*1 VARIABLE LOCATIONS FOLLOW
47530  0000  DL63CF, 0                      / RETURN TO CALLER'S FIELDS
47531  5601          JMP  I  TDP463

47532  0013  DL63K1, 13              / STATS RECORD PORT CONSTANT
47533  0024  DL63K2, 24              / STATS RECORD EXPANDED LENGTH CONSTANT
47534  0111  DL63CS, ZDCCSP          / LINK TO PAYER/COUNTERPARTY STATUS AT CONTACT
47535  0115  DL63CN, ZDCCAN          / LINK TO COUNTERPARTY AUDIT NO.
47536  0110  DL63CY, ZDCCCY          / LINK TO COUNTERPARTY COUNTRY.
47537  0460  DL6348, TDP428
             EJECT
             /
             / = LOCAL ROUTINE TO SWAP VARIABLE LOCATIONS
             / = TO AND FROM FIELD 4 PAGE ZERO
             /

47540  7542  DL61LC, .+2
47541  7413          6-1^2+7401             /*6 VARIABLE LOCATIONS FOLLOW
47542  0000  DL61M1, 0
47543  0000  DL61M2, 0                      / LOCAL SWAPPABLE DATA AREA
47544  0000  0
47545  0000  0
47546  0000  0
47547  0000  DL61SW, .-.
47550  1372          TAD     DL61PZ         / SET UP POINTER TO
47551  3004          DCA     ZWORK1         / LOCALLY HELD DATA AREA
47552  1340          TAD     DL61LC         / AND PAGE ZERO DATA AREA.
47553  3005          DCA     ZWORK2         / SET UP ALSO COPY LOOP COUNT
47554  1042          TAD     ZM0005
47555  3006          DCA     ZWORK3
47556  1404  DL61CL, TAD  I  ZWORK1         / EXCHANGE THE 5 DATA WORDS
47557  7421          MQL
47560  1405          TAD  I  ZWORK2
47561  7521          MQA MQL
47562  3405          DCA  I  ZWORK2
47563  7701          ACL
47564  3404          DCA  I  ZWORK1
47565  2004          ISZ     ZWORK1
47566  2005          ISZ     ZWORK2
47567  2006          ISZ     ZWORK3
47570  5356          JMP     DL61CL
47571  5747          JMP  I  DL61SW         / EXIT

47572  0103  DL61PZ, ZDCDTP
47573  0000          ZBLOCK   .+200&7600-.    /*ZERO FILL PAGE
             /////////////////////////////////////////////////////////
             /                                                       /
             /    MODULE:  TDP464  SET UP PRINT HEADING LINE         /
             /                                                       /
             /    PARAMETERS: NONE                                   /
             /                                                       /
             /    CALLED BY:  TDP462 PRINT-STATS                     /
             /                                                       /
             /////////////////////////////////////////////////////////

47600  7401          1-1^2+7401             /*1 VARIABLE LOCATIONS FOLLOW
47601  0000  TDP464, .-.
47602  1261          TAD     DL64K1         / GET POINTERS TO THE
47603  7421          MQL                    / START OF THE PRINT
47604  7340          WM0001                 / PART OF THE HEADING
47605  4540          JMS  I  ZKD428         / LINE
47606  7403          2-1^2+7401             /*2 VARIABLE LOCATIONS FOLLOW
```

```
47607  0000  DL64P1, 0                       / CDF TO HEADING LINE
47610  0000  DL64P2, 0                       / ADDRESS OF PRINT PART OF HEADING LINE
47611  7300          WKLEAR                  /
47612  1207          TAD     DL64P1
47613  3301          DCA     DL64DD
47614  1210          TAD     DL64P2
47615  3017          DCA     ZAUTO7
47616  6251          CDF     50
47617  1670          TAD  I  DL64D1          / STORE FIRST DATE WORD.
47620  4300          JMS     DL64ST
47621  6251          CDF     50
47622  1671          TAD  I  DL64D2          / STORE SECOND DATE WORD.
47623  4300          JMS     DL64ST
47624  6251          CDF     50
47625  1672          TAD  I  DL64D3          / STORE THIRD DATE WORD.
47626  4300          JMS     DL64ST
47627  1266          TAD     DL64K6          /
47630  6251          CDF     50
47631  1673          TAD  I  DL64TC          / STORE SPACE,TC
47632  4300          JMS     DL64ST
47633  6221          CDF     20
47634  1524          TAD  I  DDZDDB          / STORE DD,"/"
47635  7002          BSW
47636  1262          TAD     DL64K2
47637  4300          JMS     DL64ST
47640  6251          CDF     50
47641  1674          TAD  I  DL64CN
47642  6241          CDF     40
47643  4675          JMS  I  DL642A          / GET CHAR REPRESENTATION OF
47644  7521          MQA MQL                 / CONVERSATION SEQUENCE NUMBER.
47645  4300          JMS     DL64ST
47646  7701          ACL                     / STORE 4 CHAR REP IN CONSECUTIVE
47647  4300          JMS     DL64ST          / WORDS
47650  1263          TAD     DL64K3          / STORE  TAB,20
47651  4300          JMS     DL64ST
47652  1264          TAD     DL64K4          / STORE "CN"
47653  4300          JMS     DL64ST
47654  4676          JMS  I  DL642B          / GO FIND SETTING OF CNV/CNB FLAG
47655  1267          TAD     DL64K7          / CNB - SO STORE "B",NEWLINE
47656  1265          TAD     DL64K5          / CNV - SO STORE "V",NEWLINE
47657  4300          JMS     DL64ST
47660  5601          JMP  I  TDP464          / EXIT

47661  0055  DL64K1, 55              / OFFSET FROM START OF DIALOGUE BUFFER
47662  6057  DL64K2, 6057            / CONSTANT "/"
47663  3317  DL64K3, 3317            / CONSTANT TAB TO COLUMN
47664  0316  DL64K4, 316             / CONSTANT "CN"
47665  2636  DL64K5, 2636            / CONSTANT "V",DESTRUCTIVE NEWLINE
47666  4060  DL64K6, 4060            / CONSTANT SPACE/0
47667  5400  DL64K7, -2400           / CONSTANT USED FOR BONDS
47670  0104  DL64D1, ZDCDAT          / LINKS TO DATE WORDS ON FIELD 5
47671  0105  DL64D2, ZDCDAT+1
47672  0106  DL64D3, ZDCDAT+2
47673  5604  DL64TC, TDZOTC          / LINK TO OWN TC ID (FIELD 5)
47674  0107  DL64CN, ZDCCSN          / LINK TO CONVERSATION SEQUENCE NUMBER (FIELD 5)
47675  0402  DL642A, TDP42A          / LINK TO CONVERT TO CHAR FORMAT
47676  1757  DL642B, TDP42B          / LINK TO GET FLAG SETTING RTN.

             /
             /= LOCAL ROUTINE TO DEPOSIT ACC. INTO NEXT LOCATION IN THE
             /= HEADING LINE.
             /

47677  7403          2-1^2+7401              /*2 VARIABLE LOCATIONS FOLLOW
47700  0000  DL64ST, .-.
47701  0000  DL64DD, 0                       / CDF TO HEADING LINE
47702  3417          DCA  I  ZAUTO7          / DEPOSIT ACC IN NEXT LOC.
47703  6241          CDF     40              / RETURN TO FIELD 4
47704  5700          JMP  I  DL64ST
                     /
                     /=LOCAL ROUTINE TO STEP ON POINTER TO
                     /=SOURCE OR TARGET BUFFERS, KEEPING TRACK
                     /=OF TARGET RELATIVE BUFFER NUMBER
                     /
47705  7401          1-1^2+7401              /*1 VARIABLE LOCATIONS FOLLOW
47706  0000  DL61ST, .-.
47707  6241          CDF     40
47710  2306          ISZ     DL61ST
47711  3007          DCA     ZWORK4
47712  1007          TAD     ZWORK4
47713  7001          IAC
47714  0061          AND     ZP0077
47715  7640          SZA CLA                 /END OF BUFFER REACHED?
47716  5344          JMP     DL61J8          /NO
47717  2706          ISZ  I  DL61ST          /YES - INCREMENT REL BUF NO.
47720  7000          NOP
47721  2306          ISZ     DL61ST          /STEP ON TO CDF PARAM
47722  1706          TAD  I  DL61ST
47723  3325          DCA     .+2
47724  7401          1-1^2+7401              /*1 VARIABLE LOCATIONS FOLLOW
47725  0000  DL61XF, 0
47726  1007          TAD     ZWORK4          /STEP ON TO NEXT BUFFER
47727  0073          AND     ZP7700
47730  3007          DCA     ZWORK4
```

```
47731  1407          TAD  I   ZWORK4
47732  1021          TAD      ZKCDF
47733  7421          MQL
47734  2007          ISZ      ZWORK4
47735  7301          WP0001
47736  1407          TAD  I   ZWORK4
47737  3007          DCA      ZWORK4
47740  7521          SWP
47741  6241          CDF      40
47742  3706          DCA  I   DL61ST
47743  7410          SKP
47744  2306  DL61J8, ISZ      DL61ST               /STEP ON TO CDF PARAM
47745  1007          TAD      ZWORK4               /EXIT TO EXECUTE CDF WITH FRA IN AC
47746  7001          IAC
47747  5706          JMP  I   DL61ST
47750  0000          ZBLOCK   .+20067600-.         /*ZERO FILL PAGE
       0000          DL6END=.

               S

AB525I 1733     DL61K5 7135     DL63K2 7533     DR5020 6712
ACL    7701     DL61LC 7540     DL6348 7537     DR5030 6714
AKSILC 1557     DL61LF 7063     DL64CN 7674     DR6CDI 6756
AKSILI 1555     DL61L1 7271     DL64DD 7701     DR6INF 6307
AKSILO 1556     DL61L3 7011     DL64D1 7670     DR6LAD 6737
AQAKPN 6411     DL61M1 7542     DL64D2 7671     DR6MAD 6762
AQAKTP 0015     DL61M2 7543     DL64D3 7672     DR6PRI 6314
AQDPPN 6403     DL61NF 7001     DL64K1 7661     DR6TEX 6321
AQDPTP 0016     DL61PL 7351     DL64K2 7662     DR6013 6760
AQPRNM 0177     DL61PZ 7572     DL64K3 7663     DR642D 6761
AQPRTY 0200     DL61RB 7024     DL64K4 7664     DR7CDI 6526
AQ01NS 0144     DL61SA 7002     DL64K5 7665     DR7010 6510
AQORB1 5601     DL61SF 7015     DL64K6 7666     DR7020 6512
AQORB2 5704     DL61SP 7352     DL64K7 7667     DR7030 6514
AQORB3 6143     DL61ST 7706     DL64P1 7607     DR7040 6516
AQORB4 6246     DL61SW 7547     DL64P2 7610     FAP110 0000
AQQTB1 7475     DL61TA 7003     DL64ST 7700     FAP120 0000
AQQTB2 7634     DL61TF 7025     DL64TC 7673     FAP130 0000
AQSOH  0001     DL61WD 7014     DL642A 7675     FAP150 0000
AQ36SR 7157     DL61W1 7226     DL642H 7676     FAP220 0000
BFVWMT 6232     DL61W2 7227     DM5FRA 0340     FAP230 0000
BLTYPE 4402     DL61XF 7725     DM6CDF 0350     FAP240 0000
BLZCCM 0131     DL612E 7353     DNABEF 0151     FAP320 0000
BLZPRA 0134     DL612F 7350     DNHWIA 0145     FAP410 0000
BLZPRD 0133     DL6162 7347     DNHWIB 0146     FAP520 0000
BLZPRT 0126     DL62AD 6356     DNNCHS 0144     FARMDE 0000
BNVWFG 5207     DL62BA 6567     DNSPTF 0150     FAUS01 0000
CAM    7621     DL62BF 6570     DN15PA 0147     FBC205 0030
CDI    6203     DL62CF 6361     DOZALM 0126     FBP110 0000
DL16SA 4106     DL62C1 6542     DOZDCM 0125     FBP130 0000
DL6EOD 0000     DL62J1 6350     DOZDES 0127     FBP210 0020
DL61AS 7133     DL62K1 6363     DOZDUN 0124     FBP220 0020
DL61A1 7354     DL62MS 6365     DR1LSS 6240     FBP230 0020
DL61A2 7355     DL62M1 6366     DR1010 6215     FBP310 0010
DL61A3 7356     DL62M2 6367     DR1020 6234     FBP420 0030
DL61A4 7357     DL62P1 6556     DR1030 6237     FBP430 0010
DL61A5 7360     DL62P2 6557     DR2010 6260     FBP440 0020
DL61A7 7131     DL62R1 7137     DR2027 6305     FBP510 0010
DL61A8 7132     DL62R2 6531     DR242D 6306     FBP520 0010
DL61CA 7216     DL62S1 6374     DR3BAD 6623     FBP530 0010
DL61CF 7215     DL62S2 6375     DR3BFD 6622     FBP540 0010
DL61CL 7556     DL622A 6376     DR3CDF 6631     FBP810 0040
DL61CT 7004     DL6263 6574     DR3CDI 6641     FBP820 0040
DL61E1 7323     DL6264 6575     DR3035 6643     FBP910 0030
DL61E2 7324     DL63CF 7530     DR3457 6644     FCP110 0010
DL61HA 7340     DL63CN 7535     DR4LSS 6462     FCP210 0010
DL61HF 7337     DL63CS 7534     DR4027 6461     FCP310 0010
DL61HT 7332     DL63CY 7536     DR4030 6443     FCP410 0010
DL61J2 7325     DL63C1 7513     DR4040 6452     FCP550 0010
DL61J6 7067     DL63DA 7505     DR442E 6465     FCP610 0010
DL61J7 7115     DL63DF 7504     DR4453 6463     FDC480 0030
DL61J8 7744     DL63J1 7435     DR4456 6464     FDP120 0050
DL61K1 7345     DL63J2 7436     DR5LSS 6715     FDP130 0050
DL61K2 7346     DL63J3 7437     DR5005 6674     FDP210 0050
DL61K4 7134     DL63K1 7532     DR5010 6707     FDP230 0050
FDP310 0050     TBD541 0711     TBP522 2504     TDP319 3755
FDP320 0050     TBLBDF 4401     TBP523 2703     TDP32A 6420
FDP330 0050     TBP111 2602     TBP532 0522     TDP32B 6504
FDP340 0050     TBP131 3235     TBP533 0555     TDP321 6326
FDP410 0040     TBP132 3401     TBP541 1103     TDP322 6601
FDP420 0040     TBP211 4514     TBP542 1154     TDP323 7001
FDP430 0040     TBP212 4001     TBP551 2122     TDP324 6401
FDP440 0040     TBP213 4601     TBP811 0202     TDP325 6001
FDP450 0040     TBP22E 2563     TBP821 1602     TDP326 6201
FDP460 0040     TBP22J 1657     TBP911 7610     TDP327 5623
FDP470 0040     TBP22L 2001     TBP919 7603     TDP328 6050
FDP490 0040     TBP22M 2511     TCP111 6202     TDP329 6112
TAC417 0265     TBP22R 3401     TCP213 7023     TDP331 4603
TAD151 2042     TBP22S 2601     TCP311 6401     TDP332 5001
TAD221 1561     TBP22U 2437     TCP551 7124     TDP333 5077
TAD322 1072     TBP22X 0202     TCP611 7201     TDP334 5137
TAP11B 4472     TBP221 1401     TCP91X 7335     TDP335 5161
TAP121 4400     TBP222 1444     TCP911 7266     TDP341 4401
TAP129 2402     TBP223 1500     TCP912 7401     TDP342 4436
TAP131 4470     TBP224 1601     TCP913 7414     TDP345 4143
```

```
TAP134 4571
TAP151 2002
TAP152 2022
TAP153 2034
TAP154 2062
TAP212 0660
TAP223 1525
TAP235 7400
TAP236 6637
TAP237 6042
TAP239 6531
TAP242 3600
TAP243 3604
TAP244 0000
TAP322 0747
TAP323 1001
TAP324 1021
TAP411 0600
TAP412 0606
TAP416 0367
TAP417 0202
TAP521 1602
TAP525 1656
TAP529 1742
TAP611 1755
TAP612 1765
TAR417 0400
TAUS01 0700
TBCATL 0210
TBCDAL 0050
TBCFSP 1565
TBCNFP 1566
TBC132 2727
TBC205 2401
TBC210 2445
TBP226 0401
TBP229 3201
TBP23I 5143
TBP23J 5324
TBP23S 4361
TBP23X 5601
TBP23Z 6061
TBP31A 4404
TBP31R 5001
TBP315 3602
TBP422 0242
TBP423 0220
TBP424 0401
TBP425 0202
TBP431 5202
TBP432 5211
TBP434 5677
TBP437 6001
TBP438 6024
TBP44C 7555
TBP44D 6351
TBP44E 6253
TBP44F 7352
TBP44J 7601
TBP44K 7401
TBP44L 7212
TBP44M 7206
TBP44N 7202
TBP44R 7135
TBP44U 6414
TBP44V 7715
TBP441 6241
TBP451 7610
TBP512 1265
TBP521 2201
TCP914 7432
TDC010 3400
TDC201 1717
TDC202 1737
TDC481 4201
TDC483 5001
TDC484 5401
TDC486 6001
TDC487 6601
TDD201 0001
TDD202 0461
TDP121 5202
TDP122 5405
TDP123 5242
TDP124 5535
TDP131 7202
TDP132 7401
TDP133 7311
TDP134 7460
TDP135 7463
TDP137 7357
TDP211 0402
TDP212 0601
TDP221 0507
TDP224 1265
TDP236 1070
TDP31A 3003
TDP31B 2202
TDP311 4511
TDP312 3201
TDP313 3602
TDP314 2403
TDP315 3401
TDP316 4001
TDP317 4201
TDP411 4043
TDP412 4201
TDP415 4430
TDP416 3741
TDP42A 0402
TDP42B 2043
TDP42C 0711
TDP42D 2011
TDP42E 2025
TDP42F 0601
TDP42G 2001
TDP42H 1757
TDP42I 1143
TDP421 1401
TDP422 1201
TDP423 1606
TDP424 2212
TDP425 2231
TDP426 3001
TDP427 2201
TDP428 0460
TDP429 2401
TDP431 5401
TDP432 5430
TDP433 5601
TDP434 5471
TDP435 5476
TDP436 5503
TDP437 5510
TDP441 3055
TDP442 3201
TDP448 3225
TDP449 3142
TDP451 6202
TDP452 6242
TDP453 6601
TDP454 6401
TDP455 6646
TDP456 6717
TDP457 6467
TDP461 7201
TDP462 6330
TDP463 7401
TDP464 7601
TDP471 6001
TDP472 6032
TDP473 6056
TDP474 5643
TDP491 3402
TDP492 3446
TDP493 3462
TDP511 0202
TDP512 0235
TDP513 0243
TDP514 0277
TDP515 0341
TDP516 0347
TDR001 5601
TDZACI 5620
TDZGAB 5605
TDZOCY 5617
TDZGSM 5602
TDZOTC 5604
TD483E 6000
TD487E 7600
#KLEAR 7300
#K4000 7330
#K5777 7352
#K6000 7333
#K7775 7346
#K7776 7344
#K7777 7340
#M0001 7340
#M0002 7344
#M0003 7346
#M2000 7333
#M2001 7352
#M4000 7330
#P0001 7301
#P0002 7305
#P0003 7325
#P0004 7307
#P0006 7327
#P0100 7203
#P2000 7332
#P3777 7350
ZARMDE 0133
ZAUT00 0010
ZAUT01 0011
ZAUT02 0012
ZAUT03 0013
ZAUT04 0014
ZAUT05 0015
ZAUT06 0016
ZAUT07 0017
ZBCALM 0105
ZBCADM 0103
ZBCCIF 0110
ZBCDCM 0104
ZBCDUA 0102
ZBCDUN 0101
ZBCILA 0113
ZBCILF 0112
ZBCIVA 0122
ZBCKLT 0111
ZBCPGN 0120
ZBCPG1 0115
ZBCPTP 0114
ZDBNCL 0122
ZDCCAK 0115
ZDCCCL 0107
ZDCCCR 0114
ZDCCCY 0110
ZDCCDS 0103
ZDCCHS 0117
ZDCCLN 0106
ZDCCLT 0113
ZDCCOS 0102
ZDCCSN 0107
ZDCCSP 0111
ZDCCVB 0116
ZDCDAT 0104
ZDCDBF 0123
ZDCDES 0101
ZDCDTP 0103
ZDCFLD 0110
ZDCFLG 0111
ZDCFLN 0105
ZDCLCH 0114
ZDCMCL 0121
ZDCMOL 0101
ZDCOAN 0113
ZDCOCR 0112
ZDCPKS 0120
ZDCPLN 0116
ZDCPRS 0102
ZDCPSC 0115
ZDCSAD 0104
ZDCTXS 0112
ZKA151 0036
ZKA152 0037
ZKA153 0040
ZKA154 0041
ZKA322 0031
ZKA323 0032
ZKA324 0033
ZKA416 0024
ZKA417 0025
ZKA521 0026
ZKA525 0027
ZKA529-0030
ZKB111 0035
ZKB213 0157
ZKB22L 0166
ZKB221 0160
ZKB222 0161
ZKB226 0163
ZKB229 0164
ZKB23J 0171
ZKB23S 0172
ZKB23X 0173
ZKB23Z 0174
ZKB31A 0156
ZKB521 0175
ZKB522 0176
ZKB523 0177
ZKCDF  0021
ZKCDI  0023
ZKCIF  0022
ZKC213 0135
ZKC911 0173
ZKD329 0156
ZKD342 0136
ZKD345 0170
ZKD42A 0147
ZKD42B 0140
ZKD42C 0167
ZKD42F 0150
ZKD42G 0135
ZKD421 0152
ZKD422 0153
ZKD423 0154
ZKD424 0176
ZKD425 0177
ZKD426 0155
ZKD428 0151
ZKD429 0162
ZKD441 0141
ZKD453 0142
ZKD456 0143
ZKD457 0144
ZKD462 0145
ZKD463 0146
ZKD511 0130
ZKD512 0131
ZKD513 0132
ZKD514 0133
ZKD515 0134
ZKD516 0137
ZM0004 0074
ZM0005 0042
ZM0006 0043
ZM0010 0044
ZM0040 0045
ZM0120 0046
ZM0260 0047
ZP0003 0000
ZP0005 0050
ZP0006 0051
ZP0007 0052
ZP0010 0053
ZP0017 0054
ZP0020 0055
ZP0037 0056
ZP0040 0057
ZP0060 0020
ZP0070 0060
ZP0077 0061
ZP0100 0062
ZP0120 0063
ZP0177 0064
ZP0200 0065
ZP0260 0066
ZP0377 0067
ZP0777 0076
ZP7000 0070
ZP7400 0071
ZP7600 0072
ZP7700 0073
ZP7777 0077
ZVKCRL 0126
ZWORK1 0004
ZWORK2 0005
ZWORK3 0006
ZWORK4 0007

ERRORS DETECTED: 0
LINKS GENERATED: 0
```

```
ACL        230    1056   1114
DL6END      54    1193#
DL61AS     658    666    761#
DL61A1     844    913#
DL61A2     846    914#
DL61A3     860    915#
DL61A4     862    916#
DL61A5     865    917#
DL61A7     752    757#
DL61A8     750    759#
DL61CA     759    812#
DL61CF     757    811#
DL61CL    1051#   1061
DL61CT     647#   726    736    910
DL61E1     831    881#
DL61E2     802    805    882#
DL61HA     845    861    898#   900    901
DL61HF     843    859    897#
DL61HT     842    858    892#   902
DL61J2     880    883#
DL61J6     679    718#
DL61J7     723    733    743#
DL61J8    1166    1188#
DL61K1     906#
DL61K2     881    907#
DL61K4     690    762#
DL61K5     721    731    763#
DL61LC    1037#   1047
DL61LF     710#   917
DL61L1     855#   857
DL61L3     657#   713    739    745    748    754
DL61M1    1039#
DL61M2    1040#
DL61NF     644#   649    677    685    743
DL61PL     869    910#
DL61PZ    1045    1064#
DL61RB     651    668#   703
DL61SA     645#   657    662    663    751    914
DL61SF     661#   753    913
DL61SP     847    870    876    911#
DL61ST     761    1158#  1160   1167   1169   1170   1186   1188   1191
DL61SW     911    1044#  1062
DL61TA     646#   665    670    672    706    916
DL61TF     669#   915
DL61WP     660#   664    671    688    718    729
DL61W1     820#   834    856
DL61W2     821#
DL61XF    1173#
DL612E     808    836    872    912#
DL612F     855    909#
DL6162     875    908#
DL62AD     239#
DL62BA     436    440#
DL62BF     434    441#
DL62CF     220    243#
DL62C1     414    418#
DL62J1     233#
DL62K1     224    235    246#
DL62MS     239    248#
DL62M1     231    249#
DL62M2     229    250#
DL62P1     420    430#
DL62P2     424    431#
DL62R1     255    770#   773    784
DL62R2     256    409#   444
DL62S1     232    255#
DL62S2     240    256#
DL622A     228    257#
DL6263     410    446#
DL6264     411    447#
DL63CF     938    1022#
DL63CW     992    1028#
DL63CS     985    989    1027#
DL63CY     995    1029#
DL63C1    1007    1009#  1014
DL63DA    1003#   1010   1012
DL63DF    1002#   1006
DL63J1     959    963#
DL63J2     961    964#
DL63J3     962    965#
DL63K1    1015    1025#
DL63K2    1017    1026#
DL6348     940    1030#
DL64CW    1109    1137#
DL64DD    1087    1148#
DL64D1    1091    1133#
DL64D2    1094    1134#
DL64D3    1097    1135#
DL64K1    1078    1126#
DL64K2    1106    1127#
DL64K3    1116    1128#
DL64K4    1118    1129#
DL64K5    1122    1130#
DL64K6    1099    1131#
```

```
DL64K7    1121   1132#
DL64P1    1083#  1086
DL64P2    1084#  1088
DL64ST    1092   1095   1098   1102   1107   1113   1115   1117   1119   1123
          1147#  1151
DL64TC    1101   1136#
DL642A    1111   1138#
DL642H    1120   1139#
DOZALM     781    762
DOZDCM      77
DOZDES     776
DOZDUN     948   1104
DR1LSS      96    111#   141    154
DR1010      82     87#
DR1020      85     89    105#
DR1030     109#
DR2010     134    144#
DR2027     130    137    171#
DR242D     157    172#
DR3BAD     485#   493    498
DR3BFD     484#   488
DR3CDF     489    492#
DR3CDI     467    501#
DR3035     495    504#
DR3457     470    505#
DR4LSS     310    335#
DR4027     282    334#
DR4030     306    315#
DR4040     303    308    313    325#
DR442E     338#   371
DR4453     317    336#
DR4456     322    337#
DR5LSS     531    548    560    568#
DR5005     543    547#
DR5010     540    552    559#
DR5020     563#
DR5030     534    566#
DR6CDI     589    624#
DR6INT     178#   630    631    632
DR6LAD     596    605#
DR6MAD     593    629#
DR6PRT     185#   633
DR6TEX     192#   634
DR6013     600    627#
DR642D     617    628#
DR7CDI     362    381    387    399#
DR7010     380#   393
DR7020     378    383#
DR7030     386#   395
DR7040     384    389#
TDP42A     257   1138
TDP42D     172    628
TDP42E     338    912
TDP42F     909
TDP42H    1139
TDP428    1030
TDP451      54     74#    93    103    109
TDP452      99    126#   169
TDP453     336    464#   502
TDP454     274#   278    332
TDP455     521#   525    566
TDP456     337    545    586#   625
TDP457     304    359#   400    505
TDP461     799#   886
TDP462     217#   244    908
TDP463     446    935#  1023
TDP464     447   1077#  1124
TDZDTC    1136
WKLFAR     226    284    471    813   1085
WM0001     380    620    648    749    851    878    894    899    999   1080
WM0002    1004
WM0003     774
WM4000     984
WP0001     222    233    315    386    866    955    963   1181
WP0002     427    650    832
WP0003      94    422
WP0004     139
WP2000     300
ZAUT04     711    816    825    826    829    833    868
ZAUT07    1089   1149
ZDCCAN    1028
ZDCCCL     159    389    473    477    613    696    727    737    814    850
           874
ZDCCCY    1029
ZDCCDS     111    335    568
ZDCCHS     227    803    967    970   1019
ZDCCLN     156    374    475    480    611    616    686    746    817    852
           873
ZDCCLT     610
ZDCCOS      90    320    541    544    693    694    700
ZDCCSN    1137
ZDCCSP    1027
ZDCDAT    1133   1134   1135
```

| | | | | | | | | | | |
|---|---|---|---|---|---|---|---|---|---|---|
| ZDCDTP | 412 | 432 | 442 | 848 | 863 | 1064 | | | | |
| ZDCFLN | 854 | | | | | | | | | |
| ZDCLCU | 615 | 840 | 841 | | | | | | | |
| ZDCPKS | 144 | 296 | 297 | 535 | 975 | 978 | 1020 | | | |
| ZDCPLN | 618 | 807 | 835 | 853 | 871 | | | | | |
| ZDCPSC | 301 | 553 | 557 | 877 | | | | | | |
| ZDCSAD | 415 | 435 | 443 | 849 | 867 | | | | | |
| ZDCTXS | 609 | | | | | | | | | |
| ZKA525 | 438 | | | | | | | | | |
| ZKA529 | 828 | | | | | | | | | |
| ZKB111 | 428 | | | | | | | | | |
| ZKB22L | 107 | 885 | | | | | | | | |
| ZKB23S | 564 | | | | | | | | | |
| ZKB23Z | 102 | | | | | | | | | |
| ZKCDF | 413 | 864 | 1178 | | | | | | | |
| ZKCDI | 219 | 361 | 466 | 588 | 937 | | | | | |
| ZKD345 | 163 | 327 | | | | | | | | |
| ZKD42B | 482 | 809 | 818 | 895 | 1000 | 1081 | | | | |
| ZKD42G | 87 | 276 | 523 | 771 | 800 | 952 | 957 | | | |
| ZKD421 | 598 | 607 | | | | | | | | |
| ZKD422 | 131 | 138 | 225 | 283 | | | | | | |
| ZKD423 | 236 | 602 | | | | | | | | |
| ZKD425 | 621 | 879 | | | | | | | | |
| ZKD511 | 147 | 286 | 942 | | | | | | | |
| ZKD512 | 155 | 158 | 160 | 294 | 316 | 325 | 949 | 951 | 956 | 966 |
| | 969 | 974 | 977 | 982 | 987 | 990 | 993 | 996 | 1011 | |
| ZKD513 | 167 | 330 | 1018 | | | | | | | |
| ZKD515 | 293 | 365 | 528 | 592 | | | | | | |
| ZKD516 | 367 | 538 | | | | | | | | |
| ZM0004 | 550 | 953 | | | | | | | | |
| ZM0005 | 80 | 1049 | | | | | | | | |
| ZP0005 | 292 | 329 | 527 | 591 | 823 | | | | | |
| ZP0006 | 166 | 364 | 882 | | | | | | | |
| ZP0007 | 106 | 997 | | | | | | | | |
| ZP0017 | 973 | 981 | | | | | | | | |
| ZP0040 | 702 | | | | | | | | | |
| ZP0077 | 79 | 707 | 730 | 777 | 1164 | | | | | |
| ZP0377 | 968 | 976 | | | | | | | | |
| ZP7700 | 494 | 689 | 719 | 839 | 1175 | | | | | |
| ZP7777 | 91 | | | | | | | | | |
| ZWORK1 | 366 | 370 | 372 | 376 | 416 | 419 | 421 | 423 | 474 | 594 |
| | 595 | 941 | 950 | 1046 | 1051 | 1057 | 1058 | | | |
| ZWORK2 | 368 | 391 | 472 | 1005 | 1013 | 1048 | 1053 | 1055 | 1059 | |
| ZWORK3 | 1050 | 1060 | | | | | | | | |
| ZWORK4 | 705 | 708 | 1161 | 1162 | 1174 | 1176 | 1177 | 1180 | 1182 | 1183 |
| | 1189 | | | | | | | | | |

V5A

```
/ DP2151.88
/
/           %%%%%%%%%%%%%%%%%%%%%%%%%%%%%%%%%%%%%%%%%%%%%%%%%%%%%%%%%%%%%%
/           %                                                            %
/           %                       PROPRIETARY.                         %
/           %                                                            %
/           %  THIS DOCUMENT CONTAINS INFORMATION PROPRIETARY TO         %
/           %  REUTERS LIMITED AND IS NOT TO BE REPRODUCED AND/OR        %
/           %  USED IN WHOLE OR IN PART WITHOUT THE EXPRESS WRITTEN      %
/           %  PERMISSION OF REUTERS LIMITED.                            %
/           %                                                            %
/           %%%%%%%%%%%%%%%%%%%%%%%%%%%%%%%%%%%%%%%%%%%%%%%%%%%%%%%%%%%%%%
/
/

/
/        MODULE  MAPB50.88 27-OCT-80
/        SYSTEM MAP FILE

/
/        MODULE MAPC50.88 22-JAN-81
/        CONVERSATIONS MAP FILE
/
/        MODULE FCF050.88 16-JAN-80
/        FIXED PAGE ZERO CONSTANTS AND COMMON DATA EQUATES FIELD 4 & 5
```

```
                    ///////////////////////////////////////////////////////////
                    /                                                         /
                    / - COMPONENT:   CALLS QUEUE UPDATE,DISPLAY & SCROLLING   /
                    /                DP2151.BB                                /
                    /                                                         /
                    / - DATE:        JUNE 1979                                /
                    /                                                         /
                    / - AUTHOR:      S. WATHANASIN                            /
                    /                                                         /
                    / - MODULES:     TDP211 - NEW CALL                        /
                    /                TDP221 - DISPLAY WHOLE CALLS QUEUE       /
                    /                TDP212 - DEQUEUE CALL                    /
                    /                TDP213 - STEP ON A PAGE                  /
                    /                TDP236 - CALLS QUEUE ROUTING             /
                    /                      :- TDP231 - LINE FORWARD           /
                    /                         TDP232 - LINE BACK              /
                    /                         TDP233 - PAGE FORWARD           /
                    /                         TDP234 - UNSCROLL               /
                    /                         TDP235 - PAGE BACK              /
                    /                TDP222 - DISPLAY QUEUE PAGE              /
                    /                TDP224 - DISPLAY QUEUE STATUS            /
                    /                TDP223 - DISPLAY A CALL                  /
                    /                LOCAL SUBROUTINES                        /
                    /                TDC201 - CALLS QUEUE POINTER ARRAY FOR   /
                    /                         DEALING                         /
                    /                TDD201 - CALLS QUEUE ENTRY ARRAY FOR     /
                    /                         DEALING                         /
                    /                TDC202 - CALLS QUEUE POINTER ARRAY FOR   /
                    /                         BONDS                           /
                    /                TDD202 - CALLS QUEUE ENTRY ARRAY FOR     /
                    /                         BONDS                           /
                    /                TDP214 - CALLER RANG OFF                 /
                    /                                                         /
                    ///////////////////////////////////////////////////////////

        0005            FIELD FDP210%10
        0400            *400
50400   1300            0^4000+D21END-. /*ELEMENT:TYPE 0:SIZE D21END-.


                    / MODIFIED EJA 22-JAN-81 TO INCLUDE NEW MODULE TDP214-CALLER RANG OFF
                    ////////                                                                ////////
                    /                                                                              /
                    /       MODULE: TDP211: NEW CALL                                               /
                    /       FUNCTION:       ADDS A NEW CALL TO THE CALLS QUEUE ON 1ST CALL:        /
                    /                       ON THE NEXT 6 CALLS.IT WILL UPDATES THE DISPLAY        /
                    /                       ON THE SPECIFIED DESK UNIT.                            /
                    /       CALLED BY:      TDP492                                                 /
                    /       EXIT CONDITIONS:ACC=0.  DF=IF=4                                        /
                    /                                                                              /
                    ////////                                                                ////////
50401   7401            1-1^2+7401                  /*1 VARIABLE LOCATIONS FOLLOW
50402   0000    TDP211, .-.
50403   7340            WM0001
50404   6211            CDF     10
50405   1701            TAD  I  DE1BF               / BROADCAST FLAG = 1 ?
50406   6251            CDF     FDP210
50407   7640            SZA CLA
50410   5270            JMP     DE1NOB              / NO
50411   4677            JMS  I  DE1GNC              / GO PICK UP ROD NO OF CALLS/LEFT MSG
50412   0073            AND     ZP7700              / MASK OUT LEFT MESSAGE COUNT
50413   7002            BSW                         /  LEAVING NO OF CALLS
50414   3004            DCA     ZWORK1              / HOLD TEMPORARILY
50415   4675            JMS  I  DE1QPA              / GO PICK UP START ADDR OF CALLS Q PTR ARRAY
50416   1004            TAD     ZWORK1              / ADD IN NO OF CALLS
50417   3004            DCA     ZWORK1              / LEAVING ZWORK1 POINTING TO NEXT FREE ENTRY
50420   4353            JMS     GTENDQ              / PICK UP ADDR OF END OF QUEUE
50421   1004            TAD     ZWORK1              /
50422   7700            SMA     CLA                 / >= NO OF CALLS ? (16 DECIMAL)
50423   5264            JMP     DE1NOF              / YES: NO ROOM FOR NEW CALL
50424   1062            TAD     ZP0100              / INCR NO OF CALLS : IT'S IN THE TOP HALF
50425   4700            JMS  I  DE1SNC              / GO ADJUST NO OF CALLS.
50426   1404            TAD  I  ZWORK1              / PICK UP POINTER TO CALLS QUEUE PROPER
50427   3005            DCA     ZWORK2              / ZWORK2 = ^CALL QUEUE[NO OF CALLS - 1]
50430   6261            CDF     60                  / INTO CALLS QUEUE FIELD
50431   1405            TAD  I  ZWORK2
50432   0061            AND     ZP0077              / PICK UP 1ST WORD IN ENTRY & MASK TOP HALF
50433   3006            DCA     ZWORK3              / I.E. SET INTEREST MSG LENGTH TO 0
50434   7305            WP0002
50435   4534            JMS  I  ZKD515              / PICK UP INTEREST MSG LENGTH BY
50436   1302            TAD     DE1M23              / SUBTRACTING 19(DEC) FROM RECORD LENGTH
50437   7002            BSW
50440   1006            TAD     ZWORK3
50441   6261            CDF     60                  / INTO CALLS QUEUE FIELD
50442   3405            DCA  I  ZWORK2              / SAVE MSG LENGTH IN TOP HALF OF 1ST WORD IN Q
50443   7327            WP0006
50444   4534            JMS  I  ZKD515              / CALL TO DP515 JUST TO SET UP POINTER FOR
50445   7300            WKLEAR                      / TDP516: THROW AWAY VALUE RETURNED BY TDP515
50446   1303            TAD     DE1MLG              / SET UP COUNT FOR LOOP = -(Q ENTRY LENGTH-1)
50447   3010            DCA     ZAUTO0
50450   4537    DE1LOP, JMS  I  ZKD516              / PICK UP NEXT FIELD OF INPUT REC BUFFER
50451   2005            ISZ     ZWORK2
50452   6261            CDF     60                  /
50453   3405            DCA  I  ZWORK2              / COPY TO Q ENTRY
50454   2010            ISZ     ZAUTO0              / INCR COUNT
50455   5250            JMP     DE1LOP
```

```
50456  1004          TAD      ZWORK1
50457  6251          CDF      FDP210              /
50460  4704          JMS  I   DE1SPG              / CALL STEP ON A PAGE(FIRST CALL,BACKWARDS)
50461  7777          -1                           / STEP BACKWARDS
50462  4676          JMS  I   DE1SFS              / GO SET FIRST FULLY SCROLLED := RESULT
50463  5266          JMP      DE1RET
50464  6211  DE1NOR, CDF      10                  / NO ROOM : SET BROADCAST FLAG TO 0
50465  3701          DCA  I   DE1BF
50466  6243  DE1RET, CDF CIF  FDP490
50467  5602          JMP  I   TDP211              / RETURN : ACC=0, DF=IF=4
50470  4307  DE1NOB, JMS      TDP221              / NOT B/CAST : DISPLAY QUEUE
50471  7305          WP0002
50472  6222          CIF      FBP220
50473  4564          JMS  I   ZKB229              / FLASH ON SCREEN
50474  5266          JMP      DE1RET
50475  1601  DE1QPA, GETADR                       / S/R TO GET DEALING OR BONDS Q POINTER
50476  1654  DE1SFS, SAVFSS                       / S/R TO SAVE FIRST FULLY SCROLLED
50477  1612  DE1GNC, GETNCL                       / S/R TO PICK UP NO OF CALLS/LEFT MSG
50500  1624  DE1SNC, SAVNCL                       / S/R TO SAVE NEW NO OF CALLS/LEFT MSG
50501  4401  DE1BF,  TBLBDF                       / LINK TO BROADCAST FLAG
50502  7755  DE1M23, -23                          / CONSTANT RECORD LENGTH
50503  7756  DE1MLG, 1-DELENG                     / -VE LENGTH OF CALL Q ITEM
50504  1001  DE1SPG, TDP213                       / LINK TO STEP ON A PAGE RTN.

             ////////                                                    ////////
             /       MODULE: TDP221  DISPLAY CALLS QUEUE                        /
             /       FUNCTION:       DISPLAYS THE WHOLE CALLS AREA              /
             /       FORM OF CALL:   JMS  I  (TDP221)                           /
             /       CALLED BY:      TDP211, TDP212                             /
             /       EXIT CONDITIONS:ACC = 0, DF= IF= 4                         /
             ////////                                                    ////////
50505  7403          2-1^2+7401                   /*2 VARIABLE LOCATIONS FOLLOW
50506  0000  DE1ADR, 0                            / ADDR OF Q PTR ARRAY
50507  0000  TDP221, .-.
50510  4746          JMS  I   DE1GFD              / GO  PICK UP FIRST CALL DISPLAYED
50511  6221          CDF      20
50512  1751          TAD  I   DE1DUN              / ADD IN DESK UNIT NO
50513  6251          CDF      50
50514  3004          DCA      ZWORK1              / HOLD TEMPORARILY
50515  4745          JMS  I   DE1GFS              / GO PICK UP FIRST FULLY SCROLLED
50516  7041          CIA                          / NEGATE
50517  1404          TAD  I   ZWORK1              / ADD IN FIRST CALL DISPLAYED
50520  7750          SPA SNA CLA                  / 1ST CALL > 1ST FULLY SCROLLED ?
50521  5324          JMP      DE1GT
50522  4745          JMS  I   DE1GFS              / YES : GET & SET 1ST CALL TO FIRST FULLY SCROLLED
50523  3404          DCA  I   ZWORK1
50524  1404  DE1GT,  TAD  I   ZWORK1
50525  4742          JMS  I   DE1222              / DISPLAY QUEUE(1ST CALL)
50526  4744          JMS  I   DE1224              / DISPLAY STATUS
50527  4747          JMS  I   DE1QPA              / GET ADDR OF CALLS QUEUE PTR ARRAY
50530  1077          TAD      ZP7777              /
50531  3306          DCA      DE1ADR              / HOLD TEMPORARILY
50532  1306          TAD      DE1ADR              /
50533  4743          JMS  I   DE1223              / CLEAR LATEST CALL AREA OF CALLS ZONE
50534  4750          JMS  I   DE1GNC              / GET NO OF CALLS/LEFT MSGS.
50535  0073          AND      ZP7700
50536  7002          BSW
50537  1306          TAD      DE1ADR              / ADD ON BASE ADDR OF Q POINTER ARRAY
50540  4743          JMS  I   DE1223              / DISPLAY LATEST CALL
50541  5707          JMP  I   TDP221              / RETURN
50542  1201  DE1222, TDP222                       / LINK TO DISPLAY QUEUE PAGE RTN.
50543  1401  DE1223, TDP223                       / LINK TO DISPLAY A CALL RTN.
50544  1265  DE1224, TDP224                       / LINK TO DISPLAY Q STATUS RTN.
50545  1642  DE1GFS, GETFSS                       / S/R TO PICK UP 1ST FULLY SCROLLED
50546  1670  DE1GFD, GETFCD                       / S/R TO PICK UP 1ST CALL DISPLAYED
50547  1601  DE1QPA, GETADR                       / S/R TO PICK UP ADDR OF CALLS Q PTR ARRAY
50550  1612  DE1GNC, GETNCL                       / S/R TO PICK UP NO. OF CALLS/LEFT MSGS
50551  0101  DE1DUN, ZHCDUN                       / LINK TO DESK UNIT NO.

             /
             / SUBROUTINE USED BY TDP211 IN ORDER TO CALCULATE
             / THE CORRECT END OF QUEUE ACCORDING TO CNV/CNB FLAG
             /
50552  7401          1-1^2+7401                   /*1 VARIABLE LOCATIONS FOLLOW
50553  0000  GTENDQ, .-.
50554  1123          TAD      ZDCDBF              / GET DEALING/BONDS FLAG
50555  7650          SNA CLA                      / BONDS ?
50556  5361          JMP      GTEQ01              / NO
50557  1364          TAD      BNDEDQ              / GET END OF BONDS CALLS QUEUE
50560  7410          SKP                          /
50561  1363  GTEQ01, TAD      CNVEDQ              / GET END OF DEALING CALLS QUEUE
50562  5753          JMP  I   GTENDQ              / RETURN TO CALLER
50563  6041  CNVEDQ, -1-DCENDQ
50564  6021  BNDEDQ, -1-DBENDQ
50565  0000          ZBLOCK   .+20&7600-.         /*ZERO FILL PAGE
```

```
                  ////////                                                 ////////
                  /        MODULE: TDP212  DEQUEUE CALL                           /
                  /        FUNCTION:       DELETES A CALL FROM THE CALLS QUEUE,THEN /
                  /                        ON SUBSEQUENT (UP TO 6) CALLS UPDATES THE /
                  /                        DISPLAY ON THE SPECIFIED DESK UNIT.      /
                  /        FORM OF CALL:   JMS  I  (TDP212)                         /
                  /        CALLED BY:      TDP492                                   /
                  /        EXIT CONDITIONS:ACC=0,  DF=IF=4                          /
                  /                                                                 /
                  ////////                                                 ////////
50600  7401               1-1^2+7401                  /*1 VARIABLE LOCATIONS FOLLOW
50601  0000      TDP212,  .-.
50602  7340               WM0001
50603  6211               CDF       10
50604  1727               TAD   I   DE2BF             / BROADCAST FLAG = 1?
50605  6251               CDF       FDP210
50606  7640               SZA       CLA
50607  5276               JMP       DE2NOB            / NOT B/CAST
50610  4723               JMS   I   DE2GNC            / GO PICK UP NO OF CALLS/LEFT MSG
50611  0073               AND       ZP7700            / MASK OUT LEFT MSG COUNT
50612  7002               BSW                         /  LEAVING NO OF CALLS
50613  3004               DCA       ZWORK1            / HOLD TEMPORARILY
50614  4722               JMS   I   DE2QPA            / GO GET ADDR OF CALLS Q PTR ARRAY
50615  1077               TAD       ZP7777            /
50616  3007               DCA       ZWORK4            / SAVE
50617  1007               TAD       ZWORK4            / GET START OF Q POINTER ARRAY
50620  1004               TAD       ZWORK1            / ADD IN NO OF CALLS
50621  7041               CIA                         /
50622  3004               DCA       ZWORK1            / SAVE AS LIMIT OF SEARCH
50623  1052               TAD       ZP0007            / PICK UP AUDIT NO
50624  4534               JMS   I   ZKD515            / USING TDP515
50625  7041               CIA
50626  3005               DCA       ZWORK2            / SAVE NEGATED VALUE
50627  1007      DE2LOP,  TAD       ZWORK4
50630  1004               TAD       ZWORK1
50631  7650               SNA       CLA               / CHECK FOR END OF Q
50632  5316               JMP       DE2NFD
50633  2007               ISZ       ZWORK4            / INCR POINTER
50634  7000               NOP                         / ALLOW SKIP !
50635  1053               TAD       ZP0010
50636  1407               TAD   I   ZWORK4            / PICK UP ADDR OF OWN AUDIT NO IN Q ENTRY
50637  3006               DCA       ZWORK3
50640  6261               CDF       60                / INTO CALLS QUEUE FIELD
50641  1406               TAD   I   ZWORK3
50642  6251               CDF       50
50643  1005               TAD       ZWORK2            / COMPARE AUDIT NO'S
50644  7640               SZA       CLA
50645  5227               JMP       DE2LOP
50646  1007      DE2FD,   TAD       ZWORK4
50647  3011               DCA       ZAUTO1            / J := I+1
50650  1007               TAD       ZWORK4
50651  4347               JMS       SAVCDL            / SAVE POINTER TO CALL DELETED
50652  1407               TAD   I   ZWORK4            / SAVE OLD VALUE OF ARRAY[I]
50653  3006               DCA       ZWORK3
50654  1007      DE2LP2,  TAD       ZWORK4            / SEARCH FOR END OF QUEUE
50655  1004               TAD       ZWORK1
50656  7650               SNA       CLA
50657  5264               JMP       DE2OUT
50660  1411               TAD   I   ZAUTO1            / SHUFFLE UP ARRAY, I.E. ARRAY[I] := ARRAY[I+1]
50661  3407               DCA   I   ZWORK4
50662  2007               ISZ       ZWORK4
50663  5254               JMP       DE2LP2
50664  1006      DE2OUT,  TAD       ZWORK3
50665  3407               DCA   I   ZWORK4            / SET ARRAY[NO OF CALLS] := SAVED VALUE
50666  1073               TAD       ZP7700            /
50667  4724               JMS   I   DE2SNC            / DECREMENT NO OF CALLS
50670  7340               WM0001
50671  1007               TAD       ZWORK4            / POINTS TO LATEST CALL
50672  4731               JMS I     DE2213            / FIRST FULLY SCROLLED := STEP PAGE(LATEST,
50673  7777               -1                          /                                  BACKWARDS)
50674  4725               JMS   I   DE2SFS            / SAVE AS FIRST FULLY SCROLLED
50675  5320               JMP       DE2RET            / RETURN
50676  7327      DE2NOB,  WP0006                      / NOT B/CAST : UPDATE DISPLAY
50677  4534               JMS   I   ZKD515            / PICK UP DESK UNIT NO
50700  3004               DCA       ZWORK1            /
50701  4726               JMS   I   DE2GFD            / GO GET FIRST CALL DISPLAYED ARRAY ADDR
50702  1004               TAD       ZWORK1            / ADD IN DESK UNIT
50703  3004               DCA       ZWORK1            / PTR TO 1ST CALL DISPLAYED FOR THIS DU
50704  4333               JMS       GETCDL            / GO GET LAST CALL DELETED
50705  7041               CIA                         /
50706  1404               TAD   I   ZWORK1            / GET 1ST CALL DISPLAYED FOR THIS DU
50707  7750               SPA SNA CLA                 / FIRST CALL > CALL DELETED ?
50710  5314               JMP       DE2DIS            / NO : DISPLAY Q
50711  7340               WM0001
50712  1404               TAD   I   ZWORK1            / YES: DECREMENT FIRST CALL
50713  3404               DCA   I   ZWORK1
50714  4730      DE2DIS,  JMS   I   DE221             / DISPLAY CALLS QUEUE
50715  5320               JMP       DE2RET
50716  6211      DE2NFD,  CDF       10
50717  3727               DCA   I   DE2BF             / NOT FOUND: CLEAR B/CAST FLAG
50720  6243      DE2RET,  CDF CIF   FDP490
50721  5601               JMP   I   TDP212            / RETURN : ACC= 0, DF= IF = 4
50722  1601      DE2QPA,  GETADR                      / S/R TO PICK UP ADDR OF CALLS Q PTR ARRAY
50723  1612      DE2GNC,  GETNCL                      / S/R TO PICK UP NO OF CALLS/LEFT MSG
```

```
50724  1624  DE2SNC, SAVNCL                       / S/R TO SAVE NO OF CALLS/LEFT MSG
50725  1654  DE2SFS, SAVFSS                       / S/R TO SAVE ADDR OF FIRST FULLY SCROLLED CALL
50726  1670  DE2GFD, GETFCD                       / S/R TO PICK UP FIRST CALL DISPLAYED
50727  4401  DE2BF,  TBLBDF                       / LINK TO BROADCAST FLAG
50730  0507  DE221,  TDP221                       / LINK TO DISPLAY WHOLE CALLS QUEUE RTN.
50731  1001  DE2213, TDP213                       / LINK TO DISPLAY ON A PAGE RTN.

             /
             / SUBROUTINE USED BY TDP212 TO PICK UP THE LAST
             / CALL DELETED ACCORDING TO THE CNB/CNV FLAG
             /
50732  7401          1-1^2+7401                   /*1 VARIABLE LOCATIONS FOLLOW
50733  0000  GETCDL, .-.
50734  1123          TAD     ZDCDBF               / GET DEALING/BONDS FLAG
50735  7650          SNA CLA                      / BONDS ?
50736  5341          JMP     GTCD01               / NO
50737  1345          TAD     BNDCAL               / YES - GET LAST BONDS CALL DELETED
50740  5733          JMP  I  GETCDL               / RETURN TO CALLER
50741  1344  GTCD01, TAD     CNVCAL               / GET LAST DEALING CALL DELETED
50742  5733          JMP  I  GETCDL               / RETURN TO CALLER

             /
             / SUBROUTINE USED BY TDP212 TO SAVE THE LAST
             / CALL DELETED ACCORDING TO THE CNV/CNB FLAG
             /
50743  7407          4-1^2+7401                   /*4 VARIABLE LOCATIONS FOLLOW
50744  1717  CNVCAL, TDC201                       / LAST CNV CALL DELETED
50745  1737  BNDCAL, TDC202                       / LAST CNB CALL DELETED
50746  0000  CALDEL, 0                            / TEMP STORE
50747  0000  SAVCDL, .-.
50750  3346          DCA     CALDEL               / HOLD TEMPORARILY
50751  1123          TAD     ZDCDBF               / GET DEALING/BONDS FLAG
50752  7650          SNA CLA                      / BONDS ?
50753  5357          JMP     SVCD01               / NO
50754  1346          TAD     CALDEL               / YES - SAVE LAST CALL DELETED AS
50755  3345          DCA     BNDCAL               /  LAST BONDS CALL DELETED
50756  5747          JMP  I  SAVCDL               / RETURN TO CALLER
50757  1346  SVCD01, TAD     CALDEL               / SAVE LAST CALL DELETED AS
50760  3344          DCA     CNVCAL               /  LAST DEALING CALL DELETED
50761  5747          JMP  I  SAVCDL               / RETURN TO CALLER

50762  0000          ZBLOCK  .+200&7600-.         /*ZERO FILL PAGE
             ////////                                                                ////////
             /       MODULE: TDP213  STEP ON A PAGE (PAGE,DIRECTION)                        /
             /       FUNCTION:       FINDS THE FIRST CALL ON THE PAGE FOLLOWING OR          /
             /                       PRECEEDING THE SPECIFIED CALL.                         /
             /       FORM OF CALL:   TAD     (FIRST CALL)                                   /
             /                       JMS  I  (TDP213)                                       /
             /                       DIRECTION       /+1 = FORWARDS, -1 = BACKWARDS         /
             /       CALLED BY:      TDP211,TDP212,TDP233,TDP235                            /
             /       EXIT CONDITIONS:ACC = 1ST CALL ON NEW PAGE, DF=IF=5                    /
             ////////                                                                ////////
51000  7401          1-1^2+7401                   /*1 VARIABLE LOCATIONS FOLLOW
51001  0000  TDP213, .-.
51002  3004          DCA     ZWORK1               / SAVE PARAM 1
51003  3005          DCA     ZWORK2               / SET LINECOUNT TO 0
51004  1601          TAD  I  TDP213               / PICK UP DIRECTION
51005  7700          SMA     CLA
51006  5212          JMP     DE3MOV
51007  1601          TAD  I  TDP213               / IF BACKWARDS, CURRENT CALL IS NOT IN PAGE,
51010  1004          TAD     ZWORK1
51011  3004          DCA     ZWORK1               / SO ADJUST ZWORK1
51012  2005  DE3MOV, ISZ     ZWORK2               / INCR LINE COUNT
51013  1404          TAD  I  ZWORK1               /
51014  3006          DCA     ZWORK3
51015  6261          CDF     60                   / INTO CALLS QUEUE FIELD
51016  1406          TAD  I  ZWORK3
51017  6251          CDF     FDP210               /
51020  0073          AND     ZP7700               / IS THERE A INTEREST MSG? (LENGTH > 0)
51021  7640          SZA     CLA
51022  2005          ISZ     ZWORK2               / YES: INCR LINE COUNT
51023  1005          TAD     ZWORK2
51024  1265          TAD     DE3M12               / LINECOUNT > 12?
51025  7740          SMA SZA CLA
51026  5250          JMP     DE3G12
51027  4663          JMS  I  DE3QPA               / GO PICK UP ADDR OF CALLS Q PTR ARRAY
51030  7041          CIA                          / NEGATE
51031  1004          TAD     ZWORK1               / ADD IN FIRST CALL ADDR
51032  7710          SPA     CLA                  / CALL NO. >= 1 ?
51033  5260          JMP     DE3LE1               / YES - EXIT LOOP
51034  1601          TAD  I  TDP213
51035  7710          SPA     CLA
51036  5244          JMP     DE3BK
51037  4664          JMS  I  DE3GFS               / GET FIRST FULLY SCROLLED
51040  7041          CIA                          /
51041  1004          TAD     ZWORK1               / ADD IN CALL NO
51042  7650          SNA     CLA                  / CALL NO < 1ST FULLY SCROLLED & DIR IS FORWARD ?
51043  5256          JMP     DE3FFS               / NO: : EXIT LOOP
51044  1004  DE3BK,  TAD     ZWORK1
51045  1601          TAD  I  TDP213               / MOVE CALL NO 1 STEP IN SPECIFIED DIRECTION
51046  3004          DCA     ZWORK1               /
51047  5212          JMP     DE3MOV
```

```
51050  1601  DE3G12, TAD  I  TDP213          / OOPS! ONE CALL TOO MANY.
51051  7500          SMA
51052  7200          CLA                     / IF DIR IS FORWARD, ALREADY AT RIGHT CALL
51053  7041          CIA                     / SO MOVE BACK A STEP
51054  1004          TAD     ZWORK1
51055  5261          JMP     DE3RET
51056  4664  DE3FFS, JMS  I  DE3GFS          / > FIRST FULLY SCROLLED
51057  7410          SKP
51060  4663  DE3LE1, JMS  I  DE3OPA          / < 1
51061  2201  DE3RET, ISZ     TDP213          / GET CORRECT RETURN ADDR
51062  5601          JMP  I  TDP213          / RETURN WITH VALUE IN ACC
51063  1601  DE3OPA, GETADR                  / S/R TO PICK UP ADDR OF CALL Q PTR ARRAY
51064  1642  DE3GFS, GETFSS                  / S/R TO PICK UP 1ST FULLY SCROLLED
51065  7764  DE3M12, -14                     / MAX NO. OF LINES IN CALLS QUEUE
             ////////                                                                    ////////
             /       MODULE: TDP236  CALLS QUEUE ROUTING                                        /
             /       FUNCTION:       CALLS APPOPRIATE MODULE TO PERFORM SPECIFIED               /
             /                       SCROLLING ACTION                                           /
             /       CONTAINS:       TDP231, TDP232, TDP233, TDP234, TDP235                     /
             /       PARAMETER:      ACTION TO BE PERFORMED (1-5)                               /
             /       FORM OF CALL:   TAD     (ACTION)                                           /
             /                       JMS  I  (TDP236)                                           /
             /       USES:           ZWORK1, ZWORK4                                             /
             /       CALLED BY:      THP424                                                     /
             /       EXIT CONDITIONS:ACC= 0, DF= IF= 3                                          /
             ////////                                                                    ////////
51066  7403          2-1^2+7401              /*2 VARIABLE LOCATIONS FOLLOW
51067  0000  DG6TMP, 0                       / WORK STORE
51070  0000  TDP236, .-.
51071  6251          CDF     50
51072  1360          TAD     DG6TAB
51073  3004          DCA     ZWORK1
51074  1404          TAD  I  ZWORK1
51075  3004          DCA     ZWORK1
51076  6221          CDF     20
51077  1753          TAD  I  DG6DUA          / PICK UP DU CAPABILITIES
51100  0053          AND     ZP0010          / MASK
51101  7640          SZA CLA                 / CAPABLE OF BONDS ?
51102  7301          WP0001                  / YES - SET FLAG FOR BONDS IF = 1
51103  3123          DCA     ZOCDBF          /
51104  4754          JMS  I  DG6GFD          / GO GET FIRST CALL DISPLAYED ADDR
51105  6221          CDF     20
51106  1752          TAD  I  DG6DUN          / PICK UP DESK UNIT NO
51107  6251          CDF     50
51110  3007          DCA     ZWORK4          / CONTAINS PTR TO FIRST-DISP ARRAY
51111  1407          TAD  I  ZWORK4
51112  5404          JMP  I  ZWORK1
             /
             /       MODULE: TDP231  QUEUE LINE FORWARD
             /       FUNCTION:       SCROLLS CALLS Q 1 LINE FORWARD
             /
51113  7041  TDP231, CIA
51114  3267          DCA     DG6TMP
51115  4755          JMS  I  DG1GFS          / GO GET FIRST FULLY SCROLLED ADDR
51116  1267          TAD     DG6TMP
51117  7750          SPA SNA CLA
51120  5326          JMP     DG6RET
51121  2407          ISZ  I  ZWORK4          / INCR FIRST DISPLAYED
51122  7410          SKP
51123  3407  DGDISP, DCA  I  ZWORK4          / UPDATE FIRST CALL DISPLAYED
51124  1407          TAD  I  ZWORK4
51125  4757          JMS  I  DG6222          / DISPLAY Q
51126  6233  DG6RET, CDF CIF FOP420
51127  5670          JMP  I  TDP236          / RETURN TO ALERTS SUPERVISOR
             /
             /       MODULE: TDP232  QUEUE LINE BACK
             /       FUNCTION:       SCROLLS CALLS Q 1 LINE BACK
             /
51130  3267  TDP232, DCA     DG6TMP
51131  4756          JMS  I  DG2OPA          / GO GET ADDR OF CALLS Q PTR ARRAY
51132  7041          CIA
51133  1267          TAD     DG6TMP
51134  7750          SPA SNA CLA
51135  5326          JMP     DG6RET
51136  7340          WM0001
51137  1407          TAD  I  ZWORK4
51140  5323          JMP     DGDISP
             /
             /       MODULE: TDP233  QUEUE PAGE FORWARD
             /       FUNCTION:       SCROLLS CALLS Q 1 PAGE FORWARD
             /
51141  4201  TDP233, JMS     TDP213
51142  0001          +1
                                             / STEP FORWARD A PAGE
51143  5323          JMP     DGDISP          / DISPLAY Q
             /
             /       MODULE: TDP234  QUEUE UNSCROLL
             /       FUNCTION:       UNSCROLLS CALLS Q TO THE BEGINING
             /
51144  7200  TDP234, CLA
51145  4756          JMS  I  DG2OPA          / GO GET ADDR OF CALLS Q PTR ARRAY
                                             / SET FIRST CALL DISPLAYED TO 1
51146  5323          JMP     DGDISP          / DISPLAY Q
             /
```

```
                      /        MODULE  TDP235  QUEUE PAGE BACKWARDS
                      /        FUNCTION:       SCROLLS CALLS QUEUE 1 PAGE BACK
                      /
51147  4201  TDP235,  JMS      TDP213
51150  7777           -1                          / STEP BACK A PAGE
51151  5323           JMP      DGDISP             / DISPLAY THE Q
51152  0101  DG6DUN,  ZBCDUN
51153  0102  DG6DUA,  ZBCDUA                      / LINK TO DESK UNIT CAPABILITIES
51154  1670  DG6GFD,  GETFCD                      / S/R TO PICK UP FIRST CALL DISPLAYED
51155  1642  DG1GFS,  GETFSS                      / S/R TO PICK UP FIRST FULLY SCROLLED
51156  1601  DG2GPA,  GETADR                      / S/R TO PICK UP ADDR OF CALLS Q PTR ARRAY
51157  1201  DG6222,  TDP222                      / LINK TO DISPLAY QUEUE PAGE RTN.
51160  1160  DG6TAB,  .
51161  1113           TDP231
51162  1130           TDP232
51163  1141           TDP233
51164  1144           TDP234
51165  1147           TDP235
51166  0000           ZBLOCK   .+200&7600-.       /*ZERO FILL PAGE
                      ////////////////////////////////////////////////////////////////////////////
                      /        MODULE: TDP222  DISPLAY QUEUE                                      /
                      /                                                                           /
                      /        FUNCTION:       DISPLAYS THE PAGE OF THE CALLS QUEUE THAT HAS      /
                      /                        BEEN SELECTED.                                     /
                      /        PARAMETER:      POINTER TO FIRST CALL ON PAGE TO BE DISPLAYED(IN ACC)
                      /        FORM OF CALL:   TAD     (CALL NO)                                  /
                      /                        JMS  I  (TDP222)                                   /
                      /        CALLED BY:      TDP221,TDP236                                      /
                      /        EXIT CONDITIONS:ACC= 0, DF= IF= 5                                  /
                      /        USES:           ZWORK1, ZWORK2, ZAUTO0                             /
                      ////////////////////////////////////////////////////////////////////////////
51200  7401           1-1^2+7401                  /*1 VARIABLE LOCATIONS FOLLOW
51201  0000  TDP222,  .-.                         / ACC CONTAINS PTR TO 1ST CALL ON THIS PAGE
51202  3004           DCA      ZWORK1             /
51203  3005           DCA      ZWORK2             / SET LINECOUNT TO 0
51204  1251           TAD      DF2DBA             / START ADDR OF BUFFER AREA
51205  3016           DCA      ZAUTO6
51206  4660           JMS  I   DF2GNC             / GO PICK UP NO OF CALL/LEFT MSG
51207  0073           AND      ZP7700             / MASK
51210  7002           BSW                         / LEAVING NO OF CALLS
51211  3010           DCA      ZAUTO0             / HOLD
51212  4661           JMS  I   DF2GPA             / GO GET ADDR OF CALLS Q PTR ARRAY
51213  1077           TAD      ZP7777             /
51214  1010           TAD      ZAUTO0             / ADD IN NO OF CALLS
51215  7041           CIA                         /
51216  3010           DCA      ZAUTO0             / GIVING VALUE OF -VE END OF Q
51217  1004  DF2LP,   TAD      ZWORK1
51220  1010           TAD      ZAUTO0             / CHECK FOR END OF Q
51221  7700           SMA      CLA
51222  5244           JMP      DF2DSP
51223  2005           ISZ      ZWORK2             / INCR LINECOUNT
51224  1404           TAD  I   ZWORK1
51225  3006           DCA      ZWORK3             / PICK UP INTEREST MESSAGE LENGTH
51226  6261           CDF      60                 / INTO CALLS QUEUE FIELD
51227  1406           TAD  I   ZWORK3
51230  6251           CDF      FDP210
51231  0073           AND      ZP7700
51232  7640           SZA      CLA                / INT MSG > 0 CHARS?
51233  2005           ISZ      ZWORK2             / NO: INCR MESS COUNT
51234  1005           TAD      ZWORK2
51235  1257           TAD      DF2M12
51236  7740           SMA SZA  CLA
51237  5244           JMP      DF2DSP             / > 12 LINES : EXIT
51240  1004           TAD      ZWORK1             / CALL NO IN ACC
51241  4662           JMS  I   DF2223             / BUILD UP CALLS Q DISPLAY
51242  2004           ISZ      ZWORK1
51243  5217           JMP      DF2LP
51244  1363  DF2DSP,  TAD      DFETX              / STORE DEST ETX
51245  3416           DCA  I   ZAUTO6
51246  7340           WM0001                      / START RHS
51247  6222           CIF      FBP220
51250  4563           JMS  I   ZKB226             / DISPLAY CALLS QUEUE
51251  1756  DF2DBA,  DFBUF-1                     / NO ZKNOP - NOT VARIABLE
51252  1161           1161                        / CURSOR ADDRESS
51253  0011           11                          / ZONE
51254  0050           50                          / DATA FIELD
51255  1757           DFBUF                       / DATA ADDRESS
51256  5601           JMP  I   TDP222             / RETURN TO CALLER
51257  7764  DF2M12,  -14                         / -12DECIMAL.
51260  1612  DF2GNC,  GETNCL                      / S/R TO PICK UP NO OF CALLS/LEFT MSG
51261  1601  DF2GPA,  GETADR                      / S/R TO PICK UP ADDR OF CALLS Q PTR ARRAY
51262  1565  DF2223,  DF223A                      / LINK TO BUILD UP DISPLAY CALLS Q
                      ////////                                                            ////////
                      /        MODULE: TDP224  DISPLAY QUEUE STATUS                               /
                      /        FUNCTION:       DISPLAYS THE QUEUE STATUS LINE                     /
                      /        FORM OF CALL:   JMS  I  (TDP224)                                   /
                      /        USES:           ZAUTO6, ZAUTO7                                     /
                      /        CALLED BY:      TDP333, TDP221                                     /
                      /        EXIT CONDITIONS:ACC= 0, DF= IF= 5                                  /
                      ////////                                                            ////////
51263  7403           2-1^2+7401                  /*2 VARIABLE LOCATIONS FOLLOW
51264  0000  DF4TMP,  0                           / WORK STORE
51265  0000  TDP224,  .-.
```

```
51266  4762          JMS I   DF4CLR       / CLEAR DISPLAY AREA
51267  1353          TAD     DF4DBA
51270  3017          DCA     ZAUTO7       / SET UP POINTER TO DISPLAY LINE

51271  4764          JMS  I  DF4QPA       / GET ADDR OF CALLS Q PTR ARRAY
51272  7041          CIA                  /
51273  3264          DCA     DF4TMP       / HOLD
51274  4765          JMS  I  DF4GFS       / GET FIRST FULLY SCROLLED ADDR
51275  1264          TAD     DF4TMP       /
51276  7750          SPA SNA CLA          / FIRST FULLY SCROLLED > 1 ?
51277  5312          JMP     DF4NGT
51300  1354          TAD     DF4ST1       / YES : MOVE "*MORE*" TO DISPLAY LINE
51301  3417          DCA  I  ZAUTO7
51302  1355          TAD     DF4ST2
51303  3417          DCA  I  ZAUTO7
51304  1356          TAD     DF4ST3
51305  3417          DCA  I  ZAUTO7
51306  1357          TAD     DF4ST4
51307  3417          DCA  I  ZAUTO7
51310  7301          *P0001
51311  7410          SKP
51312  1056 DF4NGT,  TAD     ZP0005
51313  1017          TAD     ZAUTO7
51314  3017          DCA     ZAUTO7
51315  4766          JMS  I  DF4GNC       / PICK UP NO OF CALLS/LEFT MSG
51316  0073          AND     ZP7700
51317  7002          BSW
51320  6242          CIF     FDP420
51321  4547          JMS  I  ZKD42A       / CONVERT TO CHAR FORM
51322  7421          MQL
51323  7501          MQA
51324  0073          AND     ZP7700
51325  7002          BSW
51326  1360          TAD     DF4SP
51327  3417          DCA  I  ZAUTO7
51330  7501          MQA
51331  7002          BSW
51332  0073          AND     ZP7700
51333  1361          TAD     DF4SLH
51334  3417          DCA  I  ZAUTO7       / MORE " NN/" TO DISPLAY LINE
51335  4766          JMS  I  DF4GNC       / PICK UP NO OF CALLS/LEFT MSG
51336  0061          AND     ZP0077       / PICK UP NO OF LEFT MESSAGES
51337  6242          CIF     FDP420
51340  4547          JMS  I  ZKD42A
51341  3417          DCA  I  ZAUTO7       / CONVERT & MOVE TO DISPLAY LINE
51342  6222          CIF     FBP220
51343  7340          *#0001
51344  4563          JMS  I  ZKB226       / DISPLAY THE LINE
51345  7407          4-1^2+7401           /*4 VARIABLE LOCATIONS FOLLOW
51346  3061          3061
51347  0010          10
51350  0050          50
51351  1757          DFBUF
51352  5665          JMP  I  TDP224
51353  1756 DF4DBA,  DFBUF-1
51354  0052 DF4ST1,  52                   / "*
51355  1517 DF4ST2,  1517                 / "MO
51356  2205 DF4ST3,  2205                 / "RE
51357  5240 DF4ST4,  5240                 / "* "
51360  4000 DF4SP,   4000
51361  0057 DF4SLH,  0057
51362  1516 DF4CLR,  DFCLR
51363  3535 DFETX,   3535                 / DESTRUCTIVE ETX (TWICE)
51364  1601 DF4QPA,  GETADR               / S/R TO PICK UP ADDR OF CALLS Q PTR ARRAY
51365  1642 DF4GFS,  GETFSS               / S/R TO PICK UP FIRST FULLY SCROLLED ADDR
51366  1612 DF4GNC,  GETNCL               / S/R TO PICK UP NO OF CALLS/LEFT MSG
51367  0000          ZBLOCK  .+20067600-. /*ZERO FILL PAGE
                ////////                                                     ////////
                /        MODULE: TDP223  DISPLAY A CALL                            /
                /        FUNCTION:       DISPLAYS A SINGLE CALL                    /
                /        PARAMETER:      CALL NO (IN ACC)                          /
                /        FORM OF CALL:   TAD     (CALL)                            /
                /                        JMS  I  (TDP223)                          /
                /        USES:           ZWORK3, ZWORK4, ZAUTO1, ZAUTO2,ZAUTO6,ZAUTO7 /
                /        CALLED BY:      TDP221, TDP222                            /
                /        EXIT CONDITIONS:ACC=0,  DF= IF= 5                         /
                ////////                                                     ////////
51400  7401          1-1^2+7401           /*1 VARIABLE LOCATIONS FOLLOW
51401  0000 TDP223,  .-.                  / DON'T USE ZWORK1, ZWORK2 AND ZAUTO0
51402  3006          DCA     ZWORK3
51403  4704          JMS  I  DF3QPA       / GET ADDR OF CALLS Q PTR ARRAY
51404  7041          CIA
51405  1006          TAD     ZWORK3       / ADD ADDR OF CALL
51406  7710          SPA     CLA
51407  5277          JMP     DF3CLR       / CLEAR AREA
51410  4316          JMS     DFCLR        / CLEAR BUFFER + SET POINTER
51411  1406          TAD  I  ZWORK3       / GET POINTER TO Q ITEM
51412  3006          DCA     ZWORK3
51413  6261          CDF     60           / INTO CALLS QUEUE FIELD
51414  1406          TAD  I  ZWORK3
51415  0061          AND     ZP0077       / PICK UP CALL ID
51416  1305          TAD     DF3600       / ADD IN NEWLINE
51417  6251          CDF     FDP210
51420  3411          DCA  I  ZAUTO1       / PUT IN DISPLAY BUFFER
```

```
51421  2011          ISZ      ZAUTO1            / MOVE PTR ON
51422  1053          TAD      ZP0010
51423  1006          TAD      ZWORK3            /
51424  3012          DCA      ZAUTO2
51425  4310          JMS      PICKUP
51426  7421          MQL                        / SAVE DEALER CODE
51427  4310          JMS      PICKUP            / GET SUBSCRIBER MNEMONIC
51430  3411          DCA  I   ZAUTO1            / AND PUT IN DISPLAY BUFFER
51431  4310          JMS      PICKUP            / 2ND HALF OF SUB MNEMONIC
51432  3411          DCA  I   ZAUTO1            /
51433  2011          ISZ      ZAUTO1
51434  2011          ISZ      ZAUTO1
51435  2011          ISZ      ZAUTO1
51436  7501          MQA
51437  3411          DCA  I   ZAUTO1            / BUFFER FULL
51440  1302          TAD      DF3DBA
51441  4344          JMS      DFDISP            / DISPLAY IT
51442  6261          CDF      60
51443  1406          TAD  I   ZWORK3            / PICK UP INT MSG LENGTH
51444  6251          CDF      50
51445  0073          AND      ZP7700
51446  7002          BSW                        / DIV BY 2,- 1
51447  7450          SNA
51450  5601          JMP  I   TOP223
51451  7110          CLL RAR
51452  7040          CMA
51453  3007          DCA      ZWORK4            / SET UP COUNT
51454  7004          RAL
51455  7421          MQL                        / SAVE REMAINDER
51456  4316          JMS      DFCLR             / CLEAR BUFFER + SET POINTER
51457  1306          TAD      DF3640            / NEWLINE,SPACE
51460  3411          DCA  I   ZAUTO1            / SAVE IN DISPLAY BUFFER
51461  2007  DF3LP,  ISZ      ZWORK4
51462  7410          SKP
51463  5267          JMP      DF3OUT            / CHECK FOR END OF MESS
51464  4310          JMS      PICKUP            / COPY INT MSG TO DISP BUFFER
51465  3411          DCA  I   ZAUTO1
51466  5261          JMP      DF3LP
51467  7501  DF3OUT, MQA
51470  7650          SNA      CLA
51471  5275          JMP      DF3EVN
51472  4310          JMS      PICKUP            / ODD NO OF CHARS
51473  0073          AND      ZP7700
51474  3411          DCA  I   ZAUTO1
51475  1302  DF3EVN, TAD      DF3DBA
51476  7410          SKP
51477  1303  DF3CLR, TAD      DF3ETX
51500  4344          JMS      DFDISP            / DISPLAY IT
51501  5601          JMP  I   TOP223
51502  1756  DF3DBA, DFBUF-1
51503  1362  DF3ETX, DFETX-1
51504  1601  DF3QPA, GETADR                     / S/R TO PICK UP ADDR OF CALLS Q PTR ARRAY
51505  3600  DF3600, 3600                       / NEWLINE
51506  3640  DF3640, 3640                       / NEWLINE,SPACE

             / SUBROUTINE TO PICK UP DATA FROM CALLS Q ITEMS IN FIELD 6
51507  7401          1-1^2+7401                 /*1 VARIABLE LOCATIONS FOLLOW
51510  0000  PICKUP, .-.
51511  6261          CDF      60                / INTO CALLS Q FIELD
51512  1412          TAD  I   ZAUTO2            / GET DATA
51513  6251          CDF      50                / INTO CALLING FIELD
51514  5710          JMP  I   PICKUP            / EXIT

             /
             /       SUBROUTINE TO CLEAR DISPLAY BUFFER
             /
51515  7401          1-1^2+7401                 /*1 VARIABLE LOCATIONS FOLLOW
51516  0000  DFCLR,  .-.
51517  1044          TAD      ZM0010
51520  3017          DCA      ZAUTO7
51521  1364          TAD      DF223M            / CHECK MULTIPLE LINE MARK
51522  7640          SZA CLA                    /
51523  5326          JMP      DFCLS             / CONTINUE TO BUILD UP DISPLAY BUFFER
51524  1302          TAD      DF3DBA            / SET BUFFER POINTER
51525  3016          DCA      ZAUTO6
51526  1016  DFCLS,  TAD      ZAUTO6            / SET UP POINTER
51527  3011          DCA      ZAUTO1
51530  1341  DFCLP,  TAD      DFCSP             / SET SPACES
51531  3416          DCA  I   ZAUTO6
51532  2017          ISZ      ZAUTO7
51533  5330          JMP      DFCLP
51534  1016          TAD      ZAUTO6
51535  3017          DCA      ZAUTO7
51536  1342          TAD      DFNLET            / STORE NEWLINE,NON DEST ETX
51537  3417          DCA  I   ZAUTO7
51540  5716          JMP  I   DFCLR
51541  4040  DFCSP,  4040
51542  3642  DFNLET, 3642                       / NEWLINE,NON DEST ETX

             /
             /       SUBROUTINE TO DISPLAY A LINE
             /
51543  7401          1-1^2+7401                 /*1 VARIABLE LOCATIONS FOLLOW
51544  0000  DFDISP, .-.
```

```
51545  7001            IAC
51546  3361            DCA     DFDADD
51547  1364            TAD     DF223M          / CHECK MULTIPLE LINE MARK
51550  7640            SZA CLA
51551  5744            JMP  I  DFDISP          / NO DISPLAY IF BUILDING UP CALLS Q DISPLAY
51552  6222            CIF     FBP220
51553  7340            WM0001
51554  4563            JMS  I  ZKB226
51555  7407            4-1^2+7401              /*4 VARIABLE LOCATIONS FOLLOW
51556  7777            7777
51557  0010            10
51560  0050            50
51561  0000    DFDADD, 0
51562  5744            JMP  I  DFDISP

               /
               /       SUBROUTINE TO BUILD UP CALLS Q DISPLAY BUFFER
               /
51563  7403            2-1^2+7401              /*2 VARIABLE LOCATIONS FOLLOW
51564  0000    DF223M, 0                       / MULTIPLE LINE MARK
51565  0000    DF223A, .-.
51566  2364            ISZ     DF223M          / SET MARK
51567  4201            JMS     TDP223          /  TO EXTEND DISPLAY BUFFER
51570  3364            DCA     DF223M
51571  5765            JMP  I  DF223A
51572  0000            ZBLOCK  .+200&7600-.    /*ZERO FILL PAGE
               /
               / SUBROUTINE TO PICK UP START ADDRESS OF REQUIRED
               / CALLS QUEUE ACCORDING TO SETTING OF CNV/CNB FLAG
               /
51600  7401            1-1^2+7401              /*1 VARIABLE LOCATIONS FOLLOW
51601  0000    GETADR, .-.
51602  1123            TAD     ZDCDBF          / GET DEALING/BONDS FLAG
51603  7640            SZA CLA                 / BONDS ?
51604  1210            TAD     BNDQPT          / YES - PICK UP OFFSET TO
                                               /  BONDS CALLS QUEUE
51605  1207    GTAD01, TAD     CNVQPT          / PICK UP POINTER TO DEALING CALLS Q
51606  5601            JMP  I  GETADR          / RETURN TO CALLER
51607  1717    CNVQPT, TDC201                  / ADDRESS OF DEALING CALLS Q PTRS
51610  0020    BNDQPT, TDC202-TDC201           / ADDRESS OF BONDS CALLS Q PTRS


               /
               / SUBROUTINE TO PICK UP NUMBER OF CALLS/LEFT MESSAGES
               / ACCORDING TO SETTING OF CNV/CNB FLAG
               /
51611  7401            1-1^2+7401              /*1 VARIABLE LOCATIONS FOLLOW
51612  0000    GETNCL, .-.
51613  1123            TAD     ZDCDBF          / GET DEALING/BONDS FLAG
51614  7650            SNA CLA                 / BONDS ?
51615  5220            JMP     GTNC01          / NO
51616  1122            TAD     ZDBNCL          / YES - GET NO. OF CALLS/LEFT MSG. FOR BONDS
51617  7410            SKP                     /
51620  1121    GTNC01, TAD     ZDCNCL          / GET NO. OF CALLS/LEFT MSG. FOR DEALING
51621  5612            JMP  I  GETNCL          / RETURN TO CALLER


               /
               / SUBROUTINE TO ADJUST AND SAVE NUMBER OF CALLS/LEFT
               / MESSAGES ACCORDING TO SETTING OF CNV/CNB FLAG
               /
51622  7403            2-1^2+7401              /*2 VARIABLE LOCATIONS FOLLOW
51623  0000    ADJUST, 0
51624  0000    SAVNCL, .-.
51625  3223            DCA     ADJUST          / SAVE CONSTANT
51626  1123            TAD     ZDCDBF          / GET DEALING/BONDS FLAG
51627  7650            SNA CLA                 / BONDS ?
51630  5235            JMP     SVNC01          / NO
51631  1122            TAD     ZDBNCL          / YES - GET NO. OF CALLS/LEFT MSG.
51632  1223            TAD     ADJUST          / ADJUST NO. OF CALLS FOR BONDS
51633  3122            DCA     ZDBNCL          / SAVE
51634  5624            JMP  I  SAVNCL          / RETURN TO CALLER
51635  1121    SVNC01, TAD     ZDCNCL          / GET NO. OF CALLS/LEFT MSG.
51636  1223            TAD     ADJUST          / ADJUST NO. OF CALLS FOR DEALING
51637  3121            DCA     ZDCNCL          / SAVE
51640  5624            JMP  I  SAVNCL          / RETURN TO CALLER


               /
               / SUBROUTINE TO PICK UP ADDRESS OF FIRST FULLY
               / SCROLLED CALL ACCORDING TO CNV/CNB FLAG
               /
51641  7401            1-1^2+7401              /*1 VARIABLE LOCATIONS FOLLOW
51642  0000    GETFSS, .-.
51643  1123            TAD     ZDCDBF          / GET DEALING/BONDS FLAG
51644  7650            SNA CLA                 / BONDS ?
51645  5250            JMP     GTFS01          / NO
51646  1316            TAD     TDBFSS          / YES - GET ADDR OF BONDS 1ST FULLY SCROLLED CALL
51647  5642            JMP  I  GETFSS          / RETURN TO CALLER
51650  1307    GTFS01, TAD     TDCFSS          / GET ADDR OF DEALING 1ST FULLY SCROLLED CALL
51651  5642            JMP  I  GETFSS          / RETURN TO CALLER


               /
```

```
                / SUBROUTINE TO SAVE NEW VALUE FOR FIRST FULLY
                / SCROLLED CALL ACCORDING TO CNV/CNB FLAG
                /
51652  7403             2-1^2+7401              /*2 VARIABLE LOCATIONS FOLLOW.
51653  0000     NEWFSS, 0
51654  0000     SAVFSS, .-.
51655  3253             DCA     NEWFSS          / SAVE NEW VALUE
51656  1123             TAD     ZDCDBF          / GET DEALING/BONDS FLAG
51657  7650             SNA CLA                 / BONDS ?
51660  5264             JMP     SVFS01          / NO
51661  1253             TAD     NEWFSS          / YES - SAVE NEW FIRST FULLY
51662  3316             DCA     TDBFSS          /  SCROLLED CALL FOR BONDS
51663  5654             JMP  I  SAVFSS          / RETURN TO CALLER
51664  1253     SVFS01, TAD     NEWFSS          / SAVE NEW FIRST FULLY SCROLLED
51665  3307             DCA     TDCFSS          /  CALL FOR DEALING
51666  5654             JMP  I  SAVFSS          / RETURN TO CALLER


                /
                / SUBROUTINE TO PICK UP ADDRESS OF FIRST CALL
                / DISPLAYED ARRAY ACCORDING TO CNV/CNB FLAG
                /
51667  7401             1-1^2+7401              /*1 VARIABLE LOCATIONS FOLLOW
51670  0000     GETFCD, .-.
51671  1123             TAD     ZDCDBF          / GET DEALING/BONDS FLAG
51672  7640             SZA CLA                 / BONDS ?
51673  1277             TAD     BNDFCD          / YES - GET OFFSET TO BOND ARRAY ADDRESS
51674  1276     GTFC01, TAD     CNVFCD          / GET DEALING ARRAY ADDRESS
51675  5670             JMP  I  GETFCD          / RETURN TO CALLER
51676  1700     CNVFCD, TDCFCD-1                / ADDR OF DEALING 1ST CALL DISPLAYED ARRAY
51677  0007     BNDFCD, TDBFCD-TDCFCD           / OFFSET TO ADDR OF BONDS 1ST CALL DISPLAYED ARRAY


       1700     DDTEND=.
51700  4220             1^4000+DDTEND-. /*ELEMENT:TYPE 1:SIZE DDTEND-.
                /
                / FIRST CALL DISPLAYED ARRAY FOR DEALING
                /
51701  1717     TDCFCD, TDC201
51702  1717             TDC201
51703  1717             TDC201
51704  1717             TDC201
51705  1717             TDC201
51706  1717             TDC201                  / 6 UNITS
                /
                / FIRST FULLY SCROLLED LINE FOR DEALING
                /
51707  1717     TDCFSS, TDC201

                /
                / FIRST CALL DISPLAYED ARRAY FOR BONDS
                /
51710  1737     TDBFCD, TDC202
51711  1737             TDC202
51712  1737             TDC202
51713  1737             TDC202
51714  1737             TDC202
51715  1737             TDC202                  / 6 UNITS
                /
                / FIRST FULLY SCROLLED LINE FOR BONDS
                /
51716  1737     TDBFSS, TDC202

                ////////                                                        ////////
                /       DATA SET:       TDC201  CALLS QUEUE POINTER ARRAY FOR DEALING  /
                /       PURPOSE :       CONTAINS POINTERS TO DEALING CALLS QUEUE ARRAY /
                ////////                                                        ////////
51717  0001     TDC201, DE201A                  /1ST ENTRY IN CALLS QUEUE ARRAY
51720  0024             DE201B                  /2ND ENTRY ETC
51721  0047             DE201C
51722  0072             DE201D
51723  0115             DE201E
51724  0140             DE201F
51725  0163             DE201G
51726  0206             DE201H
51727  0231             DE201J                  /NO "I"
51730  0254             DE201K
51731  0277             DE201L
51732  0322             DE201M
51733  0345             DE201N
51734  0370             DE201P                  /NO "O"
51735  0413             DE201Q
51736  0436     PCEFDQ, DE201R                  /"R" IS THE LAST ONE
                                                /16 ENTRIES ALTOGETHER

                ////////                                                        ////////
                /       DATA SET:       TDC202  CALLS QUEUE POINTER ARR FOR BONDS      /
                /       PURPOSE :       CONTAINS POINTERS TO BONDS CALLS QUEUE ARRAY   /
                ////////                                                        ////////
51737  0461     TDC202, DE202A                  /1ST ENTRY IN CALLS QUEUE ARRAY
51740  0504             DE202B                  /2ND ENTRY ETC
51741  0527             DE202C
51742  0552             DE202D
51743  0575             DE202E
```

```
                     /=====================================================
                     /=                                                   =
                     /= - MODULE:     TDP326                              =
                     /=               SWITCH OFF CONVERSATION             =
                     /=                                                   =
                     /= - FUNCTION:                                       =
                     /=               ELIMINATES ALL TRACES OF A DIALOGUE AND =
                     /=               CHANGES MODE IF NECESSARY           =
                     /=                                                   =
                     /= - FORM OF CALL:                                   =
                     /=               JMS   I   (TDP326                   =
                     /=                                                   =
                     /=====================================================

56200  7401                1-1^2+7401              /*1 VARIABLE LOCATIONS FOLLOW
56201  0000  TDP326, .-.
56202  1266            TAD     DJ6ADR              / SET UP START ADDRESS
56203  3004            DCA     ZWORK1              /
56204  1054            TAD     ZP0017              / SET UP NEGATIVE LOOP
56205  7041            CIA                         /  COUNT OF NUMBER OF
56206  3005            DCA     ZWORK2              /  LOCATIONS TO BE CLEARED
                                                   /
56207  6241  DJ6010, CDF     40                  / ZERIOSE ENTIRE CONVERSATIONS
56210  3404            DCA  I  ZWORK1              /  CONTROL BLOCK EXCEPT
56211  6251            CDF     50                  /  DESCRIPTOR AND NUMBER OF
56212  3404            DCA  I  ZWORK1              /  LINES IN PAGE ZERO OF
56213  2004            ISZ     ZWORK1              /  FIELDS 4 AND 5
56214  2005            ISZ     ZWORK2              /
56215  5207            JMP     DJ6010              /
                                                   /.
56216  1101            TAD     ZDCDES              / GET DESK UNIT/MODE
56217  0061            AND     ZP0077              / MASK LEAVING MODE
56220  1042            TAD     ZM0005              /
56221  7640            SZA CLA                     / MODE CN2 ?
56222  1062            TAD     ZP0100              / NO - SET UP INACTIVE MASK FOR CN1
56223  1064            TAD     ZP0177              / YES - SET UP INACTIVE MASK FOR CN2
56224  6221            CDF     20                  /
56225  0671            AND  I  DJ6LCA              / MASK IN CONVERSATION ACTIVITY
56226  3671            DCA  I  DJ6LCA              /  THUS SETTING MODE INACTIVE
56227  6251            CDF     50                  /
                                                   /
56230  7001            IAC                         /
56231  6212            CIF     10                  /
56232  4535            JMS  I  ZKC213              / RETURN INSERT LINE BUFFER
                                                   /
56233  6242            CIF     40                  / CLEAR SCREEN AREA AND APPLICATION
56234  4562            JMS  I  ZKD429              /  STATUS IF NECESSARY
                                                   /
56235  6222            CIF     20                  /
56236  4572            JMS  I  ZKB23S              / UNLOCK THE KEYBOARD
                                                   /
56237  6221            CDF     20                  /
56240  1670            TAD  I  DJ6LCM              / GET DISPLAY/CURRENT MODES
56241  1265            TAD     DJ6505              / ADD IN EQUALITY MASK
56242  7640            SZA CLA                     / DISPLAY = CURRENT = CN2 MODE ?
56243  5246            JMP     DJ6015              / NO - CONTINUE
56244  1050            TAD     ZP0005              / YES - CLEAR DISPLAY MODE
56245  3670            DCA  I  DJ6LCM              /
56246  1667  DJ6015, TAD  I  DJ6LOM              / GET ALERTS SUPER/OPERATOR MODES
56247  0061            AND     ZP0077              / GET OPERATOR MODE
56250  3004            DCA     ZWORK1              /
56251  1670            TAD  I  DJ6LCM              / GET DISPLAY/CURRENT MODES
56252  0061            AND     ZP0077              / GET CURRENT MODE
56253  7041            CIA                         /
56254  1004            TAD     ZWORK1              /
56255  6251            CDF     50
56256  7640            SZA CLA                     / OPERATOR MODE = MODE BEING SWITCHED OFF ?
56257  5601            JMP  I  TDP326              / NO - SO EXIT
56260  7365            WP0002
56261  6222            CIF     20                  /
56262  4573            JMS  I  ZKB23X              / AMEND MODE TO CNV MODE
56263  7300            WKLEAR
56264  5601            JMP  I  TDP326              / RETURN TO CALLER

56265  7273  DJ6505, -505                        / EQUAL DISPLAY/CURRENT MODE MASK
56266  0102  DJ6ADR, ZDCPRS                      / START ADDRESS FOR ZEROISING
56267  0103  DJ6LOM, ZBCAOM                      / LINK TO OPERATOR MODE
56270  0104  DJ6LCM, ZBCDCM                      / LINK TO CURRENT MODE
56271  0105  DJ6LCA, ZBCALM                      / LINK TO CONVERSATION ACTIVITY
                     /=====================================================
                     /=                                                   =
                     /= - MODULE:     TDP321                              =
                     /=               TXFER                               =
                     /=                                                   =
                     /= - FUNCTION:                                       =
                     /=               PROCESSES AN OPERATOR REQUEST TO    =
                     /=               TRANSFER A DIALOGUE TO ANOTHER DESK =
                     /=               UNIT                                =
                     /=                                                   =
                     /= - FORM OF CALL:                                   =
                     /=               JMS   I   (TDP321                   =
                     /=                                                   =
                     /=====================================================
```

```
56272  7401            1-1^2+7401           /*1 VARIABLE LOCATIONS FOLLOW
56273  0000  TDP321,  .-.
56274  6242            CIF       40         /
56275  4567            JMS   I   ZKD42C     / SWAP IN CONVS CONTROL BLOCK
                                            /
56276  7346            WM0003               /
56277  1102            TAD       ZDCPRS     / GET CONVERSATION STATUS
56300  7640            SZA CLA              / CONVERSATION STATUS = DIALOGUE ?
56301  5325            JMP       DJ1010     / NO - TAKE ERROR EXIT
                                            /
56302  6221            CDF       20         /
56303  1734            TAD   I   DJ1LIA     / GET START ADDRESS OF
56304  3010            DCA       ZAUT00     /  INSERT LINE BUFFER
56305  1733            TAD   I   DJ1LIF     / GET FIELD OF INSERT LINE BUFFER
56306  1021            TAD       ZKCDF      /  AND CREATE CDF INSTRUCTION
56307  3311            DCA       DJ1CIL     /  TO THIS FIELD
                                            /
56310  7401            1-1^2+7401           /*1 VARIABLE LOCATIONS FOLLOW
56311  0000  DJ1CIL,  0                     / INTO INSERT LINE BUFFER'S FIELD
56312  1410            TAD   I   ZAUT00     / GET NO. OF CHARS IN INSERT LINE
56313  6251            CDF       50         /
56314  1332            TAD       DJ1M16     / ADD IN MAXIMUM
56315  7740            SMA SZA CLA          / LENGTH INSERT LINE < OR = 14 ?
56316  5325            JMP       DJ1010     / NO - TAKE ERROR EXIT
                                            /
56317  6222            CIF       20         /
56320  4574            JMS   I   ZKB23Z     / LOCK THE KEYBOARD
                                            /
56321  7305            WP0002               / SET SECONDARY STATUS = DISCONNECT
56322  3103            DCA       ZDCCDS     /  REQUEST (TXFER) SENT
                                            /
56323  4735            JMS   I   DJ1327     / SEND DISCONNECT REQUEST
56324  5330            JMP       DJ1EXT     / EXIT
                                            /
56325  1052  DJ1010, TAD       ZP0007     / SET UP ERROR MESSAGE NO.
56326  6222            CIF       20         /
56327  4566            JMS   I   ZKB22L     / DISPLAY "INVALID FUNCTION"
                                            /
56330  6243  DJ1EXT, CDI       40         /
56331  5673            JMP   I   TDP321     / RETURN TO CALLER

56332  7762  DJ1M16, -16                    / MAX. LENGTH INSERT LINE
56333  0112  DJ1LIF, ZBCILF                 / LINK TO INSERT LINE FIELD
56334  0113  DJ1LIA, ZBCILA                 / LINK TO INSERT LINE ADDRESS
56335  5623  DJ1327, TDP327                 / LINK TO SEND DISCONNECT RTN

56336  0000            ZBLOCK  .+20067600-.   /*ZERO FILL PAGE
             /==================================================
             /=                                                =
             /= - MODULE:    TDP324                            =
             /=              DISCONNECT-DIALOGUE               =
             /=                                                =
             /= - FUNCTION:                                    =
             /=              FORMS A DISCONNECT STATEMENT AND  =
             /=              DISCONNECTS                       =
             /=                                                =
             /= - FORM OF CALL:                                =
             /=              JMS   I   (TDP324                 =
             /=                                                =
             /==================================================

56400  7401            1-1^2+7401           /*1 VARIABLE LOCATIONS FOLLOW
56401  0000  TDP324,  .-.
56402  3216            DCA       DJ4CTY     / SAVE CONTROL TYPE - MAY BE ZERO
                                            / GET A BUFFER & FORM DISCONNECT STATEMENT
56403  4530            JMS   I   ZKD511     /  USING I/O BUFFER HANDLER COMPONENT
56404  0004            4                    / RECORD LENGTH
56405  0321            321                  / RECORD TYPE
56406  0004            4                    / LENGTH NON PACKED
56407  7777            -1                   / TERMINATOR
56410  1216            TAD       DJ4CTY     / GET CONTROL TYPE
56411  4531            JMS   I   ZKD512     / SAVE IN RECORD
56412  7301            WP0001               / DISCONNECT WITH MESSAGE
56413  4533            JMS   I   ZKD514     /  TYPE =1
                                            /
56414  5601            JMP   I   TDP324     / RETURN TO CALLER

56415  7401            1-1^2+7401           /*1 VARIABLE LOCATIONS FOLLOW
56416  0000  DJ4CTY,  0                     / CONTROL TYPE
```

| | | | | | | | |
|---|---|---|---|---|---|---|---|
| AQPRTY | 0200 | DE2QPA | 0722 | DFDISP | 1544 | DG6222 | 1157 |
| AQQINS | 0144 | DE2REI | 0720 | DFETX | 1363 | DL16SA | 4106 |
| AQQRB1 | 5601 | DE2SFS | 0725 | DFNLET | 1542 | DM5FRA | 0340 |
| AQQRB2 | 5704 | DE2SNC | 0724 | DF1ADR | 0506 | DM6CDF | 0350 |
| AQQRB3 | 6143 | DE201A | 0001 | DF1DUN | 0551 | DNABEF | 0151 |
| AQQRB4 | 6246 | DE201B | 0024 | DF1GFD | 0546 | DNHW1A | 0145 |
| AQQTB1 | 7475 | DE201C | 0047 | DF1GFS | 0545 | DNHW1B | 0146 |
| AQQTB2 | 7634 | DE201D | 0072 | DF1GNC | 0550 | DNNCHS | 0144 |
| AQSDH | 0001 | DE201E | 0115 | DF1GT | 0524 | DNSPTF | 0150 |
| AQ36SR | 7157 | DE201F | 0140 | DF1QPA | 0547 | DN1SPA | 0147 |
| BFVWMT | 6232 | DE201G | 0163 | DF1222 | 0542 | DOZALM | 0126 |
| BLTYPE | 4402 | DE201H | 0206 | DF1223 | 0543 | DOZDCM | 0125 |
| BLZCCN | 0131 | DE201J | 0231 | DF1224 | 0544 | DOZDES | 0127 |
| BLZPRA | 0134 | DE201K | 0254 | DF14RO | 2142 | DOZDUN | 0124 |
| BLZPRD | 0133 | DE201L | 0277 | DF14SA | 2141 | DPGEND | 2200 |
| BLZPRT | 0126 | DE201M | 0322 | DF2DBA | 1251 | D21END | 1700 |
| BNDCAL | 0745 | DF201N | 0345 | DF2DSP | 1244 | FAP110 | 0000 |
| BNDEDQ | 0564 | DF201P | 0370 | DF2GNC | 1260 | FAP120 | 0000 |
| BNDFCD | 1677 | DF201Q | 0413 | DF2LP | 1217 | FAP130 | 0000 |
| BNDOPT | 1610 | DF201R | 0436 | DF2M12 | 1257 | FAP150 | 0000 |
| BNVWFG | 5207 | DF201S | 1141 | DF2QPA | 1261 | FAP220 | 0000 |
| CALDEL | 0746 | DF202A | 0461 | DF2223 | 1262 | FAP230 | 0000 |
| CAM | 7621 | DE202B | 0504 | DF223A | 1565 | FAP240 | 0000 |
| CDI | 6203 | DF202C | 0527 | DF223M | 1564 | FAP320 | 0000 |
| CNVCAL | 0744 | DE202D | 0552 | DF3CLR | 1477 | FAP410 | 0000 |
| CNVEDQ | 0563 | DF202E | 0575 | DF3DBA | 1502 | FAP520 | 0000 |
| CNVFCD | 1676 | DE202F | 0620 | DF3ETX | 1503 | FARMDF | 0000 |
| CNVOPT | 1607 | DE202G | 0643 | DF3EVN | 1475 | FAUS01 | 0000 |
| DBENDQ | 1756 | DE202H | 0666 | DF3LP | 1461 | FBC205 | 0030 |
| DCENDQ | 1736 | DF202J | 0711 | DF3OUT | 1467 | FBP110 | 0000 |
| DDTEND | 2120 | DE202K | 0734 | DF3QPA | 1504 | FBP130 | 0000 |
| DELENG | 0023 | DF202L | 0757 | DF3600 | 1505 | FBP210 | 0020 |
| DENDPG | 1200 | DF202M | 1002 | DF3640 | 1506 | FBP220 | 0020 |
| DE1BF | 0501 | DF202N | 1025 | DF4CLR | 1362 | FBP230 | 0020 |
| DE1GNC | 0477 | DF202P | 1050 | DF4DBA | 1353 | FBP310 | 0010 |
| DE1LOP | 0450 | DF202Q | 1073 | DF4GFS | 1365 | FBP420 | 0030 |
| DE1MLG | 0503 | DE202R | 1116 | DF4GNC | 1366 | FBP430 | 0010 |
| DE1M23 | 0502 | DF221 | 0730 | DF4NGT | 1312 | FBP440 | 0020 |
| DE1NOB | 0470 | DE2213 | 0731 | DF4QPA | 1364 | FBP510 | 0010 |
| DE1NOR | 0464 | DE3BK | 1044 | DF4SLH | 1361 | FBP520 | 0010 |
| DE1QPA | 0475 | DE3FFS | 1056 | DF4SP | 1360 | FBP530 | 0010 |
| DE1RFT | 0466 | DF3GFS | 1064 | DF4ST1 | 1354 | FBP540 | 0010 |
| DE1SFS | 0476 | DE3G12 | 1050 | DF4ST2 | 1355 | FBP810 | 0040 |
| DE1SNC | 0500 | DF3LF1 | 1060 | DF4ST3 | 1356 | FBP820 | 0040 |
| FBP910 | 0030 | TAP153 | 2034 | TBP23J | 5324 | TDCFCD | 1701 |
| FCP110 | 0010 | TAP154 | 2062 | TBP23S | 4361 | TDCFSS | 1707 |
| FCP210 | 0010 | TAP212 | 0660 | TBP23X | 5601 | TDC010 | 3400 |
| FCP310 | 0010 | TAP223 | 1525 | TBP23Z | 6061 | TDC201 | 1717 |
| FCP410 | 0010 | TAP235 | 7400 | TBP31A | 4404 | TDC202 | 1737 |
| FCP550 | 0010 | TAP236 | 6637 | TBP31R | 5001 | TDC481 | 4201 |
| FCP610 | 0010 | TAP237 | 6042 | TBP315 | 3602 | TDC483 | 5001 |
| FDC480 | 0030 | TAP239 | 6531 | TBP422 | 0242 | TDC484 | 5401 |
| FDP120 | 0050 | TAP242 | 3600 | TBP423 | 0220 | TDC486 | 6001 |
| FDP130 | 0050 | TAP243 | 3604 | TBP424 | 0401 | TDC487 | 6601 |
| FDP210 | 0050 | TAP244 | 0000 | TBP425 | 0202 | TDD201 | 0001 |
| FDP230 | 0050 | TAP322 | 0747 | TBP431 | 5202 | TDD202 | 0461 |
| FDP310 | 0050 | TAP323 | 1001 | TBP432 | 5211 | TDP121 | 5202 |
| FDP320 | 0050 | TAP324 | 1021 | TBP434 | 5677 | TDP122 | 5405 |
| FDP330 | 0050 | TAP411 | 0600 | TBP437 | 6001 | TDP123 | 5242 |
| FDP340 | 0050 | TAP412 | 0606 | TBP438 | 6024 | TDP124 | 5535 |
| FDP410 | 0040 | TAP416 | 0367 | TBP44C | 7555 | TDP131 | 7202 |
| FDP420 | 0040 | TAP417 | 0702 | TBP44D | 6351 | TDP132 | 7401 |
| FDP430 | 0040 | TAP521 | 1602 | TBP44E | 6253 | TDP133 | 7311 |
| FDP440 | 0040 | TAP525 | 1656 | TBP44F | 7352 | TDP134 | 7460 |
| FDP450 | 0040 | TAP529 | 1742 | TBP44J | 7601 | TDP135 | 7463 |
| FDP460 | 0040 | TAP611 | 1755 | TBP44K | 7401 | TDP137 | 7357 |
| FDP470 | 0040 | TAP612 | 1765 | TBP44L | 7212 | TDP211 | 0402 |
| FDP490 | 0040 | TAR417 | 0400 | TBP44M | 7206 | TDP212 | 0601 |
| GETADR | 1601 | TAUS01 | 0200 | TBP44N | 7202 | TDP213 | 1001 |
| GETCDL | 0733 | TBCATL | 0210 | TBP44R | 7135 | TDP214 | 2122 |
| GETFCD | 1670 | TBCDAL | 0050 | TBP44U | 6414 | TDP221 | 0507 |
| GETFSS | 1642 | TBCFSP | 1565 | TBP44V | 7715 | TDP222 | 1201 |
| GETNCL | 1612 | TBCGFP | 1566 | TBP441 | 6241 | TDP223 | 1401 |
| GTAD01 | 1605 | TBC132 | 2727 | TBP451 | 7610 | TDP224 | 1265 |
| GTCD01 | 0741 | TBC205 | 2401 | TBP512 | 1265 | TDP231 | 1113 |
| GTENDQ | 0553 | TBC210 | 2445 | TBP521 | 2201 | TDP232 | 1130 |
| GTFQ01 | 0561 | TBD541 | 0711 | TBP522 | 2504 | TDP233 | 1141 |
| GTFC01 | 1674 | TBLBDF | 4401 | TBP523 | 2703 | TDP234 | 1144 |
| GTFS01 | 1650 | TBP111 | 2602 | TBP532 | 0522 | TDP235 | 1147 |
| GTNC01 | 1620 | TBP131 | 3235 | TBP533 | 0555 | TDP236 | 1070 |
| NEWFSS | 1653 | TBP132 | 3401 | TBP541 | 1103 | TDP31A | 3003 |
| PICKUP | 1510 | TBP211 | 4514 | TBP542 | 1154 | TDP31B | 2202 |
| SAVCDL | 0747 | TBP212 | 4001 | TBP551 | 2122 | TDP311 | 4511 |
| SAVFSS | 1654 | TBP213 | 4601 | TBP811 | 0202 | TDP312 | 3201 |
| SAVNCL | 1624 | TBP22F | 2563 | TBP821 | 1602 | TDP313 | 3602 |
| SVCD01 | 0757 | TBP22I | 1657 | TBP911 | 7610 | TDP314 | 2403 |
| SVFS01 | 1664 | TBP22L | 2001 | TBP919 | 7603 | TDP315 | 3401 |
| SVNC01 | 1635 | TBP22M | 2511 | TCP111 | 6202 | TDP316 | 4001 |
| TAC417 | 0265 | TBP22R | 3401 | TCP213 | 7023 | TDP317 | 4201 |
| TAD151 | 2042 | TBP22S | 2601 | TCP311 | 6401 | TDP319 | 3755 |
| TAD221 | 1561 | TBP22U | 2437 | TCP551 | 7124 | TDP32A | 6420 |
| TAD322 | 1072 | TBP22X | 0202 | TCP611 | 7201 | TDP32B | 6504 |
| TAP11B | 3472 | TBP221 | 1401 | TCP91X | 7335 | TDP321 | 6273 |
| TAP121 | 4400 | TBP222 | 1444 | TCP911 | 7266 | TDP322 | 6601 |

```
TAP129 2402    TBP223 1500    TCP912 7401    TDP323 7001
TAP131 4470    TBP224 1601    TCP913 7414    TDP324 6401
TAP134 4571    TBP226 0401    TCP914 7432    TDP325 6001
TAP151 2002    TBP229 3201    TDBFCD 1710    TDP326 6201
TAP152 2022    TBP23T 5143    TDBFSS 1716    TDP327 5623
----------------------------------------------------------
TDP328 6050    TDP492 3446    ZBCKLT 0111    ZKB23S 0172
TDP329 6112    TDP493 3462    ZBCPGN 0120    ZKB23X 0173
TDP331 4603    TDP511 0202    ZBCPG1 0115    ZKB23Z 0174
TDP332 5001    TDP512 0235    ZBCPTP 0114    ZKB31A 0156
TDP333 5077    TDP513 0243    ZDBNCL 0122    ZKB521 0175
TDP334 5137    TDP514 0277    ZDCCAN 0115    ZKB522 0176
TDP335 5161    TDP515 0341    ZDCCCL 0107    ZKB523 0177
TDP341 4401    TDP516 0347    ZDCCCR 0114    ZKCDF  0021
TDP342 4436    TDR001 5601    ZDCCCY 0110    ZKCDI  0023
TDP345 4143    TDZACI 5620    ZDCCDS 0103    ZKCIF  0022
TDP411 4043    TDZOAB 5605    ZDCCHS 0117    ZKC213 0135
TDP412 4201    TDZOCY 5617    ZDCCLN 0106    ZKC911 0173
TDP415 4430    TDZOSM 5602    ZDCCLT 0113    ZKD329 0156
TDP416 3741    TDZOTC 5604    ZDCCOS 0102    ZKD342 0136
TDP42A 0402    TD483E 6000    ZDCCSN 0107    ZKD345 0170
TDP42B 2043    TD487E 7600    ZDCCSP 0111    ZKD42A 0147
TDP42C 0711    WKLEAR 7300    ZDCCVB 0116    ZKD42B 0140
TDP42D 2011    WK4000 7330    ZDCDAT 0104    ZKD42C 0167
TDP42E 2025    WK5777 7352    ZDCDBF 0123    ZKD42F 0150
TDP42F 0601    WK6000 7333    ZDCDES 0101    ZKD42G 0135
TDP42G 2001    WK7775 7346    ZDCDTP 0103    ZKD421 0152
TDP42H 1757    WK7776 7344    ZDCFLD 0110    ZKD422 0153
TDP421 1143    WK7777 7340    ZDCFLG 0111    ZKD423 0154
TDP421 1401    WM0001 7340    ZDCFLN 0105    ZKD424 0176
TDP422 1201    WM0002 7344    ZDCLCU 0114    ZKD425 0177
TDP423 1606    WM0003 7346    ZDCNCL 0121    ZKD426 0155
TDP424 2212    WM2000 7333    ZDCNOL 0101    ZKD428 0151
TDP425 2231    WM2001 7352    ZDCOAN 0113    ZKD429 0162
TDP426 3001    WM4000 7330    ZDCOCK 0112    ZKD441 0141
TDP427 2201    WP0001 7301    ZDCPKS 0120    ZKD453 0142
TDP428 0460    WP0002 7305    ZDCPLN 0116    ZKD456 0143
TDP429 2401    WP0003 7325    ZDCPRS 0102    ZKD457 0144
TDP431 5401    WP0004 7307    ZDCPSC 0115    ZKD462 0145
TDP432 5430    WP0006 7327    ZDCSAD 0104    ZKD463 0146
TDP433 5601    WP0100 7203    ZDCTXS 0112    ZKD511 0130
TDP441 3055    WP2000 7332    ZKA151 0036    ZKD512 0131
TDP442 3201    WP3777 7350    ZKA152 0037    ZKD513 0132
TDP448 3225    ZARMDE 0133    ZKA153 0040    ZKD514 0133
TDP449 3142    ZAUT00 0010    ZKA154 0041    ZKD515 0134
TDP451 6202    ZAUT01 0011    ZKA322 0031    ZKD516 0137
TDP452 6242    ZAUT02 0012    ZKA323 0032    ZM0004 0074
TDP453 6601    ZAUT03 0013    ZKA324 0033    ZM0005 0042
TDP454 6401    ZAUT04 0014    ZKA416 0024    ZM0006 0043
TDP455 6646    ZAUT05 0015    ZKA417 0025    ZM0010 0044
TDP456 6717    ZAUT06 0016    ZKA521 0026    ZM0040 0045
TDP457 6467    ZAUT07 0017    ZKA525 0027    ZM0120 0046
TDP461 7201    ZBCALM 0105    ZKA529 0030    ZM0260 0047
TDP462 6330    ZBCAOM 0103    ZKB111 0035    ZP0003 0000
TDP463 7401    ZBCCIF 0110    ZKB213 0157    ZP0005 0050
TDP464 7601    ZBCDCM 0104    ZKB224 0166    ZP0006 0051
TDP471 6001    ZBCDHA 0102    ZKB221 0160    ZP0007 0052
TDP472 6032    ZBCDUN 0101    ZKB222 0161    ZP0010 0053
TDP473 6056    ZBCILA 0113    ZKB226 0163    ZP0017 0054
TDP474 5643    ZBCILF 0112    ZKB229 0164    ZP0020 0055
TDP491 3402    ZBCIVA 0122    ZKB23J 0171    ZP0037 0056
                                             ZP0040 0057
                                             ZP0060 0020
                                             ZP0070 0060
                                             ZP0077 0061
                                             ZP0100 0062
                                             ZP0120 0063
                                             ZP0177 0064
                                             ZP0200 0065
                                             ZP0260 0066
                                             ZP0377 0067
                                             ZP0777 0076
                                             ZP7000 0070
                                             ZP7400 0071
                                             ZP7600 0072
                                             ZP7700 0073
                                             ZP7777 0077
                                             ZVKCRL 0126
                                             ZWORK1 0004
                                             ZWORK2 0005
                                             ZWORK3 0006
                                             ZWORK4 0007

ERRORS DETECTED: 0
LINKS GENERATED: 0

ADJUST     828#   830    835    839
BNDCAL     315    326#   334
BNDFDO     198    203#
BNDFCD     886    890#
BNDOPT     800    805#
CALDEL     327#   329    333    336
CNVCAL     317    325#   337
CNVEDO     200    202#
```

| | | | | | | | | | | |
|---|---|---|---|---|---|---|---|---|---|---|
| CNVECD | 887 | 889# | | | | | | | | |
| CNVOPT | 802 | 804# | | | | | | | | |
| DBENDQ | 203 | 963# | | | | | | | | |
| DCENDQ | 202 | 942# | | | | | | | | |
| DDTEND | 894 | 971# | 972 | | | | | | | |
| DELENG | 142 | 1038 | 1040 | 1042 | 1044 | 1046 | 1048 | 1050 | 1052 | 1054 |
| | 1056 | 1058 | 1060 | 1062 | 1064 | 1066 | 1068 | 1094# | 1096 | 1098 |
| | 1100 | 1102 | 1104 | 1106 | 1108 | 1110 | 1112 | 1114 | 1116 | 1118 |
| | 1120 | 1122 | 1124 | | | | | | | |
| DENDPG | 1126 | 1128# | | | | | | | | |
| DE1BF | 80 | 128 | 140# | | | | | | | |
| DE1GNC | 84 | 138# | | | | | | | | |
| DE1LOP | 115# | 120 | | | | | | | | |
| DE1MLG | 113 | 142# | | | | | | | | |
| DE1M23 | 105 | 141# | | | | | | | | |
| DE1NOB | 83 | 131# | | | | | | | | |
| DE1NOR | 94 | 127# | | | | | | | | |
| DE1QPA | 88 | 136# | | | | | | | | |
| DE1RET | 126 | 129# | 135 | | | | | | | |
| DE1SFS | 125 | 137# | | | | | | | | |
| DE1SNC | 96 | 139# | | | | | | | | |
| DE1SPG | 123 | 143# | | | | | | | | |
| DE2BF | 219 | 294 | 302# | | | | | | | |
| DE2D1S | 287 | 291# | | | | | | | | |
| DE2FD | 253# | | | | | | | | | |
| DE2GFD | 280 | 301# | | | | | | | | |
| DE2GNC | 223 | 298# | | | | | | | | |
| DE2LOP | 238# | 252 | | | | | | | | |
| DE2LP2 | 259# | 266 | | | | | | | | |
| DE2NFD | 241 | 293# | | | | | | | | |
| DE2NOB | 222 | 277# | | | | | | | | |
| DE2OUT | 262 | 267# | | | | | | | | |
| DE2QPA | 227 | 297# | | | | | | | | |
| DE2RET | 276 | 292 | 295# | | | | | | | |
| DE2SFS | 275 | 300# | | | | | | | | |
| DE2SNC | 270 | 299# | | | | | | | | |
| DE201A | 927 | 1012 | 1018# | 1038 | | | | | | |
| DE201B | 928 | 1039# | | | | | | | | |
| DE201C | 929 | 1041# | | | | | | | | |
| DE201D | 930 | 1043# | | | | | | | | |
| DE201E | 931 | 1045# | | | | | | | | |
| DE201F | 932 | 1047# | | | | | | | | |
| DE201G | 933 | 1049# | | | | | | | | |
| DE201H | 934 | 1051# | | | | | | | | |
| DE201J | 935 | 1053# | | | | | | | | |
| DE201K | 936 | 1055# | | | | | | | | |
| DE201L | 937 | 1057# | | | | | | | | |
| DE201M | 938 | 1059# | | | | | | | | |
| DE201N | 939 | 1061# | | | | | | | | |
| DE201P | 940 | 1063# | | | | | | | | |
| DE201Q | 941 | 1065# | | | | | | | | |
| DE201R | 942 | 1067# | | | | | | | | |
| DE201S | 1012 | 1125# | 1126 | | | | | | | |
| DE202A | 948 | 1074# | 1094 | | | | | | | |
| DE202B | 949 | 1095# | | | | | | | | |
| DE202C | 950 | 1097# | | | | | | | | |
| DE202D | 951 | 1099# | | | | | | | | |
| DE202E | 952 | 1101# | | | | | | | | |
| DE202F | 953 | 1103# | | | | | | | | |
| DE202G | 954 | 1105# | | | | | | | | |
| DE202H | 955 | 1107# | | | | | | | | |
| DE202J | 956 | 1109# | | | | | | | | |
| DE202K | 957 | 1111# | | | | | | | | |
| DE202L | 958 | 1113# | | | | | | | | |
| DE202M | 959 | 1115# | | | | | | | | |
| DE202N | 960 | 1117# | | | | | | | | |
| DE202P | 961 | 1119# | | | | | | | | |
| DE202Q | 962 | 1121# | | | | | | | | |
| DE202R | 963 | 1123# | | | | | | | | |
| DE221 | 291 | 303# | | | | | | | | |
| DE2213 | 273 | 304# | | | | | | | | |
| DE3BK | 381 | 387# | | | | | | | | |
| DE3FFS | 386 | 397# | | | | | | | | |
| DE3GFS | 382 | 397 | 403# | | | | | | | |
| DE3G12 | 373 | 391# | | | | | | | | |
| DE3LE1 | 378 | 399# | | | | | | | | |
| DE3MOV | 357 | 361# | 390 | | | | | | | |
| DE3M12 | 371 | 404# | | | | | | | | |
| DE3QPA | 374 | 399 | 402# | | | | | | | |
| DE3RET | 396 | 400# | | | | | | | | |
| DFA319 | 993 | 997# | | | | | | | | |
| DFBDF | 557 | 561 | 630 | 632 | 721 | 969# | | | | |
| DFCLP | 749# | 752 | | | | | | | | |
| DFCLR | 639 | 663 | 701 | 739# | 757 | | | | | |
| DFCLS | 744 | 747# | | | | | | | | |
| DFCSP | 749 | 758# | | | | | | | | |
| DFDADD | 767 | 778# | | | | | | | | |
| DFDISP | 688 | 719 | 765# | 770 | 779 | | | | | |
| DFFIX | 552 | 640# | 722 | | | | | | | |
| DFNLFT | 755 | 759# | | | | | | | | |
| DF1ADR | 152# | 171 | 172 | 177 | | | | | | |
| DF1DON | 156 | 187# | | | | | | | | |
| DF1GFD | 154 | 184# | | | | | | | | |
| DF1GFS | 159 | 164 | 183# | | | | | | | |

```
DF1GNC     174    186#
DF1GT      163    166#
DF1QPA     169    185#
DF1222     167    180#
DF1223     173    178    181#
DF1224     168    182#
DF14RO     999   1003#
DF14SA     987   1001#
DF2DBA     520    557#
DF2DSP     534    547    552#
DF2GNC     522    564#
DF2LP      531#   551
DF2M12     545    563#
DF2QPA     526    565#
DF2223     549    566#
DF223A     566    786#   790
DF223M     742    768    785#   787    789
DF3CLR     662    718#
DF3DBA     687    716    721#   745
DF3ETX     718    722#
DF3EVN     712    716#
DF3LP      704#   709
DF3OUT     706    710#
DF3QPA     658    723#
DF3600     669    724#
DF3640     702    725#
DF4CLR     578    639#
DF4DBA     579    632#
DF4GFS     585    642#
DF4GNC     602    618    643#
DF4NGT     588    599#
DF4QPA     582    641#
DF4SLB     616    638#
DF4SP      611    637#
DF4ST1     589    633#
DF4ST2     591    634#
DF4ST3     593    635#
DF4ST4     595    636#
DF4TMP     576#   584    586
DG0ISP     450#   467    475    483    490
DG1GFS     444    494#
DG2QPA     460    481    495#
DG6DBA     426    492#
DG6DUN     433    491#
DG6GFD     431    493#
DG6RET     447    453#   464
DG6TAB     421    497#
DG6TMP     418#   443    445    459    462
DG6222     452    496#
DL16SA    1001
DPGEND     972   1009#
D21END      62    893#
FBP220     133    555    623    771
FBP420     453
FDP210      60     81    122    220    366    540    670
FDP420     605    620
FDP490     129    295
GETADR     136    185    297    402    495    565    641    723    797#   803
GETCDL     283    311#   316    318
GETFCD     184    301    493    883#   888
GETFSS     183    403    494    642    849#   854    856
GETNCL     138    186    298    564    643    813#   820
GTAD01     802#
GTCD01     314    317#
GTENDG      91    194#   201
GTEQ01     197    200#
GTFC01     887#
GTFS01     852    855#
GTNC01     816    819#
NEWFSS     864#   866    870    873
PICKUP     676    678    680    707    713    729#   733
SAVCDL     256    328#   335    338
SAVFSS     137    300    865#   872    875
SAVNCL     139    299    829#   837    841
SVCD01     332    336#
SVFS01     869    873#
SVNC01     833    838#
TBLBDF     140    302
TDBFCD     890    912#
TDBFSS     853    871    921#
TDCFCD     889    890    898#
TDCFSS     855    874    907#
TDC201     325    804    805    898    899    900    901    902    903    907
           927#
TDC202     326    805    912    913    914    915    916    917    921    948#
TDD201    1019#
TDD202    1075#
TDP211      77#   130
TDP212     216#   296
TDP213     143    304    352#   355    358    379    388    391    400    401
           472    488
TDP214     986#  1000
TDP221     131    153#   179    303
TDP222     180    496    517#   562
```

```
TDP223      181    656#   695    720    788
TDP224      182    577#   631
TDP231      442#   498
TDP232      459#   499
TDP233      472#   500
TDP234      480#   501
TDP235      488#   502
TDP236      419#   454
TDP319      997
*KLEAR      112
*M0001       78    217    271    288    465    554    624    772    994
*P0001      429    597
*P0002      103    132
*P0006      110    277
ZAUT00      114    119    525    528    530    532
ZAUT01      254    263    671    672    679    681    682    683    684    686
            703    708    715    748
ZAUT02      675    731
ZAUT06      521    553    746    747    750    753
ZAUT07      580    590    592    594    596    600    601    612    617    622
            741    751    754    756
ZBCDUA      492
ZBCDUN      187    491
ZDBNCL      817    834    836
ZDCDUF      195    312    330    430    798    814    831    850    867    884
ZDCNCL      819    838    840
ZKB226      996
ZKB226      556    625    773
ZKB229      134
ZKB522      992
ZKD345      988
ZKD42A      606    621
ZKD515      104    111    235    278
ZKD516      115
ZM0010      740
ZP0005      599
ZP0007      234
ZP0010      244    427    673
ZP0077      101    619    669
ZP0100       95
ZP7700       85    175    224    269    367    523    541    603    609    615
            692    714
ZP7777      170    228    527
ZWORK1       87     89     90     92     97    121    158    161    165    166
            226    231    233    239    260    279    281    282    285    289
            290    353    359    360    362    376    384    387    389    395
            422    423    424    437    518    531    536    548    550
ZWORK2       98    100    109    116    118    237    250    354    361    369
            370    519    535    543    544
ZWORK3      102    107    246    248    258    267    363    365    537    539
            657    660    664    665    667    674    690
ZWORK4      229    230    238    242    245    253    255    257    259    264
            265    268    272    435    436    448    450    451    466    698
            704

V5A

            / DP3156.88
            /
            /       %%%%%%%%%%%%%%%%%%%%%%%%%%%%%%%%%%%%%%%%%%%%%%%%%%%%%%%%%%%%%%
            /       %                                                            %
            /       %                         PROPRIETARY.                       %
            /       %                                                            %
            /       %  THIS DOCUMENT CONTAINS INFORMATION PROPRIETARY TO         %
            /       %  REUTERS LIMITED AND IS NOT TO BE REPRODUCED AND/OR        %
            /       %  USED IN WHOLE OR IN PART WITHOUT THE EXPRESS WRITTEN      %
            /       %  PERMISSION OF REUTERS LIMITED.                            %
            /       %                                                            %
            /       %%%%%%%%%%%%%%%%%%%%%%%%%%%%%%%%%%%%%%%%%%%%%%%%%%%%%%%%%%%%%%
            /
            /

            /
            /       MODULE  MAPB50.8B 27-OCT-80
            /       SYSTEM MAP FILE
            /
            /       MODULE MAPC50.8B 22-JAN-81
            /       CONVERSATIONS MAP FILE
            /
            /       MODULE FCF050.8B 16-JAN-80
            /       FIXED PAGE ZERO CONSTANTS AND COMMON DATA EQUATES FIELD 4 & 5
```

```
                  ////////////////////////////////////////////////////////
                  /  COMPONENT:   CONNECTION CONTROL AND FIELD 5 MISC    /
                  /               DP3156.8B                              /
                  /                                                      /
                  /  VERSION:     1                                      /
                  /                                                      /
                  /  DATE:        MAY 1979                               /
                  /  AUTHOR:      J.DOCHERTY                             /
                  /                                                      /
                  /  COMPRISES:   TDP318 SET UP DIALOGUE DISPLAY         /
                  /               TDP314 ACCEPT                          /
                  /               TDP31A START UP DIALOGUE STORAGE       /
                  /               TDP312 CONTACT REQUEST                 /
                  /               TDP315 CONNECT REQUEST RECIEVED        /
                  /               TDP313 CONTACT REPLY RECIEVED          /
                  /               TDP319 CONTACT REPLY FAILED            /
                  /               TDP316 CONNECT REPLY RECIEVED          /
                  /               TDP345 CALCULATE PORT                  /
                  /               TDP317 CONNECT FAILED                  /
                  /               TDP31C LOCAL DEQUEUE CALL              /
                  /               TDP318 CONNECTION O.K?                 /
                  /               TDP341 CONVERSATIONS CONTROL           /
                  /               TDP342 RETURN DIALOGUE BUFFER CHAIN    /
                  /               TDP311 CONTACT                         /
                  ////////////////////////////////////////////////////////


                  / MODIFIED RJA 17-JUL-80 TDP316 'FORM AND SEND CALL ACCEPTED RECORD' CODE
                  / TURNED INTO A SUBROUTINE ; TDP317 CODE MOVED TO 'FAILURE' COMPONENT DP1351
                  / AND REPLACED BY CODE TO CHECK THE REASON FOR CONNECT REJECT, TO DECIDE
                  / WHETHER TO SEND 'ACCEPT' IN ADDITION TO THE PRESENT FAILURE ACTION. (THIS
                  / IS TO TELL THE SVC FACILITY TO ADJUST ITS QUEUE LEVELS WHEN THE REASON IS
                  / OTHER THAN 'REJECTED BY REMOTE TC')

                  / MODIFIED RJA 26-SEP-80 TDP317 CHANGED TO SIMPLY INTERFACE TO TDP137 WHICH
                  / IS ALSO CHANGED TO SEND 'ACCEPT' UNCONDITIONALLY

                  / MODIFIED RJA 29-OCT-80 ENSURE PROPER DISPLAY OF CN2 TXFER CALLS
                  / ALSO RESET DIALOGUE TIMEOUT TO AVOID ERRONEOUS 'CONNECTION LOST'


                  / MODIFIED AKM 19-NOV-80 TDP31C USE LOCAL WORK AREA TO SAVE MESSAGE
                  / SUPERVISOR CONTROL DATA RATHER THAN ZWORK1-4

                  / MODIFIED RJA 4-DEC-80 TDP313 CALL TDP319 DIRECT (SAME PAGE).TDP319 GET
                  / CURRENT DESK FROM FIELD 2 RATHER THAN ZDCDES


                  / MODIFIED RJA 22-JAN-81 TDP317 (AGAIN) CHECK REASON FOR REJECT AND
                  / ROUTE TO NEW MODULE TDP214 IF REASON IS 'REJECTED BY FAR TC' (RANG OFF)
                  ////////////////////////////////////////////////////////
                  /                                                      /
                  /   MODULE:  TDP318  SET UP DIALOGUE DISPLAY           /
                  /                                                      /
                  /   FUNCTION:   WHEN CONTACT OR CONNECTION ESTABLISHED /
                  /               MAY CHANGE OPERATOR MODE TO MODE OF    /
                  /               DIALOGUE AND/OR DISPLAY THE CONVERSATION/
                  /               AND APPLICATION STATUS                 /
                  /                                                      /
                  /   INPUT PARAMETERS:   NONE                           /
                  /                                                      /
                  /   CALLED BY TDP313 (CONTACT REPLY RECEIVED)          /
                  /             TDP316 (CONNECT REPLY RECEIVED)          /
                  /                                                      /
                  ////////////////////////////////////////////////////////

             0005          FIELD   5
             2200          *2200
      52200  2400          0^4000+DLCEND-TDP318+2  /*ELEMENT:TYPE 0:SIZE DLCEND-TDP318+2
      52201  7401          1-1^2+7401              /*1 VARIABLE LOCATIONS FOLLOW

      52202  0000  TDP318, .-.
      52203  1111          TAD     ZDCCSP          / IF PAYER IS COUNTERPARTY
      52204  7700          SMA CLA                 / (I.E TDJPAY IN TDC019 SET)
      52205  5225          JMP     DL18J1
      52206  1306          TAD     DL18K1          / SET UP MQ FOR CALL OF HEADING LINE
      52207  7421          MQL
      52210  7340          *M0001
      52211  6242          CIF     40              / GET DEALER IN HEADING LINE
      52212  4540          JMS  I  ZKD428
      52213  7403          2-1^2+7401              /*2 VARIABLE LOCATIONS FOLLOW
      52214  0000  DL18CD, 0
      52215  0000  DL18AD, 0
      52216  7300          *CLEAR
      52217  1214          TAD     DL18CD          / GET INTO HEADING LINE FIELD
      52220  3222          DCA     DL18C1
      52221  7401          1-1^2+7401              /*1 VARIABLE LOCATIONS FOLLOW
      52222  0000  DL18C1, 0
      52223  1303          TAD     DL4040          / HEADING LINE
      52224  3615          DCA  I  DL18AD
      52225  6221  DL18J1, CDF     20
      52226  1702          TAD  I  DL18CM
      52227  0061          AND     ZP0077
```

```
52230  1042              TAD       ZM0005
52231  7640              SZA!CLA
52232  5246              JMP       DL1BJ3          / CN1 SO DISPLAY
52233  1702              TAD  I    DL1BCM
52234  7041              CIA
52235  1304              TAD       DL1A55
52236  7650              SNA!CLA
52237  5246              JMP       DL1BJ3          / CN2,DISP CN2 SO DISPLAY
52240  1702              TAD  I    DL1BCM
52241  0073              AND       ZP7700
52242  7640              SZA!CLA
52243  5252              JMP       DL1BJ4          / DISP IN USE OTHER MODE - NO DISPLAY
52244  1304              TAD       DL1A55
52245  3702              DCA  I    DL1BCM          / DISP BLANK,SET CN2 AND DISPLAY
52246  6251    DL1BJ3,   CDF       50              /
52247  6242              CIF       40              /
52250  4555              JMS  I    ZKD426          / DISPLAY CONVERSATION
52251  5255              JMP       DL1BJ5          / GO UNLOCK THE KEYBOARD
52252  6251    DL1BJ4,   CDF       50              /
52253  6242              CIF       40              /
52254  4562              JMS  I    ZKD429          / UPDATE APPLN STATUS ONLY
52255  4705    DL1BJ5,   JMS  I    DL1BMB          / SWAP IN CNV MODE BLOCK
52256  6222              CIF       20
52257  4572              JMS  I    ZKB23S          / UNLOCK THE KEYBOARD
52260  5602              JMP  I    TDP31B          / EXIT

                / SR TO AMEND MODE AND PREPARE FOR DIALOGUE DISPLAY
52261  7401              1-1^2+7401                /*1 VARIABLE LOCATIONS FOLLOW
52262  0060    DL31BS,   .-.
52263  1101              TAD       ZDCDES
52264  0061              AND       ZP0077
52265  6222              CIF       20
52266  4573              JMS  I    ZKB23X          / AMEND MODE TO DIALOGUE
52267  7300              WKLEAR
52270  1101              TAD       ZDCDES
52271  0061              AND       ZP0077
52272  1042              TAD       ZM0005
52273  7640              SZA!CLA
52274  5662              JMP  I    DL31BS
52275  6221              CDF       20
52276  1304              TAD       DL1A55          / CN2 - SET DISPLAY MODE CN2
52277  3702              DCA  I    DL1BCM
52300  6251              CDF       50
52301  5662              JMP  I    DL31BS
52302  0104    DL1BCM,   ZBCDCM
52303  4040    DL4040,   4040                      / K=VALUE FOR DEALER
52304  0505    DL1A55,   505                       / K=POSSIBLE VALUE FOR ZBCDCM
52305  4163    DL1BMB,   DLSCMB                    / LINK TO SWAP IN CNV MODE BLOCK
52306  0012    DL1PK1,   12                        / CONSTANT
                /= LOCAL SUBROUTINE FOR TDP313 TO DISTRIBUTE SOME OF THE DATA FROM CONTACT
                /= REPLY RECORD AND SET SECONDARY STATUS TO CONTACT REPLY RECEIVED
                /

52307  7401              1-1^2+7401                /*1 VARIABLE LOCATIONS FOLLOW
52310  0000    DLSTHD,   .-.
52311  7301              *P0001                    / SET SECONDARY STATUS TO CONTACT
52312  3103              DCA       ZDCCDS          /  REPLY RECEIVED
52313  7344              *M0002
52314  3014              DCA       ZAUTO4          / SET UP A LOOP COUNTER
52315  4537              JMS  I    ZKD516          / PICK UP NEXT 3 WORDS OF RECORD
52316  1111              TAD       ZDCCSP
52317  3111              DCA       ZDCCSP
52320  4537              JMS  I    ZKD516
52321  3115              DCA       ZDCCAN
52322  4537              JMS  I    ZKD516
52323  3113              DCA       ZDCDAN
52324  4537              JMS  I    ZKD516
52325  3110              DCA       ZDCCCY
52326  7325              *P0003
52327  1775    DLSTJ0,   TAD  I    DLSTH2          / SET UP DEPOSIT ADDRESS
52330  3004              DCA       ZWORK1
52331  7344              *M0002
52332  3011              DCA       ZAUTO1
52333  1774              TAD  I    DLSTH1          / SET UP CDF TO HEADING LINE
52334  3337              DCA       DLSTC1
52335  4537    DLSTJ1,   JMS  I    ZKD516          / PICK UP SUBSCRIBER MNEMONIC
52336  7401              1-1^2+7401                /*1 VARIABLE LOCATIONS FOLLOW
52337  0000    DLSTC1,   0
52340  3404              DCA  I    ZWORK1
52341  2004              ISZ       ZWORK1
52342  2011              ISZ       ZAUTO1
52343  5335              JMP       DLSTJ1
52344  7307              *P0004                    / FIRST TIME HERE LOOP BACK
52345  1055              TAD       ZP0020          / TO STORE TIME INFO.
52346  6251              CDF       50
52347  2014              ISZ       ZAUTO4
52350  5327              JMP       DLSTJ0          / LOOP BACK IF REQUIRED
52351  1376              TAD       DLSTK1
52352  3010              DCA       ZAUTO0          / STORE POINTER TO START OF DATE WORDS
52353  4537              JMS  I    ZKD516          / PICK UP AND STORE 3 DATE WORDS
52354  3410              DCA  I    ZAUTO0
52355  4537              JMS  I    ZKD516
52356  3410              DCA  I    ZAUTO0
```

```
52357  4537          JMS  I  ZKD516
52360  3410          DCA  I  ZAUTO0
52361  1050          TAD     ZP0005
52362  1775          TAD  I  DLSTH2
52363  3004          DCA     ZWORK1
52364  1774          TAD  I  DLSTH1
52365  3370          DCA     DLSTC2
52366  4537          JMS  I  ZKD516           / PICK UP DEALER INFO
52367  7401          1-1^2+7401               /*1 VARIABLE LOCATIONS FOLLOW
52370  0000  DLSTC2, 0
52371  3404          DCA  I  ZWORK1           / AND STORE IN HEADER LINE
52372  6251          CDF     50
52373  5710  DLSTEX, JMP  I  DLSTHD

52374  3701  DLSTH1, DL13H1
52375  3702  DLSTH2, DL13H2
52376  0057  DLSTK1, ZDCDAT-1-24
             ///////////////////////////////////////////////////////
             /                                                     /
             /   MODULE:  TDP314  ACCEPT ROUTINE                   /
             /                                                     /
             /   FUNCTION:    VALIDATES AND ACTIONS AN OPERATOR    /
             /                REQUEST TO ACCEPT A CALL IN HIS QUEUE  /
             /                                                     /
             /   INPUT PARAMETERS:    NONE                         /
             /                                                     /
             /   CALLED FROM TDP341 (CONVERSATIONS CONTROL)        /
             /                                                     /
             ///////////////////////////////////////////////////////

52377  0000          ZBLOCK  .+200&7600-.     /*ZERO FILL PAGE
52400  7405          3-1^2+7401               /*3 VARIABLE LOCATIONS FOLLOW
52401  0000  DL14CH, 0                        / CHARACTER IN INSERT LINE
52402  0000  DL14LN, 0                        / LENGTH OF INSERT LINE

52403  0000  TDP314, .-.
52404  4764          JMS  I  D14318           / CONNECTION O.K.?
52405  7401          1-1^2+7401               /*1 VARIABLE LOCATIONS FOLLOW
52406  0000  DL14I1, 0                        / MODE TO BE USED
52407  7440          SZA                      / CHECK MESSAGE INDEX (NON ZERO = ERROR)
52410  5354          JMP     DL14J5           / GO TO ERROR HANDLING
52411  6221          CDF     20               / IF MESSAGE INDEX ZERO
52412  1773          TAD  I  DL14K5           / SET DESK UNIT NUMBER
52413  3304          DCA     DL14S1           / PARAMETER FOR TBP213
52414  1767          TAD  I  DL14K2           / GET INSERT LINE FIELD
52415  1021          TAD     ZKCDF
52416  3222          DCA     DL14C1           / CREATE CDF TO INSERT LINE
52417  1770          TAD  I  DL14K3           / GET START OF INSERT LINE BUFFER
52420  3011          DCA     ZAUTO1
52421  7401          1-1^2+7401               /*1 VARIABLE LOCATIONS FOLLOW
52422  0000  DL14C1, 0
52423  1411          TAD  I  ZAUTO1
52424  3202          DCA     DL14LN           / STORE INSERT LINE LENGTH
52425  1411          TAD  I  ZAUTO1
52426  0073          AND     ZP7700
52427  7002          BSW                      / STORE FIRST INSERT LINE CHAR
52430  3201          DCA     DL14CH
52431  6251          CDF     50
52432  7340          WM0001                   / CHECK LENGTH OF INSERT LINE
52433  1202          TAD     DL14LN
52434  7650          SNA CLA
52435  5240          JMP     DL14J1
52436  7305          WP0002                   / ERROR EXIT DISPLAYING "INVALID SYNTAX"
52437  5354          JMP     DL14J5           / IF LENGTH NOT 1.
52440  1371  DL14J1, TAD     DL14K4           / SET START OF CNV Q INDEX
52441  3010          DCA     ZAUTO0
52442  1123          TAD     ZDCDBF           / GET CNV/CNB FLAG
52443  7650          SNA CLA                  / BONDS ?
52444  5252          JMP     DL14J6           / NO
52445  1055          TAD     ZP0020           / YES - SET START OF CNB Q INDEX
52446  1010          TAD     ZAUTO0
52447  3010          DCA     ZAUTO0
52450  1122          TAD     ZDBNCL           / GET NO OF CALLS/LEFT MSGS FOR CNB
52451  7410          SKP
52452  1121  DL14J6, TAD     ZDCNCL           / GET NO OF CALLS/LEFT MSGS FOR CNV
52453  0073          AND     ZP7700           / MASK OUT LEFT MSGS
52454  7002          BSW                      / LEAVING NO OF CALLS
52455  7040          CMA                      /
52456  3004          DCA     ZWORK1           / -VE NO OF CALLS
52457  2004  DL14J2, ISZ     ZWORK1           / END OF Q ?
52460  5263          JMP     DL14J4
52461  7307          WP0004                   / ERROR EXIT DISPLAYING "UNKNOWN"
52462  5354          JMP     DL14J5
52463  1410  DL14J4, TAD  I  ZAUTO0
52464  3005          DCA     ZWORK2
52465  6261          CDF     60
52466  1405          TAD  I  ZWORK2           / SEARCH Q FOR ENTRY
52467  6251          CDF     50
52470  0061          AND     ZP0077           / CORRESPONDING TO INPUT
52471  7041          CIA
52472  1201          TAD     DL14CH
52473  7640          SZA CLA
52474  5257          JMP     DL14J2
```

```
52475  1010  DL14J3, TAD     ZAUTO0
52476  3337          DCA     DL1402
52477  1206          TAD     DL1411
52500  3305          DCA     DL14S2              / MODE = 475
52501  6222          CIF     20
52502  4557          JMS  I  ZKB213              / SWAP IN DESK UNIT AND MODE CONTROL BLOCK
52503  7403          2-1^2+7401                  /*2 VARIABLE LOCATIONS FOLLOW
52504  0000  DL14S1, 0                           / DESK UNIT
52505  0000  DL14S2, 0                           / MODE
52506  7300          WKLEAR
52507  6242          CIF     40                  / SWAP IN CONVERSATION CONTROL
52510  4567          JMS  I  ZKD42C              / BLOCK FOR MODE RETURNED
52511  4765          JMS  I  DL14SC              / GET TWO DIALOGUE BUFFERS AND
                                                 / SPACE FILL HEADING LINE
52512  4530          JMS  I  ZKD511              / GET BUFFER AND SET UP INITIAL CONNECT REQUEST VALUES
52513  0034          34                          / LENGTH
52514  0300          300                         / TYPE
52515  0006          6                           / LENGTH NON-PACKED DATA
52516  0000          0                           / VALIDITY
52517  7777          -1
52520  4774          JMS  I  DL14CR              / ALLOCATE CONV REF NO
52521  1737          TAD  I  DL14D2              / PASS START ADDRESS TO
                                                 / LOCAL ROUTINE FOR DATA SHEET HANDLING
52522  4766          JMS  I  DL14SB              / LOCAL ROUTINE CALL
52523  3004          DCA     ZWORK1              / SAVE RETURNED INTEREST MESSAGE LENGTH
52524  6212          CIF     10
52525  4535          JMS  I  ZKC213              / GET INSERT LINE BUFFER
52526  4763          JMS  I  DL14BS              / AMEND MODE AND PREPARE FOR DISPLAY
52527  7307          WP0004
52530  1737          TAD  I  DL14D2
52531  1053          TAD     ZP0010              / POINT AT INTEREST MESSAGE TEXT
52532  3337          DCA     DL14D2
52533  1004          TAD     ZWORK1
52534  4762          JMS  I  D1431A              / START UP DIALOGUE STORAGE
52535  7403          2-1^2+7401                  /*2 VARIABLE LOCATIONS FOLLOW
52536  6261          CDF     60
52537  0000  DL1402, 0
52540  7346          WM0003
52541  1206          TAD     DL1411
52542  3004          DCA     ZWORK1
52543  6221          CDF     20
52544  1772          TAD  I  DL14K6              / ADJUST ZBCALM TO
52545  7002          BSW                         / REFLECT MODE CN1 OR CN2
52546  1004          TAD     ZWORK1
52547  7002          BSW
52550  3772          DCA  I  DL14K6
52551  6251          CDF     50
52552  4761          JMS  I  D1431C              / LOCALLY DEQUEUE CALL
52553  5603          JMP  I  TDP314              / NORMAL EXIT
52554  6222  DL14J5, CIF     20
52555  4566          JMS  I  ZKB22L              / DISPLAY MESSAGE INDEXED BY ACC.
52556  6222          CIF     20
52557  4572          JMS  I  ZKB23S              / UNLOCK KEYBOARD
52560  5603          JMP  I  TOP314              / ERROR EXIT

52561  4224  D1431C, TDP31C                      / LINK TO LOCAL DEQUEUE CALL ROUTINE
52562  3003  D1431A, TDP31A                      / LINK TO START UP DIALOGUE STORAGE ROUTINE
52563  2262  DL14BS, DL31BS                      / A= AMEND MODE ETC
52564  4306  D1431B, TDP31B                      / LINK TO CONNECTION O.K.? ROUTINE
52565  3337  DL14SC, DLCNSB                      / LINK TO HEADING LINE INIT ROUTINE
52566  2602  DL14SB, DL14SO                      / LINK TO LOCAL ROUTINE
52567  0112  DL14K2, ZBCILF                      / INSERT LINE FIELD
52570  0113  DL14K3, ZBCILA                      / INSERT LINE ADDRESS
52571  1716  DL14K4, TDC201-1                    / A= CALL DESCRIPTOR ENTRIES
52572  0105  DL14K6, ZBCALM                      / DESK UNIT MODE
52573  0101  DL14K5, ZBCDUN                      / DESK UNIT NUMBER
52574  4566  DL14CR, DLCNCR                      / LINK TO ALLOC CONV REF NO ROUTINE
             /
             /= LOCAL SUBROUTINE CALLED BY TDP314(ACCEPT) TO PERFORM THE
             /= MAIN DATA MOVEMENT FUNCTIONS OF THAT ROUTINE. DATA MOVEMENTS
             /= INCLUDE DISTRIBUTING DATA FROM THE RELEVANT CALLS QUEUE ENTRY,
             /= FORMING A CONNECT REQUEST RECORD AND A CALL ACCEPTED RECORD.
             /= THE ACC. IS USED TO RETURN THE LENGTH OF THE INTEREST MESSAGE

52575  0000          ZBLOCK  .+200&7600-.        /*ZERO FILL PAGE
52600  7403          2-1^2+7401                  /*2 VARIABLE LOCATIONS FOLLOW
52601  0000  DL14TP, 0                           / 1 WORK LOCATION

52602  0000  DL14SO, .-.
52603  3201          DCA     DL14TP              / STORE ADDRESS OF CALLS QUEUE ENTRY
52604  1042          TAD     ZP0005
52605  1012          TAD     ZAUTO2
52606  3012          DCA     ZAUTO2
52607  1363          TAD     DL1444              / SET UP DATA LENGTH WORD (APPL. REC. LENGTH+10)
52610  4531          JMS  I  ZKD512
52611  7307          WP0004                      / ADJUST ZAUTO2 TO INDICATE CONV. REF. WORD
52612  1012          TAD     ZAUTO2
52613  3012          DCA     ZAUTO2
52614  4531          JMS  I  ZKD512
52615  1112          TAD     ZBCOCR              / STORE CRV REF
52616  4531          JMS  I  ZKD512
52617  1361          TAD     DL14KB              / SET UP LOOP COUNT
52620  3005          DCA     ZWORK2
52621  1362          TAD     DL14TC              / SET UP COPY LOOP
```

```
52622  3015            DCA      ZAUT05       / START ADDRESS
52623  1415  DLF5J1,   TAD  I   ZAUT05       / COPY LOOP
52624  4531            JMS  I   ZKD512
52625  2005            ISZ      ZWORK2
52626  5223            JMP      DLF5J1
52627  1762            TAD  I   DL14TC       / STORE COUNTERPARTY TC/DU
52630  1020            TAD      ZP0060
52631  7002            BSW
52632  1770            TAD  I   DLSBDU
52633  1020            TAD      ZP0060
52634  4531            JMS  I   ZKD512
52635  7340            WM0001                / ADDRESS TO INDICATE THE LENGTH BYTE
52636  1261            TAD      DL14TP       / OF THE SUBSCRIBER COMMS RECORD
52637  3016            DCA      ZAUT06       / SET UP THE DATA RETRIEVER TO
52640  1367            TAD      DL14CP       / INDICATE THE APPROPRIATE CALLS
52641  3766            DCA  I   DLSBDR       / QUEUE ENTRY
52642  4773            JMS  I   DL14RT
52643  3201            DCA      DL14TP       / STORE LENGTH OF INTEREST MESSAGE
52644  1053            TAD      ZP0010       / FOR CALL OF TDP31A IN MAIN ROUTINE
52645  4531            JMS  I   ZKD512       / SET UP SUBSCRIBER COMMS LENGTH AND
52646  1363            TAD      DL1444       / TYPE
52647  4531            JMS  I   ZKD512       / RETRIEVE AND
52650  4773            JMS  I   DL14RT       / DEPOSIT DESTINATION PORT
52651  4531            JMS  I   ZKD512       / RETRIEVE AND DEPOSIT
52652  4773            JMS  I   DL14RT       / DESTINATION CONVERSATIONAL REF.
52653  3114            DCA      ZDCCCR       / STORE ALSO ON PAGE ZERO
52654  1114            TAD      ZDCCCR
52655  4531            JMS  I   ZKD512       / PUT NULLS IN NEXT TWO WORDS
52656  4531            JMS  I   ZKD512
52657  4531            JMS  I   ZKD512
52660  4570            JMS  I   ZKD345       / CALL CALCULATE PORT ROUTINE
52661  4531            JMS  I   ZKD512       / STORE OWN PORT
52662  1112            TAD      ZDCOCR
52663  4531            JMS  I   ZKD512       / STORE OWN CONVERSATIONAL REF.
52664  1051            TAD      ZP0006       / SET UP APPLICATION HEADER
52665  4531            JMS  I   ZKD512       / LENGTH AND TYPE
52666  7301            WP0001
52667  1055            TAD      ZP0020
52670  4531            JMS  I   ZKD512       / RETRIEVE AND STORE
52671  4773            JMS  I   DL14RT       /   DSP CONTROLLER INDEX
52672  4531            JMS  I   ZKD512
52673  4773            JMS  I   DL14RT       /   DSP MACHINE ADDRESS (1ST WORD)
52674  4531            JMS  I   ZKD512
52675  4773            JMS  I   DL14RT       /   DSP MACHINE ADDRESS (2ND WORD)
52676  4531            JMS  I   ZKD512
52677  4773            JMS  I   DL14RT       /   DSP PROCESS ADDRESS (1ST WORD)
52700  4531            JMS  I   ZKD512
52701  4773            JMS  I   DL14RT       / STORE DSP PROCESS ADDRESS (2ND WORD)
52702  4531            JMS  I   ZKD512
52703  4773            JMS  I   DL14RT       / STORE OWN AUDIT NUMBER
52704  3113            DCA      ZDCOAN
52705  1770            TAD  I   DLSBDU       / SET UP PARAMETERS
52706  3316            DCA      DL14D1       / FOR CALLS OF TBP213
52707  1316            TAD      DL14D1
52710  3325            DCA      DL14D3
52711  1771            TAD  I   DLSBI1       / PICK UP MODE OF CONVERSATION
52712  3326            DCA      DL14M2
52713  6222            CIF      20           / SWAP IN D.U. AND MODE CONTROL BLOCK FOR CNV.
52714  4557            JMS  I   ZKB213
52715  7403            2-1^2+7401            /*2 VARIABLE LOCATIONS FOLLOW
52716  0000  DL14D1,   0                     / DESK UNIT
52717  0002            2                     / MODE CNV
52720  7305            WP0002                / SEND O/P RECORD
52721  4533            JMS  I   ZKD514
52722  6222            CIF      20           / SWAP IN D.U. AND MODE CONTROL BLOCK FOR CN1/2.
52723  4557            JMS  I   ZKB213
52724  7403            2-1^2+7401            /*2 VARIABLE LOCATIONS FOLLOW
52725  0000  DL14D3,   0                     / DESK UNIT
52726  0000  DL14M2,   0                     / MODE CN1/2
52727  7307            WP0004
52730  7421            MQL
52731  7340            WM0001
52732  6242            CIF      40
52733  4540            JMS  I   ZKD428
52734  7403            2-1^2+7401            /*2 VARIABLE LOCATIONS FOLLOW
52735  0000  DL14H1,   0                     / CDF TO HEADER LINE
52736  0000  DL14H2,   0                     / START ADDRESS OF HEADER LINE
52737  7300            WKLEAR
52740  1335            TAD      DL14H1
52741  3765            DCA  I   DLSBDD
52742  1336            TAD      DL14H2
52743  3017            DCA      ZAUT07       / SET UP ADDRESS OF SUBSCR. MNEMONIC
52744  4773            JMS  I   DL14RT       / PICK UP AND STORE DEALER WORD
52745  3336            DCA      DL14H2       / USE DL14H2 AS A WORK LOC
52746  4773            JMS  I   DL14RT
52747  4772            JMS  I   DL14DP
52750  4773            JMS  I   DL14RT
52751  4772            JMS  I   DL14DP
52752  1336            TAD      DL14H2       / STORE DEALER IN HEADER LINE
52753  4772            JMS  I   DL14DP
52754  7305            WP0002                / SET ZDCPRS IN TDC019 TO BE 2.
52755  3102            DCA      ZDCPRS
52756  1201            TAD      DL14TP       / SET UP INTEREST MESSAGE LENGTH IN ACC
52757  7002            BSW
```

```
52760  0061          AND     ZP0077
52761  5602          JMP  I  DL14S0
52762  5604  DL14TC, TDZOTC
52763  0044  DL1444, 44
52764  7766  DL14KB, -12
52765  4504  DLSBDD, DLDPOF
52766  3574  DLSBDR, DLRTDF
52767  6261  DL14CD, CDF     60
52770  2504  DLSBDU, DL14S1                  / LINK TO DESK UNIT
52771  2406  DLSBI1, DL1411                  / MODE OF CONVERSATION
52772  4503  DL14DP, DLDFPR                  / LINK TO DATA DEPOSITOR
52773  3573  DL14RT, DLRETR                  / LINK TO DATA RETRIEVER
52774  0000          ZBLOCK  .+20067600-.    /*ZERO FILL PAGE

             ///////////////////////////////////////////////////////////
             /                                                         /
             /   MODULE:  TDP31A  START UP DIALOGUE STORAGE            /
             /                                                         /
             /   FUNCTION:   SETS UP INITIAL VALUES IN STORAGE         /
             /               CONTROL DATA AND MOVES INITIAL TEXT       /
             /               INTO THE DIALOGUE (BUT NOT THE HEADING    /
             /               LINE). INITIATE STATS COLLECTION          /
             /                                                         /
             /   CALLED BY TDP314 (ACCEPT), TDP313 (CONTACT REPLY      /
             /             RECIEVED)                                   /
             /                                                         /
             /   INPUT PARAMETERS:  1) LENGTH OF INTEREST MESSAGE(AC)/
             /                      2) INTEREST MESSAGE BUFFER FIELD   /
             /                      3) INTEREST MESSAGE BUFFER ADDR    /
             /                                                         /
             ///////////////////////////////////////////////////////////

53000  7405          3-1^2+7401              /*3 VARIABLE LOCATIONS FOLLOW
53001  0000  DL1AS1, 0
53002  0000  DL1AFL, 0                       / TEMPORARY LOC CONTAINING CONDITION FLAG

53003  0000  TDP31A, .-.
53004  3201          DCA     DL1AS1          / STORE LENGTH OF INTEREST MESSAGE
53005  3202          DCA     DL1AFL          / RESET CONDITION FLAG
53006  2203          ISZ     TDP31A          / PICK UP AND STORE
53007  1603          TAD  I  TDP31A          / INTEREST MESSAGE DATA CDF
53010  3325          DCA     DL1ATF
53011  2203          ISZ     TDP31A          / PICK UP AND STORE
53012  1603          TAD  I  TDP31A          / INTEREST MESSAGE BUFFER ADDRESS
53013  3326          DCA     DL1AIA
53014  2203          ISZ     TDP31A
53015  1201          TAD     DL1AS1          / SET STATS1=LENGTH OF
53016  1360          TAD     DL1AK1          / INTEREST MESSAGE + 52
53017  6241          CDF     40
53020  3756          DCA  I  DL1ACT
53021  7340          WM0001
53022  3763          DCA  I  DL1ALN          / SET ZDCCLN ON FIELD 4 EQUAL -1
53023  1362          TAD     DL1AKA          / AND ZDCCCL EQUAL 65(DECIMAL)
53024  3761          DCA  I  DL1ACH
53025  7340          WM0001
53026  1102          TAD     ZDCPRS          / IF STATUS=CONTACT
53027  7650          SNA CLA                 / OR STATUS= ACCEPT OR TRANSFERRED
53030  5265          JMP     DL1AJ2          / (SET UP A FLAG TO INDICATE THE
53031  7344          WM0002                  / VALUE OF THE SECOND CONDITION)
53032  1102          TAD     ZDCPRS
53033  7640          SZA CLA
53034  5264          JMP     DL1AJ3
53035  7421          MQL                     / SET MQ TO INDICATE START OF HEADING LINE REQD
53036  7340          WM0001
53037  6251          CDF     50
53040  6242          CIF     40
53041  4540          JMS  I  ZKD428          / GET START OF HEADING LINE
53042  7403          2-1^2+7401              /*2 VARIABLE LOCATIONS FOLLOW
53043  0000  DL1ADF, 0                       / CDF TO HEADER
53044  0000  DL1ADA, 0                       / START OF HEADER LINE ADDRESS
53045  7300          WKLEAR
53046  1243          TAD     DL1ADF
53047  3251          DCA     DL1AC1
53050  7401          1-1^2+7401              /*1 VARIABLE LOCATIONS FOLLOW
53051  0000  DL1AC1, 0                               / GET INTO HEADING LINE
53052  1050          TAD     ZP0005                  / TO EVALUATE DEALER STATUS
53053  1244          TAD     DL1ADA
53054  3004          DCA     ZWORK1
53055  1404          TAD  I  ZWORK1
53056  1364          TAD     DL1AC2
53057  6241          CDF     40
53060  7640          SZA CLA                         / IF TDZPRS=2 IN TDC019 AND
53061  5264          JMP     DL1AJ3                  / TDODLR="*T" IN TDOHEX IN TDD404
53062  2262          ISZ     DL1AFL                  / SET CONDITION FLAG
53063  7410          SKP
53064  7301  DL1AJ3, WP0001
53065  3757  DL1AJ2, DCA  I  DL1ACS
53066  6251          CDF     50
53067  6242          CIF     40
53070  4552          JMS  I  ZKD421                  / ADD A NEWLINE TO DIALOGUE BUFFER
53071  1043          TAD     ZM0006                  / TRANSFERRED?
53072  1102          TAD     ZDCPRS
53073  7650          SNA CLA
53074  5300          JMP     DL1AJB                  / YES
```

```
53075  1202          TAD     DL1AFL              / CHECK EARLIER EVALUATED
53076  7650          SNA CLA                     / CONDITION
53077  5311          JMP     DL1AJ4
53100  7421  DL1AJB, MQL                         / LOAD MQ TO INDICATE FIRST CHAR OF WORD
                                                 / IS USED BY TDP423
53101  1052          TAD     ZP0007              / NO. OF CHARS TO BE ADDED
53102  6242          CIF     40
53103  4554          JMS  I  ZKD423              / ADD "*TXFER*" TO BUFFER
53104  7403          2-1^2+7401             /*2 VARIABLE LOCATIONS FOLLOW
53105  6251          CDF     50
53106  3165  DL1AA1, DL1ATX
53107  6242          CIF     40
53110  4552          JMS  I  ZKD421              / ADD A NEWLINE TO THE
53111  1201  DL1AJ4, TAD     DL1AS1              / DIALOGUE BUFFER
53112  7750          SPA SNA CLA
53113  5342          JMP     DL1AJ6         / NO INTEREST MESSAGE.
53114  1043          TAD     ZM0006
53115  1162          TAD     ZDCPRS       * / IF STATUS NOT EQUAL TRANSFERRED (6)
53116  7650          SNA CLA
53117  5340          JMP     DL1AJ5
53120  7421          MQL                    / LOAD MQ TO INDICATE FIRST CHAR OF WORD
                                            / IS USED BY TDP423
53121  1201          TAD     DL1AS1
53122  6242          CIF     40
53123  4554          JMS  I  ZKD423         / ADD INTEREST MESSAGE TO BUFFER
53124  7403          2-1^2+7401             /*2 VARIABLE LOCATIONS FOLLOW
53125  0000  DL1AIF, 0                      / ADD CDF IN ENTRY SEQUENCE
53126  0000  DL1AIA, 0
53127  1202          TAD     DL1AFL         / RECALL VALUE OF EARLIER
53130  7640          SZA CLA                / STORED CONDITION
53131  5340          JMP     DL1AJ5
                                            / REVERSE THE CONTROL STATUS
53132  6241          CDF     40             / (I.E. ZDCCOS:=1-ZDCCOS )
53133  1757          TAD  I  DL1ACS
53134  7041          CIA
53135  7001          IAC
53136  3757          DCA  I  DL1ACS
53137  6251          CDF     50
53140  6242  DL1AJ5, CIF     40
53141  4552          JMS  I  ZKD421         / ADD A NEWLINE TO THE BUFFER
53142  6241  DL1AJ6, CDF     40
53143  1763          TAD  I  DL1ALN         / SET UP ZDCLCU
53144  7002          BSW
53145  7001          IAC
53146  3771          DCA  I  DL1AUL
53147  6251          CDF     50
53150  1162          TAD     ZDCPRS         / GET PRIMARY STATUS
53151  1042          TAD     ZM0005         /
53152  7500          SMA                    / STATUS = TRANSFER ?
53153  3102          DCA     ZDCPRS         / YES - RESET STATUS TO 1
53154  7300          WKLEAR                 / NO - KEEP OLD STATUS
53155  5603          JMP  I  TDP31A         / EXIT

53156  0117  DL1ACT, ZDCCHS          / CHARACTERS TRANSMITTED/RECIEVED
53157  0102  DL1ACS, ZDCCOS          / CONTROL STATUS
53160  0064  DL1AK1, 64              / CONSTANT
53161  0107  DL1ACH, ZDCCCL          / FIRST TRANSMITTED CHARACTER
53162  0101  DL1AKA, 101             / K - A VALUE TO BE PUT IN ZDCCCL
53163  0106  DL1ALN, ZDCCLN
53164  2554  DL1AC2, -5224
53165  5224  DL1ATX, TEXT "*TXFER*"
53166  3006
53167  0522
53170  5200
53171  0114  DL1AUL, ZDCLCU          / FIRST UNTRANSMITTED CHARACTER
             ///////////////////////////////////////////////////////////////
             /                                                             /
             /    MODULE:  TDP312  CONTACT REQUEST                         /
             /                                                             /
             /    FUNCTION:    FORMS AND SENDS A CONTACT REQUEST TO        /
             /                 THE SERVICE FACILITY                        /
             /                                                             /
             /    INPUT PARAMETERS:    FIELD OF INSERT LINE BUFFER         /
             /                         ADDRESS OF INSERT LINE BUFFER       /
             /                                                             /
             /    CALLED BY TDP311(CONTACT) AND TDP32A(TXFERRED)           /
             /                                                             /
             ///////////////////////////////////////////////////////////////

53172  0000          ZBLOCK  .+200&7600-.   /*ZERO FILL PAGE
53200  7401          1-1^2+7401             /*1 VARIABLE LOCATIONS FOLLOW

53201  0000  TDP312, .-.
53202  2201          ISZ     TDP312         / PICK UP PARAMETERS WHICH
53203  1601          TAD  I  TDP312         / CONTAIN A POINTER TO WHAT
53204  1021          TAD     ZKCDF          / MAY BE A REAL OR PSEUDO INSERT
53205  3237          DCA     DL12CF         / LINE
53206  2201          ISZ     TDP312
53207  1601          TAD  I  TDP312
53210  3016          DCA     ZAUTO6
53211  6212          CIF     10
53212  4535          JMS  I  ZKC213         / GET INSERT MESG LINE BUFFER
53213  2201          ISZ     TDP312
                                            / CALL S/R TO GET 2 DIALOGUE BUFFERS
```

```
53214  4731          JMS  I  CLHDSB        / AND SPACE FILL HEADING LINE
53215  3103          DCA     ZDCCDS        / SET SECONDARY STATUS=CONTACT REQUEST SENT
53216  7346          wM0003
53217  1101          TAD     ZDCDES
53220  0061          AND     ZP0077        / SET ACTIVITY MODE DEPENDING ON CONV. MODE
53221  7002          BSW
53222  3004          DCA     ZWORK1
53223  6221          CDF     20
53224  1732          TAD  I  DL12MD
53225  1004          TAD     ZWORK1
53226  3732          DCA  I  DL12MD
53227  6251          CDF     50
53230  4530          JMS  I  ZKD511        / GET OUTPUT BUFFER AND SET
53231  7777          -1                    / INITIAL VALUES
53232  6242          CIF     40
53233  4551          JMS  I  ZKD428        / CALCULATE NO. OF
53234  3005          DCA     ZWORK2        / FREE DESK UNITS
53235  4730          JMS  I  DL11AC        / ALLOCATE A CONVERSATION REF.
53236  7401          1-1^2+7401            /*1 VARIABLE LOCATIONS FOLLOW
53237  0000  DL12CF, 0                     / CDF TO INSERT LINE
                                           / GET 2ND WORD OF BUFFER
53240  1416          TAD  I  ZAUTO6        / PICK UP INSERT LINE LENGTH
53241  3336          DCA     DL12IL
53242  1336          TAD     DL12IL
53243  7110          CLL RAR
53244  7430          SZL
53245  7001          IAC
53246  6251          CDF     50
53247  3013          DCA     ZAUTO3
53250  1336          TAD     DL12IL
53251  1327          TAD     DL12C1        / INCREMENT THIS BY 10
53252  4531          JMS  I  ZKD512
53253  1065          TAD     ZP0200
53254  4531          JMS  I  ZKD512        / STORE RECORD TYPE
53255  1327          TAD     DL12C1
53256  4531          JMS  I  ZKD512        / STORE NON-PACKED LENGTH
53257  4531          JMS  I  ZKD512        / STORE VALIDITY(=0)
53260  1101          TAD     ZDCDES
53261  0073          AND     ZP7700
53262  7002          BSW                   / CALCULATE THEN
53263  4531          JMS  I  ZKD512        / STORE DESK UNIT
53264  1043          TAD     ZM0006        / SET TYPE=1 IF ZDCPRS=6
53265  1102          TAD     ZDCPRS
53266  7650          SNA CLA
53267  7301          xP0001
53270  4531          JMS  I  ZKD512        / STORE CONTACT TYPE
53271  4570          JMS  I  ZKD345        / CALCULATE DIALOGUE PORT
53272  4531          JMS  I  ZKD512        / STORE DIALOGUE PORT
53273  1112          TAD     ZDCOCR        / STORE CONVERSATION REF.
53274  4531          JMS  I  ZKD512
53275  7330          w*4000
53276  0111          AND     ZDCCSP
53277  7106          CLL RTL               / AC = 0 OR 1
53300  4531          JMS  I  ZKD512
53301  1005          TAD     ZWORK2
53302  4531          JMS  I  ZKD512        /
53303  1013          TAD     ZAUTO3        / SET UP COPY LOOP LENGTH
53304  7040          CMA
53305  3007          DCA     ZWORK4
53306  1237          TAD     DL12CF
53307  3311          DCA     DL12C2
53310  2007  DL12C4, ISZ     ZWORK4
53311  7410          SKP
53312  5320          JMP     DL12C3
53313  7401          1-1^2+7401            /*1 VARIABLE LOCATIONS FOLLOW
53314  0000  DL12C2, 0                     / COPY LOOP FOR
53315  1416          TAD  I  ZAUTO6        / RECORD TEXT
53316  4531          JMS  I  ZKD512
53317  5310          JMP     DL12C4
53320  4733  DL12C3, JMS  I  DL12HB        / SWAP IN CNV MODE BLOCK
53321  1334          TAD     DL4013        / SET UP PORT AND FEEDBACK
53322  7421          MQL
53323  1336          TAD     DL12IL        / ADD 10(DECIMAL) TO THE INSERT
53324  1327          TAD     DL12C1        / LINE LENGTH TO GET THE REC LGTH FOR TDP513
53325  4532          JMS  I  ZKD513        / SEND O/P BUFFER
53326  5661          JMP  I  TDP312        / EXIT

53327  0012  DL12C1, 12                    / CONSTANT FOR CALC REC. LENGTH
53330  4566  DL11AC, DLCACR                / LINK TO ALLOCATE CONV REF ROUTINE
53331  3337  CLHDSB, DLCNSB                / LINK TO COMMON S/R FOR HEADING LINE
53332  0105  DL12MD, ZBCALM                / LINK TO FIELD 2 CONV ACTIVITY
53333  4163  DL12HB, DLSCMB                / LINK TO SWAP IN CNV MODE BLOCK ROUTINE
53334  4013  DL4013, 4013                  / CONSTANT REQUIRED TO SEND O/P BUFFER
53335  7403          2-1^2+7401            /*2 VARIABLE LOCATIONS FOLLOW
53336  0000  DL12IL, 0                     / INSERT LINE LENGTH
             /= LOCAL CONVERSATIONS ROUTINE TO GET TWO DIALOGUE BUFFERS
             /= AND SPACE FILL THE HEADING LINE
53337  0000  DLCNSB, .-.
53340  6242          CIF     40            / GET 2 DIALOGUE BUFFERS
53341  4550          JMS  I  ZKD42F
53342  6242          CIF     40
53343  4550          JMS  I  ZKD42F
53344  7421          MQL
53345  7340          wM0001
```

```
53346  6242          CIF     40                / GET START OF HEADING LINE
53347  4540          JMS  I  ZKD428
53350  7403          2-1^2+7401                /*2 VARIABLE LOCATIONS FOLLOW
53351  0000  DLSBH1, 0                         / CDF TO HEADING LINE
53352  0000  DLSBH2, 0                         / START ADDRESS
53353  7300          WKLEAR
53354  1351          TAD     DLSBH1
53355  3361          DCA     DLSBC1            / SET UP CDF TO HEADER LINE
53356  1045          TAD     ZP0040            / SET UP COPY LOOP COUNT
53357  3004          DCA     ZWORK1
53360  7401          1-1^2+7401                /*1 VARIABLE LOCATIONS FOLLOW
53361  0000  DLSBC1, 0                         / CDF TO HEADER LINE
53362  1373  DLSBJ1, TAD     DLSBK1            / STORE SPACES IN CONSECUTIVE
53363  3752          DCA  I  DLSBH2            / LOCATIONS IN THE
53364  2352          ISZ     DLSBH2            / HEADING LINE
53365  2004          ISZ     ZWORK1            / 40(OCTAL) IN ALL
53366  5362          JMP     DLSBJ1
53367  1374          TAD     DLSEHL            / TERMINATE HEADING LINE WITH
53370  3752          DCA  I  DLSBH2            / DEST EOL + NON-DEST EOT
53371  6251          CDF     50                / RESTORE CALLING FIELD
53372  5737          JMP  I  DLCNSB            / EXIT
53373  4040  DLSBK1, 4040
53374  3642  DLSEHL, 3642
             ///////////////////////////////////////////////////////////
             /                                                         /
             /   MODULE:  TDP315  CONNECT REQUEST RECIEVED             /
             /                                                         /
             /   FUNCTION:   ACTS ON A CONNECT REQUEST RECEIVED FROM   /
             /               THE COUNTER PARTY.(AS A RESULT OF HIS     /
             /               PRESSING ACCEPT)                          /
             /                                                         /
             /   INPUT PARAMETERS:   NONE                              /
             /                                                         /
             /  CALLED FROM TDP491(DIALOGUE RECEPTION)                 /
             /                                                         /
             ///////////////////////////////////////////////////////////

53375  0000          ZBLOCK  .+200&7600-.      /*ZERO FILL PAGE
53400  7401          1-1^2+7401                /*1 VARIABLE LOCATIONS FOLLOW

53401  0000  TDP315, .-.
53402  4344          JMS     DLCNCS            / ALLOCATE A CONVERSATION SEQ. NO.
                                               / AND ADD 2 TO THE PACKET COUNT
53403  1052          TAD     ZP0007            / PICK UP COUNTERPARTY CNV. REF.
53404  4534          JMS  I  ZKD515            / FROM RECORD
53405  3114          DCA     ZDCCCR            / STORE COUNTER PARTY CONV. REF.
53406  3103          DCA     ZDCCDS            / CLEAR SECONDARY STATUS
53407  1340          TAD     DL15N2
53410  7421          MQL                       / ANSWERBACK FIELD OF HEADING LINE REQD
53411  7340          WM0001
53412  6242          CIF     40
53413  4540          JMS  I  ZKD428
53414  7403          2-1^2+7401                /*2 VARIABLE LOCATIONS FOLLOW
53415  0000  DL15H1, 0
53416  0000  DL15H2, 0
53417  7300          WKLEAR
53420  1215          TAD     DL15H1            / SET UP CDF
53421  3730          DCA  I  DL15DD            / FOR DATA DEPOSITOR
53422  1216          TAD     DL15H2            / TO INDICATE TDD404 FIELD
53423  3017          DCA     ZAUT07
53424  1334          TAD     DL15N1            / SET UP LOOP COUNT
53425  3004          DCA     ZWORK1
53426  4537  DL15J1, JMS  I  ZKD516            / TRANSFER SENDERS ANSWERBACK
53427  4736          JMS  I  DL15DP            / WORDS INTO HEADING
53430  2004          ISZ     ZWORK1            / LINE
53431  5226          JMP     DL15J1
53432  2017          ISZ     ZAUT07            / SKIP NEXT TDD404 WORD
53433  4537          JMS  I  ZKD516            / STORE SENDERS TC
53434  3005          DCA     ZWORK2            / SAVE TC/DU WORD
53435  1005          TAD     ZWORK2
53436  4736          JMS  I  DL15DP            / AND DU
53437  4530          JMS  I  ZKD511            / FORM CONSTANT PART OF CONNECT REPLY
53440  0052          52
53441  0301          301
53442  0010          10
53443  0000          0
53444  7777          -1
53445  1005          TAD     ZWORK2            / PUT TAKERS D.U. INTO
53446  0052          AND     ZP0007            / CONVERT FROM CHAR TO BINARY
53447  4531          JMS  I  ZKD512            / CONNECT REPLY RECORD
53450  1111          TAD     ZDCCSP
53451  7700          SMA CLA                   / SET PAYER IF REQUIRED
53452  7301          WP0001
53453  4531          JMS  I  ZKD512            / STORE PAYER
53454  4531          JMS  I  ZKD512            / STORE SENDER STATUS = 0 (MAKER)
53455  1113          TAD     ZDCUAN            / STORE SENDER AUDIT NO.
53456  4531          JMS  I  ZKD512
53457  1732          TAD  I  DL15CY            / PICK UP AND STORE SENDERS COUNTRY
53460  4531          JMS  I  ZKD512
53461  1101          TAD     ZDCDES            / PICK UP DESK UNIT / MODE
53462  0073          AND     ZP7700            / EXTRACT DESK UNIT
53463  1733          TAD  I  DL15TC            / ADD IN TC NUMBER
53464  7002          BSW                       / SWAP
```

```
53465  1341          TAD      DL15N3          / CREATE CHAR REPRESENTATIONS
53466  4531          JMS   I  ZKD512          / STORE TC NUMBER / DESK UNIT
53467  1215          TAD      DL15H1
53470  3731          DCA   I  DL15DR
53471  7344          WM0002
53472  1054          TAD      ZP0017
53473  1216          TAD      DL15H2          / AND STORE TIME OF CALL
53474  3016          DCA      ZAUT06
53475  4737          JMS   I  DL15RT          / STORE THE TIME
53476  4531          JMS   I  ZKD512
53477  4737          JMS   I  DL15RT
53500  4531          JMS   I  ZKD512
53501  1335          TAD      DL15D1          / STORE THE 3 DATE WORDS
53502  3010          DCA      ZAUT00
53503  1410          TAD   I  ZAUT00
53504  4531          JMS   I  ZKD512
53505  1410          TAD   I  ZAUT00
53506  4531          JMS   I  ZKD512
53507  1410          TAD   I  ZAUT00
53510  4531          JMS   I  ZKD512
53511  1334          TAD      DL15N1
53512  3004          DCA      ZWORK1
53513  1333          TAD      DL15TC
53514  3016          DCA      ZAUT06
53515  1416  DL15J3, TAD   I  ZAUT06          / STORE SENDERS ANSWERBACK
53516  4531          JMS   I  ZKD512          / (20 DECIMAL CHARS)
53517  2004          ISZ      ZWORK1
53520  5315          JMP      DL15J3
53521  4533          JMS   I  ZKD514          / SEND CONNECT REPLY
53522  6242          CIF      40              / UPDATE HEADING LINE AND
53523  4562          JMS   I  ZKD429          / APPLICATION STATUS
53524  6242          CIF      40    /
53525  4541          JMS   I  ZKD441          / OUTPUT A NULL TEXT RECORD
53526  6243          CDI      40              / RETURN TO CALLER IN FIELD 4
53527  5601          JMP   I  TDP315
53530  4504  DL15DD, DLDPDF                   / LINK TO DATA DEP CDF
53531  3574  DL15DR, DLRTDF                   / LINK TO DATA RET CDF
53532  5617  DL15CY, TDZOCY                   / LINK TO TDR001: OWN COUNTRY
53533  5604  DL15TC, TDZOTC             / LINK TO TDR001: ANSWERBACK ADDRESS-1 AND OWN TC ADDRESS
53534  7766  DL15N1, -12
53535  0103  DL15D1, ZDCDAT-1                 / A = START OF DATE ON PAGE ZERO - 1
53536  4503  DL15DP, DLDEPR                   / LINK TO DEPOSITOR ROUTINE
53537  3573  DL15RT, DLRETR                   / LINK TO RETRIEVER ROUTINE
53540  0014  DL15N2, 14
53541  6060  DL15N3, 6060
             /= LOCAL ROUTINE TO ALLOCATE A CONVERSATION SEQUENCE
             /= NUMBER, ADD TWO TO THE PACKET COUNT,
             /= PREVIOUSLY HAVING SET STATUS=DIALOGUE
53542  7403          2-1*2+7401               /*2 VARIABLE LOCATIONS FOLLOW
53543  0001  DLCVSQ, 1                        / LOCALLY HELD CONVERSATION SEQUENCE NO.
53544  0000  DLCNCS, .-.
53545  7325          WP0003                   / SET PRIMARY STATUS=DIALOGUE
53546  3102          DCA      ZDCPRS
53547  4771          JMS   I  DLRSDT          / RESET DIALOGUE TIMEOUT
53550  1343          TAD      DLCVSQ
53551  3107          DCA      ZDCCSN          / ALLOCATE THE SEQUENCE NUMBER
53552  6241          CDF      40
53553  7305          WP0002                   / INCREMENT THE PACKET COUNT BY 2
53554  1770          TAD   I  DLCSPC
53555  3770          DCA   I  DLCSPC
53556  6251          CDF      50
53557  2343          ISZ      DLCVSQ          / INCREMENT THE LOCALLY HELD
53560  1343          TAD      DLCVSQ          / SEQUENCE NO. SETTING IT TO
53561  1367          TAD      DLCVK1          / 1 IF>1000(DECIMAL)
53562  7640          SZA CLA
53563  5744          JMP   I  DLCNCS          / EXIT
53564  7301          WP0001
53565  3343          DCA      DLCVSQ
53566  5744          JMP   I  DLCNCS
53567  6027  DLCVK1, -1751                    / K = NEGATIVE 1001 (DECIMAL)
53570  0120  DLCSPC, ZDCPKS                   / LINK TO PACKET COUNT ON FIELD 4
53571  4360  DLRSDT, DLDTIM                   / A= RESET DIALOGUE TIMEOUT
             ////////////////////////////////////////////////////////////////
             /                                                              /
             /    MODULE:  DLRETR  DATA RETRIEVER                           /
             /                                                              /
             ////////////////////////////////////////////////////////////////

53572  7403          2-1*2+7401               /*2 VARIABLE LOCATIONS FOLLOW

53573  0000  DLRETR, .-.
53574  0000  DLRTDF, 0
53575  1416          TAD   I  ZAUT06
53576  6251          CDF      50
53577  5773          JMP   I  DLRETR
```

```
                    ////////////////////////////////////////////////////////////
                    /                                                          /
                    /   MODULE:  TDP313  CONTACT REPLY RECIEVED                /
                    /                                                          /
                    /   FUNCTION:   ACTS ON A REPLY TO A CONTACT REQUEST       /
                    /               RECIEVED FROM THE SERVICE FACILITY         /
                    /                                                          /
                    /   INPUT PARAMETERS:   NONE                               /
                    /                                                          /
                    /   CALLED BY TDP492 (CONVERSATIONS RECEPTION)             /
                    /                                                          /
                    ////////////////////////////////////////////////////////////

53600  7403                 2-1^2+7401                   /*2 VARIABLE LOCATIONS FOLLOW
53601  0000  DL13PT,  0                                  / WORK LOCATION TO HOLD PORT
53602  0000  TDP313,  .-.
53603  1053           TAD       ZP0010                   / CALCULATE WHICH D.U. AND MODE
53604  4534           JMS   I   ZKD515                   / CORRESPONDS TO CURRENT MESSAGE
53605  3201           DCA       DL13PT
53606  1056           TAD       ZP0037
53607  7041           CIA
53610  1201           TAD       DL13PT
53611  7110           CLL RAR
53612  3223           DCA       DL13DU
53613  7530           SZL CLL
53614  7301           WP0001
53615  1350           TAD       DL13K2
53616  3224           DCA       DL13MD
53617  6251           CDF       50                       / SWAP IN CURRENT D.U.
53620  6222           CIF       20                       / CONTROL BLOCK
53621  4557           JMS   I   ZKB213
53622  7403           2-1^2+7401                         /*2 VARIABLE LOCATIONS FOLLOW
53623  0000  DL13DU,  0
53624  0000  DL13MD,  0
53625  7300           WKLEAR
53626  6242           CIF       40
53627  4567           JMS   I   ZKD42C                   / SWAP CONVERSATIONS CONTROL
53630  7340           WM0001                             / BLOCKS.
53631  1102           TAD       ZDCPRS
53632  7450           SNA                                / CHECK IF CONVERSATION STATUS
53633  5237           JMP       DL13JA                   / EQUALS CONTACT OR TRANSFERRED
53634  1042           TAD       ZM0005                   / IF NOT EXIT.
53635  7640           SZA CLA
53636  5340           JMP       DL13J4
53637  1103  DL13JA,  TAD       ZDCCDS                   / IF SECONDARY STATUS NOT EQUAL
53640  7640           SZA CLA                            / ZERO, EXIT.
53641  5340           JMP       DL13J4
53642  1053           TAD       ZP0010                   / CHECK THAT THE CONVERSATION
53643  7001           IAC                                / REFERENCE MATCHES THAT IN THE
53644  4534           JMS   I   ZKD515                   / CURRENT CONTROL BLOCK
53645  7041           CIA
53646  1112           TAD       ZDCOCR
53647  7640           SZA CLA
53650  5340           JMP       DL13J4
53651  1050  DL13J1,  TAD       ZP0005                   / PICK UP VALIDITY
53652  4534           JMS   I   ZKD515
53653  1352           TAD       DL13K4
53654  7750           SPA SNA CLA
53655  5260           JMP       DL13J2
53656  4355           JMS       TDP319                   / IF VALIDITY > 1 PERFORM
53657  5340           JMP       DL13J4                   / CONTACT FAILED ROUTINE AND EXIT
53660  1112  DL13J2,  TAD       ZDCOCR                   / GET CONVERSATION REFERENCE
53661  7421           MQL                                / INTO MQ AS PARAM FOR TBP522
53662  1201           TAD       DL13PT                   / RESERVE PORT CORRESPONDING TO
53663  6212           CIF       10                       / THE DU/MODE.
53664  4576           JMS   I   ZKB522
53665  7305           WP0002                             / DEPENDING ON PAYER INDICATOR STORE "TO  "
53666  1053           TAD       ZP0010                   / OR "FROM" IN CURRENT HEADING LINE
53667  4534           JMS   I   ZKD515
53670  7640           SZA CLA
53671  7305           WP0002
53672  1747           TAD   I   DL13P1                   / THE TEXT IS HELD IN TDP316
53673  3011           DCA       ZAUTO1                   / THIS LINK IS USED TO SET UP A POINTER
53674  7421           MQL
53675  7340           WM0001
53676  6242           CIF       40
53677  4540           JMS   I   ZKD42B                   / FIND THE START OF THE
53700  7403           2-1^2+7401                         /*2 VARIABLE LOCATIONS FOLLOW
53701  0000  DL13H1,  0                                  / HEADING LINE.
53702  0000  DL13H2,  0
53703  7344           WM0002
53704  3010           DCA       ZAUTO0
53705  1301           TAD       DL13H1
53706  3313           DCA       DL13C5
53707  1302           TAD       DL13H2
53710  3005           DCA       ZWORK2
53711  1411  DL13J3,  TAD   I   ZAUTO1
53712  7401           1-1^2+7401                         /*1 VARIABLE LOCATIONS FOLLOW
53713  0000  DL13C5,  0                                  / CDF TO HEADING LINE
53714  3405           DCA   I   ZWORK2
53715  2005           ISZ       ZWORK2                   / MOVE "TO  " OR "FROM" TO HEADING LINE
53716  6251           CDF       50
53717  2010           ISZ       ZAUTO0
53720  5311           JMP       DL13J3
```

```
53721  4744          JMS  I  DL13SB        / CALL LOCAL ROUTINE TO DISTRIBUTE SOME
                                            / OF RECORD (SIZING PROBLEM ONLY REASON)
53722  1746          TAD  I  DL13MF        / SET UP START DIALOGUE STORAGE PARAS
53723  3335          DCA     DL13IF        / 1) THE INTEREST MESSAGE FIELD
53724  1053          TAD     ZP0010
53725  1055          TAD     ZP0020        / 2) THEN THE START ADDRESS
53726  1745          TAD  I  DL13MA
53727  3336          DCA     DL13IA
53730  7305          AP0002
53731  4534          JMS  I  ZKD515        / PICK UP RECORD LENGTH AND
53732  1351          TAD     DL13K3        / SUBTRACT 24 GIVING LENGTH
                                            / OF INTEREST MESSAGE
53733  4742          JMS  I  D1331A        / START UP DIALOGUE STORAGE
53734  7403          2-1^2+7401            /*2 VARIABLE LOCATIONS FOLLOW
53735  0000   DL13IF, 0
53736  0000   DL13IA, 0
53737  4743          JMS  I  D1331B        / SET UP CONVERSATION DISPLAY
53740  6243   DL13J4, CDI     40            / RETURN TO CALLER IN FIELD 4
53741  5602          JMP  I  TDP313
53742  3003   D1331A, TDP31A               / LINK TO START UP DIALOGUE STORAGE ROUTINE
53743  2202   D1331B, TDP31B               / LINK TO SET UP CONVERSATION DISPLAY ROUTINE
53744  2310   DL13SB, DLSTBD               / LINK TO LOCAL ROUTINE
53745  0340   DL13MA, D45FRA               / LINK TO POINTER TO CURRENT MESSAGE ADDRESS
53746  0350   DL13MF, D46CDF               / LINK TO POINTER TO CURRENT MESSAGE FIELD
53747  4141   DL13M1, DL16M1               / LINK TO TEXT CONSTANTS "TO  " AND "FROM"
53750  0004   DL13K2, 4
53751  7742   DL13K3, -36
53752  7777   DL13K4, -1

              ////////////////////////////////////////////////////////////
              /                                                          /
              /   MODULE:  TDP319  CONTACT FAILED                        /
              /                    A CONTACT REQUEST FAILS               /
              /                                                          /
              /   INPUT PARAMETERS:  NONE                                /
              /                                                          /
              /   CALLED FROM TDP123 (CONVERSATIONS KEYBOARD LOCK        /
              /                        TIMEOUT)                          /
              /                                                          /
              ////////////////////////////////////////////////////////////

53753  0101   D19DSK, ZBCDUN               / A= DESK NUMBER FIELD 2
53754  7401          1-1^2+7401            /*1 VARIABLE LOCATIONS FOLLOW
53755  0000   TDP319, .-.
53756  4536          JMS  I  ZKD342        /RETURN DIALOGUE BUFFER CHAIN
53757  4776          JMS  I  D19326        / SWITCH OFF THE CONVERSATION
53760  4777          JMS  I  D19123        / SEND TABLE STATE RECORD TO
                                            /  REPORT FREE DESK UNITS
53761  6221          CDF     20
53762  1753          TAD  I  D19DSK        / GET DESK NUMBER
53763  6251          CDF     50
53764  3370          DCA     DL19DU        /
53765  6222          CIF     20            /
53766  4557          JMS  I  ZKB213        / SWAP IN CNV MODE CONTROL BLOCK
53767  7403          2-1^2+7401            /*2 VARIABLE LOCATIONS FOLLOW
53770  0000   DL19DU, 0                     / CURRENT D.U.
53771  0002          2                     / CNV MODE
53772  7300          AKLEAR                /
53773  6222          CIF     20            /
53774  4572          JMS  I  ZKB23S        / UNLOCK THE KEYBOARD
53775  5755          JMP  I  TDP319        / AND EXIT
53776  6261   D19326, TDP326
53777  5242   D19123, TDP123

              ////////////////////////////////////////////////////////////
              /                                                          /
              /   MODULE:  TDP316  CONNECT REPLY RECIEVED                /
              /                                                          /
              /   FUNCTION:   ACTS ON A REPLY TO A CONNECT REQUEST       /
              /               RECIEVED FROM THE COUNTERPARTY             /
              /                                                          /
              /   INPUT PARAMETERS:   NONE                               /
              /                                                          /
              /   CALLED BY TDP491 (DIALOGUE RECEPTION)                  /
              /                                                          /
              ////////////////////////////////////////////////////////////

54000  7401          1-1^2+7401            /*1 VARIABLE LOCATIONS FOLLOW

54001  0000   TDP316, .-.
54002  7300          AKLEAR                / SET CONTROL CHANGE INDICATOR = FALSE
54003  6251          CDF     50
54004  6242          CIF     40
54005  4541          JMS  I  ZKD441        / TRANSMIT FROM DIALOGUE BUFFER
54006  4306          JMS     DL16SA        / SEND CALL ACCEPTED
54007  4733          JMS  I  DL16CS        / ALLOCATE A CONVERSATION SEQUENCE
                                            / NO. AND ADD 2 TO THE PACKET COUNT
54010  7421          MQL
54011  7346          AM0001
54012  6242          CIF     40            / FIND THE START OF
54013  4540          JMS  I  ZKD428        / THE HEADING LINE
54014  7403          2-1^2+7401            /*2 VARIABLE LOCATIONS FOLLOW
54015  0000   DL16HF, 0
54016  0000   DL16HA, 0
```

```
54017  7300         *KLFAR
54020  1215          TAD      DL16HF        / SET UP A CDF TO
54021  3734          DCA  I   DL16DD        / AND ADDRESS OF THE
54022  7340         *M0001                  / START OF THE HEADING
54023  1216          TAD      DL16HA        / LINE FOR THE DATA
54024  3017          DCA      ZAUT07        / DEPOSITOR
54025  1052          TAD      ZP0007        / PICK UP PAYER INDICATOR
54026  4534          JMS  I   ZKD515
54027  7112          CLL RTR                / STORE THE PAYER INDICATOR
54030  3111          DCA      ZDCCSP        / THEN SET UP THE "TO" OR
54031  1111          TAD      ZDCCSP
54032  7710          SPA CLA                / "FROM" MESSAGE IN THE
54033  7305         *P0002                  / HEADING LINE.
54034  1341          TAD      DL16M1
54035  3015          DCA      ZAUT05
54036  1415          TAD  I   ZAUT05
54037  4740          JMS  I   DL16DP
54040  1415          TAD  I   ZAUT05
54041  4740          JMS  I   DL16DP
54042  2013          ISZ      ZAUT03        / STEP OVER STATUS FIELD
54043  4537          JMS  I   ZKD516
54044  3115          DCA      ZDCCAN        / STORE COUNTERPARTY AUDIT NO.
54045  4537          JMS  I   ZKD516
54046  3110          DCA      ZDCCCY        / STORE COUNTERPARTY COUNTRY.
54047  1055          TAD      ZP0020
54050  1017          TAD      ZAUT07        / ADJUST DATA DEPOSITOR A.I.P.
54051  3017          DCA      ZAUT07
54052  4537          JMS  I   ZKD516
54053  4740          JMS  I   DL16DP        / STORE COUNTERPARTY TC
                                            / STORE COUNTERPARTY D.U.
54054  2017          ISZ      ZAUT07        / ADJUST DATA DEPOSITOR A.I.R
54055  4537          JMS  I   ZKD516
54056  4740          JMS  I   DL16DP
54057  4537          JMS  I   ZKD516
54060  4740          JMS  I   DL16DP
54061  1335          TAD      DL16K3        / SET UP AN A.I.R. TO INDICATE
54062  3015          DCA      ZAUT05        / THE DATE ON PAGE ZERO.
54063  4537          JMS  I   ZKD516        / COPY THE THREE DATE WORDS.
54064  3415          DCA  I   ZAUT05
54065  4537          JMS  I   ZKD516
54066  3415          DCA  I   ZAUT05
54067  4537          JMS  I   ZKD516
54070  3415          DCA  I   ZAUT05
54071  1051          TAD      ZP0006
54072  1216          TAD      DL16HA        / ADJUST THE DATA DEPOSITOR
54073  3017          DCA      ZAUT07        / A.I.R. TO INDICATE THE
54074  1336          TAD      DL16K4        / ANSWERBACK
                                            / SET UP ANSWERBACK COPY
54075  3004          DCA      ZWORK1        / LOOP COUNT
54076  4537  DL16J1, JMS  I   ZKD516        / COPY ANSWERBACK
54077  4740          JMS  I   DL16DP
54100  2004          ISZ      ZWORK1
54101  5276          JMP      DL16J1
54102  4732          JMS  I   D16318        / SET UP CONVERSATION DISPLAY
54103  6243          CDI      40            / RETURN TO CALLER IN FIELD 4
54104  5601          JMP  I   TDP316
             / COMMON SR TO FORM AND SEND A CALL ACCEPTED RECORD
             / ALSO CALLED BY TDP137
54105  7401          1-1^2+7401             /*1 VARIABLE LOCATIONS FOLLOW
54106  0000  DL16SA, .-.
54107  6251          CDF      50
54110  4530          JMS  I   ZKD511        / FORM A CALL ACCEPTED RECORD
54111  0007          7                      / LENGTH
54112  0206          206                    / TYPE
54113  0007          7                      / LENGTH NON-PACKED
54114  0000          0                      / VALIDITY
54115  0007          7                      / DESK UNIT
54116  7777          -1
54117  1113          TAD      ZDCOAG        / SET UP AUDIT NO.
54120  0067          AND      ZP0377
54121  4531          JMS  I   ZKD512
54122  6242          CIF      40            / SET UP NO. OF FREE DESK UNITS
54123  4551          JMS  I   ZKD428
54124  4531          JMS  I   ZKD512
54125  1337          TAD      DL16K5
54126  7421          MQL                    / SEND THE CALL ACCEPTED RECORD
54127  1052          TAD      ZP0007
54130  4532          JMS  I   ZKD513
54131  5706          JMP  I   DL16SA        / EXIT
54132  2202  D16318, TDP318                 / LINK TO SET UP CONVERSATION DISPLAY ROUTINE
54133  3544  DL16CS, DLCACS             / LINK TO ALLOCATE CONV. SEQ. ROUTINE
54134  4504  DL16DD, DLDPDF             / LINK TO DATA DEP CDF
54135  0103  DL16K3, ZDCDAT-1
54136  7766  DL16K4, -12
54137  0013  DL16K5, 13                 / PORT NO. CONSTANT FOR SEND
54140  4563  DL16DP, DLDPER             / LINK TO DATA DEPOSITOR
54141  4216  DL16M1, DLTOFR-1
```

```
                EJECT
                ////////////////////////////////////////////////////////////
                /                                                          /
                /   MODULE:  TOP345  CALCULATE PORT NUMBER                 /
                /                                                          /
                /   FUNCTION:  TO CALCULATE A PORT NUMBER FROM THE         /
                /              DESCRIPTOR(ZDCDES)IN PAGE ZERO OF FIELD     /
                /              5. USING THE FORMULA =                      /
                /                                                          /
                /              PORT:=31+(2*D.U.)+1 IF MODE CN2             /
                /                                                          /
                /   CALLED BY: CONNECTION, DISCONNECTION                   /
                /                                                          /
                ////////////////////////////////////////////////////////////

54142  7401             1=1^2+7401              /*1 VARIABLE LOCATIONS FOLLOW
54143  0000     TOP345, .-.
54144  6214             RDF
54145  1023             TAD     ZKCDI           / SAVE CALLERS FIELDS
54146  3360             DCA     DL45SF
54147  1101             TAD     ZDCDES
54150  7010             RAR                     / GINK=0 CN1,=1 CN2
54151  7200             CLA
54152  1101             TAD     ZDCDES
54153  7002             BSW
54154  0061             AND     ZP0077          / CALCULATE D.U.*2
54155  7004             RAL                     / AND ADD MODE
54156  1056             TAD     ZP0037          / ADD 31(DECIMAL)
54157  7401             1=1^2+7401              /*1 VARIABLE LOCATIONS FOLLOW
54160  0000     DL45SF, 0                       / RESTORE CALLERS FIELDS
54161  5743             JMP  I  TOP345
                EJECT
                /
                /= LOCAL CONVERSATIONS ROUTINE TO
                /= SWAP IN THE CNV MODE BLOCK
                /
54162  7401             1=1^2+7401              /*1 VARIABLE LOCATIONS FOLLOW
54163  0000     DLSCMB, .-.
54164  1101             TAD     ZDCDES          / ISOLATE DESK UNIT NUMBER
54165  0073             AND     ZP7700
54166  7002             BSW
54167  3373             DCA     DLSCDU          / SET DESK UNIT PARAM FOR TOP213
54170  6222             CIF     20
54171  4557             JMS  I  ZKK213          / SWAP IN CNV MODE BLOCK
54172  7401             1=1^2+7401              /*1 VARIABLE LOCATIONS FOLLOW
54173  0000     DLSCDU, 0                       / F = DESK UNIT NUMBER
54174  0002             2                       / K = MODE = CNV = 2
54175  7300             KKLEAR
54176  5763             JMP  I  DLSCMB          / EXIT
                ////////////////////////////////////////////////////////////
                /                                                          /
                /   MODULE:  TOP317  CONNECT FAILED                        /
                /                                                          /
                /   FUNCTION:  ACTS ON A REJECTION OF A CONNECT REQUEST    /
                /              RECIEVED FROM THE COUNTERPARTY              /
                /                                                          /
                /   INPUT PARAMETERS:   NONE                               /
                /                                                          /
                /   CALLED BY TOP491                                       /
                /                                                          /
                ////////////////////////////////////////////////////////////

54177  0000             ZBLOCK  .+20067600=.    /*ZERO FILL PAGE
54200  7401             1=1^2+7401              /*1 VARIABLE LOCATIONS FOLLOW

54201  0000     TOP317, .-.
54202  6251             CDF     50
54203  1050             TAD     ZP0005
54204  4534             JMS  I  ZKD515          / READ REASON FOR REJECTION
54205  1077             TAD     ZP7777
54206  7640             SZA!CLA                 / IF NOT 'REJECTED BY FAR TC'
54207  5212             JMP     DL317C          / HANDLE CONNECTION LOST
54210  4616             JMS  I  DLRANG          / HANDLE 'RANG OFF'
54211  5213             JMP     DL317X
54212  4615     DL317C, JMS  I  DLFAIL          / SIMPLY ROUTE TO TOP137
54213  6243     DL317X, CDI     40
54214  5601             JMP  I  TOP317
54215  7357     DLFAIL, TOP137                  / CONNECT FAILURE ACTION
54216  2122     DLRANG, TOP214                  / CALLER RANG OFF

                / 'TO /FROM' TEXT FOR HEADING LINE
54217  2417     DLTOFR, TEXT    "TO  FROM"
54220  4040
54221  0622
54222  1715
54223  0000
       4223             *.-1
```

```
                    ////////////////////////////////////////////////////////////////
                    /                                                              /
                    /    MODULE:  TDP31C  LOCAL DEQUEUE CALL                       /
                    /                                                              /
                    /    FUNCTION:   SETS UP A "BACK DOOR" ENTRY TO THE            /
                    /                MESSAGE SUPERVISOR TO DEQUEUE A CALL          /
                    /                JUST ACCEPTED IN THIS CONTROLLER ONLY         /
                    /                                                              /
                    /    INPUT PARAMETERS:   NONE                                  /
                    /                                                              /
                    /    CALLED BY TDP314 (ACCEPT)                                 /
                    /                                                              /
                    ////////////////////////////////////////////////////////////////

        54223  7401          1-1^2+7401              /*1 VARIABLE LOCATIONS FOLLOW

        54224  0000  TDP31C, .-.
        54225  1113          TAD     ZDCOAN          / MOVE OWN AUDIT NO.
        54226  3364          DCA     DL1CAU          / TO LOCALLY HELD DEQUEUE
        54227  6211          CDF     10              / CALL RECORD
        54230  1671          TAD  I  DL1CPT          /"BACK DOOR" ENTRY TO
        54231  3373          DCA     DL31C1          /MESSAGE SUPERVISOR STORE
        54232  1672          TAD  I  DL1CPD          / PORT,RECORD BUFFER CDF,
        54233  3374          DCA     DL31C2          /RECORD BUFFER ADDRESS AND
        54234  1673          TAD  I  DL1CPA          / NON-TRANSLATABLE CHARACTER
        54235  3375          DCA     DL31C3          /COUNT
        54236  1674          TAD  I  DL1CCN
        54237  3376          DCA     DL31C4
        54240  1123          TAD     ZPCORF          / GET CNV/CHR FLAG
        54241  7640          SZA CLA                 / BONDS ?
        54242  7001          IAC                     / YES - SET PORT NUMBER = 14
        54243  1270          TAD     DL1CK1          / NO - SET PORT NUMBER = 13
        54244  3671          DCA  I  DL1CPT
        54245  1266          TAD     DL1CK2
        54246  3672          DCA  I  DL1CPD
        54247  1276          TAD     DL1CRC
        54250  3673          DCA  I  DL1CPA
        54251  3674          DCA  I  DL1CCN
        54252  6251          CDF     50
        54253  6212          CIF     10              / CALL ROUTE RECORD
        54254  4556          JMS  I  ZKR31A
        54255  6211          CDF     10
        54256  1373          TAD     DL31C1          /RESTORE PREVIOUSLY SAVED
        54257  3671          DCA  I  DL1CPT          / FIELD 1,PAGE ZERO VARIABLES
        54260  1374          TAD     DL31C2
        54261  3672          DCA  I  DL1CPD
        54262  1375          TAD     DL31C3
        54263  3673          DCA  I  DL1CPA
        54264  1376          TAD     DL31C4
        54265  3674          DCA  I  DL1CCN
        54266  6251  DL1CK2, CDF     50              / RESTORE CALLERS FIELD
        54267  5624          JMP  I  TDP31C          / EXIT

        54270  0013  DL1CK1, 13              / PORT NUMBER
        54271  0126  DL1CPT, BLZPRT          / POINTERS TO FIELD 1
        54272  0133  DL1CPD, BLZPRD          / PAGE ZERO VARIABLES
        54273  0134  DL1CPA, BLZPRA          / WHICH NEED TO BE
        54274  0131  DL1CCN, BLZCCN          / SAVED AND RESTORED
        54275  7415          7-1^2+7401              /*7 VARIABLE LOCATIONS FOLLOW
        54276  4274  DL1CRC, .-2             / LOCALLY CODED
        54277  0006  DL1CR1, 6               / DEQUEUE CALL
        54300  0207  DL1CR2, 207             / RECORD
        54301  0006  DL1CR3, 6
        54302  0000  DL1CR4, 0
        54303  0007  DL1CR5, 7
        54304  0000  DL1CAU, 0

                    ////////////////////////////////////////////////////////////////
                    /                                                              /
                    /    MODULE:  TDP318  CONNECTION OK?                           /
                    /                                                              /
                    /    FUNCTION:    DOES PRELIMINARY CHECKING TO SEE IF A        /
                    /                 CONTACT OR ACCEPT REQUEST IS POSSIBLE        /
                    /                                                              /
                    /    INPUT PARAMETERS:    NONE                                 /
                    /                                                              /
                    /    OUTPUT PARAMETERS:  INDEX TO MESSAGE TABLE                /
                    /                        MODE (C/1/2) TO BE USED               /
                    /                        FOR CONNECTION                        /
                    /                                                              /
                    /    CALLED BY TDP311 (CONTACT), TDP314 (ACCEPT)               /
                    /                                                              /
                    ////////////////////////////////////////////////////////////////

        54305  7401          1-1^2+7401              /*1 VARIABLE LOCATIONS FOLLOW

        54306  0000  TDP318, .-.
        54307  2306          ISZ     TDP318          / SKIP OVER ZKNOP IF CALLING MODULE
        54310  6221          CDF     20
        54311  7344          *0002                   / CHECK THAT CURRENT MODE
        54312  1755          TAD  I  DL18CM          / IS 2 (CNV), OTHERWISE
        54313  0061          AND     ZP0077          / SET INDEX FOR "INVALID FUNCTION"
        54314  7640          SZA CLA
        54315  5347          JMP     DL18J2
```

```
54316  1754            TAD  I  DL18AM       / CHECK THAT EITHER CN1 OR CN2
54317  7002            BSW                  / IDLE (I.E. CONV. ACTIVITY IN
54320  0061            AND     ZP0077
54321  3004            DCA     ZWORK1       / ZBCALM NOT EQUAL 3-STORING
54322  7346            WM0003               / THIS IN A WORK.LOCATION FOR
54323  1004            TAD     ZWORK1       / USE LATER). OTHERWISE SET INDEX
54324  7650            SNA CLA              / FOR "INVALID FUNCTION"
54325  5347            JMP     DL18J2
54326  6251            CDF     50           / CHECK COUNTRY AND ANSWERBACK
54327  1756            TAD  I  DL18AC       / PRESENT - TDZACI IN TDR001=1
54330  7650            SNA CLA              / OTHERWISE SET INDEX FOR "INVALID
54331  5347            JMP     DL18J2       / FUNCTION".
54332  6202            CIF     0            / FIND NO. OF FREE
54333  4430            JMS  I  ZKA529       / BUFFERS. IF LESS THAN 10 SET
54334  1044            TAD     ZM0010       / INDEX FOR "SYSTEM BUSY".
54335  7710            SPA CLA
54336  5346            JMP     DL18J1
54337  7301            WP0001               / SET RETURN MODE TO FIRST
54340  0004            AND     ZWORK1       / OF CN1/2 WITH IDLE STATUS
54341  7650            SNA CLA
54342  7340            WM0001       .
54343  1050            TAD     ZP0005
54344  3706            DCA  I  TDP318
54345  5350            JMP     DL18J4
54346  1353    DL18J1, TAD     DL18K2
54347  1052    DL18J2, TAD     ZP0007
54350  2306    DL18J4, ISZ     TDP318
54351  6251            CDF     50
54352  5706            JMP  I  TDP318

54353  0015    DL18K2, 15
54354  0105    DL18AM, ZBCALM
54355  0104    DL18CM, ZBCDCM
54356  5620    DL18AC, TDZACI
               / SE TO RESET DIALOGUE TIMEOUT
54357  7401            1-1^2+7401                    /*1 VARIABLE LOCATIONS FOLLOW
54360  0000    DLDTIM, .-.
54361  6251            CDF     50
54362  4570            JMS  I  ZKP345                / GET PORT
54363  1371            TAD     DLK024
54364  6002            IOF                           / ECB BASE =65
54365  6202            CIF     0                     ///
54366  4332            JMS  I  ZKA323                /// TO RESET 40 SEC TIMEOUT CN1/2
54367  6001            ION
54370  5760            JMP  I  DLDTIM
54371  0024    DLK024, 24                            / K + PORT = ECB 65 - 100
               /SAVE AREA FOR TDP31C/MESSAGE SUPERVISOR VARIABLES
54372  7407            4-1^2+7401                    /*4 VARIABLE LOCATIONS FOLLOW
54373  0000    DL31C1, 0
54374  0000    DL31C2, 0
54375  0000    DL31C3, 0
54376  0000    DL31C4, 0
54377  0000            ZBLOCK  .+29067600-.   /*ZERO FILL PAGE

               ////////////////////////////////////////////////////////////
               /                                                          /
               /   MODULE:  TDP341  CONVERSATIONS CONTROL                 /
               /                                                          /
               /   FUNCTION:   ROUTES CONTROL TO A ROUTINE SPECIFIED      /
               /               BY A FUNCTION CODE PASSED IN THE ACC.      /
               /                                                          /
               /   CALLED BY KEYBOARD SUPERVISOR                          /
               /                                                          /
               ////////////////////////////////////////////////////////////

54400  7401            1-1^2+7401                    /*1 VARIABLE LOCATIONS FOLLOW

54401  0000    TDP341, .-.
                                                     / USE JUMP TABLE
54402  1227            TAD     DL41VJ                / TO ROUTE CONTROL
54403  3214            DCA     DL41SR                / TO APPROPRIATE ROUTINE
54404  6221            CDF     20
54405  1634            TAD  I  DL41DC                / GET DU CAPABILITIES
54406  6251            CDF     50
54407  0053            AND     ZP0010                / MASK DU CAPABILITIES WITH CN8 MASK
54410  7640            SZA CLA                       / CN8 CAPABLE ?
54411  7301            WP0001                        / YES - SET FLAG = 1
54412  3123            DCA     ZBCDBF                / SAVE FLAG SETTING
54413  7401            1-1^2+7401                    /*1 VARIABLE LOCATIONS FOLLOW
54414  0000    DL41SR, 0
54415  5225            JMP     DL41J1                / EXIT
54416  7401            1-1^2+7401                    /*1 VARIABLE LOCATIONS FOLLOW
54417  0000    DP341F, .-.                           / FUNCTION 3 = 'INVALID FUNCTION'
54420  6222            CIF     20
54421  1052            TAD     ZP0007                / CALL OF TBP22L(DISPLAY MESSAGE)
54422  4566            JMS  I  ZKB22L
54423  6222            CIF     20                    /
54424  4572            JMS  I  ZKB23S                / UNLOCK THE KEYBOARD
54425  6223    DL41J1, CDI     20
54426  5601            JMP  I  TDP341

54427  4627    DL41VJ, JMS  I  DL41T1-1              / BASIC ROUTING JUMP
54430  4511    DL41T1, TDP311
54431  2403    DL41T2, TDP314
```

```
54432  4417  DL41T3, DP341E
54433  6601  DL41T4, TDP322
54434  0102  DL41DC, ZBCDUA                            / A = DU ASSIGNMENT

              ////////////////////////////////////////////////////////////
              /                                                          /
              /   MODULE:  TDP342  RETURN DIALOGUE BUFFER CHAIN          /
              /                                                          /
              /   FUNCTION:   RETURNS CHAIN OF BUFFERS STARTING AT       /
              /               TDODTP IN TDC011 TO FREE POOL AND          /
              /               ZEROISES TDODTP                            /
              /                                                          /
              /   NO PARAMETERS                                          /
              /                                                          /
              /   CALLED BY DISCONNECTION COMPONENT                      /
              /                                                          /
              ////////////////////////////////////////////////////////////

54435  7401          1-1^2+7401                       /*1 VARIABLE LOCATIONS FOLLOW

54436  0000  TDP342, .-.
54437  6241  DL42J0, CDF      40
54440  1700          TAD   I  DL42C1                  / PICK UP START OF CHAIN FIELD
54441  7450          SNA                              / EXIT IF ZERO LINK
54442  5276          JMP      DL42J1
54443  3274          DCA      DL42P2                  / STORE AS PARA 2 FOR TAP525
54444  1701          TAD   I  DL42C2                  / PICK UP START OF CHAIN ADDRESS
54445  3273          DCA      DL42P1                  / STORE AS PARA 1 FOR TAP525
54446  7340          SM0001
54447  1273          TAD      DL42P1
54450  3010          DCA      ZAUT00
54451  1274          TAD      DL42P2
54452  1021          TAD      ZKCDF
54453  3255          DCA      DL42DF
54454  7401          1-1^2+7401                       /*1 VARIABLE LOCATIONS FOLLOW
54455  0000  DL42DF, 0                                / GET INTO CURRENT BUFFER FIELD
54456  1410          TAD   I  ZAUT00                  / PICK UP LINK WORDS
54457  7421          MQL
54460  1410          TAD   I  ZAUT00
54461  6241          CDF      40
54462  6002          IOF
54463  3701          DCA   I  DL42C2                  /// RESET START OF CHAIN
54464  7701          ACL                              ///
54465  3700          DCA   I  DL42C1                  ///
54466  6001          ION                              ///
54467  6251          CDF      50
54470  6202          CIF      0
54471  4427          JMS   I  ZKA525                  / FREE THE CURRENT BUFFER
54472  7403          2-1^2+7401                       /*2 VARIABLE LOCATIONS FOLLOW
54473  0000  DL42P1, 0                                / F = BUFFER ADDRESS
54474  0000  DL42P2, 0                                / G = BUFFER DF
54475  5237          JMP      DL42J0
54476  6251  DL42J1, CDF      50
54477  5636          JMP   I  TDP342                  / EXIT

54500  0103  DL42C1, ZDCDTP                           / G = BUFFERS START OF CHAIN DF
54501  0104  DL42C2, ZDCSAD                           / F = BUFFERS START OF CHAIN ADDRESS

              ////////////////////////////////////////////////////////////
              /                                                          /
              /   MODULE:  DLDEPR  DATA DEPOSITOR                        /
              /                                                          /
              ////////////////////////////////////////////////////////////

54502  7403          2-1^2+7401                       /*2 VARIABLE LOCATIONS FOLLOW

54503  0000  DLDEPR, .-.
54504  0000  DLDPDF, 0
54505  3417          DCA   I  ZAUT07
54506  6251          CDF      50
54507  5703          JMP   I  DLDEPR


              ////////////////////////////////////////////////////////////
              /                                                          /
              /   MODULE:  TDP311  CONTACT                               /
              /                                                          /
              /   FUNCTION:   CHECKS IF CONNECTION IS POSSIBLE           /
              /               CALLING TDP312 (CONTACT REQUEST) IF        /
              /               YES OTHERWISE DISPLAYING A MESSAGE         /
              /               USING TBP22L                               /
              /                                                          /
              /   PARAMETERS: NONE                                       /
              /                                                          /
                  CALLED BY TDP341 (CONVERSATIONS CONTROL)               /
              /                                                          /
              ////////////////////////////////////////////////////////////

54510  7401          1-1^2+7401                       /*1 VARIABLE LOCATIONS FOLLOW
54511  0000  TDP311, .-.
54512  4757          JMS   I  D11318                  / CONNECTION OK?
54513  7401          1-1^2+7401                       /*1 VARIABLE LOCATIONS FOLLOW
54514  0000  DL11R1, 0
54515  7440          SZA
```

```
54516  5351          JMP     DL11J0          / CONNECTION NOT POSSIBLE
54517  1314          TAD     DL11R1
54520  3335          DCA     DL11P2          / CONNECTION POSSIBLE
54521  6221          CDF     20
54522  1763          TAD  I  DL11DN          / PICK UP CURRENT DESK UNIT NO.
54523  3334          DCA     DL11P1          / FROM ZBCDUN IN FIELD 2
54524  1761          TAD  I  DL11IF          / SET UP PARAMETERS FOR CALL
54525  3345          DCA     DL11C1          / OF CONTACT REQUEST (POINTER
54526  1762          TAD  I  DL11IA          / TO INSERT LINE)
54527  3346          DCA     DL11C2
54530  6251          CDF     50              / SWAP IN THE CURRENT DESK
54531  6222          CIF     20              / UNIT CONTROL BLOCK FOR THE
54532  4557          JMS  I  ZKB213          / MODE RETURNED BY TOP318
54533  7403          2-1^2+7401              /*2 VARIABLE LOCATIONS FOLLOW
54534  0000  DL11P1, 0                       / DESK
54535  0000  DL11P2, 0                       / MODE
54536  7300          *KLEAR
54537  6242          CIF     40              / SWAP IN CNV CONTROL BLOCK
54540  4567          JMS  I  ZKD42C
54541  7301          XP0001                  / SET PRIMARY STATUS TO CONTACT
54542  3102          DCA     ZOCPRS
54543  4760          JMS  I  D11312          / CALL CONTACT REQUEST
54544  7403          2-1^2+7401              /*2 VARIABLE LOCATIONS FOLLOW
54545  0000  DL11C1, 0                       / INSERT LINE OF
54546  0000  DL11C2, 0                       / AND ADDRESS
54547  4756          JMS  I  DL11ES          / AMEND MODE AND PREPARE FOR DISPLAY
54550  5711          JMP  I  TOP311          / EXIT AFTER ATTEMPTING CONNECTION
54551  6222  DL11J0, CIF     20              / DISPLAY MESSAGE LINE USING
54552  4566          JMS  I  ZKB226          / INDEX RETURNED BY TOP318
54553  6222          CIF     20
54554  4572          JMS  I  ZKB23S          / UNLOCK K/B
54555  5711          JMP  I  TOP311          / EXIT WITHOUT ATTEMPTING CONNECTION

54556  2262  DL11BS, DL31BS                  / A= AMEND MODE ETC
54557  4306  D11318, TOP318                  / LINK TO CONNECTION OK ROUTINE
54560  3201  D11312, TOP312                  / LINK TO CONTACT REQUEST ROUTINE
54561  0112  DL11IF, ZBCILF
54562  0113  DL11IA, ZBCILA
54563  0101  DL11DN, ZBCDUN
             /
             /= LOCAL CONVERSATION ROUTINE TO ALLOCATE A
             /= CONVERSATION REFERENCE NUMBER
             /

54564  7403          2-1^2+7401              /*2 VARIABLE LOCATIONS FOLLOW
54565  0000  DLCVRF, 0                       / LOCALLY HELD CONVERSATION REFERENCE NO.
54566  0000  DLCNCR, .-.
54567  1365          TAD     DLCVRF          / ALLOCATE CONVERSATION REFERENCE TO PAGE ZERO FIELD
54570  0067          AND     ZP0377
54571  3112          DCA     ZPCOCR
54572  2365          ISZ     DLCVRF          / INCREMENT WRAP-ROUND CONVERSATION
54573  7000          NOP                     /    REFERENCE NUMBER
54574  5766  DLCNEN, JMP  I  DLCNCR
54575  0000          ZBLOCK  .+20067600-.    /*ZERO FILL PAGE
       4600  DLCEND=.

             $

AB5251 1733     DLSG11 2771     DL1CPD 4272     DL14D3 2725
AC6    7701     DLSGJ1 3362     DL1CPT 4271     DL14R1 2735
AKSIGC 1557     DLSGK1 3373     DL1CRC 4276     DL14R2 2736
AKSIL1 1555     DLSCDU 4173     DL1CR1 4277     DL14I1 2406
AKSIL0 1556     DLSCMR 4163     DL1CR2 4300     DL14J1 2440
AQAKPN 6411     DLSFHL 3374     DL1CR3 4301     DL14J2 2457
AQAKIP 0015     DLSTC1 2337     DL1CR4 4302     DL14J3 2475
AQGPPM 6403     DLSTC2 2370     DL1CR5 4303     DL14J4 2463
AQGPTP 0016     DLSTEX 2373     DL11AC 3330     DL14J5 2554
AGPRGF 0177     DLSTHD 2310     DL11BS 4556     DL14J6 2452
AQPRTY 0200     DLSTM1 2374     DL11C1 4545     DL14KB 2764
AQQIFS 0144     DLSTM2 2375     DL11C2 4546     DL14K2 2567
AQQRF1 5601     DLSTJ0 2327     DL11DN 4563     DL14K3 2570
AQQRF2 5704     DLSTJ1 2335     DL11IA 4562     DL14K4 2571
AQQRF3 6143     DLSTM1 2376     DL11IF 4561     DL14K5 2573
AQQRF4 6246     DLTOFR 4217     DL11J0 4551     DL14K6 2572
AQQTP1 7475     DL1AA1 3106     DL11P1 4534     DL14L4 2402
AQQTP2 7634     DL1ACH 3161     DL11P2 4535     DL14M2 2726
AQSOP  0001     DL1ACS 3157     DL11R1 4514     DL14RT 2773
AQ36SR 7157     DL1ACT 3156     DL12CF 3237     DL14SB 2566
BEVAMF 6232     DL1AC1 3051     DL12C1 3327     DL14SC 2565
BLTYPF 4402     DL1AC2 3164     DL12C2 3314     DL14S0 2602
BLZCC  0131     DL1ADA 3041     DL12C3 3320     DL14S1 2504
BLZPPA 0134     DL1ADF 3043     DL12C4 3310     DL14S2 2505
BLZPP  0133     DL1AFL 3002     DL12IL 3336     DL14TC 2762
BLZPKT 0126     DL1AIA 3126     DL12MB 3333     DL14TP 2601
BWVAF  5207     DL1AIF 3125     DL12MF 3332     DL1444 2763
CAM    7621     DL1AJB 3100     DL13C5 3713     DL15CY 3532
CDI    6203     DL1AJ2 3065     DL13DD 3623     DL15DD 3530
CLBDSB 3331     DL1AJ3 3064     DL13R1 3701     DL15DP 3536
DLCEND 4600     DL1AJ4 3111     DL13R2 3702     DL15DR 3531
DLCNCR 4566     DL1AJ5 3140     DL13IA 3736     DL15D1 3535
DLCNCS 3544     DL1AJ6 3142     DL13IF 3735     DL15H1 3415
DLCNEN 4574     DL1AKA 3162     DL13JA 3637     DL15H2 3416
DLCNSB 3337     DL1AK1 3160     DL13J1 3651     DL15J1 3426
DLCSPC 3570     DL1ALN 3163     DL13J2 3660     DL15J3 3515
DLCVR1 3567     DL1AS1 3001     DL13J3 3711     DL15M1 3534
```

DLCVRF 4565
DLCV30 3543
DLDEPR 4503
DLDPPF 4504
DLDTIP 4360
DLFAIL 4215
DLFSJ1 2623
DLK624 4371
DLRANG 4216
DLRETR 3573
DLRSDT 3571
DLRTDF 3574
DLSBC1 3361
DLSBDD 2765
DLSBGR 2766
DLSBDU 2770
DLSBP1 3351
DLSBP2 3352
DL18J1 4346
DL18J2 4347
DL18J4 4350
DL18K2 4353
DL19DD 3770
DL31FS 2262
DL31C1 4373
DL31C2 4374
DL31C3 4375
DL31C4 4376
DL317C 4212
DL317X 4213
DL4013 3334
DL4040 2303
DL41FC 4434
DL41J1 4425
DL41SR 4414
DL41T1 4430
DL41T2 4431
DL41T3 4432
DL41T4 4433
DL41V1 4427
DL42C1 4500
DL42C2 4501
DL42PF 4455
DL42J0 4437
DL42J1 4476
DL42P1 4473
DL42P2 4474
DL45SF 4160
D45FKA 0340
D96CDF 0350
D9ABFF 0151
D98BTA 0145
D98E1S 0146
D94CHS 0144
D4SP1F 0150
D41SPA 0147
D0ZACK 0126
D0ZDCK 0125
D0ZDES 0127
D0ZDHD 0124
DP341F 4117
D11312 1560
D11318 1557
D1331A 3742
D1331B 3743
D1431A 2562
D1431C 2561
D14318 2564
D16310 4132
D196SK 3753
D19123 3777
D19326 3776
FAP110 0000
TCP914 7335
TCP911 7266
TCP912 7401
TCP913 7414
TCP914 7432
TDC010 3400
TDC201 1717
TDC202 1737
TDC481 4201
TDC483 5001
TDC484 5401
TDC486 6001
TDC487 6601
TDC201 6001
TDC202 6401
TDP121 5202
TDP122 5405
TDP123 5242
TDP124 5535
TDP131 7202
TDP132 7401

DL1ATX 3165
DL1ADL 3171
DL1ASS 2304
DL1BAD 2215
DL1BCD 2214
DL1BC? 2302
DL1BC1 2222
DL1BJ1 2225
DL1BJ3 2246
DL1BJ4 2252
DL1BJ5 2255
DL1BK1 2306
DL1BMB 2305
DL1CAF 4304
DL1CCW 4274
DL1CK1 4270
DL1CK2 4266
DL1CPA 4273
FAP120 0000
FAP130 0000
FAP150 0000
FAP220 0000
FAP230 0000
FAP240 0000
FAP320 0000
FAP410 0000
FAP520 0000
FARFDF 0000
FAUS01 0000
FBC205 0030
FBP110 0000
FBP130 0000
FBP210 0020
FBP220 0020
FBP230 0020
FBP310 0010
FBP420 0030
FBP430 0010
FBP440 0020
FBP510 0010
FBP520 0010
FBP530 0010
FBF510 0010
FBP810 0040
FBP820 0040
FBP910 0030
FCP110 0010
FCP210 0010
FCP310 0010
FCP410 0010
FCP550 0010
FCP610 0010
FDC490 0030
FDP120 0050
FDP130 0050
FDP210 0050
FDP230 0050
FDP310 0050
FDP320 0050
FDP330 0050
FDP340 0050
FDP410 0040
FDP420 0040
FDP430 0040
FDP440 0040
FDP450 0040
FDP460 0040
FDP470 0040
FDP490 0040
TAC417 0265
TAB151 2042
TAD221 1561
TAD322 1072
TDP332 5601
TDP333 5077
TDP334 5137
TDP335 5161
TDP341 1401
TDP342 4436
TDP345 4143
TDP411 4043
TDP412 4201
TDP415 4430
TDP416 3741
TDP42A 0402
TDP426 2343
TDP42C 0711
TDP42D 2011
TDP42F 2025
TDP42H 0601
TDP42G 2001
TDP42H 1757
TDP421 1143
TDP421 1401

DL13J4 3740
DL13K2 3750
DL13K3 3751
DL13K4 3752
DL13MA 3745
DL13MD 3624
DL13MF 3746
DL13M1 3747
DL13PT 3601
DL13SB 3744
DL14BS 2563
DL14CD 2767
DL14CH 2401
DL14CR 2574
DL14C1 2422
DL14DP 2772
DL1401 2716
DL1402 2537
TAP118 4472
TAP121 4400
TAP129 2402
TAP131 4470
TAP134 4571
TAP151 2002
TAP152 2022
TAP153 2034
TAP154 2062
TAP212 0660
TAP223 1525
TAP235 7400
TAP236 6637
TAP237 6042
TAP239 6531
TAP242 3600
TAP243 3604
TAP244 0900
TAP322 0747
TAP323 1001
TAP324 1021
TAP411 0600
TAP412 0606
TAP416 0367
TAP417 0202
TAP521 1602
TAP525 1656
TAP529 1742
TAP611 1755
TAP612 1765
TAP417 0400
TAUS01 0200
TBCATL 0210
TBCDAL 0050
TBCFSP 1565
TBCNFP 1566
TBC132 2727
TBC205 2401
TBC210 2445
TBP541 0711
TBLBDF 4401
TBP111 2602
TBP131 3235
TBP132 3401
TBP211 4514
TBP212 4001
TBP213 4601
TBP22F 2563
TBP221 1657
TBP22L 2001
TBP22M 2511
TBP22R 3401
TBP22S 2601
TBP22U 2437
TBP22X 0202
TDP512 0235
TDP513 0243
TDP514 0277
TDP515 0341
TDP516 0347
TDR001 5601
TDZAC1 5626
TDZOAB 5605
TDZOCY 5617
TDZOSM 5602
TDZOTC 5604
TD4B3E 6000
TD4B7F 7600
WKLFAR 7300
WK4000 7330
WK5777 7352
WK6000 7333
WK7775 7346
WK7776 7344
WK7777 7340
WY0001 7340

DL15N2 3540
DL15N3 3541
DL15RT 3537
DL15TC 3533
DL16CS 4133
DL16DD 4134
DL16DP 4140
DL16HA 4016
DL16HF 4015
DL16J1 4076
DL16K3 4135
DL16K4 4136
DL16K5 4137
DL16M1 4141
DL16SA 4106
DL18AC 4356
DL18AM 4354
DL18CM 4355
TBP221 1401
TBP222 1444
TBP223 1500
TBP224 1601
TBP226 0401
TBP229 3201
TBP231 5143
TBP23J 5324
TBP23S 4361
TBP23X 5601
TBP23Z 6061
TBP31A 4404
TBP31F 5001
TBP315 3602
TBP422 0242
TBP423 0220
TBP424 0401
TBP425 0202
TBP431 5202
TBP432 5211
TBP434 5677
TBP437 6001
TBP438 6024
TBP44C 7555
TBP44D 6351
TBP44E 6253
TBP44F 7352
TBP44J 7601
TBP44K 7401
TBP44L 7212
TBP44M 7206
TBP44N 7202
TBP44R 7135
TBP44U 6414
TBP44V 7715
TBP441 6241
TBP451 7610
TBP512 1265
TBP521 2201
TBP522 2504
TBP523 2703
TBP532 0522
TBP533 0555
TBP541 1103
TBP542 1154
TBP551 2122
TBP811 0202
TBP821 1602
TBP911 7610
TBP919 7603
TCP111 6202
TCP213 7023
TCP311 6401
TCP551 7124
TCP611 7201
ZBCFTP 0114
ZDBSCL 0122
ZDCCAM 0115
ZDCCCL 0107
ZDCCCR 0114
ZDCCCY 0110
ZDCCDS 0103
ZDCCHS 0117
ZDCCLM 0106
ZDCCLT 0113
ZDCCOS 0102
ZDCCSM 0107
ZDCCSP 0111
ZDCCVR 0116
ZDCDAT 0104
ZDCDBF 0123
ZDCDES 0101
ZDCDTP 0103
ZDCFLD 0110
ZDCFLG 0111
ZDCFLM 0105

```
TDP133 7311
TDP134 7460
TDP135 7463
TDP137 7357
TDP211 0402
TDP212 0601
TDP214 2122
TDP221 0507
TDP224 1265
TDP236 1070
TDP31A 3003
TDP31B 2202
TDP31C 4224
TDP311 4511
TDP312 3201
TDP313 3602
TDP314 2403
TDP315 3401
TDP316 3001
TDP317 1201
TDP318 4306
TDP319 3755
TDP32A 6420
TDP32B 6504
TDP321 6273
TDP322 6601
TDP323 7001
TDP324 6401
TDP325 6061
TDP326 6201
TDP327 5623
TDP328 6050
TDP329 6112
TDP331 4603
TDP422 1201
TDP423 1606
TDP424 2212
TDP425 2231
TDP426 3001
TDP427 2201
TDP428 0460
TDP429 2401
TDP431 5401
TDP432 5430
TDP433 5601
TDP441 3055
TDP442 3201
TDP448 3225
TDP449 3142
TDP451 6202
TDP452 6242
TDP453 6601
TDP454 5401
TDP455 6646
TDP456 6717
TDP457 6467
TDP461 7201
TDP462 6330
TDP463 7401
TDP464 7601
TDP471 6001
TDP472 6032
TDP473 6056
TDP474 5643
TDP491 3402
TDP492 3146
TDP493 3462
TDP511 0202
*S0002 7344
*S0003 7346
*S2000 7333
*S2001 7352
*S4000 7330
*P0001 7301
*P0002 7305
*P0003 7325
*P0004 7307
*P0006 7327
*P0100 7203
*P2000 7332
*P3777 7350
ZARMEF 0133
ZAUT00 0010
ZAUT01 0011
ZAUT02 0012
ZAUT03 0013
ZAUT04 0014
ZAUT05 0015
ZAUT06 0016
ZAUT07 0017
ZBCALM 0105
ZBCAOS 0103
ZBCCTF 0110
ZBCDCP 0104
ZBCDUA 0102
ZBCOUS 0101
ZBCILA 0113
ZBCILF 0112
ZBCIVA 0122
ZBCFLT 0111
ZBCPG3 0120
ZBCPG1 0115
ZKB31A 0156
ZKB521 0175
ZKB522 0176
ZKB523 0177
ZKCDF  0021
ZKCDI  0023
ZKCIF  0022
ZKC213 0135
ZKC911 0173
ZKD329 0156
ZKD342 0136
ZKD345 0170
ZKD42A 0147
ZKD42B 0140
ZKD42C 0167
ZKD42F 0150
ZKD42G 0135
ZKD421 0152
ZKD422 0153
ZKD423 0154
ZKD424 0176
ZKD425 0177
ZKD426 0155
ZKD428 0151
ZKD429 0162
ZKD441 0141
ZKD453 0142
ZKD456 0143
ZKD457 0144
ZKD462 0145
ZKD463 0146
ZKD511 0130
ZKD512 0131
ZKD513 0132
ZKD514 0133
ZKD515 0134
ZKD516 0137
ZS0004 0074
ZS0005 0042
ZS0006 0043
ZS0010 0044
ZS0040 0045
ZS0120 0046
ZS0260 0047
ZP0003 [illegible]
ZP0005 0050
ZP0006 0051
ZP0007 0052
ZP0010 0053
ZP0017 0054
ZP0020 0055
ZP0037 0056
ZP0040 0057
ZP0060 0020
ZP0070 0060
ZDCLCH 0114
ZDCSCL 0121
ZDCSOL 0101
ZDCDAS 0113
ZDCGCR 0112
ZDCPKS 0120
ZDCPLN 0116
ZDCPRS 0102
ZDCPSC 0115
ZDCSAD 0104
ZDCTXS 0112
ZKA151 0036
ZKA152 0037
ZKA153 0040
ZKA154 0041
ZKA322 0031
ZKA323 0032
ZKA324 0033
ZKA416 0024
ZKA417 0025
ZKA521 0026
ZKA525 0027
ZKA529 0030
ZKB111 0035
ZKB213 0157
ZKB22L 0166
ZKB221 0160
ZKB222 0161
ZKB226 0163
ZKB229 0164
ZKB23J 0171
ZKB23S 0172
ZKB23X 0173
ZKB23Z 0174
ZP0077 0061
ZP0100 0062
ZP0120 0063
ZP0177 0064
ZP0200 0065
ZP0260 0066
ZP0377 0067
ZP0777 0076
ZP7000 0070
ZP7400 0071
ZP7600 0072
ZP7700 0073
ZP7777 0077
ZVKCRL 0126
ZSDRK1 0004
ZSDRK2 0005
ZSDRK3 0006
ZSDRK4 0007
```

ERRORS DETECTED: 0
LINKS GENERATED: 0

| | | | | | | |
|---|---|---|---|---|---|---|
| ACL | 1540 | | | | | |
| BLZCC# | 1370 | | | | | |
| BLZPRA | 1369 | | | | | |
| BLZPRD | 1368 | | | | | |
| BLZPRT | 1367 | | | | | |
| CO1 | 900 | 1063 | 1193 | 1301 | 1493 | |
| CL60SB | 680 | 759# | | | | |
| DLCEND | 94 | 1645# | | | | |
| DLC#CR | 371 | 756 | 1637# | 1643 | | |
| DLCNCS | 815 | 917# | 932 | 935 | 1219 | |
| DLCNFS | 1643# | | | | | |
| DLCNSB | 364 | 759 | 767# | 794 | | |
| DLCSPC | 925 | 926 | 937# | | | |
| DLCVK1 | 930 | 936# | | | | |
| DLCVRF | 1636# | 1638 | 1641 | | | |
| DLCVSD | 916# | 921 | 928 | 929 | 934 | |
| DLDEPR | 503 | 908 | 1221 | 1563# | 1567 | |
| DLDPDF | 498 | 902 | 1220 | 1564# | | |
| DLETIF | 938 | 1442# | 1450 | | | |
| DLFAIL | 1300 | 1303# | | | | |
| DLFSJ1 | 400# | 403 | | | | |
| DLK024 | 1445 | 1451# | | | | |
| DLRANG | 1298 | 1304# | | | | |
| DLRETR | 504 | 909 | 947# | 951 | | |
| DLRSPT | 920 | 938# | | | | |
| DLRTPF | 499 | 903 | 948# | | | |
| DLSGC1 | 781 | 765# | | | | |
| DLSBDD | 478 | 498# | | | | |
| DLSGDV | 414 | 449# | | | | |
| DLSGDD | 407 | 450 | 501# | | | |
| DLSG#1 | 777# | 780 | | | | |
| DLSG#2 | 778# | 787 | 788 | 792 | | |
| DLSGT1 | 454 | 502# | | | | |
| DLSGJ1 | 786# | 796 | | | | |
| DLSGK1 | 766 | 745# | | | | |
| DLSCDB | 1267 | 1271# | | | | |
| DLSCSS | 166 | 761 | 1263# | 1274 | | |
| DLSEPL | 791 | 796# | | | | |
| DLSTC1 | 193 | 196# | | | | |
| DLSTC2 | 218 | 221# | | | | |
| DLSTEX | 224# | | | | | |
| DLSTDD | 173# | 224 | 1067 | | | |
| DLST#1 | 192 | 217 | 226# | | | |
| DLST#2 | 188 | 215 | 227# | | | |
| DLST16 | 188# | 205 | | | | |
| DLSTJ1 | 194# | 200 | | | | |
| DLSTK1 | 206 | 228# | | | | |
| DLTDER | 1225 | 1307# | | | | |
| DL1AA1 | 596# | | | | | |
| DL1ACH | 545 | 642# | | | | |
| DL1ACS | 578 | 619 | 622 | 640# | | |
| DL1ACT | 541 | 639# | | | | |
| DL1AC1 | 561 | 566# | | | | |
| DL1AC2 | 571 | 645# | | | | |
| DL1ADA | 561# | 568 | | | | |
| DL1ADF | 560# | 563 | | | | |
| DL1AEL | 526# | 530 | 575 | 596 | 614 | |
| DL1ATA | 536 | 613# | | | | |
| DL1AIF | 533 | 612# | | | | |
| DL1AJ# | 585 | 589# | | | | |
| DL1AJ2 | 549 | 576# | | | | |
| DL1AJ3 | 553 | 574 | 577# | | | |
| DL1AJ4 | 588 | 590# | | | | |
| DL1AJ5 | 605 | 616 | 624# | | | |
| DL1AJ6 | 591 | 626# | | | | |
| DL1AKA | 544 | 643# | | | | |
| DL1AK1 | 539 | 641# | | | | |
| DL1AL# | 543 | 627 | 634# | | | |
| DL1AS1 | 525# | 529 | 538 | 599 | 608 | |
| DL1ATX | 596 | 616# | | | | |
| DL1ADL | 630 | 650# | | | | |
| DL1ASS | 124 | 131 | 159 | 165# | | |
| DL16AD | 108# | 115 | | | | |
| DL16CD | 107# | 110 | | | | |
| DL16C# | 117 | 122 | 127 | 132 | 160 | 163# |
| DL16C1 | 111 | 113# | | | | |
| DL16J1 | 100 | 116# | | | | |
| DL16J3 | 121 | 126 | 133# | | | |
| DL16J4 | 130 | 137# | | | | |
| DL16J5 | 136 | 140# | | | | |
| DL16K1 | 161 | 167# | | | | |
| DL16#B | 140 | 166# | | | | |
| DL1CAS | 1331 | 1378# | | | | |
| DL1CC# | 1339 | 1350 | 1362 | 1370# | | |
| DL1CK1 | 1344 | 1366# | | | | |
| DL1CK2 | 1346 | 1363# | | | | |
| DL1CKA | 1337 | 1349 | 1360 | 1369# | | |
| DL1CPD | 1335 | 1347 | 1358 | 1368# | | |
| DL1CPT | 1333 | 1345 | 1356 | 1367# | | |
| DL1CRC | 1348 | 1372# | | | | |
| DL1CR1 | 1373# | | | | | |
| DL1CR2 | 1374# | | | | | |
| DL1CR3 | 1375# | | | | | |
| DL1CR4 | 1376# | | | | | |

| | | | | | | | | | | |
|---|---|---|---|---|---|---|---|---|---|---|
| DL10E5 | 1377# | | | | | | | | | |
| DL11AC | 697 | 758# | | | | | | | | |
| DL11C5 | 1616 | 1624# | | | | | | | | |
| DL11C1 | 1598 | 1614# | | | | | | | | |
| DL11C2 | 1600 | 1615# | | | | | | | | |
| DL11D6 | 1595 | 1629# | | | | | | | | |
| DL111A | 1599 | 1628# | | | | | | | | |
| DL111F | 1597 | 1627# | | | | | | | | |
| DL1110 | 1591 | 1616# | | | | | | | | |
| DL11P1 | 1596 | 1605# | | | | | | | | |
| DL11P2 | 1593 | 1606# | | | | | | | | |
| DL11E1 | 1589# | 1592 | | | | | | | | |
| DL12CE | 672 | 699# | 739 | | | | | | | |
| DL12C1 | 710 | 714 | 753 | 757# | | | | | | |
| DL12C2 | 740 | 745# | | | | | | | | |
| DL12C3 | 743 | 749# | | | | | | | | |
| DL12C4 | 741# | 745 | | | | | | | | |
| DL121L | 702 | 703 | 709 | 752 | 764# | | | | | |
| DL1236 | 749 | 761# | | | | | | | | |
| DL12P0 | 688 | 690 | 760# | | | | | | | |
| DL13C5 | 1035 | 1040# | | | | | | | | |
| DL1300 | 975 | 984# | | | | | | | | |
| DL13P1 | 226 | 1030# | 1034 | | | | | | | |
| DL13P2 | 227 | 1031# | 1036 | | | | | | | |
| DL131A | 1053 | 1061# | | | | | | | | |
| DL131F | 1049 | 1060# | | | | | | | | |
| DL13JA | 992 | 996# | | | | | | | | |
| DL13J1 | 1006# | | | | | | | | | |
| DL13J2 | 1010 | 1013# | | | | | | | | |
| DL13J3 | 1038# | 1045 | | | | | | | | |
| DL13J4 | 995 | 998 | 1005 | 1012 | 1063# | | | | | |
| DL13K2 | 978 | 1071# | | | | | | | | |
| DL13K3 | 1056 | 1072# | | | | | | | | |
| DL13K4 | 1008 | 1073# | | | | | | | | |
| DL13MA | 1052 | 1068# | | | | | | | | |
| DL13M0 | 979 | 985# | | | | | | | | |
| DL13MF | 1048 | 1069# | | | | | | | | |
| DL13M1 | 1023 | 1070# | | | | | | | | |
| DL13PT | 966# | 970 | 973 | 1015 | | | | | | |
| DL13S8 | 1046 | 1067# | | | | | | | | |
| DL1465 | 332 | 362# | | | | | | | | |
| DL14CD | 413 | 500# | | | | | | | | |
| DL14C4 | 244# | 268 | 302 | | | | | | | |
| DL14CR | 325 | 371# | | | | | | | | |
| DL14C1 | 258 | 262# | | | | | | | | |
| DL140P | 384 | 486 | 488 | 503# | | | | | | |
| DL1401 | 451 | 452 | 459# | | | | | | | |
| DL14P2 | 306 | 326 | 334 | 336 | 341# | | | | | |
| DL1404 | 453 | 466# | | | | | | | | |
| DL1491 | 474# | 477 | | | | | | | | |
| DL1492 | 475# | 479 | 482 | 487 | | | | | | |
| DL1411 | 250# | 307 | 343 | 502 | | | | | | |
| DL14J1 | 273 | 276# | | | | | | | | |
| DL14J2 | 291# | 304 | | | | | | | | |
| DL14J3 | 305# | | | | | | | | | |
| DL14J4 | 292 | 295# | | | | | | | | |
| DL14J5 | 252 | 275 | 294 | 354# | | | | | | |
| DL14J6 | 280 | 286# | | | | | | | | |
| DL14K6 | 396 | 497# | | | | | | | | |
| DL14K2 | 256 | 366# | | | | | | | | |
| DL14K3 | 259 | 367# | | | | | | | | |
| DL14K4 | 276 | 368# | | | | | | | | |
| DL14K5 | 253 | 370# | | | | | | | | |
| DL14K6 | 346 | 350 | 369# | | | | | | | |
| DL14L1 | 245# | 263 | 271 | | | | | | | |
| DL14M2 | 455 | 467# | | | | | | | | |
| DL14N1 | 415 | 421 | 423 | 434 | 440 | 442 | 431 | 436 | 448 | 431 |
| | 483 | 485 | 504# | | | | | | | |
| DL1456 | 328 | 365# | | | | | | | | |
| DL14SC | 317 | 364# | | | | | | | | |
| DL14S0 | 365 | 383# | 494 | | | | | | | |
| DL14S1 | 255 | 312# | 501 | | | | | | | |
| DL14S2 | 308 | 313# | | | | | | | | |
| DL14TC | 398 | 404 | 495# | | | | | | | |
| DL14U0 | 361# | 383 | 411 | 416 | 491 | | | | | |
| DL1444 | 388 | 419 | 496# | | | | | | | |
| DL15CE | 861 | [illegible] | | | | | | | | |
| DL1500 | 831 | 902# | | | | | | | | |
| DL1560 | 837 | 844 | 904# | | | | | | | |
| DL15BP | 870 | 903# | | | | | | | | |
| DL1591 | 879 | 907# | | | | | | | | |
| DL15P1 | 827# | 830 | 869 | | | | | | | |
| DL15P2 | 828# | 832 | 873 | | | | | | | |
| DL1511 | 836# | 839 | | | | | | | | |
| DL15J3 | 891# | 893 | | | | | | | | |
| DL15S1 | 834 | 897 | 906# | | | | | | | |
| DL15S2 | 821 | 910# | | | | | | | | |
| DL15S3 | 867 | 911# | | | | | | | | |
| DL1561 | 875 | 877 | 909# | | | | | | | |
| DL15TC | 865 | 889 | 905# | | | | | | | |
| DL16C8 | 1130 | 1219# | | | | | | | | |
| DL1600 | 1141 | 1220# | | | | | | | | |
| DL1690 | 1155 | 1157 | 1167 | 1171 | 1173 | 1199 | 1221# | | | |
| DL169A | 1138# | 1143 | 1183 | | | | | | | |

```
DL16BF    1137#  1140
DL16J1    1188#  1191
DL16K3    1174   1221#
DL16K4    1185   1222#
DL16K5    1213   1223#
DL16M1    1070   1152   1225#
DL16SA    1129   1198#  1217
DL18AC    1415   1439#
DL18A?    1406   1437#
DL18C?    1402   1438#
DL18J1    1422   1430#
DL18J2    1405   1413   1417   1431#
DL18K1    1429   1432#
DL18K2    1430   1436#
DL19CB    1097   1101#
DL31BS     147#   157    162    362   1624
DL31C1    1334   1355   1454#
DL31C2    1336   1357   1455#
DL31C3    1338   1359   1456#
DL31C4    1340   1361   1457#
DL317C    1297   1300#
DL317X    1299   1301#
DL4013     750    762#
DL4040     114    164#
DL41DC    1477   1501#
DL41J1    1485   1493#
DL41SR    1475   1483#
DL41T1    1496   1497#
DL41T2    1498#
DL41T3    1499#
DL41T4    1500#
DL41VJ    1474   1496#
DL42C1    1520   1541   1553#
DL42C2    1524   1539   1554#
DL42DF    1531   1533#
DL42J0    1519#  1549
DL42J1    1522   1550#
DL42P1    1525   1527   1547#
DL42P2    1523   1529   1548#
DL45SF    1245   1255#
D35FPA    1068
D46CDF    1069
DP341B    1487#  1499
D11312    1612   1626#
D11318    1587   1625#
D1331A    1058   1065#
D1331B    1062   1066#
D1431A     339    361#
D1431C     352    360#
D14318     248    363#
D16318    1192   1218#
D19DSK    1087#  1095
D19123    1092   1106#
D19326    1091   1107#
TOC241     368
TOP123    1108
TOP137    1303
TOP211    1304
TOP31A     361    528#   531    532    534    535    537    637   1065
TOP31B      94     97#   143   1066   1218
TOP31C     360   1329#  1364
TOP311    1497   1586#  1617   1622
TOP312     668#   669    670    673    674    678    755   1626
TOP313     967#  1064
TOP314     247#   353    358   1498
TOP315     814#   901
TOP316    1124#  1194
TOP317    1291#  1302
TOP318     363   1398#  1399   1428   1432   1434   1625
TOP319    1011   1089#  1106
TOP322    1500
TOP326    1107
TOP341    1472#  1494
TOP342    1518#  1551
TOP345    1242#  1256
TOZACI    1439
TOZACY     904
TOZDIC     495    905
XFERER     100    152    314    476    562    636    779    829    986   1193
          1125   1139   1273   1607
Z0001      103    270    316    471    542    546    555    773    823    989
          1026   1133   1142   1426   1526
Z0002      176    196    550    871   1032   1101
Z0003      342    682   1410
Z0004      730
ZE0001     171    435    577    724    856    933    977   1423   1481   1610
ZE0002     274    361    469    924   1018   1022   1054   1151
ZE0003     167    916
ZE0004     201    293    333    390    466
ZA0100     207    209    211    213    277    282    283    295    305    880
           851    853    865   1033   1044   1528   1534   1536
ZA0101     191    199    260    263    265   1024   1038
ZA0102     306    367    371    392
ZA0103     706    736   1158
```

| | | | | | | | | | | |
|---|---|---|---|---|---|---|---|---|---|---|
| ZA0104 | 177 | 201 | | | | | | | | |
| ZA0105 | 399 | 400 | 1153 | 1154 | 1156 | 1175 | 1177 | 1179 | 1181 | |
| ZA0106 | 412 | 675 | 791 | 746 | 874 | 890 | 891 | 449 | | |
| ZA0107 | 480 | 833 | 840 | 1144 | 1164 | 1165 | 1169 | 1184 | 1565 | |
| ZOCAL? | 369 | 769 | 1437 | | | | | | | |
| ZOCDC? | 163 | 1438 | | | | | | | | |
| ZOCDDA | 1501 | | | | | | | | | |
| ZOCDDN | 370 | 1628 | 1629 | | | | | | | |
| ZOCHGA | 367 | 1626 | | | | | | | | |
| ZOCHLF | 366 | 1627 | | | | | | | | |
| ZOCHCL | 284 | | | | | | | | | |
| ZOCCA8 | 182 | 1160 | | | | | | | | |
| ZOCCCL | 642 | | | | | | | | | |
| ZOCCCR | 424 | 425 | 819 | | | | | | | |
| ZOCCCY | 186 | 1162 | | | | | | | | |
| ZOCCDS | 175 | 691 | 820 | 996 | | | | | | |
| ZOCCHS | 639 | | | | | | | | | |
| ZOCCLA | 644 | | | | | | | | | |
| ZOCCOS | 640 | | | | | | | | | |
| ZOCCSB | 922 | | | | | | | | | |
| ZOCCSP | 98 | 179 | 181 | 731 | 854 | 1148 | 1149 | | | |
| ZOCDAF | 228 | 967 | 1221 | | | | | | | |
| ZOCDOF | 278 | 1341 | 1482 | | | | | | | |
| ZOCLES | 148 | 153 | 683 | 717 | 863 | 1246 | 1249 | 1264 | | |
| ZOCLIP | 1553 | | | | | | | | | |
| ZOCLCB | 650 | | | | | | | | | |
| ZOC?CL | 286 | | | | | | | | | |
| ZOCGAP | 184 | 449 | 859 | 1207 | 1330 | | | | | |
| ZOCICR | 394 | 631 | 728 | 1003 | 1013 | 1640 | | | | |
| ZOCPKS | 937 | | | | | | | | | |
| ZOCLGS | 490 | 547 | 551 | 583 | 603 | 632 | 635 | 722 | 919 | 999 |
| | 1611 | | | | | | | | | |
| ZOCSAC | 1554 | | | | | | | | | |
| ZKA323 | 1448 | | | | | | | | | |
| ZKA525 | 1545 | | | | | | | | | |
| ZKA529 | 1419 | | | | | | | | | |
| ZKC213 | 310 | 357 | 461 | 942 | 1099 | 1269 | 1603 | | | |
| ZKC226 | 355 | 1490 | 1619 | | | | | | | |
| ZKC23S | 142 | 357 | 1105 | 1492 | 1621 | | | | | |
| ZKC23X | 151 | | | | | | | | | |
| ZKC316 | 1353 | | | | | | | | | |
| ZKK522 | 1617 | | | | | | | | | |
| ZKCOK | 257 | 671 | 1530 | | | | | | | |
| ZKCOT | 1244 | | | | | | | | | |
| ZKC213 | 331 | 677 | | | | | | | | |
| ZKG442 | 1090 | | | | | | | | | |
| ZKC315 | 429 | 726 | 1611 | | | | | | | |
| ZKI128 | 105 | 472 | 568 | 775 | 825 | 1028 | 1135 | | | |
| ZKI120 | 316 | 488 | 1503 | | | | | | | |
| ZK042F | 769 | 771 | | | | | | | | |
| ZK0421 | 581 | 598 | 625 | | | | | | | |
| ZK0423 | 593 | 610 | | | | | | | | |
| ZK0426 | 135 | | | | | | | | | |
| ZK0428 | 695 | 1211 | | | | | | | | |
| ZK0429 | 139 | 697 | | | | | | | | |
| ZK0441 | 899 | 1128 | | | | | | | | |
| ZK0511 | 319 | 692 | 845 | 1200 | | | | | | |
| ZK0512 | 389 | 393 | 395 | 401 | 409 | 418 | 420 | 422 | 426 | 427 |
| | 428 | 430 | 432 | 434 | 437 | 439 | 441 | 443 | 445 | 447 |
| | 711 | 713 | 715 | 716 | 720 | 725 | 727 | 729 | 733 | 735 |
| | 747 | 853 | 857 | 858 | 860 | 862 | 864 | 876 | 878 | 882 |
| | 884 | 886 | 892 | 1209 | 1212 | | | | | |
| ZK0513 | 753 | 1216 | | | | | | | | |
| ZKP514 | 462 | 895 | | | | | | | | |
| ZK0515 | 618 | 619 | 1001 | 1007 | 1020 | 1055 | 1116 | 1294 | | |
| ZK0516 | 178 | 181 | 183 | 185 | 194 | 208 | 210 | 212 | 219 | 836 |
| | 841 | 1159 | 1161 | 1166 | 1170 | 1172 | 1176 | 1178 | 1180 | 1188 |
| Z40005 | 119 | 155 | 385 | 633 | 993 | | | | | |
| Z40006 | 582 | 602 | 721 | | | | | | | |
| Z40010 | 1420 | | | | | | | | | |
| Z40019 | 782 | | | | | | | | | |
| ZP0005 | 214 | 567 | 1006 | 1293 | 1427 | | | | | |
| ZP0006 | 433 | 1182 | | | | | | | | |
| ZP0007 | 591 | 817 | 852 | 1145 | 1215 | 1431 | 1489 | | | |
| ZP0010 | 335 | 417 | 968 | 999 | 1019 | 1050 | 1479 | | | |
| ZP0017 | 872 | | | | | | | | | |
| ZP0029 | 202 | 281 | 336 | 1051 | 1163 | | | | | |
| ZP0037 | 971 | 1253 | | | | | | | | |
| ZP0060 | 405 | 408 | | | | | | | | |
| ZP0077 | 118 | 149 | 151 | 300 | 493 | 684 | 1251 | 1403 | 1408 | |
| ZP0200 | 712 | | | | | | | | | |
| ZP0377 | 1208 | 1639 | | | | | | | | |
| ZP7700 | 128 | 260 | 237 | 718 | 864 | 1265 | | | | |
| ZP7777 | 1295 | | | | | | | | | |
| Z?0881 | 189 | 197 | 198 | 216 | 222 | 290 | 291 | 329 | 337 | 344 |
| | 348 | 569 | 570 | 686 | 689 | 783 | 789 | 835 | 838 | 888 |
| | 603 | 1167 | 1170 | 1409 | 1411 | 1424 | | | | |
| ZX0882 | 296 | 298 | 397 | 402 | 696 | 734 | 842 | 843 | 851 | 1037 |
| | 1041 | 1032 | | | | | | | | |
| Z40884 | 738 | 741 | | | | | | | | |

```
                         / DP3350.8B
                         /
                         /         %%%%%%%%%%%%%%%%%%%%%%%%%%%%%%%%%%%%%%%%%%%%%%%%%%%%%%%%%%%%%
                         /         %                                                           %
                         /         %                       PROPRIETARY.                        %
                         /         %                                                           %
                         /         %  THIS DOCUMENT CONTAINS INFORMATION PROPRIETARY TO        %
                         /         %  REUTERS LIMITED AND IS NOT TO BE REPRODUCED AND/OR       %
                         /         %  USED IN WHOLE OR IN PART WITHOUT THE EXPRESS WRITTEN     %
                         /         %  PERMISSION OF REUTERS LIMITED.                           %
                         /         %                                                           %
                         /         %%%%%%%%%%%%%%%%%%%%%%%%%%%%%%%%%%%%%%%%%%%%%%%%%%%%%%%%%%%%%
                         /
                         /

                         /
                         /        MODULE  MAPS50.8B 26-FEB-80
                         /        SYSTEM MAP FILE
                         /
                         /        MODULE MAPC50.8B 25-FEB-80
                         /        CONVERSATIONS MAP FILE
                         /
                         /        MODULE FCE050.8B 16-JAN-80
                         /        FIXED PAGE ZERO CONSTANTS AND COMMON DATA EQUATES FIELD 4 & 5

                         ////////////////////////////////////////////////////////////////
                         /                                                              /
                         / COMPONENT:     LEFT MESSAGES   DP3350.8B                     /
                         /                                                              /
                         / DATE:          JUNE 1979                                     /
                         /                                                              /
                         / AUTHOR:        J.DOCHERTY                                    /
                         /                                                              /
                         / MODULES:                                                     /
                         /                TDP331 - LEAVE MESSAGE                        /
                         /                TDP332 - LEAVE MESSAGE REPLY RECIEVED         /
                         /                TDP333 - LEAVE MSG. STATEMENT RECIEVED        /
                         /                TDP334 - PRINT LEFT MESSAGE                   /
                         /                TDP335 - MESSAGE LEAVING ENDED                /
                         /                                                              /
                         ////////////////////////////////////////////////////////////////

               0005              FIELD   5
               4600              *4600
        54600  0400              0^4000+DL3END-TDP331+3  /*ELEMENT:TYPE 0:SIZE DL3END-TDP331+3
                         ////////////////////////////////////////////////////////////////
                         /                                                              /
                         /   MODULE:  TDP331  LEAVE MESSAGE                             /
                         /                                                              /
                         /   FUNCTION:    TO FORM AND SEND A LEAVE MESSAGE REQUEST/
                         /                IF IT IS POSSIBLE TO SEND A VALID ONE.        /
                         /                                                              /
                         /   INPUT PARAMETERS:    NONE                                  /
                         /                                                              /
                         /   CALLED BY:  TDP494 (ACTION TRANSMIT - DIALOGUE)            /
                         /                                                              /
                         ////////////////////////////////////////////////////////////////

        54601  7403              2-1^2+7401                    /*2 VARIABLE LOCATIONS FOLLOW
        54602  0000      DL31MC, 0
        54603  0000      TDP331, .-.
        54604  6221              CDF      20
        54605  1747              TAD  I   DL31TF
        54606  1021              TAD      ZKCDF                / SET UP CDF TO
        54607  3213              DCA      DL31C1               / INSERT LINE
        54610  1750              TAD  I   DL31TA               / GET START ADDRESS
        54611  3015              DCA      ZAUTO5               / OF INSERT LINE
        54612  7401              1-1^2+7401                    /*1 VARIABLE LOCATIONS FOLLOW
        54613  0000      DL31C1, 0
        54614  1415              TAD  I   ZAUTO5               / PICK UP NO. OF CHARS
        54615  3004              DCA      ZWORK1               / IN INSERT LINE
        54616  1004              TAD      ZWORK1
        54617  1342              TAD      DL31K1               / IF MORE THAN 14 CHARS
        54620  6251              CDF      50                   /
        54621  7700              SMA CLA                       / IN INSERT LINE - ERROR!
        54622  5335              JMP      DL31J1
        54623  6222              CIF      20                   / VALID PROCESSING STARTS HERE
        54624  4574              JMS  I   ZKB23Z               / LOCK KEYBOARD
        54625  4570              JMS  I   ZKD345               / CALCULATE PORT NUMBER
        54626  1345              TAD      DL31K4               / SET RELEASE INDICATOR
        54627  6212              CIF      10
        54630  4576              JMS  I   ZKB522               / RELEASE PORT PREVIOUSLY
                                                               / RESERVED FOR CONVERSATION
        54631  1202              TAD      DL31MC               / ALLOCATE A MESSAGE REFERENCE
        54632  0067              AND      ZP0377
        54633  3112              DCA      ZDCOCR
        54634  2202              ISZ      DL31MC               / INCREMENT LOCALLY HELD COUNT
        54635  7000              NOP                           / MESSAGE REFERENCE
        54636  4530              JMS  I   ZKD511               / INITIATE OUTPUT
        54637  7777              -1                            / LEAVE MESSAGE PROCESSING
        54640  1346              TAD      DL31K5               / STORE RECORD LENGTH
        54641  1004              TAD      ZWORK1
```

```
54642  4531           JMS  I  ZKD512
54643  1343           TAD     DL31K2           / SET UP RECORD TYPE
54644  4531           JMS  I  ZKD512
54645  7327           WP0006
54646  4531           JMS  I  ZKD512           / SET NON-PACKED LENGTH
54647  4531           JMS  I  ZKD512           / STORE VALIDITY
54650  1101           TAD     ZDCDES
54651  7002           BSW
54652  0061           AND     ZP0077           / STORE DESK UNIT NUMBER.
54653  4531           JMS  I  ZKD512
54654  1112           TAD     ZDCOCR           / STORE OWN CONVERSATION REFERENCE
54655  4531           JMS  I  ZKD512
54656  7327           WP0006                   / SET MQ = OFFSET OF
54657  7421           MQL                      / SUBSCRIBER MNEMONIC
54660  7340           WM0001                   / SET AC FOR HEADING LINE
54661  6242           CIF     40
54662  4540           JMS  I  ZKD428           / FIND POSITION OF SUBSCRIBER MNEMONIC
54663  7403           2-1^2+7401               /*2 VARIABLE LOCATIONS FOLLOW
54664  0000   DL31C5, 0                        / G - BUFFER CDF
54665  0000   DL31C6, 0                        / F - FRA OF WORD WITHIN BUFFER
54666  7346           WM0003                   / SET LENGTH OF
54667  3005           DCA     ZWORK2           /  COPY LOOP
54670  1264           TAD     DL31C5           / SET BUFFER CDF TO PICK UP
54671  3276           DCA     DL31C7           /  FROM HEADING LINE
54672  2005   DL31C8, ISZ     ZWORK2           / END OF LOOP ?
54673  7410           SKP
54674  5304           JMP     DL31C9
54675  7401           1-1^2+7401               /*1 VARIABLE LOCATIONS FOLLOW
54676  0000   DL31C7, 0                        / G - HEADING LINE CDF
54677  1665           TAD  I  DL31C6           / PICK UP AND
54700  6251           CDF     50
54701  4531           JMS  I  ZKD512           / STORE SUBSCRIBER MNEMONIC WORD
54702  2265           ISZ     DL31C6           / INCREMENT FRA
54703  5272           JMP     DL31C8
54704  1213   DL31C9, TAD     DL31C1           / SET UP CDF INTO INSERT
54705  3320           DCA     DL31C2           / LINE BUFFER.
54706  1004           TAD     ZWORK1
54707  7110           CLL RAR                  / CALCULATE LENGTH
54710  7430           SZL                      / OF COPY LOOP
54711  7001           IAC
54712  7040           CMA
54713  3005           DCA     ZWORK2
54714  2005   DL31C3, ISZ     ZWORK2           / END OF LOOP ?
54715  7410           SKP
54716  5325           JMP     DL31C4
54717  7401           1-1^2+7401               /*1 VARIABLE LOCATIONS FOLLOW
54720  0000   DL31C2, 0                        / COPY LOOP FOR INSERT
54721  1415           TAD  I  ZAUTO5           / LINE TEXT
54722  6251           CDF     50
54723  4531           JMS  I  ZKD512
54724  5314           JMP     DL31C3
54725  1344   DL31C4, TAD     DL31K3           / SET UP PARAMETERS
54726  7421           MQL                      / REQUIRED TO SEND
54727  1346           TAD     DL31K5           / A LEAVE MESSAGE
54730  1004           TAD     ZWORK1           / REQUEST.
54731  4532           JMS  I  ZKD513           / SEND IT
54732  7305           WP0002
54733  3104           DCA     ZDCLDS           / SET UP SECONDARY STATUS
54734  5340           JMP     DL31I2           / EXIT
54735  7305   DL31I1, WP0002                   / INVALID PROCESSING HERE
54736  6222           CIF     20               / DISPLAY "INVALID SYNTAX" AND EXIT
54737  4566           JMS  I  ZKD27L
54740  6243   DL31I2, CDI     40
54741  5603           JMP  I  TDP331

54742  7761   DL31K1, -17              / CONSTANT FOR CHECKING VALID INSERT LINE LENGTH
54743  0202  *DL31K2, 202              / RECORD TYPE - 130 DECIMAL
54744  4013   DL31K3, 4013             / PARAMETER FOR CALL OF TDP513
54745  4000   DL31K4, 4000             / CONSTANT FOR SETTING RELEASE INDICATOR
54746  0012   DL31K5, 12               / CONSTANT FOR SETTING RECORD LENGTH
54747  0112   DL31IF, ZBCILF           / LINK TO INSERT LINE FIELD
54750  0113   DL31IA, ZBCILA           / LINK TO INSERT LINE ADDRESS


              /
              / SUBROUTINE USED BY TDP333 TO PICK UP NO. OF LEFT
              / MESSAGES ACCORDING TO CNV/CNB FLAG
              /
54751  7401           1-1^2+7401               /*1 VARIABLE LOCATIONS FOLLOW
54752  0000   GETLMG, .-.
54753  1123           TAD     ZDCDBF           / GET CNV/CNB FLAG
54754  7650           SNA CLA                  / BONDS ?
54755  5360           JMP     GTLM01           / NO
54756  1122           TAD     ZDBNCL           / YES - PICK UP BONDS NO OF CALLS/LEFT MSGS
54757  5752           JMP  I  GETLMG           / RETURN TO CALLER
54760  1121   GTLM01, TAD     ZDCNCL           / PICK UP CNV NO OF CALLS/LEFT MESSAGES
54761  5752           JMP  I  GETLMG           / RETURN TO CALLER


              /
              / SUBROUTINE USED BY TDP333 TO SAVE NO. OF
              / LEFT MESSAGES ACCORDING TO CNV/CNB FLAG
              /
```

```
54762  7403          2-1^2+7401                 /*2 VARIABLE LOCATIONS FOLLOW
54763  0000  LMGCNT, 0                          / TEMP STORE
54764  0000  SAVLMG, .-.
54765  3363          DCA     LMGCNT             / HOLD NEW VALUE TEMP.
54766  1123          TAD     ZDCDBF             / GET CNV/CN2 FLAG
54767  7450          SNA CLA                    / BONDS ?
54770  5374          JMP     SVLM01             / NO
54771  1363          TAD     LMGCNT             / YES - GET NEW VALUE
54772  3122          DCA     ZDBNCL             / SAVE AS CN8 NO OF CALLS/LEFT MSGS
54773  5764          JMP  I  SAVLMG             / RETURN TO CALLER
54774  1363  SVLM01, TAD     LMGCNT             / GET NEW VALUE
54775  3121          DCA     ZDCNCL             / SAVE AS CNV NO OF CALLS/LEFT MSGS
54776  5764          JMP  I  SAVLMG             / RETURN TO CALLER

             ////////////////////////////////////////////////////////////
             /                                                          /
             /   MODULE:  TDP332  LEAVE MESSAGE REPLY RECEIVED          /
             /                                                          /
             /   FUNCTION:   CHECKS THE VALIDITY OF A RECEIVED LEAVE    /
             /               MESSAGE REPLY, SENDING A STATS RECORD      /
             /               IF THE REPLY WAS VALID                     /
             /                                                          /
             /   INPUT PARAMETERS:   NONE                               /
             /                                                          /
             /   CALLED BY:  TDP492 (CONVERSATIONS RECEPTION)           /
             /                                                          /
             ////////////////////////////////////////////////////////////

54777  0000          ZBLOCK  .+200&7600-.       /*ZERO FILL PAGE
55000  7401          1-1^2+7401                 /*1 VARIABLE LOCATIONS FOLLOW
55001  0000  TDP332, .-.
55002  4236          JMS     DL32VL             / CALL LOCAL VALIDATION
                                                / ROUTINE FOR MODE CN1
55003  7450          SNA
55004  5210          JMP     DL32J1
                                                / CALL LOCAL VALIDATION
55005  4236          JMS     DL32VL             / ROUTINE FOR MODE CN2
55006  7640          SZA CLA
55007  5231          JMP     DL32J4             / EXIT FOR UNEXPECTED MESSAGE
55010  1050  DL32J1, TAD     ZP0005
55011  4534          JMS  I  ZKD515             / GET VALIDITY OF LEAVE MESSG. REPLY.
55012  1077          TAD     ZP7777             / CHECK VALIDITY IS 1
55013  7450          SNA                        / NO - ERROR
55014  5221          JMP     DL32J2             /
55015  7001          IAC                        / GET VALIDITY BACK
55016  6222          CIF     20                 /
55017  4566          JMS  I  ZKB22L             / DISPLAY ERROR MESSAGE
55020  5230          JMP     DL32J3             / GO TO LEAVE MSG. REPLY
55021  7305  DL32J2, WP0002                     / CALCULATE LENGTH OF
55022  4534          JMS  I  ZKD515             / LEAVE MESSAGE REPLY
55023  1234          TAD     DL32K1
55024  6241          CDF     40
55025  3633          DCA  I  DL32CH             / STORE IN TDSCHS ON FIELD 4
55026  6251          CDF     50
55027  4337          JMS     TDP334             / CALL PRINT LEFT MESSAGE ROUTINE
55030  4341  DL32J3, JMS     TDP335             / CALL COMMON LEAVE MESSAGE PROCESSING
55031  6243  DL32J4, CDI     40
55032  5601          JMP  I  TDP332

55033  0117  DL32CH, ZDCCHS
55034  7724  DL32K1, -54                        / -60(8)+4

             EJECT
             /
             /= LOCAL ROUTINE TO VALIDATE THAT EITHER CN1 OR CN2 IS EXPECTING
             /= A LEAVE MESSAGE REPLY RETURNING A NON-ZERO ACC. FOR AN INVALID
             /= MODE. A VALID MODE LEAVES THE CORRECT CONTROL BLOCKS IN CORE.
             /

55035  7401          1-1^2+7401                 /*1 VARIABLE LOCATIONS FOLLOW
55036  0000  DL32VL, .-.
55037  1275          TAD     DL32K2             / ADD 4 TO GIVE MODE
55040  3251          DCA     DL32M1
55041  6221          CDF     20
55042  1674          TAD  I  DL32DU             / GET DESK UNIT FOR CALL OF TBP213
55043  3250          DCA     DL32D1             / AND TDP42C
55044  6251          CDF     50
55045  6222          CIF     20
55046  4557          JMS  I  ZKB213             / SWAP IN D.U. CONTROL BLOCK
55047  7403          2-1^2+7401                 /*2 VARIABLE LOCATIONS FOLLOW
55050  0000  DL32D1, 0                          / FOR CORRECT MODE
55051  0000  DL32M1, 0
55052  7700          WKLEAR
55053  6242          CIF     40                 / SWAP IN CONVERSATION CONTROL
55054  4567          JMS  I  ZKD42C             / BLOCK FOR CURRENT D.U. MODE.
55055  7340          WM0001                     / CHECK PRIMARY STATUS = CONTACT (=1)
55056  1102          TAD     ZDCPRS
55057  7640          SZA CLA
55060  5272          JMP     DL32JE             / ERROR EXIT
55061  7344          WM0002                     / CHECK SECONDARY STATUS = LEAVE
55062  1103          TAD     ZDCCDS             / MESSAGE REQUEST SENT (=2)
55063  7640          SZA CLA
55064  5272          JMP     DL32JE             / ERROR EXIT
```

```
55065  1052            TAD       ZP0007
55066  4534            JMS  I    ZKD515           / CHECK THAT ZDCOCR = MESSAGE
55067  7041            CIA                        / REFERENCE IN TDD332
55070  1112            TAD       ZDCOCR
55071  7640            SZA CLA
55072  7301    DL72JE, WP0001                     / SET ACC TO INDICATE ERROR
55073  5636            JMP  I    DL32VL

55074  0101    DL32DU, ZDCMON
55075  0004    DL32K2, 4

               EJECT
               ////////////////////////////////////////////////////////////////
               /                                                              /
               /   MODULE:  TDP333  LEAVE MESSAGE STATEMENT RECIEVED          /
               /                                                              /
               /   FUNCTION:   ACTS ON A LEFT MESSAGE STATEMENT OR            /
               /               LEFT MESSAGE COUNT RECORD RECIEVED             /
               /               FROM THE SERVICE FACILITY                      /
               /                                                              /
               /   INPUT PARAMETERS:   NONE                                   /
               /                                                              /
               /   CALLED BY:  TDP492  CONVERSATIONS RECEPTION                /
               /                                                              /
               ////////////////////////////////////////////////////////////////

55076  7401            1-1?2+7401                 /*1 VARIABLE LOCATIONS FOLLOW
55077  0000    TDP333, .-.
55100  7340            WM0001
55101  6211            CDF       10               / IF THE BROADCAST FLAG
55102  1732            TAD  I    DL33BF           / IS 1 THEN THIS IS THE
55103  6251            CDF       50               / FIRST OF UP TO SEVEN CALLS OF
55104  7640            SZA CLA                    / THIS ROUTINE AND SPECIAL
55105  5323            JMP       DL33J1           / PROCESSING IS PERFORMED
55106  1052            TAD       ZP0007
55107  4534            JMS  I    ZKD515           / GET THE LEFT MESSAGE COUNT FROM RECORD
55110  3004            DCA       ZWORK1
55111  4734            JMS  I    DL3GET           / UPDATE THE NO. OF LEFT MESSAGES
55112  0073            AND       ZP7700           / COUNT IN THE CALLS QUEUE CONTROL BLOCK
55113  1004            TAD       ZWORK1
55114  4735            JMS  I    DL3SAV
55115  7325            WP0003                     / GET THE RECORD TYPE
55116  4534            JMS  I    ZKD515
55117  1331            TAD       DL33K1           / IF RECORD TYPE 204 CALL
55120  7650            SNA CLA                    / PRINT LEFT MESSAGE ROUTINE
55121  4337            JMS       TDP334           / EXIT ANYWAY
55122  5327            JMP       DL33J2
55123  4733    DL33J1, JMS  I    DL3324           / SUBSEQUENT CALL PROCESSING
55124  1055            TAD       ZP0020           / DISPLAY THE 0 STATUS LINE IN THE
55125  6222            CIF       20               / CALLS QUEUE DISPLAY AREA
55126  4564            JMS  I    ZKB229           / FLASH IN THE LEFT MESSAGE DISPLAY
55127  6243    DL33J2, CDI       40               / EXIT
55130  5677            JMP  I    TDP333           / EXIT

55131  7574    DL33K1, -204             / CONSTANT TO CHECK RECORD TYPE
55132  4401    DL73BF, TBLBDF           / LINK TO BROADCAST FLAG
55133  1265    DL3324, TDP224           / LINK TO DISPLAY 0 STATUS LINE
55134  4752    DL3GET, GETLMG           / S/R TO PICK UP NO OF CALLS/LEFT MSGS
55135  4764    DL3SAV, SAVLMG           / S/R TO SAVE NO OF CALLS/LEFT MSGS

               EJECT
               ////////////////////////////////////////////////////////////////
               /                                                              /
               /   MODULE:  TDP334  PRINT LEFT MESSAGE                        /
               /                                                              /
               /   FUNCTION:   PRINTS A MESSAGE LEFT EITHER BY OUR            /
               /               PARTY OR THE COUNTERPARTY                      /
               /                                                              /
               /   INPUT PARAMETERS:   NONE                                   /
               /                                                              /
               /   CALLED BY:  TDP332 LEAVE MESSAGE REPLY RECIEVED            /
               /                                                              /
               ////////////////////////////////////////////////////////////////

55136  7401            1-1?2+7401                 /*1 VARIABLE LOCATIONS FOLLOW
55137  0000    TDP334, .-.
55140  1756            TAD  I    DL34DF           / GET THE FIELD OF THE
55141  0060            AND       ZP0070           / RECIEVED MESSAGE AND STORE
55142  3353            DCA       DL34P1           / AS PARAMETER TO PRINTER SUB, CALL
55143  7301            WP0001
55144  1053            TAD       ZP0010
55145  1757            TAD  I    DL34DA           / GET START ADDRESS OF MESSAGE TEXT AS 2ND PARA
55146  3354            DCA       DL34P2
55147  7305            WP0002                     / SET AC FOR CONVERSATION ITEM
55150  6202            CIF .     0
55151  4465            JMS  I    ZKP111           / INITIATE MESSAGE PRINTING
55152  7403            2-1?2+7401                 /*2 VARIABLE LOCATIONS FOLLOW
55153  0000    DL34P1, 0
55154  0000    DL34P2, 0
55155  5737            JMP  I    TDP334           / EXIT

55156  0360    DL34DF, DMSLDF
55157  0340    DL34DA, DMSLDA
```

```
                        EJECT
                        ////////////////////////////////////////////////////////////////////
                        /                                                                  /
                        /   MODULE:   TDP335   MESSAGE LEAVING ENDED                       /
                        /                                                                  /
                        /   FUNCTION:    PERFORMS THE NESCESSARY TIDYING UP                /
                        /                WHEN AN ATTEMPT TO LEAVE A MESSAGE                /
                        /                HAS ENDED                                         /
                        /                                                                  /
                        /   CALLED BY:   TDP132   CONVS. KEYBOARD LOCK TIMEOUT             /
                        /                                                                  /
                        ////////////////////////////////////////////////////////////////////

55160   7401                 1-1^2+7401            /*1 VARIABLE LOCATIONS FOLLOW
55161   0000   TDP335,       .-.
55162   6242                 CIF      40
55163   4546                 JMS  I   ZKD463       / SEND STATS RECORD TO SERVICE FACILITY
55164   7307                 WP0004
55165   3102                 DCA      ZDCPRS       / SET PRIMARY STATUS = ENDED
55166   7307                 WP0004
55167   3103                 DCA      ZDCCDS       / SET SECONDARY STATUS = SWITCH OFF
55170   6242                 CIF      40
55171   4562                 JMS  I   ZKD429       / UPDATE APPLICATION STATUS
55172   6222                 CIF      20
55173   4572                 JMS  I   ZKB238       / UNLOCK K/B
55174   5761                 JMP  I   TDP335       / EXIT
55175   0000                 ZBLOCK   .+200&7600-. /*ZERO FILL PAGE
        5200   DL3END=.

$
```

| | | | | | | | |
|---|---|---|---|---|---|---|---|
| AD525I | 1733 | DL32J4 | 5041 | FCP110 | 0010 | TAP416 | 0367 |
| ACL | 7701 | DL32K1 | 5064 | FCP210 | 0010 | TAP417 | 0202 |
| AKSILC | 1557 | DL32K2 | 5075 | FCP310 | 0010 | TAP521 | 1602 |
| AKSILL | 1555 | DL32M1 | 5051 | FCP410 | 0010 | TAP525 | 1656 |
| AKSILO | 1556 | DL32OL | 5036 | FCP550 | 0010 | TAP529 | 1742 |
| AQAAPA | 6411 | DL33BF | 5143 | FCP610 | 0010 | TAP611 | 1755 |
| AQANTP | 0015 | DL33J1 | 5123 | FDC480 | 0030 | TAP612 | 1365 |
| AQDPLR | 6403 | DL33J2 | 5127 | FDP120 | 0050 | TAR417 | 0400 |
| AQDPTP | 0016 | DL33K1 | 5131 | FDP130 | 0050 | TAUS01 | 0200 |
| AQPRNM | 0177 | DL3324 | 5133 | FDP210 | 0050 | TBC4IL | 0210 |
| AQPRTY | 0200 | DL34DA | 5157 | FDP230 | 0050 | TBCDAL | 0050 |
| AQQLMS | 0144 | DL34DF | 5156 | FDP310 | 0050 | TBCFSP | 1565 |
| AQRRB1 | 5601 | DL34P1 | 5153 | FDP320 | 0050 | TBCHFP | 1566 |
| AQQRB2 | 5704 | DL34P2 | 5154 | FDP330 | 0050 | TBC132 | 2727 |
| AQQRB3 | 6143 | DM5FRA | 0340 | FDP340 | 0050 | TBC205 | 2401 |
| AQQRB4 | 6246 | DM6CUF | 0350 | FDP410 | 0040 | TBC210 | 2445 |
| AQQTB1 | 7475 | DNABEF | 0151 | FDP420 | 0040 | TBD541 | 0711 |
| AQQTB2 | 7634 | DNHWIA | 0145 | FDP430 | 0040 | TBLOUF | 4401 |
| AQSDH | 0001 | DNHWIB | 0146 | FDP440 | 0040 | TBP111 | 2602 |
| BLZLCN | 0131 | DNNCHS | 0144 | FDP450 | 0040 | TBP131 | 3265 |
| BLZPPA | 0134 | DNOPTF | 0150 | FDP460 | 0040 | TBP132 | 3401 |
| BLZPAD | 0133 | DN15PA | 0147 | FDP470 | 0040 | TBP211 | 4514 |
| BLZPRT | 0126 | DOZALH | 0126 | FDP490 | 0040 | TBP212 | 4001 |
| BNUUFB | 5207 | DOZDCH | 0125 | GETLMG | 4752 | TBP213 | 4601 |
| CAM | 7621 | DOZDES | 0127 | GTLM01 | 4760 | TBP22I | 1657 |
| CDI | 6203 | DOZBUN | 0124 | LMSCNT | 4763 | TBP22L | 2001 |
| DL3END | 5200 | FAP110 | 0000 | SAVLMG | 4764 | TBP22M | 2511 |
| DL3GET | 5134 | FAP120 | 0000 | SVLM01 | 4774 | TBP22R | 3401 |
| DL3ANV | 5135 | FAP130 | 0000 | TAC417 | 0265 | TBP22S | 2601 |
| DL3101 | 4613 | FAP150 | 0000 | TAD151 | 2042 | TBP22U | 2437 |
| DL3102 | 4720 | FAP230 | 0000 | TAD221 | 1561 | TBP22X | 0207 |
| DL3103 | 4714 | FAP230 | 0000 | TAD322 | 1072 | TBP221 | 1401 |
| DL3104 | 4725 | FAP240 | 0000 | TAP11B | 4472 | TBP222 | 1444 |
| DL3105 | 4664 | FAP320 | 0000 | TAP121 | 4400 | TBP223 | 1500 |
| DL3106 | 4665 | FAP410 | 0000 | TAP129 | 2402 | TBP224 | 1601 |
| DL3107 | 4676 | FAP520 | 0000 | TAP131 | 4470 | TBP226 | 0401 |
| DL3108 | 4672 | FARMDE | 0000 | TAP134 | 4571 | TBP229 | 3201 |
| DL3109 | 4704 | FAUS01 | 0000 | TAP151 | 2002 | TBP23I | 3143 |
| DL31TA | 4750 | FBC205 | 0030 | TAP152 | 2022 | TBP23J | 3324 |
| DL31TF | 4747 | FBP110 | 0000 | TAP153 | 2034 | TBP23S | 4361 |
| DL31J1 | 4735 | FBP130 | 0000 | TAP154 | 2062 | TBP23X | 5601 |
| DL31J2 | 4740 | FBP210 | 0020 | TAP212 | 0660 | TBP23Z | 6051 |
| DL31K1 | 4742 | FBP220 | 0020 | TAP223 | 1525 | TBP31A | 4404 |
| DL31K2 | 4743 | FBP230 | 0020 | TAP235 | 7400 | TBP31R | 5001 |
| DL31K3 | 4744 | FBP310 | 0010 | TAP236 | 6637 | TBP31S | 3602 |
| DL31K4 | 4745 | FBP420 | 0030 | TAP237 | 6042 | TBP422 | 0242 |
| DL31K5 | 4746 | FBP430 | 0010 | TAP239 | 6531 | TBP423 | 0290 |
| DL31NO | 4602 | FBP440 | 0020 | TAP242 | 3600 | TBP424 | 0401 |
| DL32CH | 5033 | FBP510 | 0010 | TAP243 | 3604 | TBP425 | 0202 |
| DL32GO | 5074 | FBP520 | 0010 | TAP244 | 0000 | TBP431 | 5202 |
| DL3201 | 5050 | FBP530 | 0010 | TAP322 | 0747 | TBP432 | 5211 |
| DL32IE | 5072 | FBP540 | 0010 | TAP323 | 1001 | TBP434 | 5477 |
| DL32J1 | 5010 | FBP810 | 0040 | TAP324 | 1021 | TBP436 | 6001 |
| DL32J2 | 5021 | FBP820 | 0040 | TAP411 | 0600 | TBP437 | 6021 |
| DL32J3 | 5030 | FBP910 | 0030 | TAP412 | 0606 | TBP438 | 7047 |
| TBP44C | 7555 | TDP212 | 0601 | TDP428 | 0510 | WM2000 | 7333 |
| TBP44D | 6351 | TDP224 | 1265 | TDP429 | 2401 | WM2001 | 7352 |
| TBP44E | 6253 | TDP236 | 1070 | TDP431 | 5401 | WM4000 | 7330 |
| TBP44F | 7354 | TDP31A | 3003 | TDP432 | 5430 | WP0001 | 7301 |
| TBP44J | 7601 | TDP31B | 2202 | TDP433 | 5601 | WP0002 | 7305 |
| TBP44K | 7401 | TDP31C | 4240 | TDP434 | 5471 | WP0003 | 7325 |
| TBP44L | 7212 | TDP311 | 4515 | TDP435 | 5476 | WP0004 | 7307 |

| | |
|---|---|
| TBP44M | 7206 |
| TBP44N | 7202 |
| TBP44R | 7132 |
| TBP44U | 6414 |
| TBP44V | 7715 |
| TBP441 | 6241 |
| TBP512 | 1272 |
| TBP521 | 2201 |
| TBP522 | 2504 |
| TBP523 | 2703 |
| TBP532 | 0522 |
| TBP533 | 0555 |
| TBP541 | 1103 |
| TBP542 | 1154 |
| TBP551 | 2122 |
| TBP811 | 0202 |
| TBP821 | 1602 |
| TBP911 | 7610 |
| TBP919 | 7603 |
| TCP111 | 6202 |
| TCP213 | 7023 |
| TCP311 | 6401 |
| TCP551 | 7120 |
| TCP611 | 7201 |
| TCP911 | 7266 |
| TCP912 | 7401 |
| TCP913 | 7414 |
| TCP914 | 7432 |
| TDC010 | 3400 |
| TDC201 | 1717 |
| TDC202 | 1737 |
| TDC481 | 4201 |
| TDC483 | 5001 |
| TDC484 | 5401 |
| TDC486 | 6001 |
| TDC487 | 6601 |
| TDD201 | 0001 |
| TDD202 | 0461 |
| TDP121 | 5202 |
| TDP122 | 5405 |
| TDP123 | 5242 |
| TDP124 | 5535 |
| TDP131 | 7202 |
| TDP132 | 7401 |
| TDP133 | 7311 |
| TDP134 | 7460 |
| TDP135 | 7463 |
| TDP211 | 0402 |
| TDP312 | 3201 |
| TDP313 | 3602 |
| TDP314 | 2403 |
| TDP315 | 3401 |
| TDP316 | 4001 |
| TDP317 | 4201 |
| TDP318 | 4322 |
| TDP319 | 3755 |
| TDP32A | 6420 |
| TDP32B | 6504 |
| TDP321 | 6323 |
| TDP322 | 6601 |
| TDP323 | 7001 |
| TDP324 | 6401 |
| TDP325 | 6001 |
| TDP326 | 6201 |
| TDP327 | 5623 |
| TDP328 | 6050 |
| TDP329 | 6112 |
| TDP331 | 4603 |
| TDP332 | 5001 |
| TDP333 | 5077 |
| TDP334 | 5137 |
| TDP335 | 5161 |
| TDP341 | 4401 |
| TDP342 | 4434 |
| TDP345 | 4143 |
| TDP411 | 4043 |
| TDP412 | 4201 |
| TDP413 | 4115 |
| TDP415 | 4430 |
| TDP416 | 3741 |
| TDP42A | 0402 |
| TDP42B | 2043 |
| TDP42C | 0711 |
| TDP42D | 2011 |
| TDP42E | 2025 |
| TDP42F | 0601 |
| TDP42G | 2001 |
| TDP42H | 1757 |
| TDP42I | 1143 |
| TDP421 | 1401 |
| TDP422 | 1201 |
| TDP423 | 1606 |
| TDP424 | 2212 |
| TDP425 | 2231 |
| TDP426 | 3001 |
| TDP427 | 2201 |
| TDP436 | 5503 |
| TDP437 | 5510 |
| TDP441 | 3055 |
| TDP442 | 3201 |
| TDP448 | 3225 |
| TDP449 | 3142 |
| TDP451 | 6202 |
| TDP452 | 6242 |
| TDP453 | 6601 |
| TDP454 | 6401 |
| TDP455 | 6646 |
| TDP456 | 6717 |
| TDP457 | 6467 |
| TDP461 | 7201 |
| TDP462 | 6330 |
| TDP463 | 7401 |
| TDP464 | 7601 |
| TDP471 | 6001 |
| TDP472 | 6032 |
| TDP473 | 6056 |
| TDP474 | 5643 |
| TDP491 | 3402 |
| TDP492 | 3446 |
| TDP493 | 3462 |
| TDP511 | 0202 |
| TDP512 | 0235 |
| TDP513 | 0243 |
| TDP514 | 0277 |
| TDP515 | 0341 |
| TDP516 | 0347 |
| TDR001 | 5601 |
| TDZACI | 5620 |
| TDZOAB | 5605 |
| TDZOCY | 5617 |
| TDZOSM | 5602 |
| TDZOTC | 5604 |
| TD483E | 6000 |
| TD487E | 7600 |
| WKLEAR | 7300 |
| WK4000 | 7330 |
| WK5777 | 7352 |
| WK6000 | 7333 |
| WK7775 | 7346 |
| WK7776 | 7344 |
| WK7777 | 7340 |
| WM0001 | 7340 |
| WM0002 | 7344 |
| WM0003 | 7346 |
| WP0006 | 7327 |
| WP0100 | 7203 |
| WP2000 | 7332 |
| WP3777 | 7350 |
| ZARMDE | 0133 |
| ZAUT00 | 0010 |
| ZAUT01 | 0011 |
| ZAUT02 | 0012 |
| ZAUT03 | 0013 |
| ZAUT04 | 0014 |
| ZAUT05 | 0015 |
| ZAUT06 | 0016 |
| ZAUT07 | 0017 |
| ZBCALM | 0105 |
| ZBCADM | 0103 |
| ZBCCTF | 0110 |
| ZBCDCM | 0104 |
| ZBCDUA | 0102 |
| ZBCDUN | 0101 |
| ZBCILA | 0113 |
| ZBCILF | 0112 |
| ZBCIVA | 0122 |
| ZBCKLT | 0111 |
| ZBCPGN | 0120 |
| ZBCPG1 | 0115 |
| ZBCPTF | 0114 |
| ZDBNCL | 0122 |
| ZDCCAN | 0115 |
| ZDCCCL | 0107 |
| ZDCCCR | 0114 |
| ZDCCCY | 0110 |
| ZDCCDS | 0103 |
| ZDCCHS | 0117 |
| ZDCCLN | 0106 |
| ZDCCLT | 0113 |
| ZDCCOS | 0102 |
| ZDCCSN | 0107 |
| ZDCCSP | 0111 |
| ZDCDAT | 0104 |
| ZDCDBF | 0123 |
| ZDCDES | 0101 |
| ZDCDTF | 0103 |
| ZDCFLD | 0110 |
| ZDCFLG | 0111 |
| ZDCFLN | 0105 |
| ZDCLCU | 0114 |
| ZDCNCL | 0121 |
| ZDCMUL | 0101 |
| ZDCOAN | 0113 |
| ZDCOCR | 0112 |
| ZDCPKS | 0120 |
| ZDCPLM | 0116 |
| ZDCPRS | 0102 |
| ZDCPSC | 0115 |
| ZDCSAD | 0104 |
| [illegible] | 0112 |
| ZKA151 | 0036 |
| ZKA152 | 0037 |
| ZKA153 | 0040 |
| ZKA154 | 0041 |
| ZKA322 | 0031 |
| ZKA323 | 0032 |
| ZKA324 | 0033 |
| ZKA416 | 0024 |
| ZKA417 | 0025 |
| ZKA521 | 0026 |
| ZKA525 | 0027 |
| ZKA529 | 0030 |
| ZKB111 | 0035 |
| ZKB213 | 0157 |
| ZKB22L | 0166 |
| ZKB221 | 0160 |
| ZKB222 | 0161 |
| ZKB226 | 0163 |
| ZKB229 | 0164 |
| ZKB23J | 0171 |
| ZKB23S | 0172 |
| ZKB23X | 0173 |
| ZKB23Z | 0174 |
| ZKB21A | 0156 |
| ZKB521 | 0175 |
| ZKB522 | 0176 |
| ZKB523 | 0177 |
| ZKCDF | 0021 |
| ZKCDI | 0023 |
| ZKCIF | 0022 |
| ZKC213 | 0135 |
| ZKD211 | 0173 |
| ZKD329 | 0156 |
| ZKD342 | 0136 |
| ZKD345 | 0170 |
| ZKD426 | 0147 |
| ZKD428 | 0140 |
| ZKD429 | 0162 |
| ZKD441 | 0141 |
| ZKD453 | 0142 |
| ZKD456 | 0143 |
| ZKD457 | 0144 |
| ZKD462 | 0145 |
| ZKD463 | 0146 |
| ZKD511 | 0130 |
| ZKD512 | 0131 |
| ZKD513 | 0132 |
| ZKD514 | 0133 |
| ZKD515 | 0134 |
| ZKD516 | 0137 |
| ZM0004 | 0074 |
| ZM0005 | 0042 |
| ZM0006 | 0043 |
| ZM0010 | 0044 |
| ZM0040 | 0045 |
| ZM0120 | 0046 |
| ZM0260 | 0047 |
| ZP0003 | 0000 |
| ZP0005 | 0050 |
| ZP0006 | 0051 |
| ZP0007 | 0052 |
| ZP0010 | 0053 |
| ZP0017 | 0054 |
| ZP0020 | 0055 |
| ZP0037 | 0056 |
| ZP0040 | 0057 |
| ZP0060 | 0020 |
| ZP0070 | 0060 |
| ZP0077 | 0061 |
| ZP0100 | 0062 |
| ZP0120 | 0063 |
| ZP0177 | 0064 |
| ZP0200 | 0065 |
| ZP0260 | 0066 |
| ZP0377 | 0067 |
| ZP0777 | 0076 |
| ZP7000 | 0070 |
| ZP7400 | 0071 |
| ZP7600 | 0072 |
| ZP7700 | 0073 |
| ZP7777 | 0077 |
| ZWORK1 | 0004 |

```
ZKD42C 0167     ZWORK2 0005
ZKD42F 0150     ZWORK3 0006
ZKD42G 0135     ZWORK4 0007
ZKD421 0152
ZKD422 0153
ZKD423 0154
ZKD424 0176
ZKD425 0177
ZKD426 0155
ZKD428 0151

ERRORS DETECTED: 0
LINKS GENERATED: 0

CDT       155   240   327
DL3END     45   396#
DL3GET    313   333#
DL3SAV    316   334#
DL31C1     65    69#  127
DL31C2    128   139#
DL31C3    135#  143
DL31C4    137   144#
DL31C5    111#  115
DL31C6    112#  122   125
DL31C7    116   121#
DL31C8    117#  126
DL31C9    119   127#
DL31IA     66   164#
DL31IF     63   163#
DL31J1     76   152#
DL31J2    151   155#
DL31K1     73   158#
DL31K2     94   159#
DL31K3    144   160#
DL31K4     80   161#
DL31K5     91   146   162#
DL31MC     60#   84    87
DL32CH    236   243#
DL32DU    258   285#
DL32D1    259   264#
DL32JE    272   276   282#
DL32J1    218   223#
DL32J2    227   232#
DL32J3    231   239#
DL32J4    222   240#
DL32K1    234   244#
DL32K2    255   286#
DL32M1    256   265#
DL32VL    215   220   254#  283
DL33BF    306   331#
DL33J1    309   323#
DL33J2    322   327#
DL33K1    319   330#
DL3324    323   332#
DL34DA    356   367#
DL34DF    351   366#
DL34P1    353   362#
DL34P2    357   363#
DM5FRA    367
DM6C9F    366
GETLMG    171#  176   178   333
GTLM01    174   177#
LMGCNT    186#  188   192   195
SAVLMG    187#  194   197   334
SVLM01    191   195#
TBLBDF    331
TDP224    332
TDP331     45    61#  156
TDP332    214#  241
TDP333    303#  328
TDP334    238   321   350#  364
TDP335    239   383#  394
WKLEAR    266
WH0001    107   269   304
WH0002    273
WH0003    113
WP0001    282   354
WP0002    149   152   232   358
WP0003    317
WP0004    386   388
WP0006     96   105
ZAUTOS     67    70   140
ZBCDUN    285
ZBCILA    164
ZBCILF    163
ZBGMCI    175   193
ZBCCDS    150   274   389
ZBCCHS    243
ZBCDBF    172   189
ZBCDFS     99
ZBCNLL    177   196
ZBCDCK     86   103   280
```

| | | | | | | | | |
|---|---|---|---|---|---|---|---|---|
| ZDCPRS | 270 | 387 | | | | | | |
| ZKB111 | 360 | | | | | | | |
| ZKB213 | 262 | | | | | | | |
| ZKB22L | 154 | 230 | | | | | | |
| ZKB229 | 326 | | | | | | | |
| ZKB23S | 393 | | | | | | | |
| ZKB25Z | 78 | | | | | | | |
| ZKB522 | 82 | | | | | | | |
| ZKCDF | 64 | | | | | | | |
| ZKD345 | 79 | | | | | | | |
| ZKD428 | 109 | | | | | | | |
| ZKD42C | 368 | | | | | | | |
| ZKD429 | 391 | | | | | | | |
| ZKD463 | 385 | | | | | | | |
| ZKD511 | 89 | | | | | | | |
| ZKD512 | 93 | 95 | 97 | 98 | 102 | 104 | 124 | 142 |
| ZKD513 | 140 | | | | | | | |
| ZP0015 | 224 | 233 | 278 | 311 | 318 | | | |
| ZP0005 | 223 | | | | | | | |
| ZP0007 | 277 | 310 | | | | | | |
| ZP0010 | 355 | | | | | | | |
| ZP0020 | 324 | | | | | | | |
| ZP0070 | 352 | | | | | | | |
| ZP0077 | 101 | | | | | | | |
| ZP0Z77 | 85 | | | | | | | |
| ZP7700 | 314 | | | | | | | |
| ZP7777 | 225 | | | | | | | |
| ZWORK1 | 71 | 72 | 92 | 129 | 147 | 312 | 315 | |
| ZWORK2 | 114 | 117 | 134 | 135 | | | | |

V5A

```
                    / DP1253.88
                    /
                    /          %%%%%%%%%%%%%%%%%%%%%%%%%%%%%%%%%%%%%%%%%%%%%%%%%%%%%%%%%%%%%%%%%%
                    /          %                                                                %
                    /          %                        PROPRIETARY.                            %
                    /          %                                                                %
                    /          %  THIS DOCUMENT CONTAINS INFORMATION PROPRIETARY TO             %
                    /          %  REUTERS LIMITED AND IS NOT TO BE REPRODUCED AND/OR            %
                    /          %  USED IN WHOLE OR IN PART WITHOUT THE EXPRESS WRITTEN          %
                    /          %  PERMISSION OF REUTERS LIMITED.                                %
                    /          %                                                                %
                    /          %%%%%%%%%%%%%%%%%%%%%%%%%%%%%%%%%%%%%%%%%%%%%%%%%%%%%%%%%%%%%%%%%%
                    /
                    /

                    /
                    /     MODULE  MAPB50.88 27-OCT-80
                    /     SYSTEM MAP FILE
                    /
                    /     MODULE MAFC50.88 15-DEC-80
                    /     CONVERSATIONS MAP FILE
                    /
                    /     MODULE FCZ050.88 16-JAN-80
                    /     FIXED PAGE ZERO CONSTANTS AND COMMON DATA EQUATES FIELD 4 & 5
                    ////////                                                                    ////////
                    /     COMPONENT:      AUTHORISATION AND ABBREVIATION TABLE LOADING DP1253.88     /
                    /                                                                                /
                    /     VERSION:        0                                                          /
                    /     DATE:           AS HEADING                                                 /
                    /     AUTHOR:         S.WATHANASIN                                               /
                    /     COMPRISES:      TDP121  (AUTHORISATION)                                    /
                    /                     TDP123  (SEND STATE TABLE RECORD)                          /
                    /                     TDC484  (CNV USER ABBREVIATION TABLE CONTROL BLOCK)        /
                    /                     TDC485  (CNB USER ABBREVIATION TABLE CONTROL BLOCK)        /
                    /                     TDP122  (TABLE UPDATE RECEIVED)                            /
                    ////////                                                                    ////////

          0065        FIELD    FFP120%10
          5200        *5200
          0150        0*4000+DB3END-TDP121+2  /*ELEMENT:TYPE 0:SIZE DB3END-TDP121+2


                    / MODIFIED RJA 31-JUL-80 TDP121 CALL TDP221 TO REDISPLAY CALLS Q HAVING CLEARED
                    / COUNT OF CALLS AND LEFT MESSAGES (WIPES OUT ANY CALLS WHICH WERE STILL
                    / ON DISPLAY FROM A PREVIOUS SIGNED-ON STATE)
                    / MODIFIED RJA 18-SEP-80 TDP121 DETECT BROADCAST FIRST CALL FOR MAIN
                    / PROCESSING,BROADCAST SUBSEQUENT CALLS FOR DISPLAY ON DESKS
                    / MODIFIED RJA 12-JAN-81 TDP122 CORRECTLY CANCEL ABBREVS TABLE
```

```
                  ////////                                                          ////////
                  /         MODULE:          TDP121                                        /
                  /                          AUTHORISATION                                 /
                  /         FUNCTION:        DEALS WITH THE SIGN-ON MESSAGE SENT BY THE    /
                  /                          SERVICE FACILITY                              /
                  /         CALLED BY:       TDP492                                        /
                  /         FORM OF CALL:    JMS  I   (TDP121)                             /
                  /         EXIT CONDITIONS:ACC= 0 ,DF=IF= 4                               /
                  /         USES:            ZAUT00, ZWORK1, ZAUT03                        /
                  ////////                                                          ////////
55201   7401              1-1^2+7401             /*1 VARIABLE LOCATIONS FOLLOW
55202   0000    TDP121,   .-.
55203   7346              WP0001
55204   6211              CDF     10
55205   1772              TAD  I  DB1BDF         / CHECK BROADCAST FLAG
55206   6251              CDF     50
55207   7650              SNA!CLA
55210   5213              JMP     DB21ST         / FIRST CALL DO PROCESSING
55211   4774              JMS  I  DB1221         / SUBSEQUENT CALL DO DESK DISPLAY
55212   5237              JMP     DB21EX         / ONLY TO REFLECT CLEAR OF COUNTS
55213   1052    DB21ST,   TAD     ZP0007
55214   4534              JMS  I  ZKD515         / PICK UP OWN COUNTRY FIELD IN SIGN-ON RECORD
55215   3773              DCA  I  DB1OCY         / STORE IN SUBSCRIBER DATA RECORD
55216   1375              TAD     DB1OAB         / PICK UP ADDR OF ANSWERBACK
55217   3010              DCA     ZAUT00
55220   1376              TAD     DB1M12
55221   3064              DCA     ZWORK1         / SET UP COUNT
55222   4537    DB1LP,    JMS  I  ZKD516         / COPY ANSWERBACK TO SUBSCRIBER RECORD
55223   3410              DCA  I  ZAUT00
55224   2064              ISZ     ZWORK1
55225   5222              JMP     DB1LP
55226   7301              WP0001
55227   2010              ISZ     ZAUT00
55230   3410              DCA  I  ZAUT00         / SET FLAG IN SUBSCRIBER RECORD
55231   4242              JMS     TDP123         / SEND A TABLE STATE RECORD
55232   1123              TAD     ZDCDBF         / GET CNV/CNB FLAG
55233   7450              SNA                    / BONDS ?
55234   3121              DCA     ZDCNCL         / NO  - CLEAR CNV NO OF CALLS/LEFT MSGS
55235   7640              SZA CLA
55236   3122              DCA     ZDBNCL         / YES - CLEAR CNB NO OF CALLS/LEFT MSGS
55237   6243    DB21EX,   CDF CIF FDP490
55240   5602              JMP  I  TDP121         / RETURN TO CALLER,ACC=0, DF=IF=4
                  ////////                                                          ////////
                  /         MODULE:          TDP123                                        /
                  /                          SEND TABLE STATE RECORD                       /
                  /         FUNCTION:        SETS UP A TABLE STATE RECORD AND SENDS IT     /
                  /         CALLED BY:       TDP313,TDP322,TDP121,TDP122                   /
                  /         FORM OF CALL:    JMS  I   (TDP123)                             /
                  /         EXIT CONDITIONS:ACC=0,  DF=IF=5                                /
                  /         USES:            ZAUT00, ZAUT02, ZWORK1                        /
                  ////////                                                          ////////
55241   7401              1-1^2+7401             /*1 VARIABLE LOCATIONS FOLLOW
55242   0000    TDP123,   .-.
55243   4530              JMS  I  ZKD511         / GET A BUFFER
                          DECIMAL                / LOAD TABLE STATE RECORD WITH INITIAL VALUES
55244   0016    DB3RL,    14
55245   0215              141
55246   0012              10
                          OCTAL
55247   7772    DB3M6,    -6                     / LIST TERMINATOR - ANY NEGATIVE VALUE
55250   1123              TAD     ZDCDBF         / GET CNV/CNB FLAG
55251   7650              SNA CLA                / BONDS ?
55252   5255              JMP     DB3010         / NO
55253   1302              TAD     DB3BDT         / LOAD TABLE STATE RECORD WITH CNB DATE & TIME
55254   7410              SKP                    /
55255   1301    DB3010,   TAD     DB3CDT         / LOAD TABLE STATE RECORD WITH CNV DATE & TIME
55256   3010              DCA     ZAUT00
55257   1247              TAD     DB3M6
55260   3064              DCA     ZWORK1
55261   1410    DB3LP,    TAD  I  ZAUT00
55262   4531              JMS  I  ZKD512
55263   2064              ISZ     ZWORK1
55264   5261              JMP     DB3LP
55265   6242              CIF     FDP420         / CALCULATE NO OF FREE DESK UNITS
55266   4551              JMS  I  ZKD428
55267   4531              JMS  I  ZKD512
55270   1304              TAD     DB3AB
55271   4531              JMS  I  ZKD512
55272   1305              TAD     DB3BR
55273   4531              JMS  I  ZKD512
55274   1303              TAD     DB3P11
55275   7421              MQL
55276   1244              TAD     DB3RL
55277   4532              JMS  I  ZKD513         / SEND THE RECORD
55300   5642              JMP  I  TDP123
55301   5351    DB3CDT,   TDCDAT-1
55302   5361    DB3BDT,   TDBDAT-1
55303   0013    DB3P11,   13                     / 11 DECIMAL
55304   0102    DB3AB,    0102                   / "AB"
55305   0222    DB3BR,    0222                   / "BR"
```

```
                /
                / SUBROUTINE USED BY TDP122 TO SET UP POINTERS TO
                / CORRECT CONTROL BLOCK ACCORDING TO CNV/CNB FLAG
                /
55306  7401            1-1^2+7401               /*1 VARIABLE LOCATIONS FOLLOW
55307  0000     GETPTR, .-.
55310  1337            TAD     STADR            / SET UP PTR TO POINTER TABLE
55311  3010            DCA     ZAUT00           /
55312  1123            TAD     ZDCDBF           / GET CNV/CNB FLAG
55313  7650            SZA CLA                  / BONDS ?
55314  5326            JMP     GTPT01           / NO
55315  1340            TAD     BNDDAT           / GET POINTER TO CNB DATE
55316  3410            DCA  I  ZAUT00           / SAVE
55317  1341            TAD     BNDNFP           / GET POINTER TO NEXT FREE ENTRY FOR CNB
55320  3410            DCA  I  ZAUT00           / SAVE
55321  1342            TAD     BGDUAT           / GET POINTER TO CNB USER ABBR. TABLE
55322  3410            DCA  I  ZAUT00           / SAVE
55323  1343            TAD     BNDMTB           / GET END OF CNB TABLE
55324  3410            DCA  I  ZAUT00           / SAVE
55325  5707            JMP  I  GETPTR           / RETURN TO CALLER
55326  1344     GTPT01, TAD    CNVDAT           / GET POINTER TT CNV DATE
55327  3410            DCA  I  ZAUT00           / SAVE
55330  1345            TAD     CNVNFP           / GET POINTER TO NEXT FREE ENTRY FOR CNV
55331  3410            DCA  I  ZAUT00           / SAVE
55332  1346            TAD     CNVUAT           / GET POINTER TO CNV USER ABBR. TABLE
55333  3410            DCA  I  ZAUT00           / SAVE
55334  1347            TAD     CNVMTB           / GET END OF CNV TABLE
55335  3410            DCA  I  ZAUT00           / SAVE
55336  5707            JMP  I  GETPTR           / RETURN TO CALLER
55337  5400     STADR, DB2DAT-1                 / ADDR OF PTR TABLE
55340  5361     BNDDAT, TDBDAT-1                / ADDR OF BONDS DATE
55341  5370     BNDNFP, TDBNFP                  / ADDR OF NEXT FREE ENTRY FOR BONDS
55342  6601     BNDUAT, TDC487                  / ADDR OF BONDS USER ABBR. TABLE
55343  0201     BNDMTB, 1-TD487E                /
55344  5351     CNVDAT, TDCDAT-1                / ADDR OF CNV DATE
55345  5360     CNVNFP, TDCNFP                  / ADDR OF NEXT FREE ENTRY FOR CNV
55346  5001     CNVUAT, TDC483                  / ADDR OF CNV USER ABBR. TABLE
55347  2001     CNVMTB, 1-TD483E                /
       5350     DB3END=.
                ////////                                                          ////////
                /       DATASET:        TDC484  USER ABBRV CONTROL BLOCK FOR CNV        //
                /       FUNCTION:       CONTAINS STATUS OF CNV USER ABBR TABLE          /
                ////////                                                          ////////
55350  4021            1^4000+DBEND-.,  /*ELEMENT:TYPE 1:SIZE DBEND-.
55351  0000     TDCTBS, 0               / SEQ NO OF LAST TABLE UPDATE FOR CNV
55352  0000     TDCDAT, 0;0;0           / CNV DATE
55353  0000
55354  0000
55355  0000     TDCTIM, 0;0;0           / CNV TIME
55356  0000
55357  0000
55360  5001     TDCNFP, TDC483  / NEXT FREE ENTRY


                ////////                                                          ////////
                /       DATASET:        TDC485  USER ABBRV CONTROL BLOCK FOR CNB         /
                /       FUNCTION:       CONTAINS STATUS OF CNB USER ABBR TABLE           /
                ////////                                                          ////////

55361  0000     TDBTBS, 0               / SEQ NO OF LAST TABLE UPDATE FOR CNB
55362  0000     TDBDAT, 0;0;0           / CNB DATE
55363  0000
55364  0000
55365  0000     TDBTIM, 0;0;0           / CNB TIME
55366  0000
55367  0000
55370  6601     TDBNFP, TDC487          / NEXT FREE ENTRY FOR CNB
       5371     DBEND=  .
55371  0207            0^4000+DB2END-DBEND      /*ELEMENT:TYPE 0:SIZE DB2END-DBEND
55372  4401     DB1BCF, TBLBDF                  / A - BROADCAST FLAG
55373  5617     DB1OCY, TDZOCY                  / A - OWN COUNTRY
55374  0507     DB1221, TDP221                  / A - DISPLAY CALLS 0
55375  5604     DB1DAR, TDZDAR-1                / FOR AUTO INDEX REG
55376  7766     DB1M12, -12
55377  0000            ZBLOCK  .+200&7600-.,    /*ZERO FILL PAGE
                ////////                                                          ////////
                /       MODULE:         TDP122                                           /
                /                       TABLE UPDATE RECEIVED                            /
                /       FUNCTION:       UPDATES THE USER ABBRV TABLE                     /
                /       CALLED BY:      TDP492                                           /
                /       FORM OF CALL:   JMS  I  (TDP122)                                 /
                /       EXIT CONDITIONS:ACC=0,  DF=IF=4                                  /
                /       USES:           ZAUT00,ZAUT03,ZWORK1,2 & 3                       /
                ////////                                                          ////////
55400  7411            5-1^2+7401               /*5 VARIABLE LOCATIONS FOLLOW
55401  0000     DB2DAT, 0                       / LINK TO DATE ENTRY IN REQ CONTROL BLOCK
55402  0000     DB2NFP, 0                       / LINK TO NEXT FREE ENTRY
55403  0000     DB2TSP, 0                       / START OF USER ABBR TABLE
55404  0000     DB2MTB, 0                       / END OF USER ABBR TABLE
55405  0000     TDP122, .-.
```

```
55406  6251            CDF       50
55407  4731            JMS    I  DB2SR1      / GO SET UP CONTROL BLOCK POINTERS
55410  1043            TAD       ZM0006
55411  3004            DCA       ZWORK1
55412  1201            TAD       DB2DAT
55413  3010            DCA       ZAUT00      / SET UP COUNT & START ADDR OF DATE AREA.
55414  1052            TAD       ZP0007
55415  4534            JMS    I  ZKD515
55416  7041            CIA
55417  7001            IAC
55420  3005            DCA       ZWORK2      / SAVE -(SEQ NO - 1) (ALSO SETS UP 515, 516)
55421  4537  DB2LPD,   JMS    I  ZKD516      / LOOP TO COPY DATE & TIME
55422  3410            DCA    I  ZAUT00
55423  2004            ISZ       ZWORK1
55424  5221            JMP       DB2LPD
55425  1005            TAD       ZWORK2
55426  7450            SNA
55427  5241            JMP       DB2E01      / SEQ NO = 1
55430  1601            TAD    I  DB2DAT      / CHECK THAT RECORDS ARRIVE IN SEQUENCE
55431  7650            SNA       CLA
55432  5237            JMP       DB2TS0
55433  1201            TAD       DB2DAT      / SET DATE TO 0
55434  3010            DCA       ZAUT00      /
55435  3410            DCA    I  ZAUT00
55436  4730            JMS    I  DB2123      / SEND A TABLE STATE RECORD
55437  1602  DB2TS0,   TAD    I  DB2NFP      / PICK UP NEXT FREE ENTRY IN ABBRV TABLE
55440  7410            SKP
55441  1203  DB2E01,   TAD       DB2TST      / START ADDR OF ABBRV TABLE
55442  1077            TAD       ZP7777
55443  3010            DCA       ZAUT00
55444  1005            TAD       ZWORK2
55445  7041            CIA
55446  7001            IAC
55447  3601            DCA    I  DB2DAT      / UPDATE SEQUENCE NO IN CONTROL BLOCK
55450  4537            JMS    I  ZKD516      / PICK UP LENGTH OF EXPANSION
55451  3006            DCA       ZWORK3      / SAVE
55452  1006            TAD       ZWORK3      / GET LENGTH OF EXPANSION
55453  7110            CLL RAR               /
55454  1050            TAD       ZP0065
55455  1010            TAD       ZAUT00      / ADD IN START ABBR TABLE
55456  1204            TAD       DB2MTB      /
55457  7700            SMA CLA               / ROOM FOR ABBR,EXPANSION + FOLLOWING ZERO ?
55460  5317            JMP       DB2OVF      / NO - SO OVERFLOW
55461  1006            TAD       ZWORK3      / GET LENGTH OF EXPANSION
55462  7110            CLL RAR               /
55463  7040            CMA                   /
55464  3004            DCA       ZWORK1      / SET UP COUNT = -VE NO. OF WORDS (2 CHARS)
55465  2013            ISZ       ZAUT03      / DISCARD PAGE ID
55466  2013            ISZ       ZAUT03      /
55467  7346            ZM0003                /
55470  3005            DCA       ZWORK2      / SET UP COPY ABBR COUNT
55471  4537  DB2ABR,   JMS    I  ZKD516      / GET WORD OF ABBR
55472  6231            CDF       FDC480      /
55473  3410            DCA    I  ZAUT00      / SAVE IN USER ABBR TABLE
55474  2005            ISZ       ZWORK2      /
55475  5271            JMP       DB2ABR      / REPEAT TILL ALL ABBR COPIED
55476  1006            TAD       ZWORK3      / GET LENGTH OF EXPANSION
55477  7002            BSW                   / PUT IN TOP HALF
55500  3006            DCA       ZWORK3      /
55501  4537            JMS    I  ZKD516      / GET 1ST WORD OF EXPANSION
55502  0061            AND       ZP0077      / MASK OUT FILLER SPACE
55503  1006            TAD       ZWORK3      / ADD IN LENGTH OF EXPANSION
55504  7410            SKP
55505  4537  DB2LOP,   JMS    I  ZKD516      / GET NEXT WORD OF EXPANSION
55506  6231            CDF       FDC480
55507  3410            DCA    I  ZAUT00      / SAVE IN USER ABBR TABLE
55510  2004            ISZ       ZWORK1      / ALL OF THE EXPANSION COPIED ?
55511  5305            JMP       DB2LOP      / NO
55512  3410            DCA    I  ZAUT00      / END WITH NULL
55513  6251            CDF       50          /
55514  1010            TAD       ZAUT00      /
55515  3602            DCA    I  DB2NFP      / SAVE ADDR OF NEXT FREE ENTRY
55516  5323            JMP       DB2RET      /
55517  1602  DB2OVF,   TAD    I  DB2NFP      / GET FREE ENTRY
55520  3202            DCA       DB2NFP
55521  6231            CDF       FDC480      /
55522  3602            DCA    I  DB2NFP      / CLEAR NEXT WORD TO INDICATE END OF ABBRV
55523  6211  DB2RET,   CDF       10
55524  3727            DCA    I  DB2BDF      / CLEAR BROADCAST FLAG
55525  6243            CDF CIF   FDP490
55526  5605            JMP    I  TDP122      / RETURN: ACC=0, DF=IF= 4
55527  4401  DB2BDF,   TBLBDF
55530  5242  DB2123,   TDP123
55531  5307  DB2SR1,   GETPTR                / S/R TO SET PTRS TO CONTROL BLOCK
```

```
                  ////////                                                                        ////////
                  /          MODULE:            TDP124                                                    /
                  /                             PICK UP DATE STAMP                                        /
                  /          FUNCTION:          ACCORDING TO VALUE OF CNV/CNB FLAG,PICKS UP THE           /
                  /                             VALUE OF THE DATE STAMP IN THE CORRESPONDING USER         /
                  /                             ABBREVIATION CONTROL TABLE                                /
                  /          CALLED BY:         TDP415                                                    /
                  /          FORM OF CALL:      JMS  I  (TDP124)                                          /
                  /          EXIT CONDITIONS:ACC=DATE STAMP, DF=IF=CALLER'S                               /
                  ////////                                                                        ////////
55532  5362  DB4BDT, TDBDAT                       / LINK TO CNB DATE STAMP
55533  5352  DB4CDT, TDCDAT                       / LINK TO CNV DATE STAMP
55534  7401          1-1^2+7401                   /*1 VARIABLE LOCATIONS FOLLOW
55535  0000  TDP124, .-.
55536  6214          RDF                          / SET RETURN TO CALLER INSTR.
55537  1023          TAD     ZKCDI
55540  3351          DCA     DB4CDI
55541  6251          CDF     50                   /
55542  1123          TAD     ZDCDBF               / GET CNV/CNB FLAG
55543  7650          SNA CLA                      / BONDS ?
55544  5347          JMP     DB4010               / NO
55545  1732          TAD  I  DB4BDT               / YES - GET BONDS DATE STAMP
55546  5351          JMP     DB4CDI               / EXIT
55547  1733  DB4010, TAD  I  DB4CDT               / GET CONVS DATE STAMP
55550  7401          1-1^2+7401                   /*1 VARIABLE LOCATIONS FOLLOW
55551  0000  DB4CDI, 0
55552  5735          JMP  I  TDP124               / RETURN TO CALLER
```

```
TDP125, .-.
4
143
4
-1
MQL
JMP I
DESP11, 1
```

```
55553  0000          ZBLOCK  .+200&7600-.         /*ZERO FILL PAGE
       5600  DB2END=.
             $
```

| | | | | | | | |
|---|---|---|---|---|---|---|---|
| AB5251 | 1733 | DB2PET | 5523 | FBP510 | 0010 | TAP322 | 0747 |
| ACL | 7701 | DB2SR1 | 5531 | FBP520 | 0010 | TAP323 | 1001 |
| AKSILC | 1557 | DB2TST | 5403 | FBP530 | 0010 | TAP324 | 1021 |
| AKSILI | 1555 | DB21EX | 5237 | FBP540 | 0010 | TAP411 | 0600 |
| AKSILO | 1556 | DB21ST | 5213 | FBP810 | 0040 | TAP412 | 0606 |
| AQAKPN | 6411 | DB2123 | 5530 | FBP820 | 0040 | TAP416 | 0367 |
| AQAKTP | 0015 | DB3AB | 5304 | FBP910 | 0030 | TAP417 | 0202 |
| AQDPPG | 6403 | DB3BDT | 5302 | FCP110 | 0010 | TAP521 | 1602 |
| AQDPTP | 0016 | DB3BR | 5305 | FCP210 | 0010 | TAP525 | 1656 |
| AQPRNM | 0177 | DB3CDT | 5301 | FCP310 | 0010 | TAP529 | 1742 |
| AQPRTY | 0200 | DB3FND | 5350 | FCP410 | 0010 | TAP611 | 1755 |
| AQQINS | 0144 | DB3LP | 5261 | FCP550 | 0010 | TAP612 | 1765 |
| AQQRB1 | 5601 | DB3M6 | 5247 | FCP610 | 0010 | TAR417 | 0400 |
| AQQRB2 | 5704 | DB3P11 | 5303 | FDC480 | 0030 | TAUS01 | 0200 |
| AQQRB3 | 6143 | DB3RL | 5244 | FDP120 | 0050 | TBCATL | 0210 |
| AQQRB4 | 6246 | DB3010 | 5255 | FDP130 | 0050 | TBCDAL | 0050 |
| AQQTB1 | 7475 | DB4BDT | 5532 | FDP210 | 0050 | TBCFSP | 1565 |
| AQQTB2 | 7634 | DB4CDI | 5551 | FDP230 | 0050 | TBCNFF | 1566 |
| AQ36DI | 0001 | DB4CDT | 5533 | FDP310 | 0050 | TBC132 | 2727 |
| AQ36SR | 7157 | DB4010 | 5547 | FDP320 | 0050 | TBC205 | 2401 |
| BEVAPT | 6232 | DL16SA | 4106 | FDP330 | 0050 | TBC210 | 2445 |
| BLTYPE | 4402 | DM5FRA | 0340 | FDP340 | 0050 | TBD541 | 0711 |
| BLZCCM | 0131 | DM6CBF | 0350 | FDP410 | 0040 | TBLBOF | 4401 |
| BLZPRA | 0134 | DNABFF | 0151 | FDP420 | 0040 | TBP111 | 2602 |
| BLZERO | 0133 | DLB51A | 0145 | FDP430 | 0040 | TBP131 | 3235 |
| BLZERT | 0126 | DNB516 | 0146 | FDP440 | 0040 | TBP132 | 3401 |
| BQDDAT | 5340 | DS6CIS | 0144 | FDF450 | 0040 | TBP211 | 4514 |
| BRDMTR | 5343 | DNSPTF | 0150 | FDP460 | 0040 | TBP212 | 4001 |
| BSDNFF | 5341 | DS15PA | 0147 | FDP470 | 0040 | TBP213 | 4601 |
| BSDDAT | 5342 | DQZALM | 0126 | FDP490 | 0040 | TBP22E | 2563 |
| BSVAPG | 5267 | DQZDCM | 0125 | GETPTR | 5307 | TBP22I | 1657 |
| CAM | 7621 | DQZDES | 0127 | GTPT01 | 5326 | TBP22L | 2001 |
| CDI | 6203 | DQZLOG | 0124 | STADR | 5337 | TBP22M | 2511 |
| CNVDAT | 5344 | FAP110 | 0000 | TAC417 | 0265 | TBP22R | 3401 |
| CNVMTR | 5347 | FAP120 | 0000 | TAD151 | 2042 | TBP22S | 2601 |
| CNVNFF | 5345 | FAP130 | 0000 | TAP221 | 1561 | TBP22U | 2437 |

| | |
|---|---|
| CNVDAT | 5346 |
| DBEGD | 5371 |
| DB1BDF | 5372 |
| DB1LP | 5222 |
| DB1M12 | 5376 |
| DB1OAB | 5375 |
| DB1OCY | 5373 |
| DB1221 | 5374 |
| DB2ABR | 5471 |
| DB2BDF | 5527 |
| DB2DAT | 5401 |
| DB2END | 5600 |
| DB2EJ1 | 5441 |
| DB2ISO | 5437 |
| DB2LOP | 5505 |
| DB2LPD | 5421 |
| DB2MTB | 5404 |
| DB2NFP | 5402 |
| DB2OVF | 5517 |
| TBP431 | 5202 |
| TBP432 | 5211 |
| TBP434 | 5677 |
| TBP437 | 6001 |
| TBP438 | 6024 |
| TBP44C | 7555 |
| TBP44D | 6351 |
| TBP44E | 6253 |
| TBP44F | 7352 |
| TBP44J | 7601 |
| TBP44K | 7401 |
| TBP44L | 7212 |
| TBP44M | 7206 |
| TBP44N | 7202 |
| TBP44R | 7135 |
| TBP44U | 6414 |
| TBP44V | 7715 |
| TBP441 | 6241 |
| TBP451 | 7610 |
| TBP512 | 1265 |
| TBP521 | 2201 |
| TBP522 | 2504 |
| TBP523 | 2703 |
| TBP532 | 0522 |
| TBP533 | 0555 |
| TBP541 | 1103 |
| TBP542 | 1154 |
| TBP551 | 2122 |
| TBP611 | 0202 |
| TBP821 | 1602 |
| TBP911 | 7610 |
| TBP919 | 7603 |
| TCP111 | 6202 |
| TCP213 | 7023 |
| TCP311 | 6101 |
| TCP551 | 7124 |
| TCP611 | 7201 |
| TCP91X | 7335 |
| TCP911 | 7266 |
| TCP912 | 7401 |
| TCP913 | 7414 |
| TCP914 | 7432 |
| TDBDAT | 5362 |
| TDBNFP | 5370 |
| TDBFLM | 5365 |
| TDBTOS | 5361 |
| TDCDAT | 5352 |
| TDCNFP | 5360 |
| TDCTLM | 5355 |
| TDCTOS | 5351 |
| TDC010 | 3400 |
| TDC201 | 1717 |
| TDC202 | 1737 |
| TDC481 | 4201 |
| TDC483 | 5001 |
| FAP150 | 0000 |
| FAP220 | 0000 |
| FAP230 | 0000 |
| FAP240 | 0000 |
| FAP320 | 0000 |
| FAP410 | 0000 |
| FAP520 | 0000 |
| FARMDE | 0000 |
| FAUS01 | 0000 |
| FBC205 | 0030 |
| FBP110 | 0000 |
| FBP130 | 0000 |
| FBP210 | 0020 |
| FBP220 | 0020 |
| FBP230 | 0020 |
| FBP310 | 0010 |
| FBP420 | 0030 |
| FBP430 | 0010 |
| FBP440 | 0020 |
| TDC184 | 5401 |
| TDC486 | 6001 |
| TDC487 | 6601 |
| TDD201 | 0001 |
| TDD202 | 0461 |
| TDP121 | 5202 |
| TDP122 | 5405 |
| TDP123 | 5242 |
| TDP124 | 5535 |
| TDP131 | 7202 |
| TDP132 | 7401 |
| TDP133 | 7311 |
| TDP134 | 7460 |
| TDP135 | 7463 |
| TDP137 | 7357 |
| TDP211 | 0402 |
| TDP212 | 0601 |
| TDP221 | 0507 |
| TDP224 | 1265 |
| TDP236 | 1070 |
| TDP31A | 3003 |
| TDP31B | 2202 |
| TDP311 | 4511 |
| TDP312 | 3201 |
| TDP313 | 3602 |
| TDP314 | 2403 |
| TDP315 | 3401 |
| TDP316 | 4001 |
| TDP317 | 4201 |
| TDP319 | 3755 |
| TDP32A | 6420 |
| TDP32B | 6504 |
| TDP321 | 6273 |
| TDP322 | 6601 |
| TDP323 | 7001 |
| TDP324 | 6401 |
| TDP325 | 6001 |
| TDP326 | 6201 |
| TDP327 | 5623 |
| TDP328 | 6050 |
| TDP329 | 6112 |
| TDP331 | 4603 |
| TDP332 | 5001 |
| TDP333 | 5077 |
| TDP334 | 5137 |
| TDP335 | 5161 |
| TDP341 | 4401 |
| TDP342 | 4436 |
| TDP345 | 4143 |
| TDP411 | 4043 |
| TDP412 | 4201 |
| TDP415 | 4430 |
| TDP416 | 3741 |
| TDP42A | 0402 |
| TDP42B | 2043 |
| TAP322 | 1072 |
| TAP11B | 4472 |
| TAP121 | 4400 |
| TAP129 | 2402 |
| TAP131 | 4470 |
| TAP134 | 4571 |
| TAP151 | 2002 |
| TAP152 | 2022 |
| TAP153 | 2034 |
| TAP154 | 2062 |
| TAP212 | 0660 |
| TAP223 | 1525 • |
| TAP235 | 7400 |
| TAP236 | 6637 |
| TAP237 | 6042 |
| TAP239 | 6531 |
| TAP242 | 3600 |
| TAP243 | 3604 |
| TAP244 | 0000 |
| TDP42C | 0711 |
| TDP42D | 2011 |
| TDP42E | 2025 |
| TDP42F | 0601 |
| TDP42G | 2001 |
| TDP42H | 1757 |
| TDP421 | 1143 |
| TDP421 | 1401 |
| TDP422 | 1201 |
| TDP423 | 1606 |
| TDP424 | 2212 |
| TDP425 | 2231 |
| TDP426 | 3001 |
| TDP427 | 2201 |
| TDP428 | 0460 |
| TDP429 | 2401 |
| TDP431 | 5401 |
| TDP432 | 5430 |
| TDP433 | 5601 |
| TDP434 | 5471 |
| TDP435 | 5476 |
| TDP436 | 5503 |
| TDP437 | 5510 |
| TDP441 | 3055 |
| TDP442 | 3201 |
| TDP448 | 3225 |
| TDP449 | 3142 |
| TDP451 | 6202 |
| TDP452 | 6242 |
| TDP453 | 6601 |
| TDP454 | 6401 |
| TDP455 | 6646 |
| TDP456 | 6717 |
| TDP457 | 6467 |
| TDP461 | 7201 |
| TDP462 | 6330 |
| TDP463 | 7401 |
| TDP464 | 7601 |
| TDP471 | 6001 |
| TDP472 | 6032 |
| TDP473 | 6056 |
| TDP474 | 5643 |
| TDP491 | 3402 |
| TDP492 | 3446 |
| TDP493 | 3462 |
| TDP511 | 0202 |
| TDP512 | 0235 |
| TDP513 | 0243 |
| TDP514 | 0277 |
| TDP515 | 0341 |
| TDP516 | 0347 |
| TDR001 | 5601 |
| TDZACT | 5620 |
| TDZOAB | 5605 |
| TDZOCY | 5617 |
| TBP22X | 0202 |
| TBP221 | 1401 |
| TBP222 | 1444 |
| TBP223 | 1500 |
| TBP224 | 1601 |
| TBP226 | 0401 |
| TBP229 | 3201 |
| TBP231 | 5143 |
| TBP23J | 5324 |
| TBP23S | 4361 |
| TBP23X | 5601 |
| TBP23Z | 6061 |
| TBP31A | 4404 |
| TBP31B | 5001 |
| TBP315 | 3602 |
| TBP422 | 0242 |
| TBP423 | 0220 |
| TBP424 | 0401 |
| TBP425 | 0202 |
| TDZOSM | 5602 |
| TDZOTC | 5604 |
| TD483E | 6000 |
| TD487E | 7600 |
| wKLEAR | 7300 |
| wK4000 | 7330 |
| wK5777 | 7352 |
| wK6000 | 7333 |
| wK7775 | 7346 |
| wK7776 | 7344 |
| wK7777 | 7340 |
| wM0001 | 7340 |
| wM0002 | 7344 |
| wM0003 | 7346 |
| wM2000 | 7333 |
| wM2001 | 7352 |
| wM4000 | 7330 |
| wP0001 | 7301 |
| wP0002 | 7305 |
| wP0003 | 7325 |
| wP0004 | 7307 |
| wP0006 | 7327 |
| wP0100 | 7203 |
| wP2000 | 7332 |
| wP3777 | 7350 |
| ZARMDE | 0133 |
| ZAUT00 | 0010 |
| ZAUT01 | 0011 |
| ZAUT02 | 0012 |
| ZAUT03 | 0013 |
| ZAUT04 | 0014 |
| ZAUT05 | 0015 |
| ZAUT06 | 0016 |
| ZAUT07 | 0017 |
| ZBCALM | 0105 |
| ZBCAOM | 0103 |
| ZBCCIF | 0110 |
| ZBCDCM | 0104 |
| ZBCDUA | 0102 |
| ZBCDUB | 0101 |
| ZBCILA | 0113 |
| ZBCILF | 0112 |
| ZBCIVA | 0122 |
| ZBCKLT | 0111 |
| ZBCPGN | 0120 |
| ZBCPG1 | 0115 |
| ZBCPTP | 0114 |
| ZDBNCL | 0122 |
| ZDCCAN | 0115 |
| ZDCCCL | 0107 |
| ZDCCCR | 0114 |
| ZDCCCY | 0110 |
| ZDCCDS | 0103 |
| ZDCCHS | 0117 |
| ZDCCLN | 0106 |
| ZDCCLT | 0113 |
| ZDCCOS | 0102 |
| ZDCCSN | 0107 |
| ZDCCSP | 0111 |
| ZDCCVB | 0116 |
| ZDCDAT | 0104 |
| ZDCDBF | 0123 |
| ZDCDES | 0101 |
| ZDCOTP | 0103 |
| ZDCFLD | 0110 |
| ZDCFLG | 0111 |
| ZDCFLN | 0105 |
| ZDCLCH | 0114 |
| ZDCNCL | 0121 |
| ZDCAOL | 0101 |
| ZDCOAN | 0113 |
| ZDCOCK | 0112 |
| ZDCPKS | 0120 |
| ZDCPLB | 0116 |
| ZDCPRS | 0102 |
| ZKD329 | 0156 |
| ZKD342 | 0136 |
| ZKD345 | 0170 |
| ZKD42A | 0147 |
| ZKD42B | 0140 |
| ZKD42C | 0167 |
| ZKD42F | 0150 |
| ZKD42G | 0135 |
| ZKD421 | 0152 |
| ZKD422 | 0153 |
| ZKD423 | 0154 |
| ZKD424 | 0176 |
| ZKD425 | 0177 |
| ZKD426 | 0155 |
| ZKD428 | 0151 |
| ZKD429 | 0162 |
| ZKD441 | 0141 |
| ZKD453 | 0142 |
| ZKD456 | 0143 |
| ZKD457 | 0144 |
| ZP7400 | 0071 |
| ZP7600 | 0072 |
| ZP7700 | 0073 |
| ZP7777 | 0077 |
| ZVKCRL | 0126 |
| ZWORK1 | 0004 |
| ZWORK2 | 0005 |
| ZWORK3 | 0006 |
| ZWORK4 | 0007 |

```
ERRORS DETECTED: 0
LINKS GENERATED: 0
BNDDAT     150    169*
BNDMTB     156    172*
BNDNFP     152    170*
BNDUAT     154    171*
CNVDAT     159    173*
CNVMTB     165    176*
CNVNFP     161    174*
CNVUAT     163    175*
DBEND      182    206*   207
DB1BDF      62    208*
DB1LP       75*    78
DB1M12      73    212*
DB1UAB      71    211*
DB1OCY      70    209*
DB1221      66    210*
DB2ABR     286*   284
DB2BDF     307    310*
DB2DAT     168    224*   233    247    250    262
DB2END     207    342*
DB2E01     246    256*
DB2ISO     249    254*
DB2LOP     292*   296
DB2LPD     240*   243
DB2MTB     227*   269
DB2NFP     225*   254    300    302    303    305
DB2OVF     271    302*
DB2RET     301    306*
DB2SR1     230    312*
DB2IST     226*   256
DB21FX      67     86*
DB21ST      65     68*
DB2123     253    311*
DB3AB      129    136*
DB3BDT     111    134*
DB3BG      126    137*
DB3CDT     113    133*
DB3END      39    177*
DB3LP      117*   120
DB3MB      107*   115
DB3P11     128    135*
DB3RL      103*   130
DB3010     110    113*
DB4BDF     324*   335
DB4CDT     330    336    339*
DB4COT     325*   337
DB4010     334    337*
FDC480     281    293    304
FDP120      37
FDP420     121
FDP490      88    308
GETPTR     144*   158    167    312
GTPT01     139    159*
STADB      145    168*
TALBDF     208    310
TDBCAT     134    169    199*   324
TDB9FP     170    205*
TDBTTY     202*
TDBTOS     198*

ZDCPSC 0115        ZKD462 0145
ZDCSAD 0104        ZKD463 0146
ZDCTXS 0112        ZKD511 0130
ZKA151 0036        ZKD512 0131
ZKA152 0037        ZKD513 0132
ZKA153 0040        ZKD514 0133
ZKA154 0041        ZKD515 0134
ZKA322 0031        ZKD516 0137
ZKA323 0032        ZM0004 0074
ZKA324 0033        ZM0005 0042
ZKA416 0024        ZM0006 0043
ZKA417 0025        ZM0010 0044
ZKA521 0026        ZM0040 0045
ZKA525 0027        ZM0120 0046
ZKA529 0030        ZM0260 0047
ZKB111 0035        ZP0003 0000
ZKB213 0157        ZP0005 0050
ZKB22L 0166        ZP0006 0051
ZKB221 0160        ZP0007 0052
ZKB222 0161        ZP0010 0053
ZKB226 0163        ZP0017 0054
ZKB229 0164        ZP0020 0055
ZKB23J 0171        ZP0037 0056
ZKB23S 0172        ZP0040 0057
ZKB23X 0173        ZP0060 0020
ZKB23Z 0174        ZP0070 0060
ZKB31A 0156        ZP0077 0061
ZKB521 0175        ZP0100 0062
ZKB522 0176        ZP0120 0063
ZKB523 0177        ZP0177 0064
ZKCDF  0021        ZP0200 0065
ZKCDI  0023        ZP0260 0066
ZKCIF  0022        ZP0377 0067
ZKC213 0135        ZP0777 0076
ZKC911 0173        ZP7000 0070
```

```
TDCDAT     133    173    184#   325
TDCNFP     174    190#
TDCIIM     187#
TDCTUS     183#
TDC483     175    190
TDC487     171    205
TDP121      39     59#    89
TDP122     228#   309
TDP123      82    100#   132    311
TDP124     327#   340
TDP221     210
TDZOAB     211
TDZOCY     209
TD483E     176
TD487E     172
WM0001      60
W50003     278
VP0001      79
ZAUTOO      72     76     80     81    114    117    146    151    153    155
           157    160    162    164    166    234    241    251    252    258
           268    282    294    297    299
ZAUTO3     276    277
ZOBGCL      87
ZOCDBF      83    108    147    332
ZDCNCL      85
ZKCDI      329
ZKD428     122
ZKD511     101
ZKD512     118    123    125    127
ZKD513     131
ZKD515      69    236
ZKD516      75    240    263    280    288    292
ZP0006     231
ZP0005     267
ZP0007      66    235
ZP0677     289
ZP7777     257
ZWORK1      74     77    116    119    232    242    275    295
ZWORK2     239    244    259    279    283
ZWORK3     264    265    272    285    287    290
```

VSA

```
/ DP3252.88
/
/          %%%%%%%%%%%%%%%%%%%%%%%%%%%%%%%%%%%%%%%%%%%%%%%%%%%%%%%%%%%%%
/          %                                                            %
/          %                     PROPRIETARY.                           %
/          %                                                            %
/          %  THIS DOCUMENT CONTAINS INFORMATION PROPRIETARY TO         %
/          %  REUTERS LIMITED AND IS NOT TO BE REPRODUCED AND/OR        %
/          %  USED IN WHOLE OR IN PART WITHOUT THE EXPRESS WRITTEN      %
/          %  PERMISSION OF REUTERS LIMITED.                            %
/          %                                                            %
/          %%%%%%%%%%%%%%%%%%%%%%%%%%%%%%%%%%%%%%%%%%%%%%%%%%%%%%%%%%%%%
/
/

/
/        MODULE  MAPB50.88 27-OCT-80
/        SYSTEM MAP FILE
/
/        MODULE MAPC50.88 15-DEC-80
/        CONVERSATIONS MAP FILE
/
/        MODULE FCEG50.88 16-JAN-80
/        FIXED PAGE ZERO CONSTANTS AND COMMON DATA EQUATES FIELD 4 & 5
/=====================================================
/=                                                   =
/= - COMPONENT: DISCONNECTION & TXFER    DP3252.88   =
/=                                                   =
/= - DESIGN:     P.ROBERTS                           =
/=                                                   =
/= - AUTHOR:     G.BROWN                             =
/=                                                   =
/= - DATE:       JUNE 1979                           =
/=                                                   =
/= - MODULES:                                        =
/=              TDR061  SUBSCRIBER DATA              =
/=              TDP327  DISCONNECT REQUEST           =
/=              TDP325  DISCONNECT STATEMENT RECEIVED =
/=              TDP328  DISCONNECT REJECTION RECEIVED =
/=              TDP329  CONNECTION LOST              =
/=              TDP326  SWITCH OFF CONVERSATION      =
/=              TDP321  TXFER                        =
/=              TDP324  DISCONNECT - DIALOGUE        =
/=              TDP32A  TRANSFERRED                  =
/=              TDP32E  END STORAGE                  =
/=              TDP322  END CONT                     =
/=              TDP323  DISCONNECT REQUEST RECEIVED  =
/=                                                   =
/=====================================================
```

```
              0005            FIELD    5
              5600            *TDR001-1
      55600   4021            1*4000+TDREND-TDR001+2  /*ELEMENT:TYPE 1:SIZE TDREND-TDR001+2

                      / MODIFIED RJA 4-DEC-80 TDP322 END CONT CHANGED TO USE IN-LINE CODE RATHER
                      / THAN CASE VECTOR FOR SORTING OUT CONV STATUS - THIS IS TO ALLOW 'ACCEPT'
                      / STATUS TO BE RECOGNISED AND IGNORED

                      / MODIFIED RJA 15-DEC-80 TDP326 ALWAYS AMEND MODE TO CNV ON SWITCH OFF
                      / THIS ALLOWS MESSAGE LINE TO BE OBSERVED BY OPERATOR
                      /
                      / SUBSCRIBER DATA
                      /
      55601   5601    TDR001, .                                / ) OWN SUBSCRIBER MNEMONIC
      55602   0000            0                                / )
      55603   0000            0                                / ) OWN TC NUMBER
      55604   0000            0                                /  )
      55605   0000            0                                /  )
      55606   0000            0                                /  )
      55607   0000            0                                /  )
      55610   0000            0                                /  )
      55611   0000            0                                /  ) OWN ANSWERBACK
      55612   0000            0                                /  )
      55613   0000            0                                /  )
      55614   0000            0                                /  )
      55615   0000            0                                /  )
      55616   0000            0                                /  )
      55617   0000            0                                / ) OWN COUNTRY
      55620   0000    TDREND, 0                                / ) ANSWERBACK & COUNTRY PRESENT ?
      55621   1357            0*4000+DJ3END-TDP327+2  /*ELEMENT:TYPE 0:SIZE DJ3END-TDP327+2
                      /=====================================================
                      /=                                                   =
                      /= - MODULE:     TDP327                              =
                      /=                DISCONNECT REQUEST                 =
                      /=                                                   =
                      /= - FUNCTION:                                       =
                      /=               FORMS AND SENDS A DISCONNECT REQUEST =
                      /=                                                   =
                      /= - FORM OF CALL:                                   =
                      /=               JMS   I   (TDP327                   =
                      /=                                                   =
                      /=====================================================

      55622   7401            1-1^2+7401                    /*1 VARIABLE LOCATIONS FOLLOW
      55623   0000    TDP327, .-.
      55624   4530            JMS   I   ZK0511              / GET A BUFFER AND SET UP INITIAL
      55625   0007            7                             /  VALUE OF RECORD LENGTH
      55626   0320            320                           /  VALUE OF RECORD TYPE
      55627   0007            7                             /  VALUE OF NOV PACKED LENGTH
      55630   0001            1                             /  VALUE OF REQUEST TYPE
      55631   7777            -1                            / PLUS TERMINATOR
      55632   6241            CDF      40                   /
      55633   2754            ISZ   I   DJ7LPC              / INCREMENT PACKET COUNT
      55634   7000            NOP                           / SAFEGUARD FOR WRAP-ROUND COUNT
      55635   1753            TAD   I   DJ7LCC              / GET CHARS IN CURRENT LINE
      55636   7421            MQL                           /
      55637   1752            TAD   I   DJ7LCL              / GET CURRENT LINE NO (RELATIVE)
      55640   6251            CDF      50                   /
      55641   6242            CIF      40                   /
      55642   4760            JMS   I   DJ7420              / CONVERT REL LINE NO TO ABSOLUTE
      55643   4531            JMS   I   ZK0512              / STORE ABSOLUTE LINE NO. IN REQUEST
      55644   7701            ACL                           / GET CHARS IN CURRENT LINE
      55645   4531            JMS   I   ZK0512              / STORE IN REQUEST
      55646   1114            TAD       ZLCCCR              / GET COUNTERPARTY'S CONV REFERENCE
      55647   4531            JMS   I   ZK0512              / STORE IN REQUEST
                                                            /
      55650   1052            TAD       ZP0007              / SET UP INITIAL APPLICATION RECORD LENGTH
      55651   7421            MQL                           /
      55652   7340            -0001                         /
      55653   1103            TAD       ZLCCOS              / GET SECONDARY STATUS
      55654   7650            SNA CLA                       / STATUS = TXFER ?
      55655   5335            JMP       DJ7EXT              / NO - GO SEND NORMAL DISCONNECT REQUEST
      55656   6221            CDF      20                   / YES - SET UP TXFER DISCONNECT REQUEST
      55657   1750            TAD   I   DJ7LIF              / GET FIELD OF INSERT LINE
      55660   1021            TAD       ZKCDF               / SET UP CDF TO FIELD
      55661   3343            DCA       DJ7CIF              /  OF INSERT LINE
      55662   1751            TAD   I   DJ7LIA              / GET START ADDRESS OF INSERT LINE
      55663   3010            DCA       ZAUT00              /
      55664   6251            CDF      50                   /
      55665   4342            JMS       DJ7100              / PICK UP INSERT LINE LENGTH
      55666   3362            DCA       DJ7ILL              /
                                                            /
      55667   1012            TAD       ZAUT02              / RESET POINTER IN OUTPUT
      55670   1347            TAD       DJ7P07              /  REQUEST BUFFER
      55671   3012            DCA       ZAUT02              /
                                                            /
      55672   1362            TAD       DJ7ILL              / GET LENGTH OF INSERT LINE
      55673   1055            TAD       ZP0020              /  ADD 16 AND THEN
      55674   7421            MQL                           /  RESET APPLICATION RECORD
      55675   7701            ACL                           /  LENGTH BEFORE RESETTING
      55676   4531            JMS   I   ZK0512              /  RECORD LENGTH
```

```
55677  2012            ISZ     ZAUTO2          / RESET OUTPUT POINTER
55700  1053            TAD     ZP0010          /
55701  4531            JMS  I  ZKD512          / RESET NON PACKED LENGTH
55702  7305            WP0002                  /
55703  4531            JMS  I  ZKD512          / RESET REQUEST TYPE
                                               /
55704  7325            WP0003                  / RESET POINTER IN OUTPUT
55705  1012            TAD     ZAUTO2          /  REQUEST BUFFER
55706  3012            DCA     ZAUTO2          /
                                               /
55707  1362            TAD     DJ7ILL          / GET LENGTH OF INSERT LINE
55710  1053            TAD     ZP0010          /  ADD 8 AND THEN
55711  4531            JMS  I  ZKD512          / SET UP LENGTH IN REQUEST
                                               /
55712  1355            TAD     DJ7001          / GET ADDRESS OF SUBSCRIBER DATA TABLE
55713  3011            DCA     ZAUTO1          /
55714  1411            TAD  I  ZAUTO1          / GET FIRST TWO CHARS OF OWN SUBSCRIBER MNE
55715  4531            JMS  I  ZKD512          / STORE IN REQUEST
55716  1411            TAD  I  ZAUTO1          / GET NEXT TWO CHARS OF OWN SUBSCRIBER MNE
55717  4531            JMS  I  ZKD512          / STORE IN REQUEST
55720  1356            TAD     DJ7LT1          / GET FIRST LITERAL
55721  4531            JMS  I  ZKD512          / STORE IN REQUEST
55722  1357            TAD     DJ7LT2          / GET NEXT LITERAL
55723  4531            JMS  I  ZKD512          / STORE IN REQUEST
                                               /
55724  1362            TAD     DJ7ILL          / GET LENGTH OF INSERT LINE (CHARS)
55725  7450            SNA                     / ANY CHARS IN INSERT LINE ?
55726  5335            JMP     DJ7EXT          / NO - SO EXIT
55727  7171            CLL CMA CML IAC RAR     /
55730  3362            DCA     DJ7ILL          / SAVE LENGTH OF INSERT LINE (WORDS)
                                               /
55731  4342    DJ7010, JMS     DJ7109          / GET DATA FROM INSERT LINE
55732  4531            JMS  I  ZKD512          / STORE IN OUTPUT REQUEST
55733  2362            ISZ     DJ7ILL          / ALL THE INSERT LINE COPIED ?
55734  5331            JMP     DJ7010          / NO
                                               / YES
55735  4570    DJ7EXT, JMS  I  ZKD345          / CALCULATE PORT NUMBER
55736  7521            SWP                     / PORT NO. IN MQ/APPLI REC. LGTH. IN AC
55737  4532            JMS  I  ZKD513          / SEND OFF DISCONNECT REQUEST
55740  5623            JMP  I  TOP327          / RETURN TO CALLER


               /
               / SUBROUTINE TO PICK UP DATA WORDS FROM INSERT LINE
               /

55741  7403            2-1^2+7401              /*2 VARIABLE LOCATIONS FOLLOW
55742  0000    DJ7100, .-.
55743  0000    DJ7CIH, 0                       / INTO FIELD OF INSERT LINE
55744  1410            TAD  I  ZAUTO0          / GET DATA WORD
55745  6251            CDF     50              /
55746  5742            JMP  I  DJ7100          / RETURN TO CALLER

55747  7771    DJ7007, -7                      / CONSTANT
55750  0112    DJ7LIF, ZBCILF                  / LINK TO FIELD OF INSERT LINE
55751  0113    DJ7LIA, ZBCILA                  / LINK TO ADDRESS OF INSERT LINE
55752  0106    DJ7LCL, ZDCCLN                  / LINK TO CURRENT LINE NO.
55753  0107    DJ7LCC, ZDCCCL                  / LINK TO NO. OF CHARS IN LINE
55754  0120    DJ7LPC, ZDCPKS                  / LINK TO PACKET COUNT
55755  5601    DJ7001, TOR001                  / LINK TO SUBSCRIBER DATA TABLE
55756  5224    DJ7LT1, 5224                    / LITERAL 1 - *T
55757  4040    DJ7LT2, 4040                    / LITERAL 2 - SPACE/SPACE
55760  2011    DJ742D, TOP420                  / LINK TO CONVERT LINE NO. RTN

55761  7401            1-1^2+7401              /*1 VARIABLE LOCATIONS FOLLOW
55762  0000    DJ7ILL, 0                       / LENGTH OF INSERT LINE
55763  0000            ZBLOCK  .+200&7600-.    /*ZERO FILL PAGE
               /====================================================
               /=                                                  =
               /= - MODULE:    TOP325                              =
               /=              DISCONNECT STATEMENT RECEIVED       =
               /=                                                  =
               /= - FUNCTION:                                      =
               /=              PROCESSES A RECEIVED DISCONNECT     =
               /=              STATEMENT WHICH NORMALLY INDICATES  =
               /=              THAT THE COUNTERPARTY'S TC HAS ACCEPTED =
               /=              OUR DISCONNECT REQUEST              =
               /=                                                  =
               /= - FORM OF CALL:                                  =
               /=              JMS  I  (TOP325                     =
               /=                                                  =
               /====================================================

56000  7401            1-1^2+7401              /*1 VARIABLE LOCATIONS FOLLOW
56001  0000    TOP325, .-.
56002  7346            WM0003                  /
56003  1102            TAD     ZDCPRS          / GET CONVERSATION STATUS
56004  7640            SZA CLA                 / STATUS = DIALOGUE ?
56005  5241            JMP     DJ5EXT          / NO - EXIT
56006  7344            WM0002                  /
56007  1103            TAD     ZDCCDS          / GET SECONDARY STATUS
56010  7450            SNA                     / DISCONNECT (TXFER) SENT ?
56011  5215            JMP     DJ5005          / YES - GO PROCESS
```

```
56012  7001            IAC                     /
56013  7640            SZA CLA                 / DISCONNECT SENT ?
56014  5241            JMP     DJ5EXT          / NO - EXIT
                                               /
56015  6241    DJ5005, CDF     40              / YES
56016  2644            ISZ  I  DJ5LPC          / INCREMENT PACKET COUNT
56017  7000            NOP                     / SAFEGUARD FOR WRAP-ROUND COUNT
56020  1643            TAD  I  DJ5LCS          / GET CONTROL STATUS
56021  1077            TAD     ZP7777          /
56022  7640            SZA CLA                 / STATUS = RECEIVE
56023  5227            JMP     DJ5010          / NO
                                               /
56024  3643            DCA  I  DJ5LCS          / YES - SET STATUS = SEND
56025  6251            CDF     50              /
56026  4355            JMS     DJ3100          / GO DISPLAY INTERRUPT LITERAL
56027  6251    DJ5010, CDF     50              /
56030  7325            NP0003                  /
56031  1103            TAD     ZDCCDS          / SET PRIMARY STATUS FROM
56032  3102            DCA     ZDCPRS          /  SECONDARY STATUS
56033  7325            NP0003                  /
56034  3103            DCA     ZDCCDS          / SET SECONDARY STATUS = STATS/PRINT
56035  4646            JMS  I  DJ5326          / ADD FINAL TEXT
                                               /
56036  6242            CIF     40              /
56037  4545            JMS  I  ZKD462          / PRINT THE DIALOGUE
                                               /
56040  4645            JMS  I  DJ5326          / SWITCH OFF CONVERSATION
                                               /
56041  6243    DJ5EXT, CDI     40              /
56042  5601            JMP  I  TDP325          / RETURN TO CALLER

56043  0102    DJ5LCS, ZDCCDS                  / LINK TO CONTROL STATUS
56044  0120    DJ5LPC, ZDCPKS                  / LINK TO PACKET COUNT
56045  6201    DJ5326, TDP326                  / LINK TO SWITCH OFF CONVERSATION RTN
56046  6504    DJ5326, TDP328                  / LINK TO ADD FINAL TEXT RTN
               /=======================================================
               /=                                                     =
               /= - MODULE:      TDP328                               =
               /=                DISCONNECT REJECTION RECEIVED        =
               /=                                                     =
               /= - FUNCTION:                                         =
               /=                PROCESSES A RECEIVED DISCONNECT      =
               /=                REJECTION WHICH INDICATES THAT ONE   =
               /=                DISCONNECT REQUEST WAS REJECTED BY THE =
               /=                COUNTERPARTY'S TC                    =
               /=                                                     =
               /= - FORM OF CALL:                                     =
               /=                JMS   I   (TDP328                    =
               /=                                                     =
               /=======================================================

56047  7401            1-1^2+7401              /*1 VARIABLE LOCATIONS FOLLOW
56050  0000    TDP328, .-.
56051  1050            TAD     ZP0005          /
56052  4534            JMS  I  ZKD515          / GET STATUS FROM RECORD
56053  7041            CIA                     /
56054  1103            TAD     ZDCCDS          / ADD IN SECONDARY STATUS
56055  7640            SZA CLA                 / STATUS = DISCONNECT STATEMENT SENT ?
56056  5305            JMP     DJ8EXT          / NO - EXIT
56057  7346            NN0003                  /
56060  1102            TAD     ZDCPRS          / GET PRIMARY STATUS
56061  7640            SZA CLA                 / STATUS = DIALOGUE ?
56062  5305            JMP     DJ8EXT          /
                                               /
56063  6241            CDF     40              /
56064  2644            ISZ  I  DJ5LPC          / INCREMENT PACKET COUNT
56065  7000            NOP                     / SAFEGUARD FOR WRAP-ROUND COUNT
56066  6251            CDF     50              /
56067  6242            CIF     40              /
56070  4710            JMS  I  DJ8457          / COMPARE RECORD AND CURRENT POSITIONS
56071  7700            SMA CLA                 / RECORD POSITION < CURRENT POSITION ?
56072  5302            JMP     DJ8010          / NO
56073  6241            CDF     40              / YES
56074  7001            IAC                     /
56075  3643            DCA  I  DJ5LCS          / SET CONTROL STATUS = RECEIVE
56076  6251            CDF     50              /
56077  6242            CIF     40              /
56100  4707            JMS  I  DJ8453          / RESET DIALOGUE POSITION
                                               /
56101  4355            JMS     DJ3100          / GO DISPLAY INTERRUPT LITERAL
                                               /
56102  3103    DJ8010, DCA     ZDCCDS          / CLEAR SECONDARY STATUS
56103  6222            CIF     20              /
56104  4572            JMS  I  ZKB23S          / UNLOCK KEYBOARD
56105  6243    DJ8EXT, CDI     40              /
56106  5650            JMP  I  TDP328          / RETURN TO CALLER

56107  6601    DJ8453, TDP453                  / LINK TO RESET DIALOGUE RTN
56110  6467    DJ8457, TDP457                  / LINK TO COMPARE POSITIONS RTN
```

```
                 /=======================================================
                 /=                                                     =
                 /= - MODULE:      TDP329                               =
                 /=                CONNECTION LOST                      =
                 /=                                                     =
                 /= - FUNCTION:                                         =
                 /=                WHEN SOMETHING HAS HAPPENED TO BREAK =
                 /=                THE CONNECTION BETWEEN THE TWO PARTY'S =
                 /=                TO A DIALOGUE.THIS MODULE ENDS THE   =
                 /=                DIALOGUE,INFORMING THE USER THAT THE =
                 /=                CONNECTION HAS BEEN LOST AND LEAVING =
                 /=                HIM FREE TO SCROLL HIS TEXT BEFORE   =
                 /=                PRINTING IT                          =
                 /=                                                     =
                 /= - FORM OF CALL:                                     =
                 /=                JMS  I  (TDP329                      =
                 /=                                                     =
                 /=======================================================

56111  7401              1-1^2+7401                /*1 VARIABLE LOCATIONS FOLLOW
56112  0000    TDP329,   .-.
56113  6214              RDF                       /
56114  1023              TAD      ZKCDI            / SET UP RETURN TO CALLER'S
56115  3326              DCA      DJ9CDI           /  FIELDS INSTRUCTION
                                                   /
56116  6251              CDF      50               /
56117  1052              TAD      ZP0007           / SET PRIMARY STATUS EQUAL
56120  3102              DCA      ZDCPRS           /  TO CONNECTION LOST
                                                   /
56121  4730              JMS  I   DJ9324           / SEND A DISCONNECT STATEMENT
56122  4646              JMS  I   DJ5326           / ADD END DIALOGUE TEXT
                                                   /
56123  7325              WP0003                    / SET SECONDARY STATUS EQUAL
56124  3103              DCA      ZDCCDS           /  TO STATS/PRINT
                                                   /
56125  7401              1-1^2+7401                /*1 VARIABLE LOCATIONS FOLLOW
56126  0000    DJ9CDI,   0                         /
56127  5712              JMP  I   TDP329           / RETURN TO CALLER

56130  6401    DJ9324,   TDP324                    / LINK TO DISCONNECT - DIALOGUE RTN


                 /
                 / SUBROUTINE USED BY TDP323 TO SET UP DISCONNECT REJECTION
                 /
56131  7401              1-1^2+7401                /*1 VARIABLE LOCATIONS FOLLOW
56132  0000    DJ3300,   .-.
56133  4531              JMS  I   ZKD512           / SET UP DISCONNECT TYPE IN
56134  6241              CDF      40               /  DISCONNECT REJECTION
56135  1751              TAD  I   DJ3LCC           / GET NUMBER OF CHARACTERS
56136  7421              MQL                       /
56137  1752              TAD  I   DJ3LCN           / GET LINE NUMBER (RELATIVE)
56140  6251              CDF      50               /
56141  6242              CIF      40               /
56142  4753              JMS  I   DJ342D           / CONVERT TO ABSOLUTE
56143  4531              JMS  I   ZKD512           / STORE LINE NO. (ABSOLUTE) IN OUTPUT RECORD
56144  7701              ACL                       / GET NUMBER OF CHARACTERS
56145  4531              JMS  I   ZKD512           / STORE IN OUTPUT RECORD
56146  1112              TAD      ZDCOCR           / GET OWN CONVERSATION REFERENCE
56147  4531              JMS  I   ZKD512           / STORE IN OUTPUT RECORD
56150  5732              JMP  I   DJ3300           / RETURN TO CALLER

56151  0107    DJ3LCC,   ZDCCCL                    / LINK TO NUMBER OF CHARACTERS
56152  0106    DJ3LCN,   ZDCCLN                    / LINK TO CURRENT LINE NUMBER
56153  2011    DJ342D,   TDP42D                    / LINK TO CONVERT LINE NUMBER RTN.

                 /
                 / SUBROUTINE TO FIND ROOM FOR,ADD AND DISPLAY INTERRUPT LITERAL
                 /
56154  7401              1-1^2+7401                /*1 VARIABLE LOCATIONS FOLLOW
56155  0000    DJ3100,   .-.
56156  7001              IAC                       /
56157  7421              MQL                       / SET OVERRIDING INDICATOR
56160  1367              TAD      DJ3027           / SET UP LITERAL'S LENGTH
56161  6242              CIF      40               /
56162  4553              JMS  I   ZKD422           / FIND ROOM FOR LITERAL
56163  7300              WKLEAR                    /
56164  6242              CIF      40               /
56165  4770              JMS  I   DJ3456           / ADD INTERRUPT LITERAL AND DISPLAY
56166  5755              JMP  I   DJ3100           / RETURN TO CALLER

56167  0027    DJ3027,   27                        / LITERAL'S LENGTH
56170  6717    DJ3456,   TDP456                    / LINK TO ADD AND DISPLAY INTERRUPT RTN
56171  0000              ZBLOCK   .+200&7600-.     /*ZERO FILL PAGE
```

```
                    /=====================================================
                    /=                                                   =
                    /= - MODULE:      TDP326                             =
                    /=                SWITCH OFF CONVERSATION            =
                    /=                                                   =
                    /= - FUNCTION:                                       =
                    /=                ELIMINATES ALL TRACES OF A DIALOGUE AND =
                    /=                CHANGES MODE IF NECESSARY          =
                    /=                                                   =
                    /= - FORM OF CALL:                                   =
                    /=                JMS  I  (TDP326                    =
                    /=                                                   =
                    /=====================================================

56200  7401              1-1^2+7401               /*1 VARIABLE LOCATIONS FOLLOW
56201  0000     TDP326,  .-.
56202  1266              TAD     DJ6ADR           / SET UP START ADDRESS
56203  3004              DCA     ZWORK1           /
56204  1054              TAD     ZP0017           / SET UP NEGATIVE LOOP
56205  7041              CIA                      /  COUNT OF NUMBER OF
56206  3005              DCA     ZWORK2           /  LOCATIONS TO BE CLEARED
                                                  /
56207  6241     DJ6010,  CDF     40               / ZERIOSE ENTIRE CONVERSATIONS
56210  3404              DCA  I  ZWORK1           /  CONTROL BLOCK EXCEPT
56211  6251              CDF     50               /  DESCRIPTOR AND NUMBER OF
56212  3404              DCA  I  ZWORK1           /  LINES IN PAGE ZERO OF
56213  2004              ISZ     ZWORK1           /  FIELDS 4 AND 5
56214  2005              ISZ     ZWORK2           /
56215  5207              JMP     DJ6010           /
                                                  /
56216  1101              TAD     ZDCDES           / GET DESK UNIT/MODE
56217  0061              AND     ZP0077           / MASK LEAVING MODE
56220  1042              TAD     ZM0005           /
56221  7640              SZA CLA                  / MODE CN2 ?
56222  1062              TAD     ZP0100           / NO - SET UP INACTIVE MASK FOR CN1
56223  1064              TAD     ZP0177           / YES - SET UP INACTIVE MASK FOR CN2
56224  6221              CDF     20               /
56225  0671              AND  I  DJ6LCA           / MASK IN CONVERSATION ACTIVITY
56226  3671              DCA  I  DJ6LCA           /  THUS SETTING MODE INACTIVE
56227  6251              CDF     50               /
                                                  /
56230  7001              IAC                      /
56231  6212              CIF     10               /
56232  4535              JMS  I  ZKC213           / RETURN INSERT LINE BUFFER
                                                  /
56233  6242              CIF     40               / CLEAR SCREEN AREA AND APPLICATION
56234  4562              JMS  I  ZK0429           /  STATUS IF NECESSARY
                                                  /
56235  6222              CIF     20               /
56236  4572              JMS  I  ZKB23S           / UNLOCK THE KEYBOARD
                                                  /
56237  6221              CDF     20               /
56240  1670              TAD  I  DJ6LCM           / GET DISPLAY/CURRENT MODES
56241  1265              TAD     DJ6505           / ADD IN EQUALITY MASK
56242  7640              SZA CLA                  / DISPLAY = CURRENT = CN2 MODE ?
56243  5246              JMP     DJ6015           / NO - CONTINUE
56244  1050              TAD     ZP0005           / YES - CLEAR DISPLAY MODE
56245  3670              DCA  I  DJ6LCM           /
56246  1667     DJ6015,  TAD  I  DJ6LOM           / GET ALERTS SUPER/OPERATOR MODES
56247  0061              AND     ZP0077           / GET OPERATOR MODE
56250  3004              DCA     ZWORK1           /
56251  1670              TAD  I  DJ6LCM           / GET DISPLAY/CURRENT MODES
56252  0061              AND     ZP0077           / GET CURRENT MODE
56253  7041              CIA                      /
56254  1004              TAD     ZWORK1           /
56255  6251              CDF     50
56256  7640              SZA CLA                  / OPERATOR MODE = MODE BEING SWITCHED OFF ?
56257  5601              JMP  I  TDP326           / NO - SO EXIT
56260  7305              NP0002
56261  6222              CIF     20               /
56262  4573              JMS  I  ZKB23X           / AMEND MODE TO CNV MODE
56263  7300              NKLEAR
56264  5601              JMP  I  TDP326           / RETURN TO CALLER

56265  7273     DJ6505,  -505                     / EQUAL DISPLAY/CURRENT MODE MASK
56266  0102     DJ6ADR,  ZDCPRS                   / START ADDRESS FOR ZEROISING
56267  0103     DJ6LOM,  ZBCAOM                   / LINK TO OPERATOR MODE
56270  0104     DJ6LCM,  ZBCDCM                   / LINK TO CURRENT MODE
56271  0105     DJ6LCA,  ZBCALM                   / LINK TO CONVERSATION ACTIVITY
                    /=====================================================
                    /=                                                   =
                    /= - MODULE:      TDP321                             =
                    /=                TXFER                              =
                    /=                                                   =
                    /= - FUNCTION:                                       =
                    /=                PROCESSES AN OPERATOR REQUEST TO   =
                    /=                TRANSFER A DIALOGUE TO ANOTHER DESK =
                    /=                UNIT                               =
                    /=                                                   =
                    /= - FORM OF CALL:                                   =
                    /=                JMS  I  (TDP321                    =
                    /=                                                   =
                    /=====================================================
```

```
56272  7401          1-1^2+7401              /*1 VARIABLE LOCATIONS FOLLOW
56273  0000  TDP321, .-.
56274  6242          CIF      40             /
56275  4567          JMS  I   ZKD42C         / SWAP IN CONVS CONTROL BLOCK
                                             /
56276  7346          WM0003                  /
56277  1102          TAD      ZDCFRS         / GET CONVERSATION STATUS
56300  7640          SZA CLA                 / CONVERSATION STATUS = DIALOGUE ?
56301  5325          JMP      DJ1010         / NO - TAKE ERROR EXIT
                                             /
56302  6221          CDF      20             /
56303  1734          TAD  I   DJ1LIA         / GET START ADDRESS OF
56304  3010          DCA      ZAUT00         /  INSERT LINE BUFFER
56305  1733          TAD  I   DJ1LIF         / GET FIELD OF INSERT LINE BUFFER
56306  1021          TAD      ZKCDF          /  AND CREATE CDF INSTRUCTION
56307  3311          DCA      DJ1CIL         /  TO THIS FIELD
                                             /
56310  7401          1-1^2+7401              /*1 VARIABLE LOCATIONS FOLLOW
56311  0000  DJ1CIL, 0                       / INTO INSERT LINE BUFFER'S FIELD
56312  1410          TAD  I   ZAUT00         / GET NO. OF CHARS IN INSERT LINE
56313  6251          CDF      50             /
56314  1332          TAD      DJ1M16         / ADD IN MAXIMUM
56315  7740          SMA SZA CLA             / LENGTH INSERT LINE < OR = 14 ?
56316  5325          JMP      DJ1010         / NO - TAKE ERROR EXIT
                                             /
56317  6222          CIF      20             /
56320  4574          JMS  I   ZKB23Z         / LOCK THE KEYBOARD
                                             /
56321  7305          WP0002                  / SET SECONDARY STATUS = DISCONNECT
56322  3103          DCA      ZDCCDS         /  REQUEST (TXFER) SENT
                                             /
56323  4735          JMS  I   DJ1327         / SEND DISCONNECT REQUEST
56324  5330          JMP      DJ1EXT         / EXIT
                                             /
56325  1052  DJ1010, TAD      ZP0007         / SET UP ERROR MESSAGE NO.
56326  6222          CIF      20             /
56327  4566          JMS  I   ZKB22L         / DISPLAY "INVALID FUNCTION"
                                             /
56330  6243  DJ1EXT, CDI      40             /
56331  5673          JMP  I   TDP321         / RETURN TO CALLER

56332  7762  DJ1M16, -16                     / MAX. LENGTH INSERT LINE
56333  0112  DJ1LIF, ZBCILF                  / LINK TO INSERT LINE FIELD
56334  0113  DJ1LIA, ZBCILA                  / LINK TO INSERT LINE ADDRESS
56335  5623  DJ1327, TDP327                  / LINK TO SEND DISCONNECT RTN

56336  0000          ZBLOCK   .+20067600-.   /*ZERO FILL PAGE
             /====================================================
             /=                                                  =
             /= - MODULE:     TDP324                             =
             /=               DISCONNECT-DIALOGUE                =
             /=                                                  =
             /= - FUNCTION:                                      =
             /=               FORMS A DISCONNECT STATEMENT AND   =
             /=               DISCONNECTS                        =
             /=                                                  =
             /= - FORM OF CALL:                                  =
             /=               JMS  I  (TDP324                    =
             /=                                                  =
             /====================================================

56400  7401          1-1^2+7401              /*1 VARIABLE LOCATIONS FOLLOW
56401  0000  TDP324, .-.
56402  3216          DCA      DJ4CTY         / SAVE CONTROL TYPE - MAY BE ZERO
                                             / GET A BUFFER & FORM DISCONNECT STATEMENT
56403  4530          JMS  I   ZKD511         /  USING I/O BUFFER HANDLER COMPONENT
56404  0004          4                       / RECORD LENGTH
56405  0321          321                     / RECORD TYPE
56406  0004          4                       / LENGTH NON PACKED
56407  7777          -1                      / TERMINATOR
56410  1216          TAD      DJ4CTY         / GET CONTROL TYPE
56411  4531          JMS  I   ZKD512         / SAVE IN RECORD
56412  7301          WP0001                  / DISCONNECT WITH MESSAGE
56413  4533          JMS  I   ZKD514         /  TYPE =1
                                             /
56414  5601          JMP  I   TDP324         / RETURN TO CALLER

56415  7401          1-1^2+7401              /*1 VARIABLE LOCATIONS FOLLOW
56416  0000  DJ4CTY, 0                       / CONTROL TYPE
```

```
                        /=====================================================
                        /=                                                   =
                        /= - MODULE:     TDP32A                              =
                        /=               TRANSFERRED                         =
                        /=                                                   =
                        /= - FUNCTION:                                       =
                        /=               WHEN THE COUNTERPARTY TRANSFERS OUR =
                        /=               CONVERSATION THIS MODULE ENDS THE OLD =
                        /=               DIALOGUE AND SENDS A CONTACT REQUEST TO =
                        /=               START A NEW ONE                     =
                        /=                                                   =
                        /= - FORM OF CALL:                                   =
                        /=               JMS   I   (TDP32A                   =
                        /=                                                   =
                        /=====================================================

56417  7401              1-1^2+7401              /*1 VARIABLE LOCATIONS FOLLOW
56420  0000   TDP32A,    .-.
56421  6242              CIF      40             /
56422  4545              JMS   I  ZKD462         / PRINT THE CONVERSATION
                                                 /
56423  1111              TAD      ZDCCSP         / REMEMBER PAYER
56424  0044              AND      ZK0010         /
56425  3302              DCA      DJAPAY         /
                                                 /
56426  4700              JMS   I  DJA326         / SWITCH OFF CONVERSATION
                                                 /
56427  6221              CDF      20             /
56430  1674              TAD   I  DJALCA         / GET CONVERSATION ACTIVITY
56431  7002              BSW                     /
56432  7110              CLL RAR                 / GET ACTIVITY INDICATOR
56433  7630              SZL CLA                 / CN1 INACTIVE ?
56434  7001              IAC                     / NO - SO SET UP MODE = CN2
56435  1271              TAD      DJAP04         / YES - SO SET UP MODE = CN1
56436  3246              DCA      DJAMDE         /
56437  1673              TAD   I  DJALDU         / GET DESK UNIT NUMBER
56440  3245              DCA      DJADUN         /
56441  6251              CDF      50             /
56442  6222              CIF      20             /
56443  4557              JMS   I  ZKB213         / SWAP IN DESK UNIT CONTROL TABLE
56444  7403              2-1^2+7401              /*2 VARIABLE LOCATIONS FOLLOW
56445  0000   DJADUN,    0                       / DESK UNIT NUMBER
56446  0000   DJAMDE,    0                       / MODE
56447  7300              *KLEAR                  /
                                                 /
56450  6242              CIF      40             /
56451  4567              JMS   I  ZKD42C         / SWAP IN CONV CONTROL BLOCK
                                                 /
56452  1051              TAD      ZP0006         /
56453  3102              DCA      ZOCPRS         / SET PRIMARY STATUS = TRANSFERRED
56454  1302              TAD      DJAPAY         / RESTORE THE PAYER AND COUNTERPARTY'S
56455  3111              DCA      ZDCCSP         /  STATUS AT CONTACT
                                                 /
56456  1676              TAD   I  DJALBA         / GET START ADDRESS OF INPUT BUFFER
56457  1272              TAD      DJAP11         / ADD OFFSET GIVING
56460  3267              DCA      DJAILA         /  START ADDRESS OF PSEUDO INSERT LINE
56461  1675              TAD   I  DJALBF         / GET CDF TO INPUT BUFFER
56462  0060              AND      ZP0070         /
56463  3266              DCA      DJAILF         / SAVE FIELD OF PSEUDO INSERT LINE
                                                 /
56464  4677              JMS   I  DJA312         / DO A CONTACT REQUEST
56465  7403              2-1^2+7401              /*2 VARIABLE LOCATIONS FOLLOW
56466  0000   DJAILF,    0                       / FIELD OF PSEUDO INSERT LINE
56467  0000   DJAILA,    0                       / START ADDRESS OF PSEUDO INSERT LINE
                                                 /
56470  5620              JMP   I  TDP32A         / RETURN TO CALLER

56471  0004   DJAP04,    4                       / BASE VALUE OF MODES CN1/CN2
56472  0011   DJAP11,    11                      / OFFSET OF PSEUDO INSERT LINE
56473  0101   DJALDU,    ZBCDUN                  / LINK TO DESK UNIT NUMBER
56474  0105   DJALCA,    ZBCALM                  / LINK TO CONVERSATION ACTIVITIES
56475  0350   DJALBF,    DM6CDF                  / LINK TO INPUT RECORD'S CDF
56476  0340   DJALBA,    DM5FRA                  / LINK TO INPUT RECORD'S ADDRESS
56477  3201   DJA312,    TDP312                  / LINK TO CONTACT REQUEST RTN
56500  6201   DJA326,    TDP326                  / LINK TO SWITCH OFF CONVERSATION RTN

56501  7401              1-1^2+7401              /*1 VARIABLE LOCATIONS FOLLOW
56502  0000   DJAPAY,    0                       / PAYER
                        /=====================================================
                        /=                                                   =
                        /= - MODULE:     TDP32B                              =
                        /=               END STORAGE                         =
                        /=                                                   =
                        /= - FUNCTION:                                       =
                        /=               ADDS APPROPRIATE TEXT AT THE BOTTOM OF =
                        /=               THE EXISTING DIALOGUE TO SHOW THAT THE =
                        /=               DIALOGUE HAS ENDED                  =
                        /=                                                   =
                        /= - FORM OF CALL:                                   =
                        /=               JMS   I   (TDP32B                   =
                        /=                                                   =
                        /=====================================================
```

```
56503  7401            1-1^2+7401              /*1 VARIABLE LOCATIONS FOLLOW
56504  0000  TDP328,  .-.
56505  6242            CIF     40              /
56506  4744            JMS  I  DJB424          / REMEMBER DIALOGUE POSITION
56507  7301            *P0001                  / SET OVERRIDING INDICATOR
56510  7421            MQL                     /
56511  1346            TAD     DJBP35          / SET UP LENGTH OF LITERAL
56512  6242            CIF     40              /
56513  4553            JMS  I  ZKD422          / FIND ROOM FOR TEXT
56514  7300            *KLEAR                  /
56515  6242            CIF     40              /
56516  4552            JMS  I  ZKD421          / MOVE NEWLINE TO DIALOGUE BUFFERS
                                               /
56517  1102            TAD     ZDCPRS          / GET PRIMARY STATUS
56520  1347            TAD     DJBMAD          / ADD IN START ADDRESS OF VECTOR
56521  3010            DCA     ZAUT00          /  CONTAINING LITERAL'S ADDRESS
56522  1410            TAD  I  ZAUT00          / GET START ADDRESS OF REQUIRED LITERAL
56523  3335            DCA     DJBLAD          /
56524  7325            *P0003                  /
56525  1010            TAD     ZAUT00          / SET UP POINTER TO LITERAL'S LENGTH
56526  3010            DCA     ZAUT00          /
56527  7421            MQL                     / SET START CHARACTER INDICATOR
56530  1410            TAD  I  ZAUT00          / SET UP NO. OF CHARACTERS
56531  6242            CIF     40              /
56532  4554            JMS  I  ZKD423          / COPY TEXT TO DIALOGUE BUFFERS
56533  7403            2-1^2+7401              /*2 VARIABLE LOCATIONS FOLLOW
56534  6251            CDF     50              / DATA CDF
56535  0000  DJBLAD,  0                        / DATA ADDRESS
                                               /
56536  6242            CIF     40              /
56537  4552            JMS  I  ZKD421          / MOVE NEWLINE TO DIALOGUE BUFFERS
                                               /
56540  7340            *P0001                  /
56541  6242            CIF     40              /
56542  4745            JMS  I  DJB425          / DISPLAY LATEST TEXT
                                               /
56543  5704            JMP  I  TDP328          /

56544  2212  DJB424,  TDP424                   / LINK TO REMEMBER DIALOGUE POSITION
56545  2231  DJB425,  TDP425                   / LINK TO DISPLAY LATEST TEXT
56546  0035  DJBP35,  35                       / LENGTH OF LITERALS
56547  6543  DJBMAD,  .-4
56550  6560            DJ9END                  / ADDRESS OF END LITERAL
56551  6562            DJ9TXF                  / ADDRESS OF TXFER LITERAL
56552  6562            DJ9TXF                  /
56553  6565            DJ9CON                  / ADDRESS OF CONNECTION LOST LITERAL
56554  0005            5                       / LENGTH OF END LITERAL
56555  0007            7                       / LENGTH OF TXFER LITERAL
56556  0007            7                       / LENGTH OF TXFER LITERAL
56557  0021            21                      / LENGTH OF CONNECTION LOST LITERAL
56560  5205  DJ9END,  TEXT    "*END"
56561  1604
56562  0000
       6562            *.-1
56562  5224  DJ9TXF,  TEXT    "*TXFER"
56563  3006
56564  0522
56565  0000
       6565            *.-1
56565  5203  DJ9CON,  TEXT    "*CONNECTION LOST*"
56566  1716
56567  1605
56570  0324
56571  1117
56572  1640
56573  1417
56574  2324
56575  5200
56576  0000            ZBLOCK  .+200&7600-.    /*ZERO FILL PAGE
             /=====================================================
             /=                                                   =
             /= - MODULE:       TDP322                            =
             /=                 END CONT                          =
             /=                                                   =
             /= - FUNCTION:                                       =
             /=                 PROCESS AN OPERATOR REQUEST TO END A   =
             /=                 DIALOGUE                          =
             /=                                                   =
             /= - FORM OF CALL:                                   =
             /=                 JMS   I   (TDP322                 =
             /=                                                   =
             /=====================================================
56600  7401            1-1^2+7401              /*1 VARIABLE LOCATIONS FOLLOW
56601  0000  TDP322,  .-.
56602  6221            CDF     20              /
56603  1735            TAD  I  DJ2LCM          / GET DISPLAY/CURRENT MODE
56604  6251            CDF     50              /
56605  0061            AND     ZP0077          / GET CURRENT MODE
56606  1042            TAD     ZM0005          /
56607  7450            SNA                     / CURRENT MODE = CN2 ?
56610  5214            JMP     DJ2010          / YES
56611  7001            IAC                     /
56612  7640            SZA CLA                 / CURRENT MODE = CN1 ?
```

```
56613  5326            JMP     DJ2060      / NO - GO DISPLAY ERROR MESSAGE
56614  6242  DJ2010,   CIF     40          /
56615  4567            JMS  I  ZKD42C      / SWAP IN CONVS CONTROL BLOCKS
56616  6222            CIF     20          /
56617  4574            JMS  I  ZKB23Z      / LOCK THE KEYBOARD
56620  7346            WM0003
56621  1102            TAD     ZDCPRS      / SORT OUT CONV STATUS
56622  7450            SNA
56623  5257            JMP     DJ2030      / 3 = DIALOGUE
56624  7001            IAC
56625  7450            SNA
56626  5331            JMP     DJ2070      / 2 = ACCEPT
56627  7700            SMA!CLA
56630  5306            JMP     DJ2040      / 4+= END CONT - CONNECTION LOST
56631  1101  DJ2020,   TAD     ZDCDES      / CASE := CONV STATUS = CONTACT
56632  0061            AND     ZP0077      / GET CURRENT MODE
56633  1042            TAD     ZM0005      /
56634  7640            SZA CLA             / MODE CN2 ?
56635  1062            TAD     ZP0100      / NO - SET UP INACTIVE MASK FOR CN1
56636  1064            TAD     ZP0177      / YES - SET UP INACTIVE MASK FOR CN2
56637  6221            CDF     20          /
56640  0736            AND  I  DJ2LCA      / MASK IN CONVERSATION ACTIVITY
56641  3736            DCA  I  DJ2LCA      /  THUS SETTING MODE INACTIVE
56642  6241            CDF     40          /
56643  3741            DCA  I  DJ2LCT      / CLEAR CHARS TRANSMITTED/RECEIVED
56644  3742            DCA  I  DJ2LPC      / CLEAR PACKET COUNT
56645  6251            CDF     50          /
56646  4570            JMS  I  ZKD345      / CALCULATE PORT NUMBER
56647  1334            TAD     DJ2CST      / ADD IN CONSTANT
56650  6212            CIF     10          /
56651  4576            JMS  I  ZKB522      / RELEASE THIS PORT
56652  6242            CIF     40          /
56653  4546            JMS  I  ZKD463      / SEND STATS RECORD
56654  4536            JMS  I  ZKD342      / RETURN DIALOGUE BUFFERS
56655  4744            JMS  I  DJ2326      / SWITCH OFF CONVERSATION
56656  5601            JMP  I  TDP322      / RETURN TO CALLER
                                           /
56657  6241  DJ2030,   CDF     40          / CASE := CONVS STATUS = DIALOGUE
56660  1740            TAD  I  DJ2LCS      / GET CONTROL STATUS
56661  6251            CDF     50          /
56662  7640            SZA CLA             / STATUS = SEND ?
56663  5302            JMP     DJ2035      / NO
56664  6242            CIF     40          / YES
56665  4541            JMS  I  ZKD441      / TRANSMIT RESIDUAL TEXT
56666  6221            CDF     20          /
56667  1737            TAD  I  DJ2LCF      / GET OPERATOR INPUT FUNCTION
56670  1074            TAD     ZM0004      /
56671  6251            CDF     50          /
56672  7640            SZA CLA             / FUNCTION = INSERT ?
56673  5302            JMP     DJ2035      / NO
56674  6242            CIF     40          / YES
56675  4746            JMS  I  DJ2415      / PROCESS FURTHER TEXT IN INSERT LINE
56676  7650            SNA CLA             / ALL TEXT PROCESSED ?
56677  5331            JMP     DJ2070      / NO - SO EXIT
56700  6242            CIF     40          /
56701  4541            JMS  I  ZKD441      / TRANSMIT THIS TEXT
56702  7001  DJ2035,   IAC                 / SET SECONDARY STATUS EQUAL TO
56703  3103            DCA     ZDCCDS      /  DISCONNECT REQUEST(NORMAL) SENT
56704  4745            JMS  I  DJ2327      / SEND DISCONNECT REQUEST
56705  5601            JMP  I  TDP322      / RETURN TO CALLER
                                           /
56706  1103  DJ2040,   TAD     ZDCCDS      / CASE := CONVS STATUS = ENDCONT
56707  1074            TAD     ZM0004      / GET SECONDARY STATUS
56710  7640            SZA CLA             / SECONDARY STATUS = SWITCH OFF
56711  5316            JMP     DJ2050      / NO
56712  4536            JMS  I  ZKD342      / YES - RETURN DIALOGUE BUFFERS
56713  4744            JMS  I  DJ2326      / SWITCH OFF THE CONVERSATION
56714  4743            JMS  I  DJ2125      / SEND TABLE STATE RECORD  FREE DESKS REPORT  *
56715  5601            JMP  I  TDP322      / RETURN TO CALLER
                                           /
56716  7346  DJ2050,   WM0003              / CASE := CONNECTION LOST
56717  1103            TAD     ZDCCDS      / GET SECONDARY STATUS
56720  7640            SZA CLA             / SECONDARY STATUS = STATS/PRINT
56721  5331            JMP     DJ2070      / NO - EXIT
56722  6242            CIF     40          /
56723  4545            JMS  I  ZKD462      / YES - PRINT THE CONVERSATION
56724  4744            JMS  I  DJ2326      / SWITCH OFF THE CONVERSATION
56725  5601            JMP  I  TDP322      / RETURN TO CALLER
56726  6222  DJ2060,   CIF     20          / CASE := MODE NOT CN1 OR CN2
56727  1052            TAD     ZP0007      /
56730  4566            JMS  I  ZKB22L      / DISPLAY "INVALID FUNCTION"
56731  6222  DJ2070,   CIF     20          /
56732  4572            JMS  I  ZKB23S      / UNLOCK KEYBOARD
56733  5601            JMP  I  TDP322      / RETURN TO CALLER

56734  4000  DJ2CST,   4000                / CONSTANT FOR PORT RELEASING
56735  0104  DJ2LCM,   ZBCDCM              / LINK TO CURRENT MODE
56736  0105  DJ2LCA,   ZBCALM              / LINK TO CONVERSATION ACTIVITY
56737  0110  DJ2LCF,   ZBCCIF              / LINK TO OPERATOR INPUT FUNCTION
56740  0102  DJ2LCS,   ZDCCOS              / LINK TO CONTROL STATUS
56741  0117  DJ2LCT,   ZDCCHS              / LINK TO CHARS TRANSMITTED
56742  0120  DJ2LPC,   ZDCPKS              / LINK TO PACKET COUNT
56743  5242  DJ2125,   TDP1225             / LINK TO SEND TABLE STATE RTN  FREE DESKS REPORT
56744  6201  DJ2326,   TDP326              / LINK TO SWITCH OFF CONVERSATION RTN
```

```
56745  5623  DJ2327, TDP327                / LINK TO SEND DISCONNECT REQUEST RTN
56746  4430  DJ2415, TDP415                / LINK TO INSERT LINE TEXT RTN


             /
             / SUBROUTINE TO SWAP IN AND OUT SPECIFIED MODE BLOCKS
             /
56747  7401          1-1^2+7401            /*1 VARIABLE LOCATIONS FOLLOW
56750  0000  DJ3200, .-.
56751  7440          SZA                   / MODE GIVEN ?
56752  5355          JMP     DJ3210        / YES
56753  1101          TAD     ZDCDES        / NO - SO GET MODE FROM DESCRIPTOR
56754  0061          AND     ZP0077        /
                                           /
56755  3367  DJ3210, DCA     DJ3MDE        / SAVE MODE
56756  1101          TAD     ZDCDES        / GET DESCRIPTOR
56757  7002          BSW                   /
56760  0061          AND     ZP0077        / MASK OUT DESK UNIT
56761  3366          DCA     DJ3DUN        / SAVE
56762  6251          CDF     50            /
56763  6222          CIF     20            /
56764  4557          JMS  I  ZKB213        / SWAP IN MODE BLOCK
56765  7403          2-1^2+7401            /*2 VARIABLE LOCATIONS FOLLOW
56766  0000  DJ3DUN, 0                     /  FOR THIS DESK UNIT
56767  0000  DJ3MDE, 0                     /  AND THIS MODE
56770  7300          WKLEAR                /
56771  5750          JMP  I  DJ3200        / RETURN TO CALLER
56772  0000          ZBLOCK  .+200&7600-.  /*ZERO FILL PAGE
             /=====================================================
             /=                                                   =
             /= - MODULE:    TDP323                               =
             /=              DISCONNECT REQUEST RECEIVED          =
             /=                                                   =
             /= - FUNCTION:                                       =
             /=              PROCESSES A RECEIVED DISCONNECT REQUEST =
             /=              WHICH INDICATES THAT THE COUNTERPARTY  =
             /=              WISHES TO END OR TRANSFER THE DIALOGUE =
             /=                                                   =
             /= - FORM OF CALL:                                   =
             /=              JMS  I  (TDP323                      =
             /=                                                   =
             /=====================================================

57000  7401          1-1^2+7401            /*1 VARIABLE LOCATIONS FOLLOW
57001  0000  TDP323, .-.
57002  1053          TAD     ZP0010        /
57003  4534          JMS  I  ZKD515        / GET CONVERSATION REFERENCE FROM RECORD
57004  7041          CIA                   /
57005  1112          TAD     ZDCOCR        / GET OUR CONVERSATION REFERENCE
57006  7640          SZA CLA               / REFERENCES EQUAL ?
57007  5347          JMP     DJ3EXT        / NO - EXIT TO CALLER
57010  6242          CIF     40            /
57011  4760          JMS  I  DJ3457        / COMPARE POSITIONS
57012  3006          DCA     ZWORK3        / SAVE RESULT
57013  6241          CDF     40            /
57014  2753          ISZ  I  DJ3LPC        / INCREMENT PACKET
57015  2753          ISZ  I  DJ3LPC        /  COUNT BY TWO
57016  7000          NOP                   / SAFEGUARD FOR WRAP-ROUND COUNT
                                           /
57017  1050          TAD     ZP0005        /
57020  4534          JMS  I  ZKD515        / GET CONTROL TYPE FROM RECORD
57021  3365          DCA     DJ3CTY        / SAVE
57022  1006          TAD     ZWORK3        /
57023  6241          CDF     40            /
57024  7500          SMA                   / CURRENT POSITION > RECORD POSITION
57025  5235          JMP     DJ3010        / NO - CONTINUE
57026  7301          WP0001                /
57027  3752          DCA  I  DJ3LCS        / SET CONTROL STATUS = RECEIVE
57030  6251          CDF     50            /
57031  6242          CIF     40            /
57032  4757          JMS  I  DJ3453        / RESET DIALOGUE POSITION
                                           / SUBROUTINE TO FIND ROOM FOR INTERRUPT
57033  4761          JMS  I  DJ3LRT        /  LITERAL AND ADD AND DISPLAY IT
57034  5260          JMP     DJ3040        / GO TEST DISCONNECT TYPE
                                           /
57035  7750  DJ3010, SPA SNA CLA           / CURRENT POSITION < RECORD POSITION
57036  5243          JMP     DJ3020        / GO TO NEXT TEST
57037  3752          DCA  I  DJ3LCS        / SET CONTROL STATUS = SEND
57040  6251          CDF     50            / SUBROUTINE TO FIND ROOM FOR INTERRUPT
57041  4761          JMS  I  DJ3LRT        /  LITERAL AND ADD AND DISPLAY IT
57042  5276          JMP     DJ3060        / CONDITIONS SATISFIED SO PROCESS
                                           /
57043  6251  DJ3020, CDF     50            /
57044  7344          WM0002                /
57045  1103          TAD     ZDCCDS        / GET SECONDARY STATUS
57046  7450          SNA                   / DISCONNECT REQUEST(TXFER) OUTSTANDING ?
57047  5253          JMP     DJ3030        / YES - GO TO CONTROL STATUS TEST
57050  7001          IAC                   /
57051  7640          SZA CLA               / DISCONNECT REQUEST(NORMAL) OUTSTANDING ?
57052  5260          JMP     DJ3040        / NO - GO TEST DISCONNECT TYPE
                                           /
57053  6241  DJ3030, CDF     40            /
57054  1752          TAD  I  DJ3LCS        / GET CONTROL STATUS
57055  6251          CDF     50            /
```

```
57056  7650           SNA CLA                / STATUS = SENDER ?
57057  5276           JMP      DJ3060        / YES - CONDITIONS SATISFIED SO PROCESS
                                             /
57060  7344  DJ3040,  WM0002                 /
57061  1365           TAD      DJ3CTY        / GET CONTROL TYPE
57062  7640           SZA CLA                / DISCONNECT TYPE = TXFER ?
57063  5312           JMP      DJ3070        / NO - CONDITIONS NOT SATISFIED
                                             /
57064  7305  DJ3050,  WP0002                 / CALL SUBROUTINE TO SWAP IN
57065  4762           JMS  I   DJ3LSR        /  CNV MODE STATUS BLOCK
57066  6221           CDF      20            /
57067  1751           TAD  I   DJ3LKS        / GET KEYBOARD LOCK STATUS
57070  7421           MQL                    /
57071  4762           JMS  I   DJ3LSR        / GET CURRENT MODE BLOCKS BACK
57072  7701           ACL                    / GET KEYBOARD LOCK STATUS
57073  7104           CLL RAL                /
57074  7620           SNL CLA                / KEYBOARD LOCKED ?
57075  5312           JMP      DJ3070        / NO - CONDITIONS NOT SATISFIED
                                             /
57076  4530  DJ3060,  JMS  I   ZKD511        / CONDITIONS SATISFIED PROCEDDING
57077  0007           7                      / GET A BUFFER AND SET UP RECORD LENGTH
57100  0322           322                    /  RECORD TYPE
57101  0007           7                      /  NON PACKED LENGTH
57102  7777           -1                     /
                                             /
57103  1365           TAD      DJ3CTY        /
57104  4763           JMS  I   DJ3SR1        / SET UP DISCONNECT REJECTION
57105  4570           JMS  I   ZKD345        / GET PORT NUMBER
57106  7421           MQL                    /
57107  1052           TAD      ZP0007        / GET APPLICATION RECORD LENGTH
57110  4532           JMS  I   ZKD513        / SEND DISCONNECT REJECTION
57111  5347           JMP      DJ3EXT        / EXIT
                                             /
57112  1006  DJ3070,  TAD      ZWORK3        / GET RESULT OF POSITION COMPARE
57113  7640           SZA CLA                / POSITION EQUAL ?
57114  5325           JMP      DJ3080        / NO - CONTINUE
57115  6241           CDF      40            /
57116  1752           TAD  I   DJ3LCS        / GET CONTROL STATUS
57117  7640           SZA CLA                / STATUS = SENDER ?
57120  5325           JMP      DJ3080        / NO - CONTINUE
57121  7301           WP0001                 /
57122  3752           DCA  I   DJ3LCS        / SET STATUS = RECEIVER
57123  6251           CDF      50            /
57124  4761           JMS  I   DJ3LRT        / ADD AND DISPLAY LITERAL
57125  6251  DJ3080,  CDF      50            
57126  1365           TAD      DJ3CTY        / CONDITIONS NOT SATISFIED PROCESSING
57127  4754           JMS  I   DJ3324        /  SO SEND A DISCONNECT STATEMENT
57130  7344           WM0002                 /
57131  1365           TAD      DJ3CTY        / ADD IN RECORD'S CONTROL TYPE
57132  7440           SZA                    / DISCONNECT TYPE TRANSFER ?
57133  1077           TAD      ZP7777        / NO SO TYPE NORMAL
57134  1051           TAD      ZP0006        /
57135  3102           DCA      ZDCPRS        / SET UP PRIMARY STATUS ACCORDINGLY
57136  4756           JMS  I   DJ3328        / ADD END DIALOGUE TEXT
57137  7325           WP0003                 /
57140  3103           DCA      ZDCCPS        / SET SECONDARY STATUS = STATS/PRINT
57141  6222           CIF      20            /
57142  4572           JMS  I   ZKH23S        / UNLOCK THE KEYBOARD
57143  1102           TAD      ZDCPRS        / GET PRIMARY STATUS
57144  1043           TAD      ZM0006        /
57145  7650           SNA CLA                / TRANSFERRED ?
57146  4755           JMS  I   DJ332A        / YES - DO TRANSFERRED PROCESSING
                                             /
57147  6243  DJ3EXT,  CDI      40            /
57150  5601           JMP  I   TDP323        / RETURN TO CALLER

57151  0111  DJ3LKS,  ZBCKLT                 / LINK TO KEYBOARD LOCK STATUS
57152  0102  DJ3LCS,  ZDCCOS                 / LINK TO CONTROL STATUS
57153  0120  DJ3LPC,  ZDCPKS                 / LINK TO PACKET COUNT
57154  6401  DJ3324,  TDP324                 / LINK TO SEND DISCONNECT STATEMENT RTN
57155  6420  DJ332A,  TDP32A                 / LINK TO TRANSFERRED RTN
57156  6504  DJ3328,  TDP328                 / LINK TO END STORAGE RTN
57157  6601  DJ3453,  TDP453                 / LINK TO RESET DIALOGUE POSITION RTN
57160  6467  DJ3457,  TDP457                 / LINK TO COMPARE POSITIONS RTN
57161  6155  DJ3LRT,  DJ3100                 / LINK TO S/R FOR ADDING ETC LITERAL
57162  6750  DJ3LSR,  DJ3200                 / LINK TO S/R FOR SWAPPING IN MODE BLOCKS
57163  6132  DJ3SR1,  DJ3300                 / LINK*TO S/R TO SET UP DISCONNECT REJECTION
57164  7401           1=1^2+7401             /*1 VARIABLE LOCATIONS FOLLOW
57165  0000  DJ3CTY,  0                      / CONTROL TYPE
57166  0000           ZBLOCK   .+20067600-.  /*ZERO FILL PAGE
       7200  DJ3END=.

              S
AB525T 1733      DJ2LCA 6736      DJ5005 6015      FAP320 0000
ACL    7701      DJ2LCF 6737      DJ5010 6027      FAP410 0000
AKSILC 1557      DJ2LCM 6735      DJ532B 6046      FAP520 0000
AKSILI 1555      DJ2LCS 6740      DJ5326 6045      FARMDE 0000
AKSILO 1556      DJ2LCT 6741      DJ6ADR 6266      FAUS01 0000
AQAKPN 6411      DJ2LPC 6742      DJ6LCA 6271      FBC205 0030
AQAKTP 0015      DJ2010 6614      DJ6LCM 6270      FBP110 0000
AQDPPN 6403      DJ2020 6631      DJ6LDM 6267      FBP130 0000
AQDPTP 0016      DJ2030 6657      DJ6010 6207      FBP210 0020
```

| | | | | | | | |
|---|---|---|---|---|---|---|---|
| AQPRNM | 0177 | DJ2035 | 6702 | DJ6015 | 6246 | FBP220 | 0020 |
| AQPRTY | 0200 | DJ2040 | 6706 | DJ6505 | 6265 | FBP230 | 0020 |
| AQQINS | 0144 | DJ2050 | 6716 | DJ7CIB | 5743 | FBP310 | 0010 |
| AQQRB1 | 5601 | DJ2060 | 6726 | DJ7EXT | 5735 | FBP420 | 0030 |
| AQQRB2 | 5704 | DJ2070 | 6731 | DJ7ILL | 5762 | FBP430 | 0010 |
| AQQRB3 | 6143 | DJ2123 | 6743 | DJ7LCC | 5753 | FBP440 | 0020 |
| AQQRB4 | 6246 | DJ2326 | 6744 | DJ7LCL | 5752 | FBP510 | 0010 |
| AQQTB1 | 7475 | DJ2327 | 6745 | DJ7LIA | 5751 | FBP520 | 0010 |
| AQQTB2 | 7634 | DJ2415 | 6746 | DJ7LIF | 5750 | FBP530 | 0010 |
| AQSOH | 0001 | DJ3CTY | 7165 | DJ7LPC | 5754 | FBP540 | 0010 |
| AQ36SR | 7157 | DJ3DUN | 6766 | DJ7LT1 | 5756 | FBP810 | 0040 |
| BFVWMT | 6232 | DJ3END | 7200 | DJ7LT2 | 5757 | FBP820 | 0040 |
| BLTYPE | 4402 | DJ3EXT | 7147 | DJ7M07 | 5747 | FBP910 | 0030 |
| BLZCCN | 0131 | DJ3LCC | 6151 | DJ7001 | 5755 | FCP110 | 0010 |
| BLZPRA | 0134 | DJ3LCN | 6152 | DJ7010 | 5731 | FCP210 | 0010 |
| BLZPRD | 0133 | DJ3LCS | 7152 | DJ7100 | 5742 | FCP310 | 0010 |
| BLZPRT | 0126 | DJ3LKS | 7151 | DJ742D | 5760 | FCP410 | 0010 |
| BNVWFG | 5207 | DJ3LPC | 7153 | DJ8EXT | 6105 | FCP550 | 0010 |
| CAM | 7621 | DJ3LPT | 7161 | DJ8010 | 6102 | FCP610 | 0010 |
| CDI | 6203 | DJ3LSP | 7162 | DJ8453 | 6107 | FDC480 | 0030 |
| DJADUN | 6445 | DJ3MDE | 6767 | DJ8457 | 6110 | FDP120 | 0050 |
| DJAILA | 6467 | DJ3SR1 | 7163 | DJ9CDI | 6126 | FDP130 | 0050 |
| DJAILF | 6466 | DJ3010 | 7035 | DJ9CON | 6565 | FDP210 | 0050 |
| DJALBA | 6476 | DJ3020 | 7043 | DJ9END | 6560 | FDP230 | 0050 |
| DJALBF | 6475 | DJ3027 | 6167 | DJ9TXF | 6562 | FDP310 | 0050 |
| DJALCA | 6474 | DJ3030 | 7053 | DJ9324 | 6130 | FDP320 | 0050 |
| DJALDU | 6473 | DJ3040 | 7060 | DL16SA | 4106 | FDP330 | 0050 |
| DJAMDE | 6446 | DJ3050 | 7064 | DM5FRA | 0340 | FDP340 | 0050 |
| DJAPAY | 6502 | DJ3060 | 7076 | DN6CDF | 0350 | FDP410 | 0040 |
| DJAP04 | 6471 | DJ3070 | 7112 | DNABEF | 0151 | FDP420 | 0040 |
| DJAP11 | 6472 | DJ3080 | 7125 | DNHWIA | 0145 | FDP430 | 0040 |
| DJA312 | 6477 | DJ3100 | 6155 | DNHWIB | 0146 | FDP440 | 0040 |
| DJA326 | 6500 | DJ3200 | 6750 | DNNCHS | 0144 | FDP450 | 0040 |
| DJBLAD | 6535 | DJ3210 | 6755 | DNSPTF | 0150 | FDP460 | 0040 |
| DJBMAD | 6547 | DJ3300 | 6132 | DN15PA | 0147 | FDP470 | 0040 |
| DJBP35 | 6546 | DJ332A | 7155 | DOZALM | 0126 | FDP490 | 0040 |
| DJB424 | 6544 | DJ332B | 7156 | DOZDCM | 0125 | TAC417 | 0265 |
| DJB425 | 6545 | DJ3324 | 7154 | DOZDES | 0127 | TAD151 | 2042 |
| DJ1CIL | 6311 | DJ342D | 6153 | DOZDUN | 0124 | TAD221 | 1561 |
| DJ1EXT | 6330 | DJ3453 | 7157 | FAP110 | 0000 | TAD322 | 1072 |
| DJ1LIA | 6334 | DJ3456 | 6170 | FAP120 | 0000 | TAP11B | 4472 |
| DJ1LIF | 6333 | DJ3457 | 7160 | FAP130 | 0000 | TAP121 | 4400 |
| DJ1M16 | 6332 | DJ4CTY | 6416 | FAP150 | 0000 | TAP129 | 2402 |
| DJ1010 | 6325 | DJ5EXT | 6041 | FAP220 | 0000 | TAP131 | 4470 |
| DJ1327 | 6335 | DJ5LCS | 6043 | FAP230 | 0000 | TAP134 | 4571 |
| DJ2CST | 6734 | DJ5LPC | 6044 | FAP240 | 0000 | TAP151 | 2002 |

| | | | | | | | |
|---|---|---|---|---|---|---|---|
| TAP152 | 2022 | TBP23I | 5143 | TDC201 | 1717 | TDP415 | 4430 |
| TAP153 | 2034 | TBP23J | 5324 | TDC202 | 1737 | TDP416 | 3741 |
| TAP154 | 2062 | TBP23S | 4361 | TDC481 | 4201 | TDP42A | 0402 |
| TAP212 | 0660 | TBP23X | 5601 | TDC483 | 5001 | TDP42B | 2043 |
| TAP223 | 1525 | TBP23Z | 6061 | TDC484 | 5401 | TDP42C | 0711 |
| TAP235 | 7400 | TBP31A | 4404 | TDC486 | 6001 | TDP42D | 2011 |
| TAP236 | 6637 | TBP31B | 5001 | TDC487 | 6601 | TDP42E | 2025 |
| TAP237 | 6042 | TBP315 | 3602 | TDD201 | 0001 | TDP42F | 0601 |
| TAP239 | 6531 | TBP422 | 0242 | TDD202 | 0461 | TDP42G | 2001 |
| TAP242 | 3600 | TBP423 | 0220 | TDP121 | 5202 | TDP42H | 1757 |
| TAP243 | 3604 | TBP424 | 0401 | TDP122 | 5405 | TDP42I | 1143 |
| TAP244 | 0000 | TBP425 | 0202 | TDP123 | 5242 | TDP42J | 1401 |
| TAP322 | 0747 | TBP431 | 5202 | TDP124 | 5535 | TDP422 | 1201 |
| TAP323 | 1001 | TBP432 | 5211 | TDP131 | 7202 | TDP423 | 1606 |
| TAP324 | 1021 | TBP434 | 5677 | TDP132 | 7401 | TDP424 | 2212 |
| TAP411 | 0600 | TBP437 | 6001 | TDP133 | 7311 | TDP425 | 2231 |
| TAP412 | 0606 | TBP438 | 6024 | TDP134 | 7460 | TDP426 | 3001 |
| TAP416 | 0367 | TBP44C | 7555 | TDP135 | 7463 | TDP427 | 2201 |
| TAP417 | 0202 | TBP44D | 6351 | TDP137 | 7357 | TDP428 | 0460 |
| TAP521 | 1602 | TBP44E | 6253 | TDP211 | 0402 | TDP429 | 2401 |
| TAP525 | 1656 | TBP44F | 7352 | TDP212 | 0601 | TDP431 | 5401 |
| TAP529 | 1742 | TBP44J | 7601 | TDP221 | 0507 | TDP432 | 5430 |
| TAP611 | 1755 | TBP44K | 7401 | TDP224 | 1265 | TDP433 | 5601 |
| TAP612 | 1765 | TBP44L | 7212 | TDP236 | 1070 | TDP434 | 5471 |
| TAR417 | 0400 | TBP44M | 7206 | TDP31A | 3003 | TDP435 | 5476 |
| TAUS01 | 0200 | TBP44N | 7202 | TDP31B | 2202 | TDP436 | 5503 |
| TBCATL | 0210 | TBP44R | 7135 | TDP311 | 4511 | TDP437 | 5510 |
| TBCDAL | 0050 | TBP44U | 6414 | TDP312 | 3201 | TDP441 | 3055 |
| TBCFSP | 1565 | TBP44V | 7715 | TDP313 | 3602 | TDP442 | 3201 |
| TBCNFP | 1566 | TBP441 | 6241 | TDP314 | 2403 | TDP448 | 3225 |
| TBC132 | 2727 | TBP451 | 7610 | TDP315 | 3401 | TDP449 | 3142 |
| TBC205 | 2401 | TBP512 | 1265 | TDP316 | 4001 | TDP451 | 6202 |
| TBC210 | 2445 | TBP521 | 2201 | TDP317 | 4201 | TDP452 | 6242 |
| TBD541 | 0711 | TBP522 | 2504 | TDP319 | 3755 | TDP453 | 6601 |
| TBLBDF | 4401 | TBP523 | 2703 | TDP32A | 6420 | TDP454 | 6401 |
| TBP111 | 2602 | TBP532 | 0522 | TDP32B | 6504 | TDP455 | 6646 |
| TBP131 | 3235 | TBP533 | 0555 | TDP321 | 6273 | TDP456 | 6717 |
| TBP132 | 3401 | TBP541 | 1103 | TDP322 | 6601 | TDP457 | 6467 |
| TBP211 | 4514 | TBP542 | 1154 | TDP323 | 7001 | TDP461 | 7201 |
| TBP212 | 4001 | TBP551 | 2122 | TDP324 | 6401 | TDP462 | 6330 |
| TBP213 | 4601 | TBP811 | 0202 | TDP325 | 6001 | TDP463 | 7401 |
| TBP22F | 2563 | TBP821 | 1602 | TDP326 | 6201 | TDP464 | 7601 |
| TBP22I | 1657 | TBP911 | 7610 | TDP327 | 5623 | TDP471 | 6001 |
| TBP22L | 2001 | TBP919 | 7603 | TDP328 | 6050 | TDP472 | 6032 |
| TBP22M | 2511 | TCP111 | 6202 | TDP329 | 6112 | TDP473 | 6056 |
| TBP22R | 3401 | TCP213 | 7023 | TDP331 | 4603 | TDP474 | 5643 |
| TBP22S | 2601 | TCP311 | 6401 | TDP332 | 5001 | TDP491 | 3402 |
| TBP22U | 2437 | TCP551 | 7124 | TDP333 | 5077 | TDP492 | 3446 |

```
TBP22X 0202     TCP611 7201     TDP334 5137     TDP493 3462
TBP221 1401     TCP91X 7335     TDP335 5161     TDP511 0202
TBP222 1444     TCP911 7266     TDP341 4401     TDP512 0235
TBP223 1500     TCP912 7401     TDP342 4436     TDP513 0243
TBP224 1601     TCP913 7414     TDP345 4143     TDP514 0277
TBP226 0401     TCP914 7432     TDP411 4043     TDP515 0341
TBP229 3201     TDC010 3400     TDP412 4201     TDP516 0347
TDREND 5620     ZDCCCR 0114     ZKCDF  0021     ZP0200 0065
TDR001 5601     ZDCCCY 0110     ZKCDI  0023     ZP0260 0066
TDZACI 5620     ZDCCDS 0103     ZKCIF  0022     ZP0377 0067
TDZOAB 5605     ZDCCHS 0117     ZKC213 0135     ZP0777 0076
TDZOCY 5617     ZDCCLN 0106     ZKC911 0173     ZP7000 0070
TDZOSM 5602     ZDCCLT 0113     ZKD329 0156     ZP7400 0071
TDZOTC 5604     ZDCCOS 0102     ZKD342 0136     ZP7600 0072
TD483E 6000     ZDCCSM 0107     ZKD345 0170     ZP7700 0073
TD487E 7600     ZDCCSP 0111     ZKD42A 0147     ZP7777 0077
WKLEAR 7300     ZDCCVB 0116     ZKD42B 0140     ZVKCRL 0126
WK4000 7330     ZDCDAT 0104     ZKD42C 0167     ZWORK1 0004
WK5777 7352     ZDCDBF 0123     ZKD42F 0150     ZWORK2 0005
WK6000 7333     ZDCDES 0101     ZKD42G 0135     ZWORK3 0006
WK7775 7346     ZDCDTP 0103     ZKD421 0152     ZWORK4 0007
WK7776 7344     ZDCFLD 0110     ZKD422 0153
WK7777 7340     ZDCFLG 0111     ZKD423 0154
WM0001 7340     ZDCFLN 0105     ZKD424 0176
WM0002 7344     ZDCLCU 0114     ZKD425 0177
WM0003 7346     ZDCNCL 0121     ZKD426 0155
WM2000 7333     ZDCNOL 0101     ZKD428 0151
WM2001 7352     ZDCOAN 0113     ZKD429 0162
WM4000 7330     ZDCOCR 0112     ZKD441 0141
WP0001 7301     ZDCPKS 0120     ZKD453 0142
WP0002 7305     ZDCPLN 0116     ZKD456 0143
WP0003 7325     ZDCPPS 0102     ZKD457 0144
WP0004 7307     ZDCPSC 0115     ZKD462 0145
WP0006 7327     ZDCSAD 0104     ZKD463 0146
WP0100 7203     ZDCTXS 0112     ZKD511 0130
WP2000 7332     ZKA151 0036     ZKD512 0131
WP3777 7350     ZKA152 0037     ZKD513 0132
ZARMDE 0133     ZKA153 0040     ZKD514 0133
ZAUT00 0010     ZKA154 0041     ZKD515 0134
ZAUT01 0011     ZKA322 0031     ZKD516 0137
ZAUT02 0012     ZKA323 0032     ZM0004 0074
ZAUT03 0013     ZKA324 0033     ZM0005 0042
ZAUT04 0014     ZKA416 0024     ZM0006 0043
ZAUT05 0015     ZKA417 0025     ZM0010 0044
ZAUT06 0016     ZKA521 0026     ZM0040 0045
ZAUT07 0017     ZKA525 0027     ZM0120 0046
ZBCADM 0105     ZKA529 0030     ZM0260 0047
ZBCAOM 0103     ZKB111 0035     ZP0003 0000
ZBCCIF 0110     ZKB213 0157     ZP0005 0050
ZBCDCM 0104     ZKB22L 0166     ZP0006 0051
ZBCDUA 0102     ZKB221 0160     ZP0007 0052
ZBCDUM 0101     ZKB222 0161     ZP0010 0053
ZBCILA 0113     ZKB226 0163     ZP0017 0054
ZBCILF 0112     ZKB229 0164     ZP0020 0055
ZBCIVA 0122     ZKB23J 0171     ZP0037 0056
ZBCKLT 0111     ZKB23S 0172     ZP0040 0057
ZBCPGN 0120     ZKB23X 0173     ZP0060 0020
ZBCPG1 0115     ZKB23Z 0174     ZP0070 0060
ZBCPTP 0114     ZKB31A 0156     ZP0077 0061
ZDBNCL 0122     ZKB521 0175     ZP0100 0062
ZDCCAN 0115     ZKB522 0176     ZP0120 0063
ZDCCCL 0107     ZKB523 0177     ZP0177 0064
ERRORS DETECTED: 0
LINKS GENERATED: 0
ACL          113    141    381    969
CDI          264    320    541   1018
DJADDN       618    623#
DJAILA       637    645#
DJAILF       640    644#
DJALBA       635    654#
DJALBF       638    653#
DJALCA       610    652#
DJALDU       617    651#
DJAMDF       616    624#
DJAPAY       605    632    659#
DJAP04       615    649#
DJAP11       636    650#
DJA312       642    655#
DJA326       607    656#
DJBLAD       692    702#
DJBMAD       689    716#
DJBP35       681    715#
DJB424       678    713#
DJB425       709    714#
DJ1CIL       518    521#
DJ1EXI       535    541#
DJ1LIA       514    546#
DJ1LIF       516    545#
DJ1M16       524    544#
DJ1010       511    526    537#
DJ1327       534    547#
DJ2CSI       796    853#
DJ2LCA       789    790    855#
```

```
DJ2LCF    813   856#
DJ2LCM    760   854#
DJ2LCS    806   857#
DJ2LCT    792   858#
DJ2LPC    793   859#
DJ2010    765   769#
DJ2020    792#
DJ2030    776   805#
DJ2035    809   817   824#
DJ2040    781   829#
DJ2050    832   838#
DJ2060    768   846#
DJ2070    779   821   841   849#
DJ2123    835   860#
DJ2326    802   834   844   861#
DJ2327    826   862#
DJ2415    819   863#
DJ3CTY    922   959   980   1000  1003  1034#
DJ3DDN    879   884#
DJ3END     81   1036#
DJ3EXT    911   986   1018#
DJ3LCC    374   387#
DJ3LCM    376   388#
DJ3LCS    928   938   953   992   996   1023#
DJ3LKS    966   1022#
DJ3LPC    916   917   1024#
DJ3LRT    933   940   998   1030#
DJ3LSR    964   968   1031#
DJ3MDE    875   885#
DJ3SR1    981   1032#
DJ3010    926   936#
DJ3020    937   943#
DJ3027    398   406#
DJ3030    947   952#
DJ3040    934   950   958#
DJ3050    963#
DJ3060    941   956   974#
DJ3070    961   972   988#
DJ3080    990   994   999#
DJ3100    250   315   395#  404   1030
DJ3200    869#  887   1031
DJ3210    871   875#
DJ3300    371#  385   1032
DJ332A   1016   1026#
DJ3326   1009   1027#
DJ3324   1001   1025#
DJ342D    379   389#
DJ3453    931   1028#
DJ3456    403   407#
DJ3457    913   1029#
DJ4CTY    566   573   581#
DJ5EXT    231   238   264#
DJ5LCS    243   248   267#  310
DJ5LPC    241   268#  301
DJ5005    235   240#
DJ5010    246   251#
DJ5328    257   270#  355
DJ5326    262   269#
DJ6ADR    425   484#
DJ6LCA    446   447   487#
DJ6LCM    461   466   470   486#
DJ6LOM    467   485#
DJ6010    431#  437
DJ6015    464   467#
DJ6505    462   483#
DJ7CIR    127   191#
DJ7EXT    123   170   179#
DJ7ILL    132   138   153   168   172   176   208#
DJ7LCC    106   200#
DJ7LCL    108   199#
DJ7LIA    128   196#
DJ7LIF    125   197#
DJ7LPC    104   201#
DJ7LT1    163   203#
DJ7LT2    165   204#
DJ7M07    135   196#
DJ7001    157   202#
DJ7010    174#  177
DJ7100    131   174   190#  194
DJ7420    111   205#
DJ8EXT    294   298   320#
DJ8010    307   317#
DJ8453    313   323#
DJ8457    305   324#
DJ9CDI    348   361#
DJ9CON    720   734#
DJ9END    717   725#
DJ9TXF    718   719   729#
DJ9324    354   364#
DM5FRA    654
DM6CDF    653
TDP123    860
TDP312    655
```

| | | | | | | | | | | |
|---|---|---|---|---|---|---|---|---|---|---|
| TDP32A | 599# | 647 | 1026 | | | | | | | |
| TDP32B | 270 | 676# | 711 | 1027 | | | | | | |
| TDP321 | 504# | 542 | | | | | | | | |
| TDP322 | 758# | 803 | 827 | 836 | 845 | 851 | | | | |
| TDP323 | 905# | 1019 | | | | | | | | |
| TDP324 | 364 | 565# | 578 | 1025 | | | | | | |
| TDP325 | 227# | 265 | | | | | | | | |
| TDP326 | 269 | 424# | 476 | 481 | 656 | 861 | | | | |
| TDP327 | 81 | 96# | 182 | 547 | 862 | | | | | |
| TDP328 | 288# | 321 | | | | | | | | |
| TDP329 | 345# | 362 | | | | | | | | |
| TDP415 | 863 | | | | | | | | | |
| TDP420 | 205 | 389 | | | | | | | | |
| TDP424 | 713 | | | | | | | | | |
| TDP425 | 714 | | | | | | | | | |
| TDP453 | 323 | 1028 | | | | | | | | |
| TDP456 | 407 | | | | | | | | | |
| TDP457 | 324 | 1029 | | | | | | | | |
| TORENO | 53 | 80# | | | | | | | | |
| TOR001 | 52 | 53 | 65# | 202 | | | | | | |
| *KLEAR | 401 | 480 | 625 | 684 | 846 | | | | | |
| *M0001 | 120 | 707 | | | | | | | | |
| *M0002 | 232 | 944 | 958 | 1002 | | | | | | |
| *M0003 | 228 | 295 | 508 | 773 | 838 | | | | | |
| *P0001 | 575 | 679 | 927 | 995 | | | | | | |
| *P0002 | 146 | 477 | 531 | 963 | | | | | | |
| *P0003 | 149 | 252 | 255 | 357 | 693 | 1009 | | | | |
| ZAUT00 | 129 | 192 | 515 | 522 | 690 | 691 | 694 | 695 | 697 | |
| ZAUT01 | 158 | 159 | 161 | | | | | | | |
| ZAUT02 | 134 | 136 | 143 | 150 | 151 | | | | | |
| ZBCAL4 | 487 | 652 | 855 | | | | | | | |
| ZBCAO* | 485 | | | | | | | | | |
| ZBCCIF | 856 | | | | | | | | | |
| ZBCDCY | 486 | 854 | | | | | | | | |
| ZBCDON | 651 | | | | | | | | | |
| ZBCILA | 198 | 546 | | | | | | | | |
| ZBCILF | 197 | 545 | | | | | | | | |
| ZBCKLT | 1022 | | | | | | | | | |
| ZDCCCL | 200 | 387 | | | | | | | | |
| ZDCCCR | 115 | | | | | | | | | |
| ZDCCDS | 121 | 233 | 253 | 256 | 292 | 317 | 358 | 532 | 825 | 829 |
| | 839 | 945 | 1010 | | | | | | | |
| ZDCCHS | 858 | | | | | | | | | |
| ZDCCLN | 199 | 388 | | | | | | | | |
| ZDCCOS | 267 | 857 | 1023 | | | | | | | |
| ZDCCSP | 603 | 633 | | | | | | | | |
| ZDCDFS | 439 | 782 | 872 | 876 | | | | | | |
| ZDCOCR | 383 | 909 | | | | | | | | |
| ZDCPFS | 201 | 268 | 859 | 1024 | | | | | | |
| ZDCPRS | 229 | 254 | 296 | 352 | 484 | 509 | 631 | 688 | 774 | 1007 |
| | 1013 | | | | | | | | | |
| ZKB213 | 621 | 882 | | | | | | | | |
| ZKB22L | 539 | 848 | | | | | | | | |
| ZKB23S | 319 | 458 | 850 | 1012 | | | | | | |
| ZKB23X | 479 | | | | | | | | | |
| ZKB23Z | 529 | 772 | | | | | | | | |
| ZKB522 | 798 | | | | | | | | | |
| ZKCDF | 126 | 517 | | | | | | | | |
| ZKCDI | 347 | | | | | | | | | |
| ZKC213 | 452 | | | | | | | | | |
| ZKD342 | 801 | 833 | | | | | | | | |
| ZKD345 | 179 | 795 | 982 | | | | | | | |
| ZKD42C | 506 | 628 | 770 | | | | | | | |
| ZKD421 | 686 | 705 | | | | | | | | |
| ZKD422 | 400 | 683 | | | | | | | | |
| ZKD423 | 699 | | | | | | | | | |
| ZKD429 | 455 | | | | | | | | | |
| ZKD441 | 811 | 823 | | | | | | | | |
| ZKD462 | 260 | 601 | 843 | | | | | | | |
| ZKD463 | 800 | | | | | | | | | |
| ZKD511 | 97 | 568 | 974 | | | | | | | |
| ZKD512 | 112 | 114 | 116 | 142 | 145 | 147 | 155 | 160 | 162 | 164 |
| | 166 | 175 | 372 | 380 | 382 | 384. | 574 | | | |
| ZKD513 | 181 | 985 | | | | | | | | |
| ZKD514 | 576 | | | | | | | | | |
| ZKD515 | 290 | 907 | 921 | | | | | | | |
| ZM0004 | 814 | 830 | | | | | | | | |
| ZM0005 | 441 | 763 | 784 | | | | | | | |
| ZM0006 | 1014 | | | | | | | | | |
| ZM0010 | 604 | | | | | | | | | |
| ZP0005 | 289 | 465 | 920 | | | | | | | |
| ZP0006 | 630 | 1006 | | | | | | | | |
| ZP0007 | 118 | 351 | 537 | 847 | 984 | | | | | |
| ZP0010 | 144 | 154 | 906 | | | | | | | |
| ZP0017 | 427 | | | | | | | | | |
| ZP0020 | 139 | | | | | | | | | |
| ZP0070 | 639 | | | | | | | | | |
| ZP0077 | 440 | 468 | 471 | 762 | 783 | 873 | 878 | | | |
| ZP0100 | 443 | 786 | | | | | | | | |
| ZP0177 | 444 | 787 | | | | | | | | |
| ZP7777 | 244 | 1005 | | | | | | | | |
| Z*ORK1 | 426 | 432 | 434 | 435 | 469 | 473 | | | | |
| Z*ORK2 | 429 | 436 | | | | | | | | |
| Z*ORK3 | 914 | 923 | 988 | | | | | | | |

V5A

```
/ DP1353.88                                     PAL8-V10C 04-DEC-80 PAGE 1

                / DP1353.88
                /
                /       %%%%%%%%%%%%%%%%%%%%%%%%%%%%%%%%%%%%%%%%%%%%%%%%%%%%%%%%%%%%%%%
                /       %                                                            %
                /       %                         PROPRIETARY.                       %
                /       %                                                            %
                /       %  THIS DOCUMENT CONTAINS INFORMATION PROPRIETARY TO         %
                /       %  REUTERS LIMITED AND IS NOT TO BE REPRODUCED AND/OR        %
                /       %  USED IN WHOLE OR IN PART WITHOUT THE EXPRESS WRITTEN      %
                /       %  PERMISSION OF REUTERS LIMITED.                            %
                /       %                                                            %
                /       %%%%%%%%%%%%%%%%%%%%%%%%%%%%%%%%%%%%%%%%%%%%%%%%%%%%%%%%%%%%%%%
                /
                /
/ DP1353.88                                     PAL8-V10C 04-DEC-80 PAGE 2

                /
                /       MODULE  MAP050.88 27-OCT-80
                /       SYSTEM MAP FILE
/ DP1353.88                                     PAL8-V10C 04-DEC-80 PAGE 6

                /
                /       MODULE MAPC50.88 30-OCT-80
                /       CONVERSATIONS MAP FILE
                /
/ DP1353.88                                     PAL8-V10C 04-DEC-80 PAGE 9

                /       MODULE FCF050.88 16-JAN-80
                /       FIXED PAGE ZERO CONSTANTS AND COMMON DATA EQUATES FIELD 4 & 5
/ DP1353.88                                     PAL8-V10C 04-DEC-80 PAGE 12

                ////////////////////////////////////////////////////////////////
                /                                                              /
                /       COMPONENT       CP1353.88                              /
                /                       FAILURE                                /
                /                                                              /
                /       MODULES:        TDP131 STARTUP                         /
                /                       TDP133 DIALOGUE KB LOCK TIMEOUT        /
                /                       TDP137 CONNECT FAILED                  /
                /                       TDP132 CONVS KB LOCK TIMEOUT           /
                /                       TDP134 40 SEC TIMEOUT CN1              /
                /                       TDP135 40 SEC TIMEOUT CN2              /
                ////////////////////////////////////////////////////////////////



                / MODIFIED RJA 17-JUL-80 NEW MODULE TDP137 CREATED TO DO WHAT OLD TDP317
                / USED TO DO,PLUS SEND 'ACCEPT' IF NOT REJECTED BY FAR TC.

                / MODIFIED RJA 26-SEP-80 TDP137 SEND ACCEPT UNCONDITIONALLY

                / MODIFIED RJA 4-DEC-80 TDP137 RELEASE PORT BEFORE CALLING CONTACT FAILED
                / (DROPPING FROM CN2 TO CN1 VIA SWITCH OFF CONVERSATION WAS CAUSING CN1 PORT
                / TO BE RELEASED INSTEAD OF CN2!!!)
/ DP1353.88                                     PAL8-V10C 04-DEC-80 PAGE 13

                0006            FIELD   0
                0522            *52^2+IAR417-2          / REGISTER TASKS IN SYSTEM CONTROL
        00522   0050            50;TDP134
        00523   7460
        00524   0050            50;TDP135
        00525   7463
                1412            *65^4+IAB322-4          / REGISTER TIMERS
        01412   0000            0;-310;0;52             / 40 SEC TIMEOUT FOR DU 1,CN1
        01413   7470
        01414   0000
        01415   0052
        01416   0000            0;-310;0;53             / 40 SEC TIMEOUT FOR DU 1,CN2
        01417   7470
        01420   0000
        01421   0053
        01422   0000            0;-310;0;52             / 40 SEC TIMEOUT FOR DU 2,CN1
        01423   7470
        01424   0000
        01425   0052
        01426   0000            0;-310;0;53             / 40 SEC TIMEOUT FOR DU 2,CN2
        01427   7470
        01430   0000
        01431   0053
        01432   0000            0;-310;0;52             / 40 SEC TIMEOUT FOR DU 3,CN1
        01433   7470
        01434   0000
        01435   0052
        01436   0000            0;-310;0;53             / 40 SEC TIMEOUT FOR DU 3,CN2
        01437   7470
        01440   0000
        01441   0053
        01442   0000            0;-310;0;52             / 40 SEC TIMEOUT FOR DU 4,CN1
        01443   7470
        01444   0000
        01445   0052
```

```
01446  0000          0;-310;0;53            / 40 SEC TIMEOUT FOR DU 4,CN2
01447  7470
01450  0000
01451  0053
01452  0000          0;-310;0;52            / 40 SEC TIMEOUT FOR DU 5,CN1
01453  7470
01454  0000
01455  0052
01456  0000          0;-310;0;53            / 40 SEC TIMEOUT FOR DU 5,CN2
01457  7470
01460  0000
01461  0053
01462  0000          0;-310;0;52            / 40 SEC TIMEOUT FOR DU 6,CN1
01463  7470
01464  0000
01465  0052
01466  0000          0;-310;0;53            / 40 SEC TIMEOUT FOR DU 6,CN2
01467  7470
01470  0000
01471  0053
/ DP1353.RA                        PAL8-V10C 04-DEC-80 PAGE 13-1

       0005          FIELD   5.
       7200          *7200
57200  0400          0^4000+DC4END-TDP131+2  /*ELEMENT:TYPE 0:SIZE DC4END-TDP131+2
/ DP1353.RA                        PAL8-V10C 04-DEC-80 PAGE 14

                     /======================================================
                     /=                                                    =
                     /= - MODULE:     TDP131                               =
                     /=               CONVERSATION STARTUP                 =
                     /=                                                    =
                     /= - FUNCTION:                                        =
                     /=               THIS MODULE IS CALLED DURING THE     =
                     /=               STARTUP OF THE CONTROLLER TO END ALL =
                     /=               UNFINISHED CONVERSATIONS (PRINTING   =
                     /=               WHERE POSSIBLE) AND TRANSFER SUBSCRIBER =
                     /=               DATA TO THE CONVERSATIONS FIELDS     =
                     /=                                                    =
                     /= - FORM OF CALL                                     =
                     /=               JMS  I  (TDP131                      =
                     /=                                                    =
                     /======================================================

57201  7401          1-1^2+7401                 /*1 VARIABLE LOCATIONS FOLLOW
57202  0000  TDP131, .-.
57203  1364          TAD      DC1TTB            / SET UP POINTER TO TC ID
57204  3010          DCA      ZAUTOO            /  AND STATUS TABLE
57205  1365          TAD      DC1DTB            / SET UP POINTER TO SUBSCRIBER
57206  4004          DCA      ZWORK1            /  DATA TABLE
57207  1074          TAD      ZM0004            / SET UP LOOP COUNT OF NUMBER
57210  3005          DCA      ZWORK2            /  OF CHARS TO BEMOVED
                                                /
57211  1005  DC1010, TAD      ZWORK2            / GET COUNT
57212  7110          CLL RAR                    / SET LH/RH INDICATOR
57213  7620          SNL CLA                    /
57214  2004          ISZ      ZWORK1            / POINT TO OUTPUT WORD
57215  6201          CDF      0                 /
57216  1410          TAD  I   ZAUTOO            / GET FIRST WORD OF TC-ID
57217  6251          CDF      50                /
57220  0061          AND      ZP0077            / CONVERT TO 6-BIT PACKED
57221  7420          SNL                        / LH OR RH BYTE ?
57222  7002          BSW                        / LH BYTE
57223  7430          SZL                        /
57224  1404          TAD  I   ZWORK1            / RH BYTE - ADD IN PREVIOUS BYTE
57225  3404          DCA  I   ZWORK1            / STORE IN SUBSCRIBER DATA TABLE
57226  2005          ISZ      ZWORK2            / INCREMENT LOOP COUNT
57227  5211          JMP      DC1010            / IF NOT FINISHED - REPEAT
57230  2004          ISZ      ZWORK1            / POINT TO NEXT OUTPUT WORD
57231  6201          CDF      0                 /
57232  1410          TAD  I   ZAUTOO            / GET TC NUMBER
57233  6251          CDF      50                /
57234  1362          TAD      DC1500            / CONVERT TO INTEGER
57235  3404          DCA  I   ZWORK1            / SAVE IN SUBSCRIBER DATA TABLE
57236  3243          DCA      DC1D0U            /
                                                /
57237  2243  DC1020, ISZ      DC1D0U            /
57240  6222          CIF      20                /
57241  4557          JMS  I   ZFF213            / SWAP IN DU CONTROL TABLE
57242  7403          2-1^2+7401                 /*2 VARIABLE LOCATIONS FOLLOW
57243  0000  DC1D0U, 0                          /  DESK UNIT
57244  0003          3                          /  MODE = CN1
```

```
/ DP1353.RR                                  PAL8-V10C 04-DEC-80 PAGE 14-1

      57245  7300            WKLEAR                    /
                                                       /
      57246  6221            CDF     20                /
      57247  1703            TAD  I  DC1LAL            / GET CONV ACTIVITY WORD
      57250  6251            CDF     50                /
      57251  7002            BSW                       /
      57252  7110            CLL RAR                   / GET CN1 SETTING
      57253  3307            DCA     DC1TMP            / SAVE FLAG SETTINGS
      57254  7430            SZL                       / CN1 ACTIVE ?
      57255  4701            JMS  I  DC1LPR            / YES GO TO PROCESSING S/R
      57256  1307            TAD     DC1TMP            / GET FLAG SETTINGS
      57257  7010            RAR                       / GET CN2 SETTING
      57260  7620            SNL CLA                   / CN2 ACTIVE ?
      57261  5273            JMP     DC1030            / NO SO GO ONTO NEXT DU
      57262  1243            TAD     DC1DUN            /
      57263  3267            DCA     DC1DNO            /
      57264  6222            CIF     20                /
      57265  4557            JMS  I  ZFB213            / SWAP IN DU CONTROL TABLE
      57266  7403            2-1^2+7401                /*2 VARIABLE LOCATIONS FOLLOW
      57267  0000    DC1DNO, 0                         /  DESK UNIT
      57270  0005            5                         /  MODE = CN2
      57271  7300            WKLEAR                    /
      57272  4701            JMS  I  DC1LPR            / GO TO PROCESSING ROUTINE
                                                       /
      57273  1243    DC1030, TAD     DC1DUN            / GET DU NUMBER
      57274  1043            TAD     ZB0006            /
      57275  7710            SPA CLA                   / ALL SIX DONE ?
      57276  5237            JMP     DC1020            / NO REPEAT
                                                       / YES
      57277  6203            CDI     0                 /
      57300  5602            JMP  I  DP131             / RETURN TO CALLER

      57301  7534    DC1LPR, DC1100                    / LINK TO PROCESSING ROUTINE

      57302  7720    DC1M60, -60                       / CONSTANT FOR INTEGER CONVERSION
      57303  0165    DC1LAL, ZBCALM                    / LINK TO CONV ACTIVITY WORD
      57304  2041    DC1TFS, TAD151-1                  / LINK TO TC-ID & STATUS TABLE
      57305  5601    DC1DTB, TDR001                    / LINK TO SUBSCRIBER DATA TABLE
      57306  7401            1-1^2+7401                /*1 VARIABLE LOCATIONS FOLLOW
      57307  0000    DC1TMP, 0                         / TEMPORARY STORE FOR FLAG SETTINGS
/ DP1353.RR                                  PAL8-V10C 04-DEC-80 PAGE 15

                     /=====================================================
                     /=                                                   =
                     /= - MODULE:      TDP133                             =
                     /=                DIALOGUE KEYBOARD LOCK TIMEOUT     =
                     /=                                                   =
                     /= - FUNCTION:                                       =
                     /=                IS CALLED WHEN THE TIMEOUT OF THE  =
                     /=                KEYBOARD LOCK FOR MODE CN1 OR CN2  =
                     /=                EXPIRES                            =
                     /=                                                   =
                     /= - FORM OF CALL:                                   =
                     /=                JMS  I  ZKD133                     =
                     /=                                                   =
                     /=====================================================
      57310  7401            1-1^2+7401                /*1 VARIABLE LOCATIONS FOLLOW
      57311  0000    TDP133, .-.
      57312  6251            CDF     50                /
      57313  6242            CIF     40                /
      57314  4567            JMS  I  ZKD42C            / SWAP IN CONV CONTROL BLOCK
      57315  7340            WM0001                    /
      57316  1102            TAD     ZDCPRS            / GET PRIMARY STATUS
      57317  7640            SZA CLA                   / STATUS = CONTACT ?
      57320  5327            JMP     DC3005            / NO - GO TO NEXT TEST
      57321  7344            WM0002                    /
      57322  1103            TAD     ZDCCDS            / GET SECONDARY STATUS
      57323  7640            SZA CLA                   / STATUS = LEFT MESSAGE SENT ?
      57324  5327            JMP     DC3005            / NO - GO TO NEXT TEST
      57325  4755            JMS  I  DC3335            / YES - PERFORM LEFT MESSAGE ENDED
      57326  5351            JMP     DC3020            /  PROCESSING AND EXIT
      57327  7346    DC3005, WM0003                    /
      57330  1102            TAD     ZDCPRS            / GET PRIMARY STATUS
      57331  7640            SZA CLA                   / STATUS = DIALOGUE ?
      57332  5351            JMP     DC3020            / NO - EXIT
                                                       /
      57333  6241            CDF     40                /
      57334  1753            TAD  I  DC3LBI            / GET INDICATORS
      57335  7002            BSW                       /
      57336  7104            CLL RAL                   / GET BELL INDICATOR
      57337  7320            SNL                       / INDICATOR SET ?
      57340  5344            JMP     DC3010            / NO
      57341  7110            CLL RAR                   / YES - CLEAR BELL INDICATOR
      57342  7002            BSW                       /
```

```
57343  3753         DCA   I   DC3LBI          / SAVE
57344  7200  DC3010, CLA                      /
57345  6251          CDF      50              /
57346  1163          TAD      ZDCCDS          / GET SECONDARY STATUS
57347  7640          SZA CLA                  / STATUS = 0 ?
57350  4754          JMS   I  DC3329          / NO - DO CONNECTION LOST PROCESSING
57351  6223  DC3020, CDI      20              /
57352  5711          JMP   I  TOP133          / RETURN TO CALLER

57353  0111  DC3LBI, ZDCFLG                   / LINK TO INDICATORS
57354  6112  DC3329, TOP329                   / LINK TO CONNECTION LOST ROUTINE
57355  5161  DC3335, TOP335                   / LINK TO LEFT MSG ENDED ROUTINE
/ OP1353.MM                    PAL8-V10C 04-DEC-80 PAGE 16

                     /====================================================
                     /                                                    =
                     / MODULE :      TOP137                               =
                     /               CONNECT FAILURE                      =
                     / FUNCTION:                                          =
                     /               SENDS 'ACCEPT' UNCONDITIONALLY       =
                     /               CALLED BY TOP317 ON RECEIPT OF A CONNECT=
                     /               REJECT OR BY TOP132 AFTER A TIMEOUT  =
                     /               TO CLEAR DOWN AND DISPLAY            =
                     /               'CONNECTION LOST'                    =

                     /                                                    =
                     /====================================================
57356  7401          1-1^2+7401               /*1 VARIABLE LOCATIONS FOLLOW
57357  0000  TOP137, .-.
57360  4776          JMS   I  DC76SA          / SEND 'ACCEPT'
57361  4576          JMS   I  ZKD345          / CALCULATE PORT
57362  7104          CLL RAL
57363  7130          STL RAR                  / SET FEEDBACK
57364  6212          CIF      10
57365  4576          JMS   I  ZKB522          / RELEASE PORT
57366  4772          JMS   I  DC7319          / CALL CONTACT FAILED
57367  7340          AX0001
57370  6222          CIF      20
57371  4566          JMS   I  ZKB22L          / DISPLAY 'CONNECTION LOST'
57372  3755  DC7319, TOP319                   / NO ZKNOP AS NOT VARIABLE
57373  6251          CDF      50
57374  7563          DC37MS
57375  5757          JMP   I  TOP137          / EXIT
57376  4106  DC76SA, DL16SA                   / AN SEND 'ACCEPT' SR IN TOP316
57377  0000          ZBLOCK   .+200&7600-.    /*ZERO FILL PAGE
/ OP1353.MM                    PAL8-V10C 04-DEC-80 PAGE 17

                     /====================================================
                     /=                                                   =
                     /= - MODULE:    TOP132                               =
                     /=              CONVERSATIONS KEYBOARD LOCK TIMEOUT  =
                     /=                                                   =
                     /= - FUNCTION:                                       =
                     /=              THIS MODULE IS CALLED WHEN THE TIMEOUT =
                     /=              ON THE KEYBOARD LOCK FOR MODE CNV    =
                     /=              EXPIRES                              =
                     /=                                                   =
                     /= - FORM OF CALL:                                   =
                     /=              JMS   I   ZK0132                     =
                     /=                                                   =
                     /====================================================

57400  7401          1-1^2+7401               /*1 VARIABLE LOCATIONS FOLLOW
57401  0000  TOP132, .-.
57402  1655          TAD   I  DC2LDU          / GET CURRENT DESK UNIT
57403  3223          DCA      DC2DU           /
57404  7307          +P0004                   /
57405  3224          DCA      DC2MDE          / SET UP MODE TO CN1
57406  4216          JMS      DC2100          / GO TO PROCESSING SUBROUTINE
57407  5213          JMP      DC2010          / FINISHED PROCESSING SO EXIT
57410  2224          ISZ      DC2MDE          / SET MODE TO CN2
57411  4216          JMS      DC2100          / GO TO PROCESSING SUBROUTINE
57412  7000          NOP                      / SAFEGUARD AGAINST NO PROCESSING RQD.
                                              /
57413  6223  DC2010, CDI      20              /
57414  5601          JMP   I  TOP132          / RETURN TO CALLER

                     /
                     / COMMON SUBROUTINE FOR ALL THE PROCESSING
                     /
57415  7401          1-1^2+7401               /*1 VARIABLE LOCATIONS FOLLOW
57416  0000  DC2100, .-.
57417  6251          CDF      50              /
57420  6222          CIF      20              /
57421  4557          JMS   I  ZKB213          / SWAP IN DESK UNIT CONTROL TABLE
```

```
57422  7403            2-1^2+7401                 /*2 VARIABLE LOCATIONS FOLLOW
57423  0000  DC2DUN,   0                          /  DESK UNIT
57424  0000  DC2MDE,   0                          /  MODE (EITHER CN1 OR CN2)
57425  7300            *KLEAR                     /
57426  6242            CIF      40                /
57427  4567            JMS  I   ZKD42C            / SWAP IN CONV CONTROL BLOCK
                                                  /
57430  7344            *M0002                     /
57431  1102            TAD      ZOCPRS            / GET PRIMARY STATUS
57432  7640            SZA CLA                    / STATUS = ACCEPT ?
57433  5236            JMP      DC2110            / NO
57434  4656            JMS  I   DC2137            / YES - PERFORM CONNECT FAILED
57435  5616            JMP  I   DC2100            /  PROCESSING AND EXIT
                                                  /
57436  1043  DC2110,   TAD      ZM0006            /
57437  1102            TAD      ZOCPRS            / GET PRIMARY STATUS
57440  7650            SNA CLA                    / STATUS = TRANSFERRED ?
/ DP1353.8B                              PAL8-V10C 04-DEC-80 PAGE 17-1

57441  5246            JMP      DC2120            / YES - GO TEST SECONDARY STATUS
57442  1077            TAD      ZP7777            /
57443  1102            TAD      ZOCPRS            / GET PRIMARY STATUS
57444  7640            SZA CLA                    / STATUS = CONTACT ?
57445  5253            JMP      DC2130            / NO - TAKE NOTHING DONE EXIT
                                                  /
57446  1103  DC2120,   TAD      ZOCCDS            / GET SECONDARY STATUS
57447  7640            SZA CLA                    / STATUS = CONTACT REQUEST SENT ?
57450  5253            JMP      DC2130            / NO - TAKE NOTHING DONE EXIT
57451  4657            JMS  I   DC2319            / YES - PERFORM CONTACT FAILED
57452  5616            JMP  I   DC2100            /  PROCESSING AND EXIT
                                                  /
57453  2216  DC2130,   ISZ      DC2100            /
57454  5616            JMP  I   DC2100            / EXIT SHOWING NOTHING DONE

57455  0101  DC2LDU,   ZBCDU*                     / LINK TO DESK UNIT NUMBER
57456  7357  DC2137,   TDP137                     / LINK TO CONNECT FAILED ROUTINE
57457  3755  DC2319,   TDP319                     / LINK TO CONTACT FAILED ROUTINE
/ DP1353.8B                              PAL8-V10C 04-DEC-80 PAGE 18

                 /=====================================================
                 /=                                                   =
                 /= - MODULE:     TDP134 - 40 SECOND TIMEOUT TASK - CN1   =
                 /=               TDP135 - 40 SECOND TIMEOUT TASK - CN2   =
                 /=                                                   =
                 /= - FUNCTION:                                       =
                 /=               TDP134 IS SCHEDULED WHEN ONE OR MORE OF =
                 /=               THE 40 SECOND TIMEOUTS FOR MODE CN1     =
                 /=               EXPIRE.                             =
                 /=               TDP135 IS AN ALTERNATIVE ENTRY POINT TO =
                 /=               TDP134 BUT HANDLES THE TIMEOUTS FOR     =
                 /=               MODE CN2                            =
                 /=                                                   =
                 /= - FORM OF CALL:                                   =
                 /=               SCHEDULED                           =
                 /=                                                   =
                 /=====================================================

57460  7307  TDP134,   *P0004                     / SET UP MODE TO CN1
57461  3306            DCA      DC4MDE            /
57462  5266            JMP      DC4010            / GO SET UP INITIAL ECB VALUE
                                                  /
57463  1050  TDP135,   TAD      ZP0005            / SET UP MODE TO CN2
57464  3306            DCA      DC4MDE            /
57465  7001            IAC                        /
                                                  /
57466  1327  DC4010,   TAD      DC4P65            / SET UP INITIAL ECB VALUE
57467  3332            DCA      DC4ECB            /  (IE 65 FOR CN1/66 FOR CN2)
57470  3305            DCA      DC4DUN            / INITIALISE DESK UNIT
                                                  /
57471  2305  DC4020,   ISZ      DC4DUN            / FOR NEXT DESK UNIT
57472  6251            CDF      50                /
57473  6202            CIF      0                 /
57474  1332            TAD      DC4ECB            / AND GIVEN ECB VALUE
57475  6002            IOF                        /
57476  4431            JMS  I   ZKA322            / GET CURRENT TICKER VALUE
57477  6001            ION                        /
57500  7640            SZA CLA                    / TIMER VALUE ZERO ?
57501  5316            JMP      DC4030            / NO - SET UP NEXT TEST
57502  6222            CIF      20                /
57503  4557            JMS  I   ZKB213            / SWAP IN DESK UNIT CONTROL TABLE
57504  7403            2-1^2+7401                 /*2 VARIABLE LOCATIONS FOLLOW
57505  0000  DC4DUN,   0                          /  FOR THIS DESK UNIT
57506  0000  DC4MDE,   0                          /  AND THIS MODE
57507  7300            *KLEAR                     /
57510  6242            CIF      40                /
57511  4567            JMS  I   ZKD42C            / SWAP IN CONV CONTROL BLOCK
                                                  /
57512  7346            *M0003                     /
```

```
57513  1102          TAD     ZDCPRS            / GET PRIMARY STATUS
57514  7650          SNA CLA                   / STATUS = DIALOGUE ?
57515  4730          JMS  I  DC4329            / YES - DO CONNECTION LOST PROCESSING
                                               /
57516  7305  DC4030, *P0002                    /
57517  1332          TAD     DC4ECB            / SET UP NEXT ECB VALUE
/ DP1353.BB                          PAL8-V10C 04-DEC-80 PAGE 18-1

57520  3332          DCA     DC4ECB            /
57521  1305          TAD     DC4DUN            / GET DESK UNIT
57522  1043          TAD     ZK0006            /
57523  7710          SPA CLA                   / ALL DESK UNITS TESTED ?
57524  5271          JMP     DC4020            / NO - REPEAT
                                               / YES
57525  6203          CDI     0                 /
57526  5424          JMP  I  ZKA416            / GO TO END TASK

57527  0065  DC4P65, 65                        / INITIAL ECB VALUE
57530  6112  DC4329, TDP329                    / LINK TO CONNECTION LOST ROUTINE
57531  7401          1=1^2+7401                /*1 VARIABLE LOCATIONS FOLLOW
57532  0000  DC4ECB, 0                         / ECB VALUE

             /
             / PROCESSING SUBROUTINE
             /
57533  7401          1=1^2+7401                /*1 VARIABLE LOCATIONS FOLLOW
57534  0000  DC1100, .-.
57535  7200          CLA                       /
57536  6242          CIF     40                /
57537  4567          JMS  I  ZKD42C            / SWAP IN CONVERSATION CONTROL BLOCK
57540  7346          *40003                    /
57541  1102          TAD     ZDCPFS            / GET CONVERSATION STATUS
57542  7440          SZA                       / STATUS = DIALOGUE ?
57543  5346          JMP     DC1110            / NO
57544  4762          JMS  I  DC1329            / YES - DO CONNECTION LOST PROCESSING
57545  5354          JMP     DC1120            / GO PRINT CONVERSATION
                                               /
57546  7710  DC1110, SPA CLA                   / PRIMARY STATUS > 3
57547  5356          JMP     DC1130            / NO
57550  7346          *50003                    /
57551  1103          TAD     ZDCCDS            / GET SECONDARY STATUS
57552  7640          SZA CLA                   / STATUS = PRINT STATS ?
57553  5356          JMP     DC1130            / NO
                                               /
57554  6242  DC1120, CIF     40                /
57555  4545          JMS  I  ZKD462            / PRINT THE DIALOGUE
                                               /
57556  4536  DC1130, JMS  I  ZKD342            / RETURN ANY DIALOGUE BUFFERS
57557  4761          JMS  I  DC1326            / SWITCH OFF CONVERSATION
                                               /
57560  5734          JMP  I  DC1100            / RETURN TO MAINLINE

57561  6201  DC1326, TDP326                    / LINK TO SWITCH OFF CONVERSATION RTN
57562  6112  DC1329, TDP329                    / LINK TO CONNECTION LOST RTN
             /
57563  0317  DC37MS, TEXT    "CONNECTION LOST!"
57564  1616
57565  0503
57566  2411
57567  1716
57570  4014
57571  1723
57572  2435
/ DP1353.BB                          PAL8-V10C 04-DEC-80 PAGE 18-2

57573  0000
57574  0000          ZBLOCK  .+200&7600-.      /*ZERO FILL PAGE
       7600  DC4END=.

S                                    PAL8-V10C 04-DEC-80 PAGE 19

             S

S                                    PAL8-V10C 04-DEC-80 PAGE 20

AB5251 1733      DC2319 7457      FBP520 0010      TAP412 0606
ACL    7701      DC3LGI 7353      FBP530 0010      TAP416 0367
AKSILC 1557      DC3005 7327      FBP540 0010      TAP417 0202
AKSILI 1555      DC3010 7344      FBP810 0040      TAP521 1602
AKSILO 1556      DC3020 7351      FBP820 0040      TAP525 1656
ANAKPN 6411      DC3329 7354      FBP910 0030      TAP529 1742
ANAKTP 0015      DC3335 7355      FCP110 0010      TAP611 1755
ANDPPN 6403      DC37MS 7563      FCP210 0010      TAP612 1765
ANDPTP 0016      DC4005 7505      FCP310 0010      TAR417 0400
ANPRGM 0177      DC4ECB 7532      FCP410 0010      TAUS01 0200
ANPPLY 0200      DC4END 7600      FCP550 0010      TBCATL 0210
```

```
AQQINS 0144
AQQRB1 5601
AQQRB2 5704
AQQRB3 6143
AQQRB4 6246
AQQTB1 7475
AQQTB2 7634
AQSOH  0001
AQ36SR 7157
BFVMAT 6232
BGTYPE 4402
BLZCCN 0131
BLZPRA 0134
BLZPRD 0133
BLZPRT 0126
BMMMFG 5207
CAM    7621
COE    6203
DC1DBO 7267
DC1DBS 7243
DC1FTB 7304
DC1LAD 7303
DC1LPR 7301
DC1M60 7302
DC1OTB 7305
DC1TYP 7307
DC1010 7211
DC1020 7237
DC1030 7273
DC1100 7534
DC1110 7546
DC1120 7551
DC1130 7556
DC1326 7561
DC1329 7562
DC2DBS 7423
DC2GDB 7455
DC2MDF 7424
DC2010 7413
DC2100 7416
DC2110 7436
DC2120 7446
DC2130 7453
DC2137 7456
DC4MDF 7506
DC4P65 7527
DC4010 7466
DC4020 7471
DC4030 7516
DC4329 7530
DC7319 7372
DC76SA 7376
DL165A 4106
DM5FPA 0340
DM6CDF 0350
DMABFF 0151
DNBWIA 0145
DNBWIB 0146
DNECHS 0144
DNSPTF 0150
DO15PA 0147
DOZALM 0126
DOZDCM 0125
DOZDES 0127
DOZDUN 0124
FAP110 0000
FAP120 0000
FAP130 0000
FAP150 0000
FAP220 0000
FAP230 0000
FAP240 0000
FAP320 0000
FAP410 0000
FAP520 0000
FAPMDF 0000
FAUS01 0000
FBC205 0030
FBP110 0000
FBP130 0000
FBP210 0020
FBP220 0020
FBP230 0020
FBP310 0010
FBP420 0030
FBP430 0010
FBP440 0020
FBP510 0010
FCP610 0010
FDC480 0030
FDP120 0050
FDP130 0050
FDP210 0050
FDP230 0050
FDP310 0050
FDP320 0050
FDP330 0050
FDP340 0050
FDP410 0040
FDP420 0040
FDP430 0040
FDP440 0040
FDP450 0040
FDP460 0040
FDP470 0040
FDP490 0040
TAC417 0265
TAD151 2042
TAD221 1561
TAD322 1072
TAP11B 4472
TAP121 4400
TAP129 2402
TAP131 4470
TAP134 4571
TAP151 2002
TAP152 2022
TAP153 2034
TAP154 2062
TAP212 0660
TAP223 1525
TAP235 7400
TAP236 6637
TAP237 6042
TAP239 6531
TAP242 3600
TAP243 3604
TAP244 0000
TAP322 0747
TAP323 1001
TAP324 1021
TAP411 0600
TBCDAL 0050
TBCFSP 1565
TBCNFP 1566
TBC132 2727
TBC205 2401
TBC210 2445
TBD541 0711
TBLBDF 4401
TBP111 2602
TBP131 3235
TBP132 3401
TBP211 4514
TBP212 4001
TBP213 4601
TBP22E 2563
TBP22I 1657
TBP22L 2001
TBP22M 2511
TBP22R 3401
TBP22S 2601
TBP22U 2437
TBP22X 0202
TBP221 1401
TBP222 1444
TBP223 1500
TBP224 1601
TBP226 0401
TBP229 3201
TBP23I 5143
TBP23J 5324
TBP23S 4361
TBP23X 5601
TBP23Z 6061
TBP31A 4404
TBP31R 5001
TBP315 3602
TBP422 0242
TBP423 0220
TBP424 0401
TBP425 0202
TBP431 5202
TBP432 5211
TBP434 5677
TBP437 6061
```

$

PALB-V10C 04-DEC-80 PAGE 20-1

```
TBP43R 6024
TBP44C 7555
TBP44D 6351
TBP44E 6253
TBP44F 7352
TBP44J 7601
TBP44K 7401
TBP44L 7212
TBP44M 7206
TBP44N 7202
TBP44R 7135
TBP44U 6414
TBP44V 7715
TBP441 6241
TBP451 7610
TBP512 1265
TBP521 2201
TBP522 2504
TBP523 2703
TBP532 0522
TBP533 0555
TBP541 1103
TBP542 1154
TBP551 2122
TBP811 0202
TBP821 1602
TBP911 7610
TBP919 7603
TCP111 6202
TCP213 7023
TCP311 6101
TCP551 7124
TCP611 7201
TCP91X 7335
TCP911 7266
TCP912 7401
TCP913 7414
TCP914 7432
TDC010 3400
TDC201 1717
TDC202 1737
TDC481 4201
TDP134 7460
TDP135 7463
TDP137 7357
TDP211 0402
TDP212 0601
TDP221 0507
TDP224 1265
TDP236 1070
TDP31A 3003
TDP31B 2202
TDP311 4511
TDP312 3201
TDP313 3602
TDP314 2403
TDP315 3301
TDP316 4001
TDP317 4201
TDP319 3755
TDP32A 6420
TDP32B 6504
TDP321 6326
TDP322 6601
TDP323 7001
TDP324 6401
TDP325 6001
TDP326 6201
TDP327 5623
TDP328 6050
TDP329 6112
TDP331 4603
TDP332 5001
TDP333 5077
TDP334 5137
TDP335 5161
TDP341 4401
TDP342 4436
TDP345 4143
TDP411 4043
TDP412 4201
TDP415 4430
TDP416 3741
TDP42A 0402
TDP426 3001
TDP427 2201
TDP428 0460
TDP429 2401
TDP431 5401
TDP432 5430
TDP433 5601
TDP434 5471
TDP435 5476
TDP436 5503
TDP437 5510
TDP441 3055
TDP442 3201
TDP448 3225
TDP449 3142
TDP451 6202
TDP452 6242
TDP453 6601
TDP454 6401
TDP455 6646
TDP456 6717
TDP457 6467
TDP461 7201
TDP462 6330
TDP463 7401
TDP464 7601
TDP471 6001
TDP472 6032
TDP473 6056
TDP474 5643
TDP491 3402
TDP492 3446
TDP493 3462
TDP511 0202
TDP512 0235
TDP513 0243
TDP514 0277
TDP515 0341
TDP516 0347
TDR001 5601
TDZACI 5620
TDZOAB 5605
*A0002 7344
*A0003 7346
*M2000 7333
*M2001 7352
*M4000 7330
*P0001 7301
*P0002 7305
*P0003 7325
*P0004 7307
*P0006 7327
*P0100 7203
*P2000 7332
*P3777 7350
ZARMDF 0133
ZAUT00 0010
ZAUT01 0011
ZAUT02 0012
ZAUT03 0013
ZAUT04 0014
ZAUT05 0015
ZAUT06 0016
ZAUT07 0017
ZBCALM 0105
ZBCADM 0103
ZBCCIF 0110
ZBCDCM 0104
ZBCDOA 0102
ZBCDUN 0101
ZBCILA 0113
ZBCILF 0112
ZBCIVA 0122
ZBCKLT 0111
ZBCPG0 0120
ZBCPG1 0115
ZBCPTP 0114
ZDBBCL 0122
ZDCCAN 0115
ZDCCCL 0107
ZDCCCR 0114
ZDCCCY 0110
ZDCCDS 0103
ZDCCHS 0117
```

```
TDC483 5001      TDP42B 2043      TDZOCY 5617      ZOCCLN 0106
TDC484 5401      TDP42C 0711      TDZOSM 5602      ZDCCLT 0113
TDC486 6001      TDP420 2011      TDZOIC 5604      ZOCCOS 0102
TDC487 6601      TDP42E 2025      TD483E 6000      ZDCCSH 0107
TDD201 0001      TDP42F 0601      TD467E 7600      ZOCCSP 0111
TDD202 0461      TDP42G 2001      WKLEAR 7300      ZOCCVB 0116
TDP121 5202      TDP426 1757      WK4000 7330      ZOCDAT 0104
TDP122 5405      TDP421 1143      WK5777 7352      ZDCDBF 0123
TDP123 5242      TDP421 1101      WK6000 7333      ZOCDES 0101
TDP124 5535      TDP422 1261      WK7775 7346      ZOCDTP 0103
TDP131 7202      TDP423 1606      WK7776 7344      ZOCFLD 0110
TDP132 7401      TDP424 2212      WK7777 7340      ZOCFLG 0111
TDP133 7311      TDP425 2231      W50001 7340      ZOCFLN 0105
S                                        PAL8-V10C 04-DEC-80 PAGE 20-2

ZOCLCH 0114      ZKD425 0177
ZDCNCL 0121      ZKD426 0155
ZDCHOL 0101      ZKD428 0151
ZDCDAN 0113      ZKD429 0162
ZDCDCR 0112      ZKD431 0141
ZDCPKS 0120      ZKD453 0142
ZDCPLN 0116      ZKD456 0143
ZDCPRS 0102      ZKD457 0144
ZDCPSC 0115      ZKD462 0145
ZDCSAD 0104      ZKD463 0146
ZDCTKS 0112      ZKD511 0130
ZKA151 0036      ZKD512 0131
ZKA152 0037      ZKD513 0132
ZKA153 0040      ZKD514 0133
ZKA154 0041      ZKD515 0134
ZKA322 0031      ZKD516 0137
ZKA323 0032      ZP0004 0074
ZKA324 0033      ZP0005 0042
ZKA416 0024      ZP0006 0043
ZKA417 0025      ZP0010 0044
ZKA521 0026      ZP0040 0045
ZKA525 0027      ZP0120 0046
ZKA529 0030      ZP0260 0047
ZKB111 0035      ZP0003 0000
ZKB213 0157      ZP0005 0050
ZKB22L 0166      ZP0006 0051
ZKB221 0160      ZP0007 0052
ZKB222 0161      ZP0010 0053
ZKB226 0163      ZP0017 0054
ZKB229 0164      ZP0020 0055
ZKB23J 0171      ZP0037 0056
ZKB23S 0172      ZP0040 0057
ZKB23X 0173      ZP0060 0020
ZKB23Z 0174      ZP0070 0060
ZKB31A 0156      ZP0077 0061
ZKB521 0175      ZP0100 0062
ZKB522 0176      ZP0120 0063
ZKB523 0177      ZP0177 0064
ZKCDF  0021      ZP0200 0065
ZKCDT  0023      ZP0260 0066
ZKCIF  0022      ZP0377 0067
ZKC213 0135      ZP0777 0076
ZKC911 0173      ZP7000 0070
ZKD329 0156      ZP7400 0071
ZKD342 0136      ZP7600 0072
ZKD345 0170      ZP7700 0073
ZKD42A 0147      ZP7777 0077
ZKD42B 0140      ZVKCRL 0126
ZKD42C 0167      ZWORK1 0004
ZKD42F 0150      ZWORK2 0005
ZKD42G 0135      ZWORK3 0006
ZKD421 0152      ZWORK4 0007
ZKD422 0153
ZKD423 0154
ZKD424 0176

ERRORS DETECTED: 0
LINKS GENERATED: 0

CDI          190    249    313    420
DC1DND       176    180#
DC1DOS       153    155    159#   175    185
DC111B       125    197#
DC1LAL       164    196#
DC1LER       170    183    193#
DC1A60       151    195#
DC1D1B       127    198#
DC11MP       168    171    200#
DC1010       132#   146
DC1020       155#   185
DC1030       174    185#
DC1100       193    432#   456
DC1110       439    443#
DC1120       441    450#
```

```
DC1130      444    448    453#
DC1326      454    458#
DC1329      440    459#
DC2004      304    325#
DC2LD0      303    356#
DC2MDF      306    309    326#
DC2010      308    313#
DC2100      307    310    320#   336    351    353    354
DC2110      334    338#
DC2120      341    347#
DC2130      345    349    354#
DC2137      335    357#
DC2319      350    358#
DC3LPI      236    243    252#
DC3005      223    227    230#
DC3010      240    244#
DC3020      229    233    249#
DC3329      248    253#
DC3335      228    254#
DC37MS      282    461#
DC4D09      387    389    401#   415
DC4FC9      386    392    413    414    426#
DC4FRD      105    471#
DC4MDF      378    382    402#
DC4P65      385    423#
DC4010      379    385#
DC4020      389#   418
DC4030      397    412#
DC4329      410    424#
DC7319      276    280#
DC76SA      270    284#
DL16SA      284
TAD151      197
TAD322       53
TAR417       48
TDP131      105    124#   191
TDP132      302#   314
TDP133      216#   250
TDP134       50    377#
TDP135       52    381#
TDP137      269#   283    357
TDP319      280    358
TDP326      458
TDP329      253    424    459
TDP335      254
TDR001      198
WKLEAR      161    182    327    403
WM0001      220    277
WM0002      224    331
WM0003      230    407    436    445
WP0002      412
WP0004      305    377
ZAUTO0      126    137    149
ZBCALM      196
ZBCDUM      356
ZDCCDS      225    246    347    446
ZDCFLG      252
ZDCPRS      221    231    332    339    343    408    437
ZKA322      394
ZKA416      421
ZKB213      157    178    323    399
ZKB226      279
ZKB522      275
ZKD342      453
ZKD345      271
ZKD42C      219    329    405    435
ZKD462      451
ZM0004      129
ZM0006      186    338    416
ZP0005      381
ZP0077      139
ZP7777      342
ZWORK1      128    135    143    144    147    152
ZWORK2      130    132    145

V5A
```

Referring now to FIG. 5, a typical hardware configuration for a typical concentrator computer, such as concentrator computer 46 is shown by way of example. Thus, as previously mentioned, the concentrator computer 46 CPU is preferably a conventional computer such as a Digital Equipment Corporation PDP11/34 having 124K words of store and which is preferably connected to various associated interfaces and storage via a conventional bus 270 such as a Digital Equipment Corporation Unibus as was previously discussed with reference to the configurations of FIGS. 3 and 4. Again, as was true with respect to the configuration of FIG. 4 for a typical node computer 42, 3 serial line interfaces, 272, 274 and 276, such as conventional Digital Equipment Corporation DL11 interfaces are provided for essentially the same purposes as interfaces 234, 236 and 238 previously described with reference to FIG. 4. Similarly, a cyclic redundancy check calculation unit 278 is also provided for essentially the same purpose as cyclic redundancy check calculation unit 254 in FIG. 4, such as a Digital Equipment Corporation KG11, and dual floppy disc storage 280, such as an RX11B, is provided for essentially the same purpose as the storage 232 in FIG. 4. An asynchronous serial line interface 282 is connected to the bus 270 for interfacing the concentrator computer 46 with its associated computer node 44 through modem 148 and telephone line 152 with the data being provided at a data rate of 9600 bits per second. In addition, the concentrator configuration also preferably includes a plurality of multiple asynchronous serial line interfaces 284, 286, 288, such as conventional Digital Equipment Corporation DH11 interfaces, each capable of supporting 16 lines which via conventional modems, such as the modem configurations represented by reference numerals 172, 290 and 292, connect the concentrator CPU46 to the various subscriber terminal controllers, such as terminal controllers 68 and 80 for example. It should be noted that preferably one modem is provided for each of the 16 telephone lines associated with the respective interface 284, 286 or 288 and, in the example of FIGS. 1 and 5, modem configuration 172 includes modems 58 and 60 illustrated in FIG. 1. The data rate on each of the lines connected to the subscriber terminal controllers, such as controllers 68 and 80, is preferably 1200 bits per second.

Figure 6:
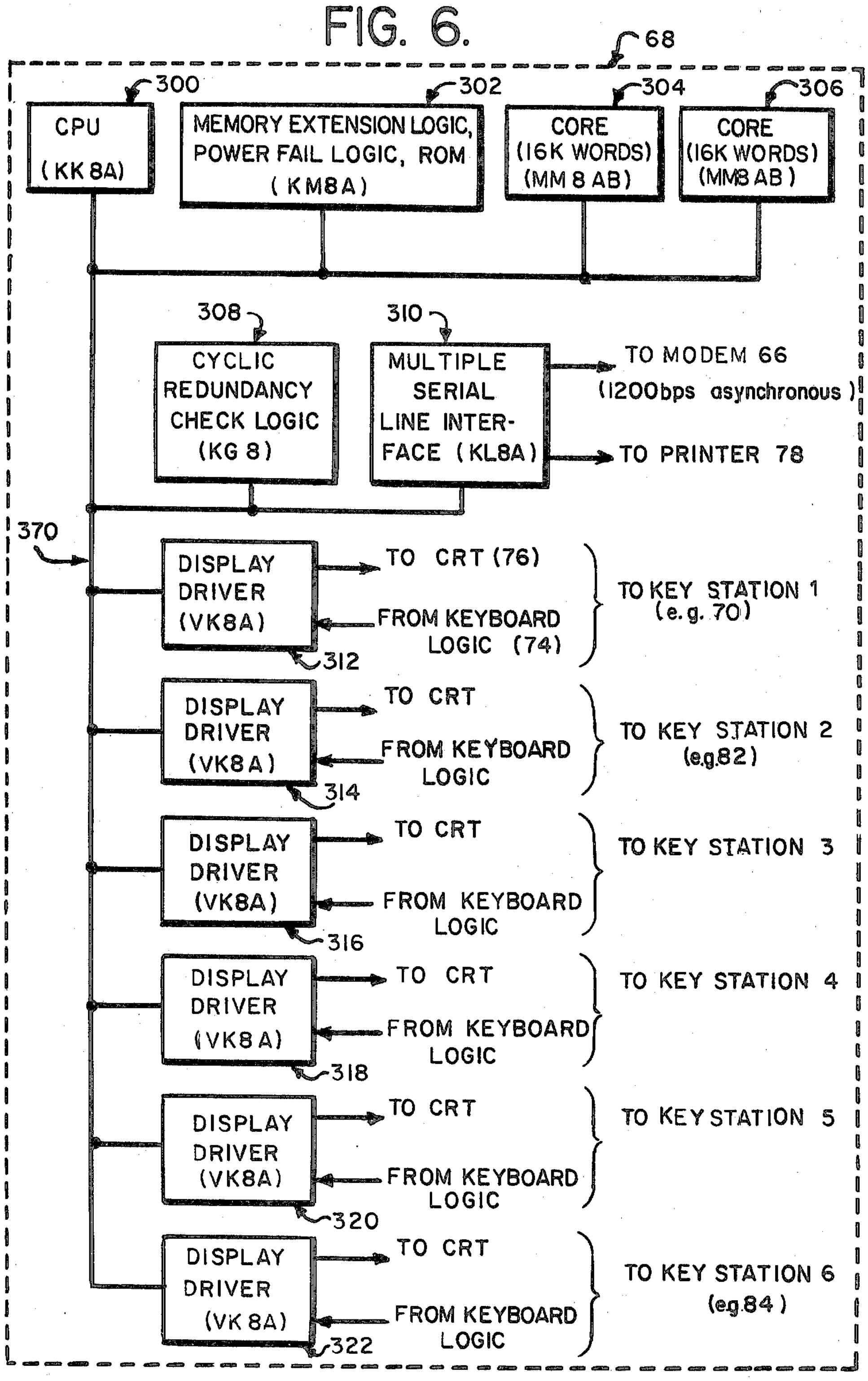
FIG. 6 is a functional block diagram of a typical terminal controller for use in the conversational video system of FIG. 1.

Referring now to FIG. 6, a functional block diagram of a typical preferred terminal controller configuration, such as terminal controller 68 which acts as the conversational video communications interface between its associated keystations 70, 82 and 84, by way of example, and the concentrator computer 46 which interfaces the terminal controller 68 with the balance of the conversational video communication system 30 is shown. As shown and preferred in FIG. 6, the terminal controller 68 preferably includes a central processing unit 300, such as a Digital Equipment Corporation KK8A CPU and associated memory 302, 304 and 306. Memory 304 and 306 are preferably core, each comprising 16K words, such as provided by a conventional Digital Equipment Corporation MM8AB Core. Memory 302 preferably includes memory extension logic, power fail logic, and ROM, with this logic circuitry being conventional such as a Digital Equipment Corporation KM8A. As will be described in greater detail hereinafter, the control program for the terminal controller 68 which controls the conversational video communication between the associated key stations 70, 82, 84 and keystations located throughout the conversational video communications network 30 is preferably downstream loaded into core storage 304, 306 of the concentrator computer 46, although, if desired, this control program could be permanently stored in ROM, assuming the ROM was of the appropriate capacity to store the control program. An example of a typical conversational video communications control program which is downstream loaded into core 304, 306 or which, as previously mentioned, could be permanently stored in appropriate ROM at the terminal controller 68 is provided below in Table A, written in PAL8 assembler language.

In the present example, where the above control program of Table A is downstream loaded from the concentrator computer 46, a terminal bootstrap program is stored in ROM 302. As was previously mentioned, this ROM 302 is contained in a conventional KM8A module. The bootstrap program is preferably responsible for loading the conversational control program of Table A into core 304, 306 as well as for loading other conventional executive programs into core 304, 306 which enable the proper operation of the CPU 300. An example of a typical preferred terminal controller bootstrap program stored in ROM 302 is provided below in Table B with this program also being written in PAL8 assembler language.

TABLE B

DEALING BOOTSTRAP PROGRAM LISTING

```
        0000            FIELD     0
        5400            *5400
                SERVE
05400   5336            JMP       NEXTCH    Will only branch for transmit complete
05401   5336            JMP       NEXTCH    on correct line so no need to test
05402   0377    KASK    377                 Can use last two transmit jumps for
05403   7774    KMFOUR  -4                  data as these flags never become set
05404   7000    SERVR0  NOP                 Timeout constant
05405   5350    SERVR1  JMP       GETRID    Check for correct line . . . .
05406   7640    SERVR2  SZA CLA             (Assume ACC 0-9 clear)
05407   5350    SERVR3  JMP       GETRID    This instruction is used to overlay SERVR1
        Fall thru when we are awaiting input & input occurs on line 0 or 1
05410   6705            YMSRD               Read CHAR
05411   0202            AND       MASK
05412   7421            MOL                 Hold CHAR in MO
05413   7701            ACL                 Restore and check
05414   1371            TAD       KMSOH     For SOH
05415   7650            SNA CLA
05416   5226            JMP       SOHGOT    Yes-Start data reception
05417   2017            ISZ       ZAUTO7    No-Update count of CHARS
05420   5232            JMP       STORE
        This section of code collects a packet and goes to load it if the CRC is valid
05421   7327    GETPKT  WP0006              Set up dummy packet
```

TABLE B-continued

DEALING BOOTSTRAP PROGRAM LISTING

| | | | | | |
|---|---|---|---|---|---|
| 05422 | 3377 | | DCA | LENGTH | Length . . . (Will be overlaid when packet is stored) |
| 05423 | 1276 | | TAD | OVRLAY | |
| 05424 | 3205 | | DCA | SERVR1 | Await input |
| 05425 | 7340 | | WM0001 | | Ignore all but SOH (CT = −1) |
| 05426 | 3017 | SOHGOT | DCA | ZAUTO7 | Save data (CT = 0) |
| 05427 | 6116 | | YRCCB | | Clear cyclic check register |
| 05430 | 1366 | | TAD | RCVPKT | Set PTR −1 |
| 05431 | 3011 | | DCA | ZAUTO1 | |
| 05432 | 7701 | STORE | ACL | | Get CHAR from MO and |
| 05433 | 6114 | | YRCGB | | accumulate CRC |
| 05434 | 7701 | | ACL | | |
| 05435 | 3411 | | DCA I | ZAUTO1 | Save data |
| 05436 | 1017 | | TAD | ZAUTO7 | See of all CHARS received . . . . |
| 05437 | 7040 | | CMA | | (Length = total number of packet CHARS; |
| 05440 | 1377 | | TAD | LENGTH | Count = number of input CHARS −1) |
| 05441 | 7740 | | SMA SZA CLA | | |
| 05442 | 5262 | | JMP | WAIT | Packet not fully in so get more CHARS |
| 05443 | 6112 | | YRCRL | | Check that CRC |
| 05444 | 7640 | | SZA CLA | | is correct |
| 05445 | 5221 | | JMP | GETPKT | Not O.K. |
| 05446 | 6111 | | YRCRH | | |
| 05447 | 7640 | | SZA CLA | | |
| 05450 | 5221 | | JMP | GETPKT | Not O.K. |
| 05451 | 1207 | | TAD | SERVR3 | Ignore input now |
| 05452 | 3205 | | DCA | SERVR1 | |
| | | | | Assume packet if a load packet | |
| 05453 | 1367 | | TAD | SDATA | Origin pair follows field byte |
| 05454 | 3013 | | DCA | ZAUTO3 | Use ZAUTO3, not ZAUTO1; we use the latter for packing pkts as it is already set to safe default value. |
| 05455 | 1203 | | TAD | KMFOUR | Set auto-index to number of |
| 05456 | 1017 | | TAD | ZAUTO7 | pairs of six bit CHARS to |
| 05457 | 7171 | | STD CIA RAR | | be processed. |
| 05460 | 3017 | | DCA | ZAUTO7 | |
| 05461 | 5332 | | JMP | LD2 | Go test for no RIM data in packet |
| | | | | Wait always entered with clear AC | |
| 05462 | 1204 | WAIT | TDA | SERVR0 | Set timeout for 10 secs (don't bother clearing ZA as will make little difference to timeout) |
| 05463 | 3012 | | DCA | ZAUTO2 | |
| 05464 | 6701 | BACK | YMSAB | | Wait for flag set |
| 05465 | 2010 | TIMEIT | ISZ | ZAUTO0 | and increment timeout |
| 05466 | 5264 | | JMP | BACK | if data not yet received |
| 05467 | 2012 | | ISZ | ZAUTO2 | |
| 05470 | 5264 | | JMP | BACK | |
| | | If timeout error fall thru to retry (Will never get timeout error if entered wait from outpkt) | | | |
| | | | | This is bootstrap start address | |
| | | RETRY | | | |
| 05471 | 7300 | TAP111 | WKLEAR | | |
| 05472 | 6710 | | YMSCD | | Initialise KL8-A |
| 05473 | 7203 | | WP0100 | | and set up KG8 |
| 05474 | 6115 | | YRCLC | | control register |
| 05475 | 7300 | | WKLEAR | | |
| 05476 | 1365 | OVRLAY | TAD | NEGLIN | |
| 05477 | 7040 | | CMA | | Swap lines (Alternates |
| 05500 | 3365 | | DCA | NEGLIN | 0, −1) |
| 05501 | 7332 | | WP2000 | | |
| 05502 | 1365 | | TAD | NEGLIN | Assert request to send on new line and clear request to send on last line used |
| 05503 | 6711 | | YMSLC | | |
| 05504 | 7300 | | WKLEAR | | |
| 05505 | 1364 | | TAD | XLOCN | Set up branch address . . . . Only bits 0-8 used |
| 05506 | 6712 | | YMSLB | | |
| 05507 | 7300 | | WKLEAR | | |
| 05510 | 1207 | | TAD | SERVR3 | Ignore input by overlaying SERVR1 |
| 05511 | 3205 | | DCA | SERVR1 | with a JMP GETRID instruction |
| 05512 | 2016 | | ISZ | ZAUTO6 | |
| 05513 | 5307 | JMP | .−4 | | Wait 50ms for the clear to send |
| | | | | Send boot request | |
| 05514 | 1352 | | TAD | HELLO | Send HELLO message . . . . |
| 05515 | 5335 | SENDPK | JMP | OUTPKT | (MSG INCLUDES CRC & terminating word) |
| | | Pack RIM | | | |
| 05516 | 1413 | LDNEXT | TAD 1 | ZAUTO3 | |
| 05517 | 7106 | | CLL RTL | | |
| 05520 | 7006 | | RTL | | |
| 05521 | 7006 | | RTL | | |
| 05522 | 1413 | | TAD 1 | ZAUTO3 | |
| 05523 | 1370 | | TAD | KM0201 | Assume 8th bit always set (also COMPS link) |
| 05524 | 7430 | | SZL | | |
| 05525 | 5331 | | JMP | LD1 | |
| 05526 | 1371 | | TAD | KMSOH | |
| 05527 | 3011 | | DCA | ZAUTO1 | |

TABLE B-continued

| DEALING BOOTSTRAP PROGRAM LISTING | | | | | |
|---|---|---|---|---|---|
| 05530 | 5332 | | JMP | LD2 | |
| 05531 | 3411 | LD1 | DCA 1 | ZAUTO1 | |
| 05532 | 2017 | LD2 | ISZ | ZAUTO7 | |
| 05533 | 5316 | LOAD | JMP | LDNEXT | |
| 05534 | 1357 | SENDAK | TAD | RIMACK | Send RIM ACK<br>On entry ACC = MSG PTR −1 |
| 05535 | 3011 | OUTPKT | DCA | ZAUTO1 | MSG includes CRC & IS terminated<br>by a constant in range 3000–6377 |
| 05536 | 7300 | NEXTCH | WKLEAR | | |
| 05537 | 1365 | | TAD | NEGLIN | −1 or 0 |
| 05540 | 7043 | | CIA BSW | | |
| 05541 | 7106 | | CLL RTL | | Form 0 or 400 for lines 0, 1 respectively |
| 05542 | 1411 | | TAD 1 | ZAUTO1 | |
| 05543 | 7510 | | SPA | | |
| 05544 | 5221 | ENDPKT | JMP | GETPKT | End of xmission - NB ACC not = 0 |
| 05545 | 6704 | | YMSXD | | Xmit |
| 05546 | 7300 | | WKLEAR | | |
| 05547 | 5262 | | JMP | WAIT | Wait for xmission gone (Returns to<br>NEXTCH & ignores input, if any) |
| 05550 | 6705 | GETRID | YMSRD | | |
| 05551 | 5265 | | JMP | TIMEIT | |
| 05552 | 5552 | HELLO | HELLO | | |
| 05553 | 0001 | | SOH | | |
| 05554 | 0012 | HIYPE | 12 | | |
| 05555 | 0201 | | HCRC1 | | |
| 05556 | 0227 | | HCRC2 | | |
| 05557 | 5557 | RIMACK | RIMACK | | PTR & terminator of HELLO MSG |
| 05560 | 0001 | | SOH | | |
| 05561 | 0014 | | 14 | | |
| 05562 | 0001 | | RCRC1 | | |
| 05563 | 0225 | | RCRC2 | | |
| 05564 | 5400 | XLUCN | SERVE | | PTR & terminator of RIMACK MSG |
| 05565 | 0000 | NEGLIN | 0 | | |
| 05566 | 5574 | RCVPKT | PSTART | | |
| 05567 | 5601 | SDATA | LENGTH +2 | | |
| 05570 | 7577 | KM0201 | −201 | | |
| 05571 | 7777 | KMSOH | −SOH | | |
| 05572 | 0000 | | ZBLOCK | .+200 & 7600−. | *Zero fill page |

As further shown and preferred in FIG. 6, the terminal controller 68 also preferably includes conventional cyclic redundancy check logic 308, such as a Digital Equipment Corporation KG8 and a conventional multiple serial line interface 310, such as a Digital Equipment Corporation KL8A, for interfacing the terminal controller CPU 300 with the concentrator computer 46 via modem 66 at a rate of 1200 bits per second asynchronous, and for interfacing the terminal controller CPU 300 with the printer 78. In addition, the terminal controller 68 also preferably includes a display driver for each of the keystations, such as keystations 70, 82 and 84, associated with the terminal controller. Thus, since as previously mentioned each terminal controller is preferably capable of servicing up to 6 keystations, 6 identical display drivers 312, 314, 316, 318, 320 and 322 are provided with, for example, display driver 312 being connected to keystation 70, display driver 314 being connected to keystation 82 and display driver 322 being connected to keystation 84. Each of these display drivers 312 through 322 may preferably be of the type commercially available from Digital Equipment Corporation under the designation VK8A. Each display driver preferably provides video signals to the CRT associated with the keystation, such as CRT 76 for keystation 70, and receives input signals from the keyboard logic associated with the keystation, such as keyboard logic 74 for keystation 70, with the display driver 312 through 322, inclusive, being the interface between the CPU 300 and the individual keystations.

Figure 7:
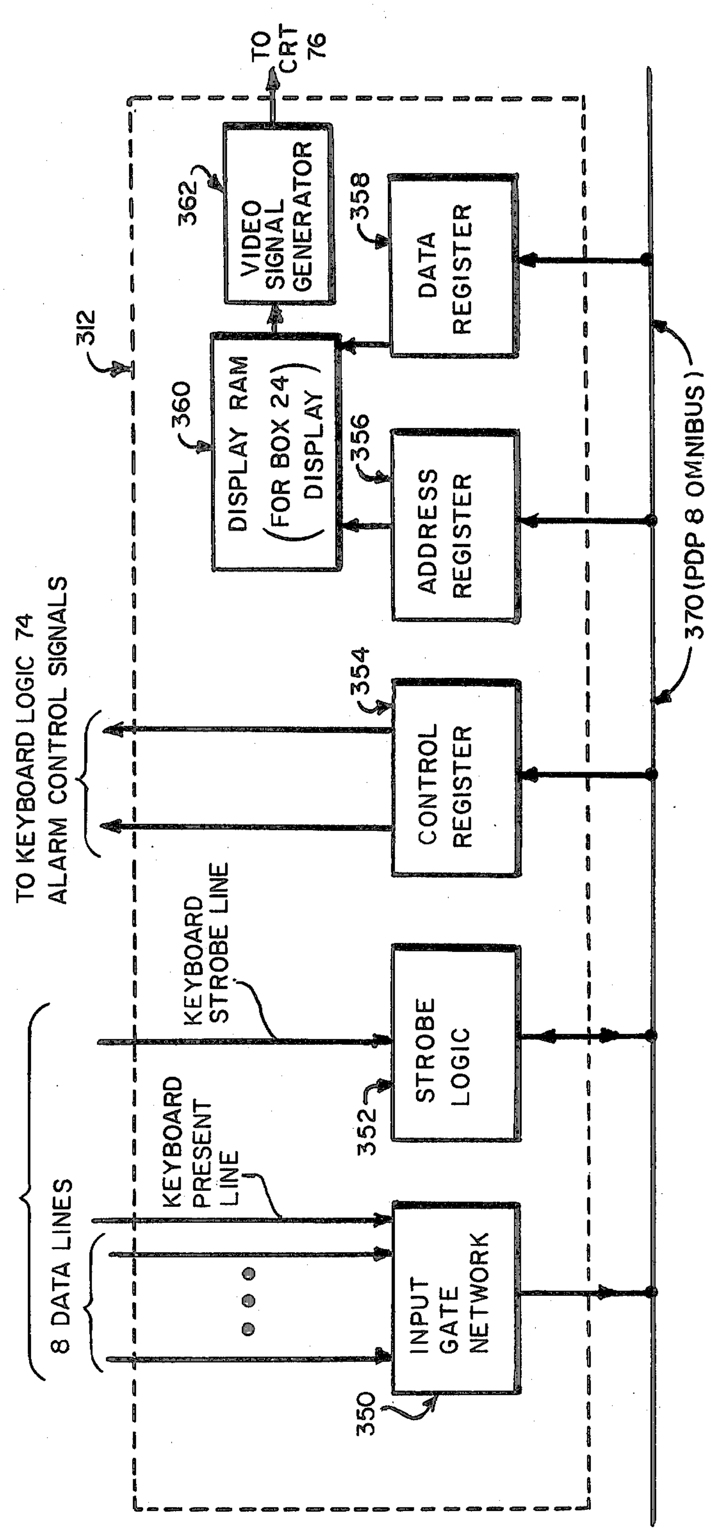
FIG. 7 is a functional block diagram of a typical display driver portion of the terminal controller of FIG. 6.
Figure 8:
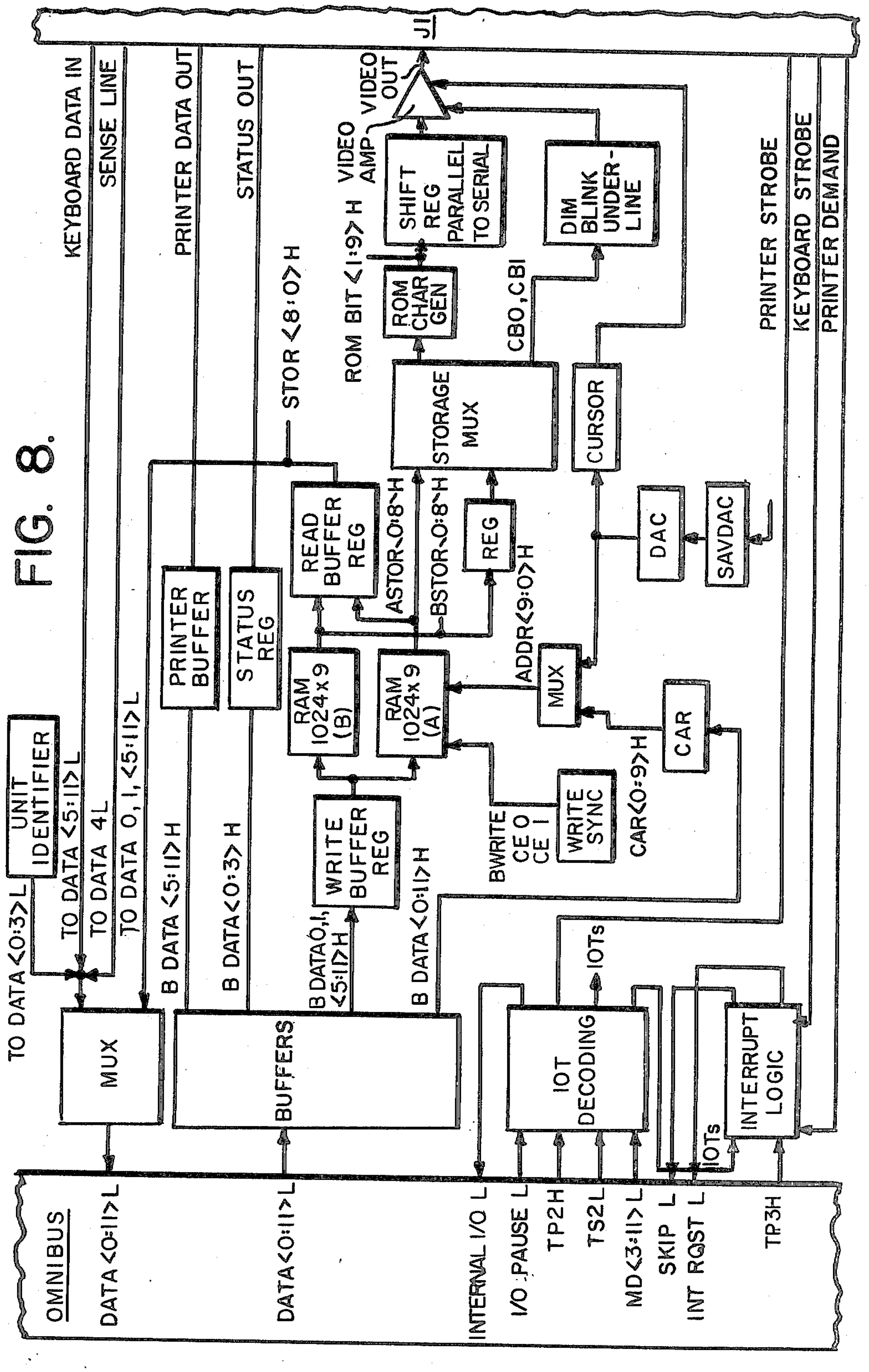
FIG. 8 is a more detailed functional block diagram of the VK8-A display driver of FIG. 7.

Referring now to FIG. 7, a typical video display driver 312 is illustrated in block form. Thus, the display driver 312 preferably includes a plurality of input gates 350 for receiving the eight data lines from the keyboard encoding logic 74, as well as for receiving a KEYBOARD PRESENT signal line also provided from the keyboard logic 74 to indicate to the terminal controller 68 that the keyboard has been switched on. In addition, the display driver 312 also includes conventional strobe logic 352, which receives a keyboard strobe signal from the keyboard logic 74, and control, address, and data registers 354, 356 and 358, respectively. Control register 354 preferably provides an alarm control signal to the keyboard for providing an alarm indication to the user. The address register 356 and the data register 358 are preferably associated with a display memory 360, such as a display RAM having 2048 bytes of memory. In reality, the display screen is preferably 80 to 24 and, accordingly, only the first 1920 bytes of the display RAM 360 are utilized to map 1-to-1 on to the display screen. The output of the display RAM 360 is provided to a conventional video signal generator circuit 362 which includes a character generator for providing a video display signal to the CRT 76 from the contents of the display RAM 360. As shown and preferred in FIG. 7, the input gates 350, strobe logic 352, control register 354 and address and data registers 356 and 358, respectively, are all connected to the CPU bus 370, such as a conventional PDP8 Omnibus. As was previously mentioned, the display driver 312 is preferably a conventional display driver such as a VK8A commercially available from Digital Equipment Corporation and a more detailed block diagram of such a VK8A display driver is illustrated in FIG. 8 and corresponds to FIG. 3-1 in the VK8A Maintenance Manual of January 1977 which may be referred to for further details on the operation of the VK8A display driver.

Figure 9:
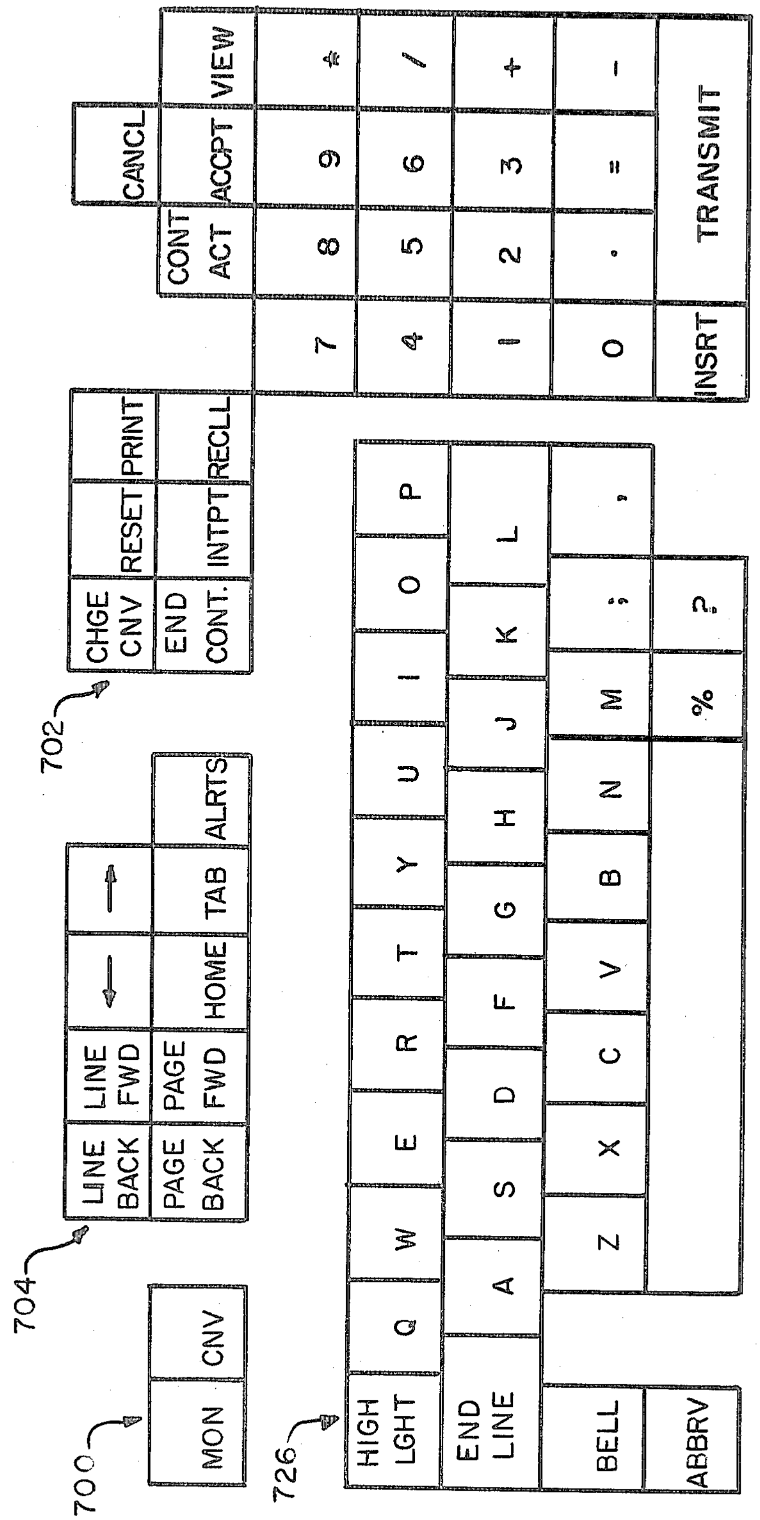
FIG. 9 is a diagrammatic illustration of a typical keyboard layout for the keyboard portion of a typical keystation for use in the system of FIG. 1.

Referring now to FIG. 9, a diagramatic illustration of a typical keyboard layout for the keyboard portion 72 of a typical keystation 70 for use in the conversational video system 30 of the present invention is shown. Thus, as shown by way of example in FIG. 9, the various keys of keyboard 72 bear legends associated with the function or type of message which the user or keystation 70 wishes to transmit through the keyboard logic 74 to the terminal controller 68, for example, for appropriate processing. As further shown and preferred in FIG. 9 the keyboard function keys are preferably divided into several functional types; namely mode keys 700 which select between a data base display mode, such as for displaying conventional data of the type commercially available from Reuters under the service designated as Reuter Monitor, and the conventional video communication mode which enables a user to carry on a two-way conversation with other users in the system 30; function and control keys 702 which are responsible for certain functional control commands; display and cursor control keys 704 which are responsible for controlling the display 76; and character control keys 706 which include certain character control functions including insertion of character data. The depression of a mode key 700 preferably causes subsequent input to be interpreted by the terminal controller 68 as being associated with that selected mode. With respect to the function and control keys 702, the effect of each function key is to some extent preferably dependent upon the mode which has been selected. Thus, the key labelled VIEW indicates to the terminal controller 68 that the characters which are subsequently being input via the character control keys 706 are to be interpreted as a request for a display. The key labelled CONTACT indicates to the terminal controller 68 that the characters which are subsequently input via the character control key 706 specify the party or subscriber with whom a conversation or other contact is desired. The key labelled ACCEPT indicates to the terminal controller 68 that the character which is subsequently input via the character keys 706 specifies the call that the user wishes to accept from the incoming call list. The key labelled INSERT indicates to the terminal controller 68 that the characters which are subsequently input via character keys 706 are to be interpreted as an insert whose function depends on the mode selected; for example, in the data or Monitor mode the characters would be interpreted as an insert to the data base 50 whereas in the conversational mode the characters which were input would be interpreted as an insert to the user line of the display 76 allowing prepreparation of conversational text without transmission at the time of preperation of these characters to the other party to the communication. This key may also be used to prepare messages to be left as will be described hereinafter. The key labelled CANCEL indicates to the terminal controller 68 that the characters which are subsequently input by character key 706 are describing an entity to be cancelled. The key labelled RESET resets a keystation within the current selected mode such as clearing the input characters displayed on the insert line and the associated measage line. In addition, as is readily available from the Reuter Monitor system, news alerts can be provided, and, if such a data base is used to provide data to the system 30 of the present invention, then the RESET key, if qualified by an earlier ALRTS key from key group 704, may be used to clear a news headline, with the display 76 reverting to the mode before the ALRTS key was depressed. The key labelled RECLL provides a control signal to the terminal controller 68 requesting the recall of the previous display. The key labelled INTPT initiates a control signal to the terminal controller 68 which, in the conversational mode, initiates an interrupt message given control of the conversation over to the party which initiated the interrupt message. This function is to be described in greater detail hereinafter. The key labelled END CONT initiates a control signal which results in the termination of a current conversation in the conversational mode. The key labelled CHGE CNV initiates a control signal which causes transfer, in the conversational mode, between conversations if two conversations are being carried on simultaneously by a single user 70 in which instance, as will be explained in greater detail hereinafter, the first conversation area 502 and the display area 504 are then utilised in the user display 76. The key labelled PRINT initiates a control signal to the terminal controller 68 which forces printing of the current display at printer 78.

With respect to the aforementioned key labelled ALRTS in key group 704, this key initiates a special sub-mode which allows control of the news headline area if present, the alerts area and the incoming calls area of the display 76. In this regard, when this key is initially depressed the alerts area is selected and control moved between the aforementioned three areas by pressing 1, 2 or 3 respectively. When the alerts or incoming calls area of the display 76 are selected the area may preferably be scrolled using the line and page control keys 704. With respect to these keys the LINE BACK and LINE FWD keys move the display up or down by one line and preferably affect only conversational dialogue displays, alerts and incoming calls, whereas the PAGE BACK and PAGE FWD affect the display of the next or previous page. With respect to the cursor control keys, these control the cursor, with the HOME key placing the cursor on the first position of the insert line and with the TAB key placing the cursor just after the last character on the insert line, with these keys only affecting the cursor in the insert line. The key labelled TRANSMIT, in the conversational mode, transfers control of the conversation to the other party. This key is also used to indicate the completion of entry of text into the insert line. With respect to the key labelled ABBRV, this key relates to the insertion of text on the user line, and particularly to the insertion of such text containing abbreviations. When this key has been depressed, the terminal controller 68 will examine the inserted message after it has been completed to determine if any of the character strings correspond to abbreviations contained in the look up table of the terminal controller 68. If so, these character strings are expanded into their corresponding full text prior to transmission. With respect to the key labelled END LINE, this key initiates the starting of a new line of conversational video text without transferring control to the other party to the conversation. With respect to the key labelled HIGHLIGHT, in the conversational mode, depression of this key causes the previous line, or the current line if it has been started, to be highlighted by asterisks on the right of the text in the print out. Lastly, the pressing of any of the graphic keys results in the character being displayed in the position indicated by the cursor and the cursor moves on to the next position.

It should be noted that the cursor normally remains in the insert line except during conversations when characters may be input directly into the display 76 for transmission to the other party.

Figure 11:
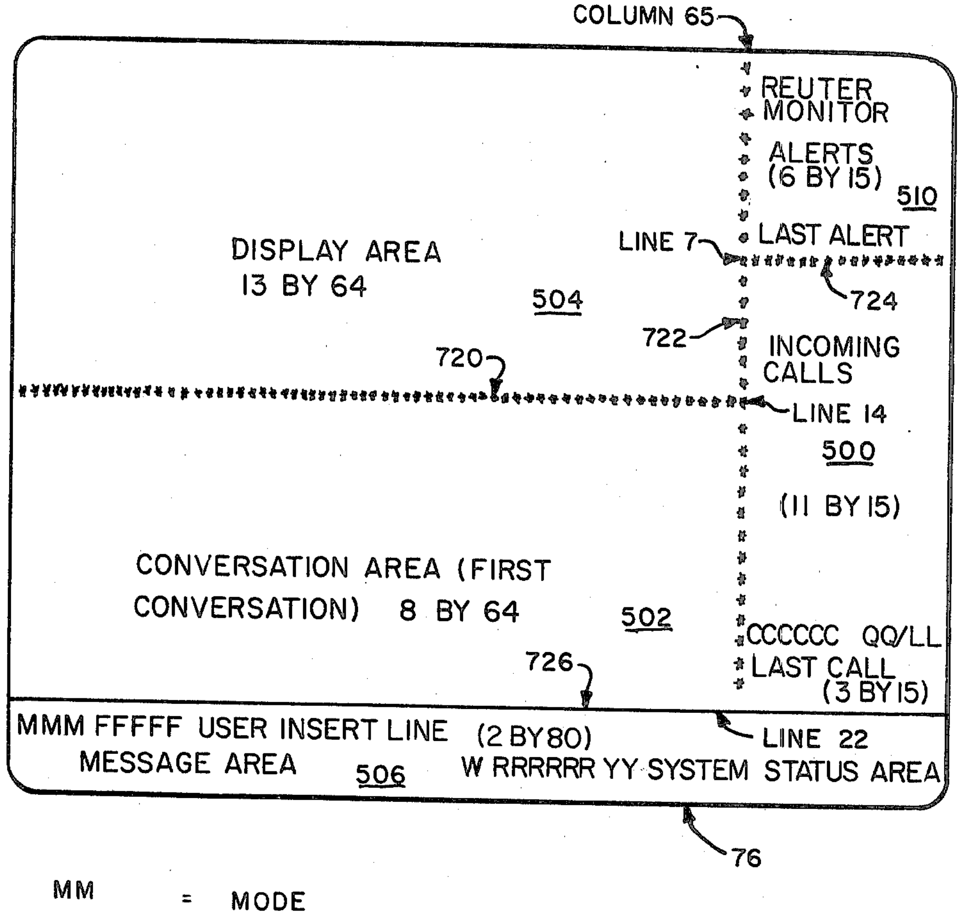
FIG. 11 is a diagrammatic illustration of a typical display area layout for the display portion of a typical keystation used in the system of FIG. 1.

Referring now to FIG. 11, a diagramatic illustration of a typical display area layout for the display portion 76 of a typical keystation 70 is shown. The display 76 preferably displays 24 lines each of 80 characters. Preferably the display 76 is divided into a plurality of predefined areas with certain of these areas clearly designated by providing lines 720, 722, 724 and 726. Thus, the screen or display 76 is preferably divided into a first conversation area 502 defined by lines 722, 720 and 726, with line 722 being at column 65, with line 720 being at column 14 and with line 726 being at column 22 to define a first conversation area of 8 by 64. In addition display 76 also includes a display area 504 defined by lines 722 and 720 which display area is preferably 13 by 64 and may display either the contents of a second conversation or retrieved data. Another area of the display is the incoming calls area 500 defined by lines 724, 722 and 726. The incoming calls area is preferably 11 by 15, with the last three lines of the incoming calls area 500 being special areas relating to a display of a message *MORE* if more calls cannot be shown, a display of the number of calls queued, a display of the number of left messages not cancelled, and a display of the last call received. The display 76 also includes an alerts message area 510 for display of alerts messages, with this area preferably being 6 by 15 and being defined by lines 722 and 724. Lastly, the bottom display area 506 of the display 76 includes a user insert line, a message area and a system status area with the bottom area 506 displaying the mode, the function, and the user insert line, which user insert line preferably comprises positions 11 to 80 of row 23, and with the mode of the system being displayed relating to the conversational mode including the CN1 or CN2 designation where CN1 is the conversation displayed in the first conversation area 502 and CN2 is the conversation displayed in the display or second conversation area 504. With respect to the message area, positions 1 to 48 of row 24 provides space for responses to inputs to the system from the keyboard 72 with this message area being cleared when text on the insert line is transmitted. Typical responses appearing on the message line are ACCEPTED and INVALID. Position 50 of row 24 preferably shows the transmission state of the last message in the current mode with W indicating waiting for transmission and T indicating waiting for a reply. This transmission state is preferably blank in the CN1 and CN2 modes, except when leaving a message. Positions 52 to 57 of row 24 preferably show the first 6 characters of the last page requested in the current mode, which page can be requested again by pressing the RECLL function key on the keyboard 72. Positions 59 to 60 of row 24 preferably show the status of the second conversation in the event this second conversation is not then currently being displayed in display area 504, with the first character being a single letter representation of the status, such as busy, queued, free, receive, send, transfer, ended or off system. With respect to the aforementioned alerts contained in area 510, preferably five alerts of up to 15 characters can be displayed in chronological order, with the most recent five received by the controller 68 preferably being displayed although the controller 68 is preferably capable of retaining an additional 12 alerts which may be scrolled into view by pressing the ALRTS key on the keyboard 72 and the LINE or PAGE keys. Preferably, as illustrated in FIG. 11, the most recent or last alert is not scrolled and always occupies the bottom line of area 510. With respect to the aforementioned incoming calls area 500, this area preferably contains brief details of the incoming calls and their interest messages, with the calls being shown in chronological order, with the oldest at the top of the area and with the latest call being displayed in lines 21 and 22. It should be noted, however, that the incoming calls do not have to be selected by the called party in the order in which they are displayed. Line 20 is preferably used to show the incoming call status. Preferably, if a news alert is received, it will be displayed in three lines below the display area 504, namely in rows 14 to 16 and positions 1 through 64. If a conversation is occupying this portion of area 502, then the heading of the conversation will be moved to row 17 to allow for display of the news alert. As was previously mentioned, this news alert may be reset.

Referring now to FIGS. 10A through 10F, these figures illustrate typical examples of conversational video displays which may appear on the display 76 of a typical keystation used in the conversational video system 30 of the present invention. As was previously mentioned, in order to conduct a conversational video communication, the keyboard 70 must be in the conversational mode. In this mode, each keystation is preferably capable of controlling two conversations simultaneously and, if the user decides to initiate such a second conversation, the details will be displayed on his display 76 in the display area 504 and will override and cancel any other display in this area 504. Displays, however, may be called up in any mode while a second conversation is in progress and will then temporarily suppress the display of the second conversation in area 504. These displays will themselves be overriden and cancelled when the second conversation is subseqently selected. The format of the display of the second conversation in area 504 is preferably identical to that of the first conversation and occupies lines 1 to 8 of the display area 504. If one conversation contact has been executed, a subsequent contact is assumed to be a request for a second conversation with control being passed back to the first conversation by depression of the key labelled CHGE CNV on the keyboard 72 which key may thereafter be used to transfer at any time between the two conversations. If the first conversation is completed while a second one is still in progress, the second conversation still remains in the display area 504. Typical call headings which would be displayed under various conditions are illustrated in FIG. 10A with each of these call headings being appropriately labelled. Each subscriber is preferably assigned a unique four character short name and the user wishing to contact another subscriber merely presses the CNTCT key on his keyboard 72, then the short name of the subscriber and the TRANSMIT key. In making this contact, the calling party may use an abbreviated form of address, may add a two character reference code to the called name, which code is intended to indicate which of the called subscribers keystations the caller wishes to contact, or he may add a 14 character interest message to his call to indicate the reason for his call. This interest message is displayed in his conversation display at his first message in the conversation and is shown in the incoming calls area 500 of the display 76 of the party being called and then in his conversation display once the incoming call is accepted. Calls which are received by a subscriber are preferably assigned a letter on receipt and are displayed in the incoming calls area 500 of all keystation screens associated with that subscriber. Calls normally occupy one line of the incoming calls area 500 and are preferably displayed, as previously mentioned, in time order with the letter assigned to the call, the four character short name of the calling subscriber and, if present, the two character reference code indicating the particular keystation that the caller wishes to contact. If an interest message is sent with the call, it preferably appears on the next line of the incoming calls area 500 indented one space. When the user accepts a call by pressing the ACCEPT function key on his keyboard 72 followed by the letter identifying the call which he wishes to accept and the key labelled TRANSMIT. The system displays, on his insert line, the message CNV ACCEPT A assuming that call A is accepted, and in the conversation area 502 for the first conversation or the display area 504 for a second conversation, the conversation heading in exactly the same format as for the contacting subscriber except for the substitution of the word "FROM" for the word "TO" to indicate that the calling party originated the call. If an interest message was included with the contact, this is preferably displayed as the first message of the conversation and the contacted party is then expected to reply with a second message. The status of the call will reflect this. The acceptance of the call is also signalled to the terminal controller of the calling party and the status of the called party's display is updated to indicate either that he should await a message, such as if he sent an interest message, or that he should start the dialogue or conversation. In addition, the accepted call is cleared from the incoming calls area 500 of all keystations associated with that subscriber. With respect to conversations dialogue, input messages are preferably displayed in the conversation area 502 for the first conversation, starting at position 4, with the user keying in the information at his own rate. The message is then transmitted in packets as it is being typed in, with the packets of the message preferably being transmitted if a space character is encountered after the input of the tenth character from the start of the line or end of the previous packet, if no space is encountered after the tenth character but the 15th character has been input, if the END LINE key has been depressed either in conversation text or to release prepared text in the insert line, if the 61st character of a line is typed, this character overflowing to the next line and automatically forcing an end of line condition, if the control is moved to the insert line by pressing the INSERT key or the ABBRV key, if the TRANSMT key is pressed to indicate the end of the sender's message, if an interval of a pre-determined period, such as 20 seconds, elapses since the last text transmission, or if the END CONT key is pressed. The completion of a message is preferably signalled by a change of status in the conversation header line of the sender's conversation from send to receive and vice versa for the recipient's conversation. While the user is awaiting receipt of a message he may prepare his next response on the insert line. He may also prepare a message for transmission when he is in control of the conversation. In either case, he enters the appropriate conversation mode CN1 or CN2 using the CNV mode and the CHGE CNV key if necessary and then presses INSERT. The system will then transmit any text up to this point and move the cursor to position 11 of the insert line. The user may then enter up to 70 characters in the insert line and edit them as required, with this text only being released if the user presses TRANSMIT, END LINE or END CONT while he has control of the conversation. The text when released in this manner is transferred to the conversation area 502 or 504 if it is a second conversation, and transmitted to the other party, with the insert line being cleared. If the TRANSMIT key has been pressed, the text is regarded as forming the complete message and the conversation status changes to receive. The use of the END LINE key indicates that the user's message is not complete. The cursor is moved into the dialogue text at an appropriate point for input to continue. Further text may be added in the conversation or in the insert area if the insert key is pressed again. A correspondent who was waiting for a response from the other party may preempt control by pressing the INTERRUPT key, as previously mentioned, and any portion of text which has been received by the receiving party's terminal controller before the INTERRUPT key has been pressed is regarded as binding and is displayed on the recipient's display 76 as a received message. The pressing of the key changes the status of his conversation from received to send and results in an interrupt message indicating how many characters have been received by the interrupted party. Receipt of this message changes the status from send to receive, clears any text after the interrupt point, and displays the message *INTERRUPT* on the next line. The interrupter in then in control of the conversation and can commence the transmission of his message. He may in turn be interrupted. The display of a conversation holds a heading and up to 7 lines of conversation, each of up to 60 characters, by way of example. The first character of each line indicates whether the line was transmitted or received. The text of lines sent preferably start at position 4, lines received being indented to position 5. The most recent message is preferably at the bottom of the area and the oldest at the top. When the area is full, the uppermost lines are preferably moved off the screen leaving space for newer messages. Earlier parts of the conversations may be examined by using the LINE and PAGE function keys on the keyboard 72. It should be noted that when a conversation is scrolled so that the current line is not on display, this is indicated on the display by display of the word SCROLL on the heading line. A user may print a current conversation using the PRINT function key on the keyboard 72 at any time. If he does so, the conversation up to that point is released for printing on the printer associated with the terminal controller and, effectively, a new conversation is started within the same call and with the same party, the user's screen is cleared, and portions of the conversation which took place before pressing the PRINT key cannot be recalled by use of the LINE and PAGE keys. It should be noted that preferably conversations of a normal length of 300 to 500 characters may be completed without the necessity of printing the conversation before it is completed.

By way of example, with respect to the aforementioned abbreviations function, standard abbreviations may be employed such by using the symbol A for the word "AT" by using the symbol B for "I BUY", by using the symbol FF for "FRENCH FRANCS", and by using the symbol * for "MILLION", then the expression "AT 79 I BUY 10 MILLION FRENCH FRANCS" may be provided in the following abbreviation: "nA79B10*F". Simple conversational messages in accordance with the above principles are illustrated in FIGS. 10A through 10F and are essentially self-explanatory with the legends provided underneath. It should be noted that the above exemplary displays are assuming that the conversational video system 30 is being used in the money dealing market in which money dealing rates are proposed and accepted by the subscribers to complete transactions. Of course, the conversational video system 30 of the present invention may be employed in any type of rapid video communication between subscribers and particularly where more than one conversation is desired to be carried on at a given time or where it is desired to provide supplementary data which may be retrieved along with the conversational text, particularly where the data could be useful in connection with the transaction being carried out through the video conversation function of the system 30. As was previously mentioned, the display of retrievable data may preferably be conventionally accomplished by a conventional data retrieval system, such as the Reuter Monitor and need not be explained in any further detail. The operation of the system 30 of the present invention shall now be described in greater detail below. It shall be assumed for purposes of explanation that the conversational video system 30 of the present invention is being used in a money market dealing environment.

"System Operation"

Figure 12:
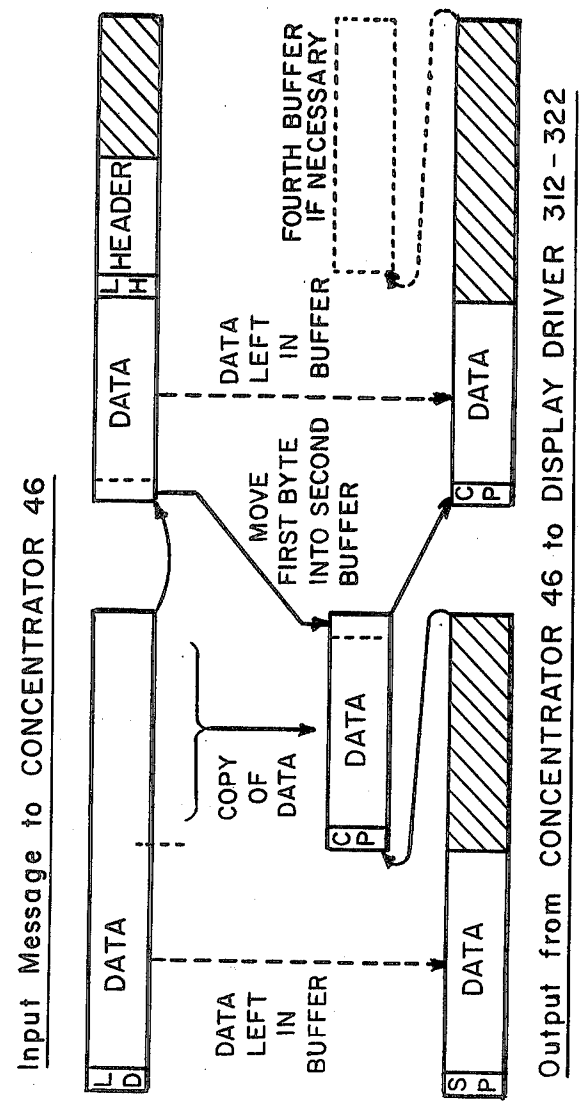
FIG. 12 is a diagrammatic illustration of the splitting of an input message to the concentrator computer into multiple packets.

As was previously described, the terminal controller, such as terminal controller 68, provides the interface between the users or subscribers and the central system network 32. Preferably, the terminal controller 68 interface to the network is based on a port table in the controller 68 control program enumerated above in table A. The various ports relate to communication with the associated concentrator 46, separate ports corresponding to communication with the data base 50, other ports relating to communication with the host computer 38 through the packet switching network 40, and with 12 ports being reserved for the 12 possible video conversations that can be held on the 6 keystations supported by the terminal controller 68, such as keystations 70, 82 and 84, by way of example. As was previously mentioned, the packet switching network 40 is preferably a conventional type of packet switching network such as one conforming to the standardised X25 packet switching protocol, and is preferably used to provide logical connections between the various concentrator computers, such as 46 and 48, and between the concentrator computers 46, 48 and the host computer 38. The system is designed so that preferably one of the logical connections between the concentrator computer 46 and the host computer 38 through the packet switching network 40 also carries all of the communication information between the terminal controller 68 and the host computer 38 as well as, in the example of FIG. 1 all of the communication information between the terminal controller 80 and the host computer 38 and any other terminal controllers which are associated with that particular concentrator computer 46. Thus, all of the common ports of the terminal controllers which are connected to a given concentrator computer 46 and which are associated with the host computer 38 use the same channel across the packet switching network 40. Similarly, all of the video conversations that are directed from one concentrator, such as concentrator 46, to another concentrator, such as concentrator 48, are multiplexed across a common logical connection between the concentrators 46 and 48. The terminal controller, such as terminal controller 68, preferably contains answerback codes and user abbreviations which are employed in the conversational video system 30 of the present invention. Thus, an answerback code would preferably be a 20 character text string identifying a particular subscriber, such as subscriber 34, and the user abbreviations are for abbreviated transmissions of various data so as to expedite the video communication, with a given terminal controller preferably containing up to a thousand characters relating user abbreviations to their corresponding full text expansion. The terminal controller 68 is preferably identified to the concentrator computer by a subscriber identifier and a unique controller number. During system 30 operation, the various multiple serial interfaces 284, 286 and 288, by way of example, associated with the concentrator computer 46 check a line whenever no traffic has been acknowledged for a pre-determined period, such as 5 seconds. Each terminal controller acknowledgement confirms the identity of the line by preferably including a check byte in addition to the packet sequence number. If the checks fail, the connection is broken and an error condition is reported. The packets on the line to the terminal controller, such as terminal controller 68, may be at normal or high priority, to be described in greater detail hereinafter. Once a packet is being transmitted, it is preferably delivered before another is transmitted; however, the interface 284, 286 or 288 will preferably select high priority packets in preference to normal priority packets. The messages received by the concentrator computer 46 from the system 30 are preferably divided into 64 data byte packets for transmission to the terminal controllers, such as terminal controller 68, so that high priority packets can obtain access to the line in a reasonable time. The first byte of each packet to the terminal controller 68 preferably contains the port number of the connection and a bit indicating if this is the first packet of a message. In terms of the aforementioned priority, a video conversational message is preferably given a high priority in the system whereas data from the data base 50 is given a normal priority. Thus, an input message is normally divided into packets so as to enable a high priority packet to be inserted where necessary between normal priority packets so that the conversational video data may always take precedence over normal data transmission in the system 30. As shown in FIG. 12 which is a diagramatic illustration of the splitting of data messages into several packets, when an input message is split, the first 64 bytes, by way of example, can be transferred in the buffer they arrived in and the port number can replace the data length byte. The rest of that buffer is preferably copied into a second buffer which is chained to the first buffer. This preferably contains 1 byte for the port, 63 bytes for the remaining data in the original buffer and 1 byte to copy from the first byte of the second buffer. If a second buffer exists, this is split into two buffers in a similar way. High priority messages are preferably handled in the same way although they are preferably restricted to messages of less than 64 bytes.

When a keystation, such as keystation 70, wants to initiate a call or video communication the user depresses the CNTCT key on the keyboard 72, which, through the keyboard logic 74, provides a contact signal to the terminal controller 68. On detecting this contact signal, the terminal controller 68 preferably sends the contents of the user insert line for user 70 to the host computer 48 for analysis. As was previously mentioned, the message preferably includes a port number allocated for the conversation and a conversation reference byte. The user's keyboard 72 is preferably locked until the initial reply is received. The host computer 38 then sends the contact request as an incoming call to the respective terminal controller with which the message is associated, such as controller 96 along with the text for display and additional data to enable the call to be established when it is accepted by the controller 96 or by one of the users 98, 100 associated with terminal controller 96. Prior to acceptance of the incoming call by one of the keystations 98, 100, the call is placed in one of, by way of example, 16 positions in a dedicated buffer area in the terminal controller 96, with a separate list specifying the order of arrival of incoming calls which controls the display of the incoming calls on the CRT display 96 such as displayed in the incoming calls portion 500 of the display illustrated in FIG. 11. The display preferably shows the calls in order of arrival normally starting with the earliest received incoming call; however, preferably the latest call is always shown at the bottom of the incoming calls area 500 on the display. If the capacity of the incoming calls area 500 is exceeded so that not all incoming calls can be shown in the incoming calls area 500, then the incoming calls can be scrolled in this area; however, the latest call is always preferably left on display at the bottom of the incoming calls area 500. Any of the associated keystations 98, 100 and preferably accept any of the incoming calls displayed in the incoming calls area 500 and does not have to select the calls in the order of receipt. As was previously mentioned, the incoming calls may be displayed with an adjacent interest message which can be utilized by the users at the keystations 98, 100 to determine which call to accept first. When a user 98,100 desires to accept one of the displayed incoming calls, the user depresses the ACCEPT key on his keyboard 72, which, through the associated keyboard logic 74, transmits an accept signal to the terminal controller 96. The user, such as keystation 98, then indicates which of the displayed incoming calls he wishes to accept by inputting a single letter identifier displayed adjacent to the particular incoming call in the incoming calls area 500. The terminal controller 96 determines from this information which of the incoming calls have been accepted and uses the related data in the call buffer to set up a display heading for the incoming call, to report to the host computer 38, and to request a connection to the caller initiating the contact by sending a request on a dedicated port to the concentrator 48. This request preferably includes the subscriber 36 answerback code and the number of the keystation 98 accepting the call. This connection may, of course be successful or unsuccessful; however, if the connection is successful the relevant conversation area in the display such as the first conversation area 502 or the second conversation area 504 is initialised with a heading line. If, however, the connection is unsuccessful, a message is displayed in the message area 506. Assuming the connection is successful, the terminal controller 68 associated with the keystation initiating the contact will preferably reply with the subscriber 34 answerback code.

After the connection has been completed between the terminal controllers 68 and 96 and the associated calling and receiving keystations, such as keystations 70 and 98, respectively, the video communication conversation may then take place between these keystations 70 and 98. The conversation text is preferably held in 64 word buffers which are chained together in each of the respective controllers 68 and 96 with data for the printed heading preferably being held separately since it is placed in the text before printing of the displayed conversational video communication. The conversational control program provided by way of example in Table A, controls the text held in core 304, 306 and can provide scrolling of the display 76, regeneration of a conversation in the general display area 504 when required, and generation of displays in the conversation area 502 when this is affected by such things as alert messages such as corresponding to relevant supplementary data, such as important news stories which could affect the transaction being carried on between the callers 70 and 98. If the conversation is ended, or released for printing on printer 78 and 102, respectively, so as to provide a hard copy print-out of the communication between keystations 70 and 98, terminating information may be added before the text is queued to the printers 78, 102. In addition, as was previously mentioned in referring to the layout of keyboard 72, the keyboard 72 also preferably includes a HIGHLIGHT key for highlighting a particular line on the display, such as to indicate that a transaction has been completed if the video communication is used for such transactions as money market dealing, for example. The highlight control function preferably acts on the current or previous line and adds a row of asterisks to the conversation line. They are not displayed, as each line is limited to 64 characters, but rather appear in the hard copy print-out. The keyboard 72 interrupt key provides an interrupt control signal to the terminal controller 68 or 96, transferring control of the conversational dialogue from the party who is transmitting at that particular point in time to the party who is receiving, and causes the sending of a message to the then transmitting party to clear data from his screen which has not yet been transmitted to the receiving party. When the interrupt has taken place, the call buffers are modified appropriately and the conversation is again displayed with the deleted text removed from the display. In addition, a reply is sent acknowledging the interrupt so that an interrupt message appears on the screen or display of the party whose message has been interrupted.

Referring now to the user insert line which appears in display area 506 of the display 76, if either the insert key on the keyboard 72 or the abbreviation key on the keyboard 72 is depressed by the user during a conversation, this forces the cursor on the screen to move to the user insert line in display area 506 and provides a control signal through the terminal controller 68 or 96, depending who is initiating the insert function, to indicate that this function has been selected. Similarly, depression of the abbreviation key places the abbreviation character in the user insert line. The user then types in the desired insert message which is displayed on his user insert line. When the insert line is released by the user, such as by depression of transmit key, the end contact key or the end line key on the keyboard 72, it is treated by the respective controller 68 or 96 as a series of characters input from the keyboard 72. If the abbreviation character is found, then subsequent processing of the insert line by the terminal controller 68 or 96 is preferably in the abbreviation mode with each character string from the keyboard 72 preferably being tested by the controller to find if it corresponds to one of the abbreviations stored in the controller 68 or 96. Assuming it does correspond, then the abbreviation is replaced by its full text expansion and the expanded abbreviation is used as though the full text characters had been provided on the user insert line.

It should also be noted that preferably a message may be left by a caller when the conversation has not been accepted. This left message is preferably created on the user insert line and despatched by the sending terminal controller, such as controller 68 with an insert function, as a left message to the host computer 38 from which it is then sent in a message to the controller 96 of the party to which it is directed. This left message is then preferably printed on printer 102 and is preferably accompanied by the number of left messages which are being held in the host computer 38 for that subscriber 36. This number is preferably displayed in the incoming calls area 500 of the display 76 and is preferably flashed for a pre-determined period, such as 3 seconds, and is also maintained on a left message page of the subscriber 36 until it has been cleared or overwritten.

As was previously described, when a connection is made between the controllers 68 and 96, messages are sent over the line in packets which include cyclic redundancy checks and an acknowledgement protocol which gives a high probability of error free communication and ensures that packets are received in the order they were sent. Thus, packets which have been sent to the concentrator computer 46 or 48 preferably include a check byte specific to the controller 68 or 96, respectively, which enables any mis-connected line to be detected, with the check byte being loaded into the controller when the connection is established so that the concentrator computer may ensure that it is connected to the correct terminal controller. Preferably, the maximum packet size into the concentrator computer will hold 83 bytes of data with packets out to the terminal controller being preferably limited to 64 bytes of data. A message reaching the concentrator computer for the associated terminal controller may preferably contain up to 225 bytes with the messages thus being divided into up to four packets for transmission to the terminal controller. Preferably, the first packet in a message is marked to permit checks on message synchronisation. As was previously mentioned, there are preferably two priorities of message which may be received by the controller, namely high priority messages and normal priority messages, with one or more high priority messages being insertable between two packets of a normal priority message. The two priorities are therefore, preferably accepted by the controller as two independent packet streams.

Figure 13A:
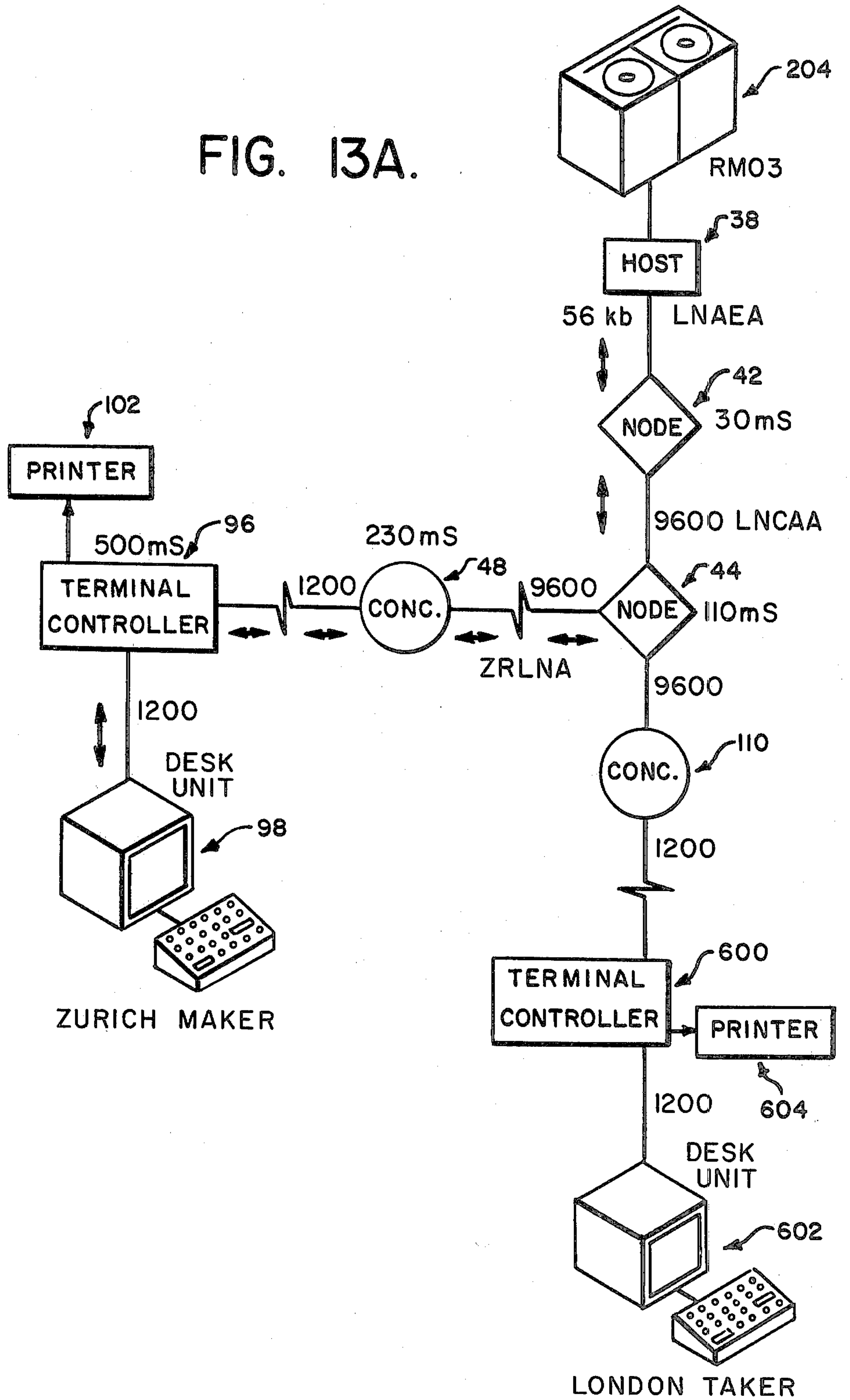
FIGS. 13A-13P are diagrammatic illustrations of a typical conversational signal path in the system of the present invention, with FIGS. 13A-13F relating to setting up a call, FIGS. 13G-13I relating to ending a call, and with FIGS. 13J-13P relating to leaving a call.
Figure 13B:
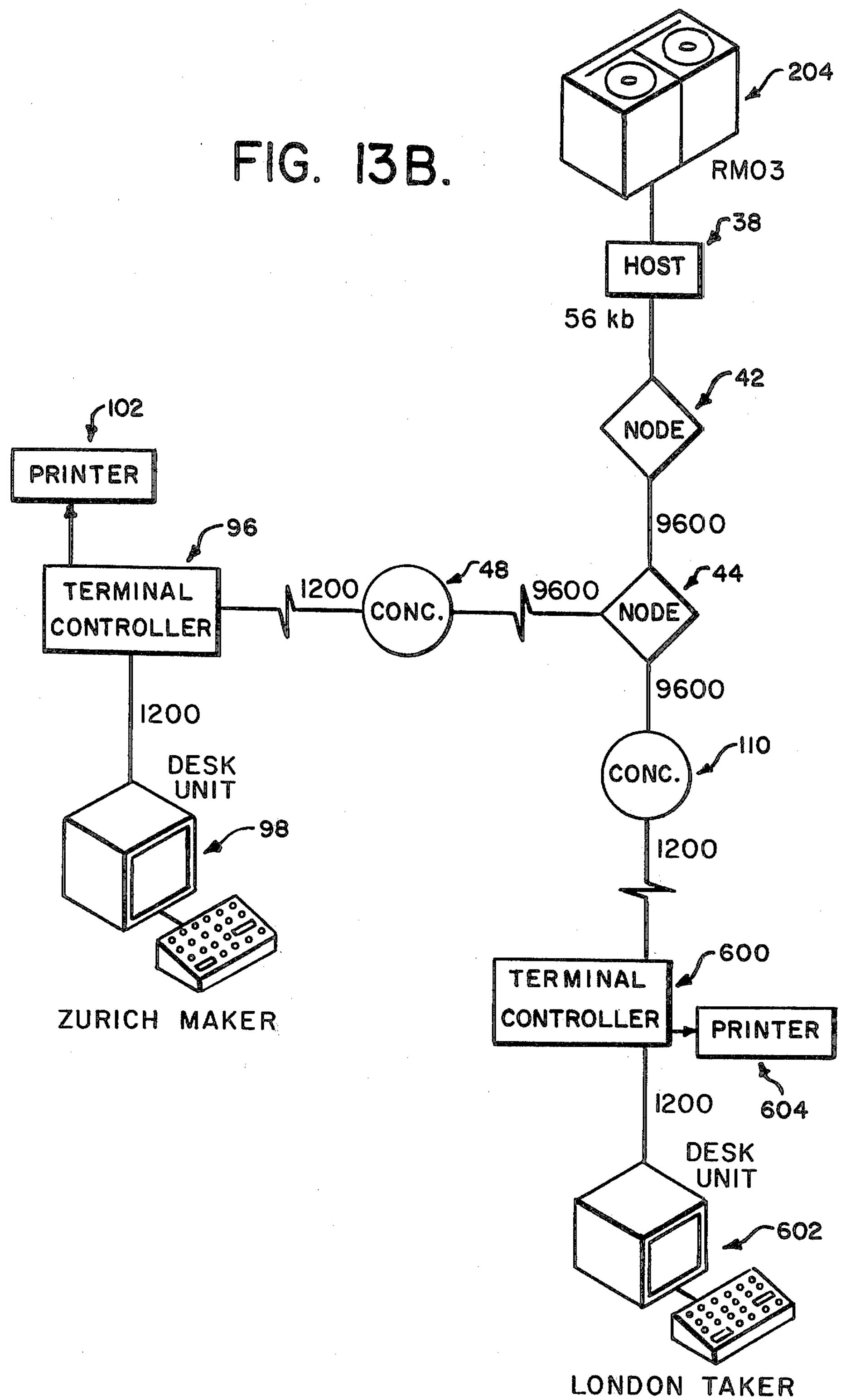
Figure 13C:
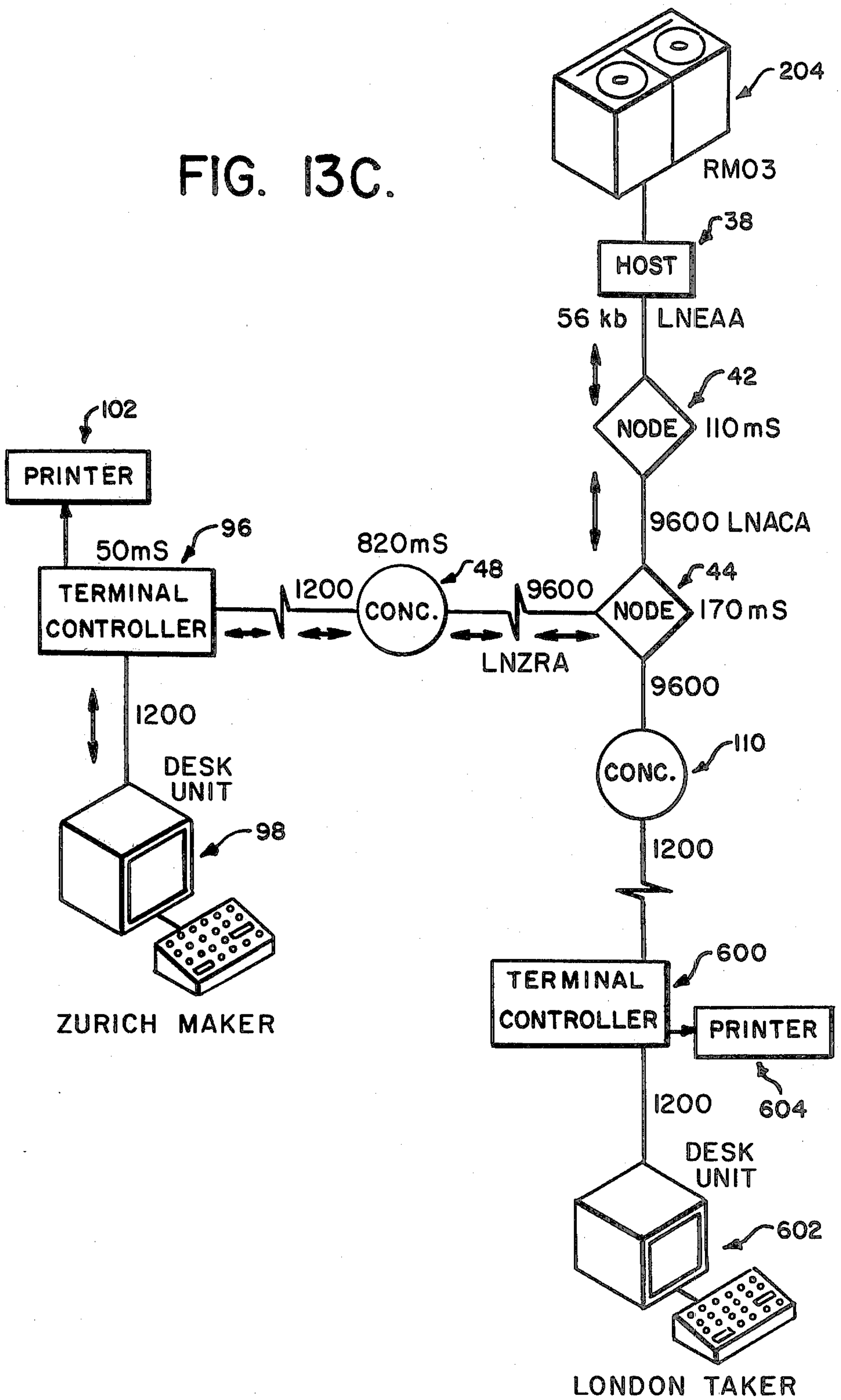
Figure 13D:
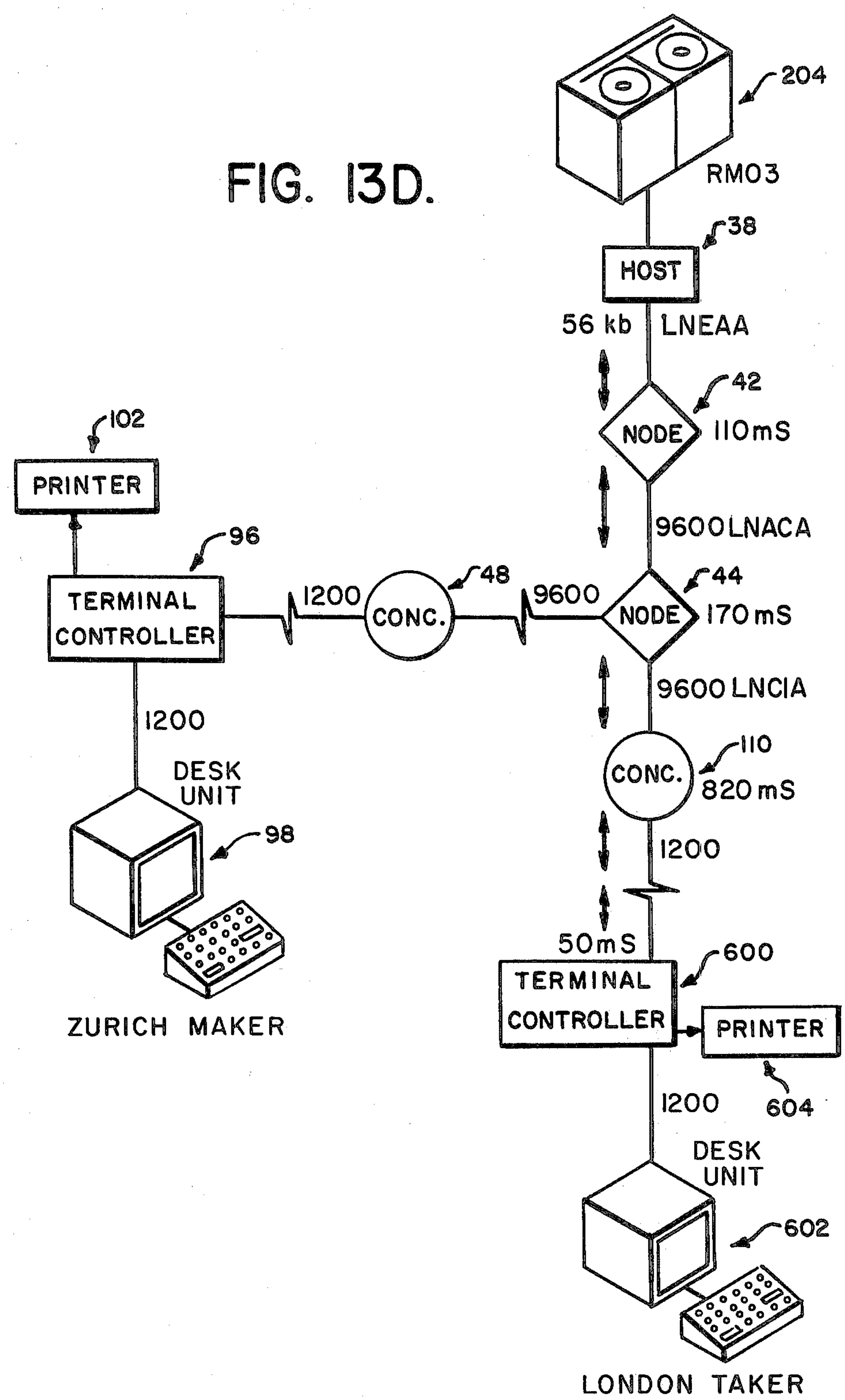
Figure 13E:
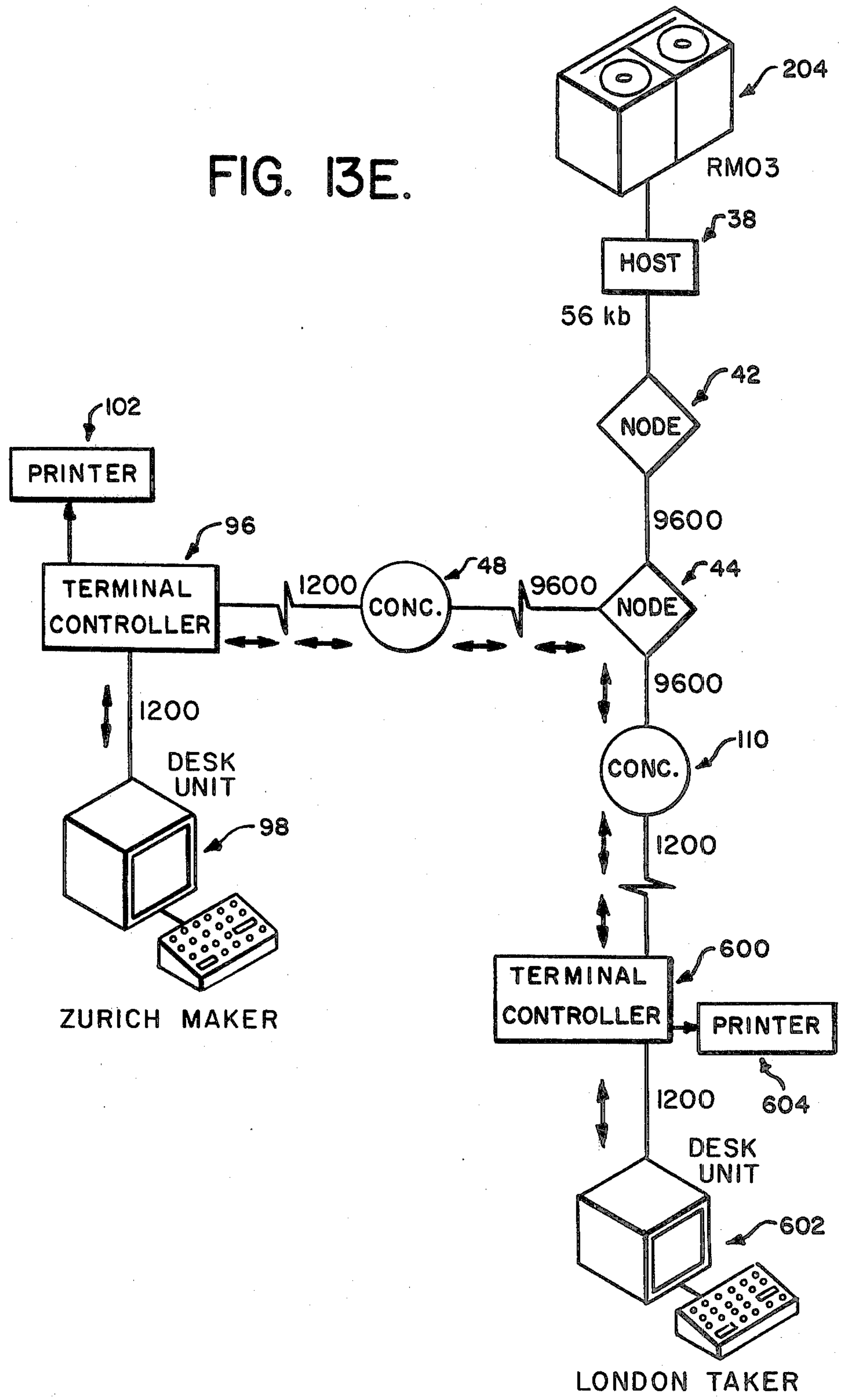
Figure 13F:
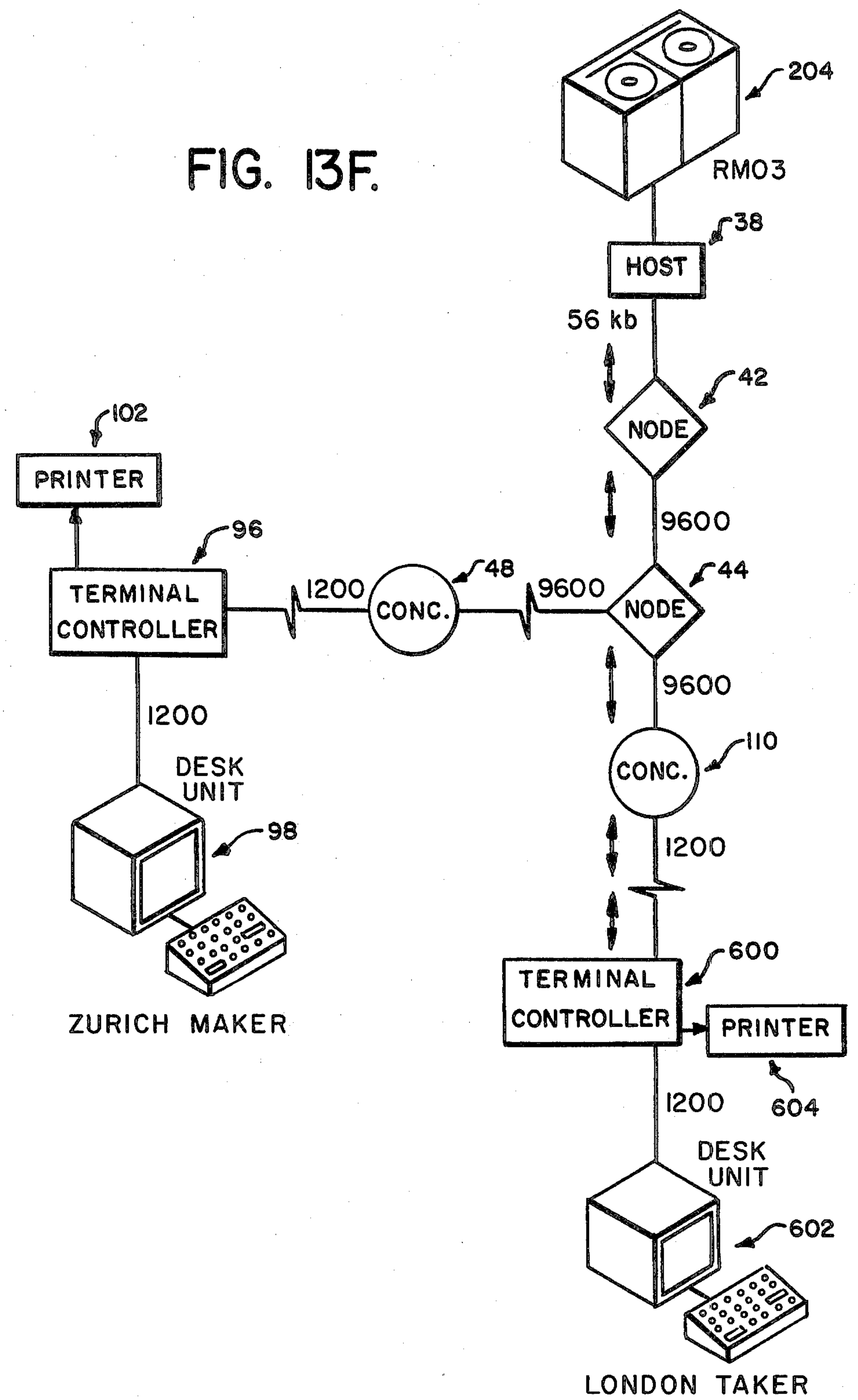
Figure 13G:
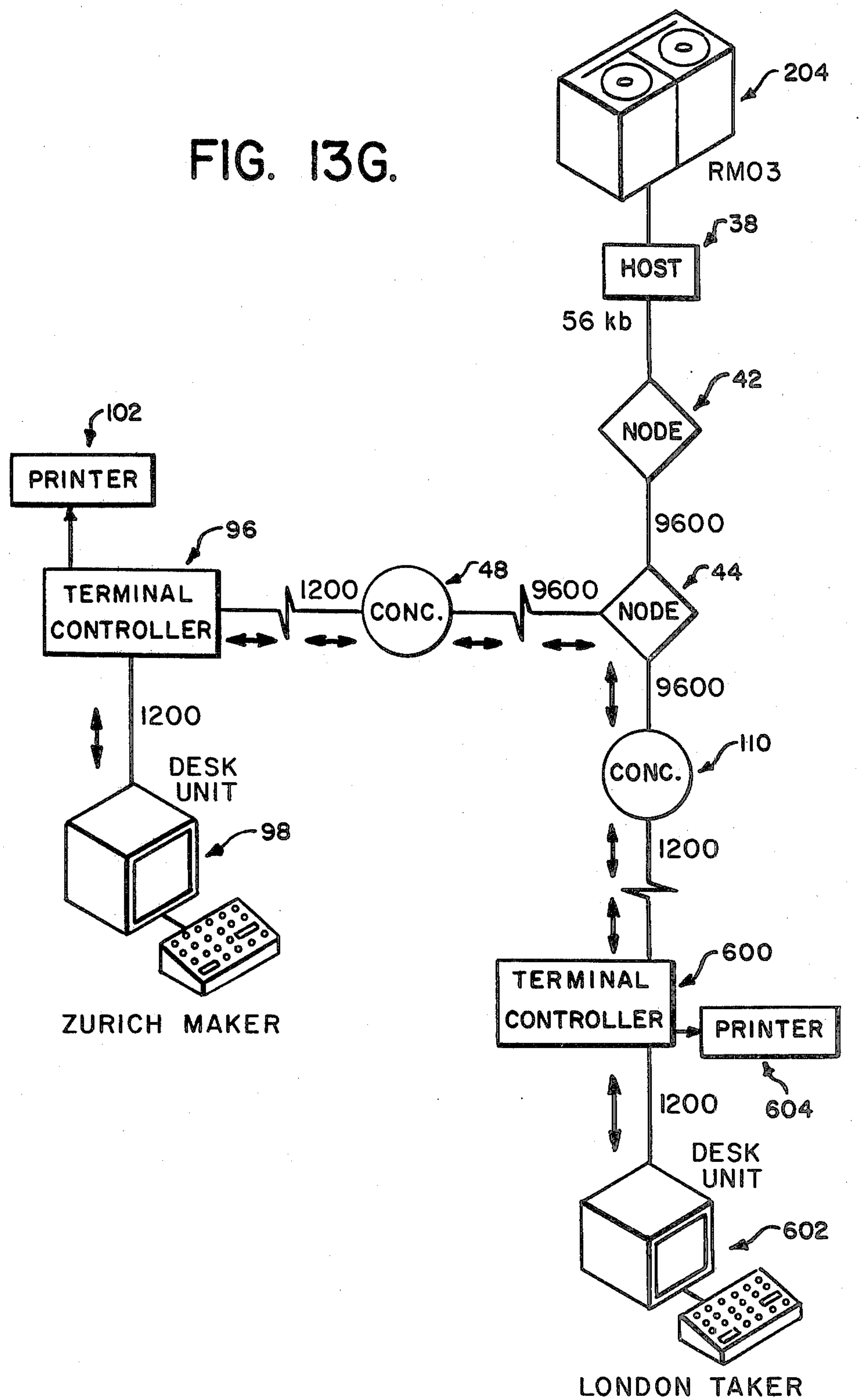
Figure 13H:
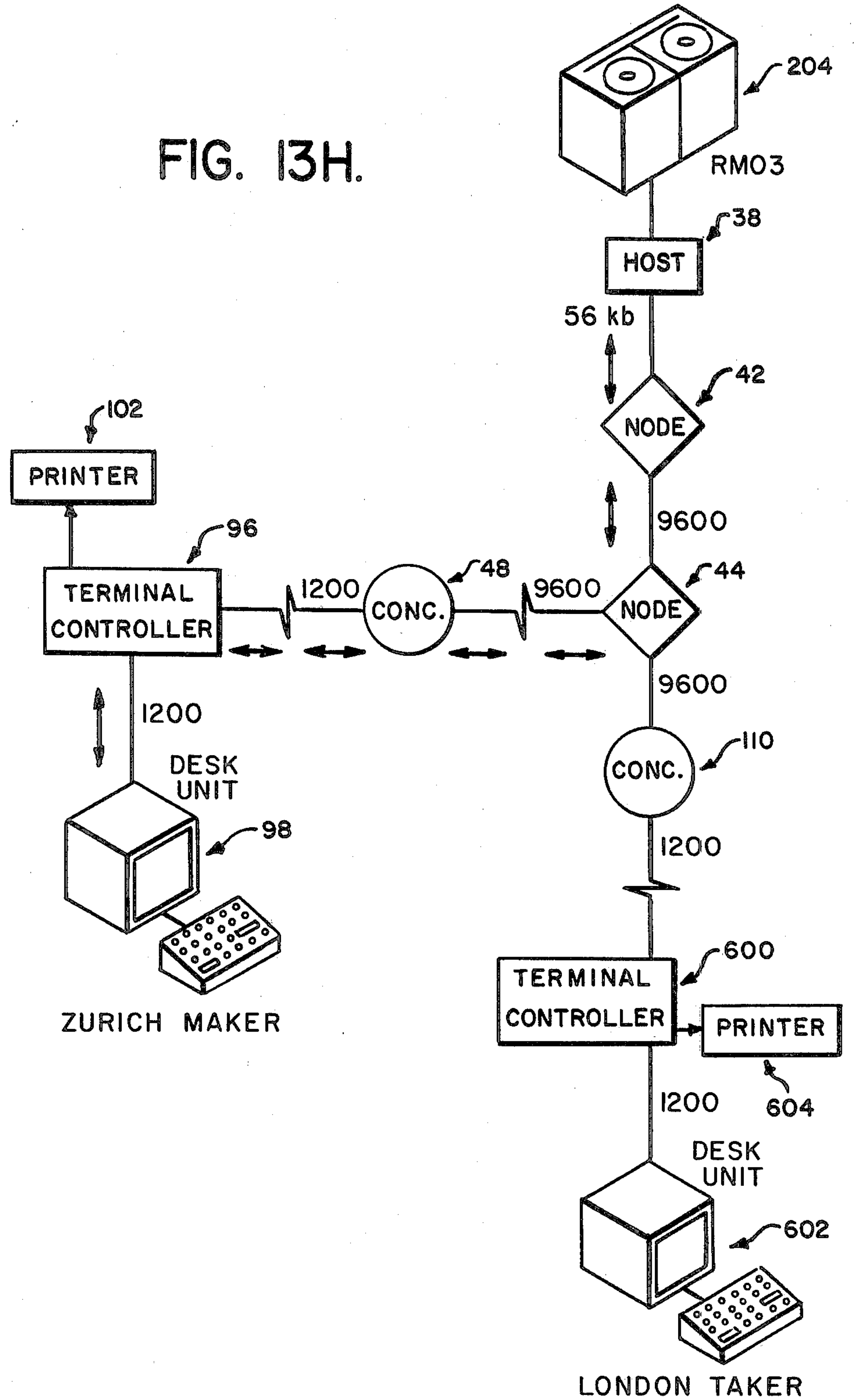
Figure 13I:
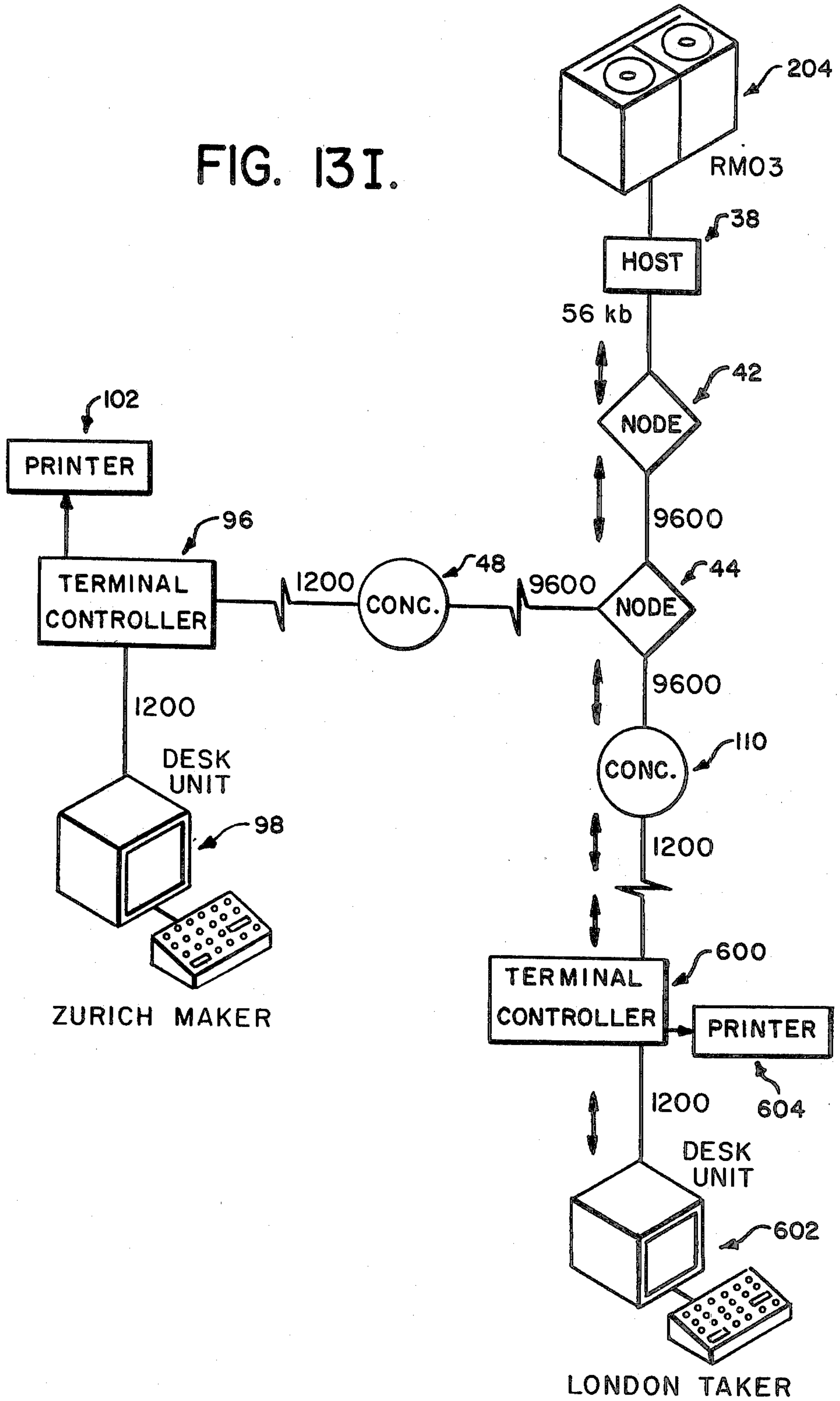
Figure 13J:
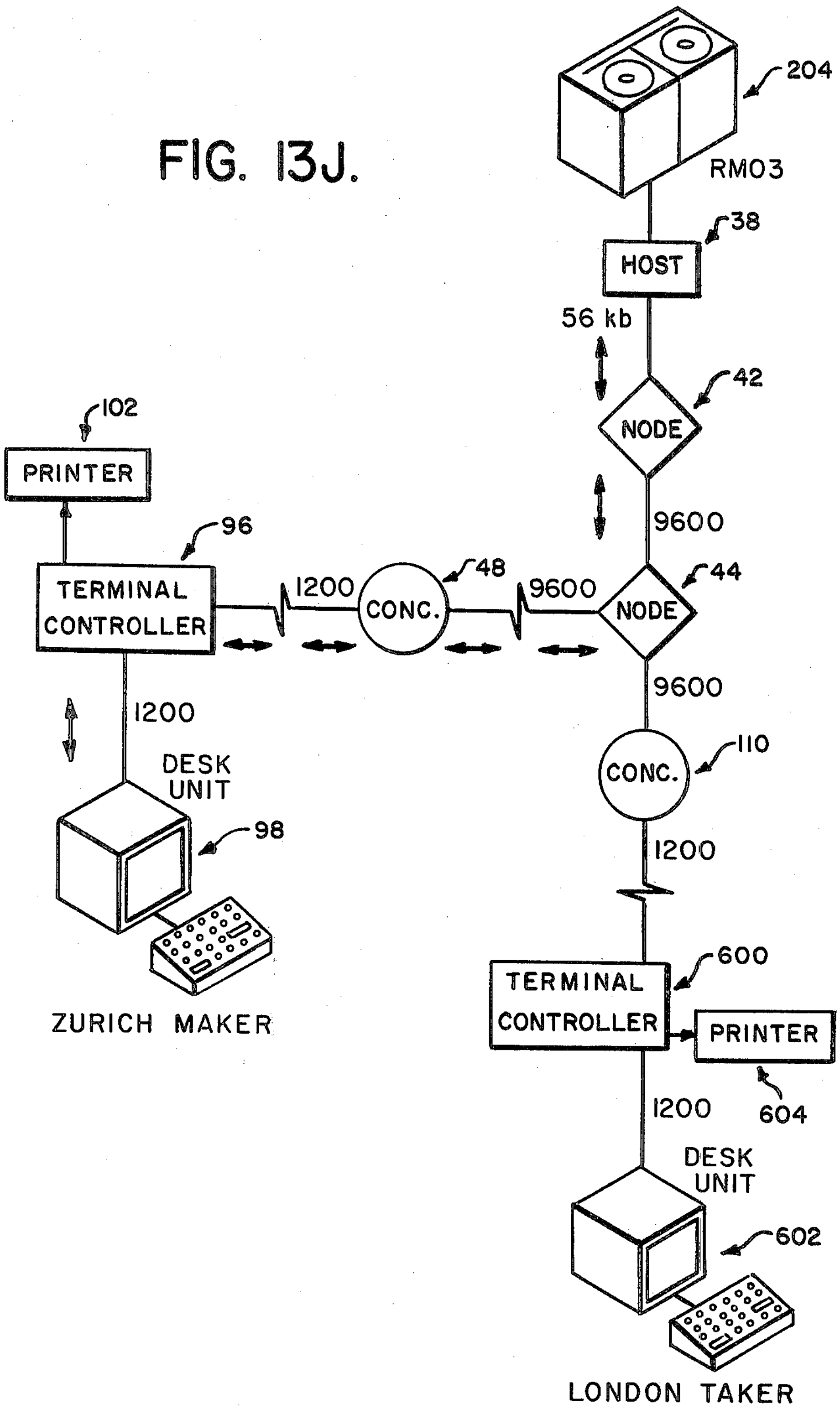
Figure 13K:
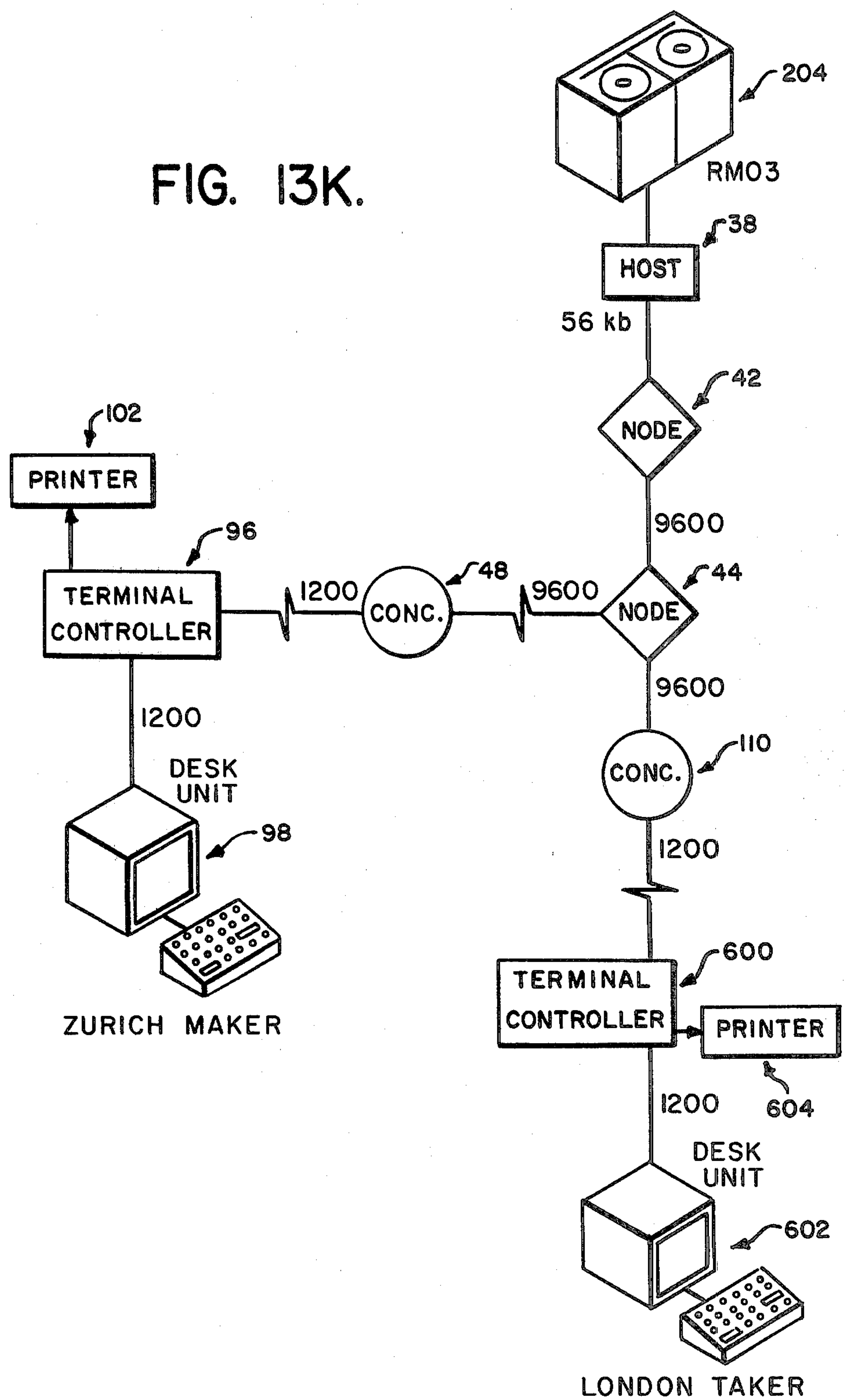
Figure 13L:
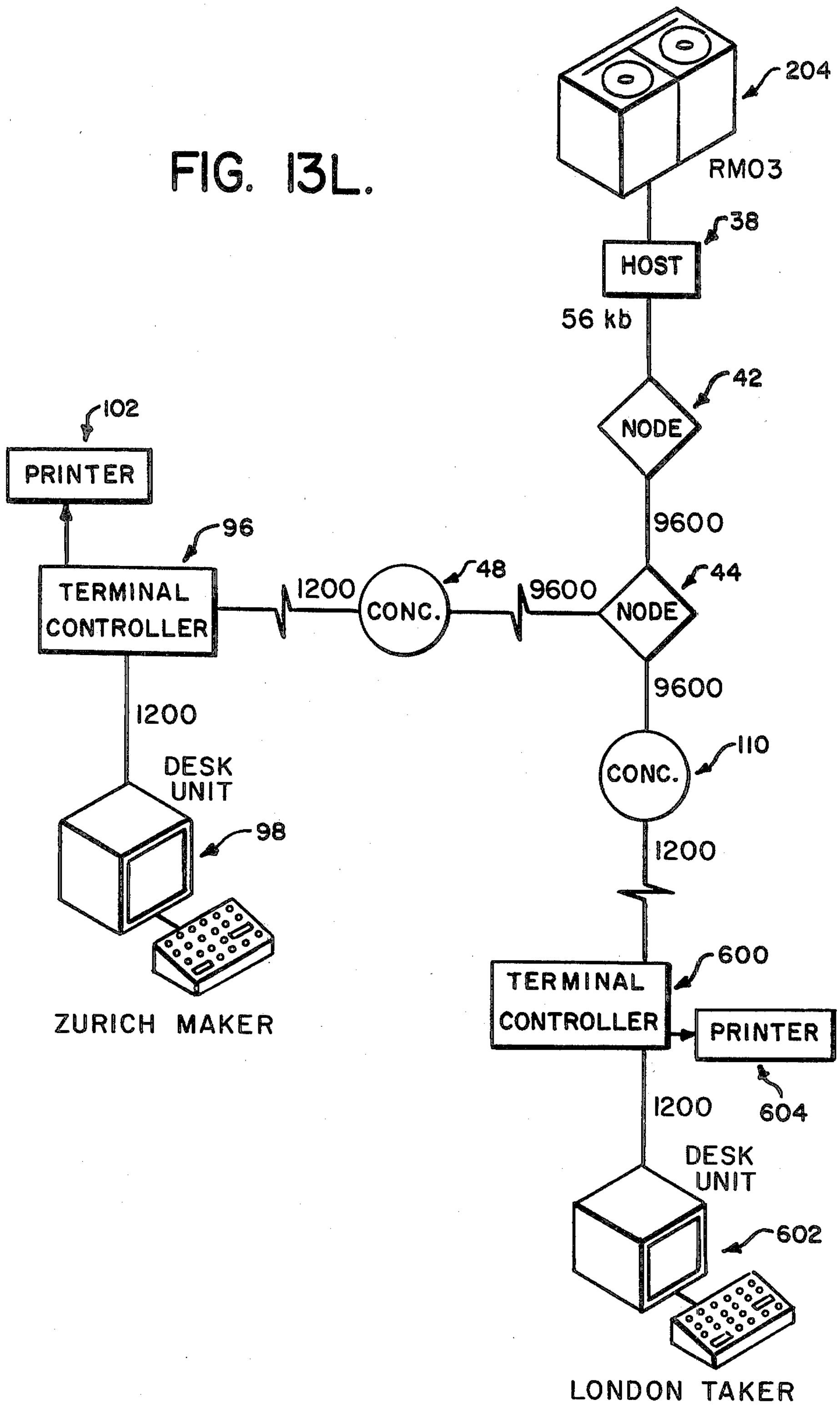
Figure 13M:
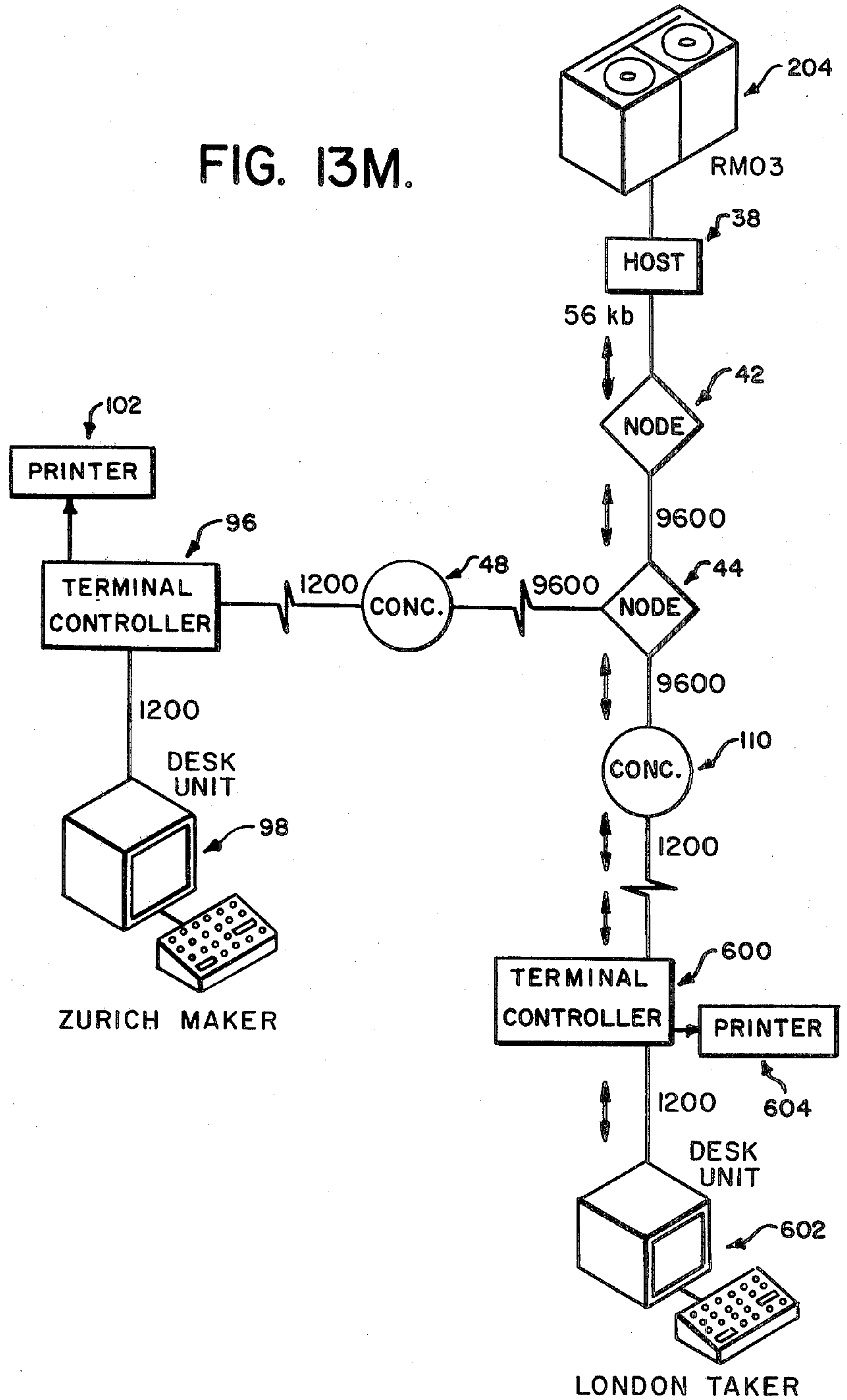
Figure 13N:
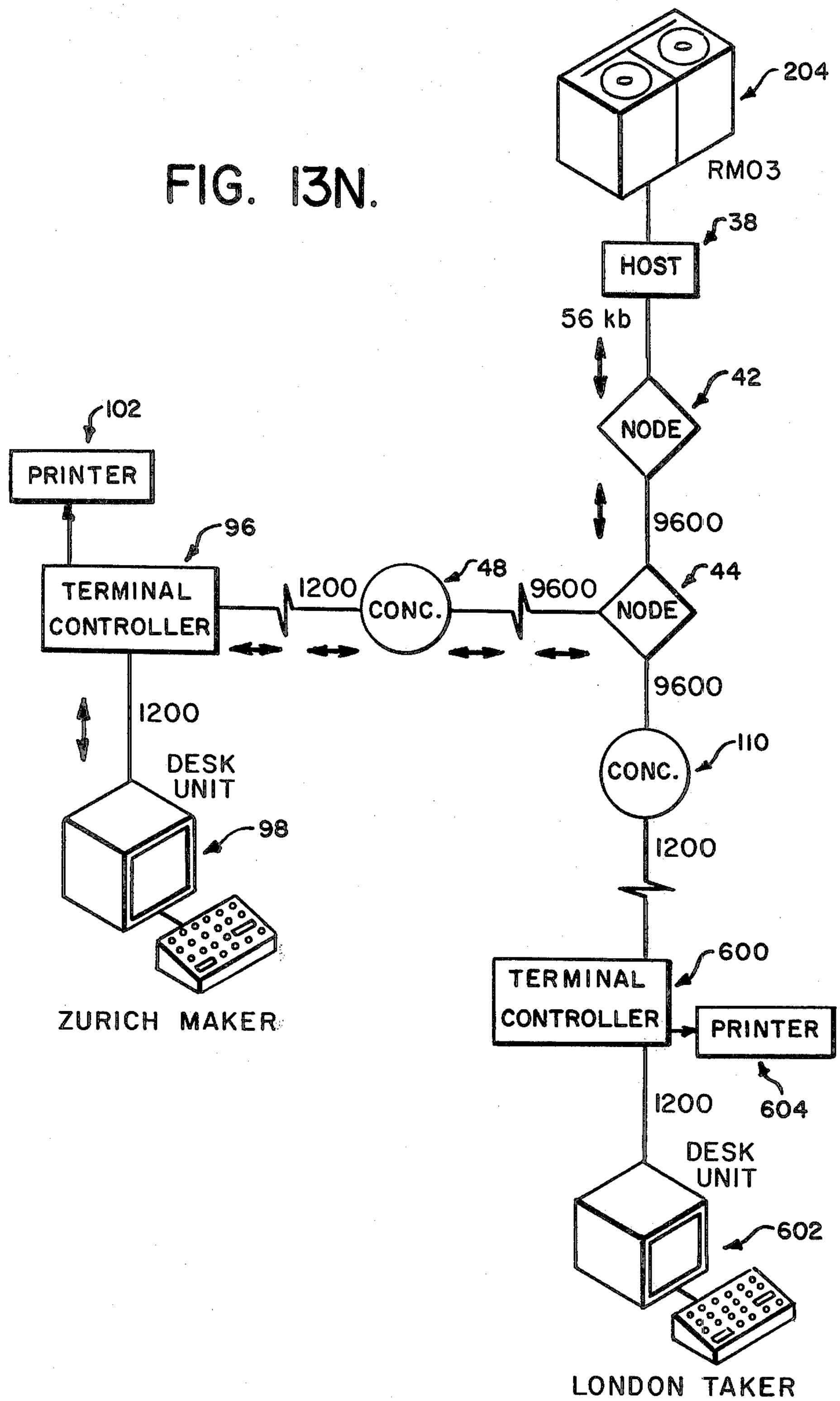
Figure 130:
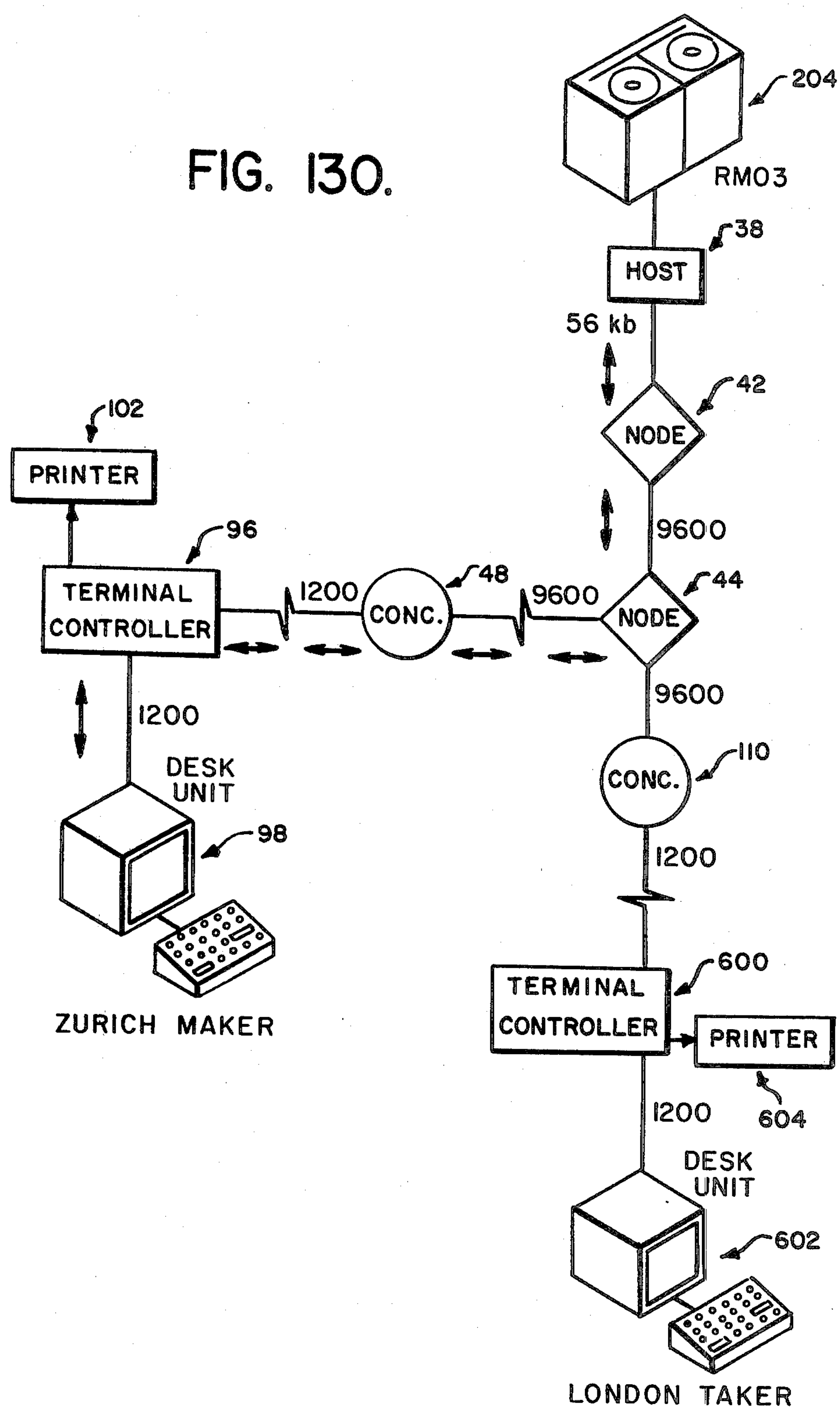
Figure 13P:
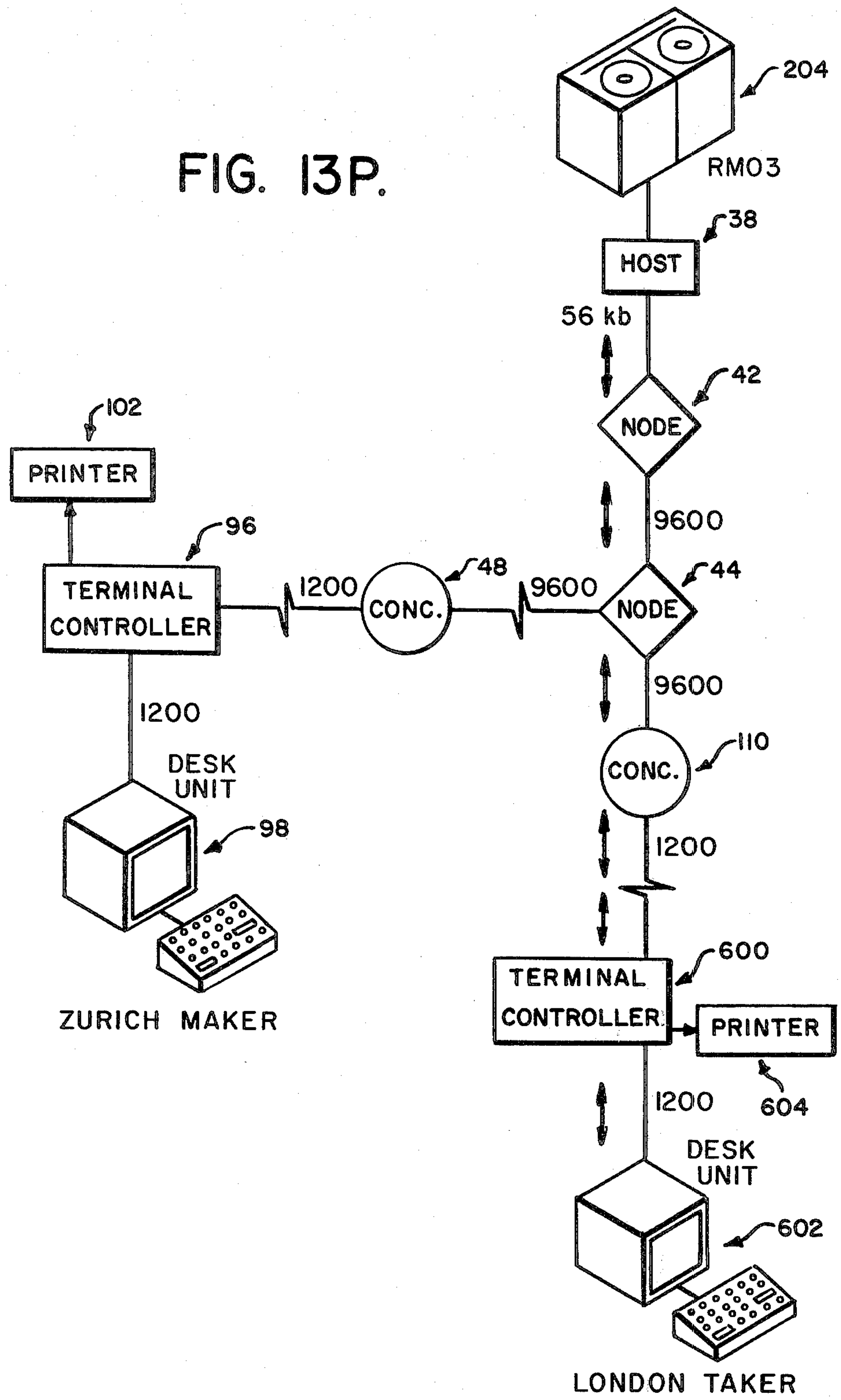

Referring now to FIGS. 13A through 13P, a typical conversational signal path for conducting a conversational video communication in this system 30 of the present invention is shown. FIGS. 13A through 13F relate to the setting up of a call, FIGS. 13G through 13I relate to the ending of a call and FIGS. 13J through 13P relate to the leaving of a call, which is the aforementioned left message. For purposes of FIGS. 13A through 13P, it shall be assumed that the transaction relates to money market dealing and that the calling party is located in Zurich at keystation 98 and is known as the Zurich maker and the called party is located in London at keystation 602 and is known as the London taker. When user 98 enters a contact request, as was previously mentioned, the message with the current insert line is transmitted to his terminal controller 96, therefrom to the concentrator computer 48, and therefrom through the computer nodes 44 and 42 to the host computer 38. The insert line is then interpreted and if the address is a single character it is preferably expanded, as was previously mentioned, by accessing the address abbreviations from storage. If the address constitutes a list of subscribers, then this list is preferably held in core while the subscribers are contacted in turn. The host computer 38, which is also associated with the called party in the example of FIGS. 13A through 13P, checks to see if there is room in the called subscriber's queue and that the caller 98 is not inhibited. If the call can be queued, the terminal controller 96 is given an audit number for the call and the interest message which was input by the caller 98. When the terminal controller 96 receives this message it preferably clears the conversation area 502, assuming it is the first conversation, in the display 76 of the caller 98 to enable display of the conversational video communication and preferably places the heading on the first line and the interest message, if any, on the second line. If the call can be queued, then the host computer 38 sends details of the call to the connected terminal controller 600 for the called subscriber at which user 602 is located. This message preferably includes an audit number to reference the call and the time and date of the call. Upon receipt at terminal controller 600, the call is preferably given a reference letter and displayed in the incoming calls queue in incoming calls area 500 of the display 76 of user 602. If user 602 accepts the call, the call is removed from the calls queue on controller 600 and the controller 600 asks its concentrator computer 110 for a connection to terminal controller 96. Terminal controller 96 then validates the acceptance of the call and replies to terminal controller 600. If the call can be established, this reply preferably includes the associated identification of user 98. When the call has been established or rejected, controller 68 sends a message to host computer 38 stating the calls audit number, whether it has been established or rejected, and the current number of free keystations associated with terminal controller 600. In response, host computer 38 sends a message to delete this call with this audit number from all terminal controllers associated with the subscriber at which terminal controller 600 is located. With respect to the aforementioned incoming calls area 500, this is maintained by the terminal controller 600, for example, which performs a number of functions on it including display of the last call on the last two lines, display of the number of calls, display of a flashing asterick and sounding a buzzer to mark a new call, display of calls in order, removing accepted calls, display of a message indication such as *MORE* if not all calls can be displayed and the scrolling of the calls area, all of which are previously described.

Once the call has been established between the Zurich maker 98 and the London taker 602, conversational video text is sent in packets at prescribed intervals with each packet including a sequence number within the respective terminal controller 600 or 96 period of control. Packets are also preferably sent at intervals in each direction to confirm the link between users 98 and 602. If a text packet arrives out of sequence, the receiving controller 96 or 600 obtains control by preferably sending a communication failure message specifying the line and column of the last character correctly received with the conversation beyond this point being deleted and a suitable message being added, with the party whose controller 96 or 600 detected the error then being left in control to resume the conversation. If the communication is somehow broken, controller 96 or 600 treats this as an abnormal end of the conversation. When control is handed over at the end of a message, the packet includes the line number in the conversation to ensure that the line numbers are synchronized. The conversational video text is preferably held in data buffers in each controller 96 and 600 and is used to support the display 76 as well as being queued for printing on printers 102 and 604, respectively, at the end of the call. It should be noted that because the display is a 64 character display, text beyond column 64 would not be displayed, although it could be printed. As was previously mentioned, the party receiving a line of conversational video text may interrupt its receipt before this line has been completed by the originator. This interrupt function can preferably only be actioned from the keyboard 72 of the party receiving the line of text. As previously mentioned, the depression of the interrupt key on this keyboard sends an interrupt message to the party originating the line of text, specifying the line number in the call, and the last character in the line received. The user who has initiated this interrupt message then rejects any further input for the call and awaits a response to its request which response causes a message *INTERRUPT* to be displayed on the next line and gives the interrupting party control over the conversation. Assuming that user 602 has initiated an interrupt message, then controller 96 which receives this interrupt will remove any text in its conversation after the point specified, will add the aforementioned interrupt message indicator on a new line, and will reply to terminal controller 600 accepting the interrupt. Referring now to FIGS. 13G through 13I, the sequence of ending a call shall now be described. Assuming that user 98 now wishes to end the call, and is in control of the conversational video communication, the user 98 depresses the end contact key on his keyboard 72, thus sending an end contact message via terminal controller 96 to terminal controller 600. If , in the above example, user 602 has not just interrupted the conversation, then this end contact message is accepted, an indication message such as the word *END* is added to the display of user 602 in the conversation area being employed, 502 or 504, and a reply is sent via the concentrator computers 110 and 48, ending the logical link between users 98 and 602. If, however, the user 98 is not in control at the time he wishes to end the call, pressing the end contact key will cause an interrupt, followed in the same message by a request to end the call. When the end of call has been acknowledged, the controller associated with the party who has initiated the end of call message, reports to the host computer 38, giving direction as to the number of associated keystations now free and, if desired, additional call statistics. The other party to the conversation retains the call text on his display 76 until he also presses the end contact key, whereupon his associated terminal controller reports the same type of information to the host computer 38. It should be noted that preferably each controller, 96 and 600 preferably queues the text of the call for printing to printers 102 and 604, respectively, as soon as the end contact message has been actioned at that particular controller 96 or 600.

Referring now to FIGS. 13J through 13P, the sequence for leaving a message, if an attempt has been made to set up a call and the called party is busy or off the system, is illustrated. In addition, as previously mentioned, a message may also be left if a call has been queued and has not been accepted. When the message has been inserted on the user insert line of the calling party and the transmit key on his keyboard is depressed, a left message message could be sent to the host computer 38 and thereafter any acceptace of the call will be refused. Host computer 38 reads the left message data block for the subscriber and, if there are less than a pre-determined number of left messages held, such as 20, or if one of the previous left messages can be deleted, it places the new left message in storage 204. This left message is then sent to the appropriate terminal controller, such as terminal controller 600, for printing at printer 604 and will include the total number of left messages for the subscriber at which terminal controller 600 is located, with this number being flashed on all screens associated with that subscriber. A reply is then sent to the originating user 98 for display as well as being printed on printer 102 associated with terminal controller 96. The display area can then be cleared by pressing the end contact key which causes the printing of the message on printer 102 and the clearing of the display of user 98.

Summarising the conventional video system of the present invention, by the use of this system, it enables, through the use of a video display terminal, subscribers to contact any subscribers throughout a world-wide network, to conduct interactive conversations with these subscribers, to conduct two such conversations simultaneously with two different subscribers, to obtain supplementary retrievable data which can be displayed during the conducting of such a conversation and which may assist the caller in connection with the conversation, particularly if it is some type of dealing transaction in which such supplementary data may be helpful, it enables a called subscriber to receive a plurality of incoming calls and randomly select any one of these calls irrespective of time of receipt and dependent on certain parameters such as the identity of the caller and the interest message initiated by that caller, it enables hard copy print-out of the video communications, it enables pre-preparation of responses while an incoming message is being received, and it enables transmission of the video communication message in short segments facilitating rapid transmisssion and response without causing excessive load on the packet switching network. All of the above features help in providing an effective conversational video communications system of the type which will enable rapid subscriber to subscriber communication and completion of dealing transactions in such situations when the system is employed for that purpose.

It is to be understood that the above described embodiments of the invention are merely illustrative of the principles thereof and that various modifications may be carried out without departing from the spirit and scope of the present invention.

What is claimed is:

1. In a video communication network capable of providing textual data messages to a plurality of subscriber terminals throughout said network, at least a portion of said plurality of subscriber terminals comprising keystations, each of said keystations comprising a keyboard means for inputting textual data messages and associated data control signals to said network and a video display means for providing a textual video display of at least keyboard generated data input to said network; the improvement comprising at least one message switching node interface means for routing video conversational textual data messages throughout said network and a plurality of keystation terminal controller interface means operatively connected between said keystations and said one message switching node interface means with at least one keystation being operatively connected to one keystation terminal controller interface means for each of said plurality of keystation terminal controller interface means, said one message switching node interface means comprising message routing logic means and storage means operatively connected to said message routing logic means for providing message routing logic control signals, each of said keystation controller interface means comprising display control logic means and local video display storage means for locally storing video conversational textual data for providing a video display thereof to at least one of said keystations connected to said keystation controller interface means, said keyboard means comprising means for providing unique calling signals to said keystation controller interface means for initiating calls to a keystation designated portion of said plurality of keystations in said network, said keystation controller interface means comprising means for providing said calling signals to said message switching node interface means and for receiving said calling signals therefrom for completing a call to said one connected keystation, said message routing logic means comprising means for routing said calling signals to said designated keystations to complete said initiated calls, said display control logic means comprising means for providing on said one connected keystation video display means a substantially simultaneous video display of video conversational textural data received from two different designated keystations in said network with which calls are completed via said separate keyboard means associated with said two different designated keystations and transmitted to said two different designated keystations via said keyboard means associated with said one connected keystation, whereby different video conversations may be substantially simultaneously carried out with different keystations on a common video display using a common keyboard.

2. A video conversational communication network in accordance with claim 1 wherein said local video display storage means comprises means for locally storing said video conversational textual data from said two different substantially simultaneous calls with said two different designated keystations.

3. A video conversational communication network in accordance with claim 2 wherein said network further comprises hard copy printing means operatively connected to each of said keystation controller interface means for providing a hard copy print out of said locally stored video conversational textual data.

4. A video conversational communication network in accordance with claim 3 wherein said display control logic means further comprises keyboard control logic means for enabling said one connected keystation to input a video conversational textual data message via said keyboard means prior to transmitting said message to said designated keystations.

5. A video conversational communication network in accordance with claim 4 wherein said keyboard control logic means enables said video conversational textual data message to be input while said connected keystation is receiving a video conversational textual data passage from one of said designated keystations.

6. A video conversational communication network in accordance with claim 5 wherein said network further comprises a retrievable data base comprising retrievable video displayable textual data, said keyboard control logic means comprising means for enabling selective retrieval of said data from said data base for video display thereof while at least video textual conversational data from one of said calls to one of said designated keystations is substantially simultaneously displayed on said one connected keystation video display means.

7. A video conversational communication network in accordance with claim 6 wherein said message routing control logic means comprises means for providing an incoming calls signal to said keystation controller interface means comprising all of said incoming calls designated for a particular keystation controller interface means, said display control logic means comprising means for displaying said incoming calls on said one connected keystation video display means, each of said incoming calls comprising at least a unique identifier associated with the keystation initiating the call.

8. A video conversational communication network in accordance with claim 7 wherein said local video display storage means stores said incoming calls in a caller queue for providing an incoming caller queue video display.

9. A video conversational communication network in accordance with claim 8 wherein said display control logic comprises means for enabling random selection of an incoming call from said incoming caller queue for completing a call to said selected incoming call initiating keystation.

10. A video conversational communication network in accordance with claim 9 wherein said display control logic means comprises means for transmitting said video conversational textual data input from said one connected keystation keyboard means from said one connected keystation to said designated keystations in data packets comprising less than the total video displayable data content of said video textual data conversational message.

11. A video conversational communication network in accordance with claim 1 wherein said network further comprises hard copy printing means operatively connected to each of said keystation controller interface means for providing a hard copy print out of said locally stored video conversational textual data.

12. A video conversational communication network in accordance with claim 1 wherein said display control logic means further comprises keyboard control logic means for enabling said one connected keystation to input a video conversational textual data message via said keyboard means prior to transmitting said message to said designated keystations.

13. A video conversational communication network in accordance with claim 12 wherein said keyboard control logic means enables said video conversational textual data message to be input while said connected keystation is receiving a video conversational textual data message from one of said designated keystations.

14. A video conversational communication network in accordance with claim 1 wherein said network further comprises a retrievable data base comprising retrievable video displayable textual data, said keyboard control logic means comprising means for enabling selective retrieval of said data from said data base for video display thereof while at lease video textual conversational data from one of said calls to one of said designated keystations is substantially simultaneously displayed on said one connected keystation video display means.

15. A video conversational communication network in accordance with claim 1 wherein said message routing control logic means comprises means for providing an incoming calls signal to said keystation controller interface means comprising all of said incoming calls designated for a particular keystation controller interface means, said display control logic means comprising means for displaying said incoming calls on said one connected keystation video display means, each of said incoming calls comprising at least a unique identifier associated with the keystation initiating the call.

16. A video conversational communication network in accordance with claim 15 wherein said local video display storage means stores said incoming calls in a caller queue for providing an incoming caller queue video display.

17. A video conversational communication network in accordance with claim 16 wherein said display control logic comprises means for enabling random selection of an incoming call from said incoming caller queue for completing a call to said selected incoming call initiating keystation.

18. A video conversational communication network in accordance with claim 1 wherein said display control logic means comprises means for transmitting said video conversational textual data input from said one connected keystation keyboard means from said one connected keystation to said designated keystations in data packets comprising less than the total video displayable data content of said video textual data conversational message.

19. In a video communication network capable of providing textual data messages to a plurality of subscriber terminals throughout said network, at least a portion of said plurality of subscriber terminals comprising keystations, each of said keystations comprising a keyboard means for operator input of textural data messages and associated data control signals to said network via said keyboard means and a video display means for providing a textual video display of at least keyboard generated data input to said network; the improvement comprising at least one message switching node interface means for routing video conversational textual data messages throughout said network and a plurality of keystation terminal controller interface means operatively connected between said keystations and said one message switching node interface means with at least one keystation being operatively connected to one keystation terminal controller interface means for each of said plurality of keystation terminal controller interface means, said one message switching node interface means comprising message routing logic means and storage means operatively connected to said message routing logic means for providing message routing logic control signals, each of said keystation controller interface means comprising display control logic means and local video display storage means for locally storing video conversational textual data for providing a video display thereof to at least one of said keystations connected to said keystation controller interface means, said keyboard means comprising means for providing unique calling signals to said keystation controller interface means for initiating calls to a keystation designated portion of said plurality of keystations in said network, said keystation controller interface means comprising means for providing said calling signals to said message switching node interface means and for receiving said calling signals therefrom for completing a call to said one connected keystation, said message routing logic means comprising means for routing said calling signals to said designated keystations to complete said initiated calls, wherein said display control logic means comprises keyboard control logic means for enabling the operator at said one connected keystation to input and display a video conversational textual data reply message via said keyboard means prior to the operator enabling transmission of said conversational reply message to a designated keystation in said network with which a call has been completed while said one connected keystation is receiving and displaying a related video conversational textual data message from said designated keystation.

20. A video conversational communication network in accordance with claim 19 wherein said keyboard control logic means further comprises means for varying said displayed conversational reply message prior to the operator enabling said transmission thereof while said one connected keystation is receiving and displaying said related conversational message from said designated keystation.

21. In a video communication network capable of providing textual data messages to a plurality of subscriber terminals throughout said network, at least a portion of said plurality of subscriber terminals comprising keystations, each of said keystations comprising a keyboard means for inputting textual data messages and associated data control signals to said network and a video display means for providing a textual video display of at least keyboard generated data input to said network; the improvement comprising at least one message switching node interface means for routing video conversational textual data messages throughout said network and a plurality of keystation terminal controller interface means operatively connected between said keystations and said one message switching node interface means with at least one keystation being operatively connected to one keystation terminal controller interface means for each of said plurality of keystation terminal controller interface means, said one message switching node interface means comprising message routing logic means and storage means operatively connected to said message routing logic means for providing message routing logic control signals, each of said keystation controller interface means comprising display control logic means and local video display storage means for locally storing video conversational textual data for providing a video display thereof to at least one of said keystations connected to said keystation controller interface means, said keyboard means comprising means for providing unique calling signals to said keystation controller interface means for initiating calls to a keystation designated portion of said plurality of keystations in said network, said keystation controller interface means comprising means for providing said calling signals to said message switching node interface means and for receiving said calling signals therefrom for completing a call to said one connected keystation, said message routing logic means comprising means for routing said calling signals to said designated keystations to complete said initiated calls, wherein said network further comprises a retrievable data base comprising retrievable video displayable textual data, said keyboard control logic means comprising means for enabling selective retrieval of said data from said data base for video display thereof while at least video textual conversational data from one of said calls to one of said designated keystations is substantially simultaneously displayed on said one connected keystation video display means.

22. In a video communication network capable of providing textural data messages to a plurality of subscriber terminals throughout said network, at least a portion of said plurality of subscriber terminals comprising keystations, each of said keystations comprising a keyboard means for inputting textual data messages and associated data control signals to said network and a video display means for providing a textual video display of at least keyboard generated data input to said network; the improvement comprising at least one message switching node interface means for routing video conversational textual data messages throughout said network and a plurality of keystation terminal controller interface means operatively connected between said keystations and said one message switching node interface means with at least one keystation being operatively connected to one keystation terminal controller interface means for each of said plurality of keystation terminal contoller interface means, said one message switching node interface means comprising message routing logic means and storage means operatively connected to said message routing logic means for providing message routing logic control signals, each of said keystation controller interface means comprising display control logic means and local video display storage means for locally storing video conversational textual data for providing a video display thereof to at least one of said keystations connected to said keystation controller interface means, said keyboard means comprising means for providing unique calling signals to said keystation controller interface means for initiating calls to a keystation designated portion of said plurality of keystations in said network, said keystation controller interface means comprising means for providing said calling signals to said message switching node interface means and for receiving said calling signals therefrom for completing a call to said one connected keystation, said message routing logic means comprising means for routing said calling signals to said designated keystations to complete said initiated calls, wherein said message routing control logic means comprises means for providing an incoming calls signal to said keystation controller interface means comprising all of said incoming calls designated for a particular keystation controller interface means, said display control logic means comprising means for displaying said incoming calls on said one connected keystation video display means, each of said incoming calls comprising at least a unique identifier associated with the keystation initiating the call, said local video display storage means storing said incoming calls in a caller queue for providing an incoming caller queue video display, said display control logic means further comprising means for enabling random selection of an incoming call from said incoming caller queue for completing a call to said selected incoming call initiating keystation.

23. In a video communication network capable of providing textual data messages to a plurality of subscriber terminals throughout said network, at least a portion of said plurality of subscriber terminals comprising keystations, each of said keystations comprising a keyboard means for inputting textual data messages and associated data control signals to said network and a video display means for providing a textual video display of at least keyboard generated data input to said network; the improvement comprising at least one message switching node interface means for routing video conversational textual data messages throughout said network and a plurality of keystation terminal controller interface means operatively connected between said keystations and said one message switching node interface means with at least one keystation being operatively connected to one keystation terminal controller interface means for each of said plurality of keystation terminal controller interface means, said one message switching node interface means comprising message routing logic means and storage means operatively connected to said message routing logic means for providing message routing logic control signals, each of said keystation controller interface means comprising display control logic means and local video display storage means for locally storing video conversational textual data for providing a video display thereof to at least one of said keystations connected to said keystation controller interface means, said keyboard means comprising means for providing unique calling signals to said keystation controller interface means for initiating calls to a keystation designated portion of said plurality of keystations in said network, said keystation controller interface means comprising means for providing said calling signals to said message switching node interface means and for receiving said calling signals therefrom for completing a call to said one connected keystation, said message routing logic means comprising means for routing said calling signals to said designated keystations to complete said initiated calls, wherein said display control logic means comprises means for initiating transmission of said keyboard generated video conversational textual data input from said one connected keystation to a designated keystation in said network with which a call has been completed in multicharacter data packets comprising less than the total video displayable data content of one video displayable line of one said video textual data conversational messages.

* * * * *